US011663414B2

(12) United States Patent
Bongartz et al.

(10) Patent No.: US 11,663,414 B2
(45) Date of Patent: May 30, 2023

(54) CONTROLLED AGRICULTURAL SYSTEMS AND METHODS OF MANAGING AGRICULTURAL SYSTEMS

(71) Applicant: FLUENCE BIOENGINEERING, INC., Austin, TX (US)

(72) Inventors: Timo Bongartz, Munich (DE); Sebastian Olschowski, Munich (DE); Norbert Haas, Langenau (DE); Guido Angenendt, Munich (DE); Marek Burza, Munich (DE); Norbert Magg, Berlin (DE); Cristin Dziekonski, Topsfield, MA (US)

(73) Assignee: FLUENCE BIOENGINEERING, INC., Austin, TX (US)

( * ) Notice: Subject to any disclaimer, the term of this patent is extended or adjusted under 35 U.S.C. 154(b) by 364 days.

(21) Appl. No.: 16/786,001

(22) Filed: Feb. 10, 2020

(65) Prior Publication Data

US 2020/0184153 A1 Jun. 11, 2020

Related U.S. Application Data

(63) Continuation-in-part of application No. 16/275,476, filed on Feb. 14, 2019.

(30) Foreign Application Priority Data

Mar. 23, 2018 (DE) ..................... 10 2018 204 524.0
Apr. 13, 2018 (DE) ..................... 10 2018 205 654.4
(Continued)

(51) Int. Cl.
G06F 17/00 (2019.01)
G06F 40/30 (2020.01)
(Continued)

(52) U.S. Cl.
CPC ............ G06F 40/30 (2020.01); A01G 9/249 (2019.05); G05B 15/02 (2013.01)

(58) Field of Classification Search
None
See application file for complete search history.

(56) References Cited

U.S. PATENT DOCUMENTS 7,092,958 B2 * 8/2006 Hempstead ........... G06F 16/252 706/50
7,548,863 B2 * 6/2009 Kida ..................... G06F 40/274 704/277
(Continued)

FOREIGN PATENT DOCUMENTS

CN 104322362 A 2/2015
CN 106888853 A 6/2017

OTHER PUBLICATIONS

Copenheaver, Blaine R., International Search Report and Written Opinion of the International Searching Authority, for counterpart application PCT/US2020/017910, dated Jun. 10, 2020, United States Patent and Trademark Office, Alexandria, Virginia, 15 pages.
(Continued)

Primary Examiner — Satwant K Singh

(57) ABSTRACT

The present disclosure relates to different techniques of controlling an agricultural system, as for example a controlled agricultural system, an agricultural light fixture and a method for agricultural management.

Furthermore, the disclosure relates to an agricultural system, which comprises a plurality of processing lines for growing plants of a given plant type, wherein a first processing line in the plurality of processing lines is configured to move a first plurality of plants through the agricultural system along
(Continued)

a route; and apply a first growth condition to the first plurality of plants to satisfy a first active agent parameter for the first plurality of plants.

15 Claims, 89 Drawing Sheets

(30) Foreign Application Priority Data

| | | | |
|---|---|---|---|
| May 18, 2018 | (DE) | ..................... | 10 2018 207 877.7 |
| Jun. 5, 2018 | (DE) | ..................... | 10 2018 208 843.8 |
| Jul. 16, 2018 | (DE) | ..................... | 10 2018 211 810.8 |
| Jul. 25, 2018 | (DE) | ..................... | 10 2018 212 402.7 |
| Jul. 31, 2018 | (DE) | ..................... | 10 2018 212 752.2 |
| Aug. 7, 2018 | (DE) | ..................... | 10 2018 213 214.3 |
| Aug. 13, 2018 | (DE) | ..................... | 10 2018 213 632.7 |
| Aug. 22, 2018 | (DE) | ..................... | 10 2018 214 193.2 |
| Aug. 22, 2018 | (DE) | ..................... | 10 2018 214 193.3 |
| Aug. 29, 2018 | (DE) | ..................... | 10 2018 214 676.4 |
| Aug. 31, 2018 | (DE) | ..................... | 10 2018 214 888.0 |
| Sep. 28, 2018 | (DE) | ..................... | 10 2018 216 800.8 |
| Oct. 8, 2018 | (DE) | ..................... | 10 2018 217 145.9 |
| Oct. 15, 2018 | (DE) | ..................... | 10 2018 217 664.7 |
| Oct. 18, 2018 | (DE) | ..................... | 10 2018 217 830.5 |
| Oct. 18, 2018 | (DE) | ..................... | 10 2018 217 848.8 |
| Oct. 18, 2018 | (DE) | ..................... | 10 2018 217 855.0 |
| Oct. 22, 2018 | (DE) | ..................... | 10 2018 218 004.0 |
| Oct. 25, 2018 | (DE) | ..................... | 10 2018 218 295.7 |
| Oct. 25, 2018 | (DE) | ..................... | 10 2018 218 297.3 |
| Oct. 30, 2018 | (DE) | ..................... | 10 2018 218 578.6 |
| Nov. 5, 2018 | (DE) | ..................... | 10 2018 218 779.7 |
| Nov. 13, 2018 | (DE) | ..................... | 10 2018 219 367.3 |
| Nov. 20, 2018 | (DE) | ..................... | 10 2018 219 875.6 |
| Nov. 20, 2018 | (DE) | ..................... | 10 2018 219 883.7 |
| Nov. 28, 2018 | (DE) | ..................... | 10 2018 220 493.4 |
| Dec. 4, 2018 | (DE) | ..................... | 10 2018 220 902.2 |
| Dec. 12, 2018 | (DE) | ..................... | 10 2018 221 544.8 |
| Dec. 12, 2018 | (DE) | ..................... | 10 2018 221 552.5 |
| Dec. 12, 2018 | (DE) | ..................... | 10 2018 221 552.9 |

(51) Int. Cl.

| | |
|---|---|
| ***A01G 9/24*** | (2006.01) |
| ***G05B 15/02*** | (2006.01) |

(56) References Cited

U.S. PATENT DOCUMENTS

| | | | | |
|---|---|---|---|---|
| 2003/0014617 | A1 | 1/2003 | Tamboli et al. | |
| 2003/0225913 | A1* | 12/2003 | Bussler ................ | G06F 16/258<br>709/246 |
| 2004/0181541 | A1 | 9/2004 | Groenendaal et al. | |
| 2007/0288467 | A1 | 12/2007 | Strassner et al. | |
| 2013/0227171 | A1 | 8/2013 | Nam et al. | |
| 2016/0078569 | A1 | 3/2016 | Ethington et al. | |
| 2016/0127514 | A1 | 5/2016 | Maksumov et al. | |
| 2017/0097720 | A1* | 4/2017 | Shin .................... | G06F 3/04162 |
| 2017/0177712 | A1* | 6/2017 | Kopru ................ | G06F 16/3337 |
| 2017/0279894 | A1 | 9/2017 | Chen et al. | |
| 2017/0374490 | A1 | 12/2017 | Schoppmeier | |
| 2018/0137579 | A1 | 5/2018 | Park et al. | |
| 2019/0114549 | A1* | 4/2019 | Olsher ................ | G06Q 10/025 |

OTHER PUBLICATIONS

English Abstract of CN 104322362 downloaded from Espacenet on Apr. 8, 2022 (1 page).

English Abstract of CN 106888853 downloaded from Espacenet on Apr. 8, 2022 (1 page).

* cited by examiner

FIG 4A
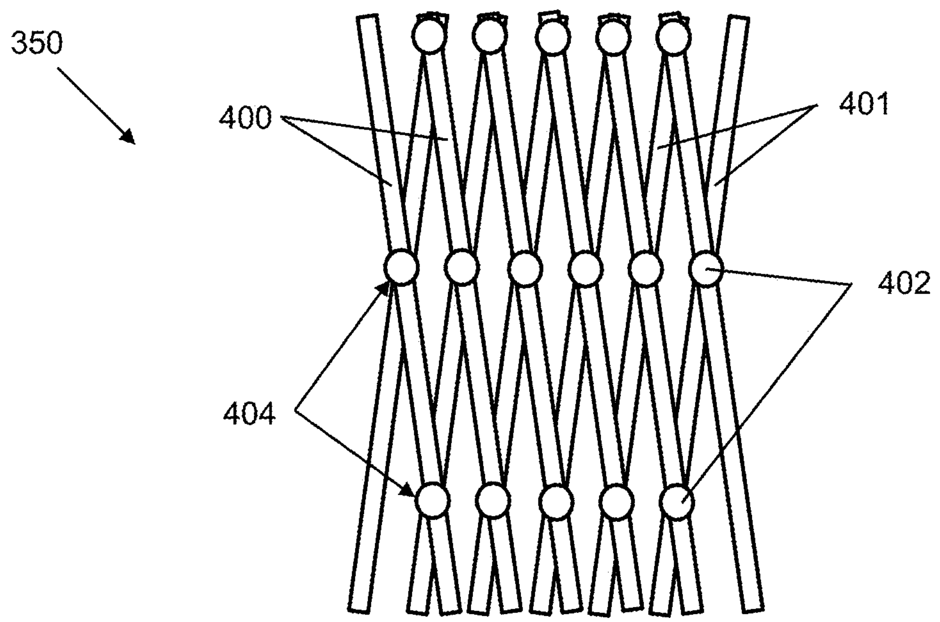
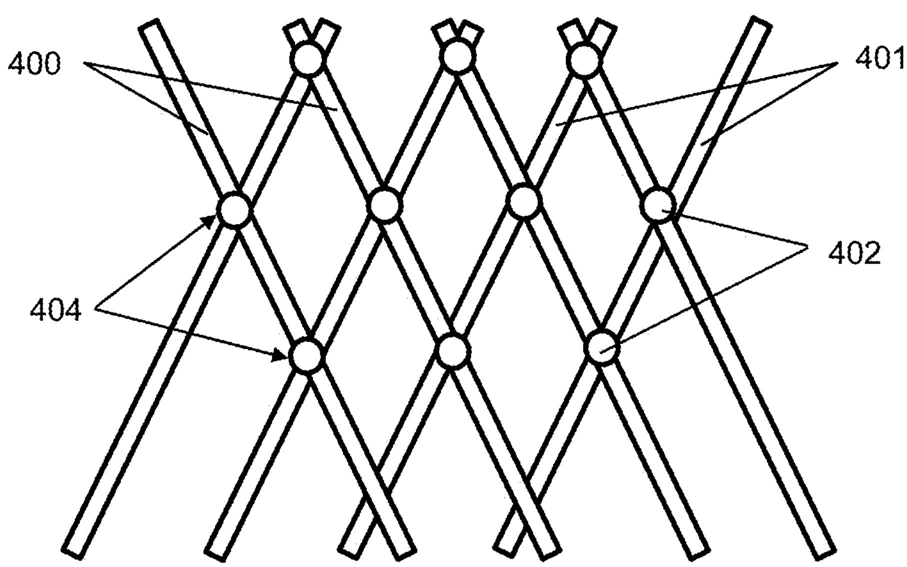
FIG 4B

CONTROLLED AGRICULTURAL SYSTEMS AND METHODS OF MANAGING AGRICULTURAL SYSTEMS

CROSS REFERENCE TO RELATED APPLICATIONS

This patent application is a continuation-in-part of U.S. patent application Ser. No. 16/275,476, entitled "Controlled Agricultural Systems and Methods of Managing Agricultural Systems," filed Feb. 14, 2019, which is hereby incorporated by reference in its entirety.

INTRODUCTION

The present disclosure relates to a Controlled Agricultural System, an Agricultural Light Fixture for use in a Controlled Agricultural System and a Method for Agricultural Management.

Agriculture has been a success story for thousands of years. Technical improvements, from the very first ploughshare to today's state of the art harvesting machines, from the early use of minerals and manure by Egyptians, Romans, and Babylonians to today's tailor-made fertilizers, from early plant breeding to genetic engineering, farming culture allowed for a steady increase of the harvest. In spite of these extensive changes, one underlying principle remained the same, the plant growth was ever since and still is today driven by the natural sunlight. This success story, which began at the end of the ice age, was about bringing the plants to the light.

The story of the present application is about bringing the light to the plants.

It is even more about designing not only the light, but the whole environment of the farm around the plants. As far as the plants have been adapted to the natural environment by breeding and genetic engineering in the past, the present approach is to customize and adapt the farm to the specific needs of the plants. One important enabler for moving agriculture indoors is the energy efficiency of state of the art light sources.

While the energy consumption of artificial lighting has been lowered continuously, in particular driven by LED technology, traditional farming is facing more and more limits. There are not only the disadvantages of monocultural farming, over-fertilized and depleted soils, but there is also an excessive use of fuel by the large harvesting machines on the giant fields. Furthermore, this decentralized crop production implies long transport routes and world-wide shipping, with a respective impact on the food quality and the ecological footprint.

From this point of view, it is again climatic change that is driving a transition. In traditional farming, irrigating agricultural land requires enormous amounts of water, particularly in view of increasing periods of drought. Apart from that, people are moving to cities with an ever more growing distance from field to fork. In this respect, going indoors and in particular vertical farming allows for a production of high-quality food close to the consumer.

With plants being organic goods having very specific needs, a farm or agricultural system discussed here can have a quite different design and setup in detail, for instance depending on the type and size of the plants grown, but also on the location of the farm (e. g. vertical farm in a city) or other local requirements.

The embodiment of claim 1 relates to an agricultural system or farm with processing lines for growing plants.

Therein, a first processing line is configured to move a first plurality of plants through the agricultural system along a route and to apply a first growth condition to the first plurality of plants to satisfy a first active agent parameter for the first plurality of plants. An active agent can for instance be a pharmaceutical ingredient, see the element "Medical Certificates" in detail.

Embodiments relating to the functionality of the farm as a whole are described in Chapter I "System Setup". The farm, in particular a fully automated farm, can manage the entire growth system, applying not only a customized illumination to the plants (light recipes), but even customized environmental conditions (growth recipes) and solutions for maintaining or restoring plant health, see Chapter II "Plant Health/Growth" and Chapter III "Light/Growth Recipe".

Thinking about the starting point again, bringing the light to the plants, the embodiments of Chapter IV "Luminaire" give a more detailed view of a possible light source and fixture setup in the farm.

A highly automated farm or agricultural system allows not only for intelligent solutions inside the farm, but also for an enhanced linkage of the farm to the outside world.

From this point of view, the farm is one element in a supply chain. Amongst others, electrical energy is one of the most important ingoing goods, which is described in detail in Chapter V "Smart Grid", particularly the interaction between a controlled agricultural system and a smart grid power supply.

Further, an automated farm can also enable an alignment with downstream entities of food industry, in particular food producers. In simple words, exactly that crop (specific taste or nutrient content or the like) required in a food fab for processing a certain lot can be grown in the farm.

Finally, customers can address their requests for customized plants to the farm, which can be preprocessed and fed into the digital supply chain of the agricultural system. The customer can monitor the growth of the customized plants by means of information on the respective growth stages provided by the farm to the customer. Such interaction between farm and customer is described in more detail in Chapter VI "Customer Interaction".

System Setup

The elements of the disclosure discussed in this chapter "System Setup" relate to the setup and functionality of the farm as a whole.

A major risk for farmers and food producers is a crop damage or even total failure, which might end up in a total economic loss. Even though going indoors can reduce the risk of for instance a storm damage, other hazards remain, as for example an infection of the plants with fungi or diseases. One major, though not the only, path of infection can be the interaction with an operating personnel bringing for instance spores from the environment outside into the farm. This can be one reason why a widely or even fully automated farm is advantageous.

Therein, the automatization in farming is hardly comparable to the production process optimization known from industrial goods. Apart from various plant specific needs, these "organic goods" change their morphology and size during production. To consider this, the element "Resizable Growth Area" proposes a growth area adjustable in size. The distance between the individual growth locations can be adapted based on the size of the plants grown there, allowing for a compact arrangement and efficient illumination at the beginning of the growth cycle and sufficient space as well as efficient illumination for the plants at the end thereof. In another aspect of "Resizable Growth Area" (but also in "Hydroponics" or "Horticulture Processing Line", see below), the growth area can be moved through the farm, wherein at different locations different illumination setups are provided, which are perfectly adapted to the actual size of the growth area at the respective location.

One way of moving plants through the farm is described in "Hydroponics", showing an assembly-line perfectly adapted to the specific needs of plants. In this case, the growth locations can be trays floating on a waterway. Likewise, the transportation through the farm, for instance along different illumination areas adapted to the respective growth stage, can be combined with an inherent water or also nutrient supply in the waterway. In case of an infection or other abnormality, detected for instance by a sensor device (e.g. camera), the respective growth tray can be unloaded from the waterway to a specific treatment location, as discussed in "Horticulture Processing Line" in detail.

The specific treatment location can be comparable to a quarantine area, which can further reduce the interaction of an operating personnel at the standard processing line and the risk of a contamination. As an alternative to the waterway, the trays with the seeds or plants can also be moved on rails or elevators along the standard processing line (but also by transportation cars or moving arms or robots in general).

Even though moving the plants through the farm may initially cause a certain effort, this invest pays off when the different locations or zones of the farm are highly customized regarding the specific growth stage. A perfect illumination setup emits only spectral portions required in the specific growth stage (spectral customization), so, ideally, all photons will hit the plants (geometrical customization). In the long run, this optimization of the energy footprint pays off. A method or tool for planning a highly automated farm is described in "Light Recipes and Workflow". As mentioned already, the setup of a sensor device or array can be crucial for the automatization, for instance to detect infected plants and trigger their unloading or treatment. An optimal arrangement or distribution of the sensors in a farm can be achieved by the method described in "Measuring Patterns".

In general, the plant production, as described for instance in "Hydroponics" or "Horticulture Processing Line" can use plant health detection systems as for instance described in "Disease & Pest Control", "Prophylaxis", "Discolored Spots Detection" and/or light treatments as for instance described in "Light Guides", "Temperature Control", "Fungi Growth Inhibition". The speed of the production may even be adapted to allow for a proper sensing or treatment of the plants. Regarding a proper function of the light fixtures, in particular in the long run over their lifetime, data obtained according to the method described in "Failure Detection" is helpful. The approach described there can also reduce human interaction and the risk of infection thus.

Ideally, the conditions in the farm or different zones thereof are customized to the specific needs of the plants in the respective growth stages. This customization can be supported or achieved by various sensor measurements. Therein, feedback loops can be implemented so that the plants but also the sensors themselves are monitored. In case of an error or extreme deviation from a predefined value or interval, the respective location or zone of the farm, possibly also the farm as a whole, can switch into a kind of preservation mode. There, the illumination, temperature, humidity and other important factors can be set to a point, which keeps the plants in a most comfortable condition without losing quality until the error (defect sensor or actual problem in the farm) is eliminated. As mentioned, avoiding a crop failure, a reduction in crop quality or a reduced harvested biomass are a primary objectives.

Plant Health/Growth

The elements of the disclosure discussed in this chapter "Plant Health/Growth" addresses the health and growth of plants.

While plants are growing, ideally in line with dedicated growth recipes, it is advantageous to monitor their growth and health status and even predict the yield. In case any problems are detected, measures should be taken quickly.

Agricultural Facilities, particularly horticultural facilities such as greenhouses are not completely shielded from the external surroundings. Thus, pathogens or pests may occasionally be introduced or released in a horticultural farm, for example via the ventilation system, the watering and drainage removal system or when introducing seeds and germ buds. Additionally, humans or machines deployed from the outside into the facility, for example, automated guided agricultural robots, may introduce pests into a greenhouse. Therefore, it is important to detect stress or diseases of plants at an early stage, especially in a closed environment like a vertical farm, where diseases can spread easily. Then, these critical conditions may be countered by way of appropriate measures (e.g., pesticides) in order to contain the outbreak.

It would be advantageous if there were no outbreak of diseases at all in the first place or if pests were not given the opportunity at all in the first place to spread. The element "Prophylaxis" of the disclosure describes a controlled agricultural system that is able to detect conditions that may be critical to the health of the plants and, optionally, suggests appropriate countermeasures.

Diseases or stress can be detected, for example, by color changes of the leaves or modifications of the fluorescence of the chlorophyll system, measurement of leaf reflectivity and/or false color imaging.

Particularly, diseases and stress, e.g. caused by temperature, salinization, drought, can lead to changes in morphological leaf-parameters. Such changes may comprise inclination of the leaves, form of the leaves (leaves will roll-up in case of stress, leaf wilting) or symmetry of the leaves (e.g. a damaged leaf will lose its symmetry) or necrosis, caused by fungi or viruses. The element "Stress Detection" of the disclosure describes a stress detection based on leaf parameters.

Different kinds of diseases or stress can cause different symptoms at a plant, for example on plant leaves, petals, stem or roots. Some can lead to a reduced growth of the plant, others, like the Tobacco mosaic virus, which can infect tobacco, pepper, tomato and cucumber, mainly cause "mosaic"-like mottling and discoloration on the leaves. Causes of discolorations, depending on plant type, can for example be caused by lack of nutrients or lack of chemical elements like Nitrogen (N), Phosphor (P), Potassium (K), Sulfur (S), Manganese (Mn), over-supply of nutrients, too much light, too rapid temperature changes, lack of air circulation, too dry air, too much irrigation, bacterial and virus infestation causing for example bacterial blight and bacterial wilt, soil contamination, soil temperature and many others. In addition to discoloration effects, plant leaves can develop holes.

Therefore, cameras may be used to observe plants and detect color changes that could be associated with diseases, i.e. when the discolored parts have changed from their naturally provided colors (according to their actual growth stage) to a changed color impression, in other words when they have become discolored. Discolorations can affect only parts or small segments of a plant body (stem, petals, and leaves) or greater areas.

However, some of these color changes, particularly in an early stage of a disease, only affect small parts of the leaves, or the contrast between the discolored part and the normal colored part is small, thus making it easy to overlook the discolored areas. The element "Discolored Spots Detection" of the disclosure targets to intensify the contrast between discolored and normal colored parts of a plant.

Furthermore, some color changes (discoloration) signal a next stage of ripening, e.g. the change of color in fruits. For instance, tomatoes discolor from green to red while ripening, eventually triggering harvesting.

In any case, if plants are affected by diseases (by viruses, bacteria or fungi) or pests (such as spider mites or aphids), a quick reaction is desirable so that the disease and/or the pests cannot spread any further. Therefore, it would be advantageous if an outbreak of a plant disease could be detected in a very early stage. The element "Disease & Pest Control" of the disclosure proposes to calculate a probability whether the plants have been or will be affected by pests or diseases based on measured plant parameters.

Furthermore, it would be advantageous to have precise and early yield and harvesting time prediction at one's disposal.

Since plant health and plant growth can be influenced by several parameters like light intensity (photon flux), light spectrum, nutrients or temperature it is important to control at least the most relevant parameters. Especially when experimenting with new settings of those parameters, a fast feedback about the plant growth, i.e. the morphological parameters, is necessary. Plant growth can mean the height of the plant, the size and number and orientation of the leaves, the diameter of the plant, the plant morphology, and the height of the Apikalmeristem etc.

However, even when the parameters to grow plants in an agriculture system are set, a regular control whether the plants are growing as expected is necessary, as undetected changes in the parameters, diseases or pests can affect the plant growth. It would also be beneficial to track plant growth data or growth indicators continuously, by day and night, and correlate the data to other external parameters like temperature, nutrients, photon flux, applied spectra, etc.

The element "Yield Prediction" of the disclosure proposes a yield prediction for flowering plants by detecting the number of plants and considering the ripening probability.

Plants can be affected by several diseases, some of them caused by fungi. Therefore, it would be advantageous if growth of fungi could be inhibited automatically. The element "Fungi Growth Inhibition" of the disclosure describes a controlled agricultural system configured for applying a fungi prevention illumination.

Monitoring the health and growth stage of ideally each individual plant cultivated in agricultural facilities like greenhouses and vertical farms usually requires appropriate sensors, in some embodiments/implementations covering the entire cultivated area.

Therefore, it would be advantageous to be able to equip agricultural facilities in a sufficient, yet economical manner. The element "Sensor Retrofit" of the disclosure describes how to make use of already existing equipment for conducting the sensor measurements in the necessary extent.

Furthermore, it would be advantageous to have a flexible sensor system for measuring the morphological or growth indicative parameters, which does not contain mechanically moving parts, because it is difficult to move across the plants, particularly in a vertical farm with stacked shelves. The element "LiDAR Plant Surveillance" of the disclosure describes using LiDAR for 3D plant surveillance, commissioning the system.

For detecting plant diseases or pests, the sensing of relevant parameters is essential. The controlled agricultural system is configured to be able to analyze the measured parameters and infer a disease or pest. Furthermore, the controlled agricultural system may also be configured to be able to predict the yield based on measured parameters. Some of the parameters that can be measured are:

- Leaf Area Index (LAI) (lowering of LAI can give a hint to loosing leaves by a disease)
- Chlorophyll fluorescence (stress detection due to wormholes or fungi/virus/bacterial infection)
- Shape of leaves (e.g. wormhole)
- Coloration of leaves (e.g. spots, necrosis, mildew, veins, rust, browning and yellowing)
- Leaf and ambient temperature and humidity (ambient and within the crops); humidity and temperature help to calculated the dew point. If the temperature is below the dew point, there is a high risk of water condensation on plants promoting growth of diseases
- Substrate moisture (substrate includes, soil, rock wool, perlite etc.) and temperature
- Dissolved oxygen in NFT (nutrient film technique), Deep water systems etc.
- EC (Electric Conductivity) and pH Value (salinity and acidity of substrate or nutrient solution)
- Microclimate
- Plant parameters like: Plant height, Leaf area, number of flowers and/or fruits
- Leaf thickness (if possible with a 3D scanner)
- The NDVI (Normal density vegetation index) determines the density of green on a patch of land
  - Chlorophyll strongly absorbs visible light 400-700 nm
  - Cell structure strongly reflects near infrared (NIR) 700-1100 nm
  - Healthy vegetation absorbs visible light and reflects large portion of NIR
  - Unhealthy vegetation reflects more visible light and less NIR
  - In case of bad vegetation the reflected NRI or the NDVI is close to zero
  - In case of good vegetation the reflected NRI or the NDVI is close to 0.8
- The CRI (Carotenoid reflectance Index) determines the concentration of carotenoids in plants
  - Weakened vegetation contains higher concentration of carotenoids, the index is thus a measure of stressed vegetation
  - Higher CR11 values mean greater carotenoid concentration relative to chlorophyll
  - CR12 uses a modified calculation of CRI which provides better results in areas with high carotenoid concentration
  - Value Index for CRI ranges from 0 to >15
- Chlorophyll index
- Anthocyanin index
- Water Index
- Volatile compounds released by plants to signal stress (pests, etc.)

Some of the sensors, which can be used in the controlled agricultural system are:

- Optical sensors
- Combination of camera and IR laser
- Stereo camera system

- Kinect system and other depth sensing cameras (relatively simple and cheap)
- RGB Camera (with removing the IR-filter, we also could increase the spectrum which is seen by the camera)
- High Resolution camera (for detecting small spots of rust/bugs/aphids etc.)
- Multispectral camera
- Camera-based motion detector
- Gas chromatography (detection of volatile compounds)
- Environmental sensors (Capacitive sensors. E.g.):
  - Temperature
  - Humidity
  - Leaf temperature
  - VPD (Vapor pressure deficit)
  - Substrate moisture
  - Substrate temperature
  - EC and pH-Value
  - Velocity
- Sensor to track nutrients (macro and micro elements)

The time interval between measurements depends on the kind of sensor. Environmental factors should be tracked every minute. Measurements with a camera systems for disease detection can be done 3-5 times per day. For example, mildew can occur over night.

Furthermore, the triggering of a measurement can be dependent on signals/events/levels/thresholds from other sensors (e.g. to cross-check/confirm detection by other means, or make the detection more specific).

One manner to detect the growth stage of plants and to detect infected plants is by using the BBCH codes (BBCH=Biologische Bundesanstalt, Bundessortenamt und Chemische Industrie), which are available for some major crops like tomatoes, leafy greens, etc. The BBCH Codes describe the development stage with a number and provide some general drawings how it looks like. This code provides means to distinguish between different stages, discriminate the optimum of respective stage, and gives guidance with regard to disease detection and yield prediction.

Data can be collected and stored locally and/or in the cloud, i.e. the global internet network. In some embodiments/implementations, the data is transferred wireless (e.g. radio, via light) to the computing device of the controlled agricultural system und then processed, to be shown at the dashboard in the typical units (e.g. temperature ° C., rel. humidity %, absolute humidity g/m$^3$, etc.), but also wired data transfer can be an option.

For big data packages, e.g. images (still or even video) the data processing in the edge, i.e. directly at the sensors, may be preferred (Edge Computing). This way, only processed and usually reduced data streams are transferred to the computing device of the controlled agricultural system for storage and analysis.

In any case, the data may be transformed in values according to the metric system or systems used in other countries (like the imperial system). The data may be processed first to render a space-resolved mapping. For example, if five sensors for temperature measurements are distributed in an area of 1 ha, the average value of the temperature may be compute as well as a kind of a temperature map for the greenhouse. Such map data can be 2D or also 3D as a point cloud. Especially if data for tracking plant growth is collected by a moving robot, a variety of sensors, including temperature sensors, can easily be added to the robot or any other automated vehicle. Furthermore, derived parameters may be calculated from measured values, for example the dew point, which is derived from temperature and humidity.

Another way to process the data could be to estimate the relative number of plants affected, like approx. 65% of your plants are infected, e.g. by detecting a necrosis or the infection with a fungi.

Most of the pre-processing may also be offloaded to the cloud—this option can advantageously allow:

- to process the data in bulk;
- lower the costs of a sensor unit (if processing consumes processing power);
- potentially extend the battery life (if pre-processing consumes battery power);
- lower the costs of data transmission (if pre-processing leads to generating additional information);
- keeping original, unprocessed data (raw data) in the cloud may open up possibilities for deriving other values later, which might be closed off by pre-processing.

The data can be stored in the "original" or "raw" format or in a processed format. For example, images can be stored (raw data) or the analyzed information retrieved by analyzing the image, e.g. that x % of the plants are affected by a certain disease (processed data). Storing the original picture can be useful in case the algorithm is improved and certain values need to be re-calculated.

The data analysis may include calculating averages and relative values (percentages) and a combination of different sensor data (sensor fusion).

The data may also be manually and/or automatically annotated, e.g. what crop species was grown, when and where a disease/pest occurred. Then the controlled agricultural system may be configured to apply machine learning/AI to learn automatically the conditions for detection of the stressors or disease causing conditions.

Reference data for the comparison with measured data and subsequent analysis of the result can be generally available reference data (i.e. some generic data and not data generated at the particular agricultural system), particularly as an initial step. In the next steps, the controlled agricultural system may be configured to start using historical on-site data, for example, data from one of the previous years.

The collection of reference data may not only include specific values, but also a range of values (min., max.) including a plausibility-check of the limit values. For example, a completely unrealistic value of 5 kg for the weight of a tomato would be excluded. Update of new data, which leads to a more precise calculation process, can be provided online via cloud. It can also be possible, that growers with the same crop actively decide to upload their data to the platform connected to the controlled agriculture system. The data may be used anonymously.

The measured data may be analyzed periodically, in real-time and/or dependent on what the customer is willing to pay.

The controlled agriculture system may be configured to inform the grower if a certain threshold (min. or max. value) of a critical parameter is reached or if, for example, a certain percentage of leaves is affected. The trigger for detecting or verifying a disease may also be a certain combination of environmental factors like EC or pH values. The trigger may also be provided by a trained AI system. The system might continue to learn while used, e.g. by supervised learning. In this case it may be beneficial to include a feedback-loop between the system and the operator to train and improve the system. To this purpose, the operator may feed back to the system whether he/she confirms or dismisses a potential issue flagged by the system.

Data storage, retrieval and processing may be managed on-site or by means of cloud-computing services, which enable on-demand access to a shared pool of computing resources (servers, applications, data, storage, processing) that can be rapidly provisioned and released via the Internet, e.g. Platform as a Service (PaaS), Software as a Service (SaaS).

Light/Growth Recipes

A vision behind the elements of the disclosure discussed in this chapter is a farm that manages the entire growth system. It can not only apply light recipes, namely a specific illumination based on the growth status, but also adjust further growth conditions. Apart from the illumination, respective control programs of the farm can for instance apply the required irrigation, fertilization, fertigation and/or plant movement.

Thinking about bringing the light to the plants, a light recipe can even go a step further. Beyond mimicking the sunlight, it can be about tailoring the illumination to a specific type of plant, in terms of the intensity and spectral composition. Different illumination setups can stimulate or trigger a difference in growth or the creation of certain ingredients (for instance primary and secondary metabolites). Even the taste or vitamin content of the crop can be influenced via the light recipe. In "Flexible growth", the light or growth recipe is for instance used for delaying or speeding up the harvesting time to meet new target values arising during the production of the plants, namely while plants are already growing. Such target values can for instance be the growth rate, but also vitamin content, biomass or color of the plants.

A light recipe can also be about an intensity or spectral modulation over time. The illumination can be adapted to different growth stages of the plants, for instance from germination over growth to fructification. As discussed for instance in "Resizable growth area", "Hydroponics" or "Horticulture processing line", different illumination setups can be arranged at different locations or zones of the farm, allowing for light fixtures or arrangements to be customized regarding the specific recipe. However, for sure, different lighting conditions can also be applied with an adjustable light fixture having tuneable light sources with different spectral properties. Independently of the setup in detail, the failure handling of the "Automatic failure compensation" may be of interest, since light recipes rely on working light fixtures. With this intrinsic compensation of a failing light source (e.g. LED), the functionality of the light recipe can be assured.

In an automated farm, the light recipe can be part of a growth recipe comprising or defining further parameters, as for instance the temperature, humidity, $CO_2$-level, airspeed EC, pH-value or the like. In "Temperature Dependent Illumination", the interaction of these parameters is discussed, in particular the interaction between temperature and illumination. In a vertical farm for instance, a different illumination can be applied at different height levels to counteract for example a spread in time to flower, which could result from a higher temperature at the upper shelves due to convection.

In general, one can strive for a perfectly adapted illumination, in particular regarding the spectral composition of the light. According to the "Adaptive Spectrum", the difference or gap between the ambient light in the farm and an ideal illumination is measured, and the illumination is adapted to "fill up" this gap. The ambient light can for instance be residual daylight, allowing for an overall energy efficient and still customized illumination.

A growth or in particular light recipe can be a fixed data set comprising spectral properties and also information on time intervals and the like. Even though the spectral data is available in this generic form, there can be a missing link to the actual control parameters for operating or controlling a specific light fixture or luminaire. "Spectrum Calculation" is about translating a generic recipe into parameters for a light fixture actually used in the farm. Such a translation may also be relevant for any change of the light recipe.

A change of the recipe may not only depend on a customer request ("Flexible Growth"), the ambient illumination ("Adaptive spectrum") or a temperature gradient ("Temperature Dependent Illumination"), but might be also used to induce a "Plant Movement". According to "Plant Movement", the light intensity is moved above the plants to induce them to follow, comparable to sunflowers following the sun. The movement can strengthen the plants.

For transmitting amended control parameters to a light fixture or its control unit, a wire based or wireless communication is possible. An interesting option is described in "Light Recipes and VLC", namely a data transfer via a modulation of the light itself. By modulating the emission, for instance, a change in control parameters can be communicated from one light fixture to the other across the farm or respective zone of the farm. On the other hand, "Light Recipes and VLC" considers an adaption of the light recipes to assure that, despite of a reduced intensity resulting from the modulation, for instance the required DLI Level is met.

As described in "Extended Recipes", apart from a spectral adjustment (intensity of certain colors), light recipes can also be implemented by other means to save energy, for instance by optics. Beyond illumination, plant growth can also be modified using a "Temperature control" or by adjusting other parameters, like for instance $CO_2$, humidity or the like. Comparable to the light recipes, also the other parameters can be adapted to a specific growth stage of the plants and change over time.

Luminaire

The elements of the disclosure discussed in this chapter "Luminaire" address an agricultural light fixture, particularly horticultural light fixture.

An agricultural light fixture or agricultural luminaire provides illumination for an agricultural arrangement, e.g. a cultivated area or any other target area or target space, in a controlled agricultural system. The illumination may comprise light in the visible range (VIS), the ultraviolet range (UV) and infrared range (IR) of the electromagnetic spectrum. Luminaires can contain a variety of light sources, sensors, actuators and heat dissipation elements, and may be connected to the controlled agricultural system. Furthermore, luminaires can have adaptable features like form change and change of optics.

In an outdoor farm or in a greenhouse, the plants are typically illuminated by the sunlight, wherein artificial lighting can be a supplementation in terms of the spectral composition or amount of light. The latter can be described by the daily light integral (DLI) describing the number of photosynthetically active photons delivered to a specific area over a 24 hour period. On the other hand, indoor farming is also possible without any natural light at all but artificial lighting only.

Traditional luminaires or lighting fixtures are arranged above a target region, which is to be illuminated. Thus, plants grown in or on such target regions commonly will only be illuminated from the top, mainly with vertical light incidence. Consequently, those parts of the plants, which are closest to the light source will receive most of the light. Leaves or bigger plant parts will block light from reaching the lower parts of the plants and therefore sufficient illumination or delivery of light to lower plant parts cannot be guaranteed. In particular, for ranking plants, such as tomatoes, or for fast growing plants, like *Cannabis*, the upper plant parts will block a significant portion of the light. A homogeneous light distribution over the entire plant therefore might not be achieved.

Further, traditional luminaires often have an illumination profile, which decreases toward the edge and therefore might not illuminate an area homogeneously. In addition, in particular modern luminaires based on semiconductors produce significant heat, which may cause a local heating of the illuminated products in such vertical farms.

LED light-sources used in existing systems may cause irregular illumination, if the distances to the plants are too small, while higher distances may result in light intensities lower as desired, in particular for specific purposes, such as pest or disease control (see also element "Disease & Pest Control" in group "Plant Health & Growth"), or influencing plant growth morphology or the enrichment of enzymes in an illuminated plant, or such.

Therefore, it would be advantageous if the light irradiated by the light sources of a light fixture could be directed or guided or distributed such that the illumination of plants would be improved with respect to the disadvantages described above. The element "Light Guides" of the disclosure describes a light module comprising at least one light guide, which enables improved illumination of plants (see below).

A failing light source, in particular a failing light fixture or light fixture module, can lead to an insufficient illumination of the plants grown in a controlled agricultural system. This does not only relate to the intensity, for instance a reduced DLI (Daily Light Integral), but also to the spectral composition of the light.

Typically, light sources having different spectral properties are provided for achieving light with a defined spectrum optimized for the type of plants grown in the farm, even in terms of their growth stage. Vice versa, one or more failing light sources with a reduced emission or even no emission at all (total failure) can have a negative impact on the health and growth behaviour of the plants.

Thus, it would be advantageous to be able to detect a failing light source quickly so that a repair or replacement action, or any other countermeasure, can be taken promptly. The element "Failure Detection" of the disclosure describes how to detect and locate a failing light source (see below).

Furthermore, it would be advantageous to be able to compensated, at least temporarily, a failing light source until the failed light source, or the affected module, or the light fixture as a whole, is replaced or repaired. The element "Failure Compensation" of the disclosure describes how to compensate a failing light source, at least temporarily (see below).

Agricultural light fixtures used in greenhouses or indoor farms are increasingly LED-based as they can provide a more specific spectrum (light recipe) and use less energy. However, the LEDs nevertheless produce a significant amount of heat, which is usually taken away from the agricultural light fixture using heat spreaders, heat pipes or other solutions to cool the LEDs and prevent an overheating of the LEDs and the surrounding electronics. The thus removed heat-energy is usually lost for further usage.

It has been observed that providing heat to plants from above or sideways can support the growth of the plants and their fruits. Furthermore, if the surrounding temperature moves below the dew point at the plants, there is an increased risk of fungus infection due to higher condensation on the leaves.

Therefore, it would be advantageous to be able to use the waste heat from the LEDs for the plants. The element "Heat Reflector" of the disclosure describes how to direct the waste heat to the plants in a controlled manner (see below).

Smart Grid

Agricultural Facilities, for example, horticultural facilities in Controlled Environment Agriculture (CEA), such as greenhouses and vertical farms, need significant amounts of electrical energy. In fact, vertical farms and similar devices (agricultural plants) are major electricity consumers for their illumination and further components (water supply, etc.).

In a conventional grid power supply, the supply of electricity is determined by the consumption by consumers. In a smart grid power supply, the consumption by the consumers can be determined by the supply of the grid power supply since the consumer obtains information about the availability of the electricity (as a rule, by way of the price, which drops when the supply is high) in this case. In particular, there may be a price difference between the energy supply during the day and at night, when less energy is consumed (the day and night rhythm may be inverted).

Therefore, it would be advantageous if an agricultural facility could benefit from low energy price without loss of yield. The element "Smart Grid" of the disclosure describes a controlled agricultural system that is able to make an optimal use of cost-effective electricity.

Customer Interaction

The elements of the disclosure discussed in this chapter "Customer Interaction" address communications and interactions between the controlled agricultural system and customers. For instance, the controlled agricultural system may receive inputs from the customer and provide information to the customer.

These days, customers are only able to order the amount of a plant (biomass). The quality of the plant to be ordered is only determined by quality classes, i.e. size, color, certification marks such as eco- or organic product and fair trade, from which the customer can make a selection. However, it would be advantageous if a more specific definition and/or influence on the quality could be possible when ordering plants, fruit or vegetables. The element "Customer Requirements" of the disclosure describes a controlled agricultural system and a method for customized plant growth.

However, growth recipes, that is, control parameters regarding e.g. illumination, temperature, humidity, nutrients, etc., do not only depend on the specific plant but also on the environment in which the plant is growing. Furthermore, growth recipes for specific customer demands might not be available and need to be extrapolated from existing growth recipes. Therefore, it would be advantageous if a kind of success score for meeting the customer's request were available. The element "Success Score" of the disclosure describes a controlled agricultural system, which is able to provide a probability (success score) to reach the desired goal, namely a customized plant growth.

Growers who grow plants in controlled environments want to constantly monitor, track and optimize plant growth to decrease risk of mold and pest infestation, predict yield and optimize conditions to increase plant quality and yield. These controlled environments can include greenhouses, vertical farms, indoor farms, smart gardening kitchen appliances or instore farms. Climate control systems and ambient sensors collect relevant data like PAR, humidity, CO2, temperature, pH, EC, etc.

Furthermore, growers may want to share pictures and the overall plant growth results on social media platforms like Instagram. Therefore, growers may want to take pictures with their smartphones or any similar mobile device (e.g. tablet PC) or even a camera.

The element "Picture Taking & Evaluation" of the disclosure proposes a method for agricultural management, which targets these needs.

Customers may also prefer produce from eco-farming, i.e. produce that have been grown and delivered with low carbon-food print or without the use of pesticides. The element "Eco Certificates" of the disclosure proposes a method for agricultural management, which considers and tracks ecological aspects with the help of a life-cycle assessment. Furthermore, by means of certificates, customers can verify that the products have been produced eco-friendly.

It is well known that medical plants, which also include cannabis products, play an important role for the health of humans and animals. By way of example, these can contribute to the provision of relief in the case of atopic dermatitis, erythema, pruritus, nervous restlessness, allergies, psoriasis (skin disorder), asthma, intolerance to light, rheumatic ailments, muscle weakness, period pain, epilepsy, tumor and many more.

Medical products can be purchased or ordered in a pharmacy, in relevant specialist stores or already, in part, by mail order as well. However, a customer has no direct influence on the quality of the wares in this case, for example on the light recipe for plant illumination or further growth conditions, and consequently they are also unable to purchase a product that has been adapted or optimized to the personal situation or requirements.

Thus, it would be advantageous if customers could order a medical plant with knowledge of the illumination scenarios the latter experienced during its seedling, growth and maturing stage and with knowledge of what growth conditions were applied.

The element "Medical Certificates" of the disclosure proposes a method for agricultural management, which align to these customer demands by providing products grown under conditions tailored for a specific use, particularly medical use. The intended use and/or content of active agents of the plants may also be certified.

SUMMARY OF THE DISCLOSURE

System Setup

"Resizable Growth Area"

Below, various aspects and details of the "Resizable Growth Area" are discussed.

1$^{st}$ aspect of the "Resizable Growth Area": A growth area having a plurality of growth locations, each growth location being provided for growing a plant respectively, wherein a distance between the growth locations is adjustable.

Across the growth area, a plurality of growth locations are provided, for instance carriers like trays or shells or the like. With the growth area adjustable in size, the distance between the growth locations can be adjusted depending on the plant's growth (morphology) or other needs.

The growth area can have a rather small size at the beginning of a growth cycle, for instance after seeding or bedding the plants. Having the plants close to each other can be advantageous in regard to the artificial lighting, as only a comparably small area has to be illuminated. When the plants grow, the distance between the growth locations can be increased, and the illuminated area can be adapted accordingly. In general, this can be an adaption in distance, size, inclination, spectrum, heating, etc. In particular, the inclination of the light fixtures and/or light sources and/or the optics could be beneficial. In addition, the spectrum and intensity could be changed.

Due to the resizable growth area, each plant has sufficient space to allow a proper growth. On the other hand, the plants can be kept close to each other as far as possible, enabling an energy efficient artificial lighting. Assuring small or even no intermediate spaces between the plants prevents a waste of light there.

In contrast, in case of a growth area having a fixed size, the percentage of the area covered by the plants/leaves with respect to the uncovered area would be rather small at the beginning of the growth cycle. The photon energy would be wasted to a large extent, because many photons would just reach the ground without being absorbed by the plants/leaves. On the other hand, placing the plants too close to each other in a predefined distance would negatively impact the growth later on.

2$^{nd}$ aspect of the "Resizable Growth Area": The growth area according to the 1$^{st}$ aspect of the "Resizable Growth Area", comprising a foil that forms the growth locations, the foil being stretchable to adjust the distance between the growth locations.

The foil can for instance be a plastic or synthetic film or foil. By stretching the foil, the size of the growth area and the distance between the growth locations can be increased. The growth locations can for instance be plant pots or trays attached to the foil, for instance by gluing.

3$^{rd}$ aspect of the "Resizable Growth Area": The growth area according to the 1$^{st}$ or 2$^{nd}$ aspect of the "Resizable Growth Area", comprising a plurality of bars that forms the growth locations, interconnected with each other in joints in an articulated manner allowing for folding, in particular lateral folding.

By folding the bars together, the distance between the growth locations can be decreased, unfolding the bars increases the size of the growth area and thus the distance between the growth locations. "Lateral" refers to a direction parallel to the growth area. In a typical application, the growth area can lie horizontally so that the lateral directions are horizontal directions. However, in general, the growth area can also be oriented in the vertical direction, for instance in case of a vertical farm.

In other words, the growth locations are in some embodiments/implementations connected with each other such that they are linked independently of the size of the growth area. In other words, a connecting means (e.g. the foil or bars) holds the growth locations together when different sizes of the growth area are adjusted. Basically, the aforementioned foil can also be combined with the interconnected bars. The latter can for instance provide a mechanical support, the foil can prevent a dirtying of the bars. In some embodiments/implementations, the foil and the bars are alternatives.

4$^{th}$ aspect of the "Resizable Growth Area": The growth area according to the 3$^{rd}$ aspect of the "Resizable Growth Area", wherein the interconnected bars form a scissors mechanism, the joints being connected operatively with each other.

This means that a position adjustment of one of the joints causes also a position adjustment of one or more other joints. Accordingly, the size of the growth area can be adjusted with a reduced number of actuators, it is not necessary to equip each joint/bar with its own actuator.

5$^{th}$ aspect of the "Resizable Growth Area": The growth area according to the 3$^{rd}$ or 4$^{th}$ aspect of the "Resizable Growth Area", wherein the bars form a flexible grid, the bars extending parallelly to each other in groups, the bars of the different groups crossing each other.

Seen in a top view, the bars form a plurality of parallelograms. At the crossing locations, the joints are provided, interconnecting the bars of the different groups with each other. The growth area can be adjusted in size comparable to a vertical or stair-case like scissor lift.

6$^{th}$ aspect of the "Resizable Growth Area": The growth area according to the 3$^{rd}$ or 4$^{th}$ aspect of the "Resizable Growth Area", wherein the bars form a flexible Hoberman-type ring which can expand in at least two directions, in particular two directions lying perpendicular to each other.

A Hoberman-sphere is for instance described in U.S. Pat. No. 5,024,031, this sphere is assembled from a plurality of Hoberman-rings. In the present case, the Hoberman-ring is used as the growth area, enabling for instance a more or less rotationally symmetrical size adjustment. Of course, other geometrical shapes are also possible, for example trapezoidal and polygonal structures, foldable structures that form a tessellated area, rotational arrangements with coplanar sides, pivotably linked support brackets, scissor-like extendable structures and the like.

7$^{th}$ aspect of the "Resizable Growth Area": The growth area according to the 1$^{st}$ aspect of the "Resizable Growth Area", being assembled from a plurality of subareas forming a growth location respectively, wherein the subareas are designed for floating on water like a raft and can be connected and disconnected to adjust the distance between the growth locations.

At the beginning of a growth cycle, the connected subareas are held together closely, resulting in a growth area of a rather small overall size. As the plants reach the next growth stage, the subareas are disconnected so that the growth area is split up. The subareas will then float independently providing sufficient space for the plants to grow.

The connection/disconnection of the subareas can be achieved by a reversible mechanism, for instance a form-fit or snap-in mechanism. On the other hand, an irreversible mechanism is possible as well, and the disconnection can be achieved by for instance scissors or saws.

In particular, the floating subareas can be designed as carriers penetrable for liquids like water, as described in the element "Aquaponics", they can float on a waterway described in this element of the disclosure.

The aspects below relate to an Agricultural System comprising a resizable growth area.

8$^{th}$ aspect of the "Resizable Growth Area": An Agricultural System, particularly for plant breeding, growing, cultivating and harvesting, comprising:

- a growth area according to one of the 1$^{st}$ to 7$^{th}$ aspect of the "Resizable Growth Area",
- a light fixture for illuminating at least a part of the growth area, wherein the Agricultural System is configured for adjusting the size of the growth area by adjusting the distance between the growth locations.

In particular, a plurality of light fixtures can be provided, see below. In some embodiments/implementations, the size adjustment is motor-driven, the agricultural system comprising an actuator device with one or more actuators to adjust the size. For instance, the actuators can stretch the foil or move the bars, as described above.

9$^{th}$ aspect of the "Resizable Growth Area": The Agricultural System according to the 8$^{th}$ aspect of the "Resizable Growth Area", the Agricultural System configured for an adaptive illumination of illumination areas having different sizes.

With the adaption, illumination areas differing in size can be illuminated so that the illumination can be adapted to the size adjustment of the growth area. Illuminating only the area actually occupied by plants is advantageous in terms of energy consumption, see above. The Agricultural System being "configured" means in particular that it can comprise a computing and/or control device programmed accordingly (to trigger an actuator and/or the illumination).

10$^{th}$ aspect of the "Resizable Growth Area": The Agricultural System according to the 9$^{th}$ aspect of the "Resizable Growth Area", wherein the illumination areas of different sizes are arranged at the same location, wherein only some light sources or light fixtures are switched on for illuminating a small growth area and additional light sources or light fixtures are switched on for illuminating a larger growth area.

In other words, the small area(s) is/are contained in the larger one(s). Therein, only one or some light sources/light fixtures are switched on for illuminating a small growth area and additional light sources/light fixtures are switched on for illuminating larger growth areas.

11$^{th}$ aspect of the "Resizable Growth Area": The Agricultural System according to the 10$^{th}$ aspect of the "Resizable Growth Area", the Agricultural System configured to shift and/or rotate the growth area and the illumination areas with respect to each other to control an overlap of the growth area and a respective illumination area.

By controlling the overlap, the illumination and/or irradiance of the growth area can for instance be optimized. In a stationary reference system, either the growth area or the illumination setup can be moved for this optimization. In general, optimizing the overlap can support an efficient use of the light sources. For instance in case of elongated luminaires, the size adjustment of the growth area could result in a disadvantageous partial coverage. Adjusting the relative position of the growth area allows, as the case may be, also switching off some light sources or fixtures even though more light sources are used in total (in case of a larger growth area).

Depending on the construction of the growth area, a length elongation of the carrier can lead to a width reduction, for instance in case of a scissor mechanism described above. There, light sources/fixtures that are no longer needed due to the width reduction can be switched off.

In general, the adaptive illumination can be achieved by switching light fixtures on or off as a whole. However, alternatively or in addition, it is also possible to switch individual light sources belonging to the same light fixture. Depending on the illumination area required, for instance one half of the light fixture could be switched on, the other half being added if required.

12$^{th}$ aspect of the "Resizable Growth Area": The Agricultural System of the 9$^{th}$ aspect of the "Resizable Growth Area", wherein the illumination areas of different sizes are arranged at different locations which are respectively equipped with a respective light fixture, the different sizes of the illumination areas being adapted to different sizes of the growth area, the Agricultural System configured to move the growth area from one illumination area at one location to another illumination area at another location, based on the size of the growth area.

The illumination areas differing in size are not arranged at the same location, instead the growth area is moved to another part of the farm. In addition to the relocation, the growth area can be rotated to control an overlap. The different illumination areas can be arranged side by side, but they can also be provided in different rooms of the farm. For the transportation, a conveyer belt or roller mechanism can be used for instance. Further, also a waterway can be used for transporting the growth area, in particular in case of the connected/disconnectable subareas.

13$^{th}$ aspect of the "Resizable Growth Area": The Agricultural System according to any one of the 8$^{th}$ to 12$^{th}$ aspect of the "Resizable Growth Area", comprising an actuator device with one or more actuators able to adjust the size of the growth area, namely the distance between the growth locations.

14$^{th}$ aspect of the "Resizable Growth Area": The Agricultural System according to the 13$^{th}$ aspect of the "Resizable Growth Area", comprising a sensor device for sensing growth data of the plants and a computing device configured to processing the growth data measured by the sensor device and to initiate the actuator device to adjust the distance between the growth locations based on the growth data, namely to vary the distance between the growth locations and hence the size of the growth area as the plants grow.

The data measured by the sensor device can be processed by a computing device, which initiates the actuator device to adjust the size of the growth area as required. The distance between the growth location can for instance be increased as the plants grow.

15$^{th}$ aspect of the "Resizable Growth Area": The Agricultural System according to the 14$^{th}$ aspect of the "Resizable Growth Area", wherein the sensor device comprises an image capture device and the processing by the computing device comprises image recognition.

The image capture device can for example be a camera, it can be used to determine the actual size of the plants. The images taken can be processed by a picture recognition. In a simple approach, for instance, the number of independent plants can be counted, and the size of the growth area can be increased if two plants become so close that they appear as one.

16$^{th}$ aspect of the "Resizable Growth Area": An Agricultural System, comprising:

a growth area having a plurality of growth locations for growing plants, a sensor device for sensing growth data of the plants, an actuator device, and a computing device, wherein the actuator device is configured for adjusting a distance between the growth locations and hence a size of the growth area, and wherein the computing device is configured to process the growth data measured by the sensor device and initiate the actuator device to adjust the size of the growth area based on the growth data, namely to vary the distance between the growth locations and hence the size of the growth area as the plants grow.

17$^{th}$ aspect of the "Resizable Growth Area": The Agricultural System of the 16$^{th}$ aspect of "Resizable Growth Area", comprising a plurality of bars that forms the growth locations of the growth area, a plurality of light fixtures for illuminating illumination areas, and an image capture device comprised in the sensor device, wherein the bars form a flexible grid, interconnected with each other in joints in an articulated manner allowing for folding, the joints being operatively connected with each other forming a scissors mechanism, wherein, in the flexible grid, the bars extend parallel to each other in groups, the bars of the different groups crossing each other, wherein the illumination areas have different sizes and are arranged at different locations the different sizes of the illumination areas being adapted to different sizes of the growth area, the Agricultural System configured to move the growth area from one illumination area at one location to another illumination area at another location, based on the size of the growth area, and wherein the growth data, based on which the size of the growth area is adjusted, comprises images, the processing by the computing device comprising an image recognition.

18$^{th}$ aspect of the "Resizable Growth Area": A Method for using a growth area according to any one of the 1$^{st}$ to 7$^{th}$ aspect of the "Resizable Growth Area", or an Agricultural System according to any one of the 8$^{th}$ to 17$^{th}$ aspect of the "Resizable Growth Area", comprising the steps:

growing plants at the growth locations, adjusting the distance between the growth locations based on the growth of the plants.

In some embodiments/implementations, this adjustment is done or triggered automatically by a computing device connected with a sensor device for sensing the growth and an actuator device, triggered by the computing device (e.g. via a control unit), for adjusting the size of the growth area.

19$^{th}$ aspect of the "Resizable Growth Area": A Method for agriculture, comprising at least one Agricultural System, and comprising:

growing plants.

20$^{th}$ aspect of the "Resizable Growth Area": A Computer program product, comprising:

a plurality of program instructions, which when executed by a computing device of an Agricultural System, cause the Agricultural System to apply defined growing conditions to the plants.

The application of "defined growing conditions" may for instance be: applying a light recipe, adjusting a temperature, and/or adjusting a $CO_2$ content. The defined growing conditions can for instance be comprised in growth recipe, see below for illustration.

21$^{th}$ aspect of the "Resizable Growth Area": Computer program product, comprising:

a plurality of program instructions, which when executed by a computing device of an Agricultural System according to any one of the 8$^{th}$ to 17$^{th}$ aspect of the "Resizable Growth Area", cause the Agricultural System to execute an adjustment of the distance between the growth locations.

Regarding further details, reference is made to the description above. The program instructions can be pre-programmed or calculated based on measurement values. Pre-programmed instructions can for instance follow linear or non-linear function over time (or over total Photon Flux or any other photometric value, or assumed plant leaf density index), or first exponential, then logarithmic etc.

"Hydroponics"

This element of the disclosure relates in particular to floating grow fields and a respective waterway for moving them through the farm.

1$^{st}$ aspect of "Hydroponics": A Grow field for a hydroponic arrangement, comprising a carrier for carrying plants, wherein the carrier is designed to be penetrable for liquids like water.

This element of the disclosure solves the problem of how to provide irrigation and nutrients to the plants and yet allows for transportation of the plants through the farm over the growth cycle. It is proposed that the plants grow in small grow fields filled with materials as used in hydroponics, e.g.

expanded clay aggregates, growstones, perlite, pumice, rock wool etc. The grow fields are surrounded by water. Each grow field may contain a single plant or several plants. The roots of the plants may be hanging in the water. The water is used to provide irrigation and nutrients. However, the small grow fields are not fixed and surrounded by flowing water, but movable within the surrounding water.

$2^{nd}$ aspect of "Hydroponics": The Grow field according to the $1^{st}$ aspect of "Hydroponics", wherein the carrier is designed for floating on water like a raft.

The preferred design is thus not the form of a plant pot, but a form that resembles a raft and allows floating on the water without tilting over. The sides of the small grow fields, especially the backside lying in the water, comprise a grid-like structure, so they hold back the plants and the grow materials but let in the water.

Seen in a top view, the shape of the grow fields can be quadratic, rectangular, hexagonal, circular, or freeform. Grow fields for the same kind of plant can have the same form. Grow fields for another kind of plant can have a different form. In this way, different shapes may facilitate identification of various kinds of plants. Furthermore, the shape can influence the drift velocity. Grow fields may be connected with each other (e.g. by magnets or any other connecting means like for instance form-fit members, see also the $7^{th}$ aspect of "Resizable Growth Area"), so that they form a chain of grow fields and float collectively.

The grow fields may be equipped with a variety of sensors and e.g. RFID or WLAN chips that transpond/repeat/send information to a reading device for asset tracking. Such reading devices may be arranged in light fixtures that may be arranged above the grow fields for irradiating/illuminating the plants.

$3^{rd}$ aspect of "Hydroponics": The Grow field according to the $1^{st}$ aspect of "Hydroponics", wherein wheels are connected to the carrier for rolling on the bottom of an area covered with water, while keeping the carrier like floating on the water surface.

In this case, the rafts floating on the water could be replaced by trays with wheels, which are rolling on the bottom of the water tank. In this case, the movement of the grow fields/plants can be assured by the inclination of the water tank alone.

$4^{th}$ aspect of "Hydroponics": A Hydroponic arrangement, comprising one or more grow fields according to any one of the preceding aspects of "Hydroponics", and further comprising a waterway, wherein the grow fields are movably arranged on the surface of the waterway.

The waterway, in which the small grow fields are floating, may be an elongated water tank, which is open on its upper side, i.e. the water surface. The small grow fields are floating on the water surface from one side of the water tank (start) to the other (end), along its long side. In some embodiments/implementations, the time it takes a grow field to reach the end coincides with the time it takes for the respective plant to be ready for harvesting. A distance between start and end can for instance be at least 2 m, 4 m, 6 m or 8 m (with possible upper limits of for instance not more than 500 m, 200 m or 100 m).

$5^{th}$ aspect of "Hydroponics": The Hydroponic arrangement according to the $4^{th}$ aspect of "Hydroponics", configured to establish a water flow on the surface of the waterway.

The water flow can move the grow fields along the waterway.

$6^{th}$ aspect of "Hydroponics": The Hydroponic arrangement according to the $4^{th}$ or $5^{th}$ aspect of "Hydroponics", further comprising one or more inlets arranged at the waterway for the inflow of water.

In particular, the inflowing water can generate the water flow for moving the grow fields.

$7^{th}$ aspect of "Hydroponics": The Hydroponic arrangement according to the $5^{th}$ or $6^{th}$ aspect of "Hydroponics", wherein the grow fields are able to float on the surface of the waterway along the water flow.

To summarize, the floating of the plants from the first end (start) to the final end (where they can be harvested) can be assured e.g. by:

- An inclination of the ground of the water tank, which provides the waterway (or an inclination of the whole water tank) towards the final end, where the waterway contains a sink for the water, so that the water automatically flows towards the final end and/or,
- Water inlets or nozzles attached at the first end and/or at the side of the water tank (in some embodiments/implementations arranged close to the water surface) pointing towards the final end and thus inducing a direction of flow on the water.

The water inlets do not only provide fresh water, they also provide the nutrients needed for the plants (like phosphor, oxygen dissolved in the water, . . . ). Therefore, in some embodiments/implementations, the water inlets are attached to the side of the water tank in any case, although they do not necessarily have to point to the final end of the water tank if the water flow is assured by the inclination of the tank.

In a preferred embodiment, the water tank also contains at least one sink to remove the water from the water tank as the water inlets add water. In this way, a flow on the surface of the water may be established without raising the level of the water in the water tank.

$8^{th}$ aspect of "Hydroponics": The Hydroponic arrangement according to any one of the $4^{th}$ to $7^{th}$ aspect of "Hydroponics", further comprising one or more light fixtures arranged above the surface of the waterway.

The floating speed of the small grow fields can be controlled by the inclination of the water tank and/or the speed with which the water inlets blow the water into the tank. However, it may be advantageous, e.g. in a small tank (i.e. where the small grow fields would only need to move very slowly to reach the final end) to add grids across the tank, which can hold back the small grow fields.

$9^{th}$ aspect of "Hydroponics": The Hydroponic arrangement according to any one of the $4^{th}$ to $7^{th}$ aspect of "Hydroponics", further comprising one or more grids arranged across the waterway, wherein the grids are able to hold back the grow fields.

With the grids, the water tank can be separated into several grow areas or zones. In each grow area (which is a growth sector or zone), the growth parameters may be different, e.g. nutrients may be added in another concentration or the light intensity or the light spectrum of the light sources of the light fixtures might be different for each grow area. If the plants have reached the end of the growth cycle, the grid is moved aside (to a side, up or down, or open like a water lock) and the grow fields move on to the next growth area where they can be exposed to one or several different grow parameters like illumination, temperature or nutrients. Furthermore, the light intensity and/or light spectrum may also be adjusted to the water flow speed. The waterway at each station/grow area may have a different depth level and temperature than the previous or subsequent one.

Below, an Agricultural System with a waterway (Hydroponic arrangement) is discussed.

10th aspect of "Hydroponics": A Controlled Agricultural System, particularly for hydroponic growth, comprising at least one hydroponic arrangement according to any one of the 4th to 8th aspect of "Hydroponics", further comprising:

an actuator device, comprising one or more actuators able to adjust parameters of the hydroponic arrangement, e.g., water inlet, water sink, water grid, nutrient dosing feeder, light fixture.

a data storage device for storing reference data of the parameters of the hydroponic arrangement, a computing device, configured to control the parameters of the hydroponic arrangement by means of the actuator device and based on the data of the parameters stored on the data storage device.

The computing device can control the water flow, and the grow parameters like nutrient concentration and illumination by means of respective actuators. The system may control these parameters based on fixed values provided in a database or based on sensor inputs e.g. from cameras, light sensors, temperature sensors or chemical sensors. The database is stored in a data storage device that may be based locally, in a network or the cloud.

11th aspect of "Hydroponics": The Controlled Agricultural System according to the 10th aspect of "Hydroponics", further comprising a sensor device.

The sensor device can comprise one or more sensors able to sense/detect growth parameters of the plants on the grow fields and/or control parameters of the hydroponic arrangement, e.g. flow speed indicator, thermometer, photometer, color detector, camera.

12th aspect of "Hydroponics": The Controlled Agricultural System according to the 10th or 11th aspect of "Hydroponics", further comprising a user interface configured to deliver the growth status of the plants on the grow fields and/or the status of the hydroponic arrangement.

The information about the growth status or the status of the grow system can be provided to customers, the farmer or other third parties.

13th aspect of "Hydroponics": A Method for agricultural management, particularly for hydroponic growth, comprising:

at least one controlled agricultural system according to any of the 10th to 12th aspect of "Hydroponics", and the steps of planting one or more plants into one or more grow fields, putting the grow fields at a first position on the water surface of the waterway of the hydroponic arrangement, adjusting the parameters of the hydroponic arrangement, e.g. water flow, illumination, controlling of the grids, concentration of nutrients in the water of the waterway, temperature of water and/or ambient air, by means of the actuator device and based on respective data of the parameters retrieved from the data storage device, with the goal that the plants are ready for harvest when they arrive downstream at a final position, moving the grow fields on the water surface from the first position of the waterway downstream to the final position of the waterway, removing the grow fields from the water surface at the final position of the waterway.

14th aspect of "Hydroponics": A Method for agricultural management according to the 13th aspect of "Hydroponics", further comprising the step of Sensing growth parameters of the plants by means of the sensor device, and readjusting the parameters of the hydroponic arrangement according to the sensed growth parameter.

15th aspect of "Hydroponics": A Computer program product, comprising:

a plurality of program instructions, which when executed by a computing device of a Controlled Agricultural System according to any one of the 10th to 12th aspect of "Hydroponics", cause the Controlled Agricultural System to execute the method for Agricultural Management according to any one of the 13th to 14th aspect of "Hydroponics".

"Horticulture Processing Line"

This element of the disclosure describes an automated processing line for growing plants.

1st aspect of the "Horticulture Processing Line": A Controlled Agricultural System comprising a processing line having different growth zones where defined growth conditions can be applied, growth trays for respectively growing at least one plant, the growth trays being moveable along the processing line from a first growth zone to a last growth zone, a treatment location where defined treatment conditions can be applied, wherein the Controlled Agricultural System is configured for moving the growth trays along the processing line, wherein at least one tray, but not all trays, is unloaded from the processing line to the treatment location prior to having reached the last growth zone.

In each growth zone, defined growth conditions can be applied, for instance a defined illumination (intensity/spectral composition), temperature, humidity or the like. At each growth zone, the growth conditions can be optimized regarding a certain growth stage of the plants. In case of a Hydroponic arrangement (see "Hydroponics"), the growth zone can be a "grow area" discussed there (see in particular the 9th aspect of "Hydroponics").

In general, the first growth zone can for instance be optimized for the sawing or seeding or for an early growth stage. After having reached a certain size or growth stage, the plants may require other growth conditions to maximize the yield. Humidity and temperature may for instance be lower than during early seeding. Accordingly, the plants can be moved to the next growth zone of the processing line. After a further growth there, the plants are moved to the next growth zone until they reach their final growth stage, becoming ready for harvesting in the last growth zone.

For moving the plants along the processing line, the agricultural system is equipped with growth trays (e.g. grow fields in "Hydroponics"). Depending on the size, the trays can receive a container or receptible or the like, they can also have a bowl- or receptible-like shape themselves. In general words, a defined volume for receiving soil or hydroponics or any other matrix material for growing plants is provided at each growth tray. Depending on the type of plants grown, at least one or also a plurality of plants can be grown at or on each growth tray.

The agricultural system is configured for moving the growth trays along the processing line, either continuously (like in a conveyer oven) or in steps from sector to sector. In the latter case, the growth trays are moved on further after having stayed a certain time at the respective growth zone, which can be predefined or depend from growth data measured with a sensor device, for instance a camera or the like. Regarding a possible design of growth trays and/or a setup for moving them, reference is again made to "Hydroponics". Further, the growth trays can also be connected in groups, each group forming or being a resizable growth area. Those growth areas can be moved through the farm as described in "Resizable Growth Area".

According to the element "Horticulture Processing Line", the agricultural system additionally comprises a treatment location. There, defined treatment conditions can be applied, see in detail below. Therein, the agricultural system is configured to unloading one or some of the trays from the processing line prior to having reached the last growth zone, while other trays pass by on the processing line. In some embodiments/implementations, this is done automatically. The other trays are moved further from sector to sector along the processing line.

2nd aspect of the "Horticulture Processing Line": The Controlled Agricultural System of the 1st aspect of the "Horticulture Processing Line", configured for reloading the at least one tray to the processing line after the treatment at the treatment location.

Thus, the at least one tray is reloaded to the processing line later on. In a simple setup, it might be reloaded via the first growth zone, even though the growth conditions there might not be appropriate for plants having been unloaded at a later stage.

3rd aspect of the "Horticulture Processing Line": The Controlled Agricultural System of the 2nd aspect of the "Horticulture Processing Line", configured for reloading the at least one tray to the processing line at that growth zone where it has been unloaded.

In case of a preferred system with a clocked operation (trays moved from sector to sector after a respective time interval), a gap can be left between two trays fed one after the other to the first growth zone. Due to the clocked movement, the gap propagates along the processing line, until the tray of the treatment location is reloaded into the gap at the appropriate processing stage.

4th aspect of the "Horticulture Processing Line": The Controlled Agricultural System of one of the preceding aspects of "Horticulture Processing Line", wherein the trays are moved along the processing line from one growth zone to another pursuant to a predefined clocking.

5th aspect of the "Horticulture Processing Line": The Controlled Agricultural System of the 3rd and 4th aspect of the "Horticulture Processing Line", configured for leaving a gap between two trays fed one after the other to the first growth zone, wherein the at least one tray is reloaded to the processing line into the gap.

Providing a treatment location for selectively unloading trays from the processing line can enable a high output and good quality, while only a minor or even no human interaction or support is required. Since only a few trays are unloaded selectively, the overall throughput remains high. For instance, not more than 40%, 30%, 20% or 15% of the trays can be unloaded to the treatment location (with possible lower limits of for example 1%, 2% or 3%). Unloading individual trays from the processing line can also protect the trays remaining on the processing line, for instance in case of a pest or fungal infestation or other contamination. Further criteria for unloading plants from the processing line can be their size (too small/too large) or fruit yield (too few/too many fruits).

6th aspect of the "Horticulture Processing Line": The Controlled Agricultural System of one of the preceding aspects, configured for unloading the at least one tray based on at least one of

- a plant size,
- a plant morphology,
- a fruit yield,
- a biological or chemical fruit ripeness indicator,
- a pest infestation,
- a fungal infestation,
- a contamination.

As described above, the growth conditions at each growth zone may be optimized regarding the respective growth stage. The unloading of individual trays can also be used for a further optimization of the growth conditions applied at a specific sector. For instance, the light recipe, e.g. the spectral composition or intensity of the light, can be adapted, not only to the plant type, but even to individual lots.

7th aspect of the "Horticulture Processing Line": The Controlled Agricultural System of one of the preceding aspects, wherein the treatment applied at the treatment location is at least one of

- an illumination treatment,
- a low or high temperature treatment,
- a gas absorption treatment,
- an insect attraction treatment,
- a controlled humidity treatment,
- an UV-radiation treatment,
- a non-lighting treatment.

To summarize, the treatment applied in the treatment location can be an illumination treatment (specific lighting with VIS, UV and/or IR light), a low or a high temperature treatment, a gas absorption (for instance of ethylene), an insect attraction treatment (to treat a pest infestation) and/or a humidity treatment and/or a non-lighting treatment (OFF-period) in a dark environment. Basically, a manual treatment of an operating personnel is possible, even though a fully automated treatment is preferred.

A target of the treatment applied may be to reduce or eliminate any deviation having been the reason for unloading the tray from the processing line. Alternatively or in addition, a specific measurement may be performed in the treatment location, see above. The tray unloaded from the processing line to the treatment location can be used for optimizing not only the light recipe but also other control parameters like temperature, humidity or the like. In case that the treatment conditions applied at the treatment location have a positive effect on the plant growth, they can be transferred to one or more growth zones of the processing line.

To protect the plants remaining on the processing line, the treatment location can be a quarantine area. In a worst-case scenario, the plants unloaded could be destroyed to prevent an infestation/contamination of the plants remaining on the processing line.

8th aspect of the "Horticulture Processing Line": The Controlled Agricultural System of one of the preceding aspects, wherein the treatment location is a quarantine area.

In general, the tray or trays unloaded from the processing line might be predefined (e.g. every 10th tray) or chosen in a stochastic procedure. The unloading from the processing line to the treatment location could be kind of a lot control, allowing a detailed inspection/monitoring of the plants. In some embodiments/implementations, the unloading is triggered by a sensor measurement.

9th aspect of the "Horticulture Processing Line": The Controlled Agricultural System of one of the preceding aspects, comprising a sensor device for sensing plant growth, harvesting time, plant morphology and/or plant health and ripeness, the Controlled Agricultural System being configured for unloading the at least one tray based on a measurement by the sensor device.

In some embodiments/implementations, the agricultural system comprises a plurality of sensor systems, which can be cameras, distance measuring devices or the like. A sensor device can for instance be integrated into a light fixture comprising the light sources for the lighting. Alternatively or in addition, a sensor device can be integrated into the tray. A sensor device at the tray can monitor the conditions that have been applied to the plants so far (e.g. temperature, illumination and so on).

$10^{th}$ aspect of the "Horticulture Processing Line": The Controlled Agricultural System of one of the preceding aspects, configured for storing growth data, namely data about the growth conditions applied to the growth trays and/or sensor data about plant growth, harvesting time, plant morphology and/or plant health, in a data storage device.

The data storage device can be an internal part of the agricultural system, connected or integrated into the computing device. However, the data storage device can also be provided externally, for instance in the cloud. Data storage and handling can be done using for example a distributed Blockchain ledger system that ensures accuracy and data permanency for each tray and/or sub-tray and/or plant thus allowing a producer or customer to track the history of a specific plant product.

$11^{th}$ aspect of the "Horticulture Processing Line": The Controlled Agricultural System of the $10^{th}$ aspect of the "Horticulture Processing Line", configured for storing the growth data individually for the trays, namely assigned to a respective tray.

The growth data can be data about growth conditions or sensor data measured, is stored individually for the trays. Accordingly, for some or all of the trays, the growth conditions which have been applied/measured for the specific tray are assigned to the tray. In some embodiments/implementations, the trays can be provided with a respective identifier, for instance a barcode, RFID-tag or the like. An identifier can simplify the correlation between the growth data and a specific tray.

$12^{th}$ aspect of the "Horticulture Processing Line": The Controlled Agricultural System of one of the preceding aspects, wherein the growth trays are provided with a respective identifier allowing an individualization of the trays.

$13^{th}$ aspect of the "Horticulture Processing Line": The Controlled Agricultural System of one of the preceding aspects, wherein a transfer gate for unloading growth trays from the processing line is provided at each growth zone.

In some embodiments/implementations, a plurality of treatment locations are provided along the processing line so that the trays can be unloaded at different growth zones (in different growth stages) to a different treatment location respectively. Therein, in a basic setup, each of the treatment locations can be linked to the processing line solely. Likewise, the trays can be unloaded from and reloaded to the processing line, or be destroyed at the treatment location, but not transferred from one treatment location to the other directly.

$14^{th}$ aspect of the "Horticulture Processing Line": The Controlled Agricultural System of one of the preceding aspects, wherein a plurality of treatment locations are provided, linked with each other by a second processing line.

Thus, the trays unloaded from the first processing line can also be moved along the second processing line from one treatment location to another. They can be processed on the second processing line until a final growth stage has been reached or can be reloaded to the first processing line before. Alternatively, the treatment location can be a "blind end" to which the plants are unloaded for treatment or destruction.

$15^{th}$ aspect of the "Horticulture Processing Line": The Controlled Agricultural System of one of the preceding aspects, wherein at least a section of the processing line extends horizontally, the growth trays being transported horizontally by vehicles or on a conveyer belt from one growth location to the other.

Horizontally, the growth trays can be transported by vehicles, in particular vehicles driving autonomously. Alternatively or in addition, a conveyer belt can be used for a horizontal transportation. Further, the growth trays could also float along a waterway, see for instance "Hydroponics". A vertical transportation can be achieved by an elevator, in particular of a paternoster-type elevator.

$16^{th}$ aspect of the "Horticulture Processing Line": The Controlled Agricultural System of one of the preceding aspects, wherein at least a section of the processing line extends vertically, the growth trays being transported vertically by an elevator.

$17^{th}$ aspect of the "Horticulture Processing Line": The Controlled Agricultural System of the $16^{th}$ aspect of the "Horticulture Processing Line", wherein the elevator is of a paternoster type.

$18^{th}$ aspect of the "Horticulture Processing Line": The Controlled Agricultural System of one of the preceding aspects, wherein the growth zones are respectively equipped with a light fixture for agricultural lighting.

Each growth zone can be equipped with a plurality of light fixtures, wherein each light fixture can comprise a plurality of light sources, like halogen lamps, discharge lamps, semiconductor LEDs, OLEDs and Laser, and the like. In particular, light sources having different spectral properties can be mixed to adjust a spectral composition which is optimized regarding the specific plants or the growth status. The light fixtures can be installed having a fixed distance to a processing line, for example, a conveyor belt, though the light fixtures in different sectors can have different distances. In another embodiment, the light fixtures can be installed in a flexible way, so that their distance to the plants can be varied over time, in some embodiments/implementations automatically.

$19^{th}$ aspect of the "Horticulture Processing Line": A Method for Controlling a Controlled Agricultural System according to one of the preceding aspects, wherein plants are grown in the growth trays and the growth trays are moved along the processing line, wherein at least one tray is automatically unloaded from the processing line to the treatment location prior to having reached the last growth zone.

$20^{th}$ aspect of the "Horticulture Processing Line": A Computer program product, comprising:

a plurality of program instructions, which when executed by a computing device of a Controlled Agricultural System according to any one of the $1^{st}$ to $18^{th}$ aspect of the "Horticulture Processing Line", cause the Controlled Agricultural System to execute the Method for Controlling a Controlled Agricultural System according to the $19^{th}$ aspect of the "Horticulture Processing Line".

The program instructions can use the data to calculate/generate a 'virtual twin facility', see also "Measuring Patterns" below, of such a controlled agricultural system and show it graphically to a producer or customer for an informed interaction and control.

"Measuring Patterns"

Growers have different demands regarding the plant growth. Furthermore, they want to monitor the plant growth continuously. Demands may comprise plant quantity, plant quality, post-harvesting quality, and/or storage and delivery time. Plant quality is mainly defined by primary and secondary metabolites as well as appearance (color, morphology). Plant quantity is defined by yield (fresh or dry weight). Plants comprise herbs, vine crops, microgreens, leafy greens, fruits and the like.

A growth recipe comprises values for a light recipe (spectrum, intensity, photoperiod), content of $CO_2$— and other gases in the air, temperature (air, soil), humidity, nutrients, EC (electrical conductivity), pH, $H_2O$, chemical and biological composition of the soil, Hydroponics and aeroponics parameters, etc. A light recipe may comprise a time-sequential set of individual light recipes. However, the actual setup of the agricultural facility/plant growing facility (light sources, light fixtures, placement of light fixtures, actuators, sensors) will be different for almost every grower so that a pre-defined growth recipe might not provide the optimal result. New requirements that have not been tested before might also not lead to the desired results. A recipe may be suited and applicable to generate desired growth conditions in a 2D and 3D agricultural environment.

This is one example, why a group of sensors or a sensor device system, which comprises a plurality of sensors, for measuring the actual plant-growth relevant data can be of interest. This data can for instance be used for triggering actuators and/or can be stored, for example in a general platform, e.g. a digital platform like an online-platform (e.g. in the cloud) or a local data storage device.

1$^{st}$ aspect of “Measuring Patterns”: A Method for arranging a plurality of sensors in an agricultural facility, e.g. in a plant growing facility, the sensors being of the same type (first type), wherein i) the sensors are placed in a first relative arrangement in the agricultural facility;
ii) a measurement is performed with the sensors being in the first relative arrangement;
iii) at least some of the sensors are removed and/or re-positioned.

“Re-positioning” means that the sensors are placed at another location in the agricultural facility and/or are oriented in another direction. Thus, the sensors are re-located and/or re-oriented. For instance in case of optical sensors, e.g. cameras, the re-orientation can change the detection field even without a re-location.

From steps i)/ii) to step iii), the distribution of the sensors can be optimized. This means that the farm is covered sufficiently while the overall number of sensors is kept as low as possible. This can reduce the overall cost of the facility. With the approach described here, an optimum coverage can be achieved nevertheless. In simple words, the agricultural facility is measured with a high (global or local) sensor density initially (first relative arrangement, steps i/ii). In the final setup (step iii), sensors are for instance placed only where the measured values differed significantly (in time or locally). In other words, sensors which do not provide new information, as the data that they are providing is almost identical to neighboring sensors, will be removed/re-positioned. Likewise, the overall number of sensors can be reduced.

The measurement of step ii can for instance cover a time interval of at least 1 hour, 2 hours, 4 hours, or 6 hours. Possible upper limits are for instance 8, 6, 4, or 2 weeks, further possible upper limits being for instance 10 days, 8 days, 6 days or 4 days. Advantageously, a time interval covering one or more days can give an impression over the circadian rhythm of the plants (covering day/night cycles).

The sensors being “of the same type” are adapted for measuring the same physical quantity. In some embodiments/implementations, these sensors are identical in construction. A physical quantity measured can for instance be the temperature, humidity, leaf temperature, VPD (vapor pressure deficit), substrate moisture, substrate temperature, or EC (electrical conductivity), further, the pH-value, wind/air velocity, or PAR (photosynthetically active radiating) can be measured. It is also possible to measure vibrations, or sound, but also camera imaging solutions (including hyperspectral imaging) can be implemented. The sensor system may also be configured to measure the geometrical layout and texture of an agricultural environment, like a vertical farm or a greenhouse.

The “plurality” of sensors can for instance be at least 5, 10, 20, 30 or 40 sensors (with possible upper limits of for instance not more than 1000, 500 or 100).

2$^{nd}$ aspect of “Measuring Patterns”: The Method of the 1$^{st}$ aspect of “Measuring Patterns”, wherein, in the first relative arrangement, a local areal density of the sensors is higher than after step iii).

The local areal density is taken locally, namely in a subarea of the growth area of the farm. The growth area is the total area used for growing plants in the farm. A subarea, in which the local aerial density is taken, can for instance cover not more than 70%, 50% or 30% of the growth area (possible lower limits are for instance at least 1%, 5% or 10%).

3$^{rd}$ aspect of “Measuring Patterns”: The Method of the 2$^{nd}$ aspect of “Measuring Patterns”, wherein the sensors are placed in a second relative arrangement prior to step iii), the local areal density of the sensors being higher in the second relative arrangement than after step iii).

The first and the second relative arrangement differ at least partly. From the first to the second relative arrangement, at least some of the sensors are re-positioned.

4$^{th}$ aspect of “Measuring Patterns”: The Method of the 3$^{rd}$ aspect of “Measuring Patterns”, wherein all sensors are re-positioned from the first to the second relative arrangement.

Likewise, prior to step iii, the growth area of the farm can be scanned successively. In each relative arrangement, the sensors form a scan field with a high local areal density of the sensors, these scan fields cover the growth area step by step. In a sense, the scan fields are moved across the farm.

5$^{th}$ aspect of “Measuring Patterns”: The Method of the 3$^{rd}$ or 4$^{th}$ aspect of “Measuring Patterns”, wherein the local areal density of the sensors is the same in the first and the second relative arrangement.

6$^{th}$ aspect of “Measuring Patterns”: The Method of any of the 3$^{rd}$ to 5$^{th}$ aspect of “Measuring Patterns”, wherein a first measuring area covered by the sensors in the first relative arrangement and a second measuring area covered by the sensors in the second relative arrangement overlap at most partly, if at all.

The measuring areas are respectively smaller than the overall growth area of the farm (the area of the farm used for growing plants).

7$^{th}$ aspect of “Measuring Patterns”: The Method of any of the 3$^{rd}$ to 6$^{th}$ aspect of “Measuring Patterns”, wherein the number of sensors after step iii) is the same as in step i). Thus, no sensors are removed in step iii).

During the initialization/setup phase, the sensors are moved across the growth area in the high density arrangements (scan fields), thereafter the same sensors are placed with a smaller local aereal to monitor the farm during normal operation.

8$^{th}$ aspect of “Measuring Patterns”: The Method of any of the preceding aspects of “Measuring Patterns”, wherein, after step iii), a local areal density of the sensors is varying across the farm, the local areal density being smaller in a subarea, where a smaller deviation between the sensors was observed prior to step iii);

and larger in a subarea, where a larger deviation between the sensors was observed prior to step iii).

Therein, "smaller"/"larger" relates to a comparison between the different subareas of the farm.

9$^{th}$ aspect of "Measuring Patterns": The Method of any of the preceding aspects of "Measuring Patterns", wherein a plurality of additional sensors, which are of a second type (different from the first type), are provided, wherein iv) the additional sensors are placed in a first relative arrangement in the agricultural facility;

v) a measurement is performed with the additional sensors being in the first relative arrangement;

vi) at least some of the additional sensors are removed or re-positioned.

Therein, the measurements with the first sensors and the additional sensors can be performed one after the other or simultaneously. In other words, steps ii) and v) can be performed at the same time or subsequently.

10$^{th}$ aspect of "Measuring Patterns": The Method of the 9$^{th}$ aspect of "Measuring Patterns", wherein, after step iii), a local areal density of the first sensors is smaller in a region where a local areal density of the additional sensors is larger;

and/or a local areal density of the additional sensors is smaller in a region where a local areal density of the first sensors is larger.

Likewise, correlations or dependencies between the different sensor types are taken into account to reduce the overall number of sensors. A correlation can for instance exist between temperature and humidity.

10$^{th}$ aspect of "Measuring Patterns": The Method of any of the preceding aspects of "Measuring Patterns", wherein a digital model of the plant growing facility, namely a digital facility twin, is rendered to indicate/suggest the positions of the sensors in the digital model.

In particular, a computing device can be configured to render the digital facility twin. The rendering can be performed based on the data stored in the data storage device. In the digital facility twin, the positions of the sensors for the first relative arrangement (of the first and/or additional sensors) can be indicated/suggested, but also the sensor positions for step iii) and/or step vi).

"Measuring Patterns" can also be implemented into an Agricultural System, configured for performing a method according to any of the preceding aspects of "Measuring Patterns".

The Agricultural System can be configured to be able to manage the positioning (including orientation and inclination) and re-positioning of the sensors of the sensor devices for monitoring the plant growth and, optionally, the status of the plant growing facility (e.g. for the maintenance of the equipment used in the plant growing facility) based on the data stored in the data storage device. In particular, this element of the disclosure can relate to a Controlled Agricultural System, particularly for breeding, growing, cultivating and harvesting in an agricultural facility, e.g. in a plant growing facility, comprising at least one sensor device, comprising a group of sensors able to measure environmental parameters (e.g. temperature, light intensity, etc.).

In particular, the Agricultural System can comprise a computing device, configured to be able to access and control the at least one sensor device and the data storage device. In some embodiments/implementations, the computing device is configured for the positioning and re-positioning of the sensor.

The Agricultural System can also comprise a data storage device (e.g. platform/cloud) for storing data about the plant growing facility (e.g. layout, size, placement of light fixtures, actuators, etc.) and the at least one sensor device (e.g. types of sensors in the groups, number of sensors per group, range of sensors, etc.), The positioning and/or re-positioning can be managed based on the data stored in the cloud.

In particular, the computing device can be configured to access and control the sensor device system and the data storage device/platform. Furthermore, the computing device is configured to access the set of measurement data, to analyze them and to compare them with other data sets, for example, stemming from other controlled agricultural systems, or from standardized or ideal data sets or current or historical user data sets.

The sensor device system may comprise a variety of different sensor types in order to measure a variety of relevant plant growth data as well as post-harvest plant data, like the concentration of certain enzymes or the concentration of vitamins and glucose. The sensor device system may comprise a variety of different sensor types in order to measure and recognize pest-related and/or disease related parameters. The sensor device may be configured to establish a communication and/or data processing and analyzing network between themselves.

To create and update the growth recipes, the status of the plant growth and of the plant growth facility needs to be understood. To record the status, a set of sensors need to be deployed in the facility. These sensors may include ambient sensors.

The group of sensors can be able to measure one or more of the following parameters: temperature, humidity, leaf temperature, VPD (vapor pressure deficit), substrate moisture, substrate temperature, EC (electrical conductivity) and pH-value, velocity, PAR (photosynthetically active radiating). Alternatively or in addition, sensors measuring vibrations, sound but also camera imaging solutions including hyperspectral imaging may be used. The sensor system may also be configured to measure the geometrical layout and texture of an agricultural environment, like a vertical farm or a greenhouse. A sensor can also be an optical detection device, particularly for imaging methods, e.g. a camera.

In an aspect of "Measuring Patterns", the sensors are able to communicate with each other or with a control unit. The sensors may form local sub-systems with a respective control unit. The local sub-systems can be adaptively reconfigured based on output data from an artificial intelligence network system. An overall control unit (e.g. the computing device) may manage data fusion of different sensors and subsequent data analysis as well as data forecasting. The sensor data may be fed into an Artificial Intelligence system that, after calculating, outputs data that can be used for plant modelling and the steering of actuators.

It can be advantageous to find the optimal place for the different sensors to optimize the use of sensors (minimum number needed) and nevertheless get a comprehensive overview about the growth situation.

Therefore, the computing device, is configured to manage the positioning and re-positioning of sensors for monitoring plant growth, plant harvesting, plant placement on empty places and, optionally, the status of the plant growth facility (e.g. for the maintenance of the equipment used in the plant growth facility).

The Controlled Agricultural System can comprise an actuator device able to adjust growth parameters of plants (e.g. water, nutrient, light (intensity, spectrum), humidity, temperature, air ventilation, water circulation, pesticides) and/or to adjust the position and shape of a light fixture and/or to change the layout of variable building design parameters of a building or housing or cabinet of the agricultural facility and/or to close or open the roof of the agricultural facility (e.g. greenhouse) and/or to change a location of a moveable agricultural growth cabinet inside the agricultural facility.

11$^{th}$ aspect of "Measuring Patterns": The Method of any of the preceding aspects of "Measuring Patterns", particularly for breeding, growing, cultivating and harvesting in an agricultural facility, e.g. a plant growing facility, comprising a controlled agricultural system, the method comprising the steps of Uploading/Entering the layout of the plant growth facility into a data storage device of the controlled agricultural system;

Uploading/Entering data of the sensors into the data storage device;

Rendering a digital model of the plant growing facility (digital facility twin) including indicating the positions of the sensors by means of the computing device based on the data stored in the data storage device;

Positioning the sensors in the real plant growing facility according to the model.

First (initial setup), a layout of the plant growth facility is uploaded to the platform (data storage device) incl. all relevant dimensions of the facility and growing zones (length, height, height of traces, distance between rows, amount of rows, etc.). Additionally, the available amount of sensor types and amount of different sensors is entered into the controlled agricultural system, e.g. via a user dashboard. The computing device of the controlled agricultural system is configured to generate a 3D model and/or a texture map of the facility, in other words a digital facility twin, and suggests where to position and how to orientate the sensors (e.g. horizontally and vertically in the facility, angle and direction of orientation), based on the input data.

12$^{th}$ aspect of "Measuring Patterns": The Method of any of the preceding aspect of "Measuring Patterns", comprising the step of:

Positioning the sensors in the plant growing facility according to similar facility setups stored in a data storage device.

Furthermore, the computing device may be configured to suggest, how long to keep the sensors at the respective places/positions and (if needed/optionally) where to put them for a 2$^{nd}$ or 3$^{rd}$ time period to generate a (even more) complete overview of the facility and microclimate within the facility. The suggestions may be based on experience with similar facilities or a calculation how the sensors should be placed on a 3D-grid in the facility to collect data (based on the (spatial) range of the specific sensor). A goal may be to leave a respective sensor as short as possible at a specific location to gather the required data.

The computing device (platform) is configured to suggest the positioning for the sensors based on the farm layout and size. It is also configured to suggest the minimum requirements of sensor data acquisition for a given agricultural system so that for each growth stage and plant maturity the acquired farm data can be considered representative for the digital facility twin database. It is preferred to collect the relevant data as fast as possible so that the farm is "understood and approved" by and for the controlled agricultural system (i.e. as a first/initial setup).

13$^{th}$ aspect of "Measuring Patterns": The Method of any of the preceding aspects of "Measuring Patterns", further comprising the step of including the range of the sensors into the calculation of the positions of the sensors.

14$^{th}$ aspect of "Measuring Patterns": The Method of any of the preceding aspects of "Measuring Patterns", further comprising the steps of Measuring and collecting data by means of the sensors;

Analyzing the measured and collected data and suggesting a re-positioning of the sensors to improve the measurements by means of the computing device.

As mentioned already, this element of the disclosure also relates to a Controlled Agricultural System:

15$^{th}$ aspect of "Measuring Patterns": A Controlled Agricultural System configured for performing a method according to any of the preceding aspects of "Measuring Patterns".

The controlled agricultural system may be configured to automatically suggest missing sensors or how additional sensors could help to accelerate/improve/optimize the growth process. For example, if an array of humidity sensors, or a single humidity sensor, is moved over time across an agricultural system, and detects conditions promoting fungi growth, the system might suggest deployment of camera-based detectors in order to catch the issue before it spreads.

The controlled agricultural system may also be configured to show tutorials how to correctly install and use the different sensors. Once the data of a location (of a sensor) is collected, the system/platform informs the grower and suggests the next possible sensor location.

For short or temporary measurements, drones, other mobile robots (automated agricultural vehicles AGV) or humans may also be used to create/collect the sensor data.

When the initial setup is done, i.e. the controlled agricultural system "understands" the different regions of the facility, the controlled agricultural system is able to suggest placing/permanently installing the sensors in relevant/problematic zones.

Furthermore, the computing device of the controlled agricultural system may also be configured to show the locations of the sensors in a kind of "heat maps" to constantly monitor these locations. If different seasons are to be considered, seasonal maps may be relevant/comprised.

The sensors can also be used to assess the status of the equipment of the plant growing facility and to plan for maintenance or crop rotation (bringing the plants in another area of the facility if the maintenance can affect the yield).

The Sensors may also be able to change their position during the growth of the plants (e.g. angle of inclination or height above ground for positioning). The sensors may also be included in the earth/ground or in the water. The sensors may also be configured to provide real-time data about growth—for example growth of fruits in kg/m$^2$/day.

During the execution of the plant-growing project, all relevant data are acquired and considered/analyzed. For instance, the controlled agricultural system may establish all relevant documentation, e.g. in a project report, regarding input factors used and results achieved, including for example agricultural risk assessments. Additionally, post-harvest measurements and risk assessments may be executed and documented as well. The data may be transferred via software interfaces automatically, e.g. stored on the platform.

16th aspect of "Measuring Patterns": A computer program product, comprising:

a plurality of program instructions, which when executed by a computer system of a Controlled Agricultural System according to the 15th aspect of "Measuring Patterns", cause the Controlled Agricultural System to execute the Method according to any one of the 1st to 14th aspect of "Measuring Patterns".

17th aspect of "Measuring Patterns": An agricultural facility (plant growing facility, (vertical) farm, greenhouse, etc.) with at least one Controlled Agricultural System according to the 15th aspect of "Measuring Patterns".

"Light Recipes & Workflow"

Horticulture facilities like greenhouses and vertical farms are getting more and more automated. An interesting approach discussed here is to move the plants through the horticulture/agricultural facility, namely to transport them through the facility depending on the specific growth phase. Therein, different light or growth recipes can be applied in different zones along the workflow (and thus plant flow). The recipes can be pre-designed in terms of the respective plant type and growth phase. Each recipe can define a specific lighting scenario, e.g. regarding the intensity and spectral composition, adapted to the growth phase of the plants in the respective zone. As discussed below, also other parameters, like temperature, humidity, air flow, etc., can be customized in the different zones.

This element of the disclosure is about designing and operating a plant production line of an agricultural facility, and it also relates to the production line and facility itself.

1st aspect of "Light Recipes & Workflow": A Method for designing an agricultural facility for growing plants, the method comprising the steps of

- determining a number N of different grow scenarios to be applied to the plants in different growth phases $GP_n$ (n=2 . . . N);
- dividing the facility into N zones $Z_n$;
- assigning to each of the N zones an area $A_n$;

wherein a sum, derived from summing up all areas $A_n$, is smaller than or equal to a total growth area available in the agricultural facility ($\Sigma A_n \leq$ total growth area);

and wherein, for at least some of the areas $A_n$, the size of the areas $A_n$ is increasing with increasing number n ($A_n < A_{n+1}$).

Therein, n is an integral number, and N is greater than 1 (i.e. N=2, 3, 4 or 5); upper limits can for instance be N=50, 40, 30, 20 or 10. The growth of the plants proceeds with increasing number n, so that $GP_{n+1}$ is the growth phase subsequent to the growth phase $GP_n$ (which applies for all values of n from 1 to N). In operation, the plants can be moved through the facility from zone to zone, namely from $Z_n$ to $Z_{n+1}$, see in detail below.

The grow scenarios can in particular be derived from a growth recipe. These can for instance be or comprise lighting scenarios. In each zone, for instance light fixtures can be adapted to emit light with a spectral composition required by the plants in the actual growth phase. Therein, the light fixtures can be fixed or pre-defined in their respective spectral properties, which can give a cost benefit in comparison to providing light fixtures with adaptable spectral properties, even though a conveyer mechanism or the like is may be required for transporting the plants. Alternatively or in addition to providing specifically adapted light fixtures in the different zones, other actuators for adjusting other environmental conditions (temperature . . . ) can be provided and adapted to the specific zone.

2nd aspect of "Light Recipes & Workflow": The Method according to the 1st aspect of "Light Recipes & Workflow", wherein, for some of the areas $A_n$, the size of the areas $A_n$ remains unchanged with increasing number n ($A_n = A_{n+1}$).

Typical growth phases can for instance be germination, growth and maturation. Depending on the specific plant type, there may be growth phases in which the size of the plants remains unchanged. Accordingly, some of the zones $Z_n$ can have the same area $A_n$. For instance, in case that the size of the plants remains basically unchanged during maturation, the zones for maturation and growth can have the same size. On the other hand, providing different zones while the size remains unchanged can be advantageous, as for instance growth and maturation may require a different illumination.

3rd aspect of "Light Recipes & Workflow": The Method according to the 1st or 2nd aspect of "Light Recipes & Workflow", wherein the zones $Z_n$ are arranged in the facility in such a way, that a length of a production line connecting the different zones $Z_n$ is minimized.

This optimization can be done for instance numerically, comparable to solving a "Travelling salesman problem". Apart from minimizing the length of the production line, other boundary conditions can be the accessibility of the plants in the different growth phases, in particular after maturation/fructification. Further, when arranging the zones in the farm, not only the size but also the shape of the building can be taken into account.

4th aspect of "Light Recipes & Workflow": The Method according to the any of the preceding aspects of "Light Recipes & Workflow", wherein the area $A_n$ of a respective zone $Z_n$ is determined depending on a space factor, namely the space assigned to a plant in the specific growth phase $GP_n$.

The larger the space factor (the more space assigned to a plant), the larger $A_n$.

5th aspect of "Light Recipes & Workflow": The Method according to the any of the preceding aspects of "Light Recipes & Workflow", wherein the area $A_n$ of a respective zone $Z_n$ is determined depending on a time factor, namely the time a plant is kept in the specific zone $Z_n$.

The larger the time factor, namely the longer the plant is kept in the specific zone $Z_n$, the larger $A_n$.

The method described here can be in particular a computer implemented method. It can for instance be a program part of a light recipe design tool (LRDT) software program.

6th aspect of "Light Recipes & Workflow": A Controlled Agricultural System, particularly for breeding, growing, cultivating and harvesting in an agricultural facility, particularly a plant growing facility and/or an hydroponics facility, comprising:

an actuator device for moving plants along a plant production line according to a workflow, the plant production line being grouped into a number of N zones $Z_n$ ($Z_1 \ldots Z_N$), wherein N is an integral number greater than 1 (i.e. 2, 3, 4, . . . ), a number of N groups of agricultural light fixtures, the agricultural light fixtures of each one of the groups being arranged to illuminate a dedicated zone, respectively (i.e. group 1 illuminates zone 1, group 2 illuminates zone 2, etc.);

a data storage device (e.g. platform/cloud) for storing data comprising the agricultural light fixtures, light recipes for the plants and the workflow, a computing device, configured to control the agricultural facility by means of the actuator device and agricultural light fixtures according to the workflow.

7th aspect of "Light Recipes & Workflow": The Controlled Agricultural System of the 6th aspect of "Light Recipes & Workflow", the Agricultural System being designed in a Method according to any of the 1st to 5th aspect of "Light Recipes & Workflow".

8th aspect of "Light Recipes & Workflow": The Controlled Agricultural System of the 6th or 7th aspect of "Light Recipes & Workflow", wherein the light fixtures have a specific, fixed spectrum.

9th aspect of "Light Recipes & Workflow": The Controlled Agricultural System of any of the 6th to 8th aspect of "Light Recipes & Workflow", wherein the light fixtures have a specific, fixed intensity.

Further, also other photometric values (see above), which are deployed at various stages of the workflow (growth phases), can be fixed. For example, a horticulture light fixture may be deployed at the beginning of the production/workflow configured to provide a specific light spectrum, e.g. for the initial growth phase of the respective plant species. Along the workflow (in different zones of the facility), horticulture light fixtures with other specific, fixed spectra and intensities may be deployed (according to the needs of the plants in subsequent growth phases). With this approach, maximum use of the functionalities of and investment in the agricultural/horticultural facility is ensured. The various fixed spectra may be selected based on plant need, environmental conditions and other requirements (user demands, Bio-mass to be produced, time to harvest, etc.).

An agricultural/horticultural light fixture that offers a fixed spectrum may include means for dimming the spectral intensity. In addition, the geometrical layout of an agricultural light fixture and beam spread are important features. All these features of those light fixtures may be stored in a database (local, cloud) available to users via a platform. The distance between light fixtures and plants (canopy) may also be taken into consideration for a suited agricultural/horticultural facility layout/setup.

The controlled agricultural system according to this element of the disclosure further comprises a computing device, which may be based locally (on-site) or in a (centralized) network or the cloud. The computing device may be configured to be able to run the LRDT software program. The computing device may also have access to the database containing data about the features of the agricultural light fixtures of the controlled agricultural system.

10th aspect of "Light Recipes & Workflow": The Controlled Agricultural System according to any of 6th to 9th aspect of "Light Recipes & Workflow", wherein the actuator device further comprises actuators able to adjust growth parameters of the plants, e.g. water, nutrients, light (intensity, spectrum), humidity, temperature, air ventilation, water circulation, pesticides.

11th aspect of "Light Recipes & Workflow": The Controlled Agricultural System of any of the 6th to 10th aspect of "Light Recipes & Workflow", the Agricultural System being configured to provide, in addition to the illumination with the light fixtures, in at least one of the Zones $Z_n$ a defined temperature, humidity and/or $CO_2$ level.

The computing device may be configured to control the agricultural facility by means of the actuators, light fixtures, etc., according to the workflow.

12th aspect of "Light Recipes & Workflow": The Controlled Agricultural System according any of the 6th to 11th aspect of "Light Recipes & Workflow", further comprising a sensor device able to measure distinctive characteristics of the plants, particularly for detecting the growth status of the plants.

The sensors may sense the growth status/growth phase of the plants as well as a health status of the plants. Health checkpoints along the flow paths can be planned/suggested by the LDRT and implemented into the horticultural plant layout and function.

13th aspect of "Light Recipes & Workflow": The Controlled Agricultural System according to any one of the 6th to 12th aspect of "Light Recipes & Workflow", wherein the computing device is further configured to trigger the next step of the workflow and/or synchronize the workflow with the growth status of the plants.

14th aspect of "Light Recipes & Workflow": The Controlled Agricultural System according to any one of the 6th to 13th aspect of "Light Recipes & Workflow", further configured to track and/or monitor the plants during the workflow, e.g. by using a distributed Blockchain ledger method.

The entire through-put cycle of a specific plant can be monitored and correlated with this specific plant, for example by using a distributed Blockchain ledger method thus allowing that the entire treatment cycle of each (individual) plant as well as the plant's health condition is documented accurately and permanently.

15th aspect of "Light Recipes & Workflow": The Controlled Agricultural System according to any one of the 6th to 14th aspect of "Light Recipes & Workflow", wherein the data storage device further comprises data about the agricultural facility including its equipment (e.g. layout, size, placement of light fixtures, actuators, sensors, etc.) and growth recipes for the plants.

To facilitate this approach, the present element of the disclosure further proposes a Light Recipe Design Tool (LRDT), which is a software program with executable program steps. In the LRDT, the facility layout and the workflow are inserted (per upload of layouts or pictures, grouping of zones/production stages, insert of dwell (delay or rest)) times, etc.). Furthermore, user demand (bio-mass), post-harvesting treatment, environmental conditions, can be factored in. The LRDT is connected to a database of light recipes for a variety of plants, growth stages, dwell times, On-Off-cycle, and the like, including the light fixture-related and light fixture-plant related data sets (see above).

16th aspect of "Light Recipes & Workflow": A method for agricultural management, particularly for breeding, growing, cultivating and harvesting in an agricultural facility, e.g. a plant growing facility, comprising:

at least one controlled agricultural system according to one or more of the 6th to 15th aspect of "Light Recipes & Workflow", and the steps of Uploading the layout of the agricultural facility and the workflow into the data storage device;

Entering data of user demand (e.g. plant species) into the data storage device;

Fetching a light recipe appropriate for the user demand, including the light fixture-related and light fixture-plant-related data sets from the database stored on the data storage device;

Rendering a light recipe design (LRD) by proposing a setup of the facility including its equipment (light fixtures, actuators, sensors, etc.), which setup is adapted to the fetched light recipe and the workflow, by means of the computing device based on the data of the previous steps.

The LRDT is configured to develop a light recipe design (LRD) for the entire plant treatment time for the grower's facility. This means the LRDT is configured to take into account the size of the facility, the size of the plants in each growth stage (growth phase), the time the plants remain in each grow stage, the number of grow stages and the like (see above). Based on this, the LRDT proposes a setup for the facility, indicating the space required for each grow stage, where to put light fixtures and which types of light fixtures including the respective configuration (spectrum, intensity).

It also defines the appropriate velocity (or stand-still time) of plants that may move on a track or conveyor belt from one position to another. It also defines the appropriate horticultural fixture design, layout, placement of attached or connected optical components (like lenses, reflectors, light guides), cooling conditions, airflow and the like, distance to the plant canopy, as well as any inclination of the light fixture.

17$^{th}$ aspect of "Light Recipes & Workflow": The method for agricultural management according to the 16$^{th}$ aspect of "Light Recipes & Workflow", further comprising the steps of Implementing the light recipe design (LRD) in the facility;

Controlling the workflow in the facility by means of the actuator device and the computing device based on the LRD.

The LRD may be uploaded to the grower's horticulture Internet of Things (IoT) platform. The horticulture IoT platform may be configured to do real-time asset tracking to monitor the plant movement along the workflow and match it to the LRD and give feedback to the grower if it matches or if something needs to be adjusted to the LRD. Adjustment to the workflow could be for example slowing down/speeding up the process time at a growth stage. Asset tracking may be done for example by sensors and radio frequency (RF), RFID or barcode and QR-code scanning of plant trays or plant pots during the production/workflow.

18$^{th}$ aspect of "Light Recipes & Workflow": The method for agricultural management according to the 17$^{th}$ aspect of "Light Recipes & Workflow", wherein the step of controlling the workflow further comprises the sub-steps of Moving the plants along the direction of the workflow and across the zones (Z1, Z2; Z3) of the plant production line;

Controlling the light fixtures according to the light recipe design (LRD), i.e. according to a setup of the facility including its equipment (light fixtures, actuators, sensors, etc.), which setup is adapted to the fetched light recipe and the workflow.

19$^{th}$ aspect of "Light Recipes & Workflow": The method for agricultural management according to the 18$^{th}$ aspect of "Light Recipes & Workflow", whereby moving of the plants is conducted in order to cross each zone (Z1, Z2; Z3) according to a pre-defined schedule.

20$^{th}$ aspect of "Light Recipes & Workflow": The method for agricultural management according to any one of the 16$^{th}$ to 19$^{th}$ aspect of "Light Recipes & Workflow", further comprising the steps of Measuring and collecting data by means of the sensor device, comprising data for detecting the growth status of the plants, and adapting the timing for moving the plants to the detected status of the plants.

21$^{th}$ aspect of "Light Recipes & Workflow": A computer program product, comprising:

a plurality of program instructions, which when executed by a computer system of a Controlled Agricultural System according to any one of the 6$^{th}$ to 15$^{th}$ aspect of "Light Recipes & Workflow", cause the Controlled Agricultural System to execute the method for Agricultural Management according to any one of the 16$^{th}$ to 20$^{th}$ aspect of "Light Recipes & Workflow".

The LRDT software program may be configured to improve itself based on feedback (customer, produces) by executing Deep Learning or AI methods. The LRDT software program may be licensed to other parties.

22$^{th}$ aspect of "Light Recipes & Workflow": An agricultural facility (plant growing facility, (vertical) farm, greenhouse, etc.) with at least one Controlled Agricultural System according to any one of the 6$^{th}$ to 15$^{th}$ aspect of "Light Recipes & Workflow".

Though a horticultural plant facility can have many flow paths, it is preferred to keep it as simple as possible, e.g. following a straight line through the horticultural plant facility (see FIG. 19). Plant factories can have a larger number of plant rows and paths, probably many hundred. Flow paths can be stacked upon each other in vertical layers thus providing a 3D path system. In principle, the flow paths could reverse their direction so that the plants move again through a previous light setting (but in opposite direction).

Plant Health/Growth

"Prophylaxis"

According to the element "Prophylaxis" of the disclosure, a controlled agricultural system and a method for agriculture for prevention of diseases and pests or for fighting same is proposed.

To this end, abiotic and biotic environmental parameters are monitored and, if need be, appropriate measures are proposed or, alternatively, introduced automatically.

1$^{st}$ aspect of "Prophylaxis": More specifically, a controlled agricultural system, comprises a first sensor device for acquiring data in relation to environmental parameters (environmental data), a data storage device for storing the data from the first sensor device and a computing device configured to analyze the data of the data storage device in order to identify critical situations and propose suitable countermeasures where applicable.

Parts of the controlled agricultural system, for example the computing device or the data storage device may be based locally or else on a network or cloud.

The term environment in this case comprises the greenhouse per se and the region outside of the greenhouse.

The environmental parameters, i.e., the effective factors, include data (environmental data) such as temperature, wind speed, humidity, light factor, ozone content of the air, UV radiation, but also season or amount of pollen or number of insects in the air. It is likewise possible to monitor the temperature at the leaves of the plant. If the temperature there falls below the dew point, there is then an increased risk of fungi afflicting the plants. As to appropriate measures against such risk, see also the element "Fungi Growth Inhibition" of the group "Plant Health & Growth" of the disclosure.

Therefore, the controlled agricultural system is equipped with sensors that are able to acquire the aforementioned abiotic and biotic environmental parameters at adjustable time intervals or else continuously.

2$^{nd}$ aspect of "Prophylaxis": Alternatively, a controlled agricultural system comprises a first sensor device for acquiring data in relation to environmental parameters (environmental data), an actuator device, a data storage device for storing the data from the first sensor device and a computing device configured to analyze the data of the data storage device in order to identify critical situations and introduce suitable countermeasures with the aid of the actuator device where applicable.

Countermeasures could be:

Start automated illumination with specific light treatment (UV)

Start automated spraying of pesticides

Inform the operator to have a check and show the affected or suspicious location Adjust watering, ventilation, etc.

Further countermeasures could be (the controlled agricultural system may be configured to start them automatically or inform the grower and leave the choice to him):

Low acidity→add an acid to the nutrient solution

High acidity→add a base to the nutrient solution

Low nutrients→add macro and micro elements or ready to use fertilizer to nutrient solution Temperature too low→tell heat system to adjust it, close or open windows Too dark/bright→open screen/close screen, dim up/dim down light Aphids found→add imidacloprid (or any other insecticide) to nutrient solution Mildew found→change light to a UV enriched spectrum/add fungicide to automated sprayer, adjust humidity and temperature to optimum.

The controlled agricultural system may also be configured to just giving notifications/recommendations in the beginning or wait for confirmation by the operator before executing the recommended countermeasures. For instance, the system may recommend a countermeasure like "In the current situation, grower XYZ implemented this or that countermeasure with the effect of ABC. Do you want to execute?" Alternatively or in an advanced stage of the project the system may be configured to decide and implement countermeasures autonomously.

The measure using pesticides should be execute as described in the user manuals. The user manuals of seed-, substrate-, fertilizer-, pesticide- and equipment companies should be stored and continuously updated in the system.

The countermeasures should also take into account the expected yield/harvesting time (and acceptable reductions or delays). Afterwards the system can give suggestions how often we increase the light intensity, or change the spectrum.

Sometimes it may also makes sense to delay a measure, e.g. before opening and closing the sunscreen to take account for small clouds in the sky.

All countermeasures may be documented by the agricultural system.

3rd aspect of "Prophylaxis": The controlled agricultural system according to the 1st or 2nd aspect of "Prophylaxis", comprising a second sensor device for acquiring data in relation to the state of the plants (plant data), wherein the data storage device is configured to store the data from the second sensor device.

Specifically, the controlled agricultural system is equipped with sensors that are able to acquire the state of the plants, in some embodiments/implementations the stress state thereof.

By way of example, these may be optical, chemical or electrical sensors, which identify, for example, the growth of the plants (density of the leaves, height of the plants, plant morphology, leaf area index), measure the color and reflectivity of the leaves, the thermo-luminescence thereof or the chlorophyll fluorescence thereof or the abscisic acid (ABA) luminescence thereof and hence the health of the plants and in particular the stress state thereof, and are able to supply these (plant data) to an evaluation.

Furthermore, the controlled agricultural system is configured to measure the recovery state, i.e., the reduction of stress parameters, of the plants. These information items are stored, in some embodiments/implementations in a plant-specific manner, in a data storage device and are analyzed by a computing device.

If a disease has been detected, the computing device of the controlled agricultural system regularly checks the sensors that detected the disease to monitor the development of the disease. If no improvement of the situation can be observed after a certain time period has passed, a warning is issued. If the situation improves, the countermeasures are modified accordingly, e.g. the amount of insecticide may be reduced.

4th aspect of "Prophylaxis": The controlled agricultural system according to the 3rd aspect of "Prophylaxis", wherein the computing device is configured to analyze the data of the data storage device, to identify negative effects on the plants in the process and reduce or stop the countermeasures should negative effects on the plants be identified.

The analysis can be performed using methods connected to artificial intelligence (AI), such as deep learning. The goal of the analysis is to identify and/or predict an environmental situation that is accompanied by an increased occurrence of diseases or pest infestation. The analysis may also include the plant state, for example the degree of maturity. This is because, as a rule, the risk of pest infestation also increases with advancing degree of maturity.

Additionally, situations in which pests such as fungi thrive may arise (particularly indoors) from the growth recipes with variable temperatures and degrees of humidity thereof. These situations may likewise be identified.

If such a situation is identified, the operator of the greenhouse can then be informed so as to introduce measures that prevent or reduce an outbreak of the disease or which prevent pests from entering the greenhouse.

However, the system may also be able to take up these measures in preventative fashion, with care having to be taken that the plants are not adversely affected, or not adversely affected too much, by the measures. Thus, there is a trade-off between potential use and possible damage by the measure. This is weighted with the probability of the occurrence of the disease or the pests and the probability of damage by the measure, and hence a decision is made as to whether or to what extent, the measure is carried out.

5th aspect of "Prophylaxis": The controlled agricultural system according to any one of the 1st to 4th aspect of "Prophylaxis", wherein the first sensor device comprises one or more sensors for one of the following environmental parameters or a combination thereof: air composition, air temperature, air humidity, wind speed, light intensity, light spectrum, number of pests, light factor, ozone content of the air, UV radiation.

6th aspect of "Prophylaxis": The controlled agricultural system according to any one of the 1st to 5th aspect of "Prophylaxis", wherein the second sensor device comprises one of the following sensors or a combination thereof: temperature sensor, gas analyzer, photodiode, spectrometer, camera.

7th aspect of "Prophylaxis": The controlled agricultural system according to any one of the 1st to 6th aspect of "Prophylaxis", wherein the actuator device comprises one or more of the following actuators or a combination thereof: plant light fixture with various light sources, UV radiation source, applicator for pesticides, applicator for herbicides, applicator for fungicides, applicator for useful creatures, mobile robot unit, drone, heater or cooler, ventilator.

Measures may include the irradiation with UV (or generally a change in the light recipe), the closing of windows and doors, the reduction of the humidity or the temperature, or else the automatic release of useful creatures or the automatic application of correspondingly licensed pesticides by means of a mobile robot unit, etc.

Placing UV-reflecting mats below the plants may be a passive measure for reducing the infestation of pests. Thus, pests can no longer distinguish leaves from the ground, and so they settle less frequently on the plants.

Effects on the plants can be monitored by controlling the plant stress (but also by checking the growth with cameras, etc.). If need be, preventative measures may be terminated if the stress on the plants becomes too large. At the same time, environmental parameters are checked regularly to see when the risk of an outbreak of disease or infestation of pests has abated.

8th aspect of "Prophylaxis": A method for agricultural management, comprising the following method steps: measuring relevant environmental parameters in a target area, analyzing the measurement data and identifying critical situations such as environmental conditions that are inexpedient for plants, for example, with an (elevated) risk of the plants being afflicted by disease or infested by pests or whether the plants are already afflicted by disease or infested by pests, proposing, or alternatively automatically introducing, countermeasures.

9th aspect of "Prophylaxis": The method for agricultural management according to the 8th aspect of "Prophylaxis", comprising the following additional steps: a) acquiring data in relation to the state of the plants and checking whether the countermeasures have a (negative) effect on the plants, b) reducing or stopping the countermeasures if the countermeasures have a (negative) effect on the plants, c) re-measuring relevant environmental parameters in the target area and checking whether a critical situation still is present if the countermeasures do not have a (negative) effect on the plants, d) stopping the countermeasures if the situation is no longer critical, e) continuing the countermeasures if the situation still is critical and continuing with step c).

10th aspect of "Prophylaxis": The method for agricultural management according to the 8th or 9th aspect of "Prophylaxis", carried out by a controlled agricultural system according to any one of the 1st to 7th aspect of "Prophylaxis".

The method enables to identify critical situations such as environmental conditions that are inexpedient for plants, and optionally taking countermeasures. Furthermore, reference is made to the description above, the features described there shall also be disclosed in terms of the method.

11th aspect of "Prophylaxis": A machine-readable computer product, comprising a multiplicity of program instructions which, when executed on the computing device of the controlled agricultural system according to any one of the 1st to 7th aspect of "Prophylaxis", cause the Controlled Agricultural System to execute the method according to the 8th or 9th aspect of "Prophylaxis".

"Stress Detection"

According to the element "Stress Detection" of the disclosure, pests, diseases and stress of plants are detected based on leaf characteristics by means of sensors.

1st aspect of "Stress Detection": More specifically, a controlled agricultural system, comprises a sensor device able to measure distinctive characteristics of plants (measured data of plants), a data storage device for storing reference data of plants, and a computing device, configured to compare the data measured by the sensor device with the respective reference data stored on the data storage device and to identify stress, diseases, pests or any other critical condition of the plants from the result of the comparison.

Furthermore, the controlled agricultural system comprises a computing unit configured to identify stress or disease from the data measured by the sensors. For instance, if the computing unit detects morphological changes of the leaves, the controlled agricultural system delivers a warning to the user (farmer).

2nd aspect of "Stress Detection": The controlled agricultural system according to the 1st aspect of "Stress Detection", further comprising a user interface for delivering the result of the comparison and/or identification to the user.

To this end, the controlled agricultural system comprises sensors, which are able to measure distinctive characteristics of plants, e.g. color changes of the leaves by means of optical sensors (e.g. sensors for spectral measurements), plant morphology by means of a camera, etc.

In an exemplary embodiment, a camera is configured to take pictures of the leaves in regular intervals (e.g. minutes, hours, days). The pictures are then compared to earlier pictures or pictures of a healthy plant. "Earlier pictures" can mean that one or a sample of earlier pictures have been taken for the purpose of later comparison or that an average of the earlier pictures has been calculated with respect to the respective parameters like inclination, leaf-size, roll-up, etc.

A stress situation can be detected, if the picture analysis shows a difference in certain morphology parameters which are larger than a certain threshold, for instance:

- certain inclination of the leaf (e.g. the leaf in inclined downwards, although it shows upwards for healthy plants),
- a roll-up of the leaf (i.e. the tip of the leave moves upwards),
- curling of leaves (i.e. the edges of the leaf move towards each other like folding the leaf longitudinally),
- an unsymmetrical leaf-size, i.e. one side of the leaf is smaller e.g. by at least 10 percent than the second side, or the size has been reduced by a certain amount (e.g. 10 percent) compared to earlier pictures,
- deformation due to an infection by aphids or other insects.

3rd aspect of "Stress Detection": The controlled agricultural system according to the 1st or 2nd aspect of "Stress Detection", further comprising an actuator device.

4th aspect of "Stress Detection": The controlled agricultural system according to the 3rd aspect of "Stress Detection", wherein the actuator device comprises one or more of the following actuators or a combination thereof: agricultural lighting device, radiation source able to emit ultraviolet (UV) radiation, irrigation system, ventilation system, heating/cooling system, feeder for dosing fertilizer and/or pesticides.

If the morphological change is due to a certain root cause (e.g. not enough water), the system may optionally initiate a counter-measure (e.g. irrigation). For this purpose, the controlled agricultural system further comprises respective actuators (e.g. irrigation system).

5th aspect of "Stress Detection": The controlled agricultural system according to the 3rd or 4th aspect of "Stress Detection", wherein the computing device is configured to automatically counteract by means of the actuator device, if stress, diseases, pests or any other critical condition is identified.

For identifying stress or disease, the pictures currently taken may be compared with existing reference pictures of corresponding plants in good health and condition retrieved from a database. The database is stored in a data storage device that may be based locally, in a network or the cloud. The identification process may be performed by using picture recognition algorithms, e.g. deep learning. By using data of other sensors (environmental sensors, chemical sensors), the different morphological changes can be linked to other causes (e.g. hanging leafs due to not enough water or due to other environmental parameters such as a too high salt concentration). These causes may also depend on the specific kind of plant, which may also be taken into consideration when analyzing the pictures. Artificial Intelligence programs may be used to monitor, collect and interpret such sensor generated data and calculate forecast or prediction models in order identify and reduce plant stress.

6th aspect of "Stress Detection": The controlled agricultural system according to any one of the 1st to 5th aspect of "Stress Detection", wherein the sensor device comprises one or more of the following sensors or a combination thereof: imaging system, e.g. still or video camera, in some embodiments/implementations TOF camera or stereo camera, LIDAR system, environmental sensor, e.g. for measuring temperature, humidity and/or chemical composition of the air or soil, sensors for detecting color changes of the plant, particularly of the leaves, sensors for detecting specific gases exhaled by the plants, sensors for detecting the fluorescence emitted by the plants after activation with dedicated radiation.

In a preferred embodiment, the measurement system is capable to create a 3D-representation of the leaves (e.g. by using time of flight (TOF-) cameras, stereo cameras, or LIDAR (light detection and ranging)). If the picture is only available in two dimensions, the angle of inclination or the symmetry of the leaf might be misinterpreted, as the cameras cannot look perpendicularly on each leaf. A 3D-representation helps to avoid this mistake.

In a similar way, root morphology (e.g. in hydroponics systems) can be measured and analyzed with regard to pests or diseases.

Furthermore, a method for agricultural management detects pests, diseases and stress of plants based on leaf characteristics as described above.

7th aspect of "Stress Detection": A method for agricultural management, comprising at least one controlled agricultural system as described above and the following method steps: measuring distinctive characteristics of plants in a target area by means of the sensor device and collecting these measured data of the plants, storing reference data of plants, comparing the measured data with the reference data by means of the computing device and identifying stress, diseases, pests or any other critical condition of the plants from the result of the comparison by means of the computing device.

8th aspect of "Stress Detection": The method for agricultural management according to the 7th aspect of "Stress Detection", further comprising the step of delivering the result of the comparison and/or identification to the user by means of the user interface.

9th aspect of "Stress Detection": The method for agricultural management according to the 7th or 8th aspect of "Stress Detection", further comprising the step of counteracting automatically by means of the actuator device, if stress, diseases, pests or any other critical condition of the plants is identified.

10th aspect of "Stress Detection": The method for agricultural management according to any one of the 7th to 9th aspect of "Stress Detection", further comprising the step of establishing reference conditions before measuring distinctive characteristics of the plants in the target area, in some embodiments/implementations establishing reference lighting of the plants in the target area.

In addition, to gain consistent results the measurement should be conducted under standardized conditions, as different illumination (color or intensity) may affect the leaf morphology as well. In addition, different measurement conditions, e.g. colors of the luminaires, might lead to different measurement results. On the other hand, well-defined changes of illumination parameters can be used to analyze the plant stress, as it might induce changes in the leaves. This change, especially the reaction time for a respective change, can be measured and the measurement result may provide an indication about the stress.

11th aspect of "Stress Detection": A machine-readable computer product, comprising a multiplicity of program instructions which, when executed on the computing device of the controlled agricultural system according to the 1st to 6th aspect of "Stress Detection" causes the controlled agricultural system to execute the method according to any of the 7th to 10th aspect of "Stress Detection".

"Discolored Spots Detection"

According to the element "Discolored Spots Detection" of the disclosure, diseases and stress of plants are detected based on the detection of discoloration by means of complementary illumination. Additionally, complementary illumination may be used to identify colors or color changes, for example, due to ripening.

1st aspect of "Discolored Spots Detection": A controlled agricultural system, particularly for detection of plant diseases and various stages of ripening, comprising a data storage device comprising data, which are related to spectra of light, particularly of light with colors complementary to colors of parts of plants (Complementary Color Spectrum CCS), for example, complementary to discolored areas or parts of plants, an illumination device able to emit light with a color spectrum according to the data stored in the data storage device and illuminate plants, a sensor device able to detect the light reflected by the illuminated plants, and a computing device, configured to control the illumination device based on the data of the database, and further configured to analyze the data from the sensor device and detect dark areas on the plants.

2nd aspect of "Discolored Spots Detection": A controlled agricultural system, particularly for detection of plant diseases and various stages of ripening, comprising an illumination device able to emit light, perform a spectral light scan, comprising Complementary Color Spectra, particularly with regard to discoloration of plants or plant parts, and illuminate plants a sensor device able to detect the light reflected by the illuminated plants, a computing device, configured to control the illumination device for performing a spectral light scan, and further configured to analyze the data from the sensor device and detect dark areas on the plants.

For instance, various Discolored Spots (DSi) are illuminated with light with Complementary Color Spectra (CCSi). If all Discolored Spots (DSi) show the same discoloration, they may be illuminated with the same Complementary Color Spectra (CCSi). If the Discolored Spots (DSi) show different discolorations, they may be illuminated with different Complementary Color Spectra (CCSi), corresponding to the different discolorations.

The detection of discoloration may be used for various tasks of cultivating plants. For instance, it may be used to track changes in plants or part of the plants, e.g. flowering, changing colors due to ripening etc. In this case, the complementary color of the state of the plant is applied (either the previous state to see if it is still there or the expected state to see if it has been realized). For example, to verify if the color of the tomatoes have already changed from green to red, the tomatoes may be illuminated with light of the color complemental to green (i.e. reddish light (magenta)). If such illuminated tomatoes appear dark, their color is still green. Otherwise, they have already changed their color to red and may be ready for harvesting. Alternatively, the tomatoes may be illuminated with light of the color complemental to red (i.e. cyan). If the illuminated tomatoes appear dark, their color is already red. Otherwise, their color is still green.

In the following, the disclosure will be described in more detail for the example of detecting diseases, where plants show discolored spots. However, the method steps and features may as well be used for other tasks of breeding, cultivating and/or harvesting plants, such as, inter alia, the examples described above.

A discolored spot, in the following designated Discolored Spot DSi, where i is the index of the spot of the plant, comprising stem, petals, etc. (i=1 to N, wherein N is the total number of spots of the respective plant) shows, when lit with white light (e.g. a white light source with a reference light spectrum that shows a good Color Rendering Index CRI (in some embodiments/implementations higher than 90), or a standardized light source with a specific reference light spectrum) a reflection light (light remission) with a color/spectrum that is different from the reflection light of a non-discolored plant area or spot.

Specifically, any Discolored Spot DSi does not reflect light with a complementary spectrum (called: Complementary Color Spectrum CCSi) This means that e.g. a yellow spot on a leaf does not (or only minimally) reflect blue light. It is preferred that the spectral Full Width at Half Maximum (FWHM) of the complementary spectrum is rather narrow, in some embodiments/implementations in the range between 1 nm, and 50 nm.

The current (local) color of a discolored spot DSi is termed Discoloration Color DCi. A plant can have several (local) Discoloration Colors DC1, DC2 . . . DCN, one Discoloration Color DCi for each Discolored Spot (DSi).

The Complementary Color Spectrum CCSi of each of the respective Discolored Spots DSi are provided by a Complementary Light Source CLSi. A horticulture light fixture may comprise several Complementary Light Sources CLSi.

It may be preferred that the illumination system (e.g. horticulture light fixture) emits only one Complementary Color Spectrum CCSi at a given time thus making it easier for sensor systems to differentiate between various reflected light colors. However, it may also be preferred to simultaneously apply radiation (light) with two or more Complementary Color Spectra CCSi to the plants. Then a detecting camera system needs to comprise color separation filters or other means of differentiating the various Complementary Color Spectrum CCSi.

3$^{rd}$ aspect of "Discolored Spots Detection": A controlled agricultural system, according to the 1$^{st}$ or 2$^{nd}$ aspect of "Discolored Spots Detection", wherein the illumination device comprises light sources, which are able to emit light of at least three different colors, in some embodiments/implementations red, green and blue.

In a preferred embodiment, the illumination unit comprises at least three light colors, e.g. red, green and blue for the RGB color-space. Such illumination units are more and more frequently used in agricultural systems for illumination purposes, but the illumination unit to detect the discolored spots/disease may also be added as an independent light source. For example, the illumination unit may be arranged in the agricultural lighting system or a separate fixed installation, or in a moveable installation, e.g. on tracks or in automated guided vehicle (AGV) or even inside a flying drone.

4$^{th}$ aspect of "Discolored Spots Detection": A controlled agricultural system, according to any one of the 1$^{st}$ to 3$^{rd}$ aspect of "Discolored Spots Detection", wherein the sensor device comprises one or more of the following sensors: camera, CCD sensor with or without filter, photodiode.

Due to the above explained measures according to the disclosure, and because the discolored spots DSi do not reflect (or only very minimally) light with their respective Complementary Color Spectrum CCi, discolored spots are visualized as dark spots that can be recognized and measured easily by a camera or other sensor systems (Photodiode, CCD chips with filters etc.).

In other words, when a plant has discolored parts/spots due to a disease or any other cause, illuminating the plant with the complementary light increases the contrast between the discolored part and the surrounding part of the plant/stem/leave, making it easier to identify discolored parts/spots.

In some embodiments/implementations, the controlled agricultural system according to the disclosure comprises a (scientific) database with a mapping of plant diseases, diseases-typical discolorations of the plants (for every growth stage), and the respective complementary light (Complementary Color Spectrum CCSi). The database is part of a computing device.

The controlled agricultural system further comprises an illumination unit (lighting fixture), which may be based on LEDs (with or without phosphor conversion), Super-Luminescent Diodes, or lasers, and which emits light in the visible range (approx. 380 to 780 nm), and may also include violet and Far-Red radiation. The illumination unit is suited to apply the complementary light (Complementary Color Spectrum CCSi). The controlled agricultural system is configured to control the illumination unit based on the data of the database.

The controlled agricultural system further comprises a sensor system (controlled by its control unit). This may be a (still or video) camera. For each setting of complementary light, the camera takes a picture of the plants (probe picture). The computing device analyses each picture and looks for dark spots. The computing device may also store a picture taken with normal/reference illumination, e.g. white light, which shows the leaves and other parts of the plants (reference picture). The computing device then compares each probe picture with the respective reference pictures. If dark spots are detected in an area, which comprises parts of the plants, this may indicate a discoloration due to a disease.

Based on the data of the database, which may be stored on a data storage device connected to (or integrated within) the computing device, the controlled agricultural system applies to the plants complementary light through the illumination unit. For instance, red discolorations (with an RGB-code of e.g. #FF0000) will appear dark when illuminated with a cyan color (with the RGB-code of #00FFFF). Therefore, this measure according to the disclosure intensifies the contrast between the discolored part and the normal-colored part and makes it easier to detect a discolored part/spot (disease).

In a second embodiment, the controlled agricultural system applies normal (reference), non-complementary light of the discoloration to the plant in a first step and then the complementary light in a second step. This will lead to a very pronounced color difference between the first (reference) and the second (probe) picture taken with the camera, making it even easier to detect discolored parts.

In another embodiment of the disclosure, the illumination unit illuminates the plants at different wavelengths (each wavelength range is emitted consecutively, i.e. only during separate time intervals), i.e. performs a spectral scan mode for probing discolored areas, and the computing device analyses the pictures. This approach can be advantageous to detect possible diseases if the database, particularly the data for specific Complementary Color Spectra, is not available or incomplete.

In yet another embodiment, the computing device is configured to trigger measurements of discolorations in regular or irregular time intervals or even stochastically. The measurement data may be analyzed by means of deep learning algorithms. Furthermore, the results of the analysis may be represented graphically. Such procedure may be used to monitor curing of plant diseases.

5th aspect of "Discolored Spots Detection": A controlled agricultural system, according to any one of the 1st to 4th aspect of "Discolored Spots Detection", further comprising a user interface.

The computing device may also comprise a user interface, which provides feedback of the measurements to the user. Via the interface the user can also schedule measurements (once a day, once a week, during the day, at the end of the day, irregular intervals, stochastically within time intervals, etc.). The computing device then interrupts the normal illumination mode and switches the illumination to detect mode.

In the detect mode, the plants are illuminated with complementary light, either applying the lights (Complementary Color Spectra) stored in the database or providing a spectral light scan, as described above. If the detection is performed in a greenhouse, the controlled agricultural system may draw down shutters or blinds prior to starting the detection mode. For this purpose, the controlled agricultural system may further comprise an appropriate actuator.

Due to the enhanced contrast between the dark spots and the surrounding when taking pictures with complementary light, diseases can be easily detected. It is not even necessary to have a very close look at the plants, but the sensor (e.g. the camera) can be placed at some distance of a plant and cover several plants at the same time. The plants can be illuminated and sensed from above or from the side (i.e. focusing on leaves or stems).

It should be noted that the controlled agricultural system according to the disclosure that applies to the plants complementary light by means of the illumination unit can be used in a greenhouse that is with the presence of natural sun light, as well as in a completely enclosed farming environment (controlled agricultural environment). In the first case, illumination with complementary light will still increase the color difference between healthy and discolored unhealthy plant parts. Similarly, in the second case, when the regular illumination light is on (ON-Lighting-cycle) or OFF (OFF-lighting-cycle). If measurements are performed in the ON-Lighting-cycle, the regular illumination can be temporarily switched off during the measurement cycles and switched on afterwards.

Agricultural lighting fixtures may comprise artificial light sources like Light Emitting Diodes (LED) with or without conversion by using a fluorescent substance, commonly referred to as phosphor, monochromatic Laser diodes, OLED light emitting material on organic basis, Quantum Dot light emitters, Fluorescent lamps, Sodium low and high pressure lamps, Xenon and Mercury Short Arc lamps, Halogen lamps, and the like.

All of the plants arranged in an agricultural or horticultural facility and managed by means of a controlled agricultural system according to the disclosure need not be illuminated with the Complementary Color Spectra (CCSi) at the same time, but can be illuminated sequentially. For example, the light with a Complementary Color Spectrum (CCSi) may be directed onto a scanning device, like a moving MEMS-mirror, and then reflected onto the various parts of an agricultural plant environment (plant cultivating area) in a time sequential manner.

6th aspect of "Discolored Spots Detection": A controlled agricultural system, according to any one of the 1st to 5th aspect of "Discolored Spots Detection", further comprising an actuator device able to treat the plants, e.g. with water, UV-light, IR-light, nutrition, medication, fungicides, pesticides.

Furthermore, the computing device may comprise an object recognition program that determines the location of the affected plant and can then send command controls to a health sustaining system. The health sustaining system may comprise appropriate actuators, e.g. by means of automated guided vehicles (AGV), which then treat the affected plant(s) (or plant area) with e.g. UV-light, IR-light, nutrition, medication, pesticides, etc.

7th aspect of "Discolored Spots Detection": A controlled agricultural system, according to any one of the 1st to 6th aspect of "Discolored Spots Detection", wherein the colors of parts of plants comprise one or more of the following: discolored spots, particularly due to diseases, colors of flowers, colors of fruit in various stages of ripening.

Furthermore, according to "Discolored Spots Detection", a method for detecting/verifying colors or discoloration of plants, or discolored spots on plants, or discoloration of plant parts, like fruits or flowers, is proposed by providing an illumination system that illuminates the plants or parts of the plants with light with Complementary Color Spectra (CCSi) with regard to the anticipated color or discoloration of the plant, plant part or plant spot. The controlled agricultural system is configured to be able to execute the method.

8th aspect of "Discolored Spots Detection": More specifically, the method for agricultural management, comprises at least one controlled agricultural system and the steps of starting the detect mode of the controlled agricultural system, illuminating plants with complementary light by means of the illumination device, and screening/detecting the plants for dark areas, e.g. discolored spots that appear as dark spots when illuminated by the complementary light, by means of the sensor device.

9th aspect of "Discolored Spots Detection": The method for agricultural management according to the 8th aspect of "Discolored Spots Detection", further comprising the step of analyzing and identifying the cause of a detected dark area, e.g. a discolored spot, flower, fruit, etc., by means of the computing device based on data store on the data storage device.

10th aspect of "Discolored Spots Detection": The method for agricultural management according to the 8th or 9th aspect of "Discolored Spots Detection", further comprising the step of identifying the disease associated with a detected discolored spot by means of the computing device.

11th aspect of "Discolored Spots Detection": The method for agricultural management according to any one of the 8th to 10th aspect of "Discolored Spots Detection", wherein screening the plants for dark areas further comprises the step of taking pictures of the plants by means of the camera.

12th aspect of "Discolored Spots Detection": The method for agricultural management according to any one of the 8th to 11th aspect of "Discolored Spots Detection", wherein screening the plants for dark areas further comprises the step of detecting the color of the light reflected by the plants/plant parts by means of at least one photodiode or CCD chips with filters.

13th aspect of "Discolored Spots Detection": The method for agricultural management according to any one of the 8th to 12th aspect of "Discolored Spots Detection", further comprising the step of probing for a specific discoloration by illuminating the plants with the respective complementary light.

14$^{th}$ aspect of "Discolored Spots Detection": The method for agricultural management according to any one of the 8$^{th}$ to 13$^{th}$ aspect of "Discolored Spots Detection", further comprising the step of enhancing the contrast for analyzing and detecting the dark areas by illuminating the plants with normal/reference light, particularly white light, and comparing the measurement data (reference data) from the sensor device with the respective measurement data (probe data) from the illumination with complementary light.

15$^{th}$ aspect of "Discolored Spots Detection": The method for agricultural management according to any one of the 10$^{th}$ to 13$^{th}$ aspect of "Discolored Spots Detection", further comprising the step of taking countermeasures against the identified disease, e.g. treating the affected plant(s) with e.g. UV-light, nutrition, medication, fungicides, pesticides, etc., by means of the actuator device.

16$^{th}$ aspect of "Discolored Spots Detection": The method for agricultural management according to any one of the 10$^{th}$ to 13$^{th}$ aspect of "Discolored Spots Detection", further comprising the step of informing the user by means of the user interface that discolored spots have been identified and about the diagnosed disease.

Furthermore, reference is made to the description above; the features described there shall also be disclosed in terms of the method.

17$^{th}$ aspect of "Discolored Spots Detection": A machine-readable computer product, comprising a multiplicity of program instructions which, when executed on the computing device of the controllable agricultural system according to any one of the 1$^{st}$ to 7$^{th}$ aspects, cause the Controlled Agricultural System to execute the method for agricultural management according to any one of the 8$^{th}$ to 16$^{th}$ aspects of "Discolored Spots Detection".

18$^{th}$ aspect of "Discolored Spots": A method for investigating a plant grown in an agricultural system, comprising:

providing a complementary light source for emitting a first complementary light with a first complementary color spectrum, which has a first spectral gap in comparison to a white light spectrum, illuminating the plant with the first complementary light, screening the plant illuminated by the first complementary light for dark areas, which absorb the first complementary light at least partly, and/or for bright areas, which reflect the first complementary light at least partly.

19$^{th}$ aspect of "Discolored Spots": The method of the 18$^{th}$ aspect of "Discolored Spots", wherein the first spectral gap of the first complementary color spectrum lies in the green and/or yellow spectral range, the plant illuminated by the first complementary light being screened for bright areas.

Typical leaves having a green color show no absorption in the green/yellow spectral range. Consequently, they reflect green/yellow light, which is the reason for their green appearance. When illuminating the plant with spectral intensities outside the green/yellow spectral range, the focus is not on the green leaves themselves but on any discoloration of the leaves, for instance discolored spots. Those can indicate an insufficient supply or a disease of the plant. In simple words, since the green colored leave itself is not illuminated in its spectral range, any discoloration of the leaves can be detected better. Any discoloration appears brighter as the green background is reduced.

"Blue spectral range" can for instance mean a spectral range from 400 nm to 490 nm.

"Green spectral range" can for instance mean a spectral range from 490 nm to 575 nm.

"Yellow spectral range" can for instance mean a spectral range from 575 nm to 600 nm.

"Orange spectral range" can for instance mean a spectral range from 600 nm to 650 nm.

"Red spectral range" can for instance mean a spectral range from 650 nm to 800 nm.

The existence of a "spectral gap" does not necessarily mean that there is no intensity at all in the respective spectral range. The intensity shall be at least reduced, it can for instance amount to not more than 30%, 20% or 10% of a maximum intensity of the complementary color spectrum (comparing for instance the spectral irradiance). This can apply for an average intensity in the spectral range with the spectral gap and/or for a maximum intensity in the spectral range with the spectral gap. Nevertheless, it is also possible that there is no intensity at all in the spectral range with the gap.

20$^{th}$ aspect of "Discolored Spots": The method of the 19$^{th}$ aspect of "Discolored Spots", wherein leaves of the plant illuminated by the first complementary light are screened for the bright areas for detecting a plant disease or inappropriate plant treatment.

Alternatively, the screening of bright areas can also allow for a tracking of a growth stage, for instance the flowering or ripening (e.g. change from green to red color).

21$^{st}$ aspect of "Discolored Spots": The method of the 18$^{th}$ aspect of "Discolored Spots", wherein the first spectral gap of the first complementary color spectrum lies outside the green spectral range, the plant illuminated by the first complementary light being screened for dark areas.

In this case, for instance, the green leave itself will reflect the green light and appear bright, whereas a discolored area will appear dark when the spectral gap lies outside the spectral range reflected by the discoloration.

22$^{nd}$ aspect of "Discolored Spots": The method of the 21$^{st}$ aspect of "Discolored Spots", wherein the first spectral gap of the first complementary color spectrum lies in the blue spectral range.

The first complementary color spectrum can have intensities in the green and/or yellow and/or orange and/or red spectral range.

23$^{rd}$ aspect of "Discolored Spots": The method of the 22$^{nd}$ aspect of "Discolored Spots", wherein leaves of the plant illuminated by the first complementary light are screened for the dark areas for detecting a plant disease or inappropriate plant treatment causing yellow coloring of the leaves.

24$^{th}$ aspect of "Discolored Spots": The method of the 22$^{nd}$ or 23$^{rd}$ aspect of "Discolored Spots", wherein the first complementary light is green light.

The first complementary color spectrum has a spectral intensity in the green spectral range only.

25$^{th}$ aspect of "Discolored Spots": The method of any of 18$^{th}$ to 24$^{th}$ aspects of "Discolored Spots", wherein a first image of the plant illuminated by the first complementary light is captured and screened for dark and/or bright areas by digital image evaluation.

26$^{th}$ aspect of "Discolored Spots": The method of the 25$^{th}$ aspect of "Discolored Spots", wherein the number of dark areas in the first image is counted and/or the number of bright areas in the first image is counted.

Apart from a disease detection, the dark and/or bright area screening can for instance be used for evaluating the number of flowers or fruits (an approximate value), which can allow for a yield prediction (see the element "Yield Prediction" in detail).

27th aspect of "Discolored Spots": The method of any of the 18th to 26th aspects of "Discolored Spots", wherein the plant is, subsequently to the illumination with the first complementary light, illuminated by a second complementary light with a second complementary color spectrum, which has a second spectral gap in comparison to a white light spectrum, the second spectral gap lying in another spectral region than the first spectral gap.

28th aspect of "Discolored Spots": The method of any of the 18th to 26th aspects of "Discolored Spots", wherein the illumination unit illuminates the plants at different wavelengths (each wavelength range is emitted consecutively, i.e. only during separate time intervals), i.e. performs a spectral scan mode for probing discolored areas.

In other words, a spectral scan is performed, see the above remarks on the "spectral scan mode". Further, subsequently to the illumination with the first/second complementary light, the plant can be illuminated by a third complementary light with a third complementary color spectrum, which has a third spectral gap in comparison to a white light spectrum, the third spectral gap lying in another spectral region than the first and the second spectral gap.

The complementary light source can be adjustable to emit the different complementary light spectra subsequently, or a plurality of complementary light sources can be provided.

29th aspect of "Discolored Spots": The method of the 27th aspect of "Discolored Spots", wherein a first image of the plant illuminated by the first complementary light is captured and a second image of the plant illuminated by the second complementary light is captured, wherein an image comparison of the first and the second image is performed.

30th aspect of "Discolored Spots": An agricultural system for a method according to any of the 18th to 29th aspects of "Discolored Spots", the agricultural system comprising a light fixture for emitting light, a growth area for growing a plant, a sensor device, an actuator device, a computing device, wherein the sensor device comprises an image capture device for capturing an image of the plant, and wherein the computing device is configured to process the image captured by the image capture device and, based on an outcome of the image processing, to trigger the actuator device and/or to output a signal to a user interface.

The actuator device can for instance perform a pest control or crop spraying, or a targeted fertilization. It can also unload the plant to a separate treatment location, see "Horticulture Processing Line" in detail.

The agricultural system can in particular be configured to illuminate the plant with the first complementary light. The image of the plant is captured when the plant is illuminated by the first complementary light.

31st aspect of "Discolored Spots": The agricultural system of the 29th aspect of "Discolored Spots", wherein the computing device is configured to screen the image captured by the image capture device for dark areas and/or for bright areas.

32nd aspect of "Discolored Spots": The agricultural system of the 29th or 31st aspect of "Discolored Spots", wherein the computing device is configured to access a database, which comprises data on plant diseases and disease-related discolorations, wherein the image processing comprises a matching with the data comprised in the database.

33rd aspect of "Discolored Spots": The agricultural system of any of the 29th to 32nd aspects of "Discolored Spots", wherein the complementary light source for emitting the first complementary light is comprised in the light fixture, the computing device being configured to switch between an investigation mode, in which the complementary light source emits the first complementary light, and an agricultural lighting mode, in which the complementary light source is switched off and another light source of the light fixture emits light to assist a growth of the plant.

The light emitted by the other light source can for instance be defined in a light recipe.

34rd aspect of "Discolored Spots": The agricultural system of any of the complementary light source, wherein the light guide is provided for guiding the first complementary light to the plant.

The light guide can for instance be a fiber optic cable, see the element "Light Guides" in detail.

"Disease & Pest Control"

According to the element "Disease & Pest Control" of the disclosure, diseases and pests are identified based on collecting data about the plants and, optionally, about the ambient conditions in the target area as well. Then, a probability for the presence of a disease or the occurrence of pests is determined by comparing the collected data with reference data. Depending on the probability, and if need be, appropriate measures are proposed or introduced automatically.

1st aspect of "Disease & Pest Control": More specifically, the controlled agricultural system, comprises a sensor device for acquiring data in a target area, a computing device connected to the sensor device, a data storage device connected to the computing device, wherein the computing device is configured to compare the data of the sensor device with the data stored in the data storage device and detect deviations between the two sets of data, a control unit connected to the computing device, wherein the computing device is configured to output control commands to the control unit depending on the detected deviations, a light fixture connected to the control unit, wherein the control unit is configured to convert the control commands of the computing device into control signals for the light fixture.

The controlled agricultural system is configured to allow the identification of changes to plants that may be caused by diseases or pests, the identification of these diseases or infestation by pests and the introduction of measures, in particular countermeasures, which contain light recipes, in particular UV-A and UV-B radiation, but also radiation in the blue and yellow spectral range. This is because it is known that certain light recipes are harmful to pests, such as lice, arachnids, acari, and bacterial pathogens. To this end, the controlled agricultural system may comprise at least one light fixture (agricultural light fixture) with corresponding light sources. Furthermore, the countermeasures may contain light recipes, which reduce the plant stress (biotic stress). For reducing biotic stress, illumination parameters may be adapted, for example, the illumination duration and/or the illuminance may be changed, e.g. reduced, and/or the light spectrum of the illumination may be changed.

2nd aspect of "Disease & Pest Control": A controlled agricultural system, comprising a sensor device for acquiring data in a target area, a computing device connected to the sensor device, a data storage device connected to the computing device, wherein the computing device is configured to compare the data of the sensor device with the data stored in the data storage device and detect deviations between the two sets of data, an actuator device connected to the control unit, wherein the control unit is configured to convert the control commands of the computing device into control signals for the actuator device.

By way of example, measures may also comprise a change in the room temperature, the humidity, ventilation, the addition of nutrients, fertilizer, pesticides, pheromones, and the addition of medicine such as systemically acting pesticides to the nutrients. Further measures may contain a geometric modification of the light fixture position, the light fixture configuration and the light fixture emission characteristic. To this end, the controlled agricultural system may comprise corresponding actuators, which carry out these measures.

A further measure in the case of an infestation by pests may include traps being illuminated in such a way that insects are attracted thereby, said insects leaving the plants and being locked in the traps or adhering thereto (sticky traps). This can be assisted by pheromones, etc. Likewise, it is possible to attract predators for the pests, such as mesostigmata, which attack spider mites. To this end, the plants can be illuminated with light in the UV range (250-380 nm) and/or in the blue-green range (500-550 nm).

3$^{rd}$ aspect of "Disease & Pest Control": The controlled agricultural system according to the 1$^{st}$ and 2$^{nd}$ aspect of "Disease & Pest Control".

Furthermore, it may be advantageous to combine the controlled agricultural system according to the 1$^{st}$ aspect of "Disease & Pest Control" with the controlled agricultural system according to the 2$^{nd}$ aspect of "Disease & Pest Control".

4$^{th}$ aspect of "Disease & Pest Control": The controlled agricultural system according to any one of the 1$^{st}$ to 3$^{rd}$ aspect of "Disease & Pest Control", wherein the sensor device is designed to acquire data of plants growing in the target area and/or data in relation to the ambient conditions in the target area.

Therefore, the controlled agricultural system is equipped with sensors, for example optical sensors, which identify the growth of the plants, the reflectivity of the leaves or the stress of the plants, for example. The growth of the plants may be detected by the density of the leaves, plant morphology, and leaf area index.

However, sensors may also identify the fluorescence radiation emitted by plants (after irradiation with excitation radiation). Chlorophyll fluorescence may be a particularly suitable option since the photosystem or the respiration changes in the case of disease or environmental conditions. Sensors may also measure a change in color of the plant (see e.g. the element "Discolored Spots Detection"), in particular of the leaves. Sensors may also determine gases released by plants or determine the concentration of said gases in the ground.

Sensors may also identify the pests directly or typical damage to the plants, which indicates infestation by pests (stunted growth, deformations or other malformations). Here, use can be made of optical sensors such as cameras with image recognition, LiDAR systems for acquiring the plant morphology (see e.g. the element "LiDAR Plant Surveillance"), spectroscopic measurement appliances, which analyze spectral properties of the irradiation light, reflected from the infested plants, but also acoustic sensors which register characteristic noises from the pests.

Deviations that indicate a disease or negative change in the plant health or an infestation by pests are determined by the comparison with a characteristic growth behavior or characteristic physical or chemical properties. As already explained above, the type of disease or pest infestation can be determined by exact analysis of the leaf colors or plant forms, for example.

The comparison data are stored in a database and can be evaluated by an evaluation unit, in particular also in statistical fashion. The comparison with an intended value can be implemented by direct parameter comparison; however, artificial intelligence methods (such as deep learning) can also be used for the comparison of statistical evaluation. A parameter comparison can include an analysis and comparison of the plant morphology and a prediction, derived therefrom, for the further growth or the morphological embodiment of the plants. From the comparison of the measured data with the characteristic values (intended values), the system establishes a probability for the occurrence of the disease or the infestation by pests. Furthermore, such an evaluation unit can be provided to create predictions of a possible outbreak of disease and thereupon output a corresponding warning to the operator and/or customer of an agricultural system controlled in this fashion.

If the probability lies above a first threshold, then there probably is an affliction by disease or pests. The system informs the operator or planter, for example, about the discovery of the possible disease or infestation by pests and proposes a further analysis in order to determine the disease or the infestation by pests more accurately.

If the probability lies above a second threshold, the system can propose a specific countermeasure for the disease or the infestation by pests or (in a further embodiment) autonomously carry out the countermeasures described above in exemplary fashion.

In order to carry out the comparison of the sensor data with the comparison data (intended data), the controlled agricultural system comprises a computing device. Here, the sensor data and the comparison data are supplied to the computing device. Depending on the result of the comparison, the computing device, via a control unit, actuates the light sources in the respective light fixture or, optionally, the actuators as well.

Part of the controlled agricultural system, for example the computing device or the data storage device, may be local, but it may also be network-based or cloud-based.

Furthermore, according to the aspect "Disease & Pest Control", a method for identifying and reacting to diseases and pests is proposed.

5$^{th}$ aspect of "Disease & Pest Control": More specifically, the method for agricultural management, according to "Disease & Pest Control", comprises the steps of monitoring the plants in a target area by collecting data about the plants and/or the ambient conditions in the target area, comparing the collected data to corresponding intended data, determining whether deviations have occurred during the comparison, determining the probability for the occurrence of a disease or pest infestation on account of the determined deviations and if the probability lies under a first threshold then no further measures are introduced, if the probability lies between a first threshold and a second threshold then an information item that a disease or a pest infestation may be present is output and/or further analyses proposed, if the probability lies over a second threshold then countermeasures are propose or, alternatively, countermeasures are independently introduced.

The probability for the occurrence of a disease or pest infestation may be determined as follows. First, the difference values of the relevant parameters that deviate from the respective intended parameter values are calculated, i.e. in each case the absolute value of the measured value minus the intended value of a parameter. Relevant parameters in this context are parameters that indicate or influence the growth and/or health status of the plants, for example, the color of the plants, temperature and humidity of the environment, etc. Then each difference value is multiplied with a respective weighting factor, and the products are, finally, accumulated. The resulting sum is a measure of the probability. The respective weighting factors depend, amongst others, on the number of measured parameters. For instance, the partial probabilities have to be normalized to result in a total sum of the value 1 if the plants are actually infected by a specific disease. Furthermore, a weighting factor may be the smaller the less relevant the respective parameter is for determining a disease. Furthermore, the weighting factors may be modified with the help of learning algorithm (AI, deep learning) based on empirical data to improve the reliability of the detection of a disease or infection with pest.

$6^{th}$ aspect of "Disease & Pest Control": The method for agricultural management according to the $5^{th}$ aspect of "Disease & Pest Control" carried out using a controlled agricultural system according to any one of the $1^{st}$ to $4^{th}$ aspect of "Disease & Pest Control".

$7^{th}$ aspect of "Disease & Pest Control": A machine-readable computer product, comprising a multiplicity of program instructions which, when executed on the computing device of the controllable agricultural system according to any one of the $1^{st}$ to $4^{th}$ aspect of "Disease & Pest Control", cause the Controlled Agricultural System to execute the method for detecting and reacting to diseases or pests of plants according to the $6^{th}$ aspect of "Disease & Pest Control".

"Yield Prediction"

According to the element "Yield Prediction" of the disclosure, an automated yield forecast for flowering plants like tomatoes or strawberries is proposed. To this end, a controlled agricultural system is configured to be able to predict the yield of flowering plants growing in a target area (cultivated area).

$1^{st}$ aspect of "Yield Prediction": A controlled agricultural system, comprising a sensor device, comprising sensors able to detect flowers and/or buds of plants, a data storage device, wherein conversion rates of flower to fruit of plants are stored, a computing device, configured to identify and count the flowers/buds from the data of the sensor device, and further configured to predict the yield based on the number of the flowers/buds and the respective conversion rate retrieved from the data storage device.

$2^{nd}$ aspect of "Yield Prediction": Alternatively, a controlled agricultural system, comprises a sensor device, comprising sensors able to measure the biomass of plants, and further comprising sensors able to measure environmental parameters like light intensity, light spectrum, temperature, air movement, humidity, chemical composition of soil, air, fluids, a computing device, configured to predict the yield based on the biomass of the plants and current and/or future environmental data measured by means of the sensor device.

According to the alternative approach, the actual biomass is measured and current and/or future environmental data (temperature, humidity, light intensity, light spectrum . . . ) are in some embodiments/implementations included to estimate the yield. Biomass in this context refers to the mass of the plants, e.g. deduced from the number of plants and their size, i.e. the size of their stems and/or leaves.

$3^{rd}$ aspect of "Yield Prediction": The controlled agricultural system according to the $1^{st}$ or $2^{nd}$ aspect of "Yield Prediction", further comprising a user interface configured to deliver the result of the prediction.

$4^{th}$ aspect of "Yield Prediction": The controlled agricultural system according to any one of the $1^{st}$ to $3^{rd}$ aspect of "Yield Prediction", wherein the sensor device comprises one or more of the following sensors or a combination thereof: imaging system, e.g. still or video camera, in some embodiments/implementations TOF camera or stereo camera, LIDAR system, color sensor.

The controlled agricultural system comprises at least one sensor, which is able to detect the flowers (or buds) at a plant or to measure the biomass of the plants in the target area. For instance, the at least one sensor may comprise a camera and an image recognition system (object recognition and classification) to detect flowers (or buds) at a plant.

Furthermore, the controlled agricultural system comprises a computing device configured to identify the flowers (or buds) from the data measured by the at least one sensor. The computing device may host the image recognition system. It may use machine learning/deep learning algorithms to detect flowers. Alternatively or in combination, it may also detect the flowers directly based on the color of the flower (e.g. yellow for tomatoes) and/or the typical size derived from the picture, either as an absolute value or relative to the size of other parts of the plant (e.g. leaves).

$5^{th}$ aspect of "Yield Prediction": The controlled agricultural system according to any one of the $1^{st}$ to $4^{th}$ aspect of "Yield Prediction", wherein the sensor device further comprises sensors able to measure the current status of growth/ripening of the plants/fruits.

$6^{th}$ aspect of "Yield Prediction": The controlled agricultural system according to the $5^{th}$ aspect of "Yield Prediction", wherein typical time schedules of ripening of the fruits are stored in the data storage device, and wherein the computing device is configured to calculate a prediction for the harvesting time of the fruits based on the currently detected status of growth/ripening of the plants/fruits and the typical time left until ripeness of the fruits according to the time schedules.

To cover an extended cultivated area, multiple sensors, e.g. cameras, may be distributed within the area. For instance, the sensors/cameras may be attached fixedly in the greenhouse or at posts in the field. Some or all of the sensors (cameras) may be attached movably at a drone or robot and move through the greenhouse or the field, in some embodiments/implementations autonomously.

The number of flowers or buds per plants may be assessed individually for each plant in the cultivated area of the field or the greenhouse to obtain the overall number of flowers or buds in the cultivated area. If the number of plants is too large, a statistical approach can be chosen, i.e. limiting the measurements to a representative selection of plants (sub group). For instance, only every nth plant is measured, plants in a certain distance from the next plant are measured or plants in areas of the field that are known to be representative for the whole field (cultivated area) are measured. The number of flowers for the whole field (cultivated area) is then extrapolated from the measured number of flowers of this subgroup of plants.

Furthermore, according to "Yield Prediction", a method for predicting the yield is proposed.

$7^{th}$ aspect of "Yield Prediction": More specifically, a method for agricultural management, comprises at least one controlled agricultural system and the steps of detecting the flowers or buds of the plants by means of the sensor device and the computing device assessing the number of flowers/ buds by means of the computing device and based on the data measured by the sensor device predicting the yield by retrieving the respective conversion rate of the plant species from the data storage device and weighing the number of flowers assessed in the previous step with the conversion rate by means of the computing device.

8th aspect of "Yield Prediction": Alternatively, a method for agricultural management, comprises at least one controlled agricultural system and the steps of measuring the biomass of the plants by means of the sensor device and the computing device, measuring environmental parameters by means of the sensor device and the computing device, predicting the yield based on the biomass and the environmental data by means of the computing device.

For predicting the yield, the method for agricultural management, according to the aspect "Yield Prediction", uses a typical conversion rate from flowers to fruits available for each plant species in a database, which is stored in a data storage device of the computing device. The conversion rate is the rate at which flowers result in fruits. For instance, a conversion rate of 0.5 means that only half of the flowers eventually result in fruits (e.g. 10 flowers would result in 5 fruits). The typical conversion rate may be the average value of conversion rates observed in the past. The conversion rate may depend on additional parameters like the temperature, humidity, etc., which may be measured as well, in order to improve the accuracy of the prediction. For example, the pollination performance of the bumble-bees is different, depending on the species, temperature, air movement, day length, humidity, etc. It also depends on the amount of bumble-bees the grower is using. All these parameters have to be considered to derive a correct yield prediction. The calculated conversion rate can also take into consideration future changes in parameters like temperature, humidity or illumination. The parameters may be checked regularly. In case deviations are observed, the conversion rate and with it the predicted yield may be updated.

9th aspect of "Yield Prediction": The method for agricultural management according to 8th aspect of "Yield Prediction", further comprising the step of delivering the result of the prediction to the user (e.g. farmer or customer) by means of the user interface.

Using the typical conversion rate and the measured or extrapolated number for flowers in the cultivated area, the expected number of fruits is calculated by the computing device, taking into consideration that not all fruits will "survive" until harvesting, as they may drop, for example, due to low water, bad nutrition or something else. Using the average weight of the fruits, the expected total yield can be calculated, e.g. in kilograms.

10th aspect of "Yield Prediction": The method for agricultural management according to any one of the 7th to 9th aspect of "Yield Prediction", further comprising the steps of detecting the current state of ripening of the plants/fruits by means of the sensor device and the computing device, predicting the harvesting time by retrieving the time schedule of ripening from the data storage device, comparing it with the current state of the ripening and calculating the typical time left until ripeness of the fruits, according to the time schedules and by means of the computing device, and/or predicting the next stage of ripening by retrieving the time schedule of ripening from the data storage device, comparing it with the current state of the ripening and calculating the typical time left for the next state of ripening, according to the time schedules and by means of the computing device.

Furthermore, the harvesting time may be forecasted as well. For this purpose, the system recognizes the state of the ripeness, e.g. the development of the flowers, the withering of the flowers, the creation of the fruits, and the different state of its ripeness. It can predict the expected harvesting time for each fruit based on average times stored in a database.

The prediction does not only include the final harvesting time but also the time when the next stage in the ripening process will be accomplished. The predicted time is compared regularly with the actual time. The forecast will be adjusted accordingly in case there should be a difference between actual and predicted time (e.g. a faster or slower ripening). In this case, the average ripening time stored in the database will be updated. The average ripening time for each stage (time schedule of ripening) is in some embodiments/implementations stored with corresponding environmental data like humidity, nutrition, illumination, temperature, and others.

The computing device may then present the calculated result (prediction) to a third party like the customer or farmer. The result may comprise a set of data, including the forecasted yield and, optionally, harvesting time, images (shot by still or video camera) or other graphical representation such as virtual or augmented reality of the plants.

11th aspect of "Yield Prediction": A computer program product, comprising a plurality of program instructions, which when executed by a computer system of an Controlled Agricultural System according to any one of the 1st to 6th aspect of "Yield Prediction", cause the Controlled Agricultural System to execute the method for Agricultural Management according to any one of the 7th to 10th aspect of Yield Prediction".

"Fungi Growth Inhibition"

According to the element "Fungi Growth Inhibition" of the disclosure, a controlled agricultural system with a light fixture is proposed that is configured to be able to illuminate plants during the nighttime to inhibit growth of fungi.

1st aspect of "Fungi Growth Inhibition": A Controlled Agricultural System for growing plants, comprising a lighting fixture for providing agricultural lighting, a fungi prevention light source for emitting light with a wavelength in a spectral range between 380 nm and 800 nm, wherein the Agricultural System is configured for applying the agricultural lighting to the plants during a day phase; and illuminating the plants with the fungi prevention light source at least temporarily during a night phase.

In addition to a lighting fixture for agricultural lighting, the agricultural system comprises a fungi prevention light source for emitting light with a wavelength in a spectral range between 380 nm and 800 nm. During a day phase, the agricultural lighting is applied to the plants. During a night phase, which usually is a dark period without any lighting at all, the plants are illuminated at least temporarily with the fungi prevention light source. In general, the duration of the additional illumination may vary from 1 minute to several hours, for instance 8 hours.

Illuminating the plants during the night phase can inhibit or prevent the growth of pathogenic fungi that would cause plant diseases. For the purpose of illustration, reference is made to downy mildew below, even though the disclosure is not restricted to it. Downy mildew is one of the most occurring diseases in basil and can lead to huge losses in production up to a total loss of the crop.

By illuminating the plants during the night phase, the germination or sporulation of a fungi spore can be prevented or growth can be suppressed. Also sporulation can be slowed down, depending on temperature and light conditions. The fungi growth or germination/sporulation is affected by illumination, which means that a certain dark period duration is usually required to trigger the germination/sporulation of the spores. In simple words, it germinates and sporulates generally during the night. With the fungi prevention light source, the night or night phase is interrupted, preventing the germination. In other words, day conditions are simulated for the fungus during the night phase.

2nd aspect of "Fungi Growth Inhibition": The Controlled Agricultural System according to the 1st aspect of "Fungi Growth Inhibition", wherein the wavelength of the light of the fungi prevention light source lies in a spectral range between 400 nm and 700 nm, in some embodiments/implementations between 600 nm and 700 nm.

On the other hand, the plants themselves require a certain dormant period, namely a night phase without agricultural lighting. Therefore, it is not beneficial, or can be even outright detrimental to illuminate the plants for 24 hours with the standard agricultural lighting. In some embodiments/implementations, the fungi prevention lighting has a reduced intensity and/or reduced spectral range. In a preferred embodiment, the wavelength of the fungi prevention light is at least 400 nm, particularly preferred at least 600 nm. An advantageous upper limit can for instance be 700 nm. Using red light is presumably advantageous in view the absorption behavior of the fungi.

Depending on the plants and fungi in detail, another advantage using red light can be a certain penetration through the leaves of the plants. In simple words, even by illuminating the plants from above, a certain treatment of the lower sides of the leaves as well as leaves at a lower position can be possible. In general, the fungi prevention lighting can be applied from any direction, from above, from the side, and/or from below. The light can be brought to any location of the plants by using for instance a light guide or optical fiber (see also "Light Guides").

With this disclosure, the use of fungicides can be drastically reduced. In some countries, this option is even not available, as certain fungicides are not permitted for use. Treating fungus diseases with light furthermore allows to grow plants organically and reduces crop loss. The concept of using a night interrupting light treatment can be used for any plants, in particular for fungi infecting herbs, medical plants or ornamental plants.

3rd aspect of "Fungi Growth Inhibition": The Controlled Agricultural System according to the 1st or 2nd aspect of "Fungi Growth Inhibition", configured for illuminating the plants with the fungi prevention light source temporarily during the night phase, namely during at least one interval.

In a preferred embodiment, the plants are only illuminated temporarily during the night phase, namely during at least one interval. This can reduce a negative impact or influence on the plants themselves, which require the dormant period. The additional illumination may be provided once during the night (e.g. in the middle of the night) or at regular intervals (e.g. every hour) or randomly during the night. In some embodiments/implementations, the fungi prevention illumination is applied during a plurality of intervals during the night phase. Therein, the duration of the intervals themselves and/or the Off-time between the intervals can be constant or can vary. Any variation can be distributed regularly or randomly. Constant intervals are possible as well, the fungi prevention illumination might for instance be applied every 2 hours for one hour during night time.

4th aspect of "Fungi Growth Inhibition": The Controlled Agricultural System according to the 3rd aspect of "Fungi Growth Inhibition", configured for illuminating the plants with the fungi prevention light source in a plurality of intervals during the night phase.

5th aspect of "Fungi Growth Inhibition": The Controlled Agricultural System according to the 4th aspect of "Fungi Growth Inhibition", wherein an intensity of the illumination with the fungi prevention light source is varied, a different intensity being applied in different intervals.

In some embodiments/implementations, the fungi prevention light source is dimmable, for instance in the range of 3-100 μmol/($m^2$s). Likewise, the intensity of the fungi prevention illumination can be varied, so that a different intensity is applied in different intervals. A different intensity can be applied for each interval, or the intensity can vary in groups. Further, the intensity can also vary within an interval. In particular, the intensity may be higher in the intervals at the beginning of the night phase than at the end of the night phase, or it may be higher at the end of the night phase than at the beginning of the night phase. The maximum intensity may also be reached in the middle of the night phase.

6th aspect of "Fungi Growth Inhibition": The Controlled Agricultural System according to any one of the 1st to the 5th aspect of "Fungi Growth Inhibition", configured for applying a dark period with no illumination at the beginning of the night phase.

7th aspect of "Fungi Growth Inhibition": The Controlled Agricultural System according to any one of the 1st to the 6th aspect of "Fungi Growth Inhibition", wherein the duration of the dark period is at least 1 hour and not more than 4 hours.

8th aspect of "Fungi Growth Inhibition": The Controlled Agricultural System according to any one of the 1st to the 7th aspect of "Fungi Growth Inhibition", wherein the duration of the night phase is at least 2 hours and not more than 10 hours.

In a preferred embodiment, a dark period with no illumination is applied at the beginning of the night phase. In some embodiments/implementations, the duration of the first dark period is at least 1 hour and not more than 6 hours. In some embodiments/implementations, the duration of the night phase itself is at least 2 hours, further preferred at least 4 hours. Possible upper limits are 10 hours, in some embodiments/implementations 8 hours at maximum. Together, the day and the night phase add up to 24 hours.

9th aspect of "Fungi Growth Inhibition": The Controlled Agricultural System according to any one of the 1st to the 8th aspect of "Fungi Growth Inhibition", wherein a total illumination time with the fungi prevention light source (200) during the night phase is not more than ⅔ of the duration of the night phase.

In a preferred embodiment, a total fungi prevention illumination time amounts to not more than ⅔ of the duration of the night phase. Possible lower limits can for instance be at least 1/100, 1/50, or 1/10 of the duration of the night phase. In case of an illumination in intervals, the total illumination time is obtained by summing up the duration of the intervals.

10th aspect of "Fungi Growth Inhibition": The Controlled Agricultural System according to any one of the 1st to the 9th aspect of "Fungi Growth Inhibition", comprising a sensor device, the Controlled Agricultural System being configured for illuminating the plants with the fungi prevention light source depending on a measurement with the sensor device.

In a preferred embodiment, the fungi prevention illumination is applied based on a measurement performed with a sensor device. Infested plants can for instance be detected using a sensor like a camera or the like, for instance in combination with a picture recognition.

11th aspect of "Fungi Growth Inhibition": The Controlled Agricultural System according to any one of the 1st to the 10th aspect of "Fungi Growth Inhibition", comprising an additional fungi prevention UV light source for emitting UV light, wherein the Controlled Agricultural System is configured for illuminating the plants with the fungi prevention UV light source at least temporarily during the night phase.

In a preferred embodiment, an additional fungi prevention UV light source is provided. In some embodiments/implementations, the plants are illuminated with UV light at least temporarily during the night phase. The UV light can for instance be UV-A light (380-315 nm), UV-B light (280-315 nm) and/or UV-C light (200-280 nm).

12$^{th}$ aspect of "Fungi Growth Inhibition": The Controlled Agricultural System according to the 11$^{th}$ aspect of "Fungi Growth Inhibition", and in combination with the 4$^{th}$ or 5$^{th}$ aspect of "Fungi Growth Inhibition", wherein the plants are not illuminated by the fungi prevention UV light source in-between the intervals during the night phase.

13$^{th}$ aspect of "Fungi Growth Inhibition": The Controlled Agricultural System according to the 11$^{th}$ or 12$^{th}$ aspect of "Fungi Growth Inhibition", wherein the plants are not illuminated by the fungi prevention UV light source in at least one of the intervals.

In some embodiments/implementations, the plants are not illuminated with the UV light source between two intervals, in which the fungi prevention illumination is applied (e.g. red light). Particularly preferred, no illumination at all is applied between the intervals of the fungi prevention/UV illumination.

The fungi prevention illumination (in particular red light) during the night phase has the goal to disturb the growth cycle of the fungus, preventing it from growing and spreading. The additional UV illumination may even destroy already existing fungi.

If several illumination intervals are planned during the night phase, at least one of them might also include UV only. The fungi prevention time which uses UV-C-light may have a duration of 15 seconds to 1 minutes, whereas illumination with UV-A-light may last from 5 minutes to 5 hours to inactivate spores. UV-light could also be applied simultaneously with the red light. In some embodiments/implementations, the total duration of the fungi prevention illumination is longer than the duration of the UV illumination.

In some embodiments/implementations, the fungi prevention light source and/or the additional UV light source are integrated into the lighting fixture for the agricultural lighting. In general, the light source(s) can be controlled by a control unit, which controls for instance the intensity, the illumination duration of the light, and the dark periods between the illuminations. The intensities and durations can be controlled independently for the fungi prevention and the UV light source.

14$^{th}$ aspect of "Fungi Growth Inhibition": The Controlled Agricultural System according to any one of the 1$^{st}$ or 13$^{th}$ aspect of "Fungi Growth Inhibition", configured for varying an additional environmental parameter during the night phase, in some embodiments/implementations at least one of temperature and humidity.

In a preferred embodiment, an additional environmental parameter is varied during the night phase, in some embodiments/implementations temperature and/or humidity. The risk of infestation of the plants by fungi is usually reduced by reducing the population density, using a dry cultivation (i.e. irrigation from below and possibly in the morning or only a few larger water sprayings), introducing a time interval to a subsequent crop cycle, preventing dew formation in the greenhouse (emergency dry heating, use of fans), using hygienic measures, or supplying balanced nutrients (e.g. avoiding nitrogen stress). If the fungus has infested the plants, the infested plants are usually removed immediately or treated with fungicides (if available).

15$^{th}$ aspect of "Fungi Growth Inhibition": A Method for Controlling an Agricultural System according to any one of the 1$^{st}$ to 14$^{th}$ aspect of "Fungi Growth Inhibition", comprising the steps of applying agricultural lighting to the plants during a day phase; and illuminating the plants with the fungi prevention light source (200) at least temporarily during a night phase.

Regarding further possible embodiments, reference is made to the description above and also to the aspect relating to the system of "Fungi Growth Inhibition".

It is also possible to adjust the nightly irradiation composition (spectrum (blue, red, green, UV, IR), intensity) and cycles (can be different for different light spectral/colors) for plants into which a symbiotic fungus has been implanted (e.g. to produce chanoclavine in the plant).

16$^{th}$ aspect of "Fungi Growth Inhibition": Computer program product, comprising a plurality of program instructions, which when executed by a computing device of a Controlled Agricultural System according to any one of the 1$^{st}$ to 14$^{th}$ aspect of "Fungi Growth Inhibition", cause the Controlled Agricultural System to execute the Method for Controlling a Controlled Agricultural System according to the 15$^{th}$ aspect of "Fungi Growth Inhibition".

The light treatment will be triggered by a control unit. The command for the control unit can be given by a computing device which either receives the command from the grower, or which triggers the treatment automatically based on the detection of the fungi by a sensor device. However, the treatment can also be initiated prophylactically to avoid the growth of fungi on the plants (e.g. every night, once a week or once a month). The respective illumination durations, dark periods and illumination intensities are stored in a database connected to or integrated into the computing device. The treatment method described here might be part of the overall control program of the light source.

"Sensor Retrofit"

According to the element "Sensor Retrofit" of the disclosure, a moveable irrigation device is equipped with a sensor device for measuring plant parameters, particularly parameters indicating health and growth stage of the plants.

1$^{st}$ aspect of "Sensor Retrofit": An Agricultural System, comprising a growth area for growing plants, an irrigation device for irrigating plants grown on the growth area and a sensor device, wherein the irrigation device is mounted moveable with respect to the growth area, and wherein the sensor device is mounted at the irrigation device and moveable with respect to the growth area, thus.

The Agricultural System according to "Sensor Retrofit" comprises an irrigation device moveable with respect to a growth area (or cultivated area) and a sensor device mounted at the irrigation device. When the irrigation device is moved over the growth area for irrigating the plants grown there, the sensor device is moved along with the irrigation device. Therefore, plants grown at different locations or regions of the growth area can be measured with the same sensor device.

Furthermore, most Agricultural Systems are equipped with an irrigation device anyway. Thus, the movement unit, which moves the nozzles over the growth area, is available already. The sensor device can be attached or retrofitted to this existing setup, which can be advantageous from an economical point of view as well. The "irrigation device" may not only be used for watering purposes but also for a treatment with fertilizers/pesticides or the like.

2$^{nd}$ aspect of "Sensor Retrofit": The Agricultural System according to the 1$^{st}$ aspect of "Sensor Retrofit", wherein the sensor device is an optical sensor, in particular a camera.

Many greenhouse growers are using an automated trolley as irrigation device. The trolley usually includes a bar or rail or arrangement of levers, which contains nozzles for irrigation or spraying of fertilizers/pesticides. The sensor device can for instance be a camera mounted to such a trolley, taking pictures of the plant surface while the trolley is turning back and forth over growth area, or other optical devices like a LiDAR (light detection and ranging) Time-of-Flight measuring and sensor device (see also "LiDAR Plant Surveillance", below). These pictures can help the grower to find regularities and irregularities in the plant population (growth, morphology, fruition, health condition). The irrigation device can also be an irrigation robot, which can be used indoors or outside in open fields or vineyards, or a vehicle driving autonomously.

$3^{rd}$ aspect of "Sensor Retrofit": The Agricultural System according to the $1^{st}$ or $2^{nd}$ aspect of "Sensor Retrofit", which is an indoor farm, the irrigation device being mounted below a ceiling above the growth area.

Plant growth can be influenced by several parameters like light intensity (photon flux), light spectrum, nutrients or temperature. Especially when experimenting with new settings of those parameters, a fast feedback about the plant growth, i.e. the morphological parameters, is necessary. Plant growth can mean the height of the plant, the size and number and orientation of the leaves, the diameter of the plant, the plant morphology, etc.

However, even when the parameters to grow plants in an agriculture system are set, a regular control if the plants are growing as expected is necessary, as undetected changes in the parameters, diseases or pests can affect the plant growth. It would also be beneficial to track plant growth data or growth indicators continuously, by day and night, and correlate the data to other external parameters like temperature, nutrients, photon flux, applied spectra, illumination ON and OFF cycles, etc.

$4^{th}$ aspect of "Sensor Retrofit": The Agricultural System according to any one of the $1^{st}$ to $3^{rd}$ aspect of "Sensor Retrofit", wherein the irrigation device comprises a horizontal rail with a plurality of nozzles provided along the rail.

Usually, an irrigation device or trolley is made of metal profiles, in particular aluminum profiles. In a preferred embodiment of an in-house farm, the irrigation device is mounted below a ceiling above the growth area. It can for instance hang on a rod from the roof top. The sensor can be mounted to the irrigation device with clips or clamps (by a form-fit or with screws or the like). In some embodiments/implementations, the irrigation device comprises a horizontal rail with a plurality of nozzles provided along the rail.

In a preferred embodiment, the sensor device is an optical sensor, in particular a camera. In general, other sensors are possible, for example temperature sensors (creating for instance a heat map) or ultrasound or LiDAR sensors to measure distances.

$5^{th}$ aspect of "Sensor Retrofit": The Agricultural System according to any one of the $1^{st}$ to $4^{th}$ aspect of "Sensor Retrofit", comprising a plurality of sensor devices mounted removably to the irrigation device.

$6^{th}$ aspect of "Sensor Retrofit": The Agricultural System according to the $5^{th}$ aspect of "Sensor Retrofit", wherein a distance between neighboring sensor devices amounts to 0.1 m at minimum and 1 m at maximum.

In a preferred embodiment, a plurality of sensor devices are mounted at the irrigation device. A distance between neighboring sensor along the trolley bar devices can for instance be at least 0.1 m and in some embodiments/implementations not more than 1 m. In detail, the spacing between the sensor devices or cameras will for instance depend on the mounting height and the angle of the lens of the camera.

$7^{th}$ aspect of "Sensor Retrofit": The Agricultural System according to the $5^{th}$ or $6^{th}$ aspect of "Sensor Retrofit", wherein at least one sensor device differs from another sensor device in the parameter measured respectively.

$8^{th}$ aspect of "Sensor Retrofit": The Agricultural System according to the $7^{th}$ aspect of "Sensor Retrofit", wherein the sensor devices, which differ in the parameter measured, are cameras with a different spectral sensitivity.

In some embodiments/implementations, at least some of the sensor devices differ in the parameter measured respectively, for instance cameras in their spectral sensitivity. The cameras can be equipped with same or different lens systems in order to cover various field-of-view settings and therefore different sensed or surveilled plant areas. The lens systems can be adjustable, in some embodiments/implementations by remote control. The cameras can be equipped for daylight picture taking and/or for nighttime picture taking using infrared-sensitive sensors. They can also be equipped with an UV-protective cover that is transparent for visual and/or infrared radiation. The cameras can also be equipped with cleaning devices or with removable optically transparent protective covers that can be cleaned, refurbished and so on.

In general, simple RGB cameras can be provided to create a general overview of the entire plant canopy. However, also multispectral or hyperspectral cameras can be used to measure e.g. the chlorophyll fluorescence or the fertilization status. With each passing of the irrigation device, pictures can be taken in different wavelength ranges, e.g. in the IR, visible range (whole spectrum or monochromatic) or UV. It is also possible that neighboring cameras take pictures at different wavelengths during one passing, e.g. the 1st, 4th, 7th, . . . camera takes pictures in the visible range, the 2nd, 5th, 8th, . . . camera takes pictures in the IR and the 3rd, 6th, 9th, . . . camera takes pictures at a certain wavelength (monochromatic). Pictures can be taken at regular time intervals or as a function of trolley speed that can for example be in the range between 5 and 25 km/h. Of course, a camera can also take videos for continuous surveillance and plant tracking.

$9^{th}$ aspect of "Sensor Retrofit": The Agricultural System according to any one of the $5^{th}$ to $8^{th}$ aspect of "Sensor Retrofit", wherein the sensor devices are provided along a rail.

$10^{th}$ aspect of "Sensor Retrofit": The Agricultural System according to any one of the $4^{th}$ to $9^{th}$ aspect of "Sensor Retrofit", wherein the rail with the sensor devices is mounted at the horizontal rail with the nozzles, the rails extending basically in parallel to each other.

In a preferred embodiment, the sensor devices are provided along a rail. This inventive rail equipped with the sensor devices/cameras, can be mounted to the existing structure (e.g. in parallel to the existing rail with nozzles) in different ways. For example, depending on the system, simple clips or clamps can be used. If necessary, a crossbar (or a steel rope) can be used to stabilize the structure.

$11^{th}$ aspect of "Sensor Retrofit": The Agricultural System according to any one of the $5^{th}$ to $10^{th}$ aspect of "Sensor Retrofit", comprising a computing device configured for collecting and merging the parameters measured by the sensor devices, a parameter map of the growth area being generated by merging the parameters.

A preferred Agricultural System comprises a computing device configured for collecting and in some embodiments/ implementations merging the parameters measured by the sensor devices. Likewise, a parameter map of the growth area can be generated.

12th aspect of "Sensor Retrofit": The Agricultural System according to any one of the 1st to 11th aspect of "Sensor Retrofit", configured for measuring a respective position of the irrigation device with respect to the growth area.

13th aspect of "Sensor Retrofit": The Agricultural System according to the 11th and 12th aspect of "Sensor Retrofit", wherein the computing device is configured for generating a 2-D or 3-D model from the position information and the parameters measured by sensor device.

In general, each of the sensor devices/cameras can be controlled individually. With this setup it is possible to create a general overview of the entire surface, which can be analyzed by a software. In addition, a 3-D picture can be generated by evaluating or merging pictures from two or more cameras next to each other. Due to the different angles, a simple 3-D model of the surface can be calculated.

By calculating a 3-D model of the plants, data can be collected about:

i. Height
ii. Shape
iii. Angle of leaves

On the other hand, by calculating a 2-D model, data can be collected about:

i. Coloration, which also can be down-calculated to necrosis, virus or fungi disease
ii. Malformation of leaves
iii. Number of flowers
iv. Missing plants
v. Plant size
vi. Plant height
vii. Plant diameter
viii. Nutrition status of the plants
ix. Disease detection
x. Water content In some embodiments/implementations, the position of the trolley will be measured to provide coordinates for the measured values, in particular for the pictures taken. The calculation of the position can be done using an (indoor) positioning system e.g. based on Bluetooth beacons, or knowing a start-point of the trolley and calculating the actual position based on the speed of the trolley and the time passed and/or using marks (like an QR-code) along the rail for positional checking and information input.

The measured parameters, in particular the picture data, will be sent to a general control unit. The data transfer can be wire-based (LAN, 5-core cable, or other existing cables for data transfer) or wire-less. The data can be transferred to the computing device via a control box or control unit. The latter can be equipped with a Wi-Fi module, which transfers the data to the computing device. A wire-based connection to the computing device is possible as well. The computing device can be linked to or comprise a climate control computer.

The computing device can be local (edge computing) or in the cloud. The data will be processed and alerts, growth status, etc. can be provided for instance on a dashboard to the grower. In case of deviation from the predicted or expected growth, an alert will be given. The alert can contain the kind of abnormality and where the abnormality was detected, for example with positional coordinates.

Data distribution and analysis can be performed using Artificial Intelligence and Deep Learning methods. Data distribution, analysis and data handling can use a blockchain technology in order to generate a tamper-proof distributed ledger-system. It is also possible to provide a low-resolution picture, with the software marking the area in a specific color where something is out of a normal behavioral condition or biological setting. Depending on the intelligence of the system, it can also give a recommendation to the user how to treat the plants.

14th aspect of "Sensor Retrofit": The Agricultural System according to any one of the 1st to 13th aspect of "Sensor Retrofit", configured for moving the irrigation device forth and back over the growth area, wherein a measurement with the sensor device is only performed during one pass of the irrigation device.

15th aspect of "Sensor Retrofit": The Agricultural System according to the 14th aspect of "Sensor Retrofit", wherein the irrigation device is moved forth in a first pass and back in a second pass, and wherein the sensor device is moved ahead the irrigation device during the first pass and the measurement is performed during the first pass.

In a preferred embodiment, the irrigation device is moved forth and back over the growth area. Therein, a measurement with the sensor device is only performed during one pass of the irrigation device, either during a first pass forth or during a second pass back. In some embodiments/implementations, the measurement (picture taking) is done when the sensor device(s) is/are moving in front of the rail with the nozzles. The trolley is usually moving twice across the field (back and forth), i.e. the data can be collected either only during one pass of the trolley, or during both passages.

16th aspect of "Sensor Retrofit": The Agricultural System according to any one of the 1st to 15th aspect of "Sensor Retrofit", comprising a light source mounted at the irrigation device and being moveable with respect to the growth area, thus.

In a preferred embodiment, a light source is mounted at the irrigation device. This can for instance be a high-power UV LED for disinfection or a red/far-red source for night interruption. In some embodiments/implementations, the light source is mounted to the rail as well. Along the rail, a plurality of sensor devices can be provided. For instance, each camera can be equipped with a respective light source. The light sources can emit light at the wavelength measured by the respective camera to improve the brilliance. They can also emit light with a complementary color of an expected disease reflectance as described in DE102018214676. Furthermore, the light sources can also emit infrared light for nighttime inspection with infrared-sensitive cameras.

17th aspect of "Sensor Retrofit": The Agricultural System according to any one of the 1st to 16th aspect of "Sensor Retrofit", wherein the irrigation device and the sensor device share a common power supply.

In a preferred embodiment, the irrigation device and the sensor device share a common power supply. Alternatively, the power supply of the sensor device can be realized via a small solar panel with a battery on the top of the sleigh if no power supply is available. In some embodiments/implementations, the common power supply is implemented based on the existing infrastructure with an electric control box above each irrigation trolley. The power supply lines can go next to the irrigation pipes.

18th aspect of "Sensor Retrofit": A Method for Controlling an Agricultural System according to any one of the 1st to 17th aspect of "Sensor Retrofit", wherein the irrigation device and the sensor device are moved over the growth area, and a parameter is measured by the sensor device.

For instance, morphological or other parameters measured can be analyzed by the computing device. The parameters and the result of the analysis can be provided to the farmer or a customer. In case of deviations, the system can automatically change a growth parameter (e.g. illumination or temperature) or it can inform the farmer or a customer (e.g. on a display about for instance the actual growth, simulated growth, growth prognosis, AR (augmented reality) or VR (virtual reality) representation, 2D and 3D plant configuration, and so on).

19$^{th}$ aspect of "Sensor Retrofit": A Computer program product, comprising a plurality of program instructions, which when executed by a computing device of an Agricultural System according to any one of the 1$^{st}$ to 17$^{th}$ aspect of "Sensor Retrofit", cause the Agricultural System to execute the Method for Controlling according to the 18$^{th}$ aspect of "Sensor Retrofit".

"LiDAR Plant Surveillance"

According to the element "LiDAR Plant Surveillance" of the disclosure, the growth of plants is monitored by measuring the decreasing distance between a distance-measuring device and the growing plants.

1$^{st}$ aspect of "LiDAR Plant Surveillance": More specifically, a controlled agricultural system, comprises a growth area for growing plants and a distance measuring device for measuring a distance to an object in a detection field, the distance measuring device being arranged in a relative position to the growth area such that the detection field and the growth area have at least an overlap.

The distance measuring device is oriented towards the growth area of the agricultural system, for measuring the distance to the plants grown there. For instance, it can be arranged above the growth area, "looking" downward onto the latter. Then, the distance measured will decrease the larger the plants become. In particular, the distance measurement can enable a profile measurement giving information on morphological parameters of the plants.

2$^{nd}$ aspect of "LiDAR Plant Surveillance": The controlled agricultural system according to the 1$^{st}$ aspect of "LiDAR Plant Surveillance", the distance measuring device being adapted for a time-of-flight distance measurement.

In a preferred embodiment, the distance measurement is a time-of-flight distance measurement. In general, an ultrasonic measurement is possible, even though a light-based measurement is preferred, in particular with a LiDAR system. Therein, the term "light" is not restricted to the visible part of the electromagnetic spectrum, it also relates to UV and IR light, the latter can even be preferred.

3$^{rd}$ aspect of "LiDAR Plant Surveillance": The controlled agricultural system according to the 1$^{st}$ or 2$^{nd}$ aspect of "LiDAR Plant Surveillance", the distance measuring device comprising a light source for emitting light pulses, in some embodiments/implementations laser pulses, and a sensor device for detecting echo pulses returning from the detection field after a reflection at the object.

A light source is provided for emitting the light pulses, in particular a laser source, which in some embodiments/implementations comprise one or more laser diodes. The light/laser pulses are emitted into the detection field and are reflected at the surface of the object(s) located there, for instance at the leaves in case of the plants. The measuring device further comprises a sensor for detecting the reflected pulses returning from the detection field, namely for detecting the echo pulses. From the time delay between the emission of the pulse and the detection of the echo pulse, namely from the time of flight δt, the distance can be calculated ($d=\delta t \cdot c/2$).

In the following some further characteristics of a preferred LiDAR system are summarized:

The light source, in particular a laser, emits short light pulses (typically with a pulse half-width between 0.1 ns and 100 ns, here preferred between 0.1 and 10 ns). The sensor, which can also be sensor array, can for instance be a Photo-Diode, an Avalanche Photo Diode (APD), a Single Photon Avalanche Diode (SPAD), a PIN-Diode, or a Photo-Multiplier, it detects the echo pulse. In some embodiments/implementations, infrared light is used (wave length between 850 nm and 1600 nm, or larger), but visible or UV-light can be used as well. The light source can emit the light pulses with repeat frequencies between 1 kHz and 1 MHz, in some embodiments/implementations between 1 kHz and 100 kHz (this gives a pulse enough time to return back to the sensor; 2 μs delay time corresponds to a distance of 300 m, 1 μs to 150 m, and 100 ns to 15 m). The light can be pulsed stochastically to filter out the background illumination, which could be sunlight but also heat radiation. This will improve the signal-to-noise ratio of the signal.

4$^{th}$ aspect of "LiDAR Plant Surveillance": The controlled agricultural system according to the 3$^{rd}$ aspect of "LiDAR Plant Surveillance", the distance measuring device being adapted for a spatially resolved distance measurement.

In some embodiments/implementations, the distance measuring device is adapted for a spatially resolved distance measurement (referred to as "enhanced" system below). The detection field is segmented into a plurality of segments, for each segment a distance value is measured. This gives a distance image with a spatial resolution, namely a three-dimensional picture of the environment, in particular of the growth field.

5$^{th}$ aspect of "LiDAR Plant Surveillance": The controlled agricultural system according to the 4$^{th}$ aspect of "LiDAR Plant Surveillance", the distance measuring device being adapted for assigning the echo pulses received with the sensor device to different solid angles of the detection field.

6$^{th}$ aspect of "LiDAR Plant Surveillance": The controlled agricultural system according to the 4$^{th}$ or 5$^{th}$ aspect of "LiDAR Plant Surveillance", the distance measuring device being adapted for emitting the light pulses into different solid angles of the detection field.

7$^{th}$ aspect of "LiDAR Plant Surveillance": The controlled agricultural system according to any one of the 4$^{th}$ to 6$^{th}$ aspect of "LiDAR Plant Surveillance", the distance measuring device being adapted for adapting the size of the detection field to the growth area and/or a growth state of the plants.

On the one hand, the spatial resolution can be achieved with the sensor device. Therein, the sensor assigns the echo pulses returning from the detection field to different solid angles. The sensor or sensor array comprises several pixels, each detecting the reflected light in a certain solid angle. This can for instance be achieved with CCD or CMOS sensor combined with an optical system, for instance a lens. The optical system guides the echo pulses from the different solid angles onto different pixels, for instance different areas of the CCD or CMOS array. Likewise, each pixel is linked to a respective solid angle, and the echo pulse can be assigned accordingly. In such a setup, the light/laser source can for instance illuminate the whole detection field (area of interest) in a flash mode.

On the other hand, the spatial resolution can also be achieved by scanning the light/laser pulses across the detection field, for instance by moving mirrors like MEMS-mirrors. Accordingly, at a certain point in time, the light/laser pulse is emitted in a certain solid angle (depending on the current tilt of the mirror). Thereafter, the next pulse is emitted in another solid angle, and so on. In this setup, the sensor can even consist of just one sensor element with an optic which covers the whole detection field (the sensor has no spatial resolution). However, as the pulse is emitted in a certain solid angle, the measuring device (or control/computing device connected thereto) knows from which solid angle the detected echo pulse returned.

It is also possible to combine a sensor with a spatial resolution and the scanning emission in a hybrid approach.

8$^{th}$ aspect of "LiDAR Plant Surveillance": The controlled agricultural system according to any one of the 4$^{th}$ to 7$^{th}$ aspect of "LiDAR Plant Surveillance", the distance measuring device being adapted for a spectrally resolved distance measurement, namely for emitting and detecting light pulses having a different wavelength.

In some embodiments/implementations, the distance measuring device is adapted for a spectrally resolved distance measurement, namely for emitting and detecting light pulses having a different wavelength (referred to as "enhanced" system below). An enhanced system can employ various wavelengths at the same time, then a (segmented or multi-) sensor needs to have respective filters, or apply the filters sequentially. Each wavelength could also use another pulse-pattern, so that it can be differentiated from other wavelengths. Using different wavelengths can provide additional information, like leaf reflectivity, fluorescence radiation, e.g. chlorophyll fluorescence. In the latter case, any subsequent pulse needs to wait until a typical fluorescence or phosphorescence decay time is over. Using light pulses having different infrared wavelengths will help increase the Signal-to-Noise Ratio (SNR) or the measured Lidar Pulses, since more measurement data can be used for data measurement and processing, object recognition and classification.

It is also possible to use laser radiation in the visible or ultraviolet wavelength range for the described scanning application. Therefore, the term LIDAR includes laser radiation in the entire wavelength range from Ultraviolet to Infrared.

Using visible laser radiation in the visible wavelength range can be used to detect and measure not just plant morphology but also biological or chemical plant features and health conditions.

Early disease detection for plants is important, especially in a closed environment like a vertical farm, where diseases can spread easily. Different kinds of diseases or stress can cause different symptoms at a plant, for example on plant leaves, petals, stem or roots. Some can lead to a reduced growth of the plant, others, like the Tobacco mosaic virus, which can infect tobacco, pepper, tomato and cucumber, mainly cause "mosaic"-like mottling and discoloration on the leaves. Causes of discolorations, depending on plant type, can for example be caused by lack of nutrients or lack of chemical elements like Nitrogen (N), Phosphor (P), Potassium (K), Sulfur (S), Manganese (Mn), over-supply of nutrients, too much light, too rapid temperature changes, lack of air circulation, too dry air, too much irrigation, bacterial and virus infestation causing for example bacterial blight and bacterial wilt, soil contamination, soil temperature and many others. In addition to discoloration effects, plant leaves can develop holes.

It is known to use cameras to observe plants and detect color changes that could be associated with diseases, i.e. the discolored parts have changed from their naturally provided colors (according to their actual growth stage) to a changed color impression, therefore they have become discolored. Discolorations can affect only parts or small segments of a plant body (stem, petals, leaves) or greater areas. However, some of these color changes, particularly in an early stage of a disease, only affect small parts of the leaves, or the contrast between the discolored part and the normal colored part is small, thus making it easy to overlook the discolored areas. The aspect "Plant Surveillance" targets to intensify the contrast between discolored and normal colored parts of a plant.

Furthermore, some color changes (discoloration) signal a next stage of ripening, e.g. the change of color in fruits. For instance, tomatoes discolor from green to red while ripening, eventually triggering harvesting.

It is therefore possible to use such a LIDAR scanning system (as described above) in a Controlled Agricultural System for plant breeding and cultivating, particularly for detection of plant diseases and various stages of ripening, comprising by using a data storage device comprising data, which are related to spectra of light, particularly of light with colors complementary to colors of parts of plants (Complementary Color Spectrum CCS), for example, complementary to discolored areas or parts of plants, an LIDAR illumination device able to emit light with a color spectrum according to the data stored in the data storage device and illuminate plants, a sensor device able to detect the light reflected by the illuminated plants, a computing device configured to control the illumination device based on the data of the database, and further configured to analyze the data from the sensor device and detect dark areas on the plants.

9$^{th}$ aspect of "LiDAR Plant Surveillance": The controlled agricultural system according to any one of the 1$^{st}$ to 8$^{th}$ aspects of "LiDAR Plant Surveillance", wherein the distance measuring device (200) is arranged in a distance from the growth area of 30 m at maximum.

In a preferred embodiment, the distance measuring device is arranged in a distance of 30 m maximum from the growth area, in some embodiments/implementations 25 m, 20 m, 15 m or 10 m at maximum (possible lower limits are for instance at least 2 m, 4 m or 5 m). A LiDAR system can reach a resolution of a few millimeters at a distance of about 10 meters. This resolution is sufficient to detect morphological parameters of plants like biomass, size, leave size, flowers (number and size), etc., future systems will even provide a better resolution.

10$^{th}$ aspect of "LiDAR Plant Surveillance": The controlled agricultural system according to any one of the 1$^{st}$ to 9$^{th}$ aspects of "LiDAR Plant Surveillance", which is an indoor farm, the distance measuring device being mounted below a ceiling above the growth area.

11$^{th}$ aspect of "LiDAR Plant Surveillance": The controlled agricultural system according to any one of the 1$^{st}$ to 10$^{th}$ aspects of "LiDAR Plant Surveillance", comprising a light fixture for illuminating at least a part of the growth area, wherein the distance measuring device is a part of the light fixture.

In a preferred embodiment, the Controlled Agricultural System is an indoor farm, for instance a greenhouse or vertical farm. To detect morphological (and other) parameters, the LiDAR-system (or enhanced-LiDAR system with spectral/spatial resolution) can be attached at an elevated place in the greenhouse or vertical farm, it can be mounted below a ceiling above the growth area, either at the ceiling itself or at a scaffold. The LiDAR-system can also be integrated into a light fixture which is provides artificial lighting to the growth area; the LiDAR-system can for instance be arranged in the housing of the light fixture.

In a simple approach, one (enhanced) LiDAR-system attached in the center of the greenhouse could be sufficient to get a rough overview. However, installations in the greenhouse like lighting fixtures might block the laser pulses and the (enhanced) LiDAR system will only measure a plant from one direction.

In general, the distance measuring device (LiDAR-system) can be mounted movably for capturing the growth area from different sides. It can for instance move along a track in a vertical farm. In a vertical farm, the plants grow on shelfs in racks, the LiDAR-system could then move along the rack to measure the plants on each shelf.

12$^{th}$ aspect of “LiDAR Plant Surveillance”: The controlled agricultural system according to any one of the 1$^{st}$ to 11$^{th}$ aspects of “LiDAR Plant Surveillance”, the distance measuring device being immovably mounted in its relative position with respect to the growth area.

In some embodiments/implementations, the distance measuring device (LiDAR-system) is mounted immovably (in an immobile manner) with respect to the growth area. In comparison to the prior art mentioned above, this mounting is far less complex. With a LiDAR-system, the light can be flashed or scanned over the entire detection field/growth area, whereas in the prior art the whole sensor system has to be moved across the growth area. A LiDAR-system does not need a movable, mechanical support and can continuously measure a much wider area.

13$^{th}$ aspect of “LiDAR Plant Surveillance”: The controlled agricultural system according to any one of the 1$^{st}$ to 12$^{th}$ aspects of “LiDAR Plant Surveillance”, comprising an additional distance measuring device for measuring a distance to an object in a detection field, in some embodiments/implementations by a light pulse time-of-flight distance measurement, the distance measuring devices being arranged to capture different regions of the growth area and/or to capture the growth area from different points of view.

In a preferred embodiment, the Controlled Agricultural System comprises an additional distance measuring device for measuring a distance to an object in a detection field, in some embodiments/implementations an additional LiDAR-system. The LiDAR-systems are arranged to capture different regions of the growth area and/or to capture the growth area from different points of view. Using several LiDAR-systems in a vertical farm or greenhouse can enable the creation of a full view of the plants. In a simple approach, an (enhanced) LiDAR-system is attached close to one of the four corners of a greenhouse. From this perspective, the whole area of interest can be covered. If the line of sight of one (enhanced) LiDAR is constrained, an (enhanced) LiDAR from another angle can cover this area. In addition, the plants can be measured from all angles, creating a 360°-view of the plant morphology.

When a plurality of LiDAR-systems are provided, each can scan the whole growth area (e.g. the full view the system is able to scan). The detection field can even be larger than the growth area. A computing device, either a local or a central device, can distinguish the growth area from other parts of the greenhouse/farm (e.g. walls). The computing device can then reduce or adapt the scanned area for each LiDAR-system so that it only covers the area of interest (“commissioning”).

In a preferred embodiment, the Controlled Agricultural System is configured for a time-synchronized measurement with the different distance measuring devices/LiDAR-systems. The control unit or computing device of the Agricultural system activates the LiDAR-systems at a specific point in time or at specific points in time—for example during illumination with light emitted by the regular horticulture lighting fixtures with a specific color, or with a specific spectral intensity or other photometric values, like photosynthetically active radiation (PAR) or Photon Flux, or only during a dark time period (no lighting), or after the plants have been treated with UV-radiation—in the greenhouse or horticultural indoor farm in an interleaved mode (i.e. one after the other) to avoid that one LiDAR-system interferes with a second LiDAR-system, leading to a “false” signal.

14$^{th}$ aspect of “LiDAR Plant Surveillance”: The controlled agricultural system according to the 13$^{th}$ aspects of “LiDAR Plant Surveillance”, wherein the additional distance measuring device is adapted for emitting and detecting light pulses having another wavelength than the light pulses emitted and detected by the first distance measuring device.

In a preferred embodiment, the distance measuring devices/LiDAR-systems are equipped for operating in different spectral regions. Each sensor (IR, UV, visible) is connected to a computing device (via its control unit). Since different wavelengths are used, the signals from another (wrong) LiDAR light source can be ignored by the sensor (e.g. by using a wavelength-filter).

15$^{th}$ aspect of “LiDAR Plant Surveillance”: The controlled agricultural system according to the 13$^{th}$ or 14$^{th}$ aspect of “LiDAR Plant Surveillance”, being configured for a clocked and/or time-synchronized measurement with the distance measuring devices, one after the other.

In a preferred embodiment, the Controlled Agricultural System is configured for a clocked measurement with the different distance measuring devices/LiDAR-systems. The control unit or computing device of the Agricultural system activates the LiDAR-systems in the greenhouse in an interleaved mode (i.e. one after the other) to avoid that one LiDAR-system interferes with a second LiDAR-system, leading to a “false” signal.

16$^{th}$ aspect of “LiDAR Plant Surveillance”: The controlled agricultural system according to the 13$^{th}$ to 15$^{th}$ aspect of “LiDAR Plant Surveillance”, comprising a computing device configured for merging distance images taken by the distance measuring devices.

17$^{th}$ aspect of “LiDAR Plant Surveillance”: The controlled agricultural system according to the 16$^{th}$ aspect of “LiDAR Plant Surveillance”, comprising a reference point in a defined relative position with respect to the growth area, the computing device being configured for merging the distance images by means of the reference point.

Each LiDAR-system will provide a three-dimensional set of (time-sequential) pictures, from its point of view. Different wavelength ranges are possible, but not mandatory. To create a three-dimensional picture of each plant, the pictures of the LiDAR-systems need to be mapped over each other. To map them, the system in some embodiments/implementations uses a reference point. This reference point can be an object in the greenhouse and the respective distances are calculated from this object. Alternatively, the reference point can be the walls of the greenhouse. The computing device receives the information from the LiDAR-system how far a plant is away from the opposite wall, and it knows the distance between the walls of the greenhouse.

The height of a plant is measured with respect to the upper surface of the soil. Usually, the plants do not cover the whole soil, so that this information should be available any time. However, the system can make a reference measurement before the first plant is planted, so that the correct height of the plant can be calculated even if the plants cover the soil completely.

The detected morphological parameters will be analyzed by the computing device. The parameters and the result of the analysis can be provided to the farmer or a customer. In case of deviations, the system can automatically change a growth parameter (e.g. illumination or temperature) or it can inform the farmer or a customer (e.g. on a display about for instance about the actual growth, simulated growth, growth prognosis, yield forecast, AR or AV representation, and so on). Such a system is able to measure even at night as to detect night behavior (e.g. also after a nightly UV-exposure).

It is also possible for a LiDAR system to recognize other objects inside a greenhouse or vertical farm, like humans, agribots, animals, and so on and provide a movement pattern of the other object. It is also possible for a LiDAR system to measure the movement and/or location of a plant or product along a moving belt or tray, allowing correct identification of the product.

Furthermore, according to "LiDAR Plant Surveillance", a method for agricultural management is proposed, which is intended for controlling a controlled agricultural system as described above.

18$^{th}$ aspect of "LiDAR Plant Surveillance": More specifically, the method for agricultural management, comprises at least one controlled agricultural system, wherein plants are grown at the growth area, and wherein the plants are captured by a distance measurement performed with the distance measuring device.

19$^{th}$ aspect of "LiDAR Plant Surveillance": The method according to the 18$^{th}$ aspect of "LiDAR Plant Surveillance", wherein a reference measurement of the growth area (203) is performed before the plants are grown at the growth area.

20$^{th}$ aspect of "LiDAR Plant Surveillance": Computer program product, comprising a plurality of program instructions, which when executed by a computing device of a Controlled Agricultural System according to any one of the 1$^{st}$ to 17$^{th}$ aspects of "LiDAR Plant Surveillance", cause the Controlled Agricultural System to execute the Method for Controlling an Agricultural System according to the 18$^{th}$ or 19$^{th}$ aspect of "LiDAR Plant Surveillance".

The growth and health of plants can be monitored according to any of the aspects of the disclosure described above or a combination of various aspects. For example, growth and health of plants may be monitored by combining any or all of the aspects of "Stress Detection", "Discolored Spots Detection", "Sensor Retrofit" and "LiDAR Plant Surveillance". Additionally, potentially critical situations may be detected according to the aspects of "Prophylaxis". The results of the monitoring, i.e. the probability that something detrimental may have happened to the plants, based on the aforementioned aspects may be further analyzed according to the aspects of "Disease & Pest Control". Finally, countermeasures may be taken according to the aspects of "Fungi Growth Inhibition".

Light/Growth Recipes

"Temperature Dependent Illumination"

It is an object to provide an advantageous Agricultural System.

This problem is solved by an Agricultural System comprising at least two light fixtures at different locations and being configured for applying a different illumination with these light fixtures at the different locations based on a temperature value measured. In detail:

1$^{st}$ aspect of "Temperature dependent illumination": A Controlled Agricultural System comprising:

at least two light fixtures for providing agricultural lighting, a sensor device for measuring a temperature value, wherein the light fixtures are arranged at different locations in the Agricultural System, and wherein the Agricultural System is configured for applying a different illumination with the light fixtures at the different locations based on a temperature value measured.

The "temperature value" can be the actual temperature, measured for instance in K, ° C. or ° F. The temperature can be measured by any kind of a thermal sensor (Electric, Resistance, Pyrometer, Piezo, etc.). In this respect, the "temperature value" can be any type of output signal of a thermal sensor, which relates to the temperature, for instance an electrical current or voltage. At the "different locations" for instance trays or bowls can be provided, in which the plants are grown. The different locations can in some embodiments/implementations lie on a different height respectively, for instance on different shelfs. In some embodiments/implementations, the different locations are arranged in the same building, particularly preferred in the same room.

Accordingly, the light fixtures and locations can be spaced vertically, for instance in a vertical farm. Vertical farm buildings can have heights of 10, 20, 30 or more meters and contain dozens of shelfs from the ground to the top in which the plants (includes Food Crops, Floriculture, *Cannabis*) are growing. Each shelf usually contains its own lighting fixture. Efforts to construct especially designed vertical farms are sometimes summarized under the term Agritecture.

The inventors observed that horticultural light fixtures can produce a certain amount of heat, even in case of LED light sources. The control systems of vertical farms may try to keep a constant (vertical) temperature in the building. However, due to the large number of light fixtures and other electrical equipment producing heat and due to the large dimensions of typical vertical farms, it is unavoidable, that the temperature under the ceiling is higher than on the ground (as warm air is lighter and moves up). Therefore, the temperature conditions in soil and air (and possibly also the water irrigation temperature) is different at different height levels.

Temperature, however, has an influence on the growth of plants. Some plants like petunia or verbena for instance need less time to flowering the higher the temperature is. However, petunia grow faster the higher the temperature is, whereas verbena grow faster the lower the temperature is. Other plants like *salvia* have a maximum growth rate at about 22° C., whereas they grow slower for higher and lower temperatures.

An approach here is to influence the growth by applying a different illumination depending on the temperature. In particular, the growth at different locations can be synchronized by applying for instance a higher DLI value where the temperature is lower, and vice versa. However, in general, the methodology also allows application of certain lighting conditions at given local temperatures in order to reach other growth targets, like super-fast growth, or super-slow growth for instance (see also "Customer Request").

2$^{nd}$ aspect of "Temperature dependent illumination": The Controlled Agricultural System according to the 1$^{st}$ aspect of "Temperature dependent illumination", wherein the illumination applied with the light fixtures at the different locations differs in at least one of a DLI value and a spectral composition.

The "Daily light integral" (DLI) describes the number of photosynthetically active photons (individual particles of light in the 400-700 nm range) that are delivered to a specific area over a 24-hour period.

Further, in terms of the different illumination, different light spectra may be applied at different temperatures. For instance, red light can be of interest at a specific temperature (e. g. 12-19° C.) and blue light at another specific temperature (e. g. 20-25° C.). The red light can affect the activation of phytochrome, the blue light can affect the activation of phototropin and cryptochrome. Additional effects may be generated when applying red or blue light at different humidity levels, e.g. red light irradiation at a cultivation atmosphere humidity level of 40% to 90% and blue light irradiation at a humidity level of 40% to 90%.

Plant growth during various growth cycles can be strongly influenced by the applied light spectra, for example, cucumber and lettuce plants reach greater length and/or mass when illuminated with the inventive horticultural light that includes far red light (700-800 nm).

So, one solution is to adjust the spectral ratios of a horticulture lamp (LED) as a function of ambient temperature. For example, the Far-Red radiation content (better: the Far-Red related Photosynthetically Active Photon Flux Density, PPFD or PFD measured in $\mu mol/(m^2 s)$, or the Far-Red related Applied Daily Light Integral (DLI) or the Far-Red related Daily Light Applied Spectrum Integral (DLASI), can be properly adjusted, e.g. for every 3° C. temperature increase a reduction of 5-30% compared to the lower temperature level. Of course, as described above, also the DLI values can be additionally adjusted.

3rd aspect of "Temperature dependent illumination": A Controlled Agricultural System according to the 1st or 2nd aspect of "Temperature dependent illumination", configured for applying a higher DLI value with the lighting fixture at that location at which the temperature is lower.

4th aspect of "Temperature dependent illumination": The Controlled Agricultural System according to any of the 1st to 3rd aspect of "Temperature dependent illumination", wherein the locations are spaced vertically, namely are arranged on a different height respectively.

5th aspect of "Temperature dependent illumination": The Controlled Agricultural System according to the 4th aspect of "Temperature dependent illumination", configured for applying a higher DLI value at that location, which is arranged at a lower height.

Due to the temperature difference in a vertical farm, the growing behavior of plants at higher height levels (especially underneath the ceiling) will differ from the growing behavior on the middle levels or on the ground (at lower temperatures), which will lead to different plant growth morphologies, different harvesting times and possibly also to different plant ingredients (vitamins, THC, enzymes, glucose, etc.) for the same plant. Temperature distribution is of course also influenced by the applied cooling conditions and the day/night illumination cycles (ON/OFF).

A sensor device is provided for measuring the (local) temperature settings, in particular inside a vertical farm building or the like, in order to apply favorable growth influencing conditions (as explained above). Basically, even a single sensor device could be sufficient, for instance an infrared camera allowing a temperature measurement at different locations at the same time. In some embodiments/implementations, a plurality of local sensor devices are provided.

6th aspect of "Temperature dependent illumination": The Controlled Agricultural System according to the 4th or 5th aspect of "Temperature dependent illumination", comprising a plurality of light fixtures on a different height respectively, wherein the Controlled Agricultural System is configured for measuring a temperature value at least at an uppermost and a lowermost location.

Accordingly, all or at least some of the locations can be equipped with a respective sensor device. In particular, the sensor device can be integrated into the lighting fixture. Lighting controllers can be placed locally at the lighting fixture or remotely.

As mentioned, in a vertical farm, a plurality of light fixtures (locations) are provided on a different height respectively, for instance at least 3, 5, 8, 10, 12, 14, 16, 18 or 20 light fixtures (locations). Possible upper limits can for instance be 1,000, 500, 200 or 100 different vertical locations. The vertical locations can be provided on a shelf respectively, each shelf comprising a plurality of horizontal locations on the same height level, equipped with an own lighting fixture respectively.

7th aspect of "Temperature dependent illumination": The Controlled Agricultural System according to the 6th aspect of "Temperature dependent illumination", configured for applying, with at least one lighting fixture arranged vertically in between the uppermost and the lowermost location, an illumination based on an interpolation of the temperature values measured at the uppermost and the lowermost location.

It is possible to use a linear (or non-linear) temperature profile by just measuring the temperatures at the bottom and at the top of a building and interpolating in between. Of course, depending on the number of temperature measuring points, any kind of reasonable mathematical interpolation can be used.

Such a desired temperature profile may be dependent on external weather conditions (adjustment time), but this is then already reflected in the actual local temperature measurement. Of course, it is necessary to apply a certain (characteristic) illumination for heat generation, either in a standard setting (DLI, spectrum) or otherwise properly selected. Once measured, such temperature data can be fed into a computer system and proper lighting conditions can be calculated and applied for each plant.

In a basic approach, the temperature profile may only be measured after quite long time intervals like hours, or only once per day.

In a more sophisticated approach, the actual local temperatures (LTik) (I=height index, k=positional index at that height, like position on a shelf) at different elevations (height levels) are regularly measured by various kinds of thermal sensors (Electric Resistance, Pyrometer, Piezo, etc.) and a vertical temperature profile (TPik) can be generated. It is preferred that such temperature sensors are built into the light fixtures.

As mentioned above, measured local data (LTik) can be stored into a Data Bank (DB). Likewise the actually applied lighting conditions (CLik) (either measured or per lighting program/sequence). The measurement of the applied lighting conditions can contain a variety of parameters (DLI, spectral ratios, and so on, as explained above). Measurements can be done e.g. at preselected time intervals (like seconds, minutes, hours), or irregularly. Once measured, such data can be fed into a computer system and proper lighting conditions can be calculated and applied (intermediate approach).

In an even more sophisticated approach, also the actual local plant growth parameters can be measured, like plant height, plant morphology, plant chemistry, plant leaf density index, plant color and other growth and ripening indicative parameters with various measurement techniques (destructive and non-destructive, see for instance "LiDAR for plant measurement" or also "Measuring patterns"). These data will then be stored as well into a data bank (Growth Parameters GPik). The Growth Parameters are compared to target growth values and the proper lighting conditions are chosen to reach the harvesting goal with respect to the actual growth parameters and the actual temperature profile. (high-level approach).

8$^{th}$ aspect of "Temperature dependent illumination": The Controlled Agricultural System according to any of the 4$^{th}$ to 7$^{th}$ aspect of "Temperature dependent illumination", comprising a plurality of light fixtures on a different height respectively, wherein the Controlled Agricultural System is configured for measuring temperature values at all vertical locations to obtain a vertical temperature profile.

9$^{th}$ aspect of "Temperature dependent illumination": The Controlled Agricultural System according to the 8$^{th}$ aspect of "Temperature dependent illumination", wherein, on each height respectively, a plurality of light fixtures are provided at different horizontal locations, wherein the Controlled Agricultural System is configured for measuring a temperature value at the horizontal locations respectively to obtain a horizontal temperature profile.

10$^{th}$ aspect of "Temperature dependent illumination": The Controlled Agricultural System according to one of the preceding aspects, wherein at least one of the light fixtures comprises a sensor device for measuring a temperature value at the location of that lighting fixture.

11$^{th}$ aspect of "Temperature dependent illumination": The Controlled Agricultural System according to one of the preceding aspects, comprising a computing device, configured to compare the data measured by the sensor device with a reference data set and to apply an illumination based on the result of the comparison.

12$^{th}$ aspect of "Temperature dependent illumination": A Method for Controlling an Agricultural System which comprises at least two light fixtures arranged at different locations at which the same plants are grown, the method comprising the steps of measuring a temperature value at at least one of the locations;

applying a different illumination at the different locations based on the temperature value measured.

13$^{th}$ aspect of "Temperature dependent illumination": The Method according to the 12$^{th}$ aspect of "Temperature dependent illumination" for controlling a Controlled Agricultural System according to any of the 1$^{st}$ to 11$^{th}$ aspect of "Temperature dependent illumination".

14$^{th}$ aspect of "Temperature dependent illumination": A Computer program product, comprising:

a plurality of program instructions, which when executed by a computing device of a Controlled Agricultural System according to any one of the 1$^{st}$ to 12$^{th}$ aspect of "Temperature dependent illumination", cause the Controlled Agricultural System to execute the Method for Controlling according to the 12$^{th}$ or 13$^{th}$ aspect of "Temperature dependent illumination"

15$^{th}$ aspect of "Temperature dependent illumination": A Method for Generating a Data Set for a Controlled Agricultural System according to one of the 1$^{st}$ to 11$^{th}$ aspect of "Temperature dependent illumination" or for a Method according to the 12$^{th}$ or 13$^{th}$ aspect of "Temperature dependent illumination" or for a Computer program product according to the 14$^{th}$ aspect of "Temperature dependent illumination", the Method comprising the steps of growing a plurality of plants and applying a defined temperature and illumination to the plants, wherein, in groups respectively, the temperature and the illumination differs;

measuring a growth parameter of the plants respectively.

"Temperature dependent illumination" also relates to a method for generating a data set for controlling an Agricultural System. For generating this data set, a plurality of plants are grown, wherein a defined temperature and illumination is applied. Therein, the temperature and illumination differs in groups. In particular, several different temperatures are defined and several different illumination setups are defined. With each temperature and illumination combination, one or in some embodiments/implementations more plants are investigated by monitoring a growth parameter. In some embodiments/implementations, for generating the data set, conspecific plants are grown and divided into groups with different temperature/illumination.

Such an evaluation can measure and assess for instance the necessary DLI levels (illumination setup) in order to reach the same Time to Flower Rate (growth parameter) at various temperature settings within a given (defined) temperature range, see Table 1 for illustration (for *Petunia* Coral Pink). Such relationships can be done with all plants and stored into a database. The database then allows producers to adjust the DLI levels (increase, keep, decrease) appropriately in order to synchronize (or at least minimize the time difference) the temperature and DLI-dependent Time to Flower. By the same methodology, however more complicated, also other factors can be taken into account, like Spectral Distribution and its adaptive adjustment, spectral ratios (like UV-B to Far-Red), humidity and others.

16$^{th}$ aspect of "Temperature dependent illumination": The Method according to the 15$^{th}$ aspect of "Temperature dependent illumination", wherein a correlation function between the temperature and the illumination is obtained from the growth parameters measured.

Apart from the Time to Flower, the "plant growth" measured can for instance also be the plant height, plant morphology, plant chemistry, plant leaf density index, plant color and other growth and ripening indicative parameters with various measurement techniques (destructive and non-destructive). These data will then be stored as well into a data bank (Growth Parameters GP).

Of course, plant growth can depend on many factors that can be evaluated by the method described, like the i. applied light spectrum,
ii. applied Photosynthetically Active radiation (PAR)
iii. Photosynthetically Active Photon Flux Density, PPFD or PFD measured in μmol/(m$^2$s),
iv. applied Daily Light Integral (DLI) or the Daily Light Applied Spectrum Integral (DLASI).
v. the change of light spectra,
vi. the ratios of spectra e.g. the ratio of blue to Far-Red; or the ratio between UV-A and Far-Red
vii. the illumination times with specific light spectra,
viii. duration and change between simultaneous or sequential illumination with different spectral distributions,
ix. amount and timing of UV-B irradiation,
x. day-night-cycles By the same methodology, however more complicated, also other factors can be considered, like applied temperature periods, i.e. temperature profiles, duration, change and so on. Though complicated, growth influencing relationship can be found. Of course, a variety of mathematical methods and computer simulation including neuronal learning and other artificial intelligence techniques can be used to find proper relations. A skilled person can find out many more of these influencing parameters by proper research.

Of course, it is understood, that the actual local temperatures (LT) are dependent on cooling conditions, air circulation, air humidity, actual light illuminating recipes at each shelf, and so on, generating complex interactive temperature interdependencies with complex feedback loops.

A Data Bank (DB) can for instance hold:

i. Temperature Profiles (LTik, TPik)

ii. Lighting conditions CLik iii. Growth Parameters GPik

All these data can be used by a suited computer program (software) to calculate the best Lighting Conditions for the actual local temperature conditions in order to minimize deviation of growth parameters at different local temperatures and/or to influence plant growth otherwise.

The compute unit can also calculate (or extrapolate) time to harvest based on any applied temperature, e.g. a temperature on the ground level of a vertical farm, or on the top level. The compute unit can also communicate this information to third parties: user, provider, etc.

"Adaptive Spectrum"

It is an object of this element of the disclosure to provide an agricultural system or method, which, on the one hand, enables an illumination of the plants with a specific light customized to the respective plant type. On the other hand, it is an object to optimize the energy consumption of the system or facility.

1$^{st}$ aspect of "Adaptive Spectrum": A controlled agricultural system, comprising a growth area for growing plants, a sensor device for a measurement of an ambient spectrum of an ambient light (second light) incident on the growth area, and a light fixture, wherein the agricultural system is configured to establish a difference spectrum between the ambient spectrum of the ambient light and a target spectrum (third light) on the basis of the measurement of the sensor device, and to trigger the light fixture to emit an additional light (first light) with an additional spectrum, wherein a superposition (superimposed light) of the first light and the second light is spectrally closer to the target spectrum (third light) than the ambient spectrum.

A respective "spectrum" can for instance cover the entire spectrum or only a spectral range of the respective light. A spectral range can for instance extend over at least 20 nm, 50 nm, or 80 nm (possible upper limits being for instance 1000 nm, 800 nm, 600 nm, 400 nm, or 200 nm). A "spectrum" can be continuous or quasi-continuous, or it can consist of discrete values at discrete wavelengths (e.g. at least one value per nm). For comparing spectra, for instance a radiant flux related value, e.g. the radiant flux itself (in Watt) or the irradiance (W/m$^2$) or radiant intensity (W/sr) or radiance (W/m$^2$/sr), plotted over the wavelength (e.g. in nanometer) can be evaluated (plotted in a linear coordinate system). The spectrum resulting from the superposition of the additional and the ambient spectrum, namely the superimposed spectrum, shall be closer to the target spectrum (third light) than the ambient spectrum. In other words, a difference between the target spectrum and the superimposed spectrum shall be smaller than a difference between the target spectrum and the ambient light. Therein, at a respective wavelength, the absolute value (modulus) of the respective difference value is taken.

In some embodiments/implementations, the ambient light is natural light, in particular sunlight. In general, the natural light can be the light available at day or also during the night. In case that sunlight is available, e.g. in terms of daytime and weather, it is incident on the growth area. For this purpose, the growth area of the agricultural system or facility can for instance be a arranged in a glasshouse. However, the sunlight could be also guided to the plants via light tubes or the like.

The sensor device allows for a spectral measurement, namely for measuring a radiant flux related value at different wavelengths. Such a spectral measurement is important, because the growth or thrive of the plants can depend on the flux or intensity in specific spectral ranges, see the "Examples of Light Recipes" below. Measuring for instance only a color of the ambient light would not be sufficient, because different spectral compositions can result in the same color.

2$^{nd}$ aspect of "Adaptive Spectrum": The controlled agricultural system of the 1$^{st}$ aspect of "Adaptive Spectrum", wherein the superimposed light corresponds to the third light.

As far as possible in terms of technical accuracy, the resulting light (ambient+first light) has the same spectral composition as the target light. In other words, the first spectrum of the first light is basically identical to the difference spectrum.

3$^{rd}$ aspect of "Adaptive Spectrum": The controlled agricultural system of the 1$^{st}$ or 2$^{nd}$ aspect of "Adaptive Spectrum", configured for an operation in which the first light has, at least temporarily, a share of at least 10% at the superimposed light.

Further lower limits can for instance be at least 20%, 30%, or 40%. Therein, for instance the irradiance of the first light and the superimposed light are compared. Even though a complete substitution (100%) is possible, preferred upper limits can for instance be 90% or 80% at maximum (at least temporarily, in the supplementation mode). The ambient light (second light) having a certain share at the superimposed light can be advantageous in terms of the energy consumption.

The goal of "Adaptive Spectrum" is to obtain the spectrum of the target light, at least approximately and in some embodiments/implementations to the best possible extent. Only setting the correctly perceived color of the light (given by the color coordinate in a CIE diagram, for example) with the aid of the additional light is insufficient in the agricultural sector; this is because a color can be represented in different ways, i.e., by different spectra (for example, yellow light can be represented by a spectrum of yellow light or by a spectrum containing red and blue components). However, the accurate spectrum is important for the growth of the plants in the agricultural sector.

4$^{th}$ aspect of "Adaptive Spectrum": The controlled agricultural system of any of the 1$^{st}$ to 3$^{rd}$ aspect of "Adaptive Spectrum", wherein the light fixture comprises at least two different light sources adapted for emitting light with different spectral properties.

These light sources differ in their spectral properties. Their peak intensities can for instance lie at different wavelengths and/or the spectral distribution can differ (narrowband or broadband). In some embodiments/implementations, the different light sources can be light-emitting diodes, see in detail below.

5$^{th}$ aspect of "Adaptive Spectrum": The controlled agricultural system of the 4$^{th}$ aspect of "Adaptive Spectrum", the agricultural system being configured for adjusting the intensity of the at least two different light sources individually, namely independently of each other.

Likewise, a very flexible supplementation of the ambient light is possible. In other words, the target spectrum can be reached under various ambient light conditions.

As mentioned, the ambient light can for instance be sunlight. However, it can also be artificial light or a superposition of sunlight an artificial light. Possible fields of application of "Adaptive Spectrum" may for instance be: greenhouses (in particular glasshouses), indoor farming or portable growing units, in which the plants (agricultural plants) are irradiated by a second light which, for example, may be the sunlight and/or artificial illumination (e.g., from adjacent or the surrounding regions, too).

Typically, the second light is not constant. For instance, the sunlight has a certain daily cycle and a yearly cycle, depending on geographic position. Moreover, further influencing variables can influence or change the characteristics of the available sunlight, such as, e.g., the formation of clouds, fine dust, rain, snow, etc. Depending on longitude and latitude, the sunlight has a daily color temperature response. In the morning and in the evening, it has a color temperature of approximately 1800 to 2200 K, it has a color temperature of approximately 5500-6500 K at noon, it has a color temperature of approximately 5500 K at 3.00 pm and it has a color temperature of approximately 4300 K in the evening. The color temperatures lie approximately on or near the Planck curve. The intensity and also the spectrum may change in the case of cloud cover, fog, etc.

The spectral range from 400 to 800 nm is most important for the growth of plants. Said range comprises blue (b) radiation (400-500 nm), green (g) radiation (500-600 nm), red (r) radiation (600-700 nm) and dark red (dr) radiation (700-800 nm). The photon flux (PF) of the photosynthetically active radiation (PAR) emerges from the sum of the individual photon fluxes PFb, PFg, PFr, PFdr. Daylight may have a ratio of PFb:PFg:PFdr=0.27:0.35:0.38.

With the developments of light-emitting diodes (LEDs), radiation sources that emit substantially in monochromatic fashion and radiation sources with a wavelength conversion element (phosphor) have become available. Depending on the embodiment, LED light sources can emit in the ultraviolet, visible or infrared spectrum. The wavelengths of the emission radiation can be accurately set by means of quantum dot LEDs. Organic LEDs (OLEDs), electroluminescence light sources, electrodeless induction lamps and mercury-free dielectric barrier discharge lamps can also be used as a light module. The light sources can have a compact or areal embodiment and can be equipped with primary and secondary optics, such as lenses, light guides, stationary and movable reflectors or radiation-reflective optical devices, holographic elements, partly transparent or completely light-opaque films, heat-reflecting films, luminescent films. Furthermore, use can be made of laser light sources, in particular those that produce white or colored light by means of LARP (laser-activated remote phosphor) technology. Consequently, a multiplicity of light sources are available for illuminating the plants and the entire radiation spectrum (UV, visible, IR) can be covered.

In particular, the agricultural system may comprise a computing device connected to the sensor device. The computing device may be configured to establish the difference spectrum between the spectrum of the ambient light and the target spectrum on the basis of the measurement values of the sensor device. Further, the agricultural system may comprise a control unit, the light fixture being connected to the control unit and the control unit being connected to the computing device. The control unit may be configured to convert the previously established difference spectrum into control signals for the light fixture. Likewise, the light fixture can be triggered to emit the additional light (first light) to supplement the ambient light.

6$^{th}$ aspect of "Adaptive Spectrum": The controlled agricultural system of any of the 1$^{st}$ to 5$^{th}$ aspect of "Adaptive Spectrum", configured to restrict an evaluation of the ambient light to wavelengths at which an intensity is designated in the target spectrum.

This can be achieved by a software or a hardware solution. For instance, even the sensor device itself can be configured to restrict the measurement of the ambient spectrum of the ambient light to the different wavelengths.

7$^{th}$ aspect of "Adaptive Spectrum": The controlled agricultural system of any of the 1$^{st}$ to 6$^{th}$ aspect of "Adaptive Spectrum", wherein the light fixture comprises LEDs and the agricultural system is configured to restrict an evaluation of the spectrum of the ambient light to intensity maxima of the LEDs of the light fixture.

In some embodiments/implementations, the sensor device is configured to restrict the measurement of the spectrum of the ambient light to these intensity maxima.

It is not the entire spectrum of the available illumination that is measured; instead, the measurement is restricted to the intensity maximums of the LEDs installed in the light fixture. The width of the wavelength range in the measurement may be fixed around the maximum in this case (e.g., +/−25 nm); however, it may also be determined by the curve of the peak, and so the boundaries lie where the intensity has fallen to a certain value (1/10 or 1/e) of the maximum.

Now, the actual intensity of the second light is measured in these regions, said intensity is compared to the desired intensity and the intensity of the LEDs can be determined by simply forming the difference.

It is possible to also apply this concept to other reference variables, for example to artificial light sources, the light properties of which change over time and which can be filled accordingly by means of the adaptive additional illumination. Thus, the "ambient light" (second light) can be natural light (direct or indirect sunlight) but also artificial light or a mixture of artificial and natural light.

If the missing parts of the target spectrum (spectrum, light intensity, etc.) are identified in the target area, then it is possible to provide the missing/supplemental parts of the spectrum in a targeted and energy saving manner, said missing/supplemental parts of the spectrum filling the second light spectrally with the desired intensity or further characteristics in order to obtain the target spectrum.

8$^{th}$ aspect of "Adaptive Spectrum": The controlled agricultural system as described in any of the preceding aspects of "Adaptive Spectrum", wherein the sensor device comprises one sensor or a plurality of sensors.

The controlled agricultural system therefore comprises at least one light fixture (agricultural light fixture) with at least one light source and a sensor or an arrangement of sensors (sensor device), by means of which the locally available second light spectrum (in the target area) can be analyzed in respect of composition and intensity, etc. Here, the spectrum means a region from UV to infrared or far infrared, i.e., approximately 100 nm to 100 000 nm (i.e., also including thermal radiation). The spectrum of the available illumination can be analyzed, for example in region increments of 1 nm, of 10 nm or of 50 nm (i.e., it is not the continuous intensity that is recorded; instead, the intensity of the spectrum is digitized in certain ranges).

9$^{th}$ aspect of "Adaptive Spectrum": The controlled agricultural system as described in any one of the preceding aspects of "Adaptive Spectrum", wherein the target spectrum corresponds to a light recipe for irradiating produce, in particular a plant.

Then, the measurement data are compared to the stored reference variables and supplied to a program. The program runs on a computing device, which may be part of the controlled agricultural system or which may else be cloud-based. Moreover, the controlled agricultural system comprises a control unit (light control unit), which actuates the light sources of the at least one light fixture on the basis of the data of the computing device and optionally modifies these appropriately. Here, different light fixtures may also receive different actuation data.

10$^{th}$ aspect of "Adaptive Spectrum": The controlled agricultural system as described in any one of the preceding aspects of "Adaptive Spectrum", comprising an interface for weather forecast data for a predictive adaptation of the additional light to the weather-dependent change in the sunlight (ambient light).

A "prediction" or "predictive adaption" can for instance be based on or implemented by Artificial Intelligence.

11$^{th}$ aspect of "Adaptive Spectrum": A method for agriculture, including the following method steps:

measuring the spectrum of an ambient light (second light) incident on a target area, in particular a growth area for growing plants, establishing a difference spectrum between the spectrum of the ambient light and a target spectrum (third light), triggering an emission of an additional light (first light), which has an additional spectrum, wherein a superposition (superimposed light) of the first light and the second light is spectrally closer to the target spectrum (third light) than the ambient spectrum.

For establishing the difference spectrum, the spectrum of the ambient light is compared with the target spectrum (spectrum of the third light). The first light emitted then has, at least approximately, the spectral composition of the difference spectrum to fill this gap. In particular, this can be achieved by way of a suitable actuation of a light fixture. Then, the growth area (target area) is irradiated with the produced additional light, in addition to the ambient light.

The spectrum of the second light (ambient light) is compared to the spectrum of the target light that should be used to illuminate the plants. Ideally, the spectrum is available using the same type of description as the measured spectrum, in this example as intensities in a wavelength range (if the spectrum is available as a continuous spectrum, the corresponding value can easily be calculated by way of the area of the intensity present in this wavelength range). Thus, the differences in the intensity can be determined for the individual ranges (e.g., using the method of least squares) and the control unit can actuate the light fixture accordingly so that the plants are irradiated by the required intensity in the determined wavelength ranges. Thus, the light fixture provides an additional light (=first light), which complements the second light (the already available ambient light) to form the target light. Moreover, provision can be made for the additional light to be adapted to the spectral changes of the ambient light (e.g., path of the sun, seasons, etc.) and/or of the predeterminable target light.

Apart from the spectral properties, also other light parameters can be measured, for instance the polarization and/or irradiation angle.

12$^{th}$ aspect of "Adaptive Spectrum": The method as described in the 11$^{th}$ aspect of "Adaptive Spectrum", including the additional method step of:

measuring the spectrum of the additional light, comparing the spectrum of the additional light to the established difference spectrum, adapting the spectrum of the additional light if the deviation between the measured spectrum of the additional light and the difference spectrum exceeds a tolerance range.

The spectrum of the second light can be measured with spatial resolution over the irradiation surface and the respective differences to the respective local target light can be calculated, for example using the method of least squares. Local differences can likewise be averaged in order to establish an overall difference for the entire illuminated region and in order thus to set the first light accordingly. In addition to local averaging, provision can also be made for an averaging of the individual differences and of the overall difference over time.

The sensor or sensors can also measure the light of the light fixtures. To this end, the light fixture radiation can be briefly modulated, for example, and so a measuring device can distinguish the artificial light from the natural light. This can ensure that the light output by the light fixture corresponds to the desired difference between the second light and the target light. If this is not the case, there is a corresponding correction (i.e., the intensity of the corresponding LED of the light fixture is adapted).

13$^{th}$ aspect of "Adaptive Spectrum": The method as described in the 7$^{th}$ aspect of "Adaptive Spectrum", wherein the additional light is modulated during the measurement of the spectra for the purposes of distinguishing it from the ambient light.

The measurement of the spectrum of the second light and this calculation of the additional light can be implemented after certain time intervals, for example every second, every minute, etc. The time interval can be designed differently depending on, e.g., the color temperature or other influencing variables (light intensity, polarization, weather).

The spectrum of the additional light (first light) can be adapted as soon as the spectrum of the target light and the spectrum of the second light differ or the measured spectrum of the additional light and the difference spectrum differ, or else only once the difference exceeds a tolerance range.

In a further configuration, it is possible to take account of not only the current spectrum of the second light (i.e., the ambient light) but also a prediction in the light change when creating the first light (i.e., the additional light/light fixture light). For the good growth of the plant, also receiving the necessary daily light integral (DLI) in addition to the correct spectrum over the day is important. To this end, the controlled agricultural system can obtain information about a weather forecast (data provided by a weather station), and so the further change in the second light can be predicted (i.e., the system has an interface to a weather forecast provider). For example, should the forecast suggest that it will be cloudy during the day, irradiation of the plants can already be started at an earlier time, for example already at 4 o'clock with primarily red light.

"Flexible Growth"

In automated plant production (e.g. in a greenhouse or in a vertical farm), one or more control units can regulate or control the plant production, for example the production process (planting, fertilizing, watering, illuminating, quality monitoring, etc.).

Further examples of processes that can be controlled by control units are the ordering process for precursor materials (seeds, fertilizer, etc.), the supply-demand requirements (customer wishes, customer orders, delivery dates and on-time delivery, cancellations, complaints), and taking account of economical and ecological points of views (e.g. energy consumption, goods storage and delivery). Respective control units may also be combined in a superordinate control unit, which then consists of a plurality of such sub-system units, such as, e.g., an interface to the customers (order and delivery platform, complaints, cancellations), an interface to the energy producers (cost control, energy availability), an interface to the actuation unit for the light fixtures or the applied light programs (growth-dependent illumination recipes), an interface to the precursor material suppliers, an interface to the transport and storage logistic companies, an interface to a data acquisition and evaluation unit (computing center, software), and more.

The growth behavior of the products, the yield (mass, number) and for example a target time, e.g. the harvest or delivery time can be predicted. Such a prediction can be possible based on growth recipes defining growth parameters, as for instance the growth cycle as a fixed parameter.

However, as discussed in "Flexible Growth", it could be interesting to adapt the target time, e.g. harvesting time, in line with external requirements arising for instance in the supply chain. It can be an interesting approach to consider for example the workload in downstream facilities (food producers) but also in upstream facilities (precursor materials).

1st aspect of "Flexible Growth": A Method for operating a controlled agricultural system, wherein plants are grown, a growth recipe is applied to the plants, wherein the growth recipe delivers a growth cycle, namely a target time for the growth of the plants, and wherein further the growth recipe is amended prior to reaching the target time;

wherein, due to the amendment of the growth recipe, i) the growth cycle is shortened or extended, and ii) a quality value of the plants is altered, and/or iii) a production value of the agricultural system is altered.

In a sense, the measures or results of the items i) to iii) are conflicting targets. For instance, assuming that iii) remains unchanged, an improvement of item i), namely a shortening of the growth cycle, will result in a deterioration of a quality value, for instance in terms of the plant's color or morphology. The approach of "Flexible Growth" is to consider or take into account these interdependencies of the different measures and to amend the recipe, e.g. depending on external requirements. Such requirements can for instance be the workload in a subsequent facility processing the crop or the crop quality required currently in such a facility (which can vary and depend e.g. from the crop quality of other farms).

2nd aspect of "Flexible Growth": The Method of the 1st aspect of "Flexible Growth", wherein a quality value of the plants is altered, namely a vitamin content, a color parameter, or a morphology parameter.

For instance, the vitamin content can be increased to compensate a poor crop quality of another farm. On the other hand, a reduced vitamin content could be found to be acceptable in case that the growth cycle shall be shortened, e.g. to optimize the workload in the supply chain. In general, shifting the target time, in particular the harvest time, can for instance help avoiding overcapacities and undercapacities in the supply chain. A product (fruits, vegetables, cut flowers, medical plants) may be required earlier, or else later. Although, alternatively, a delay could be offset by storage, a disadvantage arising in the process could be that contents are degraded, i.e. the quality suffers.

3rd aspect of "Flexible Growth": The Method of the 1st or 2nd aspect of "Flexible Growth", wherein a production value of the agricultural system is altered, namely an energy consumption of the agricultural system.

4th aspect of "Flexible Growth": The Method of the 3rd aspect of "Flexible Growth", wherein the growth cycle is shortened and a production value of the agricultural system is impaired.

5th aspect of "Flexible Growth": The Method of any of the preceding aspects of "Flexible Growth", wherein the growth cycle is shortened and a quality value of the plants is impaired.

Impairing a color parameter can for instance mean that a leaf or fruit color pales, for example from green or red to a pale color tone. Impairing the vitamin content means that less vitamins are contained in the plants, and impairing a morphology parameter can for instance mean that the stem diameter is reduced or the branching is negatively affected.

6th aspect of "Flexible Growth": The Method of any of the 1st to 3rd aspect of "Flexible Growth", wherein the growth cycle is extended.

Usually, keeping the growth cycle as short as possible is a superordinate target in agriculture. In this case, it is intentionally extended, for example to avoid overcapacities and undercapacities in the supply chain, see above.

7th aspect of "Flexible Growth": A controlled agricultural system for making plant growth flexible, comprising an acquisition unit for acquiring the change of the delivery date for a product of a plant, actuators configured to act on the plant growth, a control unit connected to the actuators and configured to identify the plants affected by the change in delivery date, a computing device connected to the acquisition unit and the control unit and configured to establish modified control parameters for the actuators on the basis of the determined current growth status in such a way that the desired state (degree of maturity) of the product is obtained at the time of the amended delivery date.

8th aspect of "Flexible Growth": The controlled agricultural system of the 7th aspect of "Measuring Patterns", the computing device being configured for executing a method according to any of the 1st to 6th aspect of "Flexible Growth".

The embodiment facilitates monitoring and control of the growth of the plants. To this end, the controlled agricultural system comprises a control unit, which monitors and controls the growth of the plants. As a result, it becomes easier to flexibly react to changes in customer queries and to adapt the harvest time or delivery date. A digital supply chain (software platform) can be filled depending on the customer queries and dates, and plants are planted so that they are mature in timely fashion. Here, the supply-demand interface can serve as a marketplace, in which supply and demand are matched to one another and the market prices are established. The platform closes contracts and ensures transparency along the supply chain.

The change in target time can be triggered by an amended customer query. Depending on the notice for the change in delivery date, it is possible to delay or accelerate germination, growth or maturing of the product. This is implemented by way of suitable changes of, for example, parameters such as light spectra, light intensity, $CO_2$ content, water/nutrient supply or temperature (air, water, ground, plant root, plant blossom, plant leaves, etc.) by way of suitable actuators (such as light fixtures, watering facilities, heaters, cooling devices, fertilizer applicants). In the case of a change in the customer-related delivery date, the plants affected thereby are identified by the control unit. To this end, whole growing units (in the case of a large order, for example) can be provided with an ID, for example a QR code, but also the smallest individual sale units, such as plant pots, planting bowls, etc.

9th aspect of "Flexible Growth": The controlled agricultural system of the 7th or 8th aspect of "Flexible Growth", comprising sensors connected to the control unit and configured to determine the growth phase of the plants.

Moreover, the growth phase of these customer-related plants or the amount of, e.g., light and/or temperature that they have already taken up, for example also temperature without light, i.e., in darkness, are determined. The individual values, the number of individual values or else the sum of individual values (time integral, power integral) are acquired in the process. Here, the acquired information items can be very multilayered since growth-related parameters are a function of a plurality of influencing factors, such as for example: applied light spectrum, applied photosynthetically active radiation (PAR), applied photosynthetically active photon flux density (PPFD or PFD, measured in μmol/($m^2$s)), applied daily light integral (DLI) or daily light applied spectrum integral (DLASI), or the ratios of the spectral intensities of blue to dark red, or of UV-A to dark red, the number and duration of the changes between two different illumination states, the radiation dose of UV-A and UV-B radiation, and many more.

These information items can be kept in a growth log for each growing unit. In order to determine the current growth phase, provision may also be made of optical sensors, for example cameras, or else other sensors such as chemical sensors, spectrally sensitive sensors or thermal sensors. Here, the phrase growth phase comprises all stages of the plant growth, including the maturing of possible fruits (e.g., fruit, vegetable, fungi, plants, etc.) of the plant.

Moreover, the amounts still required by the plants or grown products, for example in respect of the irradiation (spectral photon fluxes) and/or temperature and dark times (see above in respect of further influencing factors), until they have reached the state provided for delivery (e.g., customer-specified degree of maturity) are determined.

10th aspect of "Flexible Growth": The controlled agricultural system of any of the 7th to 9th aspect of "Flexible Growth", wherein the computing device is connected to a database which, for a respective plant, stores what change of a control parameter can bring about a certain delay or acceleration or standstill of the growth.

The running control program is interrupted and replaced by a delay or acceleration program, or holding program, which use parameters (spectrum, temperature, $CO_2$ and more) that have been modified on the basis of the values established above in order to correspondingly delay or hold the growth of the plants (later delivery date) or accelerate this (earlier delivery date). Here, the computing device of the controlled agricultural system in some embodiments/implementations accesses a database that has available appropriate plant-specific information items (e.g., a change in the parameter x leads to delay of the growth by y hours). From these information items, the computing device calculates a suitable modification of the parameters in order to produce the desired acceleration or delay, or the desired holding state, of the plant growth. In this calculation, it is possible to take account of which plant parameters (color, size, content, etc.) were particularly important to the customer such that the newly calculated parameters do not change these plant parameters where possible (keeping customer-critical plant parameters).

Acceleration programs can be accompanied by a higher light dose (e.g., a higher DLI, see above) and/or a higher proportion of red and dark-red radiation. Acceleration programs may also use other dark periods, e.g., shorter dark periods, and also set or change brief irradiation during dark periods. Acceleration programs can increase the nutrient supply and the fertilizer supply, and also appropriately adapt watering, ventilation, room temperature, etc.

Delay programs can be accompanied by a lower light dose (e.g., a lower DLI, see above) and/or a lower proportion of red and dark-red radiation. Delay programs may also use other dark periods, e.g. longer dark periods, and also prompt or modify the brief irradiation during dark periods. Delay programs may reduce the nutrient supply and the fertilizer supply, and also appropriately adapt watering, ventilation, room temperature, etc.

Holding (standstill) programs modify the parameters in such a way that the current state of the plants is largely maintained.

Depending on the shift in date, a calculation is carried out as to how long the modified control program should be used until the standard control program can be used again. Optionally, the modified control program is also used until harvest.

11th aspect of "Flexible Growth": A method for agriculture, comprising:

a controlled agricultural system as described in any one of the preceding aspects and the following method steps:

acquiring the change in the delivery date for a product of a plant with the aid of the acquisition unit, identifying the affected plants with the aid of the control unit, and determining the current growth status of the affected plants with the aid of the sensors or by way of the growth log, calculating the modified control parameters by the computing device on the basis of the determined current growth status and the state of the product to be obtained at the time of the modified delivery date, actuating the actuators with the modified control parameters by the control unit (acceleration or holding or delay program).

12th aspect of "Flexible Growth": The method for agriculture as described in the 11th aspect of "Flexible Growth", wherein the modified control parameters are calculated in such a way that they delay or accelerate the germination, the growth or the maturing of the affected plants or of the product (fruit) of the plants.

The market prices (supply-demand) can be noted at regular intervals and the control program may be updated accordingly under certain circumstances. Conceivable scenarios include:

- If an order is canceled and another customer whose order data can be met with a modified growth program (control program) is found, the modified growth program (control program) is applied.
- If another customer is found and there still is sufficient time for a new seed in respect of the modified customer order, there is no delay, but the new customer is served. In particular, this may be the case if the new customer does not require mature plants at all but only cuttings. Then, a new production is carried out for the modified customer order.
- If need be, the first production can be accelerated for the other customer and the original customer can be served with a likewise accelerated, subsequent production.

13th aspect of "Flexible Growth": The method for agriculture as described in the 11th or 12th aspect of "Flexible Growth", including the additional method steps of:

observing the market conditions, adapting the delivery date to the current market conditions.

14th aspect of "Flexible Growth": A method for agriculture if the original purchase date for a product is delayed by the customer, including the following method step:

calculating whether a slowdown of the production or storage of the finished products would be more cost-effective.

It is also possible to calculate whether a delay of the production or storage would be more cost-effective. Possibly, the production is then carried out as planned and stored since a delay additionally occupies the production area (opportunity costs).

It is also possible to calculate whether a production can be influenced in corresponding fashion at another automated plant production and can be assigned to the customer order.

"Plant Movement"

1st aspect of "Plant Movement": An Agricultural Light Fixture, particularly for use in a Controlled Agricultural, comprising:

multiple light modules, each light module comprises at least one light source and at least one driver connected to the at least one light source;

wherein the light modules are controllable individually or in groups.

Plants need nutrients and light to grow. However, to grow strong, they also need to move to strengthen their stems or shoots, in particular the stem fibers. One possibility to induce a movement is to create a certain airflow or wind gusts in a greenhouse or a vertical farm, which simulates the airflow that plants would experience in an open field.

Phototropism is the influence of light on the growth of plants. It can be positive, like for sprouts, or negative, like for roots, i.e. the plants (stem, leafs, blossom) can move and/or bend towards the light or away from the light respectively. Plant growth, growth direction and morphology can also be influenced by irradiation the plant with polarized light.

It is not only that the light fixture or fixtures can illuminate the plants alternatively from opposite directions or be moved linearly across a plant growth area, but that also the intensity and/or of the illumination spectrum can be changed, in particular both together. This can be done with the whole lighting fixture arrangement or also a single light fixture, in order to maximize a phototropic effect in combination with or as a function of plant growth, plant morphology and plant ripeness.

2nd aspect of "Plant Movement": The Agricultural Light Fixture according to the 1st aspect of "Plant Movement", wherein at least one light module is configured to be able to emit light with various intensities and/or spectra.

The maximum intensity values at both sides of the agricultural light fixture or a fixture arrangement can be adjusted to the needs of the plants; the intensity values do not need to be equal at both sides but can vary over time Furthermore, the agricultural light fixture may be configured to have two different intensities: One maximum intensity and one "standard" intensity (which is lower than the maximum intensity). The agricultural light fixture may as well be configured that its intensities can change gradually between a maximum and a minimum value. The difference between maximum and minimum needs to be sufficient to activate the phototropism of the plants. Furthermore, the values for maximum and minimum intensity and their respective durations may be adapted to the required DLI (day light integral) for each plant.

Furthermore, the agricultural light fixture may comprise multiple areal sections that are configured to emit light with different intensities and/or spectra. There could be a left section of the light fixture with a first lighting setting, for example to irradiate plants in the morning cycle with light having a reddish color temperature at about 4000 to 2000 K, a middle section that emits light with a midday daylight having a color temperature of 5000 to 10000 K, and a right section that emits light with a color temperature of about 4000 to 2000 K (sunset condition), depending on the geolocation.

Furthermore, the left and right sections of the agricultural light fixture may be configured to be able to incline or adaptively incline in order to emit light to the plants at a certain (varying) irradiation angle thus mimicking the position of the natural sunlight (circadian condition). Of course, similar cycles may be applied during the night, mimicking moon and starlight.

Furthermore, the agricultural light fixture may be configured to enable changing the form or inclination of the light fixture or of moveable parts of the light fixture in order to change the incoming beam inclination angles and/or distance to the plant within a given lighting period.

3rd aspect of "Plant Movement": The Agricultural Light Fixture according to the 1st or 2nd aspect of "Plant Movement", wherein at least one light module comprises an LED or LED-module.

In a preferred embodiment, the agricultural light fixture comprises LEDs or groups of LEDs, which can be controlled independently in order to enable the local intensity change over time. If the agricultural light fixture is configured such that single LEDs can be controlled, a gradual change of intensity is possible, if only groups of LEDs can be controlled, only a stepwise (specific lighting emitting areas) change of the intensity is possible. The groups of LEDs may be LED modules arranged in the agricultural light fixture. It is also possible to use several agricultural light fixture near each other (arrangement of agricultural light fixture) to realize this local intensity change over time.

4th aspect of "Plant Movement": A Controlled Agricultural System, comprising at least one agricultural light fixture according to one or more of the preceding aspects, wherein the Controlled Agricultural System is configured for controlling the light modules individually or in groups.

5th aspect of "Plant Movement": The Controlled Agricultural System (200) according to the 4th aspect of "Plant Movement", wherein controlling the light modules (110) comprises controlling the intensities and/or the spectrum of the light emitted by respective light modules (110).

6th aspect of "Plant Movement": The Controlled Agricultural System according to the 4th aspect of "Plant Movement", wherein the controlling of the light modules is coordinated such that the at least one agricultural light fixture is able to emit light with an intensity distribution comprising a maximum light intensity.

Therein, the intensity in distributed locally across the light fixture(s), giving a spatial intensity distribution. To induce a (bending) movement of plants using light, the intensity and/or the spectrum of the illumination is changed locally, i.e. across a part of an illuminated cultivated area (target area), over time, thus irradiating a plant from different, in some embodiments/implementations opposite, directions and/or illumination angles.

$7^{th}$ aspect of "Plant Movement": The Controlled Agricultural System according to any of the $4^{th}$ to $6^{th}$ aspect of "Plant Movement", wherein the controlling of the light modules is further coordinated such that the at least one agricultural light fixture is able to move the maximum light intensity with respect to the light emitting surface of the agricultural light fixture.

As an example: Luminaires used in indoor farms usually have an elongated rectangular form, with one side being longer than the other side. In an exemplary embodiment of an agricultural light fixture or an arrangement of agricultural light fixtures according to "Plant Movement", the intensity of the light on the right side may be stronger than on the left side (for instance) at the beginning of the daily illumination period. Then the maximum of the intensity moves towards the left side during the day so that the intensity is stronger at the left side than on the right side at the end of the daily illumination period. Of course, any other rhythm can be chosen, i.e. once per hour, every 6 hours, every 10 hours, every 14 hours. In some embodiments/implementations, the rhythm is an integer factor of the daily illumination period. Alternatively, the agricultural light fixture may be configured that the maximum intensity moves from right to left and back from left to right during one period (although the light patterns can be different).

$8^{th}$ aspect of "Plant Movement": The Controlled Agricultural System according to any one of the $4^{th}$ to $7^{th}$ aspect of "Plant Movement", wherein the controlling of the light modules is further coordinated such that the at least one agricultural light fixture is able to move the maximum light intensity from one light module (M3) to another light module (M4).

$9^{th}$ aspect of "Plant Movement": The Controlled Agricultural System according to any one of the $4^{th}$ to $8^{th}$ aspect of "Plant Movement", further comprising a control unit configured for controlling the light modules of the at least one agricultural light fixture.

In general, the controlled agricultural system may also comprise light guides and/or light reflecting plates, which may be activated or deactivated at certain times and moved in certain positions (height, inclination) with respect to the plant canopy and to provide plant central and/or side illumination (including root lighting). This way, light can be directed to irradiate the plants from different sides or angles and therefore contributes to the described inventive aspect. Activation means to allow light to pass into or onto these guides/plates and/or to activate special light sources that illuminate these light guiding elements.

Furthermore, the agricultural light fixture may be configured to enable changing the spectral composition of light, particularly as a function of the moving location of the maximum value of the light intensity with respect to the light emitting surface. The spectrum may be changed as a function of the intensity or the intensity can be changed as a function of the spectrum during a period. It is also possible that different relation of spectrum and intensity are applied in different periods, e.g. if a period has a length of 4 hours and the daily illumination is 12 hours, then each of the 3 periods could have a different relation of spectrum and intensity.

In a further refinement of "Plant Movement", that comprises a changing spectral composition of light, a cycle that resembles the circadian cycle for sun light and/or a cycle for moon light is applied to the movement of the maximum value of the light intensity.

Furthermore, the light sources that are used for a time-specific maximum light intensity may be operated (at least for certain time intervals) in a pulse mode fashion. The cycles may be determined by the geolocation.

Furthermore, the intensity change of the LEDs or LED modules arranged in the agricultural light fixture may be non-periodic or stochastic.

$10^{th}$ aspect of "Plant Movement": The Controlled Agricultural System according to the $9^{th}$ aspect of "Plant Movement", further comprising a computing device, coupled to the control unit, data storage device, coupled to the computing device, for storing the controlling schemes for the light modules, wherein the computing device is configured to control the light modules of the at least one agricultural light fixture via the control unit, based on the data of the controlling schemes stored in the data storage device.

The computing unit may also be configured to take into consideration the applied light or growth recipes.

Another approach would be to rotate the plants and keep the luminaire static. Rotating could mean to move the plants around the vertically arranged luminaire (e.g. on a circle with the circumferentially illuminating luminaire at its center) or the plants could turn around a central axis thus exposing all sides to the luminaire in a given timeframe. Alternatively, the luminaire may be horizontally arranged and the plants may rotate such that alternately the upper side and the lower side of the plants are illuminated.

$11^{th}$ aspect of "Plant Movement": A method for agricultural management, particularly for breeding, growing, cultivating and harvesting in an agricultural facility, e.g. a plant growing facility, comprising the steps of:

Providing multiple light modules, which can be controlled individually or in groups, Arranging the multiple light modules above the plants arranged in a target area and illuminating the target area, Controlling the light modules to emit light on the target area having an light intensity distribution that comprises a maximum light intensity, Moving the maximum light intensity within the target area.

$12^{th}$ aspect of "Plant Movement": The method for agricultural management according to the $11^{th}$ aspect of "Plant Movement", whereby the multiple light modules are arranged in a row and are controlled such that the maximum light intensity moves from one light module in the row to another light module in the row.

$13^{th}$ aspect of "Plant Movement": The method for agricultural management according to the $11^{th}$ or $12^{th}$ aspect of "Plant Movement", whereby the maximum light intensity of the light intensity distribution is implemented by controlling at least one light module or at most a subset of the multiple light modules of the light fixture such that its light intensity is higher than the light intensity of at least one other light module illuminating the target area.

$14^{th}$ aspect of "Plant Movement": The method for agricultural management according to any one of the $11^{th}$ to $13^{th}$ aspect of "Plant Movement", for controlling a Controlled Agricultural System according to any one of the $4^{th}$ to $10^{th}$ aspect of "Plant Movement".

$15^{th}$ aspect of "Plant Movement": A method for agricultural management, particularly for breeding, growing, cultivating and harvesting in an agricultural facility, e.g. a plant growing facility, comprising the step of:

Moving the plants with respect to a horticulture light fixture such that all circumferential sides of the respective plant is illuminated by the horticulture light fixture during a specified timeframe (cycle time).

16$^{th}$ aspect of "Plant Movement": The method for agricultural management according to the 15$^{th}$ aspect of "Plant Movement", further comprising the step of rotating the plants around a central axis.

17$^{th}$ aspect of "Plant Movement": A computer program product, comprising:

a plurality of program instructions, which when executed by a computing device of a Controlled Agricultural System according to any one of the 4$^{th}$ to 10$^{th}$ aspect of "Plant Movement", cause the Controlled Agricultural System to execute the method for Agricultural Management according to any one of the 11$^{th}$ to 13$^{th}$ aspect of "Plant Movement".

"Spectrum Calculation"

A light recipe can define the photon fluxes in all defined spectral ranges of a light source arrangement of a light fixture ((agricultural) light fixture) at a given time. It can contain a temporal sequence of photon fluxes in all defined spectral ranges, a sequence of ON or OFF illumination states and a program for the dynamic creation of light recipes. Furthermore, a light recipe can set modes of operation of an illumination device, for example constant power operation, pulsed operation, DC operation or AC operation. Furthermore, a light recipe can be generated from a calculation method with the aid of artificial intelligence (AI), for example by virtue of a plant-related assessment scheme of operation and sensor data being created and a light recipe then being generated therefrom and being applied to the illumination devices. Furthermore, a light recipe can not only set the spectral intensities of the light module but can also define the emission characteristics (e.g., beam width, emission angle, polarization) in cooperation with optical elements (e.g., lenses, mirrors, polarizers). Light recipes can also be created in customer-specific fashion. Thus, the light recipes define the optimal spectrum or a (non-ideal) spectrum that approximates an optimal spectrum for an envisaged application. This spectrum can be present as a continuous intensity distribution over the wavelength (or wavenumber), or else as a discrete intensity distribution over certain spectral ranges, wherein the spectrum or spectrums is/are able to be set in a variable, i.e., changeable, manner. Light recipes can also be created under inclusion of local light conditions, for example in the case of a greenhouse illumination (greenhouse lighting).

By way of example, the intensity in the blue range from 400-450 nm should have a certain value, a further value in the range from 450-500 nm and a third value in the range from 600 to 720 nm. A value can have a respective overall radiant flux or a respective PPF (photosynthetic photon flux, i.e., photon flux in the photosynthetically active region (PAR)) value or a respective PPFD (photosynthetically active photon flux density ($\mu mol/(m^2 s)$)) value.

Additionally, the photon flux ratio of spectral range 1 (e.g., blue) to spectral range 2 (e.g., red) and to further spectral ranges can be defined by a light recipe (constant in time or changeable). Naturally, this also applies to any other formation of ratios of spectral ranges (UV, VIS, IR, dark red).

Now, a light recipe can be created for a defined selection (number, arrangement) of light sources. It then controls the activation and deactivation of the light sources.

Now, plant illumination devices can have a different number and arrangement of light sources. Then, there is the need to convert a light recipe, or adapt it to the best possible extent, for other plant illumination devices (light fixtures) with a different number and arrangement of light sources.

The illumination used to illuminate the plants in some embodiments/implementations has LEDs. Here, use can be made of LEDs with different colors, and also in the UV and infrared. The LEDs can be directly emitting or phosphor converted (phosphor converted LEDs: pc-LEDs). Directly emitting LEDs have narrowband spectra with discrete maxima, in which their light intensity is highest. Phosphor converted LEDs have broader spectral ranges with an intensity maximum. The width of a maximum can be defined by way of the FWHM (full width at half maximum) or else by way of the reduction of the intensity at the maximum to $(1/e)^2$. Then, the maximum can be known or determinable as a single value, for example 525 nm.

Consequently, both the spectrum and the spectral ranges in which the spectral maxima lie, and also the maximum values themselves, are known for each LED type. The overall spectrum of the light fixture emerges from the superposition of the spectra of the individual LEDs. A superposition of the spectra can be implemented both in real space and in angle space.

Consequently, the corresponding data are also known for a plant illumination device, and also (where necessary) the data of the geometric arrangement of the light sources and the light fixtures.

1$^{st}$ aspect of "Spectrum Calculation": A controlled agricultural system facilitating the use of a light recipe with different light fixtures, comprising a light fixture with a plurality of light sources, an acquisition unit for capturing parameters of the light fixture and of a light recipe, a computing device connected to the acquisition unit, a control unit connected to the computing device and the light fixture, said control unit configured to convert the data of the computing unit into control signals for the light sources of the light fixture such that the light fixture produces radiation, wherein the computing device is configured to select the suitable light sources from the light sources present in the light fixture and calculate the actuation thereof on the basis of the parameters of the light fixture in such a way that the radiation of the actuated light fixture at least approximates the light recipe.

An object here is to allow a light recipe to be used or adapted in a controlled agricultural system in the case of light fixtures (agricultural light fixtures) of different design. Thus, inter alia, a solution is proposed of how a light recipe can be used, for example, both in the case of a light fixture which only has three different LED colors (e.g., blue, red, dark red) and in the case of a light fixture that has seven different LED colors (e.g., dark blue, light blue, yellow, orange, red, dark red, green). However, the approach is also applicable to nonvisible spectral ranges, such as ultraviolet and infrared, to be precise in combination with visible colors and independently.

2$^{nd}$ aspect of "Spectrum Calculation": The controlled agricultural system as described in the 1$^{st}$ aspect of "Spectrum Calculation", comprising two or more light fixtures, wherein the light sources in the at least two light fixtures differ in one or more of the following criteria: number, maximum intensity, wavelength at the maximum of the emission radiation, spectral width of the emission radiation, spatial distribution of the radiation, angle distribution of the radiation, type of light source.

Thus, the light recipe may be available for a light fixture with a certain combination of LEDs and it should now be used for a light fixture containing the same type of (structurally equivalent) LEDs, albeit in a greater respective number. Thus, for example, a light recipe is designed for maximum emissions of 3 blue and 4 red LEDs of a first light fixture and it should be used in a second light fixture with 4 blue and 5 red LEDs which are structurally equivalent in each case (excess number of in each case structurally identical light sources), then

- only 3 of the 4 blue LEDs and only 4 of the 5 red LEDs of the second light fixture can be used when applying a respective maximum power or
- the light power of the 4 blue LEDs of the second light fixture is reduced overall by a factor of % (i.e., by 25%), wherein the individual LEDs of the 4 blue LEDs may be actuated differently and the reduction factor of % must only arise in the sum; and the 5 red LEDs must be impinged by the overall factor of 4/5 (i.e., a reduction by 20%). Thus, the light power is reduced by the ratio of the original number of LEDs and to the new number of LEDs. A change in the light power, suitable to this end, by way of the current (increase, decrease) or a modulation of the operational data is known.

If a fewer number of light sources (e.g., LEDs) of the same design in each case are present in the second light fixture, the fewer number must have a stronger electrical impingement by a factor; i.e., in the case of X blue LEDs of the first arrangement and Y (less than X) blue LEDs of the second arrangement, the Y blue LEDs must be impinged more strongly by a factor of X/Y. A change in the light power, suitable to this end, by way of the current (increase, decrease) or a modulation of the operational data is known.

Should a higher impingement prove impossible (operational safety, service life of the LEDs), then, optionally, the light recipe may be modified and/or the associated irradiation may be applied for longer. An analogous statement also applies in the first case, if a reduction in the operational values is not possible (then, where applicable, the light recipe would have to be applied for a shorter time (provided this is beneficial to the product)).

Naturally, this method also applies to other configurations of structurally equivalent LEDs.

3rd aspect of "Spectrum Calculation": The controlled agricultural system as described in the 2nd aspect of "Spectrum Calculation", wherein the computer device is configured to respectively calculate a selection of the light sources for the light fixtures with various light sources and the actuation thereof in such a way that the radiation of the various light fixtures at least approximates the light recipe.

An approximation method is used should a situation arise in which the second light fixture does not comprise structurally equivalent light sources, e.g., LEDs, i.e., in which said second light fixture cannot exactly reproduce the predetermined light spectrum. To this end, the light sources used in the respective light fixture, the number of said light sources, operational data, spectral data and maximum values being known to a control unit of the light fixture, are transmitted to a computing device (software program), which then is able to simulate a variation space of all (or most) possible spectral combinations (simulation points). These simulation points are then compared to the target spectrum or target data of the light recipe, for example using the method of the least squares between calculated simulation points and target data, or of the smallest distance from the overall CIE value of the target light recipe, or of the spectral-range-specific photon fluxes. Then, the configuration (operation of those light sources of the second light fixture) which is closest to the target spectrum or the target data is selected. This setting can be adapted during the scope of the irradiation duration to the requirements of the products (growth, morphology, maturing).

These methods described in 1. to 3. can be applied both to light recipes that are not changeable in time and to light recipes that are changeable in time. Furthermore, the methods described in 1. to 3. can also be used for different types of light sources, for example the combination of organic LEDs (OLEDs) with inorganic LEDs, or with inclusion of LARP (laser-activated remote phosphor) light sources, and with inclusion of conventional light sources such as discharge and incandescent lamps.

Furthermore, it is possible to prescribe limits for the allowed deviations in the respective spectral ranges. This is due to the fact that some ranges of the spectrum (e.g., in the blue and in the red and also in the green when producing plant-based content) are particularly critical for the quality of a plant, for example when forming enzymes, vitamins, etc. Here, for example, even a small deviation of the light power can lead to relatively large changes (morphology, nutritional value) in the plant.

Consequently, a method is provided, by means of which a light recipe, which has been defined for a light fixture, can be transferred to a second light fixture of a different design. To this end, the respective light fixture parameters (number and type of the light sources, possibly also the arrangement thereof and the type and arrangement of optical elements) are made available to a control unit (light control unit) or a computing device of the light fixtures or of the controlled agricultural system. Here, the computing device may also be referred to as a "transformation unit", since it transforms a light recipe into another light recipe that is as equivalent as possible, i.e., it makes a light recipe applicable to a second light fixture of a different design. To this end, the method according to this element of the disclosure includes a transformation prescription, which, based on the light fixture parameters, undertakes the transformation of a light recipe for a first light fixture to a light recipe for a second light fixture that differs from the first light fixture. A transformation matrix can be stored and distributed in a data network. Here, a first light fixture and a second light fixture can be spatially separated, for example at different locations in irradiation devices in plant breeding and/or growing facilities.

In a further configuration, this method renders it possible to apply a generic light recipe, which emerges, for example, from the ideal conditions of growing and/or breeding plants, to a light fixture, the properties of which (type and number of light sources) are not known in advance. Here, the generic light recipe may be present only in the form of intensity over wavelength (or wavenumber), either continuously or as discrete values for certain wavelength ranges. This would correspond to a light recipe for a light fixture, in which the number of different LED colors corresponds to the number of wavelength ranges in which the spectrum was stored. Thus, method 3 would be applied here.

4th aspect of "Spectrum Calculation": The controlled agricultural system as described in any one of the preceding aspects, wherein the light sources of the light fixtures comprise LEDs.

5th aspect of "Spectrum Calculation": An agricultural method, comprising:

a light recipe for a first light fixture (first light-fixture-specific light recipe), a controlled agricultural system comprising a second light fixture that differs from the first light fixture, and the following method step:

transforming the light recipe for the first light fixture into a light recipe for the second light fixture (second light-fixture-specific light recipe).

6th aspect of "Spectrum Calculation": The agricultural method as described in the 5th aspect of "Spectrum Calculation", wherein the transformation includes one or more of the following method steps:

selecting suitable light sources from the light sources available in the second light fixture, establishing the required spectral-range-specific light intensities of the respective light sources, establishing the required control signals for the respective light sources, applying the control signals to the respective light sources.

The above-described methods are also applicable to an arrangement of a plurality of light fixtures.

Finally, provision can also be made for the computer device to notify the user if a light recipe cannot be reproduced within a tolerance range by way of a light fixture. Additionally, there beyond, provision can also be made for the computing device to provide the user with propositions for a suitable modification of the existing light fixture, for example by complementing it with further light sources, or for a suitable new light fixture.

"Extended Recipes"

The present disclosure relates to a Controlled Agricultural System, an Agricultural Light Fixture for use in a Controlled Agricultural System and a Method for Agricultural Management.

Light recipes specify the spectrum, the light intensity (i.e. photon flux) and how long and at what times a specific light recipe is to be applied to a plant species. Usually, all relevant parameters are converted into respective currents or current modifying settings like PWM modulation, On/Off cycles and the like, which drive the light sources of a horticultural light fixture such that the light emitted by the horticultural light fixture reproduces the specific, desired, light recipe as good as possible.

High light intensities of light fixtures (brightness/luminance) typically require high driver currents causing high energy consumption. This may raise economical issues due to ever increasing energy costs as well as ecological concerns.

However, providing the intensity of the illumination (illuminance; or more plant specific: photosynthetic photon flux density [PPFD]) currently required by the light recipe may also be achieved in another manner, especially by bringing the horticultural light fixtures closer to the plants and/or by adjusting or modifying optical devices of the light fixtures, for example so that the illumination is more focused on parts of the cultivated area, on the plants or even on parts of the plants.

1st aspect of "Extended Recipes": A Controlled Agricultural System, particularly for breeding, growing, cultivating and harvesting in an agricultural facility, particularly a plant growing facility and/or an aquaponics facility, comprising:

An agricultural light fixture arranged above an area cultivated with plants for illuminating the plants, An actuator device configured to be able to control the position/alignment of the agricultural light fixture, A computing device configured to control the brightness of the agricultural light fixture and to control the actuator device in order to effectuate an intensity of the illumination (illuminance) on the plants or parts of the plants according to a light recipe for the plants.

It is an advantage of "Extended Recipes" to safe energy by reducing the standard current setting (i.e. brightness) of a horticultural light fixture normally required according to the light recipe, and still keeping the illumination on the plants compliant to the light recipe. This is achieved by adjusting and/or modifying a horticultural light fixture, for example, by bringing the light fixture closer to the plants, according to the light recipe.

Therefore, "Extended Recipes" proposes a controlled agricultural system, comprising an agricultural light fixture, which agricultural system is configured to be able to control the position and/or orientation and/or shape of the agricultural light fixture with respect to the plants and/or adapt an optical device, arranged downstream of the light sources of the agricultural light fixture, according to the light recipe.

For this purpose, the controlled agricultural system further comprises a computing device and a data storage device. The data storage device comprises the respective light recipe for the plant species. The computing device is configured to be able to access the data of the light recipe (i.e. current light spectrum, intensity and duration of exposure to light irradiation) from a data storage device.

2nd aspect of "Extended Recipes": The Controlled Agricultural System according to the 1st aspect of "Extended Recipes", wherein the actuator device comprises means for lowering or raising or aligning or moving or bending the agricultural light fixture with respect to the cultivated area.

Furthermore, the computing device is configured to be able to compute a position/alignment of the agricultural light fixture that results in a higher light intensity as originally prescribed according to the light recipe. Particularly, the agricultural light fixture may be moved closer to the plants. Moving closer may be accomplished by moving the agricultural light fixture vertically closer, i.e. reducing the distance above the plants, and/or laterally closer, i.e. reducing the distance at the side of a respective plant. Concurrently, the current for the light sources, e.g. LEDs, may be reduced, compared to the current setting originally necessary, such that the resulting light intensity illuminating the plants in the target area matches with the light intensity according to the light recipe, while at the same time using less energy to realize the intended illumination target value.

3rd aspect of "Extended Recipes": A Controlled Agricultural System, particularly for breeding, growing, cultivating and harvesting in an agricultural facility, particularly a plant growing facility and/or an aquaponics facility, comprising:

An agricultural lighting fixture arranged above an area cultivated with plants for illuminating the plants, comprising an optical device for adjusting the intensity of the light emitted by the agricultural lighting fixture during illumination, An actuator device configured to be able to control the optical device of the agricultural light fixture, A computing device configured to control the brightness of the agricultural light fixture and to control the actuator device in order to achieve an intensity of the illumination (illuminance) on the plants or parts of the plants according to a light recipe for the plants.

The optical device of the agricultural light fixture may be adjusted to focus the illumination more on the plants, for example by narrowing or widening the beam angle/spread. Furthermore, depending on the size of the plants, it may be necessary to adjust the optical device such that after moving the agricultural light fixture closer to the plants the illuminated area is still sufficiently large. The computed new position and/or shape of the agricultural light fixture and—as the case may be of the optical device—is sent by the computing device to a control unit, which controls the agricultural light fixture and/or optical device correspondingly.

The optical device may be adjusted by moving lenses of a lens system or by using an adaptable lens, the focal length of which can be adjusted by changing the curvature of the surface of the lens. Alternatively, reflective optical means may be used to adjust the focusing properties of the optical device.

$4^{th}$ aspect of "Extended Recipes": The Controlled Agricultural System according to the $3^{rd}$ aspect of "Extended Recipes", wherein the optical device comprises one or more of the following:

A lens with adaptable focal length (e.g. by adjusting the curvature of the lens), a lens system, comprising two lenses, which are movable with respect to one another, a reflector.

$5^{th}$ aspect of "Extended Recipes": The Controlled Agricultural System according to any one of the preceding aspects, further comprising a data storage device connected to the computing device, the data storage device comprising a light recipe for the plant to be illuminated.

The data storage device may furthermore contain information on how mechanical changes of the position/alignment of the agricultural light fixture or the optical device of the agricultural light fixture influence the illumination, i.e. the photon flux at the plants. Thus, it is possible to calculate the feasible reduction of brightness of the light sources and, therefore, of the current setting for the light sources achieving a lower power consumption, due to mechanical changes of the position/alignment/shape of the agricultural light fixture and/or its optical device (or vice versa), and still being compliant with the light recipe.

$6^{th}$ aspect of "Extended Recipes": The Controlled Agricultural System according to the $5^{th}$ aspect of "Extended Recipes", wherein the light recipe further comprises parameters that control supplemental functions in an agricultural facility (extended light recipe).

Thus, besides changing the mechanical or optical properties of the agricultural light fixture, further parameters of the agricultural facility (e.g. greenhouse, vertical farm) may be adjusted in order to meet the requirements of the light recipe. For instance, the temperature inside the agricultural facility may be adjusted, because the temperature influences the growth rate at a predefined light intensity Furthermore, the light recipes may comprise parameters that control supplemental functions in the agricultural facility (extended light recipe). For instance, the extended light recipes may comprise parameters that specify the proper adjustment of the position of the agricultural light fixture or of its optical device without the need of computing such parameters from the light intensity data.

$7^{th}$ aspect of "Extended Recipes": The Controlled Agricultural System according to the $6^{th}$ aspect of "Extended Recipes", wherein the extended light recipe comprises parameters that specify the proper adjustment of the position/alignment of the agricultural light fixture or of its optical device.

$8^{th}$ aspect of "Extended Recipes": The Controlled Agricultural System according to the $6^{th}$ or $7^{th}$ aspect of "Extended Recipes", wherein the extended light recipe further comprises parameters that control any one of the following: polarization, collimation or coherence of the light emitted by the agricultural light fixture, environmental temperature, humidity.

To summarize, the light recipes may comprise parameters that control any one of the following: polarization, collimation or coherence of light, environmental temperature, humidity. A light recipe may further comprise adaptive irradiation settings as a function of plant growth, shape and fruition. Therefore, distance, inclination, adjustment of optical part can be regulated depending on irradiation time or measured plant growth/shape and the like.

$9^{th}$ aspect of "Extended Recipes": The Controlled Agricultural System according to any one of the $6^{th}$ to $8^{th}$ aspect of "Extended Recipes", wherein the actuator device is further configured to be able to control the supplemental functions.

$10^{th}$ aspect of "Extended Recipes": A method for agricultural management, particularly for breeding, growing, cultivating and harvesting plants arranged in a cultivated area in an agricultural facility, e.g. a plant growing facility, comprising:

A light recipe and an agricultural light fixture for illuminating plants, and the steps of:

Illuminating plants with the agricultural light fixture according to the light recipe;

Decreasing the distance between the agricultural light fixture and the plants by lowering the horticultural light fixture down closer to the plants, while reducing the brightness of the agricultural light fixture to keep the illumination on the plants specified by the light recipe constant.

$11^{th}$ aspect of "Extended Recipes": A method for agricultural management, particularly for breeding, growing, cultivating and harvesting plants arranged in a cultivated area in an agricultural facility, e.g. a plant growing facility, comprising:

A light recipe and an agricultural light fixture for illuminating plants, whereby the agricultural light fixture comprises an optical device configured to be able to focus the illumination on parts of the cultivated area and/or on parts of the plants, and the steps of:

Illuminating plants with the agricultural light fixture according to the light recipe;

Adjusting the optical device to focus the illumination more, e.g. on parts of the cultivated area, on the plants and/or on parts of the plants, while reducing the brightness of the agricultural light fixture to keep the illumination on the plants specified by the light recipe constant.

$12^{th}$ aspect of "Extended Recipes": The method for agricultural management according to the $10^{th}$ and/or $11^{th}$ aspect of "Extended Recipes", for controlling a Controlled Agricultural System according to any one of aspects 1-9.

$13^{th}$ aspect of "Extended Recipes": A computer program product, comprising:

a plurality of program instructions, which when executed by a computer system of a Controlled Agricultural System according to any one of the $1^{st}$ to $9^{th}$ aspect of "Extended Recipes", cause the Controlled Agricultural System to execute the method for Agricultural Management according to any one of the $10^{th}$ to $12^{th}$ aspect of "Extended Recipes".

"Light Recipe & VLC"

$1^{st}$ aspect of "Light Recipe & VLC": A Controlled Agricultural System comprising a first light fixture with a light source for agricultural lighting, wherein the Controlled Agricultural System is configured for modulating an emission of the light source to transmit data via this modulated signal.

The modulation can for instance be achieved by modulating the intensity, for instance by superimposing an intensity change or by switching off the light source for short intervals. The modulation can also be achieved by a pulse modulation, for example a Pulse Width Modulation (PWM), a Pulse Frequency Modulation, a Pulse Code Modulation or a Pulse Phase Modulation. The modulated signal can be received by a photodiode, and the data contained in the signal is available after a demodulation.

Accordingly, the lighting appliance of the agricultural system or farm can be used for transmitting data to other appliances, for instance control data to trigger actuators, for example for irrigation, manuring, heating/ventilation or the like, or to trigger a transportation of plant boxes from one lighting station to the next, or to trigger bendable or moveable fixtures to change their form, position or inclination. Using the light source intended for the agricultural lighting also for the data transmission can reduce the overall number of components and the complexity of the system, too. For instance, the wiring effort can be reduced.

$2^{nd}$ aspect of "Light Recipe & VLC": The Controlled Agricultural System of the $1^{st}$ aspect of "Light Recipe & VLC", comprising a second light fixture configured for receiving the modulated signal and thus the data from the first light source.

In some embodiments/implementations, the controlled agricultural system is configured for transmitting lighting parameters via the modulated signal from the first light fixture as a master to the second light fixture as a slave, but a mesh configuration can also be possible. A computing device can be connected to the first light fixture, for instance directly or via a light control unit. The connection between these components can be wireless or wire based, combinations are possible as well. Upon receiving the lighting parameters from the computing device or the light control unit, the first light fixture can emit the modulated signal for transmitting these lighting parameters to the other light fixtures. The computing device or the light control unit can be an integral part of a lighting fixture. This transmission can happen immediately upon receiving the lighting parameters from the computing device, but also after a predefined or stochastic time interval. Such a data set can contain a fixture identifier so that just the related (second) fixture responds to that data set, supposed second fixture has such an (electronic, software code) identifier and respective detection units.

$3^{rd}$ aspect of "Light Recipe & VLC": The Controlled Agricultural System according to the $1^{st}$ or $2^{nd}$ aspect of "Light Recipe & VLC", comprising a computing device connected to the first light fixture, the Controlled Agricultural System being configured for transmitting lighting parameters via the modulated signal from the first light fixture as a master to the second light fixture as a slave.

Upon receiving the lighting parameters from the first light fixture, the emission of the second light fixture can be adapted respectively. In particular, a light control unit of the second light fixture can amend the emission as required. This light control unit is connected to the second light fixture, and is connected to a sensor device (e.g. a photodiode) for receiving the modulated signal or comprises such a sensor device as an integral part.

The master/slave architecture can be advantageous in terms of a flexible setup of the agricultural system or farm. For instance, in case that additional lighting fixtures are required for an extension of the farm, those can be installed as slaves. Likewise, the lighting of a large number of light fixtures can be aligned and/or synchronized rather automatically. Advantageously, if required, an additional light fixture can be put in place and receives the lighting parameters to be applied, a connection to the power supply being the only installation necessary. Agricultural lighting fixtures can build up a network that may comprise sub-networks, that is, grouped fixtures that can be addressed with the same data set command.

$4^{th}$ aspect of "Light Recipe & VLC": The Controlled Agricultural System according to the $3^{rd}$ aspect of "Light Recipe & VLC", comprising a further light fixture, wherein the Controlled Agricultural System is configured for modulating an emission of a light source of the second light fixture for transmitting the lighting parameters from the second light fixture to the further light fixture as a slave.

In general, but also in the master/slave setup, also the second light fixture can be adapted for a modulated emission and for transmitting data via this modulated signal to a third fixture and/or back to the first fixture and/or to any other agricultural device (as described above). This also enables a feedback loop. The second light fixture can for instance transmit growth data of the plants illuminated or other local parameters to the first light fixture (and the computing device thus). On the other hand, the second light fixture can be used as an amplifier or distributor, namely for transmitting the lighting parameters to further light fixtures arranged at a larger distance from the first light fixture. In particular, this enables a transmission of the lighting parameters from the first light fixture (master) to light fixtures provided as slaves, even when the latter are not illuminated by the first light fixture directly, thus enabling a data distribution network.

In general, the spectral composition of the emitted light could be adaptively adjusted or fixed. Then, the lighting parameters can for instance be intensity values. Preferably, the light fixtures are adapted for an illumination with different spectral properties (with different light source types, see below) so that the lighting parameters are also spectral parameters (in addition to intensities). Spectral parameters can include other optical data, for example the polarization of the emitted spectrum.

Basically, the light emitted by a light fixture for agricultural lighting can be monochromatic light (FWHM<25 nm, or case of a laser light source<5 nm) or narrow band radiation (FWHM<50 nm) or broadband radiation (FWHM>100 nm) or a mixture thereof. The term "light" shall comprise spectral ranges outside the visible light spectrum. Respective non-visible spectral ranges can be infrared and/or UV.

$5^{th}$ aspect of "Light Recipe & VLC": The Controlled Agricultural System according to one of the preceding aspects, comprising an actuator device for providing at least one of irrigation, manuring, heating, ventilation and air conditioning to plants grown in the Controlled Agricultural System, the Controlled Agricultural System being configured to trigger the actuator device by the modulated signal emitted by the first light source.

This can be an alternative or a supplementation to the communication amongst the light fixtures. The actuator device can be a robot or vehicle, in particular a self-driving vehicle, but also a stationary appliance. The actuator device can comprise a sensor device, in some embodiments/implementations a photoelectrical sensor, for receiving the modulated signal. The modulated signal can be received by the actuator device directly or by an external receiving unit connected to the actuator device via an interface.

In some embodiments/implementations, the actuator device is adapted for providing irrigation, manuring, heating, ventilation and/or air conditioning to the plants grown in the farm or to trigger a transportation of plant boxes from one lighting station to the next, or to trigger bendable or moveable fixtures to change their form, position or inclination. Via the modulated signal, the actuator device can be triggered to adjust at least one of the respective conditions, for instance based on a light recipe applied.

6th aspect of "Light Recipe & VLC": The Controlled Agricultural System according to the 5th aspect of "Light Recipe & VLC" in combination with the 3rd or 4th aspect of "Light Recipe & VLC", the Controlled Agricultural System being configured for transmitting based on a growth status of plants grown in the Controlled Agricultural System a light recipe, namely various lighting parameters via the first light fixture to the second light fixture or fixtures and various actuation parameters to the actuator device.

A "light recipe" can define lighting conditions. It can contain information and executable commands that control the light intensity and/or wavelength/spectral composition. A light recipe can be adaptive, namely depend on external trigger signals or feedback loops, particularly depending on the growth status of the plants. In other words, a light recipe contains a data set that provides for every point in time operational data to enable a lighting fixture to emit the required spectral composition and spectral intensities.

In some embodiments/implementations, the modulation of the signal is used for transmitting a light recipe via the modulated signal. In particular, the first light fixture can be used for transmitting lighting parameters to second light fixtures and actuation parameters to the actuator device, both based on the growth status of the plants.

7th aspect of "Light Recipe & VLC": The Controlled Agricultural System according to one of the preceding aspects of "Light Recipe & VLC", wherein the first light fixture comprises light sources of different types with different spectral properties, a control unit for modulating the emission being configured to modulate the emission of the different light source types in at least in one mode of operation simultaneously.

Thus, the light fixture(s) comprise(s) light sources of different types. The different types differ in their spectral properties (e. g. green, red, far red and so on).

In some embodiments/implementations, a control unit for modulating the emission is configured to modulate the different light source types simultaneously, at least in one mode of operation. For instance, the green, red and far red light sources can be modulated simultaneously. In some embodiments/implementations, in this mode of operation, all light source types are modulated. In other words, the whole electromagnetic spectrum of the first light fixture is modulated, the data being contained at every wavelength of the spectrum. The control unit for modulating the emission can be a separate device provided between a computing device and the light fixture. However, it can also be an integral part or function, for instance of the computing device or the light control unit.

8th aspect of "Light Recipe & VLC": The Controlled Agricultural System according to one of the preceding aspects of "Light Recipe & VLC", wherein the first light fixture comprises light sources of different types with different spectral properties, a control unit for modulating the emission being configured to leave the emission of at least one light source type unmodulated in at least in one mode of operation while the emission of at least one other light source type is modulated.

The modulation is applied selectively in an interval of the light fixture's spectrum. For instance, only one light source type (e.g. green) can be modulated while the other light source types are not modulated. A modulation in groups is also possible, so that for instance green and yellow are modulated while red is not modulated, or vice versa. It is also possible to switch the modulation from one colour to another in a predetermined way but also in a freely selectable manner including a stochastic switch between various colours.

9th aspect of "Light Recipe & VLC": The Controlled Agricultural System according to one of the preceding aspects of "Light Recipe & VLC", wherein the first light fixture comprises light sources of different types with different spectral properties, the Controlled Agricultural System being configured for applying a light recipe, namely various lighting parameters depending on a growth status of plants grown in the Controlled Agricultural System, and wherein a control unit for modulating the emission is configured to modulate different light source types based on the light recipe.

In a preferred embodiment, the control unit for modulating the emission is configured to modulate different light source types based on the light recipe. Thus, the modulation and communication depend on the light selected for the illumination. When the latter changes according to the light recipe, another light source type or other types are chosen for the modulation. The communication switches to a different colour. In case that more than one light source type is used for the lighting, the one having the highest intensity can be chosen for instance.

10th aspect of "Light Recipe & VLC": The Controlled Agricultural System according to one of the preceding aspects of "Light Recipe & VLC", wherein the first light fixture comprises light sources of different types with different spectral properties, a control unit for modulating the emission being configured to modulate the light source types differently in a last one mode of operation, different data being transmitted via the different light source types.

Accordingly, having different light source types at hand is used for a multichannel communication. For instance, one light source type and spectral range can be used for transmitting lighting parameters to the other light fixtures. Another light source type and spectral range can be used for transmitting actuation parameters to an actuator device. Accordingly, the respective data transmitted via the respective light source type can contain only the information necessary for the devices of the respective channel. This allows reducing the losses resulting from the modulation in terms of the lighting of the plants.

11th aspect of "Light Recipe & VLC": The Controlled Agricultural System according to one of the preceding aspects of "Light Recipe & VLC", configured for monitoring a reduced lighting of plants grown in the Controlled Agricultural System, which results from the modulated emission.

For instance, the total or a wavelength-specific photon flux can be measured. In some embodiments/implementations, the off-time or reduced emission time is derived directly from the control unit for modulating the emission.

In some embodiments/implementations, a countermeasure for compensating the reduced emission is taken, depending on a threshold value for instance, the light recipe can be modified, particularly the intensity can be increased. Alternatively or in addition, the overall duration of the lighting can be increased, and/or the distance between a lighting fixture and the irradiated plant can be reduced and/or the orientation of a fixture can be adjusted.

12th aspect of "Light Recipe & VLC": The Controlled Agricultural System according to the 11th aspect of "Light Recipe & VLC", configured for compensating the reduced lighting by adjusting at least one of a light recipe, an overall intensity and an overall duration of the lighting.

13th aspect of "Light Recipe & VLC": The Controlled Agricultural System according to one of the preceding aspects of "Light Recipe & VLC", the first light fixture comprising light sources of different types, wherein the emission of at least one light source type lies outside the visible spectral range, and wherein a control unit for modulating the emission is configured to modulate at least in one mode of operation the at least one light source type outside the visible spectral range.

The light source type having an emission outside the visible spectral range, for instance an UV or IR light source. In some embodiments/implementations, the emission of this light source type is modulated in at least one mode of operation so that the non-visible light is used for transmitting data.

14th aspect of "Light Recipe & VLC": The Controlled Agricultural System according to the 11th and 13th aspect of "Light Recipe & VLC", optionally in combination with the 12th aspect of "Light Recipe & VLC", configured for compensating the reduced lighting by switching into the at least one mode of operation in which the at least one light source type outside the visible spectral range is modulated.

Thus, the non-visible spectral region is modulated when the aforementioned losses in the visible spectral range become too large.

15th aspect of "Light Recipe & VLC": A Method for Controlling a Controlled Agricultural System according to one of the preceding aspects, wherein an emission of the light source is modulated to transmit data via this modulated signal.

16th aspect of "Light Recipe & VLC": A Computer program product, comprising:

a plurality of program instructions, which when executed by a computing device of a Controlled Agricultural System according to any one of the 1st to 14th aspect of "Light Recipe & VLC", cause the Controlled Agricultural System to execute the Method of the 15th aspect of "Light Recipe & VLC".

"Temperature Control"

"Temperature Control" proposes a method of how temperature conditions can be changed or adjusted to counter-influence (negative), keep or enhance (positive) Plant Growth or plant Time-to-Harvest conditions affected by the local temperature (or integral local temperature) settings at the location of a plant.

Temperature control units for agricultural facilities like horticulture farms, vertical farms or greenhouses usually try to keep the temperature at a certain, constant level. If the temperature rises above the level (e.g. in greenhouses on a very sunny day), measures are taken to reduce the temperature (e.g. open the windows to create air ventilation, or start a cold liquid irrigation system). If the temperature rises below a certain level, a heating device is switched on to restore the target temperature in the agricultural facility.

Horticultural lighting fixtures produce an enormous amount of heat. For example, the control systems of vertical farms may try to keep a constant (vertical) temperature in the building. However, due to the large number of illuminations units and other electrical equipment, which produce heat, and the large dimensions of typical vertical farms, it is unavoidable, that the temperature under the ceiling is higher than on the ground (as warm air is lighter and moves up [natural heat convection]). Therefore, the temperature conditions in soil and air (and possibly also the water irrigation temperature) is different at different height levels.

Temperature, however, has an influence on the growth of plants. Some plants like petunia or verbena need less time to flowering the higher the temperature is. However, petunia grow faster the higher the temperature is, whereas verbena grow faster the lower the temperature is. Other plants like salvia have a maximum growth rate at about 22° C., whereas they grow slower for higher and lower temperatures.

Example Petunia Coral Pink

The following shows the respective time to flower (days) at four different temperatures (14, 17, 20, 23 [° C.]) and four different DLI (daily light integral) values (5, 10, 15, 20 [mol/m$^2$d]):

Time to flower at 14° C.: at 5 mol*m−2*d−1: more than 80 days

Time to flower at 17° C.: at 5 mol*m−2*d−1: ca. 48 days

Time to flower at 20° C.: at 5 mol*m−2*d−1: ca. 35 days

Time to flower at 23° C.: at 5 mol*m−2*d−1: ca. 30 days

Time to flower at 14° C.: at 10 mol*m−2*d−1: ca. 65 days

Time to flower at 17° C.: at 10 mol*m−2*d−1: ca. 40 days

Time to flower at 20° C.: at 10 mol*m−2*d−1: ca. 30 days

Time to flower at 23° C.: at 10 mol*m−2*d−1: ca. 28 days

Time to flower at 14° C.: at 15 mol*m−2*d−1: ca. 50 days

Time to flower at 17° C.: at 15 mol*m−2*d−1: ca. 35 days

Time to flower at 20° C.: at 15 mol*m−2*d−1: ca. 28 days

Time to flower at 23° C.: at 15 mol*m−2*d−1: ca. 23 days

Time to flower at 14° C.: at 20 mol*m−2*d−1: ca. 42 days

Time to flower at 17° C.: at 20 mol*m−2*d−1: ca. 30 days

Time to flower at 20° C.: at 20 mol*m−2*d−1: ca. 25 days

Time to flower at 23° C.: at 20 mol*m−2*d−1: ca. 20 days

These examples illustrate how the temperature influences the growth, particularly the time to flower.

Plants, however, do not only require a stable temperature, they also require certain, regular changes in temperature. For example, the circadian clock of plants is sensitive to temperature. Many processes of the plant are controlled by the circadian clock. Some other plants, for example, require low temperature to be able to complete their development cycle. This phenomenon is known as vernalization and can imply weeks at low temperature, typically between 5 and 10° C., for a plant to be able to flower.

To improve the yield and the quality of plants in an agricultural facility, it is thus necessary to provide an agricultural system, which sets the temperature of the agricultural facility in a controlled way. The controlled way does not target a stable temperature over the whole time until harvest, but it targets regular temperature modifications or changes in a proper and consistent manner.

1st aspect of "Temperature Control": A controlled agricultural system, particularly for plant breeding, growing, cultivating and harvesting in an agricultural facility, comprising:

a sensor device, comprising temperature measuring means able to measure the (local) temperature, in some embodiments/implementations at various locations, in the agricultural facility, an actuator device, comprising temperature influencing means able to influence/change the temperature in the agricultural facility, a data storage device for storing growth settings for plants, the growth settings comprising temperature profiles (temporal and/or spatial), a computing device, configured to fetch a growth setting for a respective plant species from the data storage device, the computing device, further configured to adjust the temperature in the agricultural facility according to the temperature profile of the growth setting by means of the sensor device and the actuator device.

The computing device may contain the growth settings, e.g. in a database (local, remote or cloud), for a specific plant. These settings can be fix (preset/default). Furthermore, the computing device may also have an interface so that the user can choose the respective plant and the computing device picks the required growth settings, or the user can pick the growth settings directly via the interface. The growth settings can be different for each plant species.

Temperature adjustments can be conducted in a smooth way (low change gradient) or at a higher pace or in discontinues ways (jumps).

The growth settings comprise a temperature profile over time (temporal temperature profile). This temporal temperature profile can be defined to support the circadian rhythm of the plant, i.e. it repeats itself after a certain time (e.g. 24 hours). A temperature profile may include higher temperatures during the daytime and lower temperatures during the nighttime of the plant (as plants can be grown in vertical farms, the daytime of the plant can be night time outside, as electrical power is cheaper during the night).

This allows supporting the circadian rhythm of the plant. Of course, the time shift between the temperature profile and the natural circadian cycle can be freely adjusted. It is also possible, to set the 'artificial circadian' cycle to longer values than the ones for the (local) natural circadian cycle, or even to multiples of the natural circadian cycle. Also, the duration (hours) of 'day' vs. 'night' can be freely adjusted.

The temperature profile can also have different settings for different growth phases of the plants like germination, growing, flowering etc. Here the overall temperature profile for one growth phase can have higher or lower average temperatures as for another growth phase of the plant. Furthermore, the daily difference between maximum and minimum temperature as well as the absolute values of the temperature profile can be different for different growth phases of the plants.

It is of course also possible, to locally set or adjust the temperature settings (spatial temperature profile), e.g. in the soil and at the plant top, differently, i.e. to keep or change a temperature gradient across the height of a plant (vertical temperature profile).

2$^{nd}$ aspect of "Temperature Control": The Controlled Agricultural System according to the 1$^{st}$ aspect of "Temperature Control", wherein the temperature influencing means are configured to influence the temperature differently in different locations of the agricultural facility.

3$^{rd}$ aspect of "Temperature Control": The Controlled Agricultural System according to the 1$^{st}$ or 2$^{nd}$ aspect of "Temperature Control", wherein the computing device is further configured to keep or change a vertical temperature profile across the height of the agricultural facility or of plants.

The controlled agricultural system can further comprise an actuator for influencing/changing/adjusting/controlling the temperature (temperature influencing means), i.e. a heating and cooling system like an HVAC (heating, ventilation and air conditioning), a heating pipe, IR (infrared)-radiator, etc. In a vertical farm setting, the temperature influencing means can be different at different height levels, e.g. irrigation, cool airflow, wind channels, heat shields. Heat can also be applied by irradiating the plants with Infrared radiation in the wavelength range between 850 and 4000 nm, or longer. Local heating can be applied by using e.g. a moveable infrared laser device that emits IR-radiation on selected plants or selected groups of plants, or at a certain position on the plant (root, buds, petals, etc.). Cooling airflow can be applied through ducts along the plants or by focused jet streams.

4$^{th}$ aspect of "Temperature Control": The Controlled Agricultural System according to any one of the preceding aspects, wherein the temperature influencing means of the actuator device are moveable and/or mobile.

5$^{th}$ aspect of "Temperature Control": The Controlled Agricultural System according to any one of the preceding aspects, wherein the temperature influencing means of the actuator device comprise one or more of the following means: heating device, cooling device, HVAC, heating pipe, IR-radiator, irrigation, cool/warm airflow, wind channel, heat shields.

Furthermore, the controlled agricultural system comprises temperature sensors that are used to measure the temperature and provide the information to the computing device. Based on this information, the computing device determines the difference between actual and target values and initiates a respective heating or cooling of the agricultural facility. The sensors and actuators may be controlled by respective control units.

The controlled agricultural system may also comprise sensors to detect ambient lighting, or other ambient environmental conditions such as CO2-content in the air. This may be used to align or correlate the temperature-initiated circadian rhythm with the light-induced circadian rhythm of the plants. Additional sensors and actuators may be used to monitor and adjust (within meaningful ranges/boundaries) other correlations, e.g. between temperature settings and the Daily Light Integral (DLI) or the Red/Far-Red Photon Flux Ratio, or the amount of applied fertilizers or pesticides. Furthermore, temperature conditions can be changed as a function of energy prices.

6$^{th}$ aspect of "Temperature Control": The Controlled Agricultural System according to any one of the preceding aspects of "Temperature Control", wherein the sensor device further comprises one or more sensors able to detect the growth status (shape, size, color, etc.) of the plants, e.g. imaging devices like cameras.

Thus, the controlled agricultural system may also comprise sensors to detect the growth state of the plants, e.g. cameras, including thermal and hyperspectral cameras. If a certain growth state is detected, the computing device may switch the growth settings accordingly.

In another embodiment of "Temperature Control", the computing device has an internal clock (or is connected to an external clock) and determines only based on the time passed and the kind of plant (species) when a new growth state of the plant will begin.

7$^{th}$ aspect of "Temperature Control": The Controlled Agricultural System according to the 6$^{th}$ aspect of "Temperature Control", wherein the computing device is further configured to determine the growth phase (e.g. breeding, greening, flowering and harvest) of the plants based on the data from the sensor device.

Proper research can measure and assess the necessary temperature levels in order to reach the desired plant growth values, like Time to Flower. Such relations can be done with all plants (or at least with a relevant subset) and stored into a database. The database then allows producers to adjust the temperature levels (increase, keep, decrease) appropriately in order to influence plant growth, flowering or harvesting parameters. In a preferred embodiment, such a database is stored in a data storage device connected to the computing device of the controlled agricultural system.

In other words, proper research can measure plant growth, plant morphology, plant chemistry, plant leaf density index, plant color and other growth and ripening indicative parameters with various measurement techniques (destructive and non-destructive) at certain temperatures. These data may then be stored into the database bank (Growth Parameters GP).

8th aspect of "Temperature Control": The Controlled Agricultural System according to any one of the preceding aspects of "Temperature Control", wherein the computing device is further configured to fetch a growth setting including a temperature profile dedicated to the present growth phase of the plants from the data storage device.

The controlled agricultural system may further comprise an illumination system coupled to the computing device. The illumination system may be illuminated using a light recipe, which may also be stored in the computing device (if the computing units comprises a data storage device) or in a separate data storage device connected to the computing device. The computing device assures that the growth settings containing the temperature profile and the light recipe are aligned to each other (synchronized), i.e. the "morning state" of the grow setting is also the "morning state" of the light recipe (the same for midday, evening or settings in between).

In another embodiment, the growth setting and the light recipe are provided as one dataset, so that no additional alignment is necessary.

9th aspect of "Temperature Control": A method for agricultural management, particularly for plant breeding, growing, cultivating and harvesting in an agricultural facility, comprising:

at least one controlled agricultural system according to one or more of the 1st to 8th aspect of "Temperature Control", and the steps of Picking from the data storage device a growth setting including the correlated (temporal and/or spatial) temperature profile by means of the computing device, Measuring the temperature in the agricultural facility by means of the sensor device (temperature sensors);

Checking whether the measured temperature matches with the nominal value according to the selected temperature profile;

In case of mismatch between measured and nominal temperature: Changing the temperature according to the temperature profile by means of the actuator device 111 (temperature influencing means).

10th aspect of "Temperature Control": The method for agricultural management according to the 7th aspect of "Temperature Control", further comprising the initial step of Choosing a plant species by the user via the user interface.

11th aspect of "Temperature Control": The method for agricultural management according to the 9th or 10th aspect of "Temperature Control", further comprising the step of Correlating the selected temperature profile with one or more of the following environmental/plant conditions: day-night-shift, circadian rhythm of the plant, illumination conditions, plant growth phase.

12th aspect of "Temperature Control": The method for agricultural management according to any one of the 9th to 11th aspect of "Temperature Control", further comprising the step of Synchronizing the Temperature Profile and the Light Recipe.

In an embodiment/implementation for saving energy, the temperature profile and the light recipe are synchronized to influence the plants in the same way, for instance, to speed up plant growth or delay plant growth (see e.g. the element "Flexible Growth").

13th aspect of "Temperature Control": The method for agricultural management according to any one of the 9th to 11th aspect of "Temperature Control", further comprising the step of Detecting the Growth Status/Phase of the Plants by Means of the Sensor Device.

14th aspect of "Temperature Control": The method for agricultural management according to the 13th aspect of "Temperature Control", further comprising the steps of Comparing the presently detected growth data with the previously detected growth data or data stored in the database and checking by means of the computing device whether the growth phase (e.g. breeding, greening, flowering and harvest) has changed, If the growth phase has changed:

Picking from the data storage device a growth setting including the (temporal and/or spatial) temperature profile correlated to the new growth phase by means of the computing device.

15th aspect of "Temperature Control": A computer program product, comprising:

a plurality of program instructions, which when executed by a computer system of a Controlled Agricultural System according to any one of the 1st to 8th aspect of "Temperature Control", cause the Controlled Agricultural System to execute the method for Agricultural Management according to any one of the 9th to 14th aspect of "Temperature Control".

16th aspect of "Temperature Control": Agricultural facility ((vertical) farm, greenhouse, etc.) with at least one Controlled Agricultural System according to any one of the 1st to 8th aspect of "Temperature Control".

Examples for Light/Growth Recipes

In practice, the selection of a growth or light recipe can depend on many factors. Below, some influencing parameters and boundary conditions are discussed for the purpose of illustration. Further, some exemplary recipes are shown.

Growth Phases

Requirements for optimized lighting conditions can for instance vary with the three distinctive growth phases, i.e.

a) Establishment growth: occurs after seed germination or while you are rooting and establishing vegetative b) Vegetative growth: occurs when leaves and stems are rapidly growing c) Reproductive growth occurs as plants transition to produce flowers and subsequent fruit RECOMMENDED PPFD (μmol/m²/s)

| Species | Establishment: Seed | Establishment: Vegetative Cutting | Vegetative | Reproductive |
|---|---|---|---|---|
| *Cannabis* | 100-300 | 75-150 | 300-600 | 600+ |
| Tomatoes | 150-350 | 75-150 | 350-600 | 600+ |
| Cucumbers | 100-300 | — | 300-600 | 600+ |
| Peppers | 150-350 | — | 300-600 | 600+ |

An initial goal for most crops can be to establish large leaves and stems to provide plants with enough photosynthetic area to produce carbohydrates that will be allocated to flowers and fruits during the reproduction phase. The allocation of photosynthates from 'sources' (active leaves) to 'sinks' (roots, shoots, flowers, and fruits) is an important balance influenced by environmental conditions.

The principle of limiting factors also relates to photosynthate allocation. Plants are highly adaptive, due to their inability to relocate to an ideal environment. If an environmental variable is not favorable, plants allocate energy resources to increase their chance for survival. For example, in nutrient-limited conditions, a plant will allocate resources to expand root growth, while in light-limited conditions, resources will be allocated to stem and leaf growth.

Light Saturation:

As light intensity (PPFD) increases, photosynthetic rates also increase until a saturation point is reached. Every plant species has a light saturation point where photosynthetic levels plateau. Light saturation normally occurs when some other factor (normally CO2) is limited.

Photoacclimation:

During establishment growth (a), light intensities need to be kept relatively low as the plant is developing roots, leaves, and stems that will be used to provide photosynthates during the vegetative growth phase (b). Increasing light intensity as you transition into the vegetative (b) and reproductive growth phases (c) will increase the rate of photosynthesis, which will provide the plant with more photosynthates used to develop flowers and subsequent fruit. Plants need time to acclimate to high light intensities (referred to as photoacclimation). If plants are exposed to high light intensities too early in the crop cycle, chlorophyll pigments can be damaged causing photo-oxidation (photo-bleaching). As a general rule, increasing by 50 μmol/m2/s or less per day, can be an appropriate approach.

Photoperiodism

Photoperiodism is a plant's response to the duration of the day (light period) in combination with the duration of the night (dark period). This phenomenon influences different plant responses such as flowering, vegetative reproduction and dormancy. Plants can be classified regarding their response to the daylength. The following are the current classes of photoperiod:

Short Day Plants (SDP)
Long Day Plants (LDP)
Day Length Neutral Plants (DLNP)
Intermediate Day Length Plants (IDP)
Dual Induction Plants (SLDP)

Daily Light Integral

The term daily light integral (DLI) is used to describe the total quantity of light delivered to a crop over the course of an entire day. The DLI is reported as the number of moles (particles of light) per day. Knowing the quantity of light delivered throughout the day can be a useful measurement for estimating the effect of sunlight on plant growth. Many important plant growth responses, such as biomass accumulation, stem diameter, branching, root growth and flower number are closely correlated to DLI. DLI can be a tool for managing the light environment to optimize plant growth.

Carbon Dioxide

Carbon dioxide (CO2) enrichment in a controlled agricultural environment can improve the yield of high PPFD crops. Typically, plants have a light saturation point where the maximum rate of photosynthesis is reached at a specific light intensity. However, at ambient atmospheric CO2 levels (~400 ppm) it is the limited availability of CO2 that can restrict photosynthetic activity, not the intensity of light. Generally, optimum levels of CO2 will be two to four times the normal atmospheric levels (800-1,400 ppm CO2) when growing under high PPFD conditions. It may be recommended to supplement 800 ppm CO2 into a controlled agricultural environment when the plants are provided with ≥500 μmol/m2/s. When light intensity is increased, also CO2 levels can be increased as plants acclimate to increased PPFD.

Leaf Surface Temperature

Plant growth and development can also be influenced by temperatures at the growing points of plants (i.e., roots and shoot tips). It is rather plant temperature (not air temperature) that drives physiological responses in plants. Air temperature can differ by as much as 12° C. from plant temperature, depending on the used light source (e.g. High Pressure Sodium HPS, Metal-Halide MH, or LED), light intensity, humidity, and air speed. For example, HPS lights emit a large percentage of their energy in the infrared (IR) range (800 nm-1000 nm) which is not photosynthetically active yet significantly increases plant temperature, whereas suited LED-based systems produce very little radiant heat.

Photothermal Considerations

Crops can have a species-specific base temperature, at which growth and development will not occur. Above the base temperature, growth and developmental rates increase with temperature until an optimum temperature is reached. Above the optimum temperature, plant development decreases. Light intensity primarily influences the rate of photosynthesis, while plant temperature primarily influences developmental rates. Net photosynthesis under increased PPFD will increase as temperatures approach the optimum temperature for the species of grown plants; however, the optimum temperature for photosynthesis depends on the concentration of CO2 in the growth environment. An important correlation can be that with increased temperature, also the morphology of the plant will be changed by increasing developmental rates. The ratio between light intensity and temperature is known as the photothermal ratio. If one chooses to grow at warmer temperatures (≥80° F.), it can be necessary to ensure that an adequate light intensity (≥500 μmol/m2/s) is provided, otherwise plants could be produced that have increased internode distance, small stem caliper, and an overall spindly growth habit.

Temperature Differential

The difference between day/night temperatures (DIF) can also influence plant morphology. For example, if day/night air temperature is 24/10° C., a +DIF of 12° C. results, which will promote stem elongation of most crops. Alternatively, a warmer night temperature 18/25° C. (day/night) will result in a −DIF of 12° C., which will suppress stem elongation.

Relative Humidity, Vapor Pressure Deficit, and Air Movement

Relative Humidity (RH) is the amount of humidity present at a given temperature and is expressed as a percentage. When air is completely saturated, it has a RH of 100%. Temperature, RH, and air movement can be three main variables that influence the movement of water throughout a plant. Evapotranspiration is the process plants use to cool leaf surfaces—as the temperature of a leaf increases, plants pull more water from the growing media and water is evaporated from the leaf surface, as a result, the leaf temperature decreases.

Vapor Pressure Deficit (VPD) can be a valuable tool to use when growing in a controlled environment. Maintaining a proper VPD will help to reduce plant stress brought on by either excessive transpiration (high VPD values) or the inability to transpire adequately (low VPD values). When the VPD is too low (humidity too high) plants are unable to evaporate enough water to enable the transport of mineral nutrients (such as calcium), and in cases where VPD is extremely low, water may condense on the plant surface and provide a medium for fungal growth and disease.

Air Movement

Proper Air Movement can also be an environmental variable that can be adjusted in controlled environment agriculture. Air flow can be critical to break the boundary layer around a leaf and allow transpiration and $CO_2$ uptake. It can also be beneficial to provide uniform temperature, humidity, and $CO_2$ concentrations in a controlled agricultural environment. Furthermore, an air flow against the plants will result in stronger growth of e.g. the stems. For instance, maintaining an air speed of 0.8-1.2 m/s at the plant canopy can optimize plant growth and development.

Exemplary Growth Recipes

Below, some exemplary growth recipes are shown. The first one relates to lettuce, in particular to improving red coloration of red leaf lettuce. The second one relates to basil. These two growth recipes are static, which means that the same growth conditions are applied over the whole growth cycle. The third growth recipe, which relates to *Cannabis*, is a dynamic recipe. For the flowering, the intensities given on the right are increased to a threefold value. In all recipes, the intensities are in indicated in $\mu mol\ m^{-2}\ s^{-1}$.

| | | Spectrum | |
|---|---|---|---|
| 1st Growth Recipe | | | |
| Crop | *Lactuca sativa* 'Diablotin' | UV | 0 |
| Light intensity | 240 $\mu mol\ m^{-2}\ s^{-1}$ | Blue | 60 |
| Photoperiod | 16 day/8 night | Green | 0 |
| Temperature | 20° C. day/18° C. night | Hyper Red | 180 |
| Humidity | 60-70% | Far Red | 0 |
| Growth Cycle | 28 days | Warm White | 0 |
| 2nd Growth Recipe | | | |
| Crop | *Ocimum basilicum* 'Keira' | UV | 10 |
| Light intensity | 300 $\mu mol\ m^{-2}\ s^{-1}$ | Blue | 60 |
| Photoperiod | 18 day/8 night | Green | 30 |
| Temperature | 24° C. day/22° C. night | Hyper Red | 170 |
| Humidity | 60-70% | Far Red | 0 |
| Growth Cycle | 50 days | Warm White | 30 |
| 3rd Growth Recipe | | | |
| Crop | *Cannabis sativa/indica* | UV | 5 |
| Light intensity | 330 $\mu mol\ m^{-2}\ s^{-1}$ | Blue | 70 |
| Photoperiod | 16 day/8 night (for young plants) | Green | 50 |
| | 12 day/12 night (for flowering) | Hyper Red | 200 |
| Temperature | 20 | Far Red | 5 |
| | 7° C. day/24° C. night | | |
| Humidity | 60% | Warm White | 0 |

A further example of dynamic growth recipe is shown below. It relates to lettuce and shows three alternatives PPFD I-III.

| | | | |
|---|---|---|---|
| Temperature [° C.] | Adventitious rooting Cultivation | 20° C. | 18° C. |
| | | Day | Night |
| Rel. Air humidity [%] | Germination | 60-70% | 60-70% |
| | Adventitious rooting Cultivation | 60-70% | 60-70% |
| Air flow [$m\ s^{-1}$] | | 0.1 | |
| Light intensity [$\mu mol\ m^{-2}\ s^{-1}$] | | 240 | |

| | Color | PPFD I | | PPFD II | | PPFD III | |
|---|---|---|---|---|---|---|---|
| Spectral distribution (PPFD) [$\mu mol\ m^{-2}\ s^{-1}$] | UV-A (380 nm) | | | | | | 10 |
| | Blue (450 nm) | 50 | 60 | 50 | 90 | 50 | 80 |
| | Green (520 nm) | 30 | | 30 | | 30 | |
| | Hyper Red (650 nm) | 120 | 180 | 120 | 90 | 145 | 90 |
| | Far Red (730 nm) | 10 | | 10 | | 15 | |
| | Warm White (2700K) | 33 | | 33 | | | |
| | | First 20 days | Last 10 days | First 20 days | Last 10 days | First 15 days | Last 15 days |
| | Sum | 240 | | 240 | | 240 | |

A further example for influencing the plant properties by defined environmental conditions is a strengthening of the stem of flowers, for instance of petunia. A strengthening of the stem can for instance be achieved by illuminating the plants during the growth phase (after the formation of the first leaves until flower formation) with green light, e.g. with a wavelength between 500 nm and 550 nm and an intensity of at least 400 μmol $m^{-2}$ $s^{-1}$.

Another example is an extension of the flowering, which can be achieved by an illumination with a wavelength between 400 nm and 800 nm, wherein the intensity between 450 nm and 500 nm amounts to more than 45% of the total intensity.

Luminaire

"Light Guides"

According to the element "Light Guides" of the disclosure, a light module comprising at least one light guide, which enables improved illumination of plants, is proposed. Furthermore, an agricultural lighting fixture comprising such a light module and a method for agricultural management providing improved illumination by means of the agricultural lighting fixture is proposed.

Below, various aspects and details of "Light Guides" are described.

$1^{st}$ aspect of "Light Guides": A light module, in particular for plants, comprising holding or fixation means and at least one light emitting element, wherein the light-emitting element is mountable to the holding means and wherein the light-emitting element comprises at least one light guide which is arranged in a pre-determined distance, in some embodiments/implementations in a common plane, to a target area.

Light Modules, Light Emitting Elements, Light Guides

According to an embodiment of "Light Guides", a light module is provided, in particular for illuminating plants. The light module comprises holding or fixation means adapted to hold or fix the light module in place or fasten the light module to a supporting structure, such as a wall, a ceiling, a meshwork, a grid, beams or other structures. The holding means may also be provided to support parts of the light module. Separate holding means may also be provided, in order to hold or fix the light module and to support elements of the light module. The light module also comprises at least one light-emitting element. The light module and/or the light emitting element can comprise or include a transparent material. The light-emitting element of the light module comprises at least one light guide, which is arranged in a predetermined distance to the target area. The light guide, in particular an elongated light guide, can be arranged in a, usually horizontal, plane, with a predetermined distance to the target area.

The light guide can be placed such that it vertically extends downward, i.e. towards the plants or the target area. One or more light guides may be provided, which have portions arranged horizontally, i.e. forming a plane basically parallel to a target area and having portions arranged vertically, i.e. substantially normal to the target area or at least inclined with respect to the target area. However, multiple light guides may be provided wherein at least one of the light guides is arranged horizontally, and at least one, in some embodiments/implementations multiple, light guides are arranged vertically or at least inclined with respect to the target area.

$2^{nd}$ aspect of "Light Guides": The light module according to the $1^{st}$ aspect of "Light Guides", wherein the light-emitting element extends in different vertical layers, in some embodiments/implementations the layers forming planes and having a predetermined or adjustable distance to one another.

Providing light guides on different vertical layers or spanning different vertical layers, in particular between the plants, and controlling light parameters in a vertical direction, i.e. differently for different vertical layers, may improve illumination and light supply to the plants to be grown.

$3^{rd}$ aspect of "Light Guides": The light module according to the $2^{nd}$ aspect of "Light Guides", wherein the at least one light guide is arranged in the at least two layers.

$4^{th}$ aspect of "Light Guides": The light module according to the $2^{nd}$ or $3^{rd}$ aspect of "Light Guides", wherein the light-emitting element comprises multiple light guides, which are arranged in the at least one layer.

The light module according to the present disclosure may thus also be referred to as an adjustable inter-canopy light module, as it allows to adjust light parameters in different vertical layers even between plants.

$5^{th}$ aspect of "Light Guides": The light module according to the $4^{th}$ aspect of "Light Guides", wherein the multiple light guides are controllable, in some embodiments/implementations separately, by a control unit.

According to an embodiment, a light guide may contain light sources (e.g. LEDs) that can be controlled individually or in groups. In particular, these light sources may be placed above or adjacent to each other along the longitudinal length of the light guide.

$6^{th}$ aspect of "Light Guides": The light module according to the $5^{th}$ aspect of "Light Guides", wherein at least one light guide can be controlled to provide a different spectrum of light and/or a different light recipe compared to at least one other light guide.

The light sources may be individual LEDs or one or more groups of LEDs. These light sources may emit light of different spectral composition, thus allowing control and adjustment of the light spectrum emitted to the plants along a vertical direction.

In an embodiment, the light-emitting element or at least the light guide, may be placed with a uniform distance to the target area and, eventually, to the plants growing in the target area. In particular, this may also allow the light-emitting element or portions of the light-emitting element to be placed such that a uniform distance with respect to the plants may be adjusted, even if the size of the plants, in particular in a vertical direction, is not uniform. That way, the element "Light Guides" of the disclosure may allow vegetated areas and/or plants to be illuminated more evenly.

The use of light guides may allow the reduction of the distance of the light emitting element to the plants or target area, as they may provide more uniform illumination compared to point sources, such as single LED elements.

Further, according to an embodiment, the light module, or at least the light guide may be arranged in a horizontal way above the target area. A target area with this respect is an area, which is to be illuminated by the lighting fixture. It is understood that neither the lighting fixture, the light module, nor the light guide have to be arranged horizontally with respect to the target area, i.e. arranged in parallel to the target area, even if the lighting fixture, the light module, or the light guide may, at least in places, be arranged parallel to the target area.

According to another embodiment, the light-emitting element of the light module extends in different layers, wherein in some embodiments/implementations the layers are forming planes and in some embodiments/implementations are having a predetermined distance to one another. That way, the present disclosure may enable to further direct light to different regions of the plant, in particular to different vertical sections of the plant. Consequently, those leaves at the tip of the plants may be arranged between two layers of the lighting fixture, such that leaves and other plant sections below the uppermost leaves may be supplied with sufficient light. This may increase the agricultural outcome (yield). Those layers or parts of the layers being situated below the uppermost leaves may be controlled to emit light at a reduced or an increased intensity or with an altered spectrum of light, respectively a different light recipe. The light characteristics like photon flux quantity and/or photosynthetically active radiation (PAR) and/or light spectrum and/or operating conditions, for example the ON/OFF cycles of the provided illumination, and/or illumination phases with increased or reduced light intensity, e.g. boost and dim phases, may be changed over time as the plants grow and change their morphology.

According to an advantageous refinement, the at least one light guide of the light module is arranged in more than one of the layers forming the light-emitting element. In particular, the at least one light guide may be arranged in the at least two layers which can be stacked vertically on top of each other or, at least, in more than one of the layers. Alternatively, more than one light guide may be provided in the at least one or in more layers of the light module. This is to say that one or more light guides may be provided in one or more layers of the light module. A "layer" according to the element "Light Guides" of the disclosure means a portion of the light module that is adapted to illuminate a different section of the plant, in particular in a vertical direction, compared to another layer. Different layers may also be differentiated by their individual distance to the target area or any of the target areas.

As at least portions of the light guides may be provided along a vertical direction, vertical variation of emitted light spectra may be enabled by controlling light sources within a light guide. Such individual light sources being arranged in a light guide may thus form vertical layers as understood in the context of "Light Guides".

13$^{th}$ aspect of "Light Guides": The light module according to any one of the 1$^{st}$ to 12$^{th}$ aspects of "Light Guides", wherein the at least one light-emitting element and/or the at least one light guide comprise or include fiberglass or plastic.

This may allow for better defining light guiding properties, amount and location of the out-coupling of light out of the light guide and other parameters. For instance, at predetermined positions, the light guide may be prepared to couple light out of the light guide. In particular, the light guide may comprise roughened portions, where the light can leave the light guide at such predetermined positions.

14$^{th}$ aspect of "Light Guides": The light module according to any one of the 1$^{st}$ to 13$^{th}$ aspects of "Light Guides", wherein the at least one light guide comprises roughened portions adapted to guide light to predetermined positions.

It is also possible that the light guides are designed such that light with a predetermined wavelength or within a predetermined wavelength range may couple out of the fiber at one position, whereas light of different wavelength continues to travel within the light guide and may exit at another location. Thus, the "Light Guides" may enable to provide light in an advantageous manner compared to existing solutions.

While light guides commonly are perceived to be fiber-like structures, such as optical fibers, any design suitable for guiding light may be applied for light guides within the meaning of the "Light Guides".

15$^{th}$ aspect of "Light Guides": The light module according to any one of the 1$^{st}$ to 14$^{th}$ aspects of "Light Guides", wherein at least one light guide is a liquid light guide, in some embodiments/implementations adapted to guide light of the UV-part of the light spectrum.

In an advantageous refinement, the light guide may for instance be a liquid light guide. A liquid light guide within the perception of "Light Guides" refers to any kind of light guide, which, at least partially, uses a liquid medium as a light guide, to guide light of one or more wavelengths. Liquid light guides may be preferable in order to guide light comprising ultraviolet (UV) light. Thus, UV light may be guided to plants and even to predetermined sections of plants. Such light guides may be used e.g. in order to guide the light below the uppermost layer of leaves, i.e. the canopy. Thus, bottom sides of the plants and in particular of the leaves may be illuminated with light, e.g. UV light.

UV light may particularly be used to dispatch or control or minimize pests of various origins or fight at least some diseases (see also the element "Prophylaxis" of the disclosure). The light guides may also be provided in close proximity to or directly on the ground, i.e. the target area, in order to dispatch pests or vermin living on the ground. This may increase agricultural output and reduce crop failure. This again may allow enhancing predictability of the agricultural output and facilitate logistics before and after harvesting (see also the element "Yield Prediction" of the disclosure).

16$^{th}$ aspect of "Light Guides": The light module according to any one of the 1$^{st}$ to 15$^{th}$ aspects of "Light Guides", wherein the light-emitting element comprises non-emitting portions and/or reflective portions and/or light conversion portions in order to emit light in the pre-determined direction.

In addition to or separately from the light guides, the light-emitting element may comprise sections with no or only minimal emission. For instance, the light-emitting element may comprise non-emitting portions and/or reflective portions, in order to emit light in a predetermined direction or to block it completely. Such non-emitting portions may be portions, within which the light guide is completely covered by a non-transparent and/or absorbing layer or is provided within a channel or the like. Reflective portions of the light-emitting element may be sections, where the light is coupled out of the light guide to one or more desired directions, whereas no emission takes place in other, non-desired directions. The reflective portions may in particular comprise a reflective layer provided on the light guide, in order to prevent light already from coupling out of the light guide. Further, the reflective portions may be provided such that light, which was emitted in a non-desired direction, will be incident on a reflective element to be reflected into a desired direction. A desired direction for instance would be toward a plant, a target area or the like. It is also within the framework of the aspect "Light Guides" to coat a light guide with a light conversion material or to implement such a light conversion material into a light guide, thus enabling a conversion of incoming wavelengths (excitation wavelength) into other ones, e.g. in the manner of down-conversion to longer wavelengths. By this, a light guide can provide different light spectra at different locations depending on the use of conversion materials and mix thereof.

17$^{th}$ aspect of "Light Guides": The light module according to any one of the 1$^{st}$ to 16$^{th}$ aspects of "Light Guides", wherein the light-emitting element comprises a light source which comprises a semiconductor element, in some embodiments/implementations an LED or OLED element, in some embodiments/implementations a laser element.

The light-emitting element may in particular comprise one or more semiconductor elements as light sources. In some embodiments/implementations the light source may comprise or include a light emitting diode (LED) and/or an organic light emitting diode (OLED). The LEDs may be direct emitting diodes or so-called phosphor-converting diodes. In some embodiments/implementations, the light source may comprise or include a laser element. While, in some embodiments/implementations, the laser element is a semiconductor element, in some embodiments, the laser element may be based on non-semiconductor technologies. Such a laser element can also be used as part of a Laser Activated Remote Phosphor (LARP) conversion device. Combination of light guides with semiconductor light sources may allow simplified coupling of light into the light guide and delivery of the light to the region of interest, e.g. the plants, specific plant parts, the target area and the like.

Advantageously, light originating from different light sources and/or of different wavelength may be combined in the light guides, in order to provide light with a predetermined or desired spectral composition. Two or more light guides can be connected or combined into a single light guide, at least over a certain common length, and be separated again. Thus, different light guides can form a mesh of light emitting elements with similar or different lighting properties that can complement each other, for example with regard to locally emitted light intensity, spectrum, emission angle, angular beam spread, and operating modes. It is also within the framework of this disclosure that a light guide can be used as conducting means, for example by placing pipes or other transporting means inside a hollow light guide, to apply nutrients, fertilizer, irrigation and the like to the plants. A light guide can be made watertight so that it can also be used in aquaponics growth settings, e.g. as described for instance in the element "Aquaponics" of the group "System Setup" of the disclosure.

A light guide can have various cross sections and/or geometrical product dimensions along its axis or any other spatial extension. A light guide can emit different light recipes and use different light-changing or influencing means, as described above, along its circumference thus providing different lighting scenarios into different radiation angles, thus making it more versatile for plant illumination.

7$^{th}$ aspect of "Light Guides": The light module according to any one of the 1$^{st}$ to 6$^{th}$ aspect of "Light Guides", wherein the at least one light guide comprises flexible material.

This allows directing the light along a definable, arbitrary path toward the target area or sections of the plants. This further allows mounting the light guide to supporting structures, such as a meshwork, which is distributed over the target area and in particular over the plants. The light guides may further be rotatable designed, in order to further individualize their respective emission scheme and alter or adapt the emission direction.

Control Unit and Lighting Parameters

Advantageously, the light guide or multiple light guides or different fractions of one or more light emitting elements or of the light module are controllable by means of a control unit. More advantageously, one or more light guides and/or light emitting elements are controllable separately from one another. With that respect, the control unit may be configured such that lighting parameters, such as wavelength, spectrum, spectral composition, light intensity, time of illumination or other parameters are controlled.

Further, the control unit may be enabled to, additionally or exclusively, control mechanical parameters of the light-emitting element and/or the light guide, such as the position relative to the target area, the plant to be illuminated, the holding means, or between different parts of the light module and/or the orientation thereof and/or the distance and angle between two or more light guides.

The control unit may also control light of at least one light guide or light-emitting element such that a different light recipe compared to at least one other light guide or light-emitting element is applied. This may allow providing the right illumination to the different parts of the plants, which, eventually, may increase the yield and quality of the agricultural output (agricultural produce).

A light recipe comprises information and control data of illumination with respect to time, location, light intensity, and other parameters suitable or necessary to control growth of the plants or phases of plant growth. A light recipe thus also includes dark phases, boost phases, dim phases and control of different spectra to be delivered to the plants. A light recipe may comprise control data for an entire life cycle of a type of plant or various types of plants. A light recipe may also comprise control data specific for abnormal events, such as diseases or pests, specific periods, such as germination or harvesting, or accelerated ripening. In particular, a light recipe may comprise information to control light parameters to vary over time. Light recipes may be provided to account for plant parameters such as growth phases or ripening phases of the plants or goods to be harvested. Such plant parameters may be determined by means of sensors, the measured data of which being processed in the control unit, particularly for monitoring the health and growth of the plants (see also the element "Plant Health and Growth" of the disclosure).

According to an exemplary light recipe, those light-emitting elements or light guides situated directly above a plant or a tip of a plant, may be operated at reduced intensity, while those light emitting elements or light guides or parts thereof situated below the tip of the plants may be operated at increased intensity or spectrum, to compensate for the shading effect of higher leaves, or vice versa.

8$^{th}$ aspect of "Light Guides": The light module according to any one of the 2$^{nd}$ to 7$^{th}$ aspects of "Light Guides", wherein the light-emitting element provided in a layer closer to the target area is adapted or adaptable to emit light with higher portions of at least one of blue and/or red and/or far-red, and/or infrared and/or ultraviolet compared to the light-emitting element provided in a layer further away from the target area.

As an example, at least one light-emitting element or light guide that is provided in a layer closer to the target area compared to a light emitting element or light guide provided in a layer further away from the target area is adapted to emit light with a higher portion of blue light. Arranging that light emitting element or the respective light guide of this light-emitting element below the uppermost leaves of the plants allows delivery of light with an increased amount of blue wavelengths to the lower parts of the plants. As, commonly, plants in the lower sections do receive a reduced amount of blue light due to the shading and absorption by higher leaves, increased illumination of these lower sections may increase the agricultural output by compensating the shading due to higher leaves. In a similar way, other light spectra can be applied, like red, far-red, infrared, and ultraviolet.

In particular, the light emitted by such a lower placed light emitting element or light guide can be adjusted, for example with respect to light intensity, or may be spectrally changed over time as a function of plant growth or plant morphology. The light emitting element may thus form a light element, which is spectrally adaptable in a vertical direction. The light emitting element may further be temporally controllable, i.e. spectral composition, light intensity and/or further parameters according to an applicable light recipe may be controlled to vary over time.

9th aspect of "Light Guides": The light module according to any one of the 1st to 8th aspect of "Light Guides", wherein the light-emitting element comprises a wire netting, which is arrangeable in a predetermined shape on or over the target area.

In particular, the wire netting may be arrangeable over the plants to be illuminated. More advantageously, the holding means of the lighting fixture may comprise the wire netting. The light guides may be mounted to or attached to the wire netting. That way, light may be delivered more accurately, under definable incident angles and in a more individualized manner. Further, the shape and size of the meshwork may be altered, e.g. over time. Size and shape of the meshwork may be adaptable e.g. to the size and/or morphological state and/or morphological change of the growing plants.

10th aspect of "Light Guides": The light module according to any one of the 1st to 8th aspect of "Light Guides", wherein the light guide is braided or twisted around the light-emitting element.

The light guide may in particular be braided or wrapped around the light-emitting element, e.g. a wire netting of the lighting fixture. The wire netting may also be provided as a separate component. In such embodiments, the light-emitting element may be supported by the wire netting or meshwork of the netting.

Fabric

11th aspect of "Light Guides": The light module according to any one of the 1st to 8th aspect of "Light Guides", wherein the holding means include or comprise a fabric, with at least one light guide of the at least one light-emitting element being provided on or in the fabric.

The fabric may in particular form a mat-like structure. On or in the fabric, a light guide of the at least one light module is provided.

12th aspect of "Light Guides": The light module according to the 11th aspect of "Light Guides", wherein the fabric is movably connected with respect to the holding means.

Further, the fabric may be connected movably with respect to the holding means of the light module. In particular, the light guide may be woven into the fabric. The fabric thus may be arranged over the target area, i.e. over the plants to be illuminated. Following the growth of the plants, the fabric may be moved, e.g. raised, in order to keep the distance of the light guides from the plants constant, or, as the case may be, according to an individual or predetermined adjustment or control plan.

The fabric may also be designed rollable. This may facilitate access to the plants for watering, harvesting, visual inspection or other tasks, by simply removing the fabric. Furling or unfurling of the fabric may either be actuated manually or automatically. Furling and unfurling of the fabric may in particular be controlled by a control unit, in some embodiments/implementations by the same control unit, which also controls the light parameters. Providing such a fabric may also allow to store away the fabric, if it is not needed, in a convoluted state. This may reduce storage place and facilitate handling with the light emitting element.

Light Source and Control

18th aspect of "Light Guides": The light module according to any one of the 1st to 17th aspect of "Light Guides", wherein the light source of the light emitting element is arranged in a remote position from the light-emitting element.

The light source, in fact, may be placed remote to the vegetated (cultivated) areas, even in separated rooms or on different floors of a vertical farm. That way, heat generated by the light sources or by the control unit or units may be utilized for heating or climate control of the vertical farm, without locally and uncontrollably affecting climate conditions in the vertical farm. The light guides are then provided in order to deliver the light from the light sources to the respective target areas.

A heat pump may be provided, in order to utilize the heat generated by the light sources. Alternatively, a water cycle, ventilation system or similar may be provided in order to utilize the heat generated and to cool the light sources and other components, if required. Heat generated may thus be used for heating in air conditioning systems, warm water supply or such, even in locations remote from the heat source. Alternatively, if need may be, the heat may be redirected to the plants (see also the aspect "Heat Reflector", below).

Light guides or groups of light guides intended for the same one or more wavelengths or spectral composition may be coupled to light sources, in particular semiconductor light sources, which may be separately controllable. That way, groups of light sources may be formed. "Separately controllable" in this context shall mean that one or more first light sources may be controlled independent from at least one or more second light sources. Control parameter may be, among others, spectral composition, light intensity, emission time and others. A semiconductor light source may emit light of essentially one wavelength or of multiple wavelengths, depending on the type of light source used.

Thus, different layers of a light emitting element or different sections thereof may be provided with an individual light recipe. This may be realized by using light guides of one group or another. That way, light illumination of the plants may be improved, in particular of plant sections below the uppermost leave layer.

Sensors

Accordingly, the at least one light guide can bring light between the leaves of a plant, which may be referred to as inter-canopy lighting. According to various embodiments of the aspect "Light Guides", sensors, such as optical, thermal, spectral, or other sensors, can be attached to the at least one light guide or implemented within a light guide, to the at least one light emitting element and/or to the light module. The sensors may also be provided independent of a light guide at the light emitting element, the light module, or at any position within the agricultural lighting fixture or connected therewith. "Connected" in this context shall mean any connection, physical or via data connection or any other interaction between sensor and lighting fixture, including common databases or similar.

The sensors may check parameters like temperature, humidity or illumination. The sensors may also be attached to a holding or supporting structure, such as wires, used to hold the crop or any other installation between the crops. The sensors may be used to measure the micro-climate within the canopy, for example air temperature, ventilation, humidity, CO2 concentration, pheromone concentration, concentration of toxic substances released from a plant, and the like. A computing unit considers these data to optimize the growth parameters, e.g. temperature, humidity, light, for the specific plant. The computing unit may be a part of the control unit or provided as a separate element. The sensors could be connected to a power line and to a network line for data transfer. The sensors may also be battery operated. The sensors may transmit data through a data connection, such as LAN, WLAN, Bluetooth, radio, RFID, near field communication or similar.

Agricultural Lighting Fixture

19$^{th}$ aspect of "Light Guides": Furthermore, an agricultural lighting fixture, in particular for plant illumination, comprises a control unit and at least one light module according to any one of the 1$^{st}$ to 18$^{th}$ aspects, wherein the control unit is adapted to control at least one of light intensity, illumination time, illuminated area, spectral composition of the light, position of at least one light guide, light emitting element or of the light module, in particular as a function of plant growth and/or plant morphology.

Agricultural Lighting fixtures provide lighting of plants, algae, fungi, transgenic plants, and any other edible or useable produce as well as for animals, including transgenic animals, insects, bacteria, and viruses with natural and/or artificial electromagnetic radiation.

Agricultural Lighting is applied in order to influence, stimulate and control the growth and well-being in all stages of the individual development including shoot development, reproduction, morphology, maturation, harvesting and storage. In the following, for the sake of convenience, the term 'light' shall encompass the entire electromagnetic wavelength range from the ultraviolet (100 to 400 nm) to the visible (400-780 nm) to the infrared (780 nm to 1 mm) spectral range.

Agricultural lighting fixtures can be part of a fixed, moveable or portable growth or storage place. Agricultural Lighting fixtures can contain light sources, light source drivers and controllers, sensors, optical components, actuators, as well as data storage, processing and one-directional, bi-directional and multi-directional communication devices. Agricultural Lighting fixtures can contain heating and cooling devices as well as heat deflecting devices, such as heat reflective walls (see also the element "Heat Reflector" of the disclosure, below).

Agricultural Lighting fixtures can contain or be made of transparent polymeric materials, translucent materials, and specular or diffusive materials.

Agricultural Lighting fixtures for plant growth can be suited to modulate light generated by the light sources with a rhythmic or aperiodic signal produced artificially or a rhythmic signal extracted from sound present in nature, and can be suited to illuminate a plant with the modulated light.

Agricultural Lighting fixtures can be operated based on the execution of light recipes. Agricultural Lighting fixtures can have individual identifiers, like an RFID chip or a digital signature or IP-address, allowing them to be connected to a computer system or cloud computer network, so that they can be part of an Internet-of-Things (IOT)-system, or connected to an Artificial Intelligence (AI) machine in order to provide useful growth predictions (see also the aspect "Yield Prediction") and applicable illumination settings.

Agricultural Lighting fixtures can be suited for underwater lighting, sweet and salt water.

Agricultural Lighting fixtures can be part of an Industry 4.0 standard.

Lighting fixtures of agricultural purposes can contain artificial light sources like Light Emitting Diodes (LED) with or without conversion by using a fluorescent substance, commonly referred to as phosphor conversion, Laser diodes, OLED light emitting material on the basis of organic materials, Quantum Dot light emitters, Fluorescent lamps, Sodium low and high pressure lamps, Xenon and Mercury Short Arc lamps, Halogen lamps, and the like. Therefore, such light sources may also be used in a light module according to various aspects of the present disclosure.

Lighting fixtures of agricultural purposes can contain fluorescent or phosphorescent substances, for example applied to the fixture surfaces. The light source of the lighting fixtures of agricultural purposes can be adjusted or be optimized for use in connection to optical components, such as reflectors, symmetrical or asymmetrical lenses, filters and so on.

Lighting fixtures of agricultural purposes can be grouped together or can be arranged in a network or wire-frame manner.

An agricultural lighting fixture can be rotated, for example from lighting top-down to lighting bottom-up at various stages of a rotary growth cabinet.

An agricultural lighting fixture can be made of a flexible material that is formable, e.g. bendable, and can therefore be changed in form and shape. An agricultural lighting fixture may comprise of one or several lighting modules that can be changed, individually or as a group, in their form and/or position thus altering the shape and appearance of the fixture.

Method for Agricultural Management

20$^{th}$ aspect of "Light Guides": Furthermore, a method for agricultural management, in particular for plant growth, with a light module according to any one of the 1$^{st}$ to 18$^{th}$ aspects, comprises the steps of providing a light-emitting element on or above a target area, in some embodiments/implementations the target area being populated by one or more plants, seedlings and/or seeds, controlling, by means of a control unit, parameters of light being emitted toward the target area, wherein the light emitting element is provided, in some embodiments/implementations movably, in a predetermined distance away from the target area.

By means of a control unit, parameters of light, which is emitted toward the target area, are controlled. In particular, the control unit may comprise at least one light recipe. The light recipe allows controlling a specific, predetermined or adaptively defined, period of plant growth, including the entire life-cycle of a plant.

The light-emitting element and/or the light guide is provided in a predetermined distance away from the target area. The light-emitting element and/or the light guide may be provided movably, i.e. such that the distance thereof with respect to the target area with the plants, and thus the distance to the plants to be grown, may be varied. That way, the distance between the light-emitting element and the plants may be adjusted, in some embodiments/implementations to an optimal distance in order to provide a desired light recipe. The control unit may be provided to control the distance of the light emitting element to the plants.

According to "Light Guide", light of different spectral composition, among other parameters, may be provided in different vertical layers, such as above the plants and between the plants, referred to as inter-canopy lighting. Lighting parameters may be set or controlled to vary over time. Variation of lighting parameters may depend on predetermined light recipes and/or data collected, e.g. by means of sensors, and/or manual input. In particular, lighting parameters such as illumination time or spectral composition, and in particular spectral composition or other parameters in different vertical layers, may be defined based on plant growth phases, ripening phases, morphological condition, plant size, but also based on economic factors such as planned harvesting, delivery dates, research and others.

"Failure Detection"

According to the element "Failure Detection" of the disclosure, a controlled agricultural system with a light fixture is proposed that is configured to be able to detect and, in some embodiments/implementations, locate a failing light source quickly so that a repair or replacement action, or any other countermeasure, can be taken promptly.

1st aspect of "Failure Detection": More specifically, the controlled agricultural system, comprises a light fixture with a light source for providing agricultural lighting, wherein the Controlled Agricultural System is configured for an automatic failure detection, namely for detecting a reduced emission and/or total failure of the light source.

2nd aspect of "Failure Detection": The controlled agricultural system according to the 1st aspect of "Failure Detection", comprising a current sensor, the Controlled Agricultural System being configured to measure, for the failure detection, an electrical current of the light fixture and/or the light source.

In a preferred embodiment, a current sensor is provided for measuring an electrical current for the failure detection.

3rd aspect of "Failure Detection": The controlled agricultural system according to the 2nd aspect of "Failure Detection", wherein the light fixture comprises a plurality of light sources, the Controlled Agricultural System being configured to measure the electrical current of a subset of the light sources and/or individual light sources.

Therein, the current can be measured for the light fixture as a whole or for individual light sources thereof. It is also possible to measure the current not for each light source individually but in groups, still allowing at least a certain localization of the failing light source. Combinations are possible as well, for instance a measurement in groups (coarse localization) with a subsequent measurement of the light sources within the respective group (fine localization). For measuring the current through the light sources individually and/or in groups, in some embodiments/implementations a plurality of electrical current sensors are provided.

The agricultural system, in particular a computing device thereof, can be configured for comparing the current or current/power consumption evaluated by the current sensor with a target value. The target value can be fixed or in some embodiments/implementations depend from the lighting conditions applied, for instance be lower in case of a lower intensity and vice versa. A deviation from the target value can indicate a problem with the light fixture/light source. For instance, in case of a LED light source, a bond wire lift off or other damage of the electrical wiring can be detected as an open load.

In general, the light fixture typically comprises a plurality of light sources, in some embodiments/implementations light sources having different spectral properties. In some embodiments/implementations the light sources are LEDs.

4th aspect of "Failure Detection": The controlled agricultural system according to any one of the 2nd or 3rd aspect of "Failure Detection", wherein the light sources belong to a light fixture assembled from exchangeable modules, each module comprising a plurality of light sources respectively, the Controlled Agricultural System being configured to measure the electrical current for each module individually.

In a preferred embodiment, the light fixture comprises at least two exchangeable modules, each of them comprising a plurality of light sources. When a light source fails, the respective module can be replaced as a whole by a new module, allowing for a quick installation and short down time. In a respective multi-module light fixture, the current measurement can in some embodiments/implementations be performed for each module individually.

5th aspect of "Failure Detection": The controlled agricultural system according to any one of the 2nd to 4th aspect of "Failure Detection", comprising a computing device configured for comparing at least one of the current measured and a current consumption derived therefrom with a target value.

6th aspect of "Failure Detection": The controlled agricultural system according to the 5th aspect of "Failure Detection", wherein the target value considers an ageing effect, namely depends from the service life of the light fixture and/or the light source.

In a preferred embodiment, the computing device of the agricultural system is configured for comparing the measured current or current consumption with a current value depending on the service life of the light fixture or light source. This means, aging effects are considered, enabling a decision on whether a current drift or drop results from an actual failure or lies within the normal aging. Any target value referred to in this disclosure can be stored in a data storage device of the agricultural system or externally, for instance in the cloud.

7th aspect of "Failure Detection": The controlled agricultural system according to any one of the 1st to 6th aspect of "Failure Detection", comprising a light sensor, the Controlled Agricultural System being configured to measure, for the failure detection, a light intensity value of the light source and/or the light fixture.

Alternatively or in addition to the electrical current measurement, a light sensor can be provided for the failure detection. A drop of the light intensity measured by the sensor can indicate the failing light source or light fixture.

8th aspect of "Failure Detection": The controlled agricultural system according to the 7th aspect of "Failure Detection", wherein the light sensor is arranged in a growth area having growth locations for growing plants.

The light sensor or an array with a plurality of light sensors can be arranged in the growth area, namely in the area where the plants are grown. Assuming a top down illumination, the light sensor can be oriented upwards to the light fixture. Typically, a plurality of light fixtures are provided above a growth area. In general, an external light sensor can be advantageous as it can be oriented towards a light exit surface of the light fixture, detecting directly the light emitted there.

9th aspect of "Failure Detection": The controlled agricultural system according to the 8th aspect of "Failure Detection", wherein the light sensor is integrated into the light fixture.

Alternatively, it is also possible to integrate the light sensor into the light fixture. The light sensor can for instance be oriented towards the growth area, detecting light reflected or scattered there.

10th aspect of "Failure Detection": The controlled agricultural system according to the 9th aspect of "Failure Detection", wherein the light fixture comprises a lens for guiding light emitted by the light source to a growth location, wherein the light sensor is optically coupled to the lens.

When the light fixture comprises a lens for guiding the light towards the growth area, the light sensor can in some embodiments/implementations be arranged at an edge thereof. The lens can be a converging or convex lens for instance, focusing the light on the growth area. Most of the light emitted by the light sources of the light fixture will travel through the lens to the growth field. However, some reflection can occur at the interfaces, for instance a total internal reflection or Fresnel reflection.

11$^{th}$ aspect of "Failure Detection": The controlled agricultural system according to the 10$^{th}$ aspect of "Failure Detection", wherein the light sensor is arranged at an edge of the lens to receive a part of the light, which is guided in the lens by total internal reflection.

By placing the light sensor at the edge of the lens, the light reflected sideward can be used for the intensity measurement.

12$^{th}$ aspect of "Failure Detection": The controlled agricultural system according to the any one of the 7$^{th}$ to 11$^{th}$ aspects of "Failure Detection", comprising a plurality of light sources, a plurality of light sensors, and a computing device, wherein the computing device is configured for locating the light source with the reduced emission and/or total failure by comparing light intensity values measured by the light sensors.

In a preferred embodiment, the controlled agricultural system comprises a plurality of light sensors. Each of them can be connected to a control unit. This can be a common one for several sensors or individual units for each sensor.

The measured intensity values can be collected in a computing device. In some embodiments/implementations the latter is configured for locating the failing light source or light fixture by comparing the intensity values measured by the different light sensors.

This localization can be achieved by a triangulation procedure. The position of the individual light sensors and light sources is known by the computing device, so that the area calculated by triangulation based on the sensor signals can easily be matched with the position of the light source. Depending on the distances between the light sensors and the failing light source or fixture, the measured intensity will drop more or less. With target values of the intensities stored (calculated or measured upfront), a drop profile results, enabling the failure spot location.

13$^{th}$ aspect of "Failure Detection": The controlled agricultural system according to the any one of the 7$^{th}$ to 12$^{th}$ aspects of "Failure Detection", comprising a computing device and a sunlight sensor for measuring a sunlight intensity value, wherein the computing device is configured to evaluate the light intensity value measured by the light sensor for the failure detection whilst considering the sunlight intensity value.

In a preferred embodiment, the controlled agricultural system comprises an additional sunlight sensor. Likewise, in case of a greenhouse or glasshouse, or in case of an outdoor farm, the sunlight intensity can be considered when the light intensities measured for the failure detection are evaluated, as the intensity of the sunlight can vary depending on the weather (cloudy or bright sky) and daytime. With the sunlight sensor, this "background intensity" can be measured, enabling a differentiation of natural and artificial variations of the lighting.

14$^{th}$ aspect of "Failure Detection": The controlled agricultural system according to the any one of the 7$^{th}$ to 13$^{th}$ aspects of "Failure Detection", comprising a plurality of light sources, the Controlled Agricultural System being configured for modulating the emission of at least one light source temporarily, namely to impose a defined pattern, wherein a computing device of the Controlled Agricultural System is configured to allocate the light intensity measured by the light sensor to the at least one light source.

In a preferred embodiment, the controlled agricultural system is configured for modulating the emission of at least one light source temporarily. This can for instance be controlled by the computing device connected to a control unit of the light fixture, or light source. In general, the modulation could even be predefined in the control unit of the light fixtures. With the modulation, a pattern is imposed on the emission, for instance a periodical intensity change or a switch on/off routine.

The light intensity measured shows the same modulation. By an evaluation of this signal, for instance by a Fourier Transformation, the pattern can be read out. The modulation/pattern is a direct link between the light source and the measured intensity. Accordingly, an intensity change, for instance an intensity drop, can be assigned to the respective light source/light fixture.

15$^{th}$ aspect of "Failure Detection": The controlled agricultural system according to the any one of the 7$^{th}$ to 14$^{th}$ aspects of "Failure Detection", comprising a plurality of light sources, the Controlled Agricultural System being configured to trigger a clocked emission of the light sources in a measuring interval.

In a preferred embodiment, the controlled agricultural system is configured for triggering, in a measuring interval, a clocked emission of the light sources, either individually or in groups. The light sources emit one after the other so that the light intensity measured at different points in time can be assigned to the different light sources. The duration of the measuring interval can be in the range of seconds or milliseconds. The same time scale can be of interest for the modulation mentioned above.

16$^{th}$ aspect of "Failure Detection": The controlled agricultural system according to the any one of the 7$^{th}$ to 15$^{th}$ aspects of "Failure Detection", comprising a plurality of light sources having different spectral properties and a plurality of light sensors having different spectral sensitivities, a computing device of the Controlled Agricultural System being configured to correlate light intensity values measured in different spectral ranges with the light sources (300,400) having different spectral properties.

In some embodiments/implementations, a plurality of light sensors with different spectral sensitivities can be provided. The spectral sensors can either measure the total spectral range or their spectral sensitivity can fit to the maxima of the emission of the light sources used. Thus, it is possible to determine which spectral region is affected, namely which light source type is failing.

The element "Failure Detection" of the disclosure also relates to a method for controlling a controlled agricultural system, wherein a reduced emission of total failure of a light source is detected.

17$^{th}$ aspect of "Failure Detection": More specifically, the method for agricultural management, according to any one of the 1$^{st}$ to 16$^{th}$ aspects of "Failure Detection", comprises at least one controlled agricultural system, wherein a reduced emission and/or total failure of a light source is detected. Regarding further details, reference is made to the description above.

The element "Failure Detection" is also applicable to a group of light fixtures (luminaires) irradiating the same agricultural space. In one embodiment, all but one light fixture can be switched off for a predefined time window (measurement time interval) so that the sensors measure the irradiation from the operating light source (as described above), which is then repeated analogously for the other fixtures. Alternatively, all fixtures can stay in operation mode, wherein during each measuring time interval each fixture (the light sources thereof) is individually modulated (for example using a set of different PWM techniques) thus enabling a simultaneous measurement of all fixtures with the same sensors.

Further, the element "Failure Detection" also relates to a computer program comprising program instructions, which, when executed by a computing device, execute the aforementioned method.

$18^{th}$ aspect of "Failure Detection": Computer program product, comprising a plurality of program instructions, which when executed by a computing device of a Controlled Agricultural System according to any one of the $1^{st}$ to $16^{th}$ aspects of "Failure Detection", cause the Controlled Agricultural System to execute the Method for Controlling a Controlled Agricultural System according to the $17^{th}$ aspect of "Failure Detection".

"Failure Compensation"

According to the element "Failure Compensation" of the disclosure, a controlled agricultural system with a light fixture is proposed that is configured to be able to compensate a failing light source, namely a reduced emission or even total failure, at least temporarily, until the failed light source, affected module, or the light fixture as a whole, is replaced or repaired.

$1^{st}$ aspect of "Failure Compensation": More specifically, the controlled agricultural system comprises a plurality of light sources for providing agricultural lighting, wherein the controlled agricultural system is configured for compensating a reduced emission and/or total failure of a failing light source by an emission of another light source.

For instance, upon detection of the failing light source, an alert message can be issued, informing operating personnel about the failure. However, a replacement of the failing light source is often not possible instantaneously, depending for instance on the availability of an electrician or the accessibility of the respective region of the farm. In terms of preventing a contamination or the like of the plants, accessibility can be restricted, depending for instance on the growth cycle.

In this respect, compensating a failing light source according to the disclosure can prevent the plants from being illuminated insufficiently at least temporarily, namely until the light source is repaired or replaced. Even a temporary insufficient illumination, for instance in terms of the intensity or the spectral composition, can negatively impact the growth of the plants.

The light sources may be configured to emit radiation in the visible and/or the non-visible spectral range, as for example in the far-red range and/or in the UV-B region of the electromagnetic spectrum. It may be configured to emit monochromatic light, e.g. green 525 nm, or narrow band radiation with a Full Width At Half Maximum (FWHM) smaller than 50 nm, or broadband radiation with a Full Width At Half Maximum (FWHM) greater than 100 nm. The light sources may be an integral part of the light fixture as well as a remote yet connected element. It may be placed in various geometrical patterns, distance pitches and may be configured for alternating of color or wavelength emission or intensity or beam angle. The fixture and/or light sources may be mounted such that they are moveable or can be inclined, rotated, tilted etc. The fixture and/or light sources may be configured to be installed inside a building or exterior to a building. In particular, it is possible that the light sources or selected light sources are mounted such or adapted to being automatically controllable, in some embodiments/implementations remotely, in their orientation, movement, light emission, light spectrum, sensor etc.

The light sources may be selected from the following group or a combination thereof: light emitting diode (LED) including a phosphor conversion LED or pc-LED using a fluorescent and/or phosphorescence substance for conversion, laser diode (LD), laser activated remote phosphor (LARP), Organic Light sources such as OLED, quantum dot based light sources, solar radiation, an incandescent lamp, a halogen lamp, a Xenon or Mercury short arc lamp, a fluorescent lamp, a high pressure discharge lamp and a low pressure discharge lamp.

Below, two options for realizing the compensation of the failing light source are discussed.

$2^{nd}$ aspect of "Failure Compensation": The Controlled Agricultural System according to the $1^{st}$ aspect of "Failure Compensation", wherein the other light source is also switched on in normal operation prior to the compensation, its emission being increased for the compensation.

The light sources can typically be arranged array- or matrix-like. When one of the light sources is detected as failing, this can be compensated by an increased output of one or more surrounding light sources. Using more than one light source for the compensation can be preferred in general, in terms of homogeneity and in terms of avoiding an overload of the light sources used for the compensation.

$3^{rd}$ aspect of "Failure Compensation": The Controlled Agricultural System according to the $2^{nd}$ aspect of "Failure Compensation", wherein the light sources belong to a light fixture comprising a plurality of light sources, the Controlled Agricultural System being configured for choosing the other light source for the compensation on the basis of at least one of the criteria spatial proximity and spectral matching.

In a preferred embodiment, the light source(s) driven with a higher emission for the compensation is/are chosen depending on the spatial proximity and/or the spectral matching. Thus, those light sources, which are close to the failing light source and have a comparable or identical spectral composition or emission wavelength are chosen to compensate the failing light source. As discussed below, in some embodiments/implementations the respective decisions are taken automatically, for instance by a computing device. In particular, neuronal learning or other artificial intelligence techniques can be applied to optimize the decision taking.

$4^{th}$ aspect of "Failure Compensation": The Controlled Agricultural System according to the $2^{nd}$ or $3^{rd}$ aspect of "Failure Compensation", wherein the light sources belong to a light fixture assembled from exchangeable modules, each module comprising a plurality of light sources respectively, wherein the Controlled Agricultural System is configured for choosing the other light source within the module of the failing light source.

In a preferred embodiment, the agricultural system is equipped with one or more light fixtures, wherein the light fixtures are assembled from exchangeable modules respectively. Each module comprises a plurality of light sources. Therein, the light sources within a module can have the same spectral properties or can have a different emission wavelength.

$5^{th}$ aspect of "Failure Compensation": The Controlled Agricultural System according to the $4^{th}$ aspect of "Failure Compensation", configured for compensating the failing light source only within the module of the failing light source.

In some embodiments/implementations, the controlled agricultural system is configured for choosing the light source for compensating the failing light source within the same module. Basically, light sources of other modules can be used in addition. However, particularly preferred, solely the module of the failing light source is used for the compensation, i.e. no other light sources belonging to another module. This can be advantageous, as the high current operation required for the compensation can reduce the life time of the light sources which is less critical when the module is exchanged anyway (since the failing light source has to be exchanged by exchanging said module).

6th aspect of "Failure Compensation": The Controlled Agricultural System according to the 1st aspect of "Failure Compensation", wherein the other light source is redundant, namely is switched off prior to the compensation and switched on for the compensation.

An alternative approach to compensate the failing light source is to provide one or more redundant light sources. As long as no failing light source is detected, the redundant light source(s) is/are switched off. Providing a redundant light source could also be combined with using normal operation light sources for the compensation. In some embodiments/implementations, these are alternatives, one of them being chosen for the agricultural system.

7th aspect of "Failure Compensation": The Controlled Agricultural System according to the 6th aspect of "Failure Compensation", wherein the light sources belong to a light fixture comprising a plurality of redundant light sources switched off during normal operation.

In a preferred embodiment, a plurality of redundant light sources are provided in a respective light fixture. Particularly preferred, each interchangeable module of the light fixture can be provided with one or more redundant light sources. Regarding their spatial alignment, a rather equal distribution of the redundant light sources can be preferred, even so not required in general. The redundant light sources can have different wavelengths, the composition/mixture being adapted to the normal operation light sources.

8th aspect of "Failure Compensation": The Controlled Agricultural System according to any one of the 1st to 7th aspect of "Failure Compensation", wherein the light sources belong to a light fixture comprising a plurality of light sources and a sensor device for sensing the reduced emission and/or total failure of the failing light source.

In a preferred embodiment, a light fixture comprising the light sources (normal operation and/or redundant) comprises also a sensor device for sensing the failing light source. For instance, a current sensor can be provided for detecting a change of the current through the respective light source. Alternatively or in addition, an optical or light sensor, for instance a photodiode, can be provided for measuring the light.

9th aspect of "Failure Compensation": The Controlled Agricultural System according to any one of the 1st to 8th aspect of "Failure Compensation", comprising an actuator device for adjusting the emission of the light source and a computing device coupled with the actuator device and configured to cause the actuator device to compensate the failing light source by the emission of the other light source.

In a preferred embodiment, the controlled agricultural system comprises an actuator device for adjusting the emission of the light source, for instance a drive unit adjusting the current through the light source. The actuator device can be integrated into the light fixture or provided externally. Further, the agricultural system comprises a computing device which is coupled to the actuator device. The coupling of individual components, for instance the actuator device and the computing device, can be achieved wire-based or wireless, any known interface can be used (WLAN, LAN or Bluetooth for instance). The computing device is configured to cause the actuator device to compensate the failing light source as described above. Since the failing light source is known, the computing device can decide which light source (spectral properties/position) has to be driven with the appropriate intensity to achieve the compensation.

10th aspect of "Failure Compensation": The Controlled Agricultural System according to the 9th aspect of "Failure Compensation", comprising a data storage device or being linked to a data storage device linked to the computing device, a data set being stored in the data storage device, wherein the data set comprises data on ageing properties of the light sources, the computing device being configured for assessing the failing light source based on the ageing properties.

In some embodiments/implementations, the controlled agricultural system comprises a data storage device linked to the computing device. Therein, a data set is stored in the data storage device, which comprises data on the ageing properties of the light source(s). With such data, the decision about which light source has to be considered as the failing one could even be taken without any measurement at all. The system knows upfront the time of life and when a compensation becomes necessary because the emission decreases. However, in some embodiments/implementations, the ageing data is used in combination with the sensor detection, increasing the overall reliability of the decision taking.

11th aspect of "Failure Compensation": A Method for Controlling an Agricultural System, comprising a plurality of light sources, wherein a reduced emission and/or total failure of a failing light source is compensated by an emission of another light source.

Furthermore, reference is made to the description above, the features described there shall also be disclosed in terms of the method.

12th aspect of "Failure Compensation": The Method for Controlling an Agricultural System according to the 11th aspect of "Failure Compensation", for controlling a Controlled Agricultural System according to any one of the 1st to 10th aspect of "Failure Compensation".

13th aspect of "Failure Compensation": Computer program product, comprising a plurality of program instructions, which when executed by a computing device of a Controlled Agricultural System according to any one of the 1st to 10th aspect of "Failure Compensation", cause the Controlled Agricultural System to execute the Method for Controlling an Agricultural System according to the 11th or 12th aspect of "Failure Compensation".

"Heat Reflector"

According to the element "Heat Reflector" of the disclosure, a horticultural apparatus is proposed, particularly for use in a controlled agricultural system, particularly for breeding, growing, cultivating and harvesting in an agricultural facility, particularly a plant growing facility and/or an aquaponics facility, which comprises an agricultural light fixture and a heat reflector that is able to direct or redirect the heat generated by the agricultural light fixture to the plants.

1st aspect of "Heat Reflector": More specifically, the horticultural apparatus, particularly for use in a Controlled Agricultural System, comprises an agricultural light fixture, comprising at least one light module, configured for illuminating plants arranged on a cultivated area below the agricultural light fixture, a heat reflector arranged above the agricultural light fixture and configured to be able to reflect heat, emanating upwards from the agricultural light fixture, downwards to the plants.

Cooling of the LEDs is mainly done by heat conduction (through heat spreaders) and heat convection (through the air). During operation, due to cooling effects, the air above an agricultural light fixture comprising LED is hotter than the air below the agricultural light fixture. To heat the plants, however, more heat underneath the agricultural light fixture is needed. This can be achieved by installing a (heat) reflector above and/or attached to the agricultural light fixture. The reflector traps the heat (hot air) below. Furthermore, the reflector may comprise an infrared-reflecting surface, e.g. based on gold-, silver- or a dielectric coating, which reflects radiation, in some embodiments/implementations in the infrared range. Other coating ad/or heat reflective materials are for example, birefringent dielectric multilayer films and two-component infrared reflecting films comprising alternating layers of first and second diverse polymeric materials, Consequently, such a reflector reflects infrared radiation down to the plants, thus heating the plants and improving their growth, while recovering the heat energy which would have been lost otherwise.

2$^{nd}$ aspect of "Heat Reflector": The horticultural apparatus according to the 1$^{st}$ aspect of "Heat Reflector", comprising at least one ventilator configured to be able to direct the heat from the agricultural light fixture towards the heat reflector by means of forced convection.

The air convection from the agricultural light fixture to the reflector and thus the transportation of heat can be improved by arranging ventilators on the top face of the agricultural light fixture, which cool the LEDs by creating an airflow that directs the air towards the reflectors.

3$^{rd}$ aspect of "Heat Reflector": The horticultural apparatus according to the 1$^{st}$ or 2$^{nd}$ aspect of "Heat Reflector", wherein the heat reflector comprises a plane arranged parallel to the top side of the agricultural light fixture.

In first basic embodiment, the reflector comprises a plane made e.g. of metal, plastics or glass, which is attached or mounted above the agricultural light fixture, in some embodiments/implementations aligned parallel to the agricultural light fixture. In some embodiments/implementations, the surface area covered by the reflector is at least as large as the surface area covered by the agricultural light fixture.

4$^{th}$ aspect of "Heat Reflector": The horticultural apparatus according to the 1$^{st}$ or 2$^{nd}$ aspect of "Heat Reflector", wherein the heat reflector is shaped such that the heat emanating from the top side of the agricultural light fixture is first reflected sideways and then downwards, i.e. around the agricultural light fixture towards the plants.

In another embodiment, the reflector is shaped to be able to reflect the heat around the agricultural light fixture. For instance, an appropriate form of the reflector first reflects the heat sideways and then downwards (see for instance FIG. 2).

5$^{th}$ aspect of "Heat Reflector": The horticultural apparatus according to any one of the 1$^{st}$ to 4$^{th}$ aspects of "Heat Reflector", wherein the heat reflector comprises two or more movable parts that constitute the reflecting surface.

Furthermore, the reflector may also be partitioned in two or more separate parts that can be (automatically or by temperature sensor feedback control loop) moved apart (split) thus creating openings for carrying some of the heat away by means of upwards airflow while reducing the heat radiation downwards, and vice versa.

6$^{th}$ aspect of "Heat Reflector": The horticultural apparatus according to the 5$^{th}$ aspects of "Heat Reflector", wherein the two or more parts that constitute the reflecting surface are configured to be able to move apart thereby forming between the two parts an aperture where heat can escape, enabling to control the amount of heat reflected towards the plants.

7$^{th}$ aspect of "Heat Reflector": The horticultural apparatus according to the 5$^{th}$ or 6$^{th}$ aspects of "Heat Reflector", wherein at least one movable parts is configured to be able to adjust the direction of the reflected heat.

Furthermore, the orientation or inclination of the ventilators and/or the reflectors and/or parts of the reflectors may be adjustable, so that the heat can be directed in certain directions, e.g. to increase the heat in certain areas depending on the applied growth recipe.

8$^{th}$ aspect of "Heat Reflector": The horticultural apparatus according to any one of the 1$^{st}$ to 7$^{th}$ aspects of "Heat Reflector", comprising at least one supplemental heat source.

Furthermore, a supplemental heat source may be added to the agricultural light fixture to enhance the heating if necessary.

It should also be noted that a heat reflector can contain heat absorbing and heat storing materials (like phase transition materials) and thus release thermal energy even after the light sources were switched off.

It should also be noted that a heat reflector that is for example correlated with a specific fixture, can be connected to another heat reflector of a second lighting fixture thus allowing transfer of heat across two or multiple heat reflectors.

Furthermore, a solar panel or photovoltaic cells may be attached to the upper side of the reflector. Together with the reflector, the solar panel or the photovoltaic cells can help to shade the agricultural light fixture against heat from the sun in a greenhouse and at the same time generate additional energy to supply e.g. the agricultural light fixture or, as the case may be, sensors or ventilators.

9$^{th}$ aspect of "Heat Reflector": A Controlled Agricultural System, comprising at least one horticultural apparatus according to one of the 1$^{st}$ to 8$^{th}$ aspect, a computing device, configured to be able to control the horticultural apparatus according to a growth recipe.

More specifically, the controlled agricultural system is configured to be able to adjust the heat reflector, e.g. its position, alignment, shape, according to a growth recipe. The growth recipe comprises a light recipe, and it may also comprise temperature values appropriately correlated to the light recipe.

10$^{th}$ aspect of "Heat Reflector": The Controlled Agricultural System according to the 9$^{th}$ aspect of "Heat Reflector", wherein the growth recipe comprises a light recipe and correlated temperature values, measured for example at plant level.

It should be noted that temperature sensors can be attached to the reflective planes or be integrated into them, thus allowing measurement of the local reflector temperatures in real time. The horticultural light fixture and/or the heat reflector may be controlled such that the illumination and the temperature at the plants match with the growth recipe.

11$^{th}$ aspect of "Heat Reflector": The Controlled Agricultural System according to the 9$^{th}$ or 10$^{th}$ aspect of "Heat Reflector", comprising an actuator device configured to be able to control the position/alignment and/or the shape of the heat reflector.

Furthermore, as the case may be, ventilators and/or supplemental heat sources, arranged at the agricultural light fixture, may also be controlled by the computing device via the actuator device and/or any other suitable control unit.

12$^{th}$ aspect of "Heat Reflector": The Controlled Agricultural System according to any one of the 9$^{th}$ to 11$^{th}$ aspect of "Heat Reflector", comprising a data storage device for storing the growth recipe and/or control data for controlling the ventilator and/or control data for controlling the heat reflector.

The data storage device may comprise a database in which growth settings, including light recipes and correlated temperature values, for example measured at plant level, for various plants species are stored.

Furthermore, the computing device is configured to control the actuator device, including the heat reflector, and the agricultural light fixture, including—as the case may be—ventilators and/or supplemental heat sources arranged at the agricultural light fixture, according to the growth recipe stored on the data storage device.

The element "Heat Reflector" of the disclosure also relates to a method for agricultural management, particularly for breeding, growing, cultivating and harvesting in an agricultural facility, particularly a plant growing facility and/or an aquaponics facility, which enables to redirect the waste heat of the light fixture to the plants.

$13^{th}$ aspect of "Heat Reflector": A method for agricultural management, comprising the steps of arranging an agricultural light fixture above plants arranged on a cultivated area, illuminating the plants with the agricultural light fixture, arranging a heat reflector above the agricultural light fixture such that heat, emanating upwards from the agricultural light fixture, is reflected downwards to the plants.

$14^{th}$ aspect of "Heat Reflector": The method for agricultural management according to the $13^{th}$ aspect of "Heat Reflector", further comprising the step of configuring the heat reflector such that heat, emanating upwards from the agricultural light fixture, is first reflected sideways and then downwards, i.e. around the agricultural light fixture towards the plants.

Accordingly, the heat generated by the light sources of the light fixture, particularly LEDs, can be used to increase the temperature of the plants, thus improving the plant growth and recovering the heat energy.

$15^{th}$ aspect of "Heat Reflector": The method for agricultural management according to the $13^{th}$ or $14^{th}$ aspect of "Heat Reflector", for controlling a Controlled Agricultural System according to any one of the $9^{th}$ to $12^{th}$ aspect of "Heat Reflector".

The measures described above according to "Heat Reflector" allow establishing, maintaining and adjusting a specific microclimate around plants or even a single plant.

$16^{th}$ aspect of "Heat Reflector": A computer program product, comprising a plurality of program instructions, which when executed by a computer system of an Controlled Agricultural System according to any one of the $9^{th}$ to $12^{th}$ aspect of "Heat Reflector", cause the Controlled Agricultural System to execute the Method for Agricultural Management according to any one of the $13^{th}$ to $15^{th}$ aspect of "Heat Reflector".

After detecting a malfunction of a luminaire according to "Failure Detection", failing light sources can be compensated according to "Failure Compensation". Such detecting and compensating can be applied to luminaires, for instance, of the kind described in "Reflector heat" or "Light Guides".

The aspects of "Optical Arrangements" may be combined with various aspects of "Light Guides" for further enhancing the efficiency of irradiation to a plant bed. The measures proposed in "Light Guides" and "Optical Arrangements" can further be enhance with various aspects of "Extended Light Recipes".

UV-light can be used to destroy insects (see group "Plant Health & Growth" of the disclosure). Other wavelengths in the visible range or near infrared range can be used to provide photons to the plant to trigger specific hormone production, or other plant reactions, which are related to specific wavelengths. "Heat Reflector" describes an add-on to a luminaire, which can influences the plant growth (see group "Light/Growth Recipes" of the disclosure).

Smart Grid

According to the element "Smart Grid" of the disclosure, a controlled agricultural system with a connection to a smart grid is proposed. Furthermore, the agricultural system is configured to withdraw more current during times of a great electricity supply (i.e. low price) and withdraw less current in times of a lower supply (i.e. high price), by dynamically adjusting the light recipes for the plants.

The system uses growth recipes (see e.g. "Customized Requirements"). A growth recipe consists of values for light recipe (spectrum, intensity, photoperiod), CO2, temperature, humidity, nutrients, EC, pH, H2O, etc.

The growth recipe has an optimum value and value ranges for good, sufficient and short-term tolerable. Optimum values are self-explaining. Good values are high efficient values which lead to good economics, sufficient values keep the plants growing but slow and/or in not good quality and/or quantity, short-term tolerable values are values where the plant could live/grow for a short-term (e.g. 5 min.) but thereafter would die or have diseases.

To reduce/increase energy consumption, actuators could be orchestrated according to these values, but also production preparation activities (e.g. seeding) and post-production activities (e.g. cleaning of trays) could be shifted. Actuators could be water pumps, HVAC systems, lighting system, internal transportation/logistics, harvesting robots, production systems like seeding machines.

Different optical and ambient sensors are tracking all relevant data and a computer unit onsite or in the cloud is analyzing the data, e.g. due to the sensor data available from a substrate moisture sensor, it can be calculated how long the irrigation pumps can be shut down. Also with the data from optical/image plant sensors it can be detected if stress in the plant occurs and reduce cooling, irrigation etc., within the tolerance level of the plant.

In case of light treatments/adjustments, light might be switched off (or only the energy intensive part of the spectrum could be switched off or reduced), depending on the plants. For some plants, the light intensity can be reduced to the compensation point. The (light) compensation point is the light intensity on the light curve where the rate of photosynthesis exactly matches the rate of cellular respiration. At this point, the uptake of $CO_2$ through photosynthetic pathways is equal to the respiratory release of carbon dioxide, and the uptake of $O_2$ by respiration is equal to the photosynthetic release of oxygen. Keeping the illumination above the compensation point prevents the plant from losing energy.

However, when doing this, the reaction of the plant to high or low illumination has to be taken into account. There are long day and short day plants whose activities depend on the length of the day. Example *Cannabis*: This is a short day plant; if the critical day length will be shorter than ~14 hours (depending on variety) they will initiate flower; this would be bad if the branching of the plants were not complete and it would result in a lower biomass/flower production.

$1^{st}$ aspect of "Smart Grid": More specifically, a controlled agricultural system with a connection to a smart grid, comprises an acquisition unit for acquiring data from the smart grid, a computing device connected to the acquisition unit and configured to calculate a dynamic light recipe for a plant to be illuminated using the data from the smart grid, a control unit connected to the computing device, a light fixture connected to the control unit and configured to convert the dynamic light recipe into control signals for the light fixture and thereby produce a light intensity curve and/or a spectrum curve of the light fixture.

The smart grid provides information about energy costs, and so energy-intensive apparatuses can be operated at times when the prices are low (or is even offered credit if electricity is taken from the grid) because the demand is low or the supply is high (such as on very windy days, for example).

The agriculture system is calculating and showing the grower the cost estimation and revenue potential per project based on the utility company data, especially in case of grid stress. Based on that the agriculture system develops the best possible cost-revenue production planning and gives recommendations to the grower if it is economically reasonable if extra energy should be taken and for how long.

In addition, the status of the production has to be taken into account (provided e.g. by real-time sensor data) to see if any deviations from the production plan due to higher or lower availability of energy is acceptable.

The grower, of course, can define projects as mandatory so that they are executed as planned in any case. These settings are considered in the remaining production planning.

A step-by-step approach to supply more power to the system over time could make sense for user acceptance. Therefore, at the beginning the system is just giving notifications/recommendations regarding flexing of the smart grid. Later on the system decides and implements the growth conditions totally independent.

In case of grid stress, the amount of electricity to be taken from the grid, prices and duration for how long the electricity should be taken will be provided (the system generally provides the price level and the electricity availability).

To take into consideration the availability of (cheap) energy for production planning, the controlled agricultural system may comprise an API to a weather forecast system and an API to the utility company is beneficial to get real-time data and to perform the smart grid approach. The system can also contain an API to a growth recipe input providers.

With the help of price information items from the past and weather forecasts, it is possible to identify when the electricity price will be low or negative.

Furthermore, it is also possible to use time-zone effects, e.g. the import of electricity from EU or other countries that are already in the "night phase"—or are currently consuming less energy.

Therefore, the controlled agricultural system according to "Smart Grid" serves to balance the electricity consumption in a smart grid ("grid balancing").

2$^{st}$ aspect of "Smart Grid": The controlled agricultural system according to the 1$^{st}$ aspect, comprising an energy storage configured to be able to receive electrical energy in the case of an electricity surplus and/or in the case of a cheap electricity rate in the smart grid.

3$^{nd}$ aspect of "Smart Grid": The controlled agricultural system according to the 1$^{st}$ or 2$^{nd}$ aspect, comprising an energy storage configured to be able to output electrical energy in the case of an electricity deficit and/or in the case of an expensive electricity rate in the smart grid.

In a preferred embodiment, the vertical farm can have local energy storages in order to capture brief times of surplus or deficit. Consequently, the vertical farm can serve as a battery in the smart grid. Furthermore, energy can be stored in the local energy storages when prices for electrical energy are low and used for operating the controlled agricultural system when prices for electrical energy are high.

The acquisition unit is configured to be able to acquire, e.g. via the Internet or other databases, store and evaluate the energy costs (in some embodiments/implementations electricity in this case).

Furthermore, according to "Smart Grid", a method for agriculture/agricultural management is proposed that balances the electricity consumption of the controlled agricultural system according to the supply from a smart grid power supply.

4$^{th}$ aspect of "Smart Grid": A method for agriculture, comprising a controlled agricultural system according to any one of the 1$^{st}$ to 3$^{rd}$ aspect of "Smart Grid" and the following method steps: acquiring data, in particular the electricity price, from the smart grid by the acquisition unit, calculating a dynamic light recipe for a plant to be illuminated by means of the computing unit, taking account of the data, in particular the electricity price and/or the available amount of electricity, from the smart grid, actuating the light fixture by the control unit, which converts the dynamic light recipe from the computing device into corresponding control signals for the light fixture, as a result of which a light intensity or light intensity curve is produced by the light fixture.

5$^{th}$ aspect of "Smart Grid": The method for agriculture according to the 4$^{th}$ aspect of "Smart Grid", comprising the step of predicting the curve of the electricity price by means of the computing device based on the data from the smart grid.

6$^{th}$ aspect of "Smart Grid": The method for agriculture according to the 5$^{th}$ aspect of "Smart Grid", comprising the step of taking account of the predicted curve of the electricity price when calculating the dynamic light recipe by means of the computing device.

The controlled agricultural system moreover comprises a computing device, which is configured to be able to predict the curve of the electricity price with the aid of the smart grid when using the acquisition unit, for example using historical data of the electricity curve depending on parameters such as time or weather.

The computing device is configured to render the light recipes dynamic. By way of example, the DLI is known on account of the available, static light recipes. The dark times of the plants and, possibly, other parameters are likewise known. The computing device now knows the target spectrum over time, i.e., the energy consumption over time. It has available a prediction of the energy availability and, using this, it is able to calculate what energy, i.e., light intensity, can be made available at what time. The computing device now optimizes (minimizes) the costs for the energy supply, with it being ensured that boundary parameters such as the entire photon flux per day required by the plants is reached but also that dark times (i.e. rest periods of the plants) are observed.

These information items are then transmitted to the control units (light control units) of the light fixtures (agricultural light fixtures), said control units actuating the light fixtures according to this profile. Depending on the electricity price, the profile substantially changes in terms of the overall intensity and/or the actuation of the individual light colors or spectral regions. Initially, the relative intensity of the individual wavelength regions with respect to one another remains unchanged. However, it is also conceivable for the spectrum itself to change as a consequence of rendering the spectrum dynamic.

By way of example, it is conceivable that the spectrum is restricted in a targeted manner to those LEDs that produce electricity efficiently such that the daylight sum can be obtained with low costs (e.g., the light fixture can actuate only blue LEDs and deactivate other colors that operate less efficiently since the light is converted therein, or only operate said other colors in dimmed fashion).

Moreover, it is possible to undertake a change between different light sources and/or change a mode of operation of different light sources by means of the control unit that is connectable to a smart grid. By way of example, in the case of a mixed illumination, there can be a change from a predominant illumination with conventional halogen or discharge lamps to a predominant illumination using light-emitting diodes, and vice versa.

7$^{th}$ aspect of "Smart Grid": The method for agriculture according to any one of the 4$^{th}$ to 6$^{th}$ aspect of "Smart Grid", comprising the step of absorbing a brief electricity surplus by way of correspondingly increasing the light intensity of the light fixture (grid balancing) and/or charging the energy storage.

A brief surplus may also be taken up by a vertical farm according to the disclosure. Here, the light fixtures are operated with a higher intensity than what is provided for by the light recipe. The control unit has available the maximum illumination that a plant can accept without stress. In a first step, the illumination intensity (and hence the electricity consumption) is increased to this value.

However, it is also possible to briefly increase the intensity of the illumination above this threshold if a very large current supply is present and the grid power supply has to be relieved quickly (in order to take the "pressure" out of the power supply grid in real time; i.e., it is possible to also control the light fixtures in real time). Plants can withstand illumination that is too strong for a certain amount of time. In some embodiments/implementations, the stress on the plants is checked using a sensor for stress detection such that these are not stressed too strongly. A sensor for stress detection can be a fluorescence sensor, which measures the efficiency of the photosystem, or a cuvette for measuring gas exchange ($CO_2$ fixation in the plant), with the cuvette being attached at representative positions.

The sensors may provide data about the maximum capacity of the photosystem for the plants. Then the system can make decisions about how much electricity it can use for the lights (intensity or spectrum) without damaging the photosystem.

By measuring the activity of the photosynthesis and creating a light curve with regard to factors like temperature, and carbon dioxide level, the light level can slowly be increase up to the point where it is most comfortable to the plants. (Note: plants can adapt over time to higher light intensities) so a few days later may be the comfortable zone could be higher or lower, depending on past illumination levels.

One way to prioritize certain products, is to implement current market prices for the crops. If possible, local prices would be the best Since a vertical farm may also house different types of plants, the computing device can in some embodiments/implementations apply the brief stronger irradiation to those plants that are less susceptible to elevated illumination intensities.

Moreover, the computer device has access to information about what products are grown in the coming days and what light recipes are required to this end. The light recipes are associated with time-resolved energy consumption. In a conventional grid power supply, the light recipes would simply be run through.

Typical behaviors of the computing device appear to be: the plants are illuminated with a lower photon flux and/or a different spectrum in the case of high energy costs. In exchange, a higher photon flux and/or a different spectrum can be made available at times with lower energy costs.

Vertical farms may also be operated predominantly at night, with the adaptations or control mechanisms described above also being carried out here on account of electricity price variations.

The computing device checks the actual costs and predicted costs of the illumination profile at regular intervals. A new optimization of the illumination profile is undertaken if the deviation exceeds a set threshold.

8$^{th}$ aspect of "Smart Grid": The method for agriculture according to the 7$^{th}$ aspect of "Smart Grid", comprising the steps of recalculating the planned light intensity curve after the end of the brief electricity surplus and taking account of the previously increased light intensity profile on account of the grid balancing.

These brief phases of excess irradiation are then taken in account by the computing device when calculating the dynamic light recipes; i.e., phases of excess irradiation are compensated by phases of lower irradiation or by a reduction in the irradiation time or by a change in the irradiation spectrum. The term "dynamic" can thus relate both to a time-varying irradiation intensity (e.g., photon flux) and to a time-varying irradiation spectrum of the respective light recipe. Thus, irradiation components of spectral regions, for example blue to dark-red, can be changed over time and can be adapted to the selected energy options. The timescales for change or adaptation may be implemented in a second, minute, hour or day clock or longer, depending on how the energy supply or the energy costs change.

However, unlimited amounts of energy are not available at all times in a smart grid if limits are placed on the costs or if the intention is to profit from times of particularly low or negative prices. According to the disclosure, the light recipes are not simply left statically but the light recipes are made dynamic; i.e., the light recipe, in particular the intensity of the emitted light, is modified depending on the availability of the energy.

As a result of rendering the light recipes dynamic, an optimal use of cost-effective electricity for the operation of the plant light fixtures is possible. Moreover, the controlled agricultural system is configured to also act as an energy storage for the smart grid (grid balancing). To this end, provision is made of adapting the dynamic light recipes to brief electricity surpluses or deficits or to low or high electricity costs and/or of charging or discharging an energy storage.

When the farm has decided how much energy it could consume, it feedbacks the information back to the grid which can either accept or reject the offer (rejection e.g. in case surplus needs to be taken). The API may include a user identification, so that the power supplier directly knows who is making the offer and/or whom it is talking to.

When the modified power supply is applied, the effect on the plants is checked regularly with regards to thresholds prescribed by margins of the growth recipe i.e. to see if not too much stress in introduced on the plant. Light sensor is an example of a sensor, which could be used for verification, but also pH- and/or EC-sensors could be used to monitor water content if circulation is increased, or visual sensors for stress detection if only the spectrum rather than switching off the light are manipulated.

For the time being, it appears that the "smart grid" only provides tariffs, in the form of:

Time-based (time during the day, day during the week, season);

Location-dependent (city/rural, degrees of separation or distance from core distribution network);

Tier-bound (min/max energy demand of the customer);

Charge type (fixed price, consumption-based, demand-based, etc.).

Therefore at the moment the smart grid can only react to the price conditions provided by the energy supplier without providing an active response—e.g. given the demand of particular crops in coming times and their associated growth recipes, the software can only figure out an optimal match to the available tariffs, i.e. plan the optimal growth settings.

An alternative to planning and reactive operation would be to buffer the energy in power banks at the time when prices are low and using that reserve when the prices are high. This could especially be used to store energy when the prices are negative. The stored electricity could then simply be sold in times of positive prices.

In conclusion, according to the disclosure, the control, as explained above, of the controlled agricultural system in a smart grid not only obtains economical advantages by an optimal use of more cost-effective current, instead the controlled agricultural system also acts as an energy buffer in a smart grid (grid balancing). These aspects are assisted as a result of rendering the light recipes dynamic.

Naturally, a controlled agricultural system connected to a smart grid power supply (smart grid) can also store energy, for example in batteries, flywheel energy storages and the like, and then can either use the stored energy itself at a later time or, for example, supply its stored energy to another agricultural system, controlled thus, that is connected to a smart grid power supply (smart grid) (exchange of energy between controlled agricultural systems).

In a further refinement of "Smart Grid" the light recipes may be adjusted according to the various elements of the group "Light/Growth Recipes" in order to reduce overall energy cost. Alternatively or additionally, the temperature in the horticultural facility may be optimized as well according to "Temperature Dependent Illumination" and/or "Temperature Control" in order to maximize energy savings.

Furthermore, adjustments of suitable parameters can be conducted by the controlled agricultural system in order to compensate negative effects that may result when the system reduces the energy consumption because of high prices for electrical energy. Specifically, when the control unit of the system adjusts the parameters such that energy consumption is reduced, the growing conditions for plants may not be optimal or even adverse. For instance, too low temperatures may decelerate the growth of plants. Therefore, the light recipes may be adjusted to compensate the effect of low temperatures according to "Temperature Dependent Illumination" and "Temperature Control". Further parameters, such as humidity, $CO_2$-concentration, etc. that influence the growth of plants may be adjusted as well.

Customer Interaction

"Customer Requirements"

According to the element "Customer Requirements" of the disclosure, a controlled agricultural system comprises actuators that influence the plant health and growth based on the target product defined by the customer.

"Customer Requirements" allows the customer not only to order the type and amount of a plant or product but also to set certain characteristics of the plant. The characteristics may include (not exhaustive): color, content (e.g. vitamins, THC and other cannabinoids, etc.), the morphology (i.e. form of the plant), degree of maturity, etc.

By way of example, the term plants should include the following products in this case: wheat, grapes, berries, algae, fungi, flowers, crops and the like, but also fish (aquaponics).

Below, various aspects and details of "Customer Requirements" are described.

1st aspect of "Customer Requirements": A controlled agricultural system for customized plant growth, comprising an acquisition unit for acquiring the definition of the target product by the customer, actuators configured to be able to act on the plant (target product) or plant growth, a control unit connected to the actuators, a computing device connected to the acquisition unit and the control unit and configured to be able to establish control parameters for the actuators from the definition of the target product.

It has been established that plants react to light (including ultraviolet and infrared) and other environmental parameters. Thus, the chlorophyll portion of broccoli can be increased if it is irradiated by UV light prior to harvest, just like the proportion of glucosinolates (cardiac or mustard oil glycoside). Other wavelengths excite the height growth of the plant or ensure a more compact form (morphology) or stimulate the production of certain ingredients (active ingredients, enzymes, etc.).

Thus, a customer may select his/her product or product properties, such as content (e.g., vitamin C content), plant form, quality of the plants or fruits (such as firmness to bite), color, etc., from a multidimensional parameter set or a correspondingly displayed graphical representation. The selection options for the customer may also be divided in predefined quality categories or quality certificates, simplifying a selection and order process.

For this purpose, the controlled agricultural system may comprise a communications device with the customer, for example, a Graphical User Interface (GUI), which provides a selection menu for selecting a product order variant. The GUI may also make available to a customer an augmented or virtual reality representation of the desired result.

Furthermore, the controlled agricultural system may comprise a computing device with storage, data processing and data analysis equipment, a database, software or a computer program, API interfaces.

2nd aspect of "Customer Requirements": The controlled agricultural system according to the 1st aspect of "Customer Requirements", comprising sensors connected to the control unit and configured to check the plant growth or the plant health (actual values), wherein the computing device is configured to establish adapted control parameters for the actuators in the case of an unscheduled deviation of the sensor data (actual values) from an expected profile of the plant growth for the target product (intended values).

The (grown) products may be subject to constant quality monitoring. To this end, the controlled agricultural system may also comprise corresponding sensors, for example, electric, thermal, magnetic, spectroscopic, cameras, etc.

3rd aspect of "Customer Requirements": The controlled agricultural system according to the 1st or 2nd aspect of "Customer Requirements", wherein the actuators comprise a horticultural light fixture.

4th aspect of "Customer Requirements": The controlled agricultural system according to any one of the 1st to 3rd aspect of "Customer Requirements", wherein the sensors comprise a camera.

The controlled agricultural system converts this customer requirement into a suitable growth recipe (in fully or partly automated fashion), which may actually be a light recipe. The light recipe can be provided by an appropriately embodied plant illumination unit (horticultural light fixture). In some embodiments/implementations, light-emitting diodes are used as light sources for the illumination unit.

A light recipe means a temporal change in the spectrum (i.e., temporal light phases), to be precise in relation to, inter alia, spectrum (spectral distribution), intensity (photon flux, photobiologically active radiation), incoming radiation direction, dark times, pulsed operation, shock treatment with UV light, etc. Thus, the light recipe for the germination phase may have a spectrum with a certain embodiment, said spectrum may have a further embodiment for the growth phase and a third embodiment for the maturing phase. The duration of the temporal phases and further growing conditions can be set in a light recipe (on the basis of empirical values or predictions, for example).

However, in addition to a light recipe, a growth recipe may also comprise further parameters, such as the temperature, the $CO_2$ content, the humidity, the watering or the use of fertilizers and pesticides, for example.

5th aspect of "Customer Requirements": The controlled agricultural system according to the 3rd and 4th aspect of "Customer Requirements", wherein the control parameters comprise the control signals of a light recipe, by means of which the plant light fixture is actuated.

The growth recipes are now used to appropriately operate the light fixtures over the planted fields (light recipe, position, form, location) such that the characteristics of the plants desired by the customer are produced. Additionally, as already described above, nutrients and other parameters may also be adapted appropriately.

In the case of deviations in the growth or maturing parameters or in the case of the identification of diseases or pests, the light recipe (spectrum, intensity, time duration) and, optionally, further influencing variables (fertilizer, watering, pest control, etc.) are modified.

By way of example, the irradiation duration and growth state can be actively monitored using a sensor system. Thus, the end of the germination phase may be defined by virtue of the plants (or some of the plants in a bed) having reached a certain height or having formed a certain number of leaves or a certain leaf density.

6th aspect of "Customer Requirements": A method for agriculture, comprising a controlled agricultural system according to any one of the 1st to 5th aspect of "Customer Requirements" and the following method steps: acquiring the definition of the target product by the customer with the aid of the acquisition unit, calculating the control parameters for the actuators by the computing device on the basis of the definition of the target product, actuating the actuators with the control parameters by the control unit.

7th aspect of "Customer Requirements": The method for agriculture according to the 6th aspect of "Customer Requirements", further comprising the steps of checking the plant growth or the plant health (actual values) on the basis of the sensor data by way of the computing device, adapting the control parameters by way of the computing device if the check (actual values) shows unscheduled deviations in relation to an expected profile of the plant growth for the target product (intended values).

Control parameters for actuators that influence the plant growth or the plant health are established based on the definition of the target product by the customer. In some embodiments/implementations, the plant growth or the plant health is monitored by means of a sensor system (actual values). The control parameters are suitably adapted in the case of unscheduled deviations in relation to an expected profile of the plant growth for the target product (intended values).

8th aspect of "Customer Requirements": The method for agriculture according to the 6th or 7th aspect of "Customer Requirements", comprising the step of predicting the profile of the plant growth (intended values) on the basis of the definition of the target product and the control parameters suitable to this end, e.g., the light recipe, by way of the computing device.

9th aspect of "Customer Requirements": The method for agriculture according to any one of the 6th to 8th aspect of "Customer Requirements", comprising a database in which the optimal profile of the plant growth of the target product (intended values) is stored.

10th aspect of "Customer Requirements": The method for agriculture according to any one of the 7th to 9th aspect of "Customer Requirements", comprising the step of transmitting information items in relation to the plant growth or the plant health (actual values) to the customer.

If active monitoring of the growth occurs, then these information items may also be made accessible to the customer, for example as a data record, as an image (or camera recording) or in the form of a graphical representation (e.g. virtual or augmented reality). Furthermore, the customer can be informed in respect of the expected delivery date and an appropriate product certificate may also be issued to them.

"Success Score"

According to the element "Success Score" of the disclosure, a controlled agricultural system is configured to be able to evaluate a success score for growing a customized plants based on the setup of the agricultural system. Furthermore, the controlled agricultural system is able to control and/or (re-)adjust the growth parameter and other relevant parameters such that the goal is reached (if feasible), in some embodiments/implementations in the optimal way or at least approximately.

1st aspect of "Success Score": A Controlled Agricultural System, comprising an interface for submitting and/or receiving requests for a customized plant, a data storage device comprising growth recipes of plants, a computing device, configured to choose a growth recipe from the data storage device matching to the request, the computing device, further configured to render a model plant (digital plant twin) based on the chosen growth recipe, an actuator device able to adjust growth parameters of plants, a sensor device able to measure distinctive characteristics of plants, particularly suitable for monitoring plant growth (measured data of real plants), the computing device, further configured to control the actuator device based on the data stored in the data storage device, particularly for conducting growth recipes, the computing device, further configured to collect the data from the sensor device, particularly for monitoring the growth status of the plants, the computing device, further configured to compare the data of real plants measured by the sensor device with the data of the model plant stored on the data storage device and to identify possible differences between the real plant and the model plant.

The grower can insert his demand or the demand of his customer in a special customized plant project dashboard (or any other user interface), which may be a general platform, e.g. a digital platform like an online-platform, to which several growers are connected. The customer of the grower, which may be a retailer, e-grocer, pharma company or food processor, may even be directly linked to the digital platform and submit his/her demands directly.

The demand may include plant quantity, plant quality and/or delivery time. Plant quality is mainly defined by primary and secondary metabolites as well as appearance. Plant quantity is defined by yield (fresh or dry weight). As an example, if an e-grocer wants to run a summer campaign for spicy mojitos and needs special mojito mint, which tastes strong/spicy, he can insert this demand into the platform. The platform automatically finds hits where this mint has been grown with a special spicy flavor profile and suggests a "Customized growth recipe" to create this customized product.

2nd aspect of "Success Score": The Controlled Agricultural System according to the 1st aspect of "Success Score", wherein the computing device is further configured to choose the best-match growth recipe currently available in the data storage device.

Furthermore, the controlled agricultural system is configured to assess, which growth recipe might be needed/suitable to achieve the desired results under the premises that for example taste, sugar content, acid content, and content of aromatic components can be controlled and adjusted by different growth parameters (environmental) and by nutrients and, if necessary, pesticides.

One example is getting hotter chili peppers by doing the cultivation very dry (less water supply)). The growth recipes can be predefined growth recipes from sources like growth substrate manufacturers, lighting companies, universities, and governmental institutions.

The growth recipes are stored in an accessible database. The database can be updated by the platform provider or by the growth recipe provider through APIs. In some embodiments/implementations, the controlled agricultural system chooses the best-match growth recipe currently available in the database.

The controlled agricultural system according to the disclosure comprises a computing device. Considering all inputs (e.g. quality, pricing, available capacity), the computing device is configured to either select or calculate which growth recipe can be used to reach the goal, in some embodiments/implementations in the optimal way.

To do this, the computing device "knows" which environmental or other growth parameters influence the plant parameters for the specific plant or biologically similar plants (e.g. from the same plant family) and can either select or suggest suited growth parameters for the desired result, for example by calculating suited growth parameters (including suited light recipes) by applying artificial intelligence (AI) or similar methods based on the currently available database information and customer input.

A growth recipe comprises for example values for light recipes (spectrum, intensity, photoperiod), CO2-content of the air, temperature, humidity, nutrients, EC (electrical conductivity), pH, H2O, etc. A light recipe may comprise a time-sequential set of individual light recipes.

3rd aspect of "Success Score": The Controlled Agricultural System according to the 2nd aspect of "Success Score", wherein the computing device is further configured to analyze whether the best-match growth recipe can be realized with the available setup of the controlled agricultural system and, otherwise, suggests a feasible growth recipe.

However, the actual setup (light sources, lighting fixtures, placement of lighting fixtures, actuators) will be different for almost every grower so that the pre-defined growth recipe might not provide the optimal result for each and every case. New requirements that have not been tested before might also not lead to or even prohibit the desired results.

The controlled agricultural system comprises a sensor device (sensor device system) that measures the deviations and collects/stores the data (e.g. in the cloud or a local data storage device) and feeds the collected information into the database. The sensor device system may contain a variety of different sensor types in order to measure a variety of relevant plant growth data as well as post-harvest plant data, like the concentration of certain enzymes or the concentration of vitamins and glucose. The sensor device may be configured to establish a communication network between themselves.

Digital Model Plant ("Digital Twin")

Based on all the collected data describing the "real" plant growth and selected or calculated and applied growth parameters that should lead to a desired plant growth, the computing device is configured to render a model plant, a "digital plant twin", e.g. based on artificial intelligence. This digital plant twin encompasses the applied input factors (=growth recipes which includes pre-defined recipes and recipes from growers) and delivers the correlated output factors (=growers results). A digital horticultural plant can also be called a virtual plant or a digital twin model.

With the help of the digital plant twin, the computing device is configured to analyze deviations to the ideally wanted plant and assesses which growth parameters (may) lead to deviations from the ideal plant. To do the assessment, the computing device is configured to compare the digital plant twin, which is described by all relevant growth parameters (=growth recipe) with the measured/collected real growth data plus the post-harvest data referring to plant quality and quantity as documented in the controlled agricultural system by the grower/user. The deviations between both datasets (model vs. real) are automatically recorded by the system and stored in the database. Based on several installations (different customers), these deviations are documented and influencing patterns are identified and interpreted by algorithms (=machine learning) in order to define that a specific deviation to the model (=growth recipe) led to a specific effect in the plant growth and post-harvest results. Thus, the disclosure enables to define growth recipes adapted to a specific growth environment.

Examples of different results compared to the digital model could be faster growth time, different plant quality (e.g. more anthocyane in a lollo rosso lettuce or higher glycemic index (GI) values in a strawberry) or more yield (e.g. more tomatoes per $m^2$). In case the data set is insufficient or the types of sensors are inadequate to find an acceptable solution, the computing device can suggest selection and placement of additional sensors based on stored database information.

4th aspect of "Success Score": The Controlled Agricultural System according to any one of the 1st to 3rd aspect of "Success Score", wherein the computing device is further configured to adjust the growth parameter by means of the actuator device in order to minimize any differences between the real plant and the model plant.

5th aspect of "Success Score": The Controlled Agricultural System according to any one of the 1st to 4th aspect of "Success Score", wherein the actuator device comprises one or more actuators able to adjust one or more of the following growth parameters: water, nutrient, light (intensity, spectrum), humidity, temperature, air ventilation, pesticides.

6th aspect of "Success Score": The Controlled Agricultural System according to any one of the 1st to 5th aspect of "Success Score", wherein the sensor device comprises one or more sensors able to measure one or more of the following parameters: temperature, illumination (intensity, color temperature, spectrum), and/or the color and/or the chemical constituents and/or or the morphology of the plants and fruits, and/or optical devices, e.g. cameras for imaging methods.

7th aspect of "Success Score": The Controlled Agricultural System according to any one of the 1st to 6th aspect of "Success Score", wherein the computing device is further configured to evaluate a success score based on data stored in the data storage device from similar configurations regarding customer demand, result of the corresponding plant project and the setup of the respective agricultural system.

In a preferred embodiment, the controlled agricultural system is configured to use artificial intelligence (AI) or Deep Learning methods to calculate customized growth recipes based on different grower data. The likelihood of a successful growth according to the customer's wishes highly depends on the database, i.e. the available knowledge about the desired plant features. For example, the likelihood is high (e.g. >90%) if several customers (e.g. >2 customer) had the same wishes and have successfully grown the customized product. However, the likelihood is low (<10%) if no customer has grown the respective plants with comparable requirements. This likelihood can also be expressed in terms of statistical standard deviations, like 1, 2 or 3 sigma. The higher the likelihood of getting the desired results, the higher the success score.

Furthermore, the controlled agricultural system may have an automatic algorithm to search for data overlap of growing conditions (plant, facility, sensors, actuators, etc.), required plant expression or characteristics (=customized plant) and successful growth according to requirements. Based on that, the system is generating and displaying an estimated success score at the beginning of a possible project to the customer. The success score could go for example from 1 to 10 points whereas 10 is expressing total confidence of a successful plant growth according to the desired outcome (=likelihood 100%) and 1 is meaning very low confidence.

8th aspect of "Success Score": The Controlled Agricultural System according to the 7th aspect of "Success Score", wherein the computing device is further configured to suggest measures for improving the success score if the evaluation initially resulted in an unacceptable low value.

For low success score values for example below 7 (=70% likelihood) the system recommends measures to increase the confidence level for a successful growth. The suggested measures could include a pilot test together with a description how to set it up. It could also include cultivation support by a respective expert in the field. The support can be done physically or remotely over the platform in form of a webcast. Another measure could be to suggest directly connecting two growers growing the same cultivar to enable information sharing between both parties. This of course should be approved by both parties beforehand.

9th aspect of "Success Score": A method for agricultural management, comprising at least one controlled agricultural system according to any one of the 1st to 8th aspects and the steps of, receiving a demand on the platform (growers view), submitted by a customer via the dashboard of the platform (customers view), determining the growth parameters that influence the plant characteristics relevant to the customer's demand, calculating a growth recipe (preferably best-match; optionally extrapolating from existing growth recipes) by means of the computing device based on the information of the previous steps and the database, e.g. a collection of growth recipes and results achieved under various environmental conditions and agricultural system setups, rendering a model plant (digital plant twin) by means of the computing device based on the growth recipe determined in the previous step.

10th aspect of "Success Score": A method for agricultural management according to the 9th aspect of "Success Score", further comprising the steps of comparing the growth of the real plant with the model plant by means of the computing device based of the data from the sensor device and the digital plant twin and detecting possible deviations between real plant and model plant.

11th aspect of "Success Score": A method for agricultural management according to the 10th aspect of "Success Score", further comprising the steps of analyzing which growth parameters caused the deviations between the real plant and the model plant by means of the computing device, adjusting the growth parameters of the growth recipe by means of the actuator device and the computing device in order to minimize the detected deviations.

All projects are documented in the database (located on platform and/or local data storage device) including customer and price. Additionally the platform of the grower may be connected through APIs to utility companies, weather companies, growth recipe input providers, etc. Based on this data as well as the input factors of the customized growth recipe, a cost per kg/plant/tray/etc. is calculated.

12th aspect of "Success Score": A method for agricultural management according to any one of the 9th to 11th aspects of "Success Score", further comprising the steps of storing the environmental data and growth data of the real plant(s) collected by means of the sensor device and the post-harvest data (particularly regarding the characteristics relevant to the customer's demand) into the database.

All the above-described measures have the intention to increase the success score for the grower and improving the database of the system. If the goal is reached and the likelihood is increased, the grower feeds the information back to the system. The information could be changing parameters to the growth recipe according to the consultation feedback or successful trial. Thereafter, the grower is starting with the growing according to the (updated) parameters of the digital plant twin. The real data and post-harvest data are thereafter brought back in the system for usage of customized plant growth recipes and success scores.

13th aspect of "Success Score": A method for agricultural management according to any one of the 9th to 12th aspects of "Success Score", further comprising the steps of analyzing by means of the computing device which growth recipe is feasible with the available setup of the controlled agricultural system, in some embodiments/implementations based on the best-match growth recipe, optionally extrapolating from existing growth recipes.

14th aspect of "Success Score": A method for agricultural management according to any one of the 9th to 13th aspects of "Success Score", further comprising the steps of searching the database for similar configurations (setup, growth recipe) by means of the computing device, calculating a success score for estimating the chances of success for growing the customized plant, by means of the computing device based on the search result.

Customized Plant Growth

Appropriate ("best match") growth recipes may be provided by third parties. However, the use of 3rd-party growth recipes may require a royalty payment (license fee). Therefore, the controlled agricultural system may be configured to be able to calculate the overall costs for using the recipes and alternatives, including used materials like nutrients, costs for electricity, wear of the equipment and the probably achievable quality, and chose an optimum.

The revenue potential can be calculated based on the target price of the customer or market prices received via APIs from other customers or online-marketplace.

The platform is calculating and showing the grower the cost estimation and revenue potential per project. Based on that the platform develops the best possible cost-revenue production planning with maximum capacity utilization.

The grower, of course, can select projects (or certain features e.g. concerning quality) as mandatory so that they are executed in any case. These settings are considered in the remaining production planning.

If the grower has idle acreage/space to grow crops he wants to, i.e. he has no binding customer projects, the platform suggests the best crop to grow based on relevant data like maximum margin or tests to improve quality/quantity of regularly demanded products or product features.

Based on this planning, delivery times are calculated. If the customer wants to push the delivery date the platform suggests changes to the production planning to the grower.

15th aspect of "Success Score": A method for agricultural management according to any one of the 9th to 13th aspects of "Success Score", further comprising the steps of preparing an offer based on customer's demand, calculated costs and, optionally, the success score calculated, submitting the offer to the customer, in some embodiments/implementations via the platform, by addressing the dashboard of the customer who submitted the request.

When a customer is inserting a demand for a customized plant (via dashboard), the platform gives the corresponding offer of a grower either directly to the customer through an API or open platform (success score, delivery time and price) or personally to the customer.

16th aspect of "Success Score": A method for agricultural management according to the 15th aspect of "Success Score", further comprising the step of requesting amendments (e.g. price, plants characteristics, delivery . . . ) to the offer by the customer, in some embodiments/implementations via the platform.

If the customer wants to change the offered time, price or is not satisfied with the success score (i.e. the calculated probability to reach the goal), he can insert this additional demand into the dashboard. Either the platform has the rights to consider adjustments to the production planning or reports this requests to the grower who may approve or reject the demand.

17th aspect of "Success Score": A method for agricultural management according to the 15th or 16th aspect of "Success Score", further comprising the step of making a respective contract between the costumer and the grower, in some embodiments/implementations via the platform, if both parties agree to the deal.

If agreed by both parties the deal making process is completed and the contract is established in the checkout process of the platform. If no deal has been established the platform could suggest another grower (match making).

18th aspect of "Success Score": A method for agricultural management according to any one of the 9th or 17th aspects of "Success Score", further comprising the step of presenting the growth status of the customized plants to the customer, in some embodiments/implementations via the platform, e.g. on customer's dashboard.

Once the project is started the customer can see his customized plant project in a special dashboard including all relevant data (fertilizer use, pesticide use, CO2 footprint, seeds, space, water use, planned output on day X in €/$, current status of the technical equipment–running time of luminaries, pumps etc.+estimated running time of plants). The dashboard can also be open to the end consumers if wished. Furthermore, the percentage of completion may be shown. In case of delays or problems during the production the customer is informed through notifications of the platform. In case of major problems, the grower is informed so he/she can personally inform the customer.

All relevant data is send as a report or automatically through an API to the grower for traceability and for content marketing towards the end customers.

If wished special landing pages and dashboards can be created for the customer e.g. "Your Mojito from Seed to Drink—Join the food and beverage revolution".

19th aspect of "Success Score": A computer program product, comprising a plurality of program instructions, which when executed by a computer system of a Controlled Agricultural System according to any one of the 1st to 8th aspect of "Success Score", cause the Controlled Agricultural System to execute the method for Agricultural Management according to any one of the 9th to 18th aspect of "Success Score".

20th aspect of "Success Score": An agricultural facility, e.g. (vertical) farm, greenhouse, etc., with at least one Controlled Agricultural System according to any one of the 1st to 8th aspect of "Success Score".

"Picture Taking & Evaluation"

According to the element "Picture Taking & Evaluation" of the disclosure, a method for agricultural management, which enriches the data that may be captured by a controlled agricultural system, by means of taking and evaluating pictures for monitoring, tracking and optimizing plant growth.

Below, various aspects and details of "Picture Taking & Evaluation" are described.

1st aspect of "Picture Taking & Evaluation": A method for agricultural management, particularly for plant breeding, growing, cultivating and harvesting in an agricultural facility, comprising a mobile device with a camera (still and/or video), configured to be able to contribute to the following steps: starting a picture mode on the mobile device, providing a picture frame shown on a screen of the mobile device and indicating how to achieve alignment for taking a standardized picture of an horticultural object, targeting a horticultural object with the camera and aligning the viewer picture to the picture frame, checking alignment, re-aligning if still out of alignment and taking a standardized picture of the horticultural object if in alignment.

To enable comparable and usable data gained from pictures, standardized pictures need to be taken. These standard pictures could have different motives, dimensions and angles but are predefined. Standard pictures could be distance shot, figure shot, full shot, medium shot, close-ups, extreme close-ups, etc.

To facilitate taking these standardized pictures, the present disclosure suggests a software program for a suitable mobile device (app), e.g. a smartphone app, which assists the user when taking standardized pictures. For this purpose, the (smartphone) app has a dedicated picture taking function. This function helps growers to make standardized pictures by giving picture frame orientation on the respective mobile device (e.g. mobile phone) screen (e.g. by yellow rectangle and when motive fits into frame, frame gets green and picture will be taken).

2nd aspect of "Picture Taking & Evaluation": The method for agricultural management according to the 1st aspect of "Picture Taking & Evaluation", further comprising the step of selecting an object type from a set of object types, e.g. plant (single, multiple), growing cabinet.

The frames for the standardized pictures may be predefined depending on the growth environment (e.g. a specific vertical farm or a growth cabinet). The present environment may be input manually. Alternatively, the app may contain a picture recognition software for identifying the environment.

3rd aspect of "Picture Taking & Evaluation": The method for agricultural management according to the 1st or 2nd aspect of "Picture Taking & Evaluation", further comprising the step of selecting a picture style from a set of picture styles, e.g. distance shot, figure shot, full shot, medium shot, close-ups, extreme close-ups.

4th aspect of "Picture Taking & Evaluation": The method for agricultural management according to the 3rd aspect of "Picture Taking & Evaluation", further comprising the step of taking multiple pictures of the same object with same or different picture styles.

Of course, in addition to (still) pictures, also videos (motion pictures) can be taken. Smartphone pictures are usually taken in daylight without the use of a flash, but during night situations, a flash (or a flash working as a continuous auxiliary lighting) with a (standardized) setting can be used. In addition, a smartphone camera may be suited to take pictures in the infrared, for example by using an IR-LED or VCSEL (Vertical Cavity Surface Emitting Laser), for flash or auxiliary lighting purposes.

In addition, a face or eye tracking/scanning system of a smartphone (e.g. Apple iPhone X) may be adapted for gathering further information. When a smartphone with such a system is used, the device could directly measure the physiognomy/morphology of a nearby plant (close up) and provide this data to the app. This helps to come up with plant morphology recognition much faster than feeding it to a separate software program, and it can be posted directly on social networks and to user groups.

5th aspect of "Picture Taking & Evaluation": The method for agricultural management according to any one of the 1st to 4th aspect of "Picture Taking & Evaluation", further comprising the step of evaluating the picture(s) and showing the results, particularly with respect to plant growth status and plant health.

6th aspect of "Picture Taking & Evaluation": The method for agricultural management according to any one of the 1st to 5th aspect of "Picture Taking & Evaluation", wherein the picture frame comprises indications (e.g. four arrows, one arrow in each corner of the frame oriented to the center of the frame) for indicating to the user how to achieve alignment for taking a standardized picture of the horticultural object.

7th aspect of "Picture Taking & Evaluation": The method for agricultural management according to any one of the 1st to 6th aspect of "Picture Taking & Evaluation", wherein aligning the viewer picture to the picture frame comprises adapting the position and/or the orientation (vertically and horizontally) of the mobile device with respect to the respective horticultural object (e.g. plant).

In a further refinement of the disclosure, based on the taken pictures, software algorithms are provided for calculating plant growth indices like Leaf Area Index (LAI) or NDVI (Normalized Difference Vegetation Index), give feedback about coloring/pigmentation, give feedback on plant health based on colors and growth, count fruits and vegetables, plant morphology, pest manifestation, insects, mildew etc.

The data analytics/algorithms may be provided directly in the app or the data may be uploaded to the cloud and analyzed there (by means of a dedicated software service). Furthermore, the software (app), for example, may be designed to develop a topographic map or 3D data models based on different pictures, e.g. taken at different positions, possibly also under different angles.

The results provided by the software, here also named Graphical Output (GO), may be displayed to the grower on the graphical user interface (GUI) of the mobile device (e.g. smartphone) with graphs, growth trackers, time lapse videos, etc. Additionally, the (smartphone) app may automatically benchmark/compare to other growers/users and to the grower's own historical results and displays these historical and benchmarking values on the GUI.

Based on the real-time, historical and benchmarking data the (smartphone) app may give scores and badges to the grower according to the success. Additionally, the software (algorithms, AI) may be designed for calculating and doing forecasts to estimate harvest dates.

Furthermore, the software may be designed to recognize abnormalities in the pictures. Finally, the software may be designed to compare the captured pictures with a picture database to determine plant abnormalities (mold, pest, nutrient lack, tip burn, etc.).

8th aspect of "Picture Taking & Evaluation": A Controlled Agricultural System, particularly for breeding, growing, cultivating and harvesting in an agricultural facility, particularly a plant growing facility and/or an aquaponics facility, comprising a mobile device with a camera configured to perform the steps according to any one of the 1st to 7th aspect of "Picture Taking & Evaluation".

9th aspect of "Picture Taking & Evaluation": The Controlled Agricultural System according to the 8th aspect of "Picture Taking & Evaluation", further comprising a data storage device, e.g. for storing the pictures and/or the plant growth results deduced by evaluating the pictures.

Furthermore, the (smartphone) app may be designed to suggest new plant growth recipes (i.e. adjustments to the present growing conditions).

The (smartphone) app may also be designed to directly connect to the climate control system, a growth cabinet, or the like of the facility so that the actuation of an actuator is directly controlled via the mobile device (e.g. smartphone). Direct connection may be established, for instance, via Bluetooth, WiFi, Radio Frequency, VLC (Visible Light Communication). If it is directly connected, the smartphone app may also ask the grower if the conditions should be adjusted to the new recipe and by approving of the grower, this is done automatically.

10th aspect of "Picture Taking & Evaluation": A Controlled Agricultural System, particularly for breeding, growing, cultivating and harvesting in an agricultural facility, particularly a plant growing facility and/or an aquaponics facility, comprising one or more lighting fixtures for illuminating the plants, and/or one or more actuators, e.g. heating, wherein at least one lighting fixture and/or at least one actuator is configured to be controllable by means of a mobile device, e.g. a smartphone.

11th aspect of "Picture Taking & Evaluation": The Controlled Agricultural System according to the 10th aspect of "Picture Taking & Evaluation", further comprising a sensor device able to measure environmental parameters, e.g. the ambient temperature of the agricultural facility, and/or growth parameters of the plants.

12$^{th}$ aspect of "Picture Taking & Evaluation": The Controlled Agricultural System according to the 10$^{th}$ or 11$^{th}$ aspect of "Picture Taking & Evaluation", further comprising a computing device, configured to be able to access and control the sensor device and the data storage device.

13$^{th}$ aspect of "Picture Taking & Evaluation": The Controlled Agricultural System according to the 12$^{th}$ aspect of "Picture Taking & Evaluation", wherein the computing device is further configured to evaluate the environmental data and/or growth data measured by the sensor device and outputs a notification if the measured data exceeds a tolerance range.

13$^{th}$ aspect of "Picture Taking & Evaluation": The Controlled Agricultural System according to the 13$^{th}$ aspect of "Picture Taking & Evaluation", configured to be able to send the notification to a mobile device, e.g. via a dedicated app software.

All the data from the Graphical Output Interface (GOI) may be displayed on a user-friendly dashboard for constant monitoring, notification and optimization. The grower can share and comment results in the app and on social media if wanted.

15$^{th}$ aspect of "Picture Taking & Evaluation": A method for agricultural management, particularly for plant breeding, growing, cultivating and harvesting in an agricultural facility, comprising a Controlled Agricultural System according to any one of the 10$^{th}$ to 14$^{th}$ aspect of "Picture Taking & Evaluation", wherein the mobile device is configured to be able to contribute to the following steps: controlling and regulating the at least one lighting fixture and/or actuator based on executable command data transmitted by the mobile device.

If the app is not connected to the dedicated climate control system, the app may be designed to communicate with and control the actuators of the controlled agricultural system like HVAC, light, water pumps, etc. via the smartphone microphone/speaker and dedicated ultrasonic sequences. For this, the actuators need to be equipped with ultrasonic sensors and respective controllers. Alternatively, the respective actuation may be controlled by modulations of a smartphone photoflash LED, also called Visible Light Communication (VLC), or a specific IR-LED.

16$^{th}$ aspect of "Picture Taking & Evaluation": A method for agricultural management according to the 15$^{th}$ aspect of "Picture Taking & Evaluation", wherein the executable command data comprise dedicated (ultra)sonic sequences generated by the speaker of the mobile device or modulations of a photoflash LED or a specific IR-LED.

In a further embodiment, the controlled agricultural system comprises horticultural lighting fixtures that employ sensors (photoelectrical, piezo, etc.). Optionally, the (Smartphone) app is designed to connect to these fixtures (as described above) and to control and regulate the fixtures based on the transmitted executable command data.

17$^{th}$ aspect of "Picture Taking & Evaluation": A computer program product, comprising a plurality of program instructions, which when executed by a mobile device with a camera cause the mobile device to execute the Method for Agricultural Management according to any one of the 1$^{st}$ to 7$^{th}$ aspect of "Picture Taking & Evaluation".

18$^{th}$ aspect of "Picture Taking & Evaluation": A computer program product, comprising a plurality of program instructions, which when executed by a mobile device with a camera cause the mobile device to execute the Method for Agricultural Management according to the 15$^{th}$ or 16$^{th}$ aspect of "Picture Taking & Evaluation".

"Eco Certificates"

According to the element "Eco Certificates" of the disclosure, a method for agricultural management, in other words a method for managing an agricultural facility, comprising a life-cycle assessment is proposed, based on which an operator, customer or other user can act and, for example, take account of ecologically evaluated light recipes or an ecological overall balance.

Furthermore, a breeding and/or growing and/or raising facility (agricultural facility) with an improved ecological compatibility is proposed.

Below, various aspects and details of "Eco Certificates" are described. Particularly, a multiplicity of irradiation variants and illumination controls for breeding and/or growing plants are highlighted. By way of example, ecologically evaluated light recipes can be used for illumination purposes, or an ecological overall balance can be taken into account when selecting the illumination variants.

1$^{st}$ aspect of "Eco Certificates": A method for agricultural management, more specifically a method for operating a breeding and/or growing and/or raising facility, in particular a breeding and/or growing and/or raising facility for plants and/or animals (agricultural facility), comprising the steps of inputting input data into a computing device by way of an input device, processing the input data in the computing device and outputting output data to an output device by the computing device, wherein the output data at least contain information items in relation to a life-cycle assessment, an energy consumption or a carbon footprint.

In this way, a life-cycle assessment can be observed when producing the products of the breeding and/or growing and/or raising facility.

2$^{nd}$ aspect of "Eco Certificates": The method for agricultural management according to the 1$^{st}$ aspect of "Eco Certificates", wherein the output data for controlling the facility are inputted into a control device in one method step, wherein, in particular, the control unit also may comprise the input device, the computing device and/or the output device.

That is to say, the data calculated by the computing device in the control unit can be used as new input data either in this control unit or in a further control unit. This may permit a control loop, and so adaptive control of the breeding and/or growing and/or raising facility, of the illumination device or else of individual light sources may be implemented on the basis of evaluated data, e.g., in relation to growth and the like, or else on the basis of additional data, e.g., on account of customer requirements, system-related restrictions, legal requirements or the like.

3$^{rd}$ aspect of "Eco Certificates": The method for agricultural management according to the 2$^{nd}$ aspect of "Eco Certificates", wherein the control is modified by the control device on the basis of the output data in such a way that a predetermined life-cycle assessment, an energy consumption or a carbon footprint, in particular of an added-value process of the products or of a growth or maturing process, is not exceeded.

Such a modification of a control or actuation of the facility or the components thereof can allow a user, operator or customer to produce or select products that meet certain ecological or economical requirements.

4$^{th}$ aspect of "Eco Certificates": The method for agricultural management according to any one of the 1$^{st}$ to 3$^{rd}$ aspect of "Eco Certificates", wherein the method includes a step in which the computing device calculates and/or selects a light recipe in order to obtain a predefined effect, in some embodiments/implementations boundary conditions defined by input data, in particular in order to observe a predetermined life-cycle assessment or meet ecological boundary conditions.

In particular, these boundary conditions may be the observance of a predetermined life-cycle assessment or other ecological prescriptions. Here, light recipes can be stored in a database and already be evaluated and assessed in respect of their life-cycle assessment, energy consumption or similar parameters. By calculating new light recipes, for example on the basis of newly employed light sources, on the basis of the application to new types of plants or animals or on the basis of simply an improvement of existing light recipes, it is thus possible to match an energy consumption to the actual requirements of the products.

5$^{th}$ aspect of "Eco Certificates": The method for agricultural management according to any one of the 1$^{st}$ to 4$^{th}$ aspect of "Eco Certificates", wherein the method includes a step for determining a life-cycle assessment resulting from the energy consumption of an illumination apparatus, in particular a horticultural illumination, and/or the entire energy consumption and/or CO2 equivalent of the facility.

6$^{th}$ aspect of "Eco Certificates": The method for agricultural management according to any one of the 1$^{st}$ to 5$^{th}$ aspect of "Eco Certificates", wherein a light recipe is established by a control device, wherein the step of establishing the light recipe provides for at least the evaluation of an energy consumption data record of energy consumers provided in the light recipe, wherein the light recipe is determined in such a way that an energy consumption lies below a pre-determinable threshold.

7$^{th}$ aspect of "Eco Certificates": The method for agricultural management according to any one of the 1$^{st}$ to 6$^{th}$ aspect of "Eco Certificates", wherein the method includes a step for determining an entire photon flux of a light recipe of the breeding and/or growing and/or raising facility, wherein the step for determining the photon flux includes reading at least one sensor and/or reading at least one data record with information items relating to photon flux of light sources used in the light recipe.

The corresponding data, also sensor data, may be stored in a database, for example, contain current sensor data, directly acquired by a sensor and transmitted to the control device, or contain both. In particular, it is also possible to process data from different sensors, both local and distant, and/or different databases in the process.

8$^{th}$ aspect of "Eco Certificates": The method for agricultural management according to any one of the 1$^{st}$ to 7$^{th}$ aspect of "Eco Certificates", wherein the data in relation to life-cycle assessment are output on a display apparatus and/or stored in a database in a method step such that the data are provided to a user, operator and/or customer.

9$^{th}$ aspect of "Eco Certificates": A method for agricultural management, more specifically a method for operating a breeding and/or growing and/or raising facility, in particular a breeding and/or growing and/or raising facility for plants and/or animals, comprising a step for processing an order of at least one product produced in the breeding and/or growing and/or raising facility, wherein a control device has at least one input means with a communications unit such that a data entry, in particular an indication of demand, is assignable to a production or planned production in the control device from an external interface.

In particular, an ordering platform can be directly or indirectly coupled to a control device of the agricultural facility and so a need can be acquired directly on the basis of incoming or pending orders and can be taken into account in controlling and organizing the breeding and/or growing and/or raising facility. Thus, for example, sowing can be actuated, in particular by a sowing apparatus or sowing robot, in order to sow a desired product in order to service an increased demand that cannot be covered by existing growing products.

10$^{th}$ aspect of "Eco Certificates": The method for agricultural management according to the 9$^{th}$ aspect of "Eco Certificates", wherein the external interface may comprise an input terminal, wherein the input terminal is embodied in such a way that a user and/or a machine and/or program code can input at the input terminal an indication of demand in respect of one or more products to be produced in the agricultural facility.

In this way, a need can be planned more precisely and overproduction can be avoided. Moreover, a completion of the production can be matched to the demand, and so storage times, and losses and reductions in quality caused thereby, may be reduced.

11$^{th}$ aspect of "Eco Certificates": The method for agricultural management according to the 9$^{th}$ or 10$^{th}$ aspect of "Eco Certificates", wherein the input of an indication of demand for the ordering of plant and/or animal products includes a step for evaluating and/or monitoring a life-cycle assessment of the products.

Here, an indication of demand can be an order at the same time, or merely the announcement of a demand in future, for example in order to plan a corresponding utilization of the breeding and/or growing and/or raising facility in timely fashion. Taking account of life-cycle assessments or ecological boundary conditions for production already at the time of establishing demand can ease the observance of these boundary conditions and thus improve the ability of planning production. Thus, observing the set boundary conditions can be better ensured, particularly in cases where the use of alternative light recipes is necessary for treatment purposes owing to unforeseen events, such as in the case of pest infestation or disease.

12$^{th}$ aspect of "Eco Certificates": The method for agricultural management according to any one of the 9$^{th}$ to 11$^{th}$ aspect of "Eco Certificates", wherein the method includes a step for automatically triggering an indication of demand of a plant and/or animal product depending on whether a selected product has reached a predefined threshold, in particular a predetermined plant growth and/or a degree of maturity and/or a nutrient content and/or a mineral content.

This may allow a customer to indicate demand, for example on a transfer platform, and this may allow production to be implemented, either on the basis or independently thereof, such that once the boundary conditions and preconditions saved by the customer are reached, this can be automatically acquired and processed as an order; in particular, harvesting and delivery may be implemented.

The data can be provided at a single occasion, at regular intervals, when certain growth or maturity phases are reached, or else virtually in real time, depending on sensor data and measurement intervals, for example.

These data of one or more breeding and/or growing and/or raising facilities can be compared on the transfer platform with indications of demand of one or more customers, in some embodiments/implementations a multiplicity of customers. As soon as a predefined criterion is reached, for example a criterion that was predefined by a customer, an automatic order can then be triggered on the transfer platform.

13th aspect of "Eco Certificates": A data storage medium, containing a control program for carrying out a method according to any one of the 1st to 12th aspect of "Eco Certificates".

14th aspect of "Eco Certificates": The data storage medium according to the 13th aspect of "Eco Certificates", wherein the data storage medium contains at least one database with light recipes and/or life-cycle assessments of a breeding and/or growing and/or raising facility, illumination device, light source, etc., and/or data in relation to requirements of the products to be produced in respect of growth, health, contents or the like.

15th aspect of "Eco Certificates": An agricultural facility, more specifically a breeding and/or growing and/or raising facility, in particular a breeding and/or growing and/or raising facility for plants and/or animals, comprising at least one input device, a computing device and an output device, wherein the computing device is embodied to output output data to the output device and wherein the output data include at least information items in relation to a life-cycle assessment, an energy consumption or a carbon footprint, and wherein the output device has means for outputting the output data to a user or a control unit.

A production of products within the scope of predetermined boundary conditions, in particular ecological boundary conditions, can be facilitated in such a facility.

16th aspect of "Eco Certificates": A building configured for vertical farming and comprising at least one agricultural facility according to the 15th aspect of "Eco Certificates" or being at least part of such a facility and/or comprising a control device configured to carry out a method according to any one of the 1st to 12 aspect of "Eco Certificates".

Light Sources

Characteristics of Light Sources

Discharge lamps, for example low-pressure sodium vapor lamps or high-pressure mercury vapor lamps, and halogen lamps are available as light sources for an illumination device of a breeding and/or growing and/or raising facility according to the disclosure. With the development of light-emitting diodes (LEDs), radiation sources that emit substantially in monochromatic fashion and radiation sources with a wavelength conversion element, also referred to as a converter or phosphor, have become available. Depending on the embodiment, LED light sources can emit in the ultraviolet, visible or infrared spectrum. The wavelengths of the emission radiation can be accurately set by means of quantum dot LEDs. Organic LEDs (OLEDs), electroluminescence light sources, electrodeless induction lamps and mercury-free dielectric barrier discharge lamps can also be used as a light module. The light sources can have a compact or areal embodiment and can be equipped with primary and secondary optics, such as lenses, light guides, stationary and/or movable reflectors or radiation-reflective optical devices, holographic elements, partly transparent or completely light-opaque films, heat-reflecting films, luminescent films or the like. Furthermore, use can be made of laser light sources, in particular those that produce white or colored light by means of LARP (laser-activated remote phosphor) technology, i.e., an activation of a wavelength converter arranged at a distance from a laser light source. Consequently, a multiplicity of light sources are available for illuminating the plants and the entire radiation spectrum (UV, visible, IR) can be covered. Some of the light sources listed above can also emit wholly or partly polarized light.

Different light sources can be combined, for example sodium vapor lamps and LED light sources. Radiation reflectors can be moved and/or tilted rhythmically, for example with circadian control, i.e., depending on solar altitude, with the sun being visible or else not. Illumination devices can be adaptively matched in terms of their form and emission direction to the plant growth, i.e., become narrower or wider or keep the distance from the plant surface constant or set the distance according to a predetermined or selected or calculated mathematical function, for example in order to avoid shadowing of the plants lying further to the outside. The distance from a plant surface and/or the geometric form of an adaptively changeable light fixture can also be implemented depending on the leaf area index or the leaf area density index (see below in this respect).

Here, the "light" and "illumination" terms should also include the radiation components that are not visible to the human eye, in particular UV and infrared.

Here, the phrase "plant-growth-promoting illumination" should also comprise aquaponics illumination. As alternative phrases, use can be made of "growth-promoting and maturity-promoting illumination" and "breeding and/or growing and/or raising illumination".

[End of "Characteristics of Light Sources"]

Operating Mode of Light Sources

Here, the light sources can be operated in multifaceted ways, in particular with constant performance data, with time-variable performance data, for example in a pulsed operation (basic level, higher or lower level; the time durations can be equal or different) or in PWM operation (e.g., with a milli-second or μs clock). The performance data can be controlled within the scope of feedback. In particular, sensors can be used as a controlled variable, which is also referred to as a parameter, of feedback, said sensors outputting a measurement signal on the basis of one or more influencing variables, such as ambient temperature, humidity, time of day (circadian), $CO_2$ content, methane gas content, ground moisture, substance toxicity, color, reflectivity of a plant in the visible, ultraviolet and infrared spectral range, the component of polarized reflection radiation, reflectivity of the surroundings of a plant in the visible, ultraviolet and infrared spectral range, respectively also the component of polarized reflection radiation therefrom, or soil acidity, the measurement signals being usable by means of an evaluation and control unit for regulating an emission spectrum and mode of operation of the light sources, for example, or else for setting photosynthetically active radiation (PAR), measured in terms of photon energy or photon flux and expressed in $\mu mol/(m^2*s)$ or $\mu Einstein/(m^2*s)$.

[End of "Operating Mode of Light Sources"]

Parameters of Light Sources/Sensors

Consequently, light sources can be regulated, in particular in automated fashion, by acquired parameters, as described above. On the other hand, it is also possible to accordingly set the light spectrum, in particular in automated fashion, on the basis of a plant-specific parameter, such as, e.g., leaf reflectivity or vitamin C content, or external influencing variables, such as, e.g., temperature and soil acidity.

The corresponding sensors can be attached at many locations, for example in the greenhouse, in the growing chamber, on the plants, in the ground or in the water tank and/or on the roots.

The irradiation units may have a modular design, i.e., can be put together into relatively large units and can also be removed, for example according to demand, in a manual process or in a process that is automated by means of a control loop.

[End of "Parameters of Light Sources/Sensors"]

Plant

Here, the term "plant" should comprise all types of grown products, such as, e.g., salads, fungi, flowers, cannabis, medical plants, hydroponic and aeroponic plants, salads, tropical plants, algae, water plants, cannabis, seedlings and seeds. Fish and plants are bred and grown in so-called aquaponic farms. Here, the plants are watered by the nutrient-rich wastewater from the fish.

[End of "PLANT"]

Characteristics of Illumination for Light Recipes

It is known that the plants or growth and also seeds require optimal radiation of a suitable wavelength distribution and intensity depending on the growth and maturity phase. This is also referred to as a growth-related light recipe. Expressed differently, a targeted control of the properties of the light sources such as, e.g., the spectral intensity, the emission characteristic, the color locus, the variation in the spectral individual intensities and hence in the color locus of a plant-growth-specific illuminance and plant-specific light spectrum can be provided for an optimal photomorphogenic influence on plants, for example in respect of growth and maturity. Consequently, an optimal illumination scenario, i.e., an illumination recipe, can be provided depending on the growth and maturity phase of the plants. Here, illumination can be implemented from above, from below or from the sides; it is also possible to illuminate the roots of plants. Plants growing hanging down from above can be irradiated from below in analogous fashion. A plant-specific illumination can change over time in terms of its intensity (radiant flux), emission direction, emission angle, polarization and spectral properties. Different spectral regions can be provided simultaneously or sequentially. Different spectral regions can be provided with different radiant fluxes and with different ON-OFF cycles. Thus, every spectral region can have an independent irradiation cycle in this case. The spectral regions can be disjunct or at least partly overlap. Preferred spectral regions are: 350 to 520 nm, 520-550 nm, 550-800 nm. Further preferred spectral regions are: 420-450 nm, 450-470 nm, 500-550 nm, 510-540 nm, 570-600 nm, 580-600 nm, 610-660 nm, 625-650 nm. Preferred color temperatures, a quantity known from illumination engineering, may be less than 5000 K or greater than 5000 K, for example up to 10 000 K. The color rendering index of an illumination device for white light may lie in the region of greater than 90.

LED light sources may be grouped according to their light properties; by way of example, blue light sources, in particular all blue light sources, can be grouped together and/or red light sources, in particular all red light sources, can be grouped together. However, they can also be arranged in mixed fashion, inter alia in the form of geometric patterns, too. By way of example, three blue LEDs could be surrounded by eight red LEDs. LEDs with different spectral properties can be placed in triangular, rectangular or polygonal arrangements, for example. They can fill up an area without gaps. The arrangement can also be unordered and arbitrary. The light-emitting sources can also be arranged in a light fixture in such a way that different emission regions, which are equipped with at least two different light sources, emit the same photon flux (μmol/($m^2$*s)) for different unit areas of the light fixture. However, it is also possible to occupy different emission regions with light sources in such a way that certain photon fluxes arise, as will still be discussed below.

It is also possible to use light sources whose radiation is polarized. Here, the polarization can be the same or different for all spectral regions. It is also possible to use polarized and non-polarized light sources simultaneously or alternately in time. The polarization can be stored in a so-called light recipe.

Light sources, or a combination of light sources, can emit radiation whose spectra are matched in respect of direct light and/or in respect of light reflected by objects. Furthermore, the light sources can be adapted for water illumination.

[End of "Characteristics of Illumination for Light Recipes"]

Light Recipes

Light recipes define illumination conditions. A light recipe can be stored in program code and can be implemented by way of computer-implemented software or a program, by way of a user-defined or user-selected program code or by a sensor-triggered signal. A light recipe can contain information items and executable commands, which control the light wavelength, for example matched to chlorophyll absorption curves, light intensity, including photon flux, physical light properties such as polarization, focus and coherence, photon flux conditions in certain wavelength regions, for example the ratio of blue to red radiation, or blue to infrared radiation (730 nm) or UV-B to red radiation or green radiation to red radiation, durations of the on-times (illumination) and off-times (no illumination), irradiation with light for measurement purposes, such as, e.g., monochromatic laser radiation for fluorescence measurements.

A light recipe can be adaptive, i.e., it can be part of a regulating feedback loop that depends on external trigger signals.

A light recipe can contain information items in relation to activating and controlling light operating modes, such as, e.g., dimming, pulsation, pulse width modulation, light pattern, increase, for example in the millisecond range, data production for light-based communication, including the synchronization with other illumination devices or agribusiness operating networks for energy, material and waste management, or other agribusiness growing sites.

A light recipe can be used for plant treatment and for disinfection purposes.

A light recipe can contain information items regarding the repulsion of insects by light properties and regarding light properties for insect use, such as some wavelengths in the ultraviolet region, regarding the component of light polarization, for example the component of left-hand or right-hand circular polarization, or regarding thermal radiation and the like.

A light recipe can contain information items about the component of photosynthetically active radiation (PAR) or flux density.

A light recipe can be part of a growth recipe, which can contain information items about the overall energy consumption of the activated or chosen light recipe in relation to the overall illumination time duration or in relation to an energy equivalent, such as the production of $CO_2$, oxygen or methane gas, or said light or growth recipe can be selected on the basis thereof.

A light recipe may contain information items about the residual energy or an equivalent thereof, for example the amount of light energy until harvest.

A light recipe can be selectable and allow producers or customers to order a production at all times and make available the necessary residual light data or the remaining light data.

A light recipe can be user-defined, i.e., interactive.

A light recipe can be certified; in particular, light recipes can be established for breeding and/or growing and/or raising or maturing medical plants, for example for obtaining certain content concentrations or the like.

A light recipe can be sold or licensed as intellectual property.

Light recipes can define the amount of illumination for plant covers and plant interstices.

A light recipe can contain information items in respect of the location and the form of an illumination device and can contain instruction code to move a device into a specific position or form.

A light recipe can be stored in an accessible database system.

Light recipes can also be provided to include the actuation of a combination of different light sources, such as, e.g., metal-halide lamps, sodium-vapor lamps, organic and inorganic light-emitting diodes. Light recipes may contain an interaction between different light sources.

Light recipes may contain the form and/or emission angle and/or photon flux of an irradiation light fixture or a group of irradiation light fixtures depending on a leaf area index and/or a leaf area density.

Irradiation light, in particular ultraviolet light in the UV-B range, i.e., 280-315 nm, and in the UV-C range, i.e., less than 280 nm, can be used to reduce or even entirely avoid an onset of disease in plants. Even a low photon flux of UV-B radiation appears to have a positive influence on the plant's health.

Various light fixtures or light fixture groups can have the same or different illumination scenarios. Various light fixtures or light fixture groups can be operated with one or more light scenarios (light recipes), which are interchanged cyclically or according to a predetermined pattern or stochastically. Here, light fixtures or light fixture groups can communicate with one another and interchange data, for example via Bluetooth, WLAN, radio or via a decentralized data network or a controller.

Plants can be illuminated from above, from below and/or from the side, with the irradiation direction being able to be set adaptively, for example depending on the plant growth or the degree of maturity.

Artificially produced and natural light can be used together or in alternation. By way of example, an irradiation using a non-daylight-equivalent spectrum can follow a daylight-equivalent spectrum in alternating fashion. An artificial spectrum can have a circadian light spectrum and can be applied synchronously with the solar altitude, or else with a time offset, or it is possible to apply a circadian light spectrum with a multi-day rhythm. An artificial spectrum can also reproduce the currently prevalent conditions (clouds, rain, snow) by virtue of the current light spectrum or the spectral intensity distribution thereof being measured by way of an external measurement device and then being stored and being provided to a control device, which sets the artificial light source (plant illumination) accordingly such that the current spectral conditions can be reproduced synchronously or else with a time offset. A plant irradiation can also be synchronized with external parameters, such as, e.g., music, ambient noises, external wind speeds, rain, etc.

An irradiation sequence can be followed by a dark phase, with relatively long dark phases leading to an accelerated length growth of the plants.

By way of example, light recipes can be established scientifically by way of trials, wherein the influencing factors, such as, e.g., light spectrum, photon flux, photon density, irradiation cycles, modes of operation, nutrients, pesticides, ground properties, etc., are varied statistically and are then evaluated when measuring the desired plant characteristics. This can also be assisted by the use or implementation of deep learning methods. Moreover, light recipes can be created or developed by individual tests or test sequences and/or by direct simulation of natural conditions, for example on the basis of sensor data evaluations and the like.

[End of "LIGHT RECIPES"]

Matching the Wavelength to Fields of Application

Here, the spectrum and, optionally, a dark phase of an irradiation cycle can be matched to the photochemical properties of a plant, for example to the absorption properties of chlorophyll or vitamin C production. Furthermore, the spectrum and the irradiation cycle can be matched to the photochemical properties of fertilizers and pesticides. Furthermore, the spectrum and the irradiation cycle can be matched to the photobiological properties of insects, bees, etc., which contribute to the pollination of the plants. To this end, the irradiation light can be polarized. Furthermore, the irradiation light can intensify spectral regions in which the photoreceptors of Hymenoptera, for example, are particularly radiation sensitive, i.e., 340 nm, 430 nm and 535 nm, 600 nm, for example, by radiation sources that emit narrowband or monochromatic light, for example. Light recipes can take account of these requirements and can actuate light sources accordingly for the purposes of emitting predetermined wavelengths or wavelength regions.

Natural light, for example directly from the sun, the sky or the moon, has a high proportion of radiation with wavelengths of less than 450 nm. By contrast, radiation reflected by natural objects, such as from plants or the ground, for example, has a large component of green and yellow light. Light recipes can take account of these demands and can accordingly reproduce or simulate direct and indirect radiation.

Infrared radiation can likewise be used for illuminating and heating purposes. By way of example, ultraviolet light can be used for short-term irradiation of plants, for a so-called irradiation shower for the plants. This may bring about an increase in resistance or may regulate growth. Such requirements can also be taken into account by light recipes.

Such an illumination scenario or else light recipe may also contain dark phases in which no visible light is emitted; however, depending on requirements, ultraviolet radiation, in particular UV-B, i.e., 280-315 nm, and/or red radiation and/or infrared radiation are applied.

Irradiation may also be implemented with monochromatic light, for example with narrowband laser radiation at 525 nm. Alternatively, monochromatic radiation can be complemented by a further irradiation component with a certain spectral width, for example in the range of 605-645 nm.

Irradiation may contain radiation components that correspond to the natural light such as light from the sun, the sky or the moon, for example, said light having a large component of radiation with wavelengths of less than 450 nm, and/or radiation components that correspond to light reflected at natural objects, such as leaves, the ground, etc., or at artificial objects, such as, e.g., walls or glass, etc. By contrast, radiation reflected by natural objects, such as plants or the ground, has a large component of green and yellow light. Light recipes can take account of these requirements.

Irradiation may also be switched back-and-forth between the two modes of irradiation; or certain regions are illuminated by one radiation and other regions are illuminated by the other radiation. Light recipes can take account of these requirements.

Water absorbs light particularly strongly in the red and infrared spectral range. Therefore, light sources for water illumination, for example for breeding and/or growing and/or raising algae or fish, can be adapted accordingly to the requirements, for example by virtue of having greater red and infrared components, or by virtue of not emitting these spectral regions at all, or only with a lower radiant flux, such that energy can be saved. Light recipes can take account of these requirements.

Irradiation can be switched back-and-forth between a multiplicity of irradiation modes, or else said modes may be operated together for simultaneous illumination, or certain irradiation regions are illuminated by one radiation and other regions are illuminated by the other radiation. Here, a multiplicity of combinations are possible, in particular also interval, modulation and pulsed operations. Light recipes can take account of these requirements.

[End of "Matching the wavelength to fields of application"]

Spectral Compositions

It is also possible to apply different spectral components with a set or time-variable ratio, for example: blue (450 nm) to red (680 nm) in a ratio of 7:1 to 1:7. These spectral ratios can be applied alternately, for example with an interval of 5-15 minutes or longer. Here, a spectral component can be operated with a modulation, for example pulsed operation, PWM modulation or the like. Additionally, both spectral components can be operated with the same or different modulation. The modulation can be varied in time and, within the scope of an illumination arrangement, in space, in particular locally, as well. This mode of operation can be applied within the scope of the interaction of various light sources. Light recipes can take account of these requirements.

Other spectral ratios can be as follows: blue, in particular with a wavelength of 460 nm-470 nm, with an irradiance (μmol/($m^2$*s)) of e.g. at most 6% to 8% of that in the orange-red spectral range, i.e., 600-700 nm. Forming the ratio may also include UV and IR light. Light recipes can take account of these requirements.

Alternatively, other ratios are likewise possible. Thus, the photon flux of red to green to blue can be: 0.68 to 0.44 to 1.0, or as 9:0:1, or as 67:0:2, 92:0:16; 62:0:10; 56:11:5; 112:22:10. Light recipes can take account of these requirements.

Other photon flux ratios can be: red to green to blue as 75-85% to 5-15% to 5-15%. The light spectra or the ratios of light spectra also can be matched to the photoreceptor proteins, which occur in plants, algae, bacteria, cyanobacteria and fungi. They measure the ratio of light red to dark red light, for example the ratio (photon flux) of red radiation at 660 nm and dark red radiation at 730 nm, and control a broad spectrum of responses to light stimuli, for example the turning of green of plant parts, the shade avoidance in plants or the seed germination in plants. In addition to cryptochromes and phototropins, they are the most important class of photoreceptors. Light recipes can take account of these requirements.

Specifically, the radiation ratio of red, i.e., approximately 660 nm, to dark red, i.e., approximately 730 nm, has a great influence on the plant growth and the maturing process. For plants, the red to dark-red radiation ratio is an indication for the density of planting since dark red is reflected more strongly by other plants and consequently increases the photon flux for adjacent plants. A light recipe can update the red-to-dark red ratio with increasing plant growth, for example in automated fashion by way of a camera-based identification of the growth stage. Light recipes can take account of these requirements.

The radiation ratio of UV-B (UVB) to the ratio of red (R) to dark red (DR), i.e., UVB/(R/DR), is also an important regulating factor for plant health. Light recipes can take account of these requirements.

The photon flux ratios can also be related to surface regions of a light fixture or a light fixture group, as already discussed. Light recipes can take account of these requirements.

Under the assumption that a product requires a certain photon flux to reach maturity or obtain a desired maturity state when considered independently of a cyclical application of the light for simulating a circadian rhythm, determining the photon flux up to a certain time of maturity can also determine the further photon flux that is required until a desired maturity state occurs. Thus, if the previous overall photon flux is known or determinable, it is possible, according to the present disclosure, to establish a photon flux for residual irradiation after delivery of a plant and/or animal product.

Establishing the time duration of residual irradiation can also be implemented taking account of the local natural irradiation, for example taking account of the available or predicted sunlight.

In particular, it is possible to establish the time duration of residual irradiation taking account of the local irradiation consisting of sunlight and/or artificial light sources. The use of sensors that measure a photon flux can be particularly advantageous here, as it is possible to acquire light of both natural and artificial origin, if need be using various sensors. This can be taken into account when determining residual irradiation.

[End of "Spectral compositions"]

Dependence on Leaf Area Parameters

The photon flux ratios can also be regulated according to the so-called leaf area index (LAI) or green leaf area index (GLAI), or according to the leaf area density (LAD). Both are parameters for the planting density and can be considered, accordingly, as leaf area per unit of ground surface (LAI, GLAI) or leaf area per unit volume (LAD). By way of example, a coniferous forest has an LAI value of 5; fields of maize have a value of between 4 and 10. Since the LAI or LAD values change within the scope of the growth stage, there is also change in the reflection of light off leaves. Therefore, it is advantageous to regulate the radiant flux or the photon flux of the plant illumination as a function of the LAI or LAD values. Here, the relationship is usually non-linear and can follow a mathematical curve, for example.

By way of example, the LAD values of magnolias change as follows: 0.1 at 0.5 m growth height, 0.3 at 1 m, 0.4 at 3 m, 0.2 at 4 m, and less than 0.1 at 5 m. Light recipes can take account of these requirements.

[End of "Spectral compositions"]

Irradiation Sequences

It is also possible to pass over light spectra in regions, for example, an irradiation with blue light for a time duration of a few milliseconds, seconds or minutes, then with the subsequent spectral color, e.g., green in the region of 550 nm, wherein the time interval can be the same or different, and then with the subsequent spectral color, e.g., red with a wavelength in the region of 600 nm, wherein the time interval can be the same as, or different to, the preceding ones. The respective spectral regions can be narrowband, i.e., have a small full width at half maximum of a few nanometers. In some embodiments/implementations, radiation has a full width at half maximum (FWHM) of at least 50 nm in the spectral range of 600-700 nm; radiation in the spectral range of 440-500 nm has a full width at half maximum of at most 50 nm. Light recipes can take account of these requirements.

When seen spectrally, the sequence of spectral regions can run from shorter to longer wavelengths, or in reverse, with a stochastic distribution or in random fashion. The sequence and intensities, for example in respect of photon flux per spectral range or wavelength and the like, can be made available within the scope of a light recipe from a database.

[End of "Irradiation sequences"]

Further Irradiation Effects

It is also possible to irradiate plants with an irradiation in the wavelength range of 400-700 nm and a photon flux of 40 to 2000 μmol/($m^2$s) for 1 to 3 days during or after the growth stage, or else in the mature state, in order to reduce the concentration of nitrates in the plant, for example. This can likewise be taken account of by light recipes.

Plants can be heated or cooled during the irradiation (see also elements "Temperature Dependent Illumination" and "Temperature Control"). Thus, it is also conceivable, in principle, to keep the plants at a low temperature in a type of refrigerator and irradiate them there with light.

[End of "Further irradiation effects"]

Illumination/Imaging

Radiation that is effective from a photo-biological point of view also can be replaced briefly by irradiation that is better suited to recording an image, for example by means of a camera, a spectroscope or the human eye, particularly when data that characterize the quality are established. In particular, it is possible to determine the exact location of a person in a plant breeding and/or growing and/or raising facility by way of a sensor acquire and modify the light in terms of its properties there in a targeted manner, for example toward white light or light with a higher color rendering index, or light without ultraviolet radiation.

Furthermore, the aforementioned light sources and modes of operation can also be used for illuminating plants that are used for soil remediation. Here, soil remediation is understood to mean that the plants remove unwanted constituents, often toxic constituents, from the ground, i.e., take these up or influence the latter via their roots. Furthermore, the aforementioned light sources and modes of operation can also be used for illuminating plants that are used for extracting chemical elements, for example for obtaining rare earths, for example by growing *Arabidopsis halleri*. The technology linked therewith is often referred to using the following keywords: bio-augmentation as part of renaturation ecology, phytoremediation, phytomining, phytoextraction, rhizofiltration.

[End of "Illumination/Imaging"]

Examples of Light Recipes

A light recipe for an irradiation device that determines or takes account of the photon flux ratio of red (approximately 660 nm) to dark red (approximately 730 nm).

A light recipe for an irradiation device that determines or takes account of the photon flux ratio of UV-B (280-315 nm) to red (approximately 660 nm).

A light recipe for an irradiation device that determines or takes account of the photon flux ratio of UV-B (280-315 nm) to dark red (approximately 730 nm).

A light recipe for an irradiation device that determines or takes account of the photon flux ratio of UV-C (200-280 nm) to red (approximately 660 nm).

A light recipe for an irradiation device that determines or takes account of the photon flux ratio of UV-C (200-280 nm) to dark red (approximately 730 nm).

A light recipe for an irradiation device that determines or takes account of the photon flux ratio of UV-B (280-315 nm) to the photon flux ratio of red (approximately 660 nm) to dark red (approximately 730 nm).

A light recipe that determines or takes account of the photon flux ratio of UV-B (280-315 nm) to the photon flux ratio of red (approximately 660 nm) to dark red (approximately 730 nm), depending on the growth state and/or growth density of plants.

A light recipe which regulates the photon flux of a light source in the UV-B range in such a way that this photon flux is less than 5% of the overall photon flux in the ultraviolet emission spectrum of a light source.

A light recipe which regulates the photon flux of a light source during dark phases, during which no visible light is emitted but during which ultraviolet radiation, in particular UV-B (280-315 nm), and/or red radiation and/or infrared radiation is applied if required. That is to say, such ultraviolet radiation and/or red radiation and/or infrared radiation may be applicable when necessary.

A light recipe, which regulates the photon flux of a light source depending on the leaf area index (LAI). Thus, light of a certain wavelength can be supplied in augmented fashion such that leaf growth is excited in order to accelerate a growth process, for example. By way of example, this can be implemented by increasing a component of red light or long-wavelength red light, which is also referred to as far red.

A light recipe which regulates the photon flux of a light source depending on the leaf area density (LAD). Depending on the type and/or age of a plant, a LAD that is typical for the respective development or growth stage may be stored in a database for this purpose. As mentioned previously, the actual LAD can be acquired or determined by appropriate sensors. Should there be deviations between the actual LAD and the stored LAD, a control unit can then increase the photon flux in order to cause increased growth, or it can reduce the former.

[End of "Examples of Light Recipes"]

Sensors

Plant germination, growth and maturity can be measured by sensors or cameras, wherein different parameters can be measured depending on plant and desired degree of ripeness, such as leaf color, pigmentation, fluorescence, radiation absorption, vitamin C content, nitrate content, rigidity, blossom, height and width of the planting spacing and the ground porosity and humidity, for example. Individual plants or groups of plants can be identified and their growth can be measured using cameras or other imaging methods such as radar, lidar or ultrasonic sensor systems, for example. Using these measurement methods, the leaf area index or the leaf area density can then be implemented and can then be used as controlled variable, as will still be explained below.

In a development of the disclosure, provision can be made of a spectroscope, in particular a spectroscope embodied to measure a leaf color, pigmentation, radiation absorption, fluorescence, etc. Moreover, provision can be made of at least one camera embodied to measure a planting spacing, a blossom, a leaf density and the like. Moreover, a breeding and/or growing and/or raising method according to the disclosure may contain a step for determining a vitamin C content, for example by way of titration. Moreover, the method according to the disclosure may contain a step for determining the plant porosity, for example by means of pulse thermography and ultrasonic reflection measurement. An appropriate ultrasonic measurement device can be provided in a development of the breeding and/or growing and/or raising facility according to the disclosure. In a further method step, a rigidity of the plants or of plant parts can be acquired, for example by means of a pendulum resistance measurement. Moreover, provision can be made of a photo sensor such that a nitrate content can be measured in a method step using a photo sensor by way of radiation absorption, in some embodiments/implementations in the blue (400-500 nm) and red (600-700 nm) wavelength range. Moreover, provision can be made of a potentiometer, for example in order to carry out a ground moisture measurement in a possible method step.

In general, one or more measuring devices can be provided for acquiring plant-specific and/or environment-specific parameters. It is also possible to provide one or more evaluation devices for analyzing plant-specific and/or environment-specific parameters, and one or more control devices for selecting and implementing a light recipe that was selected on account of the acquired and analyzed parameters.

[End of “Sensor”]

Data Analysis and Database

Controlling Growth

These measurement variables can serve as controlled variables for adapting the radiation or adapting the mode of operation. Here, an image analysis may require downstream object identification and possibly object classification. Different object classes can be illuminated differently. Here, sensors and cameras can be movable and travel along a planted area. Sensors can be combined to form an interconnected system. The data can be processed externally, for example by way of cloud computing. The irradiation units (light fixtures) can also be grouped and combined to form an interconnected system and, for example, be actuated in decentralized fashion. Thus, even plant breeding and/or growing and/or raising devices that are far apart can be matched to one another, leading to uniform plant growth and quality. Thus, the planted area is illuminated with the same light recipes, possibly with a time offset where required, depending on the geographic position.

[End of “Controlling Growth”]

Database

Light recipes can be stored in a database and can be applied according to need. Here, the suitable light recipe can be selected manually. It is also conceivable for the light recipe to be selected according to a set schedule. Moreover, it is conceivable for the selection of the light recipe to be implemented in automated fashion on account of measurement data and an evaluation unit, which then applies a suitable irradiation scenario for a certain amount of time. The selection can also be implemented in semiautomatic fashion, for example by virtue of possible actions being proposed on the basis of measurement data, empirical values or a different input and a confirmation or selection being implemented by a further entity, in particular a user.

A light spectrum can also be coupled to a further controlled variable, for example irrigation, water atomization or ventilation. The light or light scenario can moreover contain further control commands, which then control further functions such as water atomization, ventilation, fertilization and the like. Consequently, a light spectrum or light recipe stored in a database may already contain such additional control commands. Then, these can either be applied or deactivated.

[End of “Database”]

Fields of Application

Light spectrum or light recipe and further controlled variables coupled thereto can be requested by a customer or by a measurement system, inter alia within the scope of a licensing model. Thus, e.g., for allocating access rights to a database or a transfer platform, for example, a control device of a breeding and/or growing and/or raising facility may obtain access to alternative light recipes containing further functions, such as recipes for pest control, increased growth, life-cycle assessments and more.

A light recipe database can be provided by the operator of a plant breeding and/or growing and/or raising facility, a research institute or a user. It is also conceivable for customers to provide a light recipe of a database that has been modified according to their requirements or experience, possibly once again within the scope of a licensing model.

Measurement data acquired by one or more sensors can be supplied to an image-producing method and can be implemented, for example, as a 2-D or 3-D model. Then, this can be provided to the operator of a planting device or their customers, for example by means of a display or AR glasses.

Neuronal networks connected to databases can record the growth behavior under different illumination scenarios and can identify optimal patterns and supply these to a control mechanism. Furthermore, it is possible that extrapolation methods in respect of the expected growth and maturity behavior of the plants are used for applied light scenarios, said extrapolation methods pictorially highlighting the predicted growth behavior to an operator or customer or transferring the appropriate data to them.

[End of “FIELDS OF APPLICATION”]

Urban Farming

With increasing growth of the Earth’s population and increased density in urban areas, food production in situ is becoming very important. This is described, for example, using the phrases urban farming or indoor farming, be this in buildings, shopping malls or at home, for example in a kitchen. Such planting methods can be incorporated in so-called smart city concepts. Here, it is also conceivable that ever more production halls specifically designed therefor, particularly production devices arranged vertically in levels, often also referred to as vertical farming, and skyscrapers that are also populated by humans, also referred to as agritecture, are designed and built. Skyscrapers configured for vertical growth may have different types of planting or animal rearing on different levels.

[End of “Urban farming”]

Cluster Farming

Naturally, small, portable or transportable planting devices may also be used, in particular those that are able to be stacked on one another, connected to one another or coupled with one another. By way of example, electrical and/or mechanical or other connections may be provided to this end. Here, information items may be exchanged between individual units. By way of example, light recipes and/or control commands of the illumination sources can be transferred from one unit to another, or individual units could take over the complete control for an entire group of units or clusters in the style of a master-slave circuit. Alternatively, such stackable planting devices can be controlled by an external controller via data transfer, for example via WLAN, Bluetooth, etc. To this end, each stacking unit has appropriate light sources, alternative transmitter units, receiver, operating and/or control devices.

According to one aspect of the present disclosure, a cluster of irradiation devices, is provided, with the irradiation devices being connected to form a data network. In a cluster of irradiation devices, the light control thereof can be undertaken by local control devices. Moreover, in a cluster of irradiation devices, the light control thereof can be undertaken by one or more external control devices.

Here, it should be noted that all illumination and measurement scenarios described herein can also be used for, or are applicable to, seeds and germ buds.

[End of "Cluster farming"]

Life-Cycle Assessment

Having an expedient life-cycle assessment is becoming ever more important for food production. It is not only the light sources that consume energy, but also the ventilation, watering, heating or cooling, disposal and then also the sale and distribution of the biomass that has arisen. The life-cycle assessment can (and should) also include the workforce or the production of harvesting robots.

Here, natural energy sources may be the following: The Sun (solar energy), wind (wind turbines), water (hydroelectric power, tidal power plants), geothermics, conversion of biomass and more. All energy consuming variables should be acquired for the overall life-cycle assessment, i.e., from the provision of the seed via planting, fertilizing, watering, setting the temperature, illumination, growth control, data acquisition and evaluation, feedback devices, customer information and marketing, harvest, waste disposal, cleaning, delivery and sale of the produced biomass, and so on.

A vertical aquaponics device, in which for example butterhead lettuce and tilapia fish are grown and raised, may have an area of approximately 1000 $m^2$, for example. The salads and fish could be only illuminated at night, for example, when, as a rule, energy is cheaper than during the day. In general, the illumination can be planned in such a way that the costs for energy are lowest, provided this is compatible with the requirements of the plants and animals. The irradiated power per $m^2$ for raising tilapia can be 400 W, for example. In the case of an irradiation duration of 4 hours per day, this results in an energy consumption of approximately 50 000 kWh per month. Accordingly, the energy requirement for larger breeding and/or growing and/or raising devices can be significantly higher. Therefore, a reduction in the energy costs is desirable. To this end, efficient LED light fixtures, for example, can be used for illumination purposes. Moreover, it is possible to create or use light recipes that are designed for low energy consumption.

Another aspect of "Eco Certificates" also relates to a method for determining a light recipe of a breeding and/or growing and/or raising facility taking account of ecological boundary conditions, a method for determining a light recipe of a breeding and/or growing and/or raising facility taking account of an energy consumption resulting therefrom, and a method for determining the entire photon flux of such a light recipe of a breeding and/or growing and/of raising facility. By way of example, sensors for acquiring an overall photon flux, i.e., photon flux caused by artificial and natural illumination, can be used for determining a photon flux. It is also conceivable for the photon flux of the light source to be determinable directly by the actuation of the light source on account of knowledge about the employed artificial light sources and that use is made of sensors that only acquire light of a natural origin. Moreover, mixed forms are conceivable. In this way, there can be open-loop or closed-loop control of the photon flux and further factors relevant to the illumination.

By way of example, such methods can be defined by trials on the basis of the evaluation of results. Since a result could be influenced by a very subjective impression of users, it is therefore also conceivable for the creation or definition of new methods or light recipes to be implemented by means of an intelligent computer control or a learning or self-learning software or database. By way of example, ecological boundary conditions, such as energy consumption, use of specific wavelengths for treating the products, irradiation durations, etc., can be predetermined; these are also relevant in a so-called life-cycle assessment. The goal of such a method for creating or determining a light recipe for a breeding and/or growing and/or raising facility may then be to obtain a predetermined maturity state, nutrient content, health state and the like without departing from the ecological boundary conditions. It is conceivable for one or more sensors to acquire this growth process or individual parameters and for an automatic or manual adaptation of the illumination to be implemented in order to maximize the result. After running through at least one, probably several, growth loops, a light recipe may then be created, said light recipe developing an optimized result within the boundary conditions set. Naturally, it is likewise conceivable for such a learning or self-learning system to have further optimization requirements, even beyond the creation of such a light recipe. Thus, it is also conceivable for parameters from alternative light recipes or light recipes for alternative types of product to be applied. In this way, it is also possible to identify synergies, for example by combining certain types of plants within the same growing region. This may be accompanied by a further increase in yield.

Similarly, it is possible to determine a light recipe for a breeding and/or growing and/or raising facility taking account of an energy consumption arising therefrom. Thus, an energy balance can be created for each employed light fixture or each light module of an illumination device. This may be implemented on the basis of data sheets, which are stored in a database, with an energy consumption specified in the data sheet underlying the creation of the energy balance. Moreover, it is conceivable for a power meter or other sensors or detectors to acquire the energy supplied for illuminating the plants.

As an alternative or in addition thereto, it is also conceivable for the photon flux reaching the plants to be measured exactly with the aid of sensors, independently of the employed light source. Here, the sensor or sensors can have a wavelength-dependent embodiment, and so a sensor is only sensitive to a certain wavelength range, while other wavelength ranges are covered by one or more other sensors.

A 59-story so-called sky farm—in this case, this means a vertical farm for salad, carrots, spinach, soybeans, pepper, wheat, potatoes, cucumbers and other products—designed by Gordon Graff would require an illumination energy requirement of a total of 82 million kWh per year, for example.

A life-cycle assessment can be created for each included product, such as water, fertilizer, seed transport, current, heating etc. By way of example, this can be implemented in the form of a $CO_2$ certificate. A life-cycle assessment can also be created for the illumination of the plants. Moreover, a life-cycle assessment could be made in each case for the costs relating to control, sensor systems, evaluation, light control, data provision, data evaluation, data presentation, etc. Then, this life-cycle assessment can relate to the biomass produced.

The included measurement variables can be related to the overall energy outlay in this case, including consumption outlay of a plant breeding and/or growing and/or raising facility, for example converted into energy costs or an energy equivalent, such as the $CO_2$ production, connected therewith, of the energy sources available in the plant breeding and/or growing and/or raising facility, or the use thereof. The energy or consumption outlay can contain the actual costs of the facility, such as house, devices, repairs and maintenance, for example, possibly reduced by amortization costs, etc., and, in particular, the running energy costs: power, water, illumination, climate control, dehumidification, nutrients, pollination, herbicides, care, control, harvesting, and also storage, packaging, sale including transport costs, communication, data acquisition, data analysis, data storage, waste disposal and recycling, etc. Here, both renewable and non-renewable sources of energy should be taken into account. Energy recuperation, for example by biomass, can be taken into account as a positive balance. The special energy variables for breeding fishes, such as water cleaning, specialist feed, medical checks and the like, should likewise be taken into account for aquaponics devices.

An aspect of "Eco Certificates" thus also relates to a method for determining a life-cycle assessment resulting from the energy consumption of a breeding and/or growing and/or raising illumination, a method for determining a life-cycle assessment resulting from the energy consumption of a plant illumination and the entire energy consumption and/or $CO_2$ equivalent of a breeding and/or growing and/or raising facility, and a method for indicating/displaying such a life-cycle assessment. In addition to the information items that are known or supplied from the included products in respect of the life-cycle assessment thereof, or that are able to be taken into account in any other way, the values according to the illumination can be used directly for calculating and updating the life-cycle assessment. Here, it is conceivable that the information items relating to the amount of energy consumed for illumination purposes are obtained directly from the employed light recipes, are combined in appropriate data packages and are stored in corresponding databases. Moreover, it is conceivable for sensors arranged between the plants or animals to be used in order to obtain an independent source of information and in order to be able to better key the energy assessment in spatial terms. Moreover, this could also implement an acquisition to the effect of which components of light from different spectra in the acquisition region of a sensor were used for these wavelengths and for what duration this was the case. Such sensors could also be used, for example, for fishes in aquaponics devices, for instance by direct application to the skin.

According to "Eco Certificates", it is possible to acquire the entire life-cycle assessment of a sold product. This life-cycle assessment can then be made available to an operator and a customer. By way of example, the information can be provided in situ or by way of the Internet. This can allow a customer to make a decision to buy based on, for example, an energy requirement during production, i.e., based on whether or not these are energy-friendly products. Additionally, a customer is put into a position where they can prescribe a life-cycle assessment as an additional order or purchase decision for the operator. Thus, a customer can prescribe a life-cycle assessment upper limit, or a bandwidth within which the product has to be produced. By way of example, trade may occur on a transfer platform, as is yet to be described below.

Here, operators can also exchange or sell ecological certificates, with it then being possible to present an overall life-cycle assessment for an operator, for example a chain store. In this way, a user or consumer or customers can be provided with additional information items in respect of a life-cycle assessment and, provided this is desirable, the latter can form a further basis of negotiations or commercial transactions. By way of example, such ecological certificates can be exchanged on a transfer platform, as described below. Trading of ecological certificates can be implemented in a manner corresponding to the trade of emission rights, for example, or may be subject to legal regulation.

A life-cycle assessment can also be provided for light recipes. Said life-cycle assessments can then likewise be provided to the operator or customer for the selection of a suitable illumination scenario.

Thus, the disclosure also relates to a method for interactive and/or automated determination or development of a light recipe for a breeding and/or growing and/or raising facility with acquisition of a life-cycle assessment, a method for applying such a light recipe for a breeding and/or growing and/or raising facility and a method for changing from light recipes with a poorer ecological assessment to light recipes with a better ecological assessment. This can be implemented on a platform configured to this end, said platform being accessible by customers, operators or other users. All available light recipes, or the light recipes made available, can be stored here with data or information items in respect of a life-cycle assessment or can be labeled here by certificates which are granted on the basis of a grouping in different life-cycle assessments or life-cycle assessment groups. It is conceivable that an assignment of the life-cycle assessment moreover includes further influencing factors. An assignment of a life-cycle assessment can be implemented manually, automatically or semi-automatically. The light recipes can be displayed to a user on a display apparatus or can be read from a database and output as output data upon request, for example by way of an input means.

Consequently, customers are able to buy plants that have achieved or else fallen within a predetermined life-cycle assessment. The customer can then either consume said products in said state or subsequently expose them to a natural light source, in particular the sun, for subsequent irradiation. Here, it is possible to communicate the necessary residual irradiation duration to the customer. Consequently, it is possible to satisfy ecologically oriented customer needs. By displaying a life-cycle assessment, a customer or consumer is consequently put into a position of being able to select a product from a first producer H1, which was produced with a first life-cycle assessment 1, or the same product from a second producer H2, which was produced with a second life-cycle assessment 2.

Also, it is possible that the customers are automatically informed if growing products or growing products selected by the customer have reached a certain maturity state, vitamin content, for example of vitamin C, or a certain amount of plant constituents, nutrients or minerals, or have satisfied a predetermined life-cycle assessment, and can be collected or shipped.

Further, an operator or customer is able to change from a light recipe with a poorer ecological assessment to a light recipe with a better ecological assessment. Such light recipes can be revealed in a database or offered to the operator or customer.

A further aspect of "Eco Certificates" relates to a method for applying such a light recipe in a breeding and/or growing and/or raising facility.

According to one aspect of "Eco Certificates", consumers or operators of a breeding and/or growing and/or raising facility can thus be provided with a life-cycle assessment established using the methods described herein.

Moreover, one aspect of "Eco Certificates" relates to a method for ordering plant and/or animal products, which contains a step for observing an established life-cycle assessment. In this way, it may be possible to use a further reliable information item, in respect of the life-cycle assessment in this case, within the scope of a purchasing decision.

Furthermore, an aspect of "Eco Certificates" relates to a method for an automated order or offer for a plant and/or animal product, triggered by a certain plant growth and/or a degree of maturity and/or a nutrient content and/or mineral content being reached. In addition, or as an alternative thereto, such a method can contain a step for an automated order or offer of a plant and/or animal product, triggered by a predetermined life-cycle assessment being achieved. What this can facilitate is that an order can be matched exactly to the customer's wishes. In particular, this can facilitate bringing about a certain degree of maturity, for example a certain vitamin content being obtained, without the rest of the plant having to be matured completely. Thus, maturing times can be optimized according to purpose.

An automated ordering process depending on one or more maturity states being reached can moreover be advantageous to the extent that there can be better planning for demand and no, or less, storage and warehousing time is necessary. This can reduce product decay on account of storage and the like. In a case where a certain life-cycle assessment being reached, i.e., an energy outlay for maturing the product in this case, triggers harvest and further processing, and not a maturity state, it is possible, in particular, to supply an information item with the products to be processed further, said information item stating whether or for how long further maturing is necessary, for example under natural conditions and light, in order to obtain a predetermined maturity state.

Naturally, it may require scientific examinations to analyze the advantages of a certain plant maturity or a nutritional value or a chemically effective plant constituent and be able to market this in view of customer requirements. By way of feedback in respect of their own experiences, the taste of the plants, the storability and the like, customers can actively be included in the design of light recipes that take account of a life-cycle assessment.

[End of "LIFE-CYCLE ASSESSMENT"]

Database

An aspect of "Eco Certificate" moreover relates to a method for interactively establishing light recipes. To this end, a database can be provided in order to store various data of one or more light recipes. A further aspect of the present disclosure also relates to a method for establishing a life-cycle assessment for such interactive light recipes. Here, interactive means influenced by current measurements, for example a pest infestation, problems when breeding and/or growing and/or raising plants or animals, or the like, or a customer can modify a selected light recipe, and consequently a life-cycle assessment, for example. By way of example, the life-cycle assessment can be determined by virtue of the information items about the energy consumption or the overall energy consumption, etc., that are available or establishable in relation to the light recipes, but also in relation to further growth parameters, such as watering, temperature, etc., being processed or calculated depending on the respectively set growth parameters.

Here, the data may include information items in relation to the illumination per se, such as intensity, duration of the on/off cycles, spectral composition of the light, etc., but also information items in relation to origin or amount of the employed energy, residual illumination durations, further environmental conditions such as humidity, temperature, etc., and the like. Such a database can be stored on a local data storage medium, a server, or at a non-local storage location or decentralized storage location. The database may be connected to an illumination device or control device of the illumination device such that data from the database can be considered for direct use during the illumination. Here, access to the database can be restricted by means of an access control. Thus, depending on access status, selected users may be provided on the database with read authorization, write authorization or read and write authorization. As a result of read authorization, the data stored in the database can be read, and so the light recipes stored therein and the additional information items can be made available to a user. With write authorization, in particular, a user can be allowed to store own light recipes, which are made available to them or, optionally, to further users as well, or else to modify existing light recipes or adapt these to special conditions. An optimization of the result can be achieved in this interactive manner for creating light recipes or modifying existing light recipes.

Such a database can be configured to be reachable by the user or users or operators by way of a network connection, a wireless network connection, a telecommunications connection or by way of other communication paths. To this end, the database or a data storage medium containing the database may be provided in a computing device, in particular a computer. The computing device may have communication means in this case, such as a network device, a transmitter device and/or a receiver device. A user and operator of the database can obtain access, even remote access, to the database by means of a further transmitter and/or receiver device. Here, the second transmitter and/or receiver device can be a computing device or else a mobile terminal. Here, all devices that are equipped with a communications interface and that need not be operated locally are considered to be mobile terminals, such as, for example, cellular telephones, portable computers such as laptops or tablets, and also smart watches, AR glasses or VR glasses, and the like.

[End of "Database"]

Transfer Platform

Such a database can be part of a transfer platform. In principle, such a platform can be provided for all aspects connected with an addition of value to be offered, sold, purchased, exchanged or modified. Primarily, this relates to products such as plants and/or animals. Thus, a plant product can be ordered by way of the platform in such a way that, for example, a certain amount in a predetermined maturity state is provided for delivery or collection at a certain time.

Furthermore, it is conceivable for certain light recipes, which improve or optimize various aspects of the production, for example, to be traded. By way of example, these light recipes can be made available to users, for example as downloadable databases, as locally executable programs or else as programs that are executable via the network. In particular, it is conceivable that an execution of the programs or an application of the light recipes is facilitated within the scope of so-called apps for mobile devices. As already mentioned, the mobile device or any other computing device can serve for implementation purposes, but also merely for display, selection, control or other maintenance or remote maintenance purposes, with the controlling program in fact being executed on a platform that is independent of the computing device or on an independent computer, which is indirectly or directly connected to a breeding and/or growing and/or raising facility.

Incidentally, as already mentioned, it is possible for so-called life-cycle assessments to be linked to the products or for the products to be labeled using such life-cycle assessments. Since a life-cycle assessment according to the present disclosure is primarily designed to document the resources or energy used for production and to present this transparently, an ecological certificate can be issued for a complete batch that was produced using a predetermined light recipe, for example. A transfer platform according to the present disclosure could also represent a platform embodied for trade with such ecological certificates. Moreover, it is conceivable to label non-modified light recipes with ecological certificates such that the products produced using such a light recipe accordingly fall under this certificate.

[End of "Transfer platform"]

Further Aspects

According to a further aspect of "Eco Certificates", a method is provided, said method creating or establishing a life-cycle assessment of a light recipe, in particular of an interactive light recipe. At least one computing device is connected to a data source for the purposes of creating such a life-cycle assessment on the basis of a light recipe, in particular an interactive light recipe. The data source may be a database, for example a database as described above, one or more sensors, a manual user input, an output of one or more further computing devices or the like, or a mixture of the aforementioned sources. Depending on what information items should be included in the life-cycle assessment, it is possible to evaluate the data of a light recipe, in particular in respect of an illumination duration, illuminance, spectral composition, etc., the energy footprint of which is directly determinable depending on the employed light modules and the like. In similar fashion, this can be established for interactive light recipes by analyzing the employed light modules and the applied illumination parameters. To this end, a so-called look-up table could be stored in a database or in one of the remaining data sources or in a local storage device of the computing device, for example, said lookup table presenting a simple correlation between light module, lighting parameter and energy consumption. By way of example, light modules of third-party suppliers may also be included in such a system for light planning purposes. In order to create a life-cycle assessment, it is also conceivable for only the photon flux or the previous overall photon flux to be taken into account, and not all secondary energy consumers.

Further influencing factors, which should be taken into account in a life-cycle assessment, can be taken into account in a similar fashion, optionally by way of external data sources. The various data or data packets can be combined and evaluated in the computer unit such that an overall energy consumption or another selected variable, the information of which is made available, is evaluated. A life-cycle assessment created thus, for example over a life-cycle of a product, can then be output on an output device. Once again, the output device can either be a local unit or a mobile unit, as already described above.

A further aspect of "Eco Certificates" relates to a method for exchanging light recipes. Here, a user or operator may have selected a certain light recipe, which is used for illumination purposes. Here, additional or other light recipes may be stored in a database, for example a database as described above, said additional or other light recipes either being optimized for the envisaged use or having special properties or merely being intended as alternative recipes which, for example, have different life-cycle assessments, different durations to maturity or the like. Access to the database may allow the computing device for controlling the breeding and/or growing and/or raising facility to replace an active light recipe with another light recipe that is stored in the database. By way of example, factors relating to the exchange of a light recipe could be the presence of an extraordinary situation, for example the occurrence of diseases or pests, which can be fought by means of specific light recipes, or else a requirement to slow down or accelerate the maturing process. The method for exchanging a light recipe may also be implemented, in particular, on the basis of sensor data that monitor parameters of the plant growth, or on the basis of a user request or a user specification. Such a method for exchanging a light recipe may thus include the steps of: acquiring a data input, for example from sensor data or a user request, possibly acquiring or analyzing the present light recipe in respect of the data input, selecting a predetermined light recipe or a light recipe appropriate for the data, deactivating the current light recipe provided a light recipe is selected and active, and activating a light recipe or the new light recipe.

[End of "Further aspects"]

Data Storage Medium

A further aspect of the disclosure relates to a data storage medium. The data storage medium contains a control program for carrying out a method for operating a breeding and/or growing and/or raising facility as described herein.

In particular, a data storage medium may contain at least one database. Here, the database may have light recipes and/or life-cycle assessments of a breeding and/or growing and/or raising facility, illumination device, light source, etc., and/or data in respect of requirements of the products to be produced in respect of growth, state of health, contents or the like.

[End of "Data storage medium"]

Irradiation Unit

A further aspect of the present disclosure relates to an irradiation device. In particular, the irradiation device can be connected to a control device. By way of example, the control device can be part of a computer or can be embodied downstream of a computing device.

The irradiation device can be embodied to emit an irradiation light, the light properties of which are regulated by one or more light recipes.

The irradiation device can be embodied to emit a light spectrum, the photon fluxes per spectral region of which are regulated by one or more light recipes.

The irradiation device can be embodied to emit a light spectrum, the photon fluxes per spectral region and spatial emission of which are regulated by one or more light recipes.

The irradiation unit according to one aspect of the present disclosure can also be embodied as a mobile irradiation device. Here, this mobile irradiation unit can be embodied to carry out at least one of the methods described herein. By way of example, mobile irradiation devices can be: trucks, trains, ships, spaceships or space stations, shopping carts, mobile household devices and the like.

A further aspect of the present disclosure relates to an irradiation device, the form and/or emission angle and/or photon flux of which is defined depending on a leaf area index and/or the leaf area density.

Two or more such irradiation devices can also be combined to form a cluster, wherein the light control thereof is undertaken by an external control device. It is moreover conceivable for a control device to be provided for each cluster element, wherein the individual control devices are actuated by one or more computer units.

[End of "Irradiation unit"]

Agricultural Facility

An agricultural facility, i.e. a breeding and/or growing and/or raising facility for plants or animals according to the present disclosure may comprise at least one illumination device, which is also referred to as irradiation unit. An illumination device, in turn, has at least one light source provided for illumination purposes. In some embodiments/implementations, an illumination device has a multiplicity of light sources. Here, the light sources can be actuatable individually, in groups or together. Here, the light sources can emit spectra that deviate from one another. Individual light sources or groups of light sources can be embodied here for the purposes of emitting individual wavelengths or narrow wavelength ranges. Other light sources or groups of light sources can emit a broadband spectrum or emit light with a predetermined or adjustable color temperature.

Moreover, an agricultural facility may have a control unit. The control unit can have an input device, a computing device and an output device. Here, the control unit is embodied to control the facility or at least part of the facility, in particular an illumination device, but also further components such as, for example, at least one watering system, at least one ventilation system, at least one climate-control system, a sensor system arrangement, writing data to, and reading data from, databases, and the like.

Moreover, an agricultural facility according to the present disclosure may also have a multiplicity of illumination devices.

[End of "Irradiation unit"]

Building

A further aspect of the present disclosure relates to a building configured for agricultural management, e.g. for vertical farming or any other form of controlled environmental agriculture, a greenhouse, etc. This means that a building according to the disclosure is configured to breed and/or grow and/or raise plants and/or animals on one or more levels, e.g. stories, of the building and, by way of at least partly artificial illumination in particular, develop growth or maturing conditions which mimic natural light, which are improved or optimized in relation to natural illumination or which influence a growth or maturing process of products in any other way. Such a building can be part of a breeding and/or growing and/or raising facility according to the disclosure. Conversely, it is also conceivable for a breeding and/or growing and/or raising facility to be part of such a building such that, where applicable, only parts of the building are assigned to a breeding and/or growing and/or raising facility. A control unit can be provided in the building or in the breeding and/or growing and/or raising facility, said control unit controlling the breeding and/or growing and/or raising facility or at least part of the breeding and/or growing and/or raising facility or the building or at least one part of the building.

[End of "Building"]

"Medical Certificates"

According to the element "Medical Certificates", a method for agricultural management, in other words a method for managing an agricultural facility, is proposed, wherein the breeding and/or growing and/or raising of a product is adapted to a specific use of the product. Particularly, growth parameters of medically active plants may be adapted to a planned medical use.

The method may comprise medically active plants grown with a specified growth process resulting in a specified content of medically active agents.

The method may comprise improved definitions or documentations of the growth process of the plants.

A multiplicity of irradiation variants and illumination controls for growing and/or breeding plants are highlighted, as are the methods enabling this and the corresponding breeding and/or growing facilities.

The following list specifies some paragraphs of "Eco Certificate", which are also relevant for "Medical Certificate", because, for example, a customer of medical products may also want to order a product on its ecological footprint. Furthermore, these paragraphs may be of general relevance to the disclosure. To avoid duplication of large text parts, these paragraphs are incorporated here by reference, and again cited in the following description at appropriate text passages to facilitate the comprehension of "Medical Certificate" without lengthy repetition of description.

Light Sources
Characteristics of Light Sources
Operating Mode of Light Sources
Parameters of Light Sources/Sensors
Plant
Characteristics of Illumination for Light Recipes
Matching the wavelength to fields of application
Spectral compositions
Irradiation sequences
Further irradiation effects
Illumination/Imaging
Examples of light recipes
Sensors
Data analysis and database
Controlling Growth
Database
Fields of Application
Urban farming
Cluster farming
Life-Cycle Assessment
Database
Transfer platform
Further aspects
Data storage medium
Irradiation unit
Agricultural facility
Building 1st aspect of "Medical Certificates": A method for agricultural management, particularly for operating a plant breeding, growing, cultivating and harvesting facility, in particular a breeding and/or growing and/or raising facility for plants and/or animals (agricultural facility), comprising the steps of: inputting input data from an input device into a computing device, processing the input data in the computing device and outputting output data from the computing device to an output device, wherein the output data contain at least information items in relation to a degree of maturity of a breeding and/or growing and/or raising product, an active agent content and/or an active agent concentration of at least one active ingredient in the breeding and/or growing and/or raising product.

Here, in particular, the input data can contain measured values of plants that allow a determination of active agents, active agent content and/or active agent concentration or that directly contain these values.

2nd aspect of "Medical Certificates": The method for agricultural management according to the 1st aspect of "Medical Certificates", wherein, in one method step, the output data for controlling the breeding and/or growing and/or raising facility are input into a control device, wherein, in particular, the control unit also may comprise the input device, the computing device and/or the output device.

3rd aspect of "Medical Certificates": The method for agricultural management according to the 2nd aspect of "Medical Certificates", wherein a control by the control device is modified on the basis of the output data in such a way that an active agent concentration of an active ingredient in the breeding and/or growing and/or raising product lies within a predetermined range or does not exceed or drop below a pre-determinable limit of an active agent content.

Such limits may be prescribed on the basis of medical data, legal requirements, requirements from certifications and the like. Here, it is conceivable for corresponding institutions or establishments that predetermine such limits make available databases that are made available by way of access, for example by means of a remote access method. In this way, these data can be taken into account in a breeding and/or growing and/or raising method and, in particular, can also be taken into account automatically. Here, in the present case, a "breeding and/or growing and/or raising product" should comprise plants and/or animals that are raised or grown, at least in part or at least intermittently, by means of a breeding and/or growing and/or raising method as described here.

4th aspect of "Medical Certificates": The method for agricultural management according to any one of the 1st to 3rd aspect of "Medical Certificates", wherein the method includes a step in which the computing device calculates and/or selects a light recipe in order to obtain a predefined effect, in some embodiments/implementations by inputting defined boundary conditions, in particular in order to obtain a predetermined active agent content or a pre-determinable active agent concentration.

In this way, determining the light recipe that accordingly fits best to the circumstances can be implemented, wherein, in this case, it is also possible to include factors such as future maturing times, development of active agents and plant growth and the like in the assessment of the light recipe selection in order to facilitate a better prediction and an improved load of the breeding and/or growing and/or raising facility.

5th aspect of "Medical Certificates": The method for agricultural management according to any one of the 1st to 4th aspect of "Medical Certificates", wherein the method includes a step for determining an active agent content resulting from a sensor-based acquisition of a breeding and/or growing and/or raising product and evaluation of the acquired data.

These sensor data can be input into the control device as input data.

6th aspect of "Medical Certificates": The method for agricultural management according to any one of the 1st to 5th aspect of "Medical Certificates", wherein a light recipe is established by a control device, wherein the step for establishing the light recipe at least includes the evaluation of a current degree of maturity or an active agent content of a breeding and/or growing and/or raising product.

Here, the light recipe can be determined in such a way that a target active agent content or target range of the active agent content or the active agent concentration is reached in the breeding and/or growing and/or raising product or can be expected at the end of the breeding and/or growing and/or raising stage in accordance with the chosen light recipe.

7th aspect of "Medical Certificates": The method for agricultural management according to any one of the 1st to 6th aspect of "Medical Certificates", wherein the data in respect of a maturing process and/or an active agent content and/or a health state and the like are, in one method step, output on a display apparatus and/or stored in a database such that the data are provided to a user, operator and/or customer.

This allows a user to track or else document the breeding and/or growing and/or raising process. This can also allow parameters during the breeding and/or growing and/or raising to be controlled or adapted manually on the basis of the displayed output data. Here, the display apparatus can be a local or a non-local display apparatus. In particular, the display apparatus can also be an appliance that is connected via a telephone network, radio network, LAN or similar network, such as, for example, a tablet computer, a cellular telephone or the like. Moreover, the display apparatus can be part of a computer, either locally or at a distance (remote client). It is likewise conceivable for the display apparatus to be a display apparatus of any unit connected, for example, via a network such as LAN, W-LAN, Internet, etc., said unit also being able to be configured for data output only.

8th aspect of "Medical Certificates": The method for agricultural management according to any one of the 1st to 7th aspect of "Medical Certificates", wherein the method includes a step for processing an order of at least one product produced in the breeding and/or growing and/or raising facility, wherein a control device has at least one input means with a communications unit such that a data input, in particular an indication of demand, from an external interface is assignable to a production or planned production in the control device.

In particular, an ordering platform can be directly or indirectly coupled to a control device of the breeding and/or growing and/or raising facility and so a need can be acquired directly on the basis of incoming or pending orders and can be taken into account in controlling and organizing the breeding and/or growing and/or raising facility. Thus, for example, sowing can be actuated, in particular by a sowing apparatus or sowing robot, in order to sow a desired product in order to service an increased demand that cannot be covered by existing growing products.

In respect of medical plants, in particular, this can allow various orders of one or more users to be bundled, particularly if this relates to small amounts, and thus allow logistical outlay to be reduced. Moreover, it is possible to conserve resources if products with the same or similar requirements in relation to the environmental conditions are processed together.

9th aspect of "Medical Certificates": The method for agricultural management according to any one of the 1st to 8th aspect of "Medical Certificates", wherein the external interface can have an input terminal, wherein the input terminal is embodied in such a way that a user and/or a machine and/or program code can input an indication of demand in respect of one or more products to be produced in the breeding and/or growing and/or raising facility at the input terminal.

In this way, a need can be planned more precisely and overproduction can be avoided. Moreover, a completion of the production can be matched to the demand, and so storage times, and losses and reductions in quality caused thereby, may be reduced.

Inputting an indication of demand for ordering plant and/or animal products can include a step for evaluating and/or monitoring an active agent content of the products. Alternatively, this can be a step for evaluating and/or monitoring an active agent concentration, for instance in certain plant parts, or the like. Here, an indication of demand can be an order or merely the announcement of a demand in future, for example in order to plan a corresponding utilization of the breeding and/or growing and/or raising facility in timely fashion. Particularly in cases in which the use of alternative light recipes for treatment purposes is necessary owing to unforeseen events, such as pest infestation or disease, it is possible to better ensure the observance of placed boundary conditions. By way of example, such boundary conditions may emerge from legal limits for plant contents or from certification specifications. However, these may also arise on account of other specifications, such as, for example, medical recipes or formulations, for reasons of research or for test purposes.

10$^{th}$ aspect of "Medical Certificates": The method for agricultural management according to the 8$^{th}$ or 9$^{th}$ aspect of "Medical Certificates", wherein the input of an indication of demand for ordering plant and/or animal products includes a step for evaluating and/or monitoring an active agent content of the products.

11$^{th}$ aspect of "Medical Certificates": The method for agricultural management according to any one of the 8$^{th}$ to 10$^{th}$ aspect of "Medical Certificates", wherein the method includes a step for automatically triggering an indication of demand of a plant and/or animal product depending on whether a selected product has reached a predefined threshold, in particular a predefined plant growth and/or a degree of maturity and/or a nutrient content and/or a mineral content and/or an active agent content or an active agent concentration.

This can allow a customer to indicate demand, for example on a transfer platform, and production to be implemented, either on the basis thereof or independently, such that the logged demand can be automatically acquired as an order when the boundary conditions and preconditions stored by the customer are reached and can be processed further such that, in particular, harvesting and delivery can be implemented if such a procedure was agreed in advance within the scope of an order method. Alternatively, data in relation to products that were produced in a breeding and/or growing and/or raising facility could be made available here on a corresponding transfer platform, said data including, for example, amounts, light recipes, life-cycle assessments, residual illumination durations, storability and storage requirements, active agent contents and concentrations, and the like. The data can be provided once, at regular intervals, when certain growth or maturity stages are reached, or virtually in real time, depending on sensor data and measurement intervals, for example. These data from one or more breeding and/or growing and/or raising facilities can be compared on the transfer platform to indications of demand by one or more customers, in some embodiments/implementations a multiplicity of customers. As soon as a predefined criterion, e.g., a criterion predefined by a customer, has been reached, an automatic order can be triggered on the transfer platform. Order data or product requirements on the part of the customer, the light recipes selected by a software program (app) and further growth information items, and plants illuminated or grown therewith and optionally provided with an identification code can be saved permanently as a correlation data record by means of a blockchain method and thus can also become comprehensible to the customer. This can ensure a gap-free and non-falsifiable record of the entire growth and supply chain. This can be particularly useful for operators and customers.

12$^{th}$ aspect of "Medical Certificates": An application app for selecting and/or purchasing and/or licensing a light recipe according to any one of the 1$^{st}$ to 11$^{th}$ aspect of "Medical Certificates".

13$^{th}$ aspect of "Medical Certificates": An application app for coupling various light recipes.

14$^{th}$ aspect of "Medical Certificates": An application app for interactively designing light recipes.

15$^{th}$ aspect of "Medical Certificates": A breeding and/or growing and/or raising facility, in particular for plants and/or animals (agricultural facility), comprising at least an input device, a computing device and an output device, wherein the computing device is designed to output output data to the output device and wherein the output data contain at least information items in relation to a degree of maturity, in particular an active agent content and/or an active agent concentration of at least one active ingredient, and wherein the output unit comprises a means for outputting the output data to a user or a control device.

The output data can contain at least information items in relation to an active agent, an active agent content and/or an active agent concentration of one or more plants, in particular medically active plants. Undertaking production of products within the scope of predetermined boundary conditions can be facilitated in such a breeding and/or growing and/or raising facility.

16$^{th}$ aspect of "Medical Certificates": An agricultural system, comprising:

a plurality of processing lines for growing plants of a given plant type, wherein a first processing line in the plurality of processing lines is configured to:
  - move a first plurality of plants through the agricultural system along a route; and
  - apply a first growth condition to the first plurality of plants to satisfy a first active agent parameter for the first plurality of plants.

An active agent can for instance be a pharmaceutical ingredient or nutrient of the plant. For instance, in case of a *Cannabis*-plant, it can be THC or CBD. Theine can for example be the active agent of a tea plant, and a vitamin or mixture of vitamins (vitamin complex) can for instance be the active agent of a fruit. Further, also a plant-color like Anthocyanin can be an active agent of a plant.

A processing line can for instance be designed as described in "Aquaponics", "Horticulture Processing Line", "Resizable Growth Area" and/or "Light Recipes and Workflow". The processing lines can for example be arranged in an indoor farm, for instance an agricultural facility.

17$^{th}$ aspect of "Medical Certificates": The system of the 16$^{th}$ aspect of "Medical Certificates", wherein each of the plurality of processing lines is configured to apply a different growth condition to their respective plants.

In general words, a "growth condition" can for example be a condition relevant for the growth of the plant, modifying the growth condition will typically alter the growth of the plants, or the ripening/flowering or the like. A growth condition can for instance be determined by the illumination (in particular light recipe), temperature, humidity, CO2-content in the air, and/or fertilizers, etc. A growth condition can for example be defined in a growth recipe. By applying different growth conditions, the active agent parameter of the plant can be influenced.

18$^{th}$ aspect of "Medical Certificates": The system of the 16$^{th}$ or 17$^{th}$ aspect of "Medical Certificates", wherein the first active agent parameter comprises an amount and/or concentration of an active agent.

The active agent parameter can for instance be the content of an active agent in the plant, and it can be provided in absolute mass units (e.g. milligrams) or in relation to a reference (e.g. milligrams per kilogram or milligrams per liter). It is not necessarily measured by a molecular analysis of the plant, but could also be evaluated indirectly (i.e. when the active agent affects the growth or appearance of the plant). In other words, the active agent is not necessarily measured directly, instead the influence on the morphology/form and/or color of the plant could be taken as a reference.

19$^{th}$ aspect of "Medical Certificates": The system of any of the 16$^{th}$ to 18$^{th}$ aspects of "Medical Certificates", wherein the active agent is a biological or chemical component that provides a nutritional and/or health-related benefit to the first plurality of plants.

20$^{th}$ aspect of "Medical Certificates": The system of any of the 16$^{th}$ to 19$^{th}$ aspects of "Medical Certificates", wherein the first processing line comprises a conveyor belt or an autonomous vehicle.

21$^{st}$ aspect of "Medical Certificates": The system of any of the 16$^{th}$ to 20$^{th}$ aspects of "Medical Certificates", the system further comprising a memory configured to store data about the first plurality of plants.

22$^{nd}$ aspect of "Medical Certificates": The system of the 21$^{st}$ aspect of "Medical Certificates", wherein the data comprises at least one of a location in the agricultural system of the first plurality of plants at a corresponding time, amount of time that the first growth condition has been applied to the first plurality of plants, the first active agent parameter, growth data of at least one of the first plurality of plants, the first growth condition, and an identifier for each plant in the first plurality of plants.

23$^{rd}$ aspect of "Medical Certificates": The system of the 21$^{st}$ or 22$^{nd}$ aspect of "Medical Certificates", the system further comprising at least one sensor configured to collect at least a portion of the data about at least one of the first plurality of plants as it is moved along the route.

24$^{th}$ aspect of "Medical Certificates": The system of any of the 21$^{st}$ to 23$^{rd}$ aspects of "Medical Certificates", wherein at least a portion of the data is stored in a blockchain.

A blockchain can for example be a digital record that stores a list of transactions (called "blocks") backed by a cryptographic value. Each block can contain a link to the previous block, a timestamp, and data about the transactions that it represents. Blocks are immutable, meaning that they can't easily be modified once they're created. And the data of a blockchain are stored non-locally, i.e. on different computers. These computers could be the computer of the producer and the computer of the customer.

The data collected by the sensors can contain information about the parameters applied to the plants (like temperature and illumination) and the growth status of the plants until harvesting. Using a blockchain that is shared between at least the customer and the farmer, the customer can be assured that the data collected in the blockchain are correct, as it is almost impossible to modify a blockchain once it has been created, i.e. a modification of data by the farmer afterwards (e.g. to hide problems during production) is impossible.

25$^{th}$ aspect of "Medical Certificates": The system of any of the 16$^{th}$ to 24$^{th}$ aspects of "Medical Certificates", wherein the route is segmented into a plurality of growth zones, and in each growth zone the first processing line is configured to apply a different growth condition to the first plurality of plants.

26$^{th}$ aspect of "Medical Certificates": The system of the 25$^{th}$ aspect of "Medical Certificates", wherein the plurality of growth zones comprises at least one of a germination zone, a maturation zone, and a flowering/fructification zone.

27$^{th}$ aspect of "Medical Certificates": The system of the 25$^{th}$ or 26$^{th}$ aspect of "Medical Certificates", wherein a route for each of the plurality of processing lines is segmented into the plurality of growth zones.

In general the different growth conditions can for instance differ in at least one of a light recipe, a temperature, and a carbon dioxide concentration.

28$^{th}$ aspect of "Medical Certificates": The system of any of the 25$^{th}$ to 27$^{th}$ aspects, wherein each of the different growth conditions is based on growth data received from one or more users.

The plurality of users can for instance be at least 10, 50, 100, 500 or 1000 different users (possible upper limits can for example be $1\times10^7$ or $1\times10^6$ different users). Defining the growth conditions this way can be advantageous as, for instance, a wide range of requirements can be collected or mapped, which goes beyond an experimental data base or matrix drafted by a single individual. The data generated respectively can allow for revealing correlations, for instance by artificial intelligence analysis, which are not accessible by conventional techniques.

29$^{th}$ aspect of "Medical Certificates": The system of any of the 16$^{th}$ to 28$^{th}$ aspects of "Medical Certificates", wherein the first growth condition is defined by a user that owns the plants.

30$^{th}$ aspect of "Medical Certificates": The system of any of the 16$^{th}$ to 29$^{th}$ aspects of "Medical Certificates", wherein the first growth condition is constructed by applying machine learning on growth data received from one or more users.

31$^{st}$ aspect of "Medical Certificates": The system of any of the 16$^{th}$ to 30$^{th}$ aspects of "Medical Certificates", wherein the first growth condition comprises a plurality of parameters relevant for growth of the first plurality of plants; and applying the first growth condition to the plurality of plants comprises adjusting one or more of the parameters in the first processing line.

32$^{nd}$ aspect of "Medical Certificates": The system of the 31$^{st}$ aspect of "Medical Certificates", wherein the plurality of parameters comprises at least one of an illumination level, one or more illumination wavelengths, a temperature, a humidity, a concentration of one or more gases in the air, and a fertilizer amount or concentration.

33$^{rd}$ aspect of "Medical Certificates": A method of operating an agricultural system, comprising:

defining a plurality of growth zones for a plurality of plants of a given plant type; and applying, in each of the plurality of growth zones, a different growth condition to the plurality of plants, wherein a first growth condition applied in a first growth zone of the plurality of growth zones causes the plurality of plants to satisfy a first active agent parameter.

34$^{th}$ aspect of "Medical Certificates": The method of the 33$^{rd}$ aspect of "Medical Certificates", wherein the first active agent parameter comprises an amount and/or concentration of an active agent.

35$^{th}$ aspect of "Medical Certificates": The method of the 33$^{rd}$ or 34$^{th}$ aspect of "Medical Certificates", wherein the active agent is a biological or chemical component that provides a nutritional and/or health-related benefit to the plurality of plants.

36$^{th}$ aspect of "Medical Certificates": The method of any of the 33$^{rd}$ to 35$^{th}$ aspects of "Medical Certificates", wherein the plurality of growth zones comprises at least one of a germination zone, a maturation zone, and a flowering/fructification zone.

37th aspect of "Medical Certificates": The method of any of the 33rd to 36th aspects of "Medical Certificates", further comprising:

receiving the first growth condition from a user that owns the plurality of plants.

38th aspect of "Medical Certificates": The method of any of the 33rd to 37th aspects of "Medical Certificates", further comprising:

determining each of the different growth conditions based on growth data of one or more users.

39th aspect of "Medical Certificates": The method of any of the 33rd to 38th aspects of "Medical Certificates", wherein the first growth condition is constructed by applying machine learning on growth data received from one or more users.

40th aspect of "Medical Certificates": The method of any of the 33rd to 39th aspects of "Medical Certificates", further comprising:

storing data about the plurality of plants.

41st aspect of "Medical Certificates": The method of the 40th aspect of "Medical Certificates", wherein the data comprises at least one of a location in the agricultural system of the plurality of plants at a corresponding time, amount of time that the first growth condition has been applied to the plurality of plants, the first active agent parameter, growth data of at least one of the plurality of plants, the first growth condition, and an identifier for each plant in the plurality of plants.

42nd aspect of "Medical Certificates": The method of the 40th or 41st aspect of "Medical Certificates", further comprising:

collecting, by one or more sensors, at least a portion of the data about the plurality of plants.

43rd aspect of "Medical Certificates": The method of any of the 40th to 42nd aspects of "Medical Certificates", wherein at least a portion of the data is stored in a blockchain.

44th aspect of "Medical Certificates": The method of any of the 33rd to 43rd aspects of "Medical Certificates", further comprising:

moving the plurality of plants between the plurality of growth zones using a processing line.

45th aspect of "Medical Certificates": The method of any of the 33rd to 44th aspects of "Medical Certificates", wherein the first growth condition comprises a plurality of parameters relevant for growth of the first plurality of plants; and the first growth condition is applied in the first growth zone by adjusting one or more of the parameters in the first growth zone.

46th aspect of "Medical Certificates": The method of the 45th aspect of "Medical Certificates", wherein the plurality of parameters comprises at least one of an illumination level, one or more illumination wavelengths, a temperature, a humidity, a concentration of one or more gases in the air, and a fertilizer amount or concentration.

47th aspect of "Medical Certificates": The method of any of the 33rd to 46th aspects of "Medical Certificates", for operating the agricultural system of any of the 16th to 32nd aspects of "Medical Certificates".

Individualized Light Recipes and Growth Recipes

"Medical Certificate" allows the application by a user of their own light recipe. Such a light recipe program can also specify further growth variables, such as, for example, fertilization, watering, ambient temperature, location of a plant in relation to a light source, time of the light-induced transition from the growth stage to the flowering stage, storage conditions after the harvest, transport conditions and the like. These non-light-related or not exclusively light-related specifications can be stored in a growth recipe. Here, a growth recipe should be understood to be a database, lookup table or other data source or collection of data, which defines the aforementioned parameters and/or which contains data that are relevant to the growing, growth, breeding, treatment, harvest and the like of plants and/or animals. A growth recipe can also be configured as a dynamic growth recipe. The latter can specify, select and, by way of the actuators such as light fixtures, food supply devices, etc., set in the growth recipe, carry out growth-specific light recipes. By way of example, growth-specific light recipes can be defined as a function of a plant-specific growth variable, such as the Leaf Area Index, for example.

A light recipe within the meaning of "Medical Certificate" should be primarily understood to be an illumination concept, although it may also contain control data of a growth recipe or contain control commands for a growth recipe, for example when water or fertilizer should be applied, as these may be coupled to a light function. Provided it is specified for a greenhouse, a light recipe can also be specified depending on the geographic location and/or the (statistical) weather conditions, and consequently also include the presence of natural daylight. Growth recipes and light recipes can thus interact or cover parameter spaces and specifications for breeding and/or growing and/or raising plants and, optionally, animals as well which at least intersect with one another or are in part common to one another.

Specified light recipes may comprise all stages of the plant growth and the storage and delivery process, i.e. seeds, seedlings, growth, flowering, maturity, harvest, storage and transport.

As mentioned at the outset, although growth- and maturity-promoting illumination concepts are known per se, they should be established exactly in each case for specific applications and customer requirements. This also applies to illumination concepts that should form or accumulate a predetermined or predefined concentration of certain active agents, also referred to as phytochemical active agents. By way of example, phytochemical active agents can include: vincristine, vinblastine, taxanes, paclitaxel, docetaxel, baccatin, cephalomannine, xylosyl, tetrahydrocannabinol (THC) and cannabidiol (CBD) from *cannabis* plants such as *Cannabis sativa, Cannabis indica* and *Cannabis ruderalis*, eucalyptol, genistein, daidzein, codeine, morphine, quinine, alkannin, cimicifuga, and more. *Cannabis* products can have more than 85 different phytochemical active agents, inter alia cannabinol (CNB), biphenyl and biphenyl-like and tricyclic cannabinoid active agents. Further illumination methods can promote or prevent the production of certain plant ingredients. Thus, it is possible to choose an illumination that can promote the formation of anthocyanins in plants or fruits, which gives certain fruit types a red, violet or blue color.

Luminous energy, i.e., photon fluxes, can be specified as micromol/($m^2$s) values (also expressed as μmol/($m^2$s) or μE/($m^2$s)). By way of example, a light source can be configured in such a way that it emits a photon flux of 2000 μmol/($m^2$s) in the spectral range of 420-700 nm and a photon flux of 600 μmol/($m^2$s) in the spectral range of 650-700 nm. These variables are adjustable within large boundaries depending on the design of the light sources.

According to a development of the present disclosure, an operator, customer or other user of a breeding and/or growing and/or raising facility or a user of the growing and/or breeding and/or raising method can store, for example by means of an input means, a product specification in a database or transfer platform. On the basis thereof, a control unit or a computing device of the breeding and/or growing and/or raising facility can determine a light recipe meeting the chosen requirements or select one or more suitable light recipes from a plurality of light recipes stored in a database. Moreover, there can also be an automatic adaptation of the respective requirements to the light recipe by way of an input means on the basis of a preselection of a product specification and measurement data in relation to the products, for example by sensors.

Consequently, it is of a great advantage if customers are able to choose between various light recipes, in some embodiments/implementations certified light recipes, for the product to be obtained.

According to the disclosure, a method for creating a light recipe (illumination code), which comprises the entire life-cycle of a growing product, is also provided, as well as such a light recipe. Such a light recipe may contain executable program codes and executing program codes of a growth recipe and/or may interact with such program code; thus, a light recipe may contain program code which selects (or prompts the generation of) a growth recipe fitting to the current situation via a database or by way of a currently employed deep learning analysis (AI) and which applies said growth recipe. What may occur here is that a growth recipe is selected and, as a consequence thereof, the light recipe needs to be reconfigured, i.e., its program code has to be modified, and said light recipe interacts with the program code of the growth recipe in this manner.

Moreover, the present disclosure also relates to a method for the application of a coupled light recipe to different growing products. A coupled light recipe or growth recipe is intended to be that a light recipe (or growth recipe) can be configured in such a way that the respective program, for example on the basis of a camera input, recognizes a new product (e.g., during a conveyor belt illumination process or when replacing a growth shelf) and then applies a light recipe related to this plant type. Thus, the light recipe (software in the database) can be configured to select and apply a light recipe assigned to the plant for each plant type, i.e., to couple said light recipe to the plant. In the case of a pass-type process, the light recipes are coupled to one another in time.

App, Certification and Obtaining a License

To this end, users, in particular customers, can be provided with control or regulating software, for example. The present disclosure also relates to such software and a data storage medium having such software. The software can be installed as an executable version on a data storage medium, for example an interchangeable data storage medium or a mobile data storage medium, or on a computing device and it is intended also to be referred to as an app below. Here, computing devices can be: computers, mobile appliances such as tablet computers and telephones, servers with and without remote access options, for example Internet-based input masks, and other components that have a display, processing, output or other option for accessing the app and/or the breeding and/or growing and/or raising facility.

In particular, the software can also be software for controlling the breeding and/or growing and/or raising facility or parts of the breeding and/or growing and/or raising facility.

Users are able to install or activate the app on a system provided therefor. Different light recipes can be displayed in the app for the tested or specified plant types, in particular for plants with applications in medicine.

According to "Medical Certificate", the application app can be embodied for selecting and/or purchasing and/or licensing a light recipe, as described herein. To this end, the app can be coupled to a communications interface of the computing device in order to facilitate one-way or two-way (reciprocal) communication with data storage media, databases, control units, other computing units, servers or other internal or external components.

The app can also be embodied to couple various light recipes. This means that an APP is configured in such a way that it recognizes whether or when a chosen light recipe no longer leads to success as a result of modified boundary conditions, or whether or when another and possibly new light recipe, which achieves the desired result more efficiently, quicker or with a better life-cycle assessment, is present. Consequently, coupling light recipes also means stringing together best-suited light recipes for a pre-determinable result. In this way, there can be a change of the applied light recipe to an alternative or better light recipe according to the respective circumstances if need be. In turn, this can be implemented within the chosen specifications or boundary conditions. Here, the app can be embodied in such a way that a selection of the suitable light recipes is implemented automatically. If light recipes that should only be applied to a certain or pre-determinable interval, for example a growth stage or flowering stage, are selected, automatic coupling of light recipes for different growing stages can be implemented accordingly.

In particular, the app can be embodied for the interactive design of light recipes. This can allow a user to manipulate or adapt a control, in particular a light application. Here, it is conceivable for the app or the input data for controlling the breeding and/or growing and/or raising facility to provide the user with a restricted parameter space, within which variations of the light recipes are facilitated. In this way, a predetermined specification, for example a permitted maximum active agent content or a maximum active agent concentration can be observed in medically active plants despite the option of a manual, interactive design of light recipes. Then, interactively created light recipes can be made available, for example as output data from the app, or from the app via the control device as output data in an internal and external database, or they may be merely stored. In this way, other users may also access light recipes created in this manner. Then, other users may be provided with rights for using and/or processing the light recipes, possibly once again within a restricted variable or parameter space.

Certification and Purchase of Specific Light Recipes

Light recipes can be selected by a user within the app or, in the case of an Internet-based access to databases, using a browser-based access mask. The user can or must be registered, depending on a selection of the light recipes. Moreover, it is possible for the light recipes to be purchased or for licenses for use thereof to be obtained such that the user is put into the position where they are able to apply light recipes relevant to them for the purposes of growing and/or breeding corresponding plants. Here, a licensing may for example be unrestricted, or restricted to a certain time period or to a pre-determinable number of growth cycles or maturity cycles. Corresponding apps or additional modules of such apps can be provided by, for example, an operator of a breeding and/or growing and/or raising facility, by a distribution partner or by a certification body such as the department of health. The light recipes stored for the respective application or plant types can be labeled as certified or non-certified and/or can be classified as permitted or not for certain groups of people. In this way, it is possible to obtain access control within the app and a restriction of the group of people using the light recipes.

The app can be provided interactively. This means that a user can specify personal requirements and optionally adapt or match the light recipe and also, optionally, the growth concept to these requirements. Such light recipes may be certified, but need not be certified, by an official body.

Official light recipes are certified and reveal the active ingredients that are obtainable by the illumination and the growth conditions for the respective plant types, with possible ranges of variation. It is also conceivable here that a light recipe can be varied only in certain areas or only in respect of predetermined parameters by a user so that it is possible to ensure that a product remains within predetermined limits, for example certified limits.

Furthermore, light recipes that can be tailored to certain groups of people may be offered. Here, it is possible to take account of, for example, body size, age, disease, sex, skin type, previous diseases, addiction treatment, co-medicaments, allergies and the like when selecting, assigning and determining one or more light recipes.

Thus, the apps can specify the active ingredients or the concentrations thereof that result over the irradiation time within the scope of a chosen light recipe for different breeding and/or growing and/or raising products and different requirements or groups of people. Dark stages may also be included therein.

The apps can specify/have certified breeding and/or growing and/or raising facilities, which are able to carry out the chosen light recipes for the chosen products, i.e., which comprise suitable illumination devices.

Thus, customers purchase or license a light recipe and then, provided a selection exists, select a suitable breeding and/or growing and/or raising facility, which is as local as possible, and order their product. Once an order has been implemented, it can naturally also be triggered again in future.

The control device or another component of a breeding and/or growing and/or raising facility according to the disclosure may comprise a communications device for communicating the measured data to the respective customers. In this way, access, in particular remote access, to the measured data and optional further information items relating to the intended and/or actual state of the breeding and/or growing and/or raising facility or specific growth data of growing products can be facilitated for a user. In particular, the communications device can be configured to communicate with a certification body or with a communications device and/or database of a certification body. A method for controlling a breeding and/or growing and/or raising facility can accordingly include a step for communicating with a certification body.

Breeding and/or Growing and/or Raising Logistics

The selected light recipe is available as a digital software program or as program code and/or as a collection of parameters, is identified and, in conjunction with the order process, transmitted to a selected producer or operator or the selected producer or operator of a breeding and/or growing and/or raising facility authorized to this end, said producer or operator then growing and accordingly illuminating the product or making a product that is already complete and that meets the requirements ready for delivery (or collection). To this end, the operator of the breeding and/or growing and/or raising facility must ensure that the ordered plant also experiences the ordered light recipe. Therefore, it is expedient to provide a plant container or a tray of plants with a corresponding unique code, which ideally also contains the order data.

Should a customer order a plurality of plant types with different light recipes, an app can calculate or set a respective start date, proceeding from the desired delivery date, in such a way that the growing products are finished simultaneously.

In the case of a growing product that still has to grow, the current and/or integral exposure data (spectra, exposure time durations, modes of operation, dark stages, spectral photon fluxes) and calculated or measured concentrations of active ingredients can be communicated to a customer (via the app, email, etc.). Naturally, the concentrations must be determined in situ or at a certified testing body.

Active agent concentrations can be determined by means of suitable measurement methods. The use of luminescent or fluorescent markers in cannabis plants and illumination of the plants with UV light, visible red light or infrared light is known. Then, medical cannabis can be differentiated from other cannabis types on the basis of the spectral data.

The customer is informed when the specified substance values are reached, and delivery is triggered or self-collection is implemented. What light recipe is suitable for storage or for keeping the active ingredients can be communicated to the customer upon collection. If the customers have a similar illumination scenario at home, they can store the substances therein under recommended conditions.

Customers are able to report their experiences and, where applicable, their privately determined measured values of the active ingredients by way of a forum or via their physician. These can then be assessed by an expert team and, if need be, a new light recipe is thereupon created, certified and then also made available.

Furthermore, customers can (following payment) download light recipes (apps) onto their smartphone or other communications devices, for example, and operate their private plant illumination therewith. To this end, the private plant illumination should be compatible with (or even certified for) the light recipe (and also the growth recipe).

Using portable appliances, customers are able, for example, to measure the UV absorption of a (dissolved) cannabis product and thus determine the THC concentration.

Plant Illumination

Plant-growth-promoting illumination by way of artificial light sources has been known for a relatively long time, firstly as an additional illumination in greenhouses, and then for plant illumination in spaces that are largely or even completely shielded from natural ambient light.

Light Sources

Characteristics of Light Sources

Reference is made to the respective paragraph of "Eco Certificate" with the same title name.

Operating Mode of Light Sources

Reference is made to the respective paragraph of "Eco Certificate" with the same title name.

Parameters of Light Sources/Sensors

Reference is made to the respective paragraph of "Eco Certificate" with the same title name.

Plant

Reference is made to the respective paragraph of "Eco Certificate" with the same title name.

Characteristics of Illumination for Light Recipes

Reference is made to the respective paragraph of "Eco Certificate" with the same title name.

Light Recipes

Reference is made to the respective paragraph of "Eco Certificate" with the same title name.

By way of example, light recipes can be created and selected taking account of both ecological points of view and customer use points of view. These include inter alia: preference for taste, consistency, look, color, smell, ingredients of a product (plant, animal). For plants that are applicable in a medical or therapeutic context, further properties may increase the customer usefulness: vitamin C content, nutrients, minerals, medical active ingredients such as cannabidiol, THC, cancer-fighting substances, pain reducing active agents, cramp releasing active agents, etc., but also the concentration of toxic and consequently damaging plant ingredients.

Different groups of people have different requirements or metering needs, for example on account of body size, age, disease, sex, skin type, previous diseases, addiction treatment, co-medicaments, allergies, etc.

Therefore, a customer is interested in obtaining or actively co-designing the optimal product for their requirements (on account of the personal well-being or on account of examinations by a physician). Since light recipes decisively cause and influence product growth and quality, it would be advantageous if a customer knows these variables or is made aware of these variables and if said customer could trigger an order on the basis thereof. Moreover, it would be advantageous if a customer could co-design a light recipe. This can achieve a maximization of use. These usage factors are referred to here as effect values WW.

To this end, the customer must know the applied light recipes or the administered light variables (see below) or the effect values WW for the product to be ordered or the ordered product, and optionally also other growth and maturity parameters and correlation factors K. It is conceivable that a customer or user is likewise able to influence these correlation factors.

Matching the Wavelength to Fields of Application

Reference is made to the respective paragraph of "Eco Certificate" with the same title name.

Spectral Compositions

Reference is made to the respective paragraph of "Eco Certificate" with the same title name.

Dependence on Leaf Area Parameters

Reference is made to the respective paragraph of "Eco Certificate" with the same title name.

Irradiation Sequences

Reference is made to the respective paragraph of "Eco Certificate" with the same title name.

Further Irradiation Effects

Reference is made to the respective paragraph of "Eco Certificate" with the same title name.

Illumination/Imaging

Reference is made to the respective paragraph of "Eco Certificate" with the same title name.

Examples of Light Recipes

Reference is made to the respective paragraph of "Eco Certificate" with the same title name.

Phytoremediation/Phytomining

A light recipe which regulates the photon flux of a light source in such a way that the production of an active ingredient is promoted or a light recipe which regulates depending on an active ingredient or active ingredient concentration.

Sensors

Reference is made to the respective paragraph of "Eco Certificate" with the same title name.

Data Analysis and Database

Controlling Growth

Reference is made to the respective paragraph of "Eco Certificate" with the same title name.

Database

Reference is made to the respective paragraph of "Eco Certificate" with the same title name.

Fields of Application

Reference is made to the respective paragraph of "Eco Certificate" with the same title name.

Urban Farming

Reference is made to the respective paragraph of "Eco Certificate" with the same title name.

Cluster Farming

Reference is made to the respective paragraph of "Eco Certificate" with the same title name.

Life-Cycle Assessment

Reference is made to the respective paragraph of "Eco Certificate" with the same title name.

Furthermore, the customers may automatically be informed if concentrations of the amounts of a predetermined active agent is achieved.

In addition to achieving a certain life-cycle assessment, other parameters or the attainment of such another parameter may be a triggering event for subsequent steps in a method as described here, in particular in an automated method. In particular, such a parameter can also be an active ingredient concentration in a plant.

Database

Reference is made to the respective paragraph of "Eco Certificate" with the same title name.

Transfer Platform

Reference is made to the respective paragraph of "Eco Certificate" with the same title name.

Such certificates also can be issued for medical plants and optionally can be traded, for example in respect of production volume, plant type or plant constituents and, in particular, active agent content and active agent concentration. The explanations above and also the explanations below in this case describe methods for revealing different characterizing records, using the example of life-cycle assessments. By way of example, a certification of products which has been implemented within predetermined specifications according to documentation can be obtained here in an analogous or similar manner. The products can then be named, labeled and traded accordingly.

Data Storage Medium

Reference is made to the respective paragraph of "Eco Certificate" with the same title name.

Irradiation Unit

Reference is made to the respective paragraph of "Eco Certificate" with the same title name.

Agricultural Facility

Reference is made to the respective paragraph of "Eco Certificate" with the same title name.

Building

Reference is made to the respective paragraph of "Eco Certificate" with the same title name.

Light as a Service (LaaS)

In a further embodiment of the disclosure the illumination in the agricultural facility, particularly the illumination for plants, is provided as a service. Such Light as a Service (LaaS) means that the grower does not need to buy agricultural or horticultural light fixtures, but just an illumination quantity or alternatively a harvest yield. For example, the grower may rent the light fixtures and just pays for the illumination quantity he or she needs. To this end, a grower may give the service provider specifications about the agricultural facility, e.g. production area, and the requested result. Based on these specifications the provider leases the appropriate light fixtures and provides the illumination quantity according to the applied light recipe. Based on the requested result the service provider may also provide an appropriate light recipe.

For this purpose, the controlled agricultural system comprises sensors for monitoring the operation of the light fixtures. The monitoring may include operating durations and illumination intensity during the operation durations. Therefore, the sensors may comprise, for example, light sensors, sensors for current measurements, clocks, etc. The operating data of the light fixtures are stored, e.g. in the data storage device of the agricultural system, and can be accessed by the service provider, for example, via the control unit. Furthermore, the agricultural system may be configured to bill the grower based on the operating data and the fee rate agreed with the service provider. Alternatively, the grower may be billed based on a flat rate.

1st aspect of "LaaS": A controlled agricultural system, comprising at least one light fixture and at least one sensor that is able to monitor the operation of the light fixture, particularly the illumination quantity.

2nd aspect of "LaaS": A method for agricultural management, wherein the illumination in an agricultural facility, particularly the illumination for plants, is provided as a service (LaaS).

3rd aspect of "LaaS": The method for agricultural management according to the 2nd aspect, wherein the applied illumination quantity is monitored with a controlled agricultural system according to the 1st aspect of "LaaS".

The aspects regarding Light as a Service (LaaS) mentioned above can also unfold their beneficial effects when they are used in combination with each of the above-mentioned elements of the disclosure. For instance, LaaS may benefit from "Failure Detection" in order to be able to detect failures of the light fixtures as soon as possible. Furthermore, the failure may soon be corrected with the help of "Failure Compensation", in order to safeguard the illumination rented by the grower. The elements "Adaptive Spectrum", "Temperature Dependent Illumination" and "Extended Light Recipes" may help to reduce the operational cost for the service provider. Elements described in the group "Plant Health and Growth" may contribute to achieve the targeted yield.

As described in "Success Score" the customer can interact with the grower via interfaces of the controlled agricultural system and order customized plants. The customer can choose between different growth recipes, e.g. according to "Medical Certificates", and/or define his/her general requirements, which are then translated into the correct growth recipe by the system, e.g. according to "Customer Requirements".

Furthermore, the controlled agricultural system may be configure according to elements of the group "Light and growth Recipes", particularly "Flexible Growth", to adjust the growth recipe. Using the farm setup the production is planned and started according to elements of the group "Plant Health and Growth", especially "Yield Prediction" to forecast the yield. The weather forecast may also be taken into consideration. Furthermore, feedback may be provided to the customer like eco-balance ("Eco Certificates") and success score ("Success Score"), in case the precise growth recipe for the specific farm is not available.

The elements "Smart Grid" and "Adaptive Spectrum" can also be taken into consideration when planning the production and the energy costs associated with it.

Using different farms (some of them greenhouses, i.e. exposed to the weather) the production can be distributed among the farms taking into account the local weather forecast to reach the production target.

The customer can also interact with the controlled agricultural system using a smartphone-app as described in "Picture Taking & Evaluation", i.e. controlling the growth and health of plants and providing this information to the platform. The data obtained with the help of "Picture Taking & Evaluation" can also be taken to improve prediction accuracy of "Yield Prediction" and "Customer Requirements".

The controlled agricultural system can also give a feedback about the plant growth. Customers can react to the feedback from the platform. If changes are requested, they can be implemented using growth recipe (see the group "Light and Growth recipe, especially "Flexible Growth").

Further Aspects of the Disclosure

Agricultural Lighting as a Service (ALaaS)

Lighting as a Service (LaaS) is a value added service delivery model in which a light service, in particular the availability of an agreed upon illumination quantity and quality at a specific location and at a specific time, is charged on a subscription or use basis rather than via a one-time payment. Such a business model has become known in commercial and citywide installations of LED lights, specifically in retrofitting buildings and outdoor facilities, with the aim of reducing installation costs.

An Agricultural Lighting as a Service (ALaaS) delivery model refers to a Controlled Agricultural System that employs Agriculture Light Fixtures, Sensors and Actuators, as well as to a related business model, wherein the installation of light emitting elements, like light fixtures, their use and their performance are monitored, locally or remotely, and counter measures are being selected and executed in order to compensate for light degradation, to repair a light emitting device or to provide repair instructions, furthermore to trigger the exchange or refurbishment of an Agricultural System or one of its components, and to select adjusted growth conditions (i.e. to provide agreed-upon light or growth recipes) in order to fulfill the agreed upon service contract (ALaaS) as best as possible. Such an Agricultural Lighting Service (ALaaS) can be assisted with smart contracts for example based on blockchain technologies.

In order to provide such ALaaS services, several elements of the disclosure need to be combined and jointly executed in order to meet the contractual service obligations. In a preferred implementation, a synergistic operating and control management is intended that manages and employs favorable combinations of the elements "Yield Prediction", "Resizable Growth Area", "Horticulture Processing Line", "Failure Compensation", "Failure Detection", and other as described below.

Agricultural Lighting as a Service (ALaaS) also means that a provider of such services may need to ensure proper operation of an Agricultural System or at least of some of its components, such as light fixtures that provide illumination to the plants. Therefore, in a preferred implementation it is provided to install and activate a failure detection control system as described in the element "Failure Detection" of the disclosure, aiming at the detection, localization, repair, replacement or any other suited countermeasures.

One of the possible countermeasures is described in the element "Failure Compensation" of the disclosure wherein a controlled agricultural system with a light fixture is proposed that is configured to be able to compensate a failing light source, namely a reduced light emission or even a total failure, at least temporarily, until the failed light source, affected module, or the light fixture as a whole, is replaced or repaired.

Using the element "Failure Compensation", the agreed-upon light quantity and light quality can be maintained at least for a short period of time after the detection of a failure using "Failure Detection", until a proper repair of the defect light source can be made. Thus, it is technically possible to reach the targets defined in the ALaaS-agreement.

The customer may be supported in defining the right light quantity and quality by using the element "Customer Requirements" which helps to define the light and growth recipe based on the requirements the customer has with respect to the quality of the plants and produce (vitamin-content, color of the plants, etc.). Based on this requirements, a proposal for a light quality may be provided to the customer.

The element "Customer Requirements" relies mainly on available data (i.e. which light or growth recipe provides which results for a plant). These data might not always be available, i.e. the element "Success Score" might be used to calculate the success probability for an unknown combination of plants and/or requirements.

Once the light quality and light quantity has been defined by or for the customer, the eco-balance may be calculated using the element "Eco Certificates".

The provider of ALaaS may use the aspects described in the element "Smart Grid" to reduce his costs of providing the light, like reducing light intensity when the costs are high. This might result in adaptions of the light recipe as described in the elements "Adaptive Spectrum", "Extended Light Recipes" and/or "Flexible Growth". Modifications of the light spectrum might make it necessary to recalculate the eco-balance as described in "Eco Certificates".

While the light recipes defined in the ALaaS-contract are applied, the growth of health of the plants may be monitored to provide a feedback to the customer if the desired growth, yield and quality targets can be reached. To achieve this, aspects described in the elements "Disease & Pest Control", "Prophylaxis", "Discolored Spot Detection", "LiDAR Plant Surveillance", "Stress Detection" and/or "Yield Prediction" might be used. The status of the plant growth might be provided using a UI which shows the status and deviations between the actual growth and expected growth status.

The elements to monitor the growth and health of plants need sensors that are distributed within the agricultural farm. To obtain an optimized distribution of sensors (i.e. a minimum number of sensors with a maximum coverage) the aspects described in the element "Measuring Patterns" can be used.

If deviations to the expected growth and yield results are observed, the system may propose counter-measures. These might be measures against disease or pest as described in the elements "Disease & Pest Control", "Prophylaxis" and/or "Fungi Growth Inhibition". If the projected yield is lower than expected, as e.g. the estimations described in the element "Success Score" were not completely correctly, the system might propose an updated light recipe (or growth recipe) which can replace the originally agreed-upon light recipe.

In other words, the described ALaaS service approach makes use of several or all of the above-described elements that are combined and jointly executed in a favorable way thus enabling fulfillment of the contractual obligations to the benefit of the growers and customers.

Agricultural Platform as a Service (APaaS)

A Platform as a Service (PaaS) or Application Platform as a Service (aPaaS) or platform-based service is a category of cloud computing services that provides a platform allowing customers to develop, run, and manage applications without the complexity of building and maintaining an infrastructure typically associated with developing and launching an app or program. An Agricultural Platform as a Service (APaaS) enables, for example, growers and customers, as well as soft- and hardware developer, to create better or more suited plant lighting recipes, plant growth and pest control programs, stress detection and stress avoiding algorithms, in form of computer implemented codes (Software, App), leading to better biomass yield, a higher quality with respect to the nutrients of the produce, a more reliable operation, a quicker time to market, and a higher system reliability.

In particular, an Agricultural System may use a Data Processing Center comprising a Software as a Service (SaaS) input/output system configured to implement an agricultural product decision-making and resource planning process by using an Application Program Interface (API) provided by an SaaS platform, and to request analysis from a Platform as a Service (PaaS) analysis system, and to receive a result of the analysis from the PaaS system, and output the analysis result to a User Interface (UI).

An Agricultural Platform as a Service (PaaS) provides the computing and data management resources and infrastructure to collect and analyze data. Data may be general information about the agricultural farm, for instance the functionality of the light sources (see the element "Failure Detection"), the growth and health data of the plants (see for instance the elements "LiDAR Plant Surveillance", "Sensor Retrofit". "Stress Detection", "Disease & Pest Control", Discolored Spots Detection", "Picture Taking & Evaluation" and/or "Prophylaxis"), and the status of the agricultural farm in general like humidity, temperature, $CO_2$ etc.

These data can be provided to customers, the provider of the agricultural system or third parties for further analysis. The analysis may contain yield prediction (see the element "Yield Prediction"), the calculation of "Medical Certificates" or "Eco Certificates" (see the respective elements), the evaluation of a "Success Score" (see the element), the probability of an infection (see "Disease & Pest Control"), and/or the risk of an infection taking place (see "Prophylaxis").

The analysis may be displayed and/or used to control actuators, e.g. to modify growth parameters as described in the elements "Adaptive Spectrum", "Extended Light Recipes", Flexible Growth", "Temperature Dependent Illumination", "Temperature Control", and/or "Plant Movement", and/or to take measures against pest or disease as described in the elements "Disease & Pest Control", "Prophylaxis" and/or "Fungi Growth Inhibition". The control parameters might be provided by third parties which us the Agricultural Software Platform and the data provided by it.

Internet of Things

The Internet of Things is a network of devices such as light fixtures, sensors and actuators. The devices may communicate among each other using wire-bound or wireless communication. Wireless communication may comprise Bluetooth, WLAN or OWC.

Optical Wireless Communications (OWC) is a form of optical communication in which guided or unguided visible, infrared (IR), or ultraviolet (UV) light is used to carry a signal. Visible light communication (VLC) is a data communications variant which uses visible light between 400 and 800 nm. VLC is a subset of optical wireless communication technologies.

The agricultural system comprises several elements that can communicate wireless with each other, especially using OWC, as light fixtures are available throughout the agricultural system. For instance, the "Failure Detection" may be communicated wirelessly to a central computing device and/or computer system, and the "Failure Compensation may be triggered in the same way. Also the sensors may communicate in this way among each other, with the light fixtures and with a central computing device and/or computer system, for instance sensors as described in "Sensor Retrofit" or "Measuring Patterns". Also the disease and growth control may be done wirelessly, as well as the whole control of the system (as described in "Aquaponics", "Resizable Growth Area" and/or "Horticulture Processing Line").

However, when using light fixtures to communicate with the sensors or actuators in the system, it has to be considered that the light modulation may affect the intensity of the light fixtures (either overall or at specific wavelengths). A way to deal with this is described in the element "Light Recipe and VLC".

The control of such use of various OWC techniques may be facilitated by a Software as a System (SaaS) system and method, a Light as a Service (LaaS) system and method, and a Platform as a Service (PaaS) system and method.

BRIEF DESCRIPTION OF THE DRAWINGS

FIGS. 4A, 4B show a first embodiment of a growth area.

DETAILED DESCRIPTION

The detailed description is described with reference to the accompanying figures. In the context of this description, the terms "connected" and "coupled" are used to describe both a direct and an indirect connection and a direct or indirect coupling.

System Setup

Figure 1:
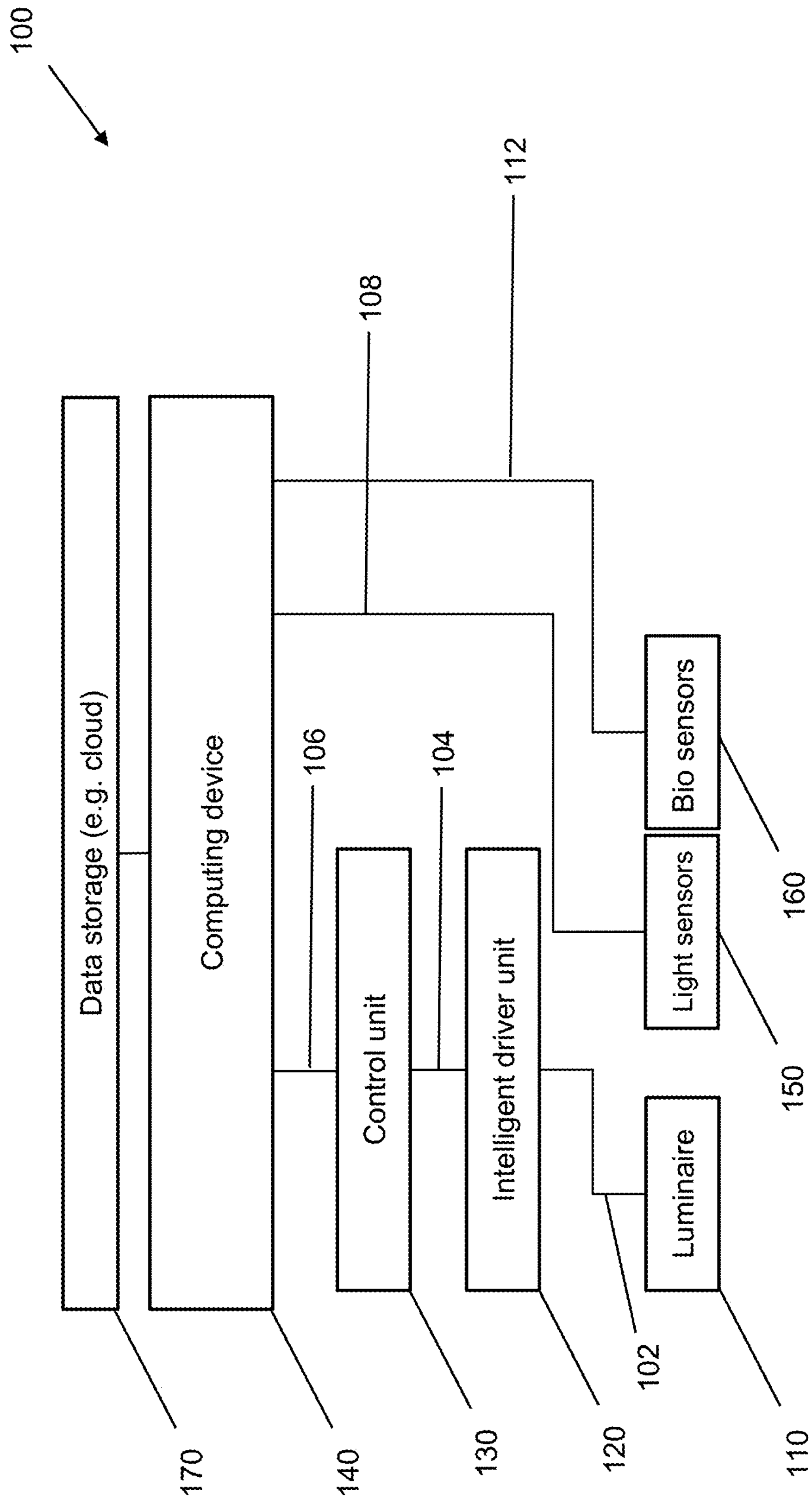
FIG. 1 illustrates schematically a Controlled Agricultural System.

FIG. 1 illustrates schematically a Controlled Agricultural System 100 according to various embodiments.

An agricultural light fixture 110 is connected to an intelligent driver unit 120. The intelligent driver unit 120 is configured to transmit a first signal 102 to the agricultural light fixture 110. The connection between the agricultural light fixture 110 and the intelligent driver unit 120 may be a wired connection or a wireless connection. The transmitting signal 102 may conform to a common communication protocol. The intelligent driver unit 120 is connected to a light control unit 130. The light control unit 130 is configured to transmit a second signal 104 to the intelligent driver unit 120. The first signal 102 is based on the second signal 104. The light control unit 130 is connected to a computing device 140, e.g. a computer system. Furthermore, the computing device 140 is connected to a first sensor 150, e.g. an optical sensor for measuring plant growth and plant health, and a second sensor 160, e.g. a sensor for measuring environmental parameters like temperature, humidity, etc. The computing device 140 is configured to compute a third signal 106 based on the signals 108, 112 transmitted from the sensors 150, 160. The computing device 140 is connected to a data storage device 170, which may be based locally (on-site), in a network or in the cloud (cloud computer network).

In various embodiments, the Controlled Agricultural System 100 may further comprise one or more actuators for adjusting the growing conditions for the plants, for instance, for adjusting the temperature, humidity, lighting, air, ventilation in the proximity of the light fixture or for applying growth supporting components, such as water, nutrients and/or pesticides to the seeds or plants.

In various embodiments, the computing device may be configured to perform an agriculture management software. The agriculture management software may be configured to manage the Controlled Agricultural System 100.

Figure 2:
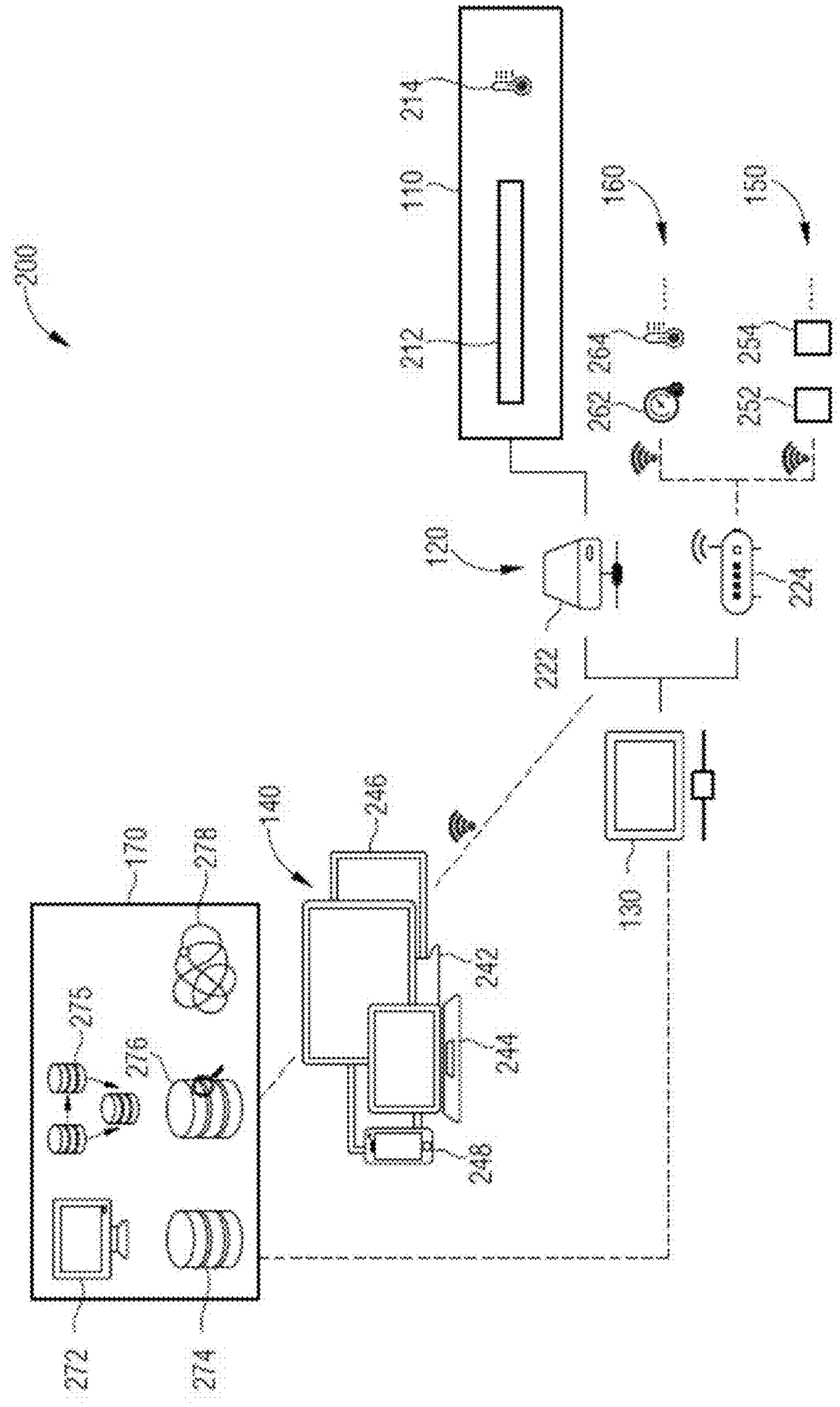
FIG. 2 illustrates schematically a first embodiment of a Controlled Agricultural System.

FIG. 2 illustrates schematically a first embodiment of a Controlled Agricultural System 200.

An agricultural light fixture 110 is connected via a gateway 120, e.g. based on a local area network (LAN) 222 or wireless LAN (WLAN) 224 or any other wired or wireless connection, to a light control unit 130. The agricultural light fixture 110 comprises light modules 212 and sensors, e.g. temperatures sensors for monitoring the temperature of the light modules 212. Supplemental sensors 150 for measuring plant growth and plant health, e.g. image sensors 252, PAR sensors 254, and sensors 160 for measuring environmental parameters, e.g. humidity sensors 262, temperature sensors 264, are also connected via the gateway 120 to the light control unit 130. Via the gateway 120 the light control unit 130 is also connected to the computing device 140, e.g. a desktop computer 242, a laptop computer 244, a mobile device like a tablet 246 or mobile phone 248 and/or to any graphical user interface (GUI). The computing device 140 is configured to run an agriculture management software. The light control unit 130 and the computing device 140 may also be connected to a data storage device 170 (cloud computer network). The data storage device 170 (cloud computer network) may be accessed via a website 272 and provide data storage 274, data management 275, data analytics 276 and algorithms and computations based on artificial intelligence (AI) 278.

In various embodiments, the data storage device 170 (cloud computer network) may further comprise plant health definitions, analytical reporting and growth strategies. The data storage device 170 (cloud computer network) may even comprise the functions of the computing device 140.

The detailed description is described with reference to the accompanying figures.

Figure 3:
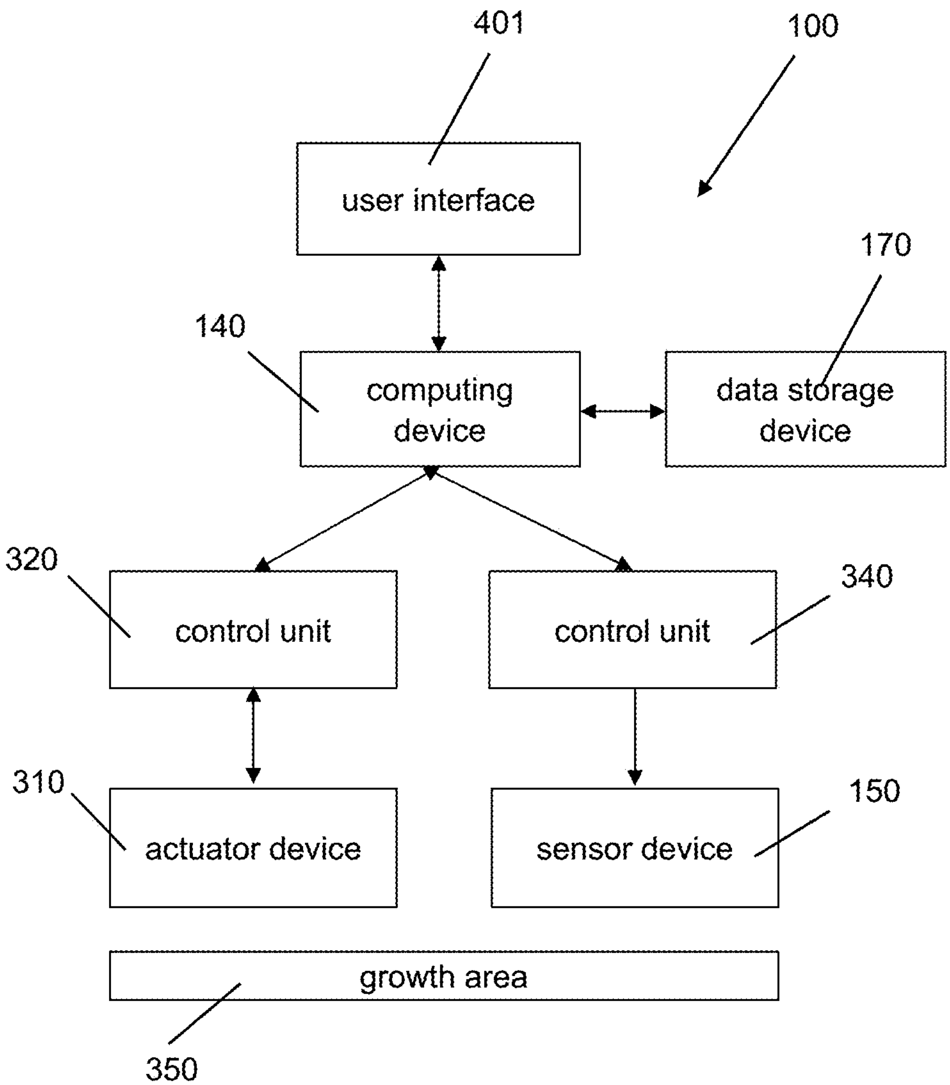
FIG. 3 shows a schematic block diagram of a controlled agricultural system according to the disclosure.

FIG. 3 shows a schematic block diagram of a controlled agricultural system 100, according to the disclosure. The controlled agricultural system 100 comprises a computing device 140, a data storage device 170, coupled to the computing device 140, an actuator device 310, coupled to the computing device 140 via a control unit 320 and a growth area 350 (see also FIG. 4).

The data storage device 170 comprises a database with data of control parameters for controlling the growth area 350. Based on the data stored in the data storage device 170, the control parameters may be adjusted by means of the actuator device 310. To this end, the computing device 140 is configured to adjust the size of the growth area 350 and the size of an illuminated area, too, see the Figures below. Furthermore, the computing device 140 is configured to control grow parameters like nutrient concentration or the lighting conditions. Therefore, the actuator device 310 may comprise various actuators for adjusting the various parameters, in particular the size of the growth area 350. Further, the Agricultural System 100 may comprise one or more light fixtures 110, as shown in FIG. 1/2 (not shown in FIG. 3).

The controlled agricultural system 100 further comprises a sensor device 150, for sensing the status of the growth of the plants (coupled to the computing device 140 e.g. via a control unit 340). The sensor device 150 may particularly comprise a camera for imaging the growth area 350 and the plants grown there. The information about the growth status of the plants or the status of the growth area 350 may be delivered to the user or customer by a user interface (UI) 401, e.g. a control terminal coupled to the computing device or a mobile device such as a smartphone or tablet including a dedicated application (i.e. app for mobile devices).

FIGS. 4A, 4B show a first possibility to design a growth area 350 adjustable in size in a top view. It is assembled from a plurality of bars 400, 401 parallel in groups, forming a criss-cross pattern. The bars 400, 401 are interconnected with each other in joints 402. The joints 402 are connected operatively with each other, forming a scissors mechanism.

At the joints 402, the growth locations 404 can be arranged, for instance pots for growing the plants. At the beginning of the growth cycle, the growth locations 404 can be arranged close to each other, as shown in FIG. 4A. When the plants grow, the size of the growth area 350 can be adjusted, as shown in FIG. 4B. As shown below, the light fixtures/the illuminated area can be adapted accordingly.

Figure 5:
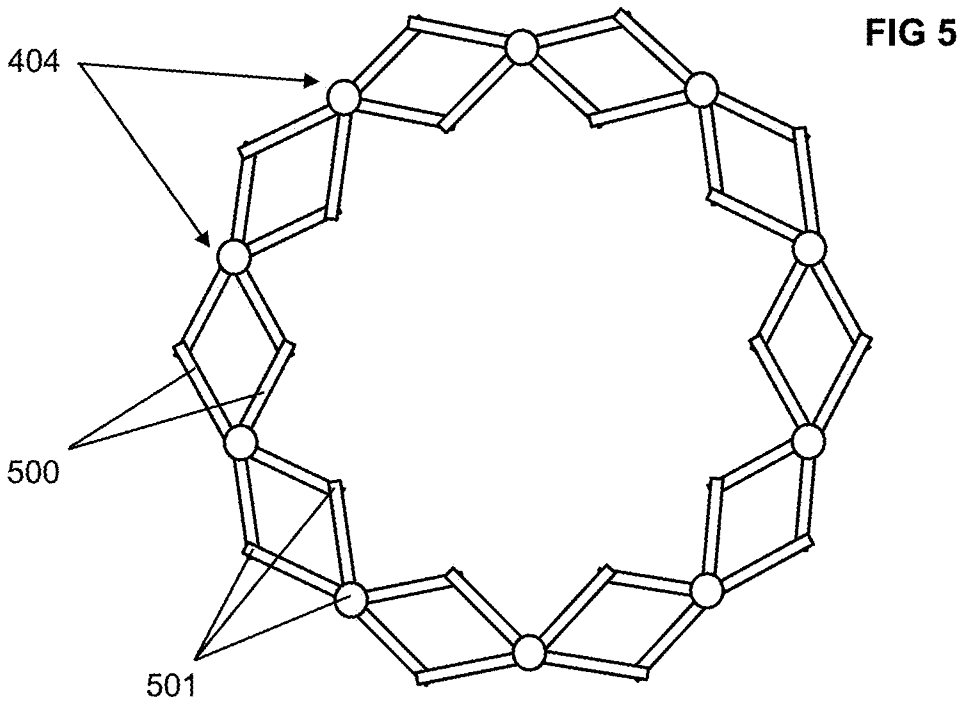
FIG. 5 shows another embodiment of a growth area.

FIG. 5 shows another possibility for providing a growth area 350 adjustable in size. The carrier is also assembled from a plurality of bars 500 interconnected in joints 501. The bars 500 form a Hoberman-ring enabling a more or less rotationally symmetrical size adjustment. In an early stage, the growth locations 404 can be arranged closer to each other, the ring can be extended at a later growth stage.

Figure 6A:
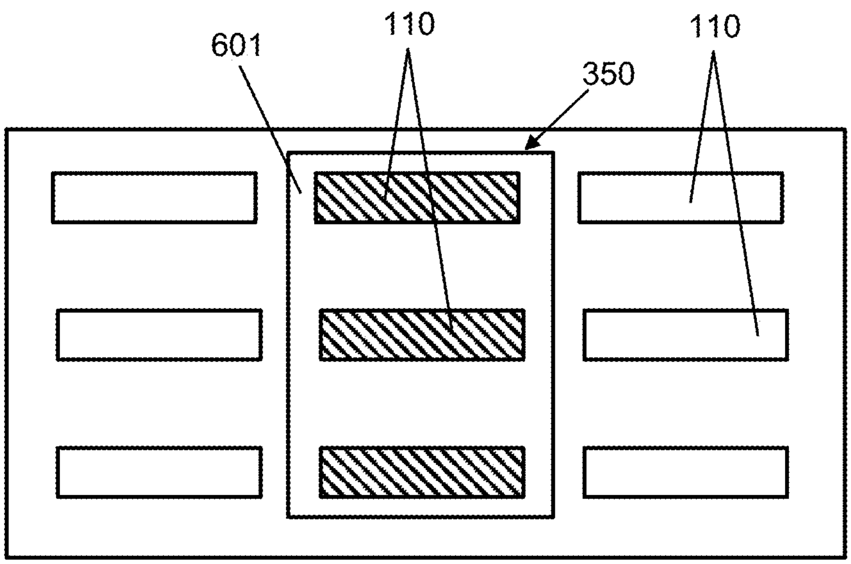
FIGS. 6A, 6B illustrate an adaption of the illumination to the growth area changing its size.
Figure 6B:
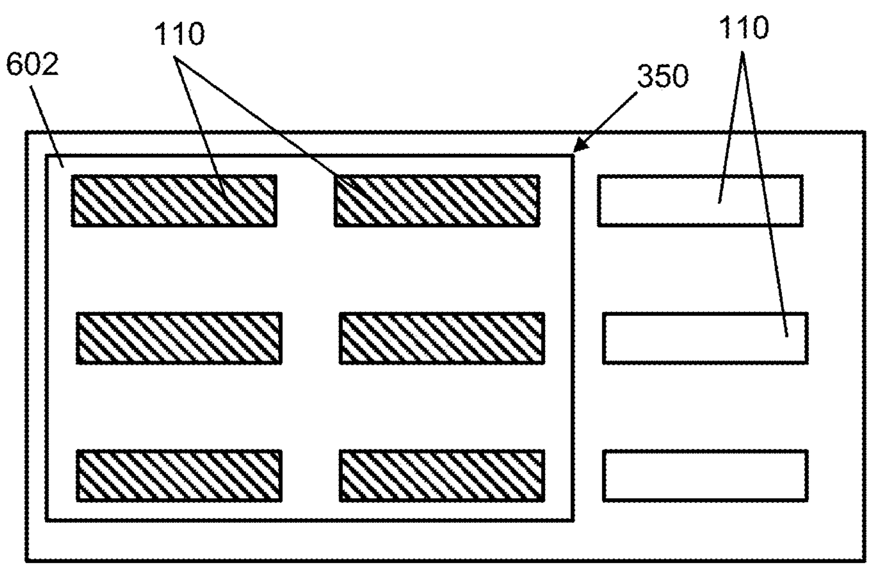

FIGS. 6A, 6B illustrate an adaption of the illumination to the growth area changing its size. In FIG. 6A, the growth area 350 is small and can be fully illuminated by three light fixtures 110. Accordingly, only the light fixtures 110 in the center are switched on (cross hatched), those at the left and at the right are switched off. The illumination area 601 is small.

In a later stage, shown in FIG. 6B, the growth area 350 is larger since the plants are bigger. Accordingly, the illumination is adapted, the light fixtures 110 on the left being switched on in addition. The illumination area 602 is larger. Later on, when the growth area 350 is larger again, the light fixtures 110 on the right can be switched on in addition.

Figure 7:
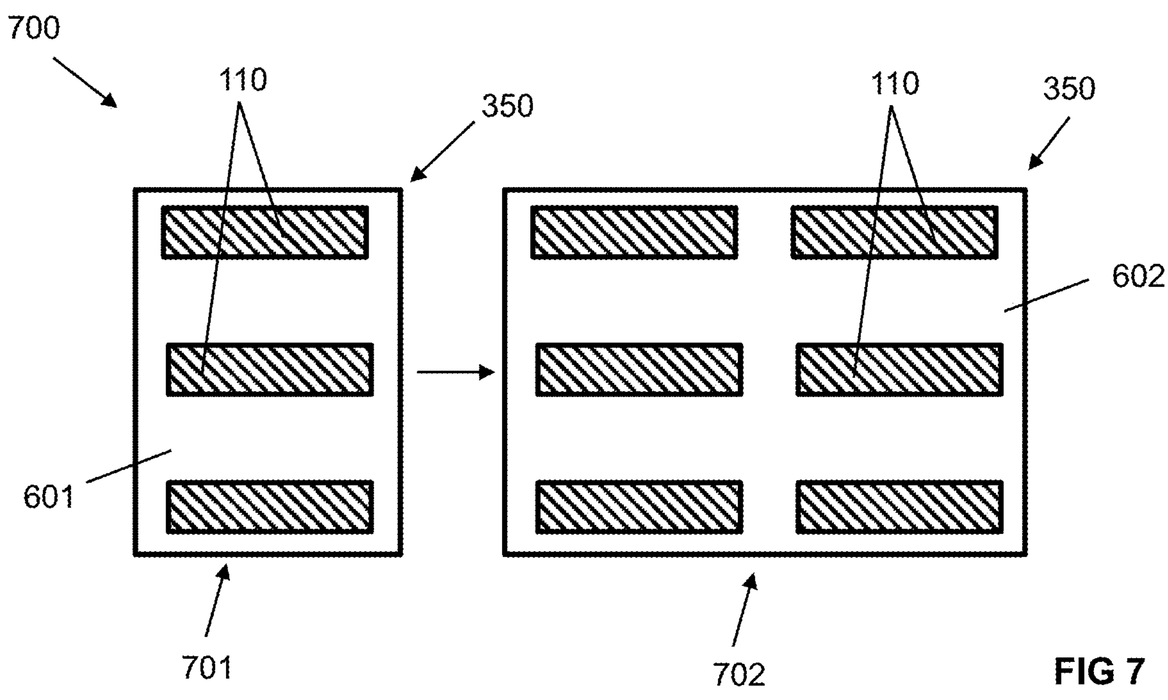
FIG. 7 shows an alternative to the embodiment of FIGS. 6A, 6B.

FIG. 7 shows an alternative to the embodiment of FIGS. 6A, 6B where the growth area 350 stays at the same location over the growth cycle. In FIG. 7, the growth area 350 is moved through the farm 700 during a growth cycle. At a first location 701, the illumination setup is adapted to a small growth area 350. When the plants grow and the size of the growth area 350 is adapted accordingly, the growth area 350 is moved to the next location 702 equipped with more light fixtures 110.

Figure 8:
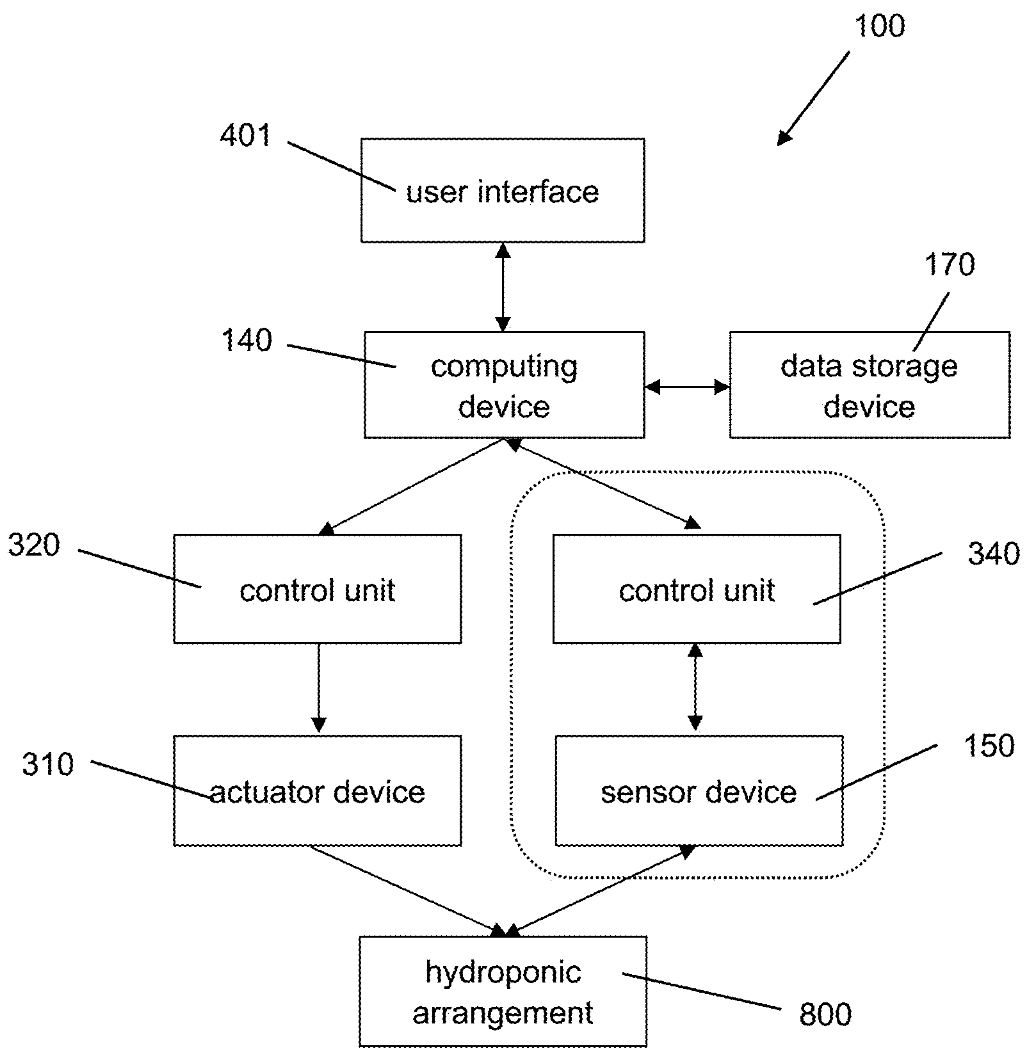
FIG. 8 shows a schematic block diagram of a controlled agricultural system according to the disclosure.

FIG. 8 shows a schematic block diagram of a controlled agricultural system 100 according to the disclosure. The controlled agricultural system 100 comprises a computing device 140, a data storage device 170, coupled to the computing device 140, an actuator device 310, coupled to the computing device 140 via a control unit 320 and a hydroponic arrangement 800 (see also FIG. 10). The data storage device 170 or even the computing device 140 may be based locally (on-site), in a network or the cloud.

The data storage device 170 comprises a database with data of control parameters for controlling the hydroponic arrangement 800. Based on the data stored in the data storage device 170, the control parameters may be adjusted by means of the actuator device 310. To this end, the computing device 140 is configured to control the water flow in the waterway of the hydroponic arrangement 800 (see also FIG. 10). Furthermore, the computing device 140 is configured to control grow parameters like nutrient concentration and illumination. Therefore, the actuator device 310 may comprise various actuators for adjusting the various parameters, e.g., water inlet, water sink, water grid, nutrient dosing feeder, light fixture, etc.

Figure 9:
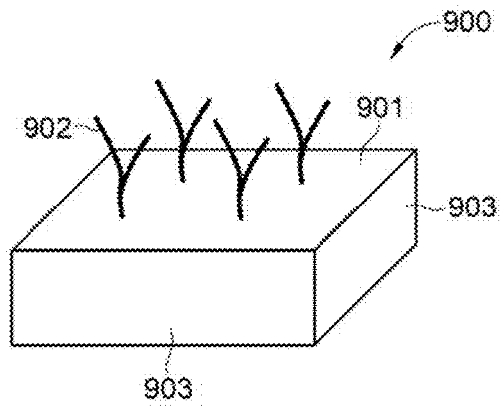
FIG. 9 schematically shows a grow field according to an embodiment of the disclosure.

Optionally, the controlled agricultural system 100 further comprises a sensor device 150, coupled to the computing device 140 via a second control unit 810 (encircled with dotted line), for sensing control parameters of the hydroponic arrangement 800, and/or monitoring the status of the growth of the plants 902 (see also FIG. 9). Therefore, the sensor device 150 may comprise various sensors for, e.g., the flow speed, the temperature, the light, the color of the plants, or cameras for imaging methods, etc. Furthermore, the computing device 140 may (re)adjust parameters of the hydroponic arrangement 800 based on the data of the sensor device 150. For example, the computing device 140 may adjust the water inlets 1030 and/or the grids 370, 371 and/or the illumination based on the growth status detected by the sensor device 150.

Furthermore, the information about the growth status of the plants 902 or the status of the hydroponic arrangement 800 may be delivered to the user or customer by a user interface (UI) 401, e.g. a control terminal coupled to the computing device or a mobile device such as a smartphone or tablet including a dedicated application (i.e. app for mobile devices).

FIG. 9 schematically shows a grow field 900 according to an embodiment of the disclosure. The grow field 900 comprises a carrier 901 and plants 902 (four plants per grow field in this example). The sides 903 of the carrier 901 are grid-like in order to let in water and hold back the grow material (not shown). As shown in FIG. 9 (and FIG. 10) the carrier 901 of the grow field 900 is formed like a raft for floating on the water without tilting over.

In an alternative embodiment, the grow field may resemble the form of a tray (or trolley) with wheels, configured for rolling on the bottom of the water tank (not shown). The tray may have grid-like sides in order to let in water and hold back the grow material.

Figure 10:
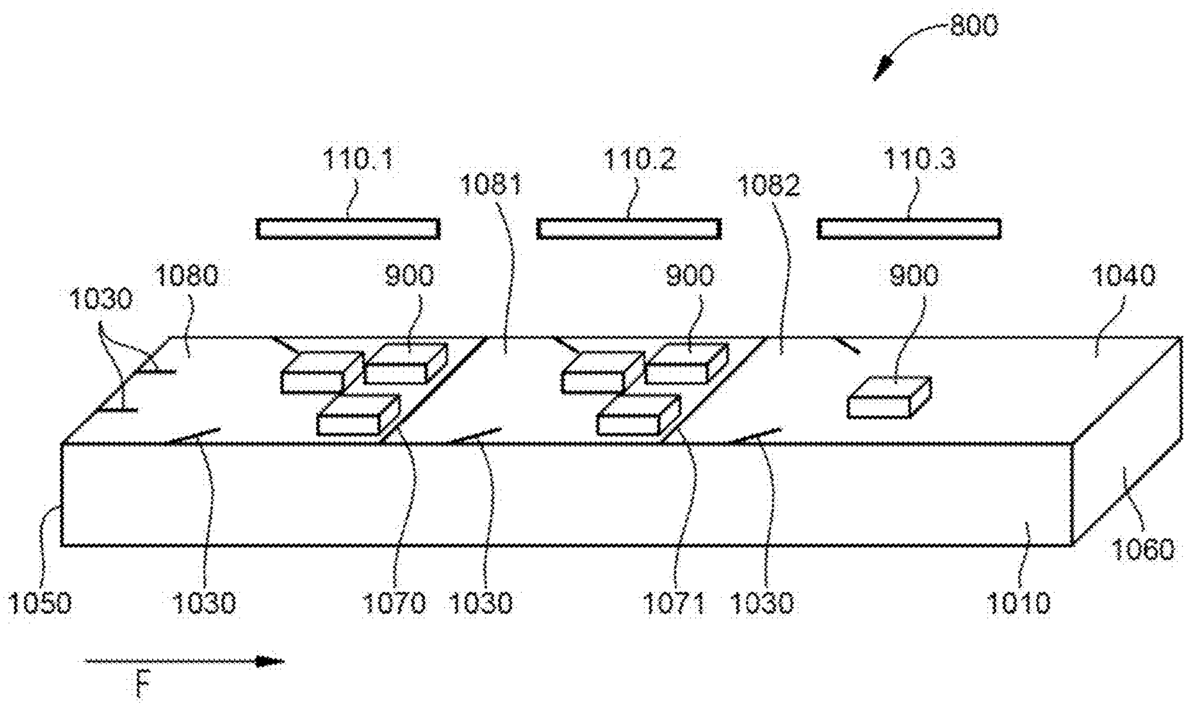
FIG. 10 schematically shows a grow field according to an embodiment of the disclosure.

FIG. 10 schematically shows a hydroponic arrangement 800 according to an embodiment of the disclosure. In addition to FIG. 9, reference is made to FIG. 10 for the following description. The hydroponic arrangement 800 comprises a water tank 1010, which provides the waterway, grow fields 900 and agricultural light fixtures 110.1-110.3. The water tank 1010 further comprises water inlets 1030 for establishing a flow on the surface 1040 of the water. The direction of the flow is indicated by the arrow F. The flow direction F defines a start 1050 and an end 1060 for the grow fields 900 floating on the surface 1040 of the water inside the water tank 1010. Furthermore, the water tank 1010 comprises grids 1070, 1071 that are able to stop the grow fields 900 from further floating with the flow of the water, without stopping the flow of the water itself. Furthermore, the grids 1070, 1071 may be arranged on the water surface 1040 in order to define two or more separate grow areas 1080-1082. Dedicated light fixtures 110.1-110.3, which may emit light with different spectra and/or intensity, may be arranged above each of the grow areas 1080-1082 supporting dedicated growth cycles. At the end of a growth cycle, the grids 1070, 1071 may be removed from the surface, for instance upwards or downwards, to enable floating of the grow fields 900 to the next grow area and eventually to the final position, e.g. end 1060, for harvesting.

The hydroponic arrangement may also comprise a sink for removing the water added by the inlets (not shown).

Figure 11:
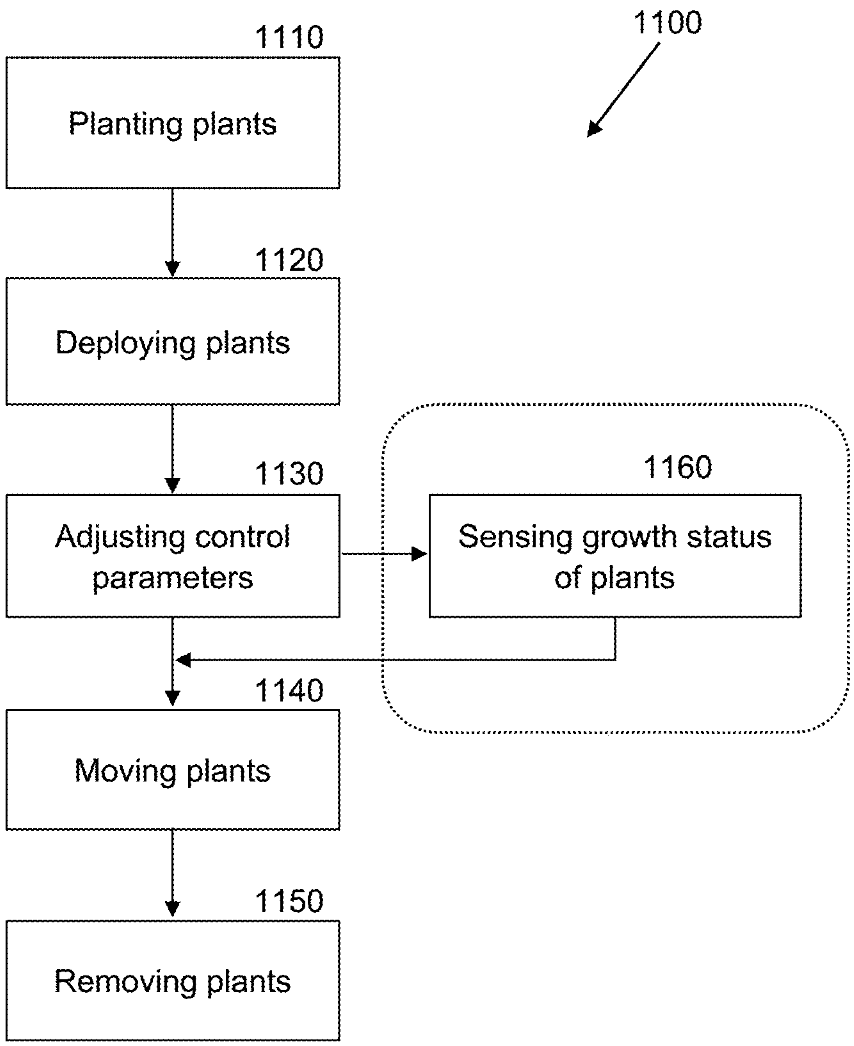
FIG. 11 schematically shows the steps of the method for agricultural management according to the disclosure.

FIG. 11 schematically shows the steps 1100 of the method for agricultural management according to the disclosure. For the following description, in addition to FIG. 11, reference is made to FIGS. 8 to 10. The method comprises the following steps:

Step 1110: Planting plants in the grow fields 900;

Step 1120: Putting the grow fields 900 at a first position 1050 on the water surface of the waterway 1010 of the hydroponic arrangement 1000;

Step 1130: Adjusting the control parameters of the hydroponic arrangement by means of the actuator device 310 and based on respective data of the parameters retrieved from the data storage device 170, with the goal that the plants are ready for harvest when they arrive at the end 1060;

Step 1140: Moving the grow fields 900 on the water surface from the first position 1050 downstream to the end 1060 of the waterway 1010;

Step 1150: removing the grow fields 900 from the water surface at the end 1060 of the waterway 1010.

In step 1120, the first position and the end position may be the start or end of the waterway (as indicated in FIG. 10), respectively, or any other two locations in between separated from each other by a distance suitable for the growth and/or ripening time of the plants. In some embodiments/implementations, the distance and/or moving speed of the grow fields may be adapted to respective plant species.

In step 1130, control parameters of the hydroponic arrangement may comprise, for example, water flow, illumination (intensity, spectrum), controlling of the grids, concentration of nutrients in the water of the waterway, temperature of the water and/or ambient air.

In step 1140, moving of the grow fields 900 may be performed by floating on the water due to water flow or any other means that enable moving on the water surface, e.g. rolling along the ground of the waterway by means of a trolley carrying the grow fields. The grow fields 900 may continuously float from the start (first position) to the final position. The grow fields 900 may also be stopped at least once for some time, e.g. until a growth cycle is finished. During a growth cycle the grow parameter, e.g. plant illumination, nutrient concentration, temperature, may be specifically adapted.

In step 1150, the grow fields may be removed automatically from the water when they arrive at the final position by means of a suitable actuator. Furthermore, fruits may also be harvested automatically. Finally, the computing system may be configured to inform the user of the controlled agricultural system and/or a third party about the finished growth of the plants or ripening of the fruits.

Optionally, the method may comprise the additional step 1160 (marked with dotted line):

Sensing the growth status of the plants by means of the sensor device 150. Furthermore, the parameters of the hydroponic arrangement 800 may be readjusted according to the sensed growth parameter.

The growth parameters sensed may comprise the size, shape and color of the plants including their flowers, buds or fruits.

Furthermore, the computing system may be configured to inform the user of the controlled agricultural system and/or a third party about the sensed growth status.

Figure 12:
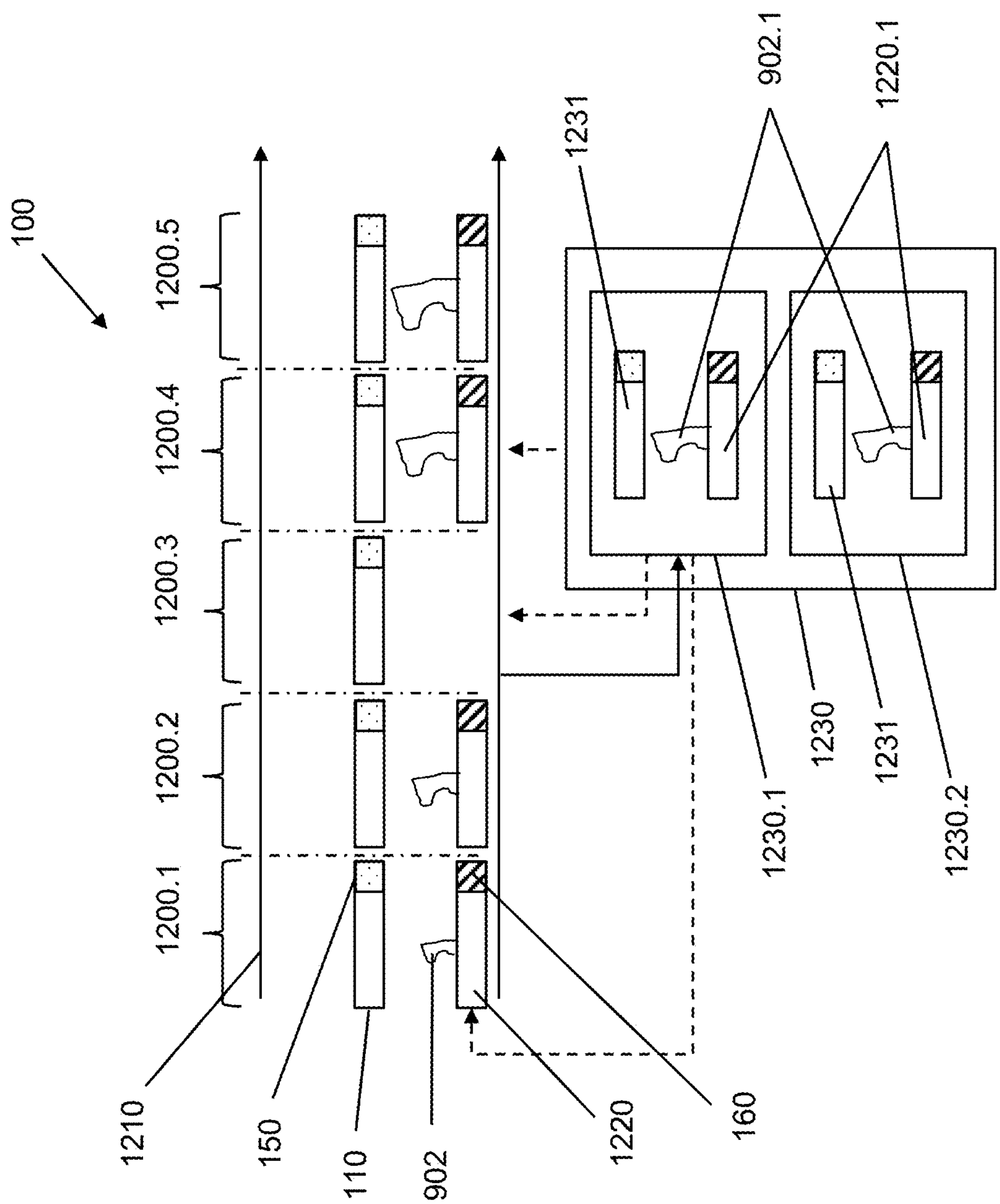
FIG. 12 schematically shows a controlled agricultural system according to the disclosure.

FIG. 12 shows a controlled agricultural system 100 according to the disclosure. It comprises a plurality of growth zones 1200 connected with each other along a processing line 1210. Trays 1220 can be fed to the processing line 1210, beginning with the first growth zone 1200.1 thereof. As the trays 1220 pass the growth zones 1200.1-1200.5 one after the other, plants 902 grown in the trays 1220 grow successively. In each growth zone 1200.1-1200.5, the growth conditions are adapted to a specific growth stage, for instance in terms of temperature, nutrition, humidity or the like.

In particular, a specific lighting can be applied at each of the growth zones 1200, namely a specific light recipe. Each growth zone 1200 is equipped with a light fixture 110, each of them having a plurality of LED light sources (not shown). Each of the light fixtures 110 is equipped with a sensor device 150, in this case a camera imaging the respective tray 1220. Further, each tray 1220 is equipped with a sensor device 160, comprising a light sensor and a temperature sensor in this case. With this setup, growth data of the plants 902 can be captured.

Additionally, the agricultural system 100 comprises a treatment location 1230. Some of the trays 1220 moved along the processing line 1210 are unloaded from the processing line 1210 to the treatment location 1230. For instance, the sensor devices 150, 160 can detect a deviation from a target value, for example regarding the size of the plants 902 or any other parameter, see the description above in detail. The trays 1220.1 unloaded to the treatment location, namely the plants 902.1 growing in these trays 1220.1, can be subjected to a specific treatment, for instance in term of lighting, temperature, gas absorption or the like, see the description above.

In the example shown here, the treatment location 1230 is divided into two subregions 1230.1, 1230.2. In the subregions 1230.1, 1230.2, different treatment conditions can be applied. Each subregion 1230.1, 1230.2 is equipped with a light fixture 1231 comparable to the growth zones 1200.

After unloading the trays 1220.1 from the processing line 1210 and treating the plants 902.1 in the treatment location 1230, the trays 1220.1 can be reloaded to the processing line 1210, either to the first growth zone 1200.1 (hatched line to the left) or to the growth zone 1200.3 (hatched line in the middle).

Figure 13:
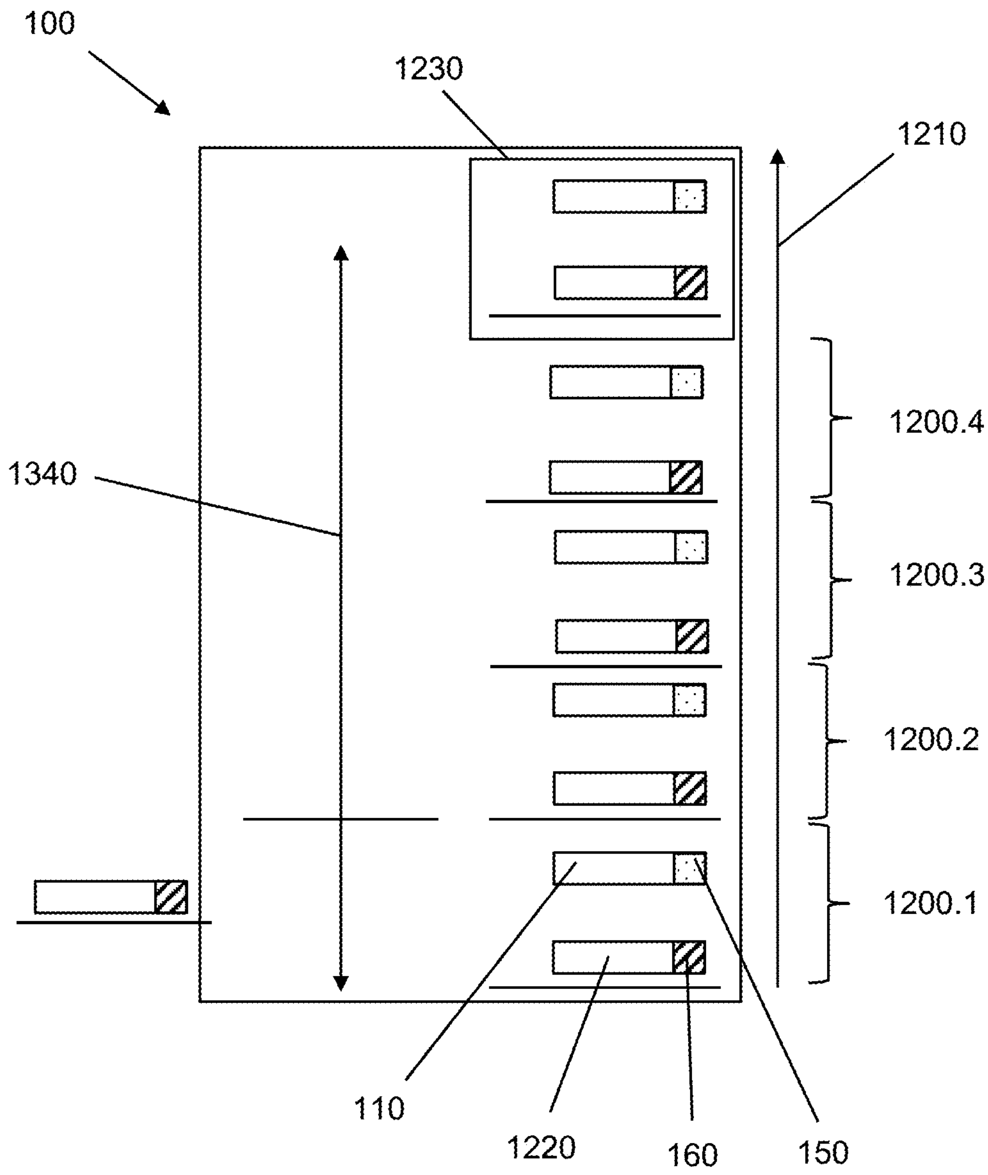
FIG. 13 shows a vertical setup of growth zones in a vertical farm.

FIG. 13 shows a vertical setup, the growth zones 1200.1-1200.4 are arranged one above the other in a vertical farm. For moving the trays 1220 from one growth zone 1200 to the following one, an elevator 1340 is provided. Further, a treatment location 1230 is provided above the growth zones 1200. In case that a deviation is detected by the sensor devices 150, 160, the respective tray 1220 is unloaded from the processing line 1210 to the treatment location 1230, see the description above.

Figure 14:
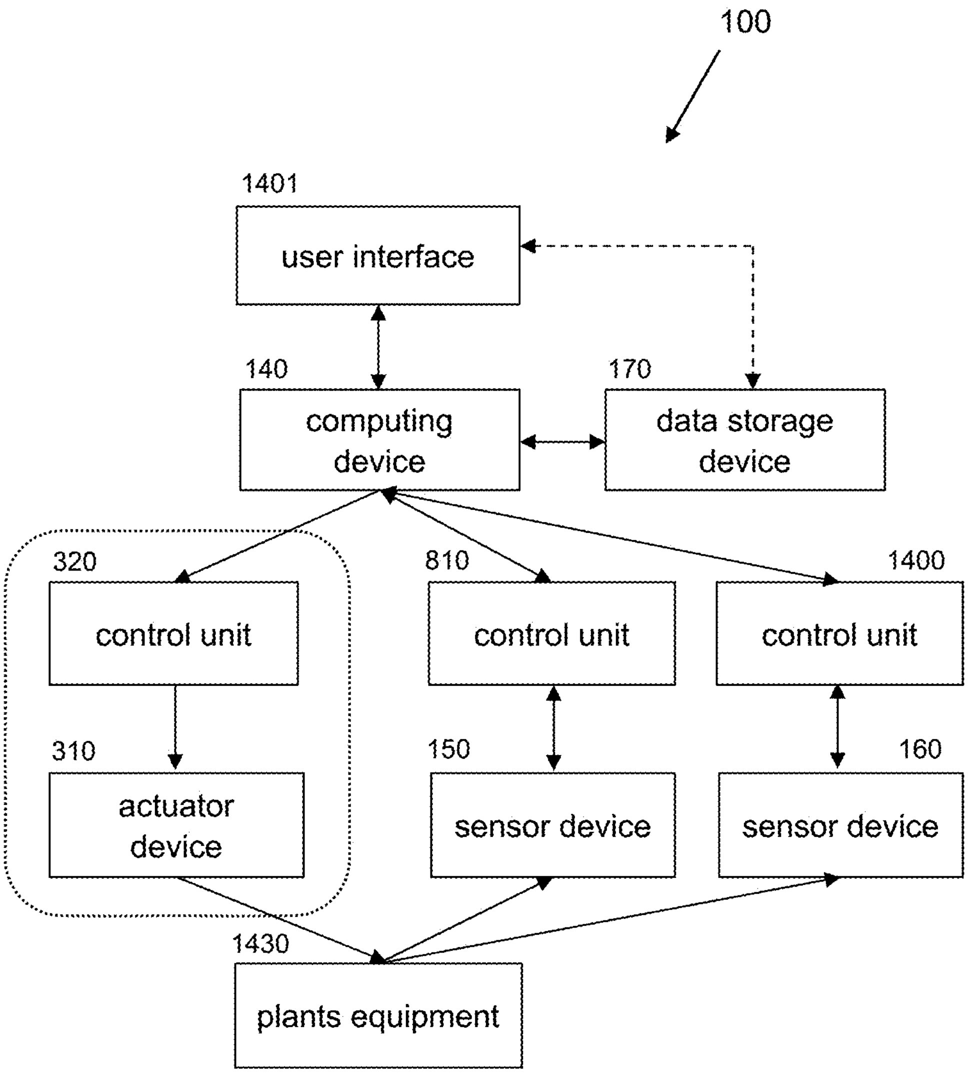
FIG. 14 shows a schematic block diagram of a controlled agricultural system for a plant growing facility, according to the disclosure.

FIG. 14 shows a schematic block diagram of a controlled agricultural system 100 for a plant growing facility (not shown), according to the disclosure. The controlled agricultural system 100 comprises a user interface 401 for exchanging information between a user and the controlled agricultural system 100, a computing device 140, a data storage device 170, coupled to the computing device 140 and a first sensor device 150, coupled to the computing device 140 via a first control unit 810, and a second sensor device 160, coupled to the computing device 140 via a second control unit 1400. The numeral 1430 designates the plants equipment.

Figure 16:
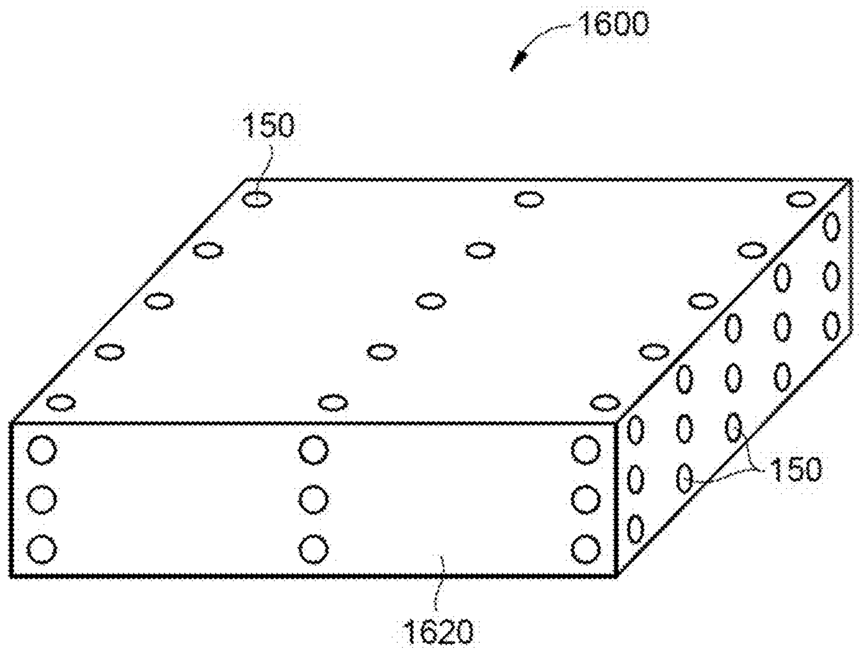
FIG. 16 schematically shows an example for a setting of sensors in a greenhouse.

Each of the sensor devices 150, 160 may comprise a group of specific sensors that may be positioned at various locations of the plant growing facility. Two sensor devices 150, 160 are shown in FIG. 16 for exemplary reasons only. The controlled agricultural system 100 may also comprise only one sensor device or more than two sensor devices, i.e. three or many (sensor device system).

The sensor devices may comprise ambient sensors measuring temperature, humidity, leaf temperature, VPD (vapor pressure deficit), substrate moisture, substrate temperature, EC and pH-value, air and water velocity, PAR but also camera imaging solutions, including hyper-imaging solutions, sensors for chemical analysis, sensors for spectroscopy and reflectivity of electromagnetic radiation, Doppler (sound and ultrasound) sensors for plant movement measurement, Lidar sensors for measurement of plant morphology, sensors for measuring photoacoustic effects inside a plant leaf. For instance, each sensor of one group of sensors (e.g. sensor device 150) may be able to measure temperature and humidity. The sensors of another group of sensors (e.g. sensor device 160) may be cameras for taking images of the plants.

In an advantageous refinement of the disclosure, the controlled agricultural system 100 further comprises an actuator device 310, coupled to the computing device 140 via a dedicated control unit 320 (encircled with dotted line).

The data storage device 170 or even the computing device 140 may be based locally (on-site), in a (centralized) network or the cloud. Furthermore, the data storage device 170 may also be integrated into the computing device 140 or network/cloud based. The data storage device 170 may include a (digital/online-) platform, e.g. located in the cloud. The platform may also be accessible by mobile devices, e.g. laptop PC, tablet PC or smartphones via dedicated apps. Therefore, a user (grower/operator of the controlled agricultural system) may access the platform via the computing device 140 or a separate device (not shown). Furthermore, the platform may comprise dashboards customized to various user groups such as growers and customers.

In the data storage device 170, data about the plant growing facility (e.g. layout, size, placement of lighting fixtures, actuators, etc.) and the sensor devices 150, 160 (e.g. types of sensors in the groups, number of sensors per group, etc.) are stored. The data may be entered via the user interface 401 or uploaded otherwise.

The computing device 140 is configured to access and control the sensor device system 150, 160 and the data storage device/platform 170.

Furthermore, the computing device, is configured to manage the positioning and re-positioning of the sensors of the sensor devices 150, 160 for monitoring the plant growth and, optionally, the status of the plant growth facility (e.g. for the maintenance of the equipment used in the plant growth facility) based on the data stored in the data storage device/platform 170. Managing the (re-)positioning of the sensors may comprise suggesting a pattern for positioning the sensors.

Figure 15:
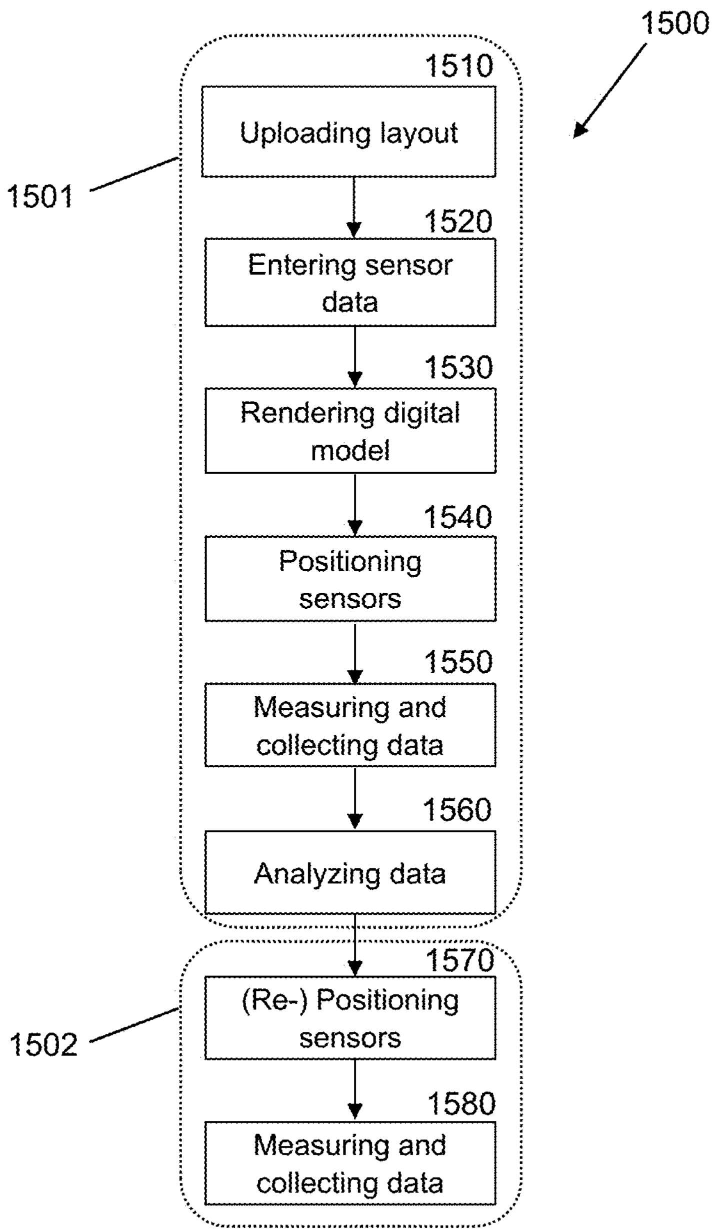
FIG. 15 schematically shows the steps of a method for agricultural management according to the disclosure.

FIG. 15 schematically shows the steps 1500 of a method for agricultural management according to the disclosure. The method aims to evaluate and suggest the positioning of sensors for monitoring the growth status of plants in a plant growing facility. For the following description, in addition to FIG. 15, reference is made to FIG. 14. The method comprises the following steps:

Initial/Reconfiguration Setup Phase 1501

Step 1510: Uploading the layout of the plant growth facility into the data storage device 170;

Step 1520: Entering data of the available sensors of the sensor device system 150, 160 into the data storage device 170; the data including type, position and orientation of the individual sensors, Step 1530: Rendering a digital model of the plant growing facility (digital facility twin) including indicating the positions and orientations of the available sensors by means of the computing device 140 based on the data input of steps 1510 and 1520;

Step 1540: Positioning the sensors in the real plant growing facility according to the positioning (and orientation) suggested in the model;

Step 1550: Measuring and collecting data by means of the sensors;

Step 1560: Analyzing the data measured and collected during step 1550 and suggesting an operating phase setup for the sensors by means of the computing device 140;

Operating Setup Phase 1502

Step 1570: (Re-) Positioning the sensors according to the operating phase setup suggested in step 1560;

Step 1580: Measuring and collecting data by means of the sensors.

The steps 1510 to 1560 of the initial/reconfiguration setup phase 1501 may be repeated, at least in part, in case of changes to the plant growing facility (reconfiguration), e.g. resizing of growing space, changing the equipment, level of plant maturity, and/or in case of changes to the cultivated plant variety.

The step 1520 may comprise the number and types of the available sensors. The data may be entered via a user interface 401, e.g. a dashboard, or automatically, e.g. wirelessly.

As an alternative to the steps 1530 and 1540, the sensors may be positioned according to similar facility setups stored in the data storage device 170 (database/platform).

The steps 1530 to 1560 may be conducted section-wise if the number of available sensors is insufficient to adequately cover the whole facility in only one measurement run.

In the steps 1560 to 1570, the setup/positioning of the sensors for the operating phase may be the same as for the initial/reconfiguration phase or modified. The step 1560 may comprise different sensor setups for different seasons. It may also comprise the supplemental steps of indicating missing sensors or how additional sensors could help to accelerate, improve, or optimize the growth process. Furthermore, it may comprise guidance for correctly installing and using different sensors.

In the step 1570, the sensors may be installed permanently, at least for the duration of a growth phase. However, the sensors may as well be adapted to changing conditions, e.g. the position and/or orientation of a sensor may be adapted to the growing plants. The step 1570 may comprise using mobile devices like drones, robots or humans equipped with sensors for temporary measurements. For example, a mobile device equipped with a camera may help to clarify whether the measured high humidity has already caused fungi growth in the area affected by high humidity. Such timely clarification may help to prevent the spread of diseases or pests.

The step 1580 may comprise a visual/graphical representation of the measured and collected sensor data for monitoring the growth status of the plants and/or the equipment of the facility, e.g. by using the digital model of the facility according to step 1580.

FIG. 16 schematically shows an example 1600 for a setting of sensors 1610 in a greenhouse 1620 (plant growing facility, e.g. tomato greenhouse). The pattern for positioning the sensors 150 correlates with relevant measuring points for measuring the leaf temperature of tomato plants.

Figure 17:
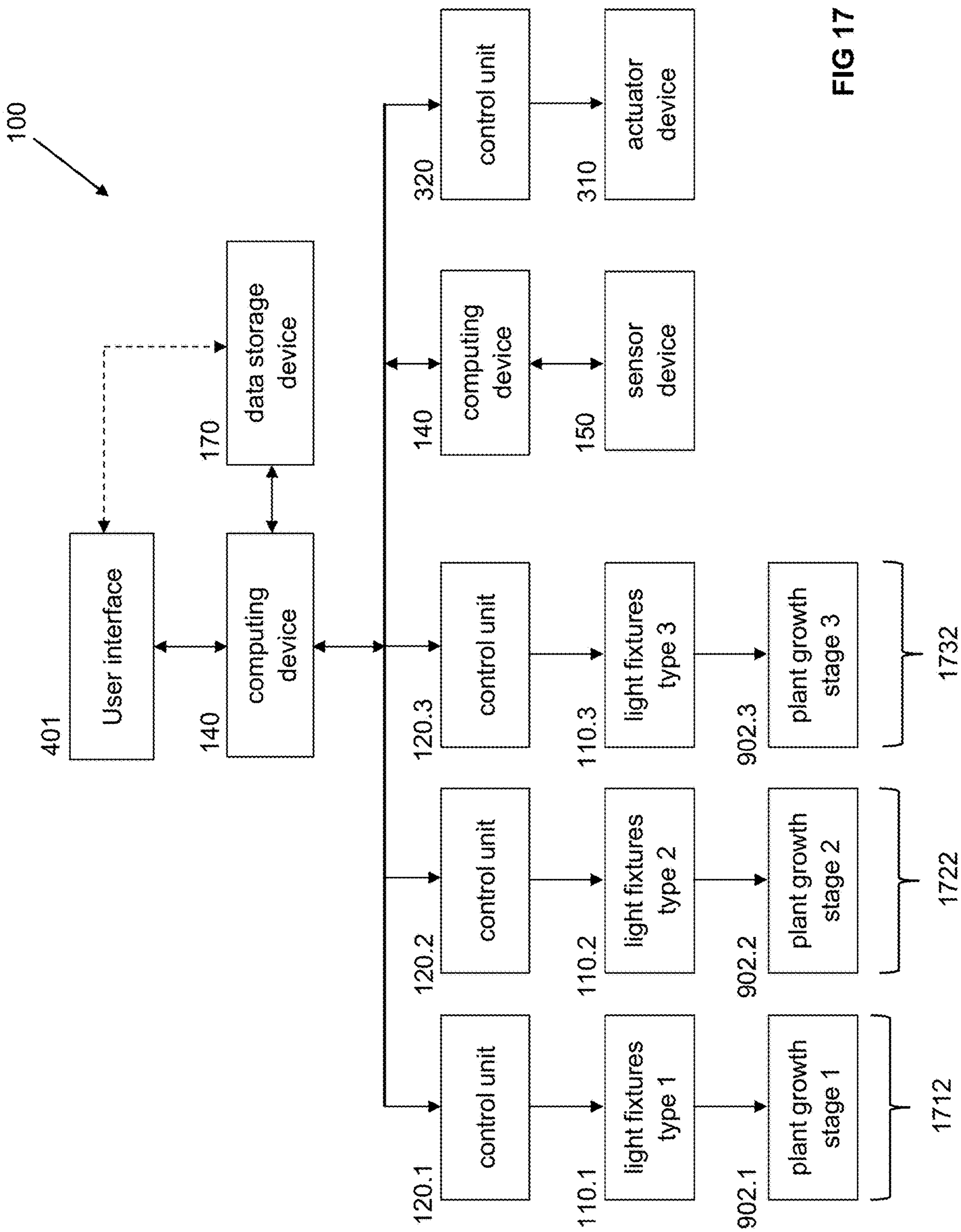
FIG. 17 shows a schematic block diagram of a controlled agricultural system, according to the disclosure.

FIG. 17 shows a schematic block diagram of a controlled agricultural system 100, according to the disclosure. The controlled agricultural system 100 comprises a computing device 140, a data storage device 170, coupled to the computing device 140, three groups of agricultural light fixtures 110.1-110.3 coupled to the computing device 140 via respective control units 120.1-120.3 a sensor device 150, coupled to the computing device 140 via a control unit 140 and an actuator device 310, coupled to the computing device 140 via another control unit 320. The numerals 902.1-902.3 designate plants in different phases or growth stages.

The data storage device 170 or even the computing device 140 may be based locally (on-site) or in a (centralized) network or the cloud. Furthermore, the data storage device 170 may also be integrated into the computing device 140. The data storage device 170 may include a (digital/online-) platform, e.g. located in the cloud. The platform may also be accessible by mobile devices, e.g. laptop PC, tablet PC or smartphones via dedicated apps. For a user, a user interface 401 to access the platform via the computing device 140 or a separate device (not shown) is provided. Furthermore, the platform may comprise dashboards customized to various user groups such as growers and customers.

The data storage device 170 comprises a database in which growth settings, including light recipes, for various plants species, growth stages, dwell times, On-Off-cycle, and the like, are stored. The database may also comprise the specifications and features of various agricultural lighting fixtures, including lighting fixture-related and lighting fixture-plant related data sets. Furthermore, the database may comprise data documenting previous plant projects, e.g. from other growers using the same platform. The data storage device 170 may also comprise software programs, particularly the light recipe design tool (LRDT), which can be uploaded into and executed by the computing device 140.

The sensor device 150 may comprise sensors for monitoring and detecting the growth status of the plants, e.g. one or more cameras, or one or more thermos sensors.

The actuator device 310 may comprise means for moving the plants inside the agricultural facility according to the workflow, for example a motor driving a conveyor belt.

The computing device 140 is configured to control the groups of agricultural light fixtures 110.1, 110.2, 110.3 and the actuator device 310 based on the data stored in the data storage device 170.

Furthermore, the computing device 140 is configured to analyze the data from the sensor device 150, thereby monitoring the growth status of the plants, and, particularly, detecting various growth phases.

In some embodiments/implementations, the computing device 140 is configured by uploading and executing the LRDT software program.

In an exemplary embodiment of the disclosure, each of the three groups of agricultural light fixtures 110.1, 110.2, 110.3 is dedicated to a different growth phase 1712, 1722, 1732. In other words, the first group 110.1 is dedicated to the first growth phase 1712, the second group 110.2 is dedicated to the second growth phase 1722, and the third group 110.3 is dedicated to the third growth phase 1722. The controlled agricultural system 100 may comprise less than three groups of dedicated agricultural light fixtures or more than three groups, depending on the number of dedicated growth phases. For more details of the present embodiment, reference is now made to FIG. 18.

Figure 18:
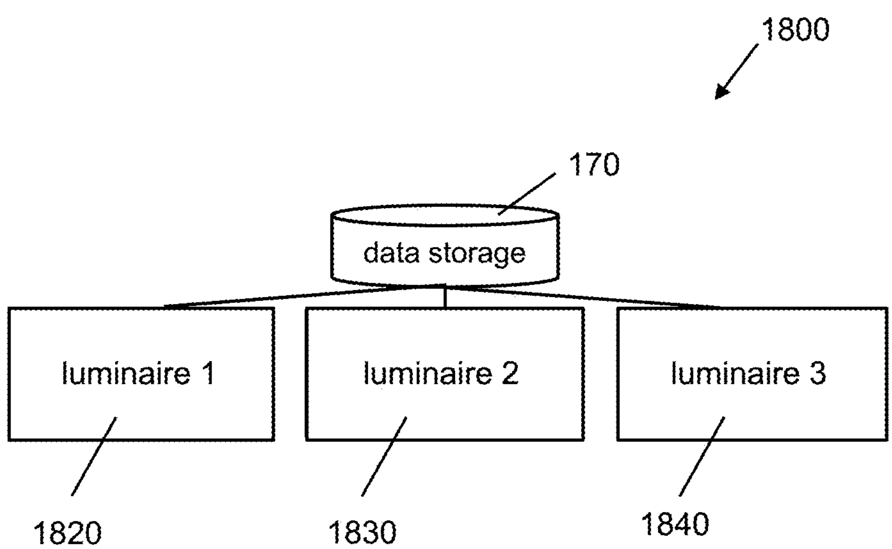
FIG. 18 schematically shows an exemplary illumination setup, according to the disclosure.

FIG. 18 schematically shows an exemplary illumination setup 1800, according to the disclosure. A first group 1820 of agricultural light fixtures comprises the luminaire type SPYDR (LED Grow Light) of the company Fluence Bioengineering, Inc. This type delivers a light intensity of up to 250 μmol/m²/s and a specific spectrum (PhysioSpec). A second group 1830 of agricultural light fixtures comprises the luminaire type VYPR (LED Grow Light; Fluence Bioengineering, Inc.). This type delivers a light intensity of up to 300 μmol/m²/s and a specific spectrum (PhysioSpec Indoor), too. A third group 1840 of agricultural light fixtures comprises the luminaire type VYPRxPlus (LED Grow Light; Fluence Bioengineering, Inc.). This type delivers a light intensity of up to 320 μmol/m²/s and another specific spectrum (AnthoSpec). The fixture-related data sets as well as the dynamic light recipes for controlling each group 1820, 1830, 1840 of agricultural light fixtures are stored in the data storage device 170. Each group 1820, 1830, 1840 is arranged above a dedicated cultivating zone. Each zone corresponds to a different growth phase.

To summarize the conditions in the zones:

Zone 1 (group 1820):
- Luminaire Type: SPYDR
- Intensity: 250 μmol/m²/s
- Spectrum: PhysioSpec
- Dwell Time: 21 days Zone 2 (group 1830):
- Luminaire Type: VYPR
- Intensity: 300 μmol/m²/s
- Spectrum: PhysioSpec Indoor
- Dwell Time: 21 days Zone 3 (group 1840):
- Luminaire Type: VYPRxPlus
- Intensity: 320 μmol/m²/s
- Spectrum: AntoSpec
- Dwell Time: 21 days For more details of the setup of the agricultural facility and the workflow, reference is now made to FIG. 19.

Figure 19:
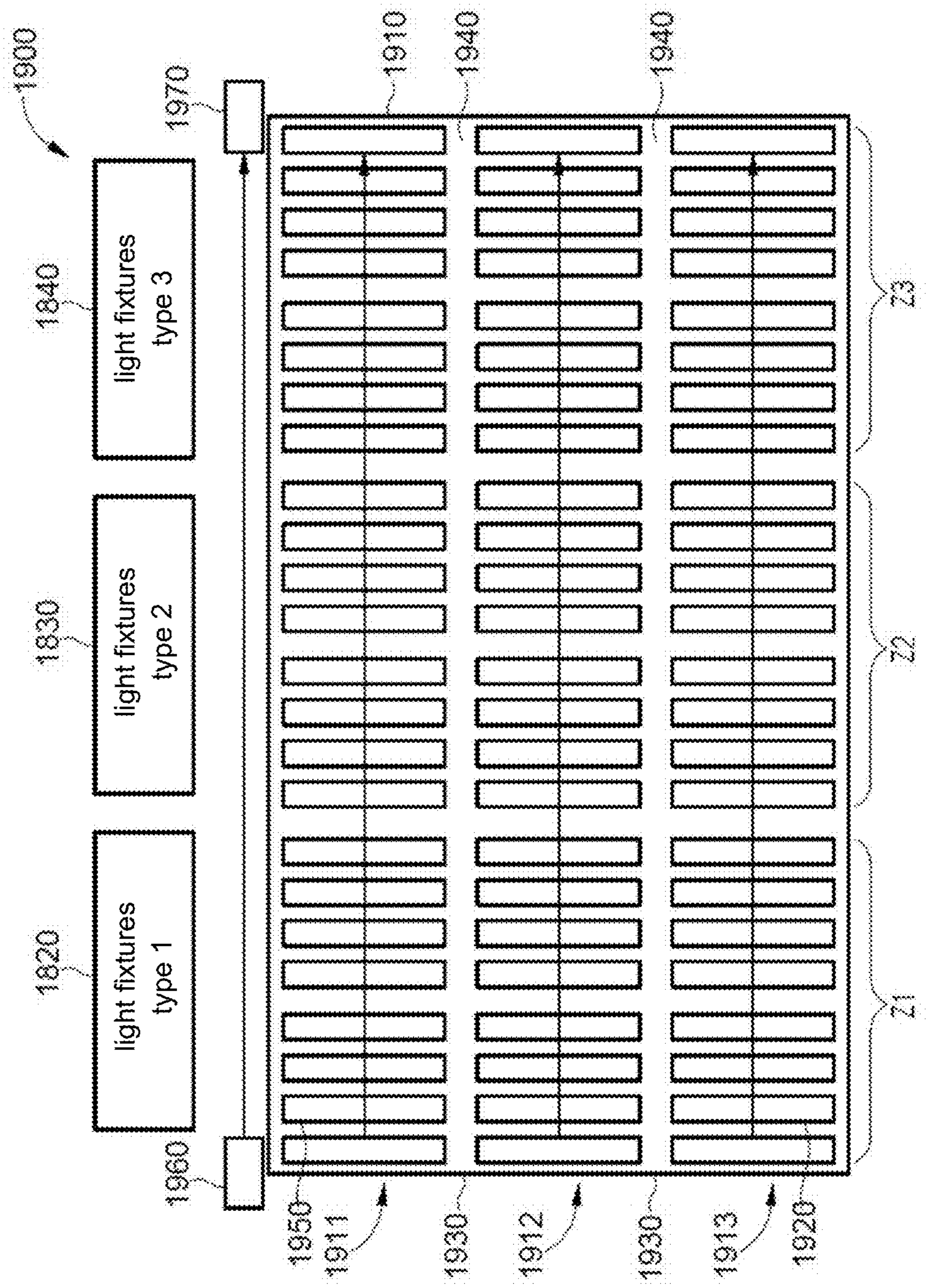
FIG. 19 shows a schematic block diagram of an agricultural facility according to an embodiment of a controlled agricultural system.

FIG. 19 shows a schematic block diagram of an agricultural facility 1900 according to an embodiment of a controlled agricultural system. The cultivated area 1910 of the agricultural facility 1900 comprises three rows 1911, 1912, 1913 (plant production lines) of plant units 1920. The plant units 1920 comprise plants and a carrier (not shown), in which the plants are arranged. The carriers may be movable trays, tables, trolleys, etc. The plant units 1920 are moved along the plant production lines 1911, 1912, 1913, e.g. by means such as a conveyor belt, from start 1960 (day 1) to end 1970 (e.g. day 63), i.e. in FIG. 19 from left to right (see arrows 1950), during the growth of the plants, thereby defining the direction 1950 of the workflow/crop (plant) flow.

The three rows 1911, 1912, 1913 are separated by two main corridors 1940, which are accessible via entrance doors 1930. Furthermore, each row 1911, 1912, 1913 is grouped into three zone Z1, Z2, Z3 along the workflow 1950. In the first zone Z1 the plants are illuminated with agricultural light fixtures of the first group 1820. In the second zone Z2 the plants are illuminated with agricultural light fixtures of the second group 1830. In the third zone Z3 the plants are illuminated with agricultural light fixtures of the third group 1840. The dwell time for the plants in each zone is 21 days, which sums up to a total of 63 days from start 1960 to end 1970.

In some embodiments/implementations, the setup of the agricultural facility 1900 is designed by means of the method for agricultural management according to the disclosure, in some embodiments/implementations aided by the computing device 140 executing the LRDT software program.

Figure 20:
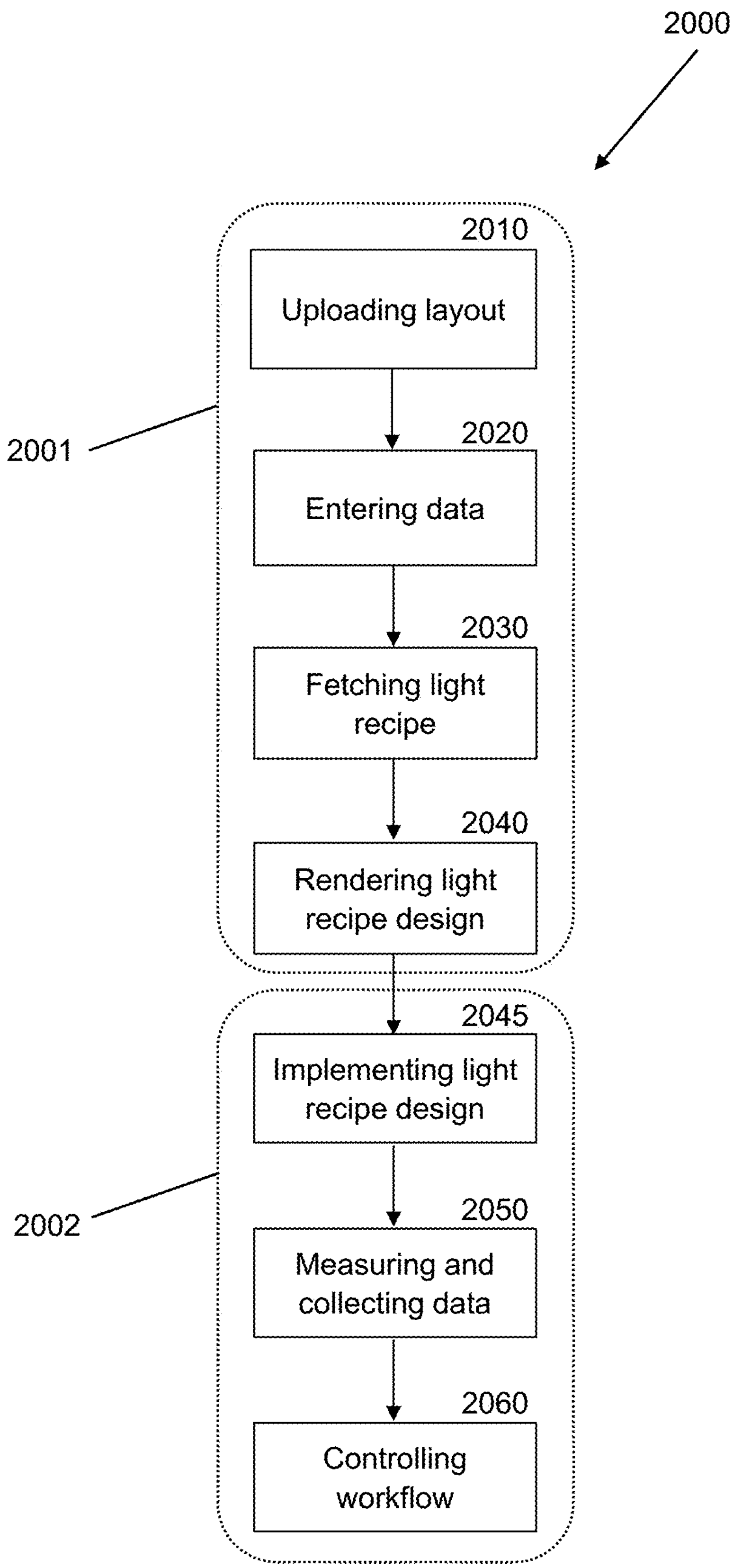
FIG. 20 schematically shows the steps of a method for agricultural management according to the disclosure.

FIG. 20 schematically shows the steps 2000 of a method for agricultural management according to the disclosure. The method aims to evaluate and suggest the setup of an agricultural/horticultural facility 1900 (or a part of such a facility), based on the plant species and the layout of the facility 1900. For the following description, in addition to FIG. 20, reference is made to FIGS. 17 to 19. The method comprises the following steps:

Initial/Reconfiguration Setup Phase 2001
- Step 2010: Uploading the layout of the agricultural facility 2000 and the workflow into the data storage device 170;
- Step 2020: Entering data of user demand (e.g. plant species) into the data storage device 170;
- Step 2030: Fetching a light recipe appropriate for the user demand, including the lighting fixture-related and lighting fixture-plant related data sets from the database stored on the data storage device 170;
- Step 2040: Rendering a light recipe design (LRD) by proposing a setup of the facility 1900 including its equipment (lighting fixtures, actuators, sensors, etc.), which setup is adapted to the fetched light recipe and the workflow, by means of the computing device 140 based on the data of steps 2010 to 2030;

Operating Setup Phase 2002
- Step 2045: Implementing the light recipe design (LRD) in the facility 1900;
- Step 2050: Measuring and collecting data by means of the sensor device 150;
- Step 2060: Controlling the workflow in the facility 1900 by means of the actuator device 310 and the computing device 140 based on the LRD and the data of step 2050.

In the steps 2010 to 2040, the computing device 140 is configured by uploading and running the light recipe design tool (LRDT).

The step 2010 may comprise upload of layouts or pictures, grouping of zones/production stages, insert of dwell (delay or rest)) times, available equipment like sensors, actuators, lighting fixtures, etc.

In the step 2020, the user demand may comprise biomass, post-harvesting treatment, environmental conditions, etc.

In the step 2030, the LRD may cover the entire plant treatment time for the grower's facility, taking into account the size of the facility, the size of the plants in each growth stage (growth phase), the time the plants remain in each grow stage, the number of grow stages and the like.

The step 2040 may comprise indicating the space required for each grow stage and where to put lighting fixtures, which types of lighting fixtures and the respective configuration (spectrum, intensity), as well as the appropriate velocity (or stand-still time) of plants.

Step 2045 may comprise setting up the facility 1900 according to the LRD, including allocating the space required for each grow stage/phase, arranging the lighting fixtures with proper configuration (spectrum, intensity, On-Off-cycles), respectively, dwell times of the plants in the respective zones, etc.

Step 2050 may comprise detecting the growth status of the plants, which may be used to adapt the timing for moving the plants 1920. Particularly, a change in the growth phase, which may trigger moving the respective plants to the next zone or eventually harvesting. Alternatively, the plants may be moved according to a fixed, pre-defined schedule, which may obviate the need for sensing the growth status of the plants and, hence, step 2050. The schedule for moving the plant units 1920 may be stored in the data storage device 170.

Step 2060 may comprise moving plants along the workflow, i.e. within a zone or even from one zone into the next zone. Step 2060 may further comprise controlling the lighting fixtures 110.1, 110.2, 110.3 according to the respective light recipe design (LRD). Step 2060 may further comprise additional measures, particularly for influencing environmental/growth parameters such as temperature, irrigation, ventilation, fertilization, etc.

Plant Health/Growth

Figure 21:
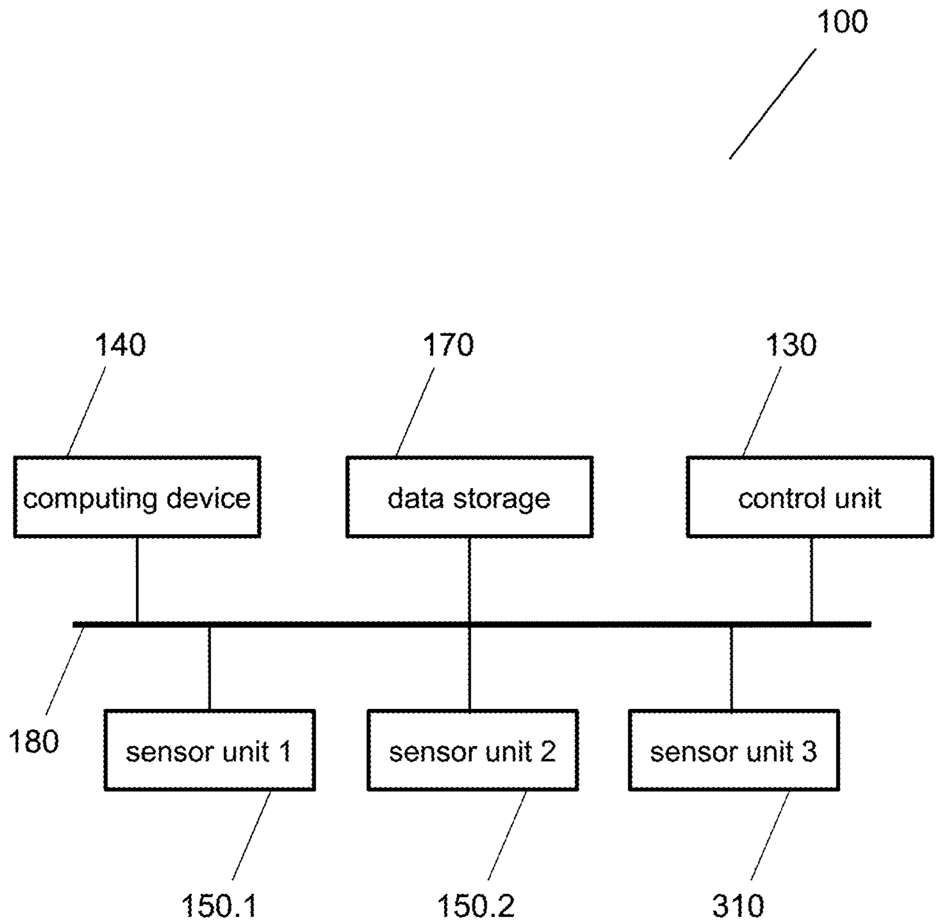
FIG. 21 shows a block diagram of a controlled agricultural system according to "Prophylaxis".

FIG. 21 shows a block diagram of an exemplary embodiment of a controlled agricultural system 100 for prevention of diseases and pests. It comprises a computing device 140, a data storage device 170, a control unit 130, a first sensor device 150.1, a second sensor device 150.2, an actuator device 310 and a bus system 180. The aforementioned components interchange data and signals via the bus system 180. In an alternative computer architecture, the sensor devices, the data storage device and the control unit for the actuator device are directly connected to the computing unit (not illustrated). The first sensor device 150.1 is configured to measure environmental parameters (environmental data), for example air temperature and humidity, and it may comprise a plurality of different sensors. The second sensor device 150.2 is configured to acquire the state of the plants (plant data). To this end, it may comprise a plurality of different sensors, for example also imaging sensors such as cameras. The sensor data are stored in the data storage device 170 and analyzed by the computing device 140 as to whether there is an (elevated) risk of the plants being afflicted by disease or becoming infested by pests. If this is the case, the computing device 140 introduces suitable countermeasures. The control unit 130 converts the commands of the computing device 140 into control signals that are suitable for the actuator device 310. The actuator device 310 is configured to carry out the countermeasures for removing or at least reducing an elevated risk. To this end, the actuator device 310 may comprise a plurality of different actuators, for example a plant light fixture with different light sources, UV radiation sources, ventilators, heating/cooling, apparatuses for fighting pests, apparatuses for releasing useful creatures for plants, or else apparatuses for applying pesticides, fertilizers, water, etc., and any combination of the actuators. The computing device 140 is configured to establish the effects of the countermeasures on the plants by analyzing the data from the second sensor device 150.2 (plant data).

Figure 22:
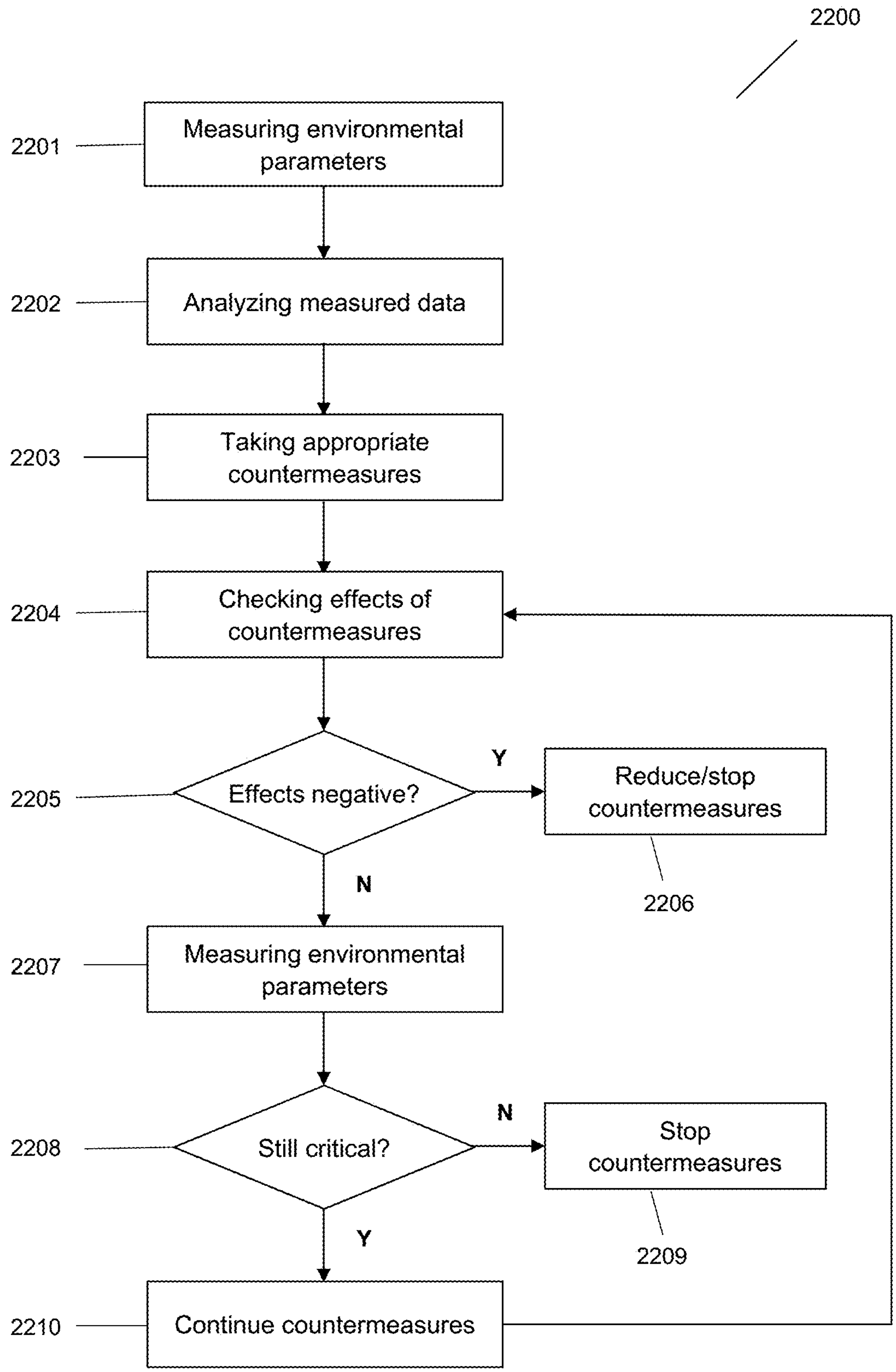
FIG. 22 shows a schematic flow chart of the method for agriculture according to "Prophylaxis".

FIG. 22 shows a schematic flow chart 2200 of the method for agriculture according to the disclosure. Reference is also made to FIG. 21 below. Relevant environmental parameters are measured using the first sensor device 150.1 (step 2201) and stored in the data storage device 170. From there, the measurement data (environmental data) are read by the computing device 140 and an analysis is carried out as to whether a critical situation is present (step 2202), for example if the dew point is undershot in the vicinity of the plants. If so, suitable countermeasures are proposed to the user or else directly introduced in automated fashion (step 2203); for example, dry air is supplied or the air temperature is increased (if countermeasures are introduced automatically, the user can then be informed about this). Further countermeasures may include, for example, a change in the light recipe for the plants, UV or (N)IR irradiation, supply of pesticide, fertilizer, etc. The effects of the countermeasures on the plants are checked on the basis of the measurement data of the second sensor device 150.2 (plant data) (step 2204). If (negative) effects can be seen (step 2205, YES), the countermeasures are reduced or stopped entirely (step 2206). If not (step 2205, NO), the environmental parameters are checked again (step 2207), i.e., in the aforementioned example, there is a check whether the dew point is still undershot or else whether it has been exceeded again. If the situation is no longer critical (step 2208; NO), the countermeasures are stopped (step 2209). If the situation continues to be critical (step 2208; YES), the countermeasures are continued (step 2210) and there is a return to step 2204 (checking the effects of the countermeasures on the plants).

Figure 23:
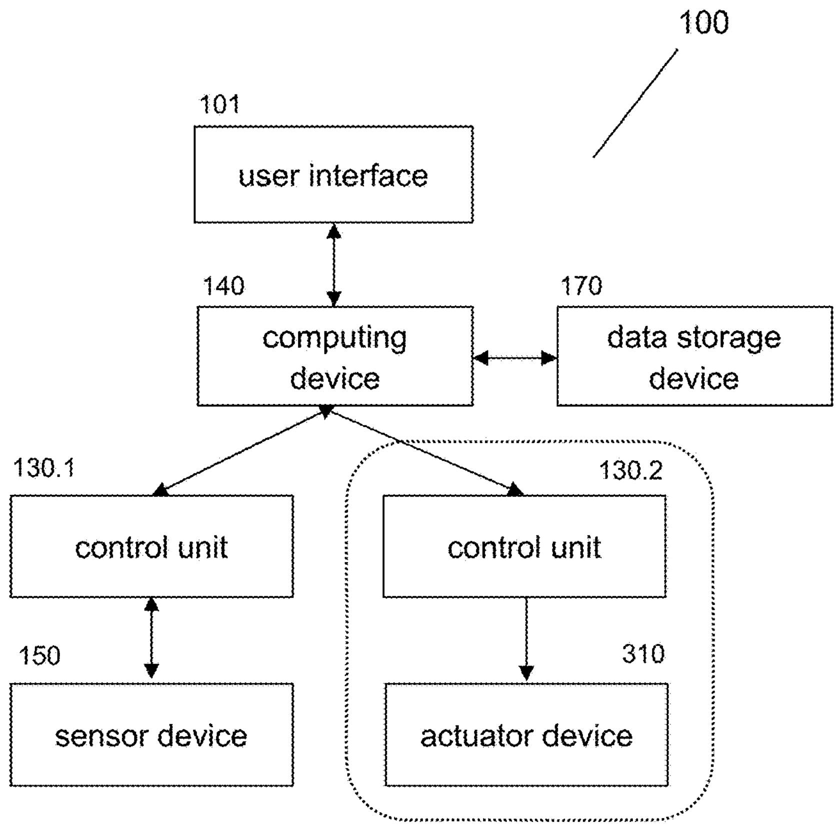
FIG. 23 shows a schematic block diagram of a controlled agricultural system according to "Stress Detection".

FIG. 23 shows a schematic block diagram of a controlled agricultural system 100, according to the disclosure. The controlled agricultural system 100 comprises a computing device 140, a data storage device 170, coupled to the computing device 140 and a sensor device 150, coupled to the computing device 140 via a first control unit 130.1. In an advantageous refinement of the disclosure, the controlled agricultural system 100 further comprises an actuator device 310, coupled to the computing device 140 via a second control unit 130.2 (encircled with dotted line). The data storage device 170 or even the computing device 140 may be based locally (on-site), in a network or the cloud. The sensor device 150 may comprise an imaging system, e.g. a still or video camera, in some embodiments/implementations a TOF camera or stereo camera, a lidar system, environmental sensors, e.g. for measuring the temperature, humidity and/or chemical composition of the air or soil, sensors for detecting color changes of the plant, particularly of the leaves, sensors for detecting specific gases exhaled by the plants, sensors for detecting the fluorescence emitted by the plants after activation with dedicated radiation. The computing device 140 compares the data measured by the sensor device 150 with respective reference data stored in the data storage device 170.

The comparison and analysis of the data may involve picture recognition algorithms, e.g. deep learning, to detect changes in the morphology or other characteristics of the plants. Artificial Intelligence may be used to identify the cause of the changes, for instance, environmental induced stress, plant diseases or pests. Measured data from a multitude of various sensors may be compared and analyzed to improve the reliability of the result of the analysis. For example, possible causes for changes in the morphology of the plants may be further pinpointed by supplemental environmental data of the air and/or soil. The result of the analysis is delivered to the user of the system (e.g. farmer). The delivered result may comprise different levels of warning to the user depending on the stress level, disease, pest or other critical condition detected. The result may be delivered to the user by a user interface 101, e.g. a control terminal coupled to the computing device or a mobile device such as a smartphone or tablet including a dedicated application (i.e. app for mobile devices).

Optionally, the measurements may be triggered only after reference conditions for a specific plant variety have been established, particularly regarding the illumination of the plants, because different illuminations (color or intensity) may affect the leaf morphology and also the measured data differently, causing inconsistent results. Furthermore, dedicated illumination scenarios may be used for detecting stress of the plants by measuring the reaction of the plants to specific illumination. For the purpose of illumination, the actuator device 310 comprises at least one light fixture with at least one light source. In some embodiments/implementations, the light fixture comprises several, different light sources configured to enable various light recipes. The light fixture may also comprise sources for emitting radiation that activates the plants to emit fluorescence radiation. In particular, changes in the chlorophyll-fluorescence may indicate plant diseases or detrimental ambient conditions, because they influence photosynthesis of the affected plants.

Furthermore, controlled agricultural system 100 may be configured to automatically counteract by means of the actuator device 310, if the analysis of the measured data by means of the computing device 140 results in the identification of stress, disease, pest or any other critical condition of the plants. For this purpose, the actuator device 310 may comprise, for instance, agricultural lighting devices configured to enable various light recipes, particularly light recipes that ease plant stress, radiation sources able to emit ultraviolet (UV) radiation, e.g. 250 to 300 nm, irrigation systems, ventilation systems, heating/cooling systems, feeders for dosing fertilizers, pesticides etc.

Figure 24:
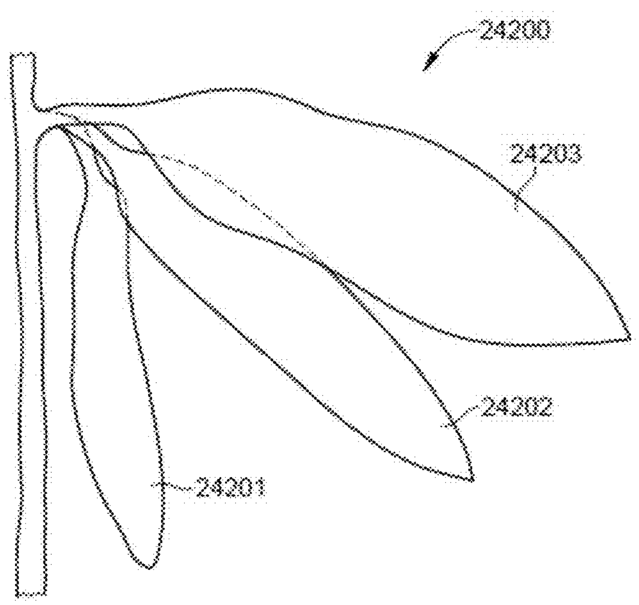
FIG. 24 shows changes in leaf orientation due to changes of environmental conditions.

FIG. 24 shows changes in leaf orientation and morphology due to changes of environmental conditions. For instance, leafs of rhododendrons 2400 uncurl and move from pendulant (hanging downwards) to horizontal with rising temperatures (2401: −30° C., leaf curled, pendulant; 2402: −0.5° C., leaf less curled, moved upwards to diagonal inclination; 2403: 10° C., leaf uncurled, almost horizontal orientation) (source: https://scholar.lib.vt.edu/ejournals/JARS/v40n1/v40n1-nilsen.htm).

Figure 25:
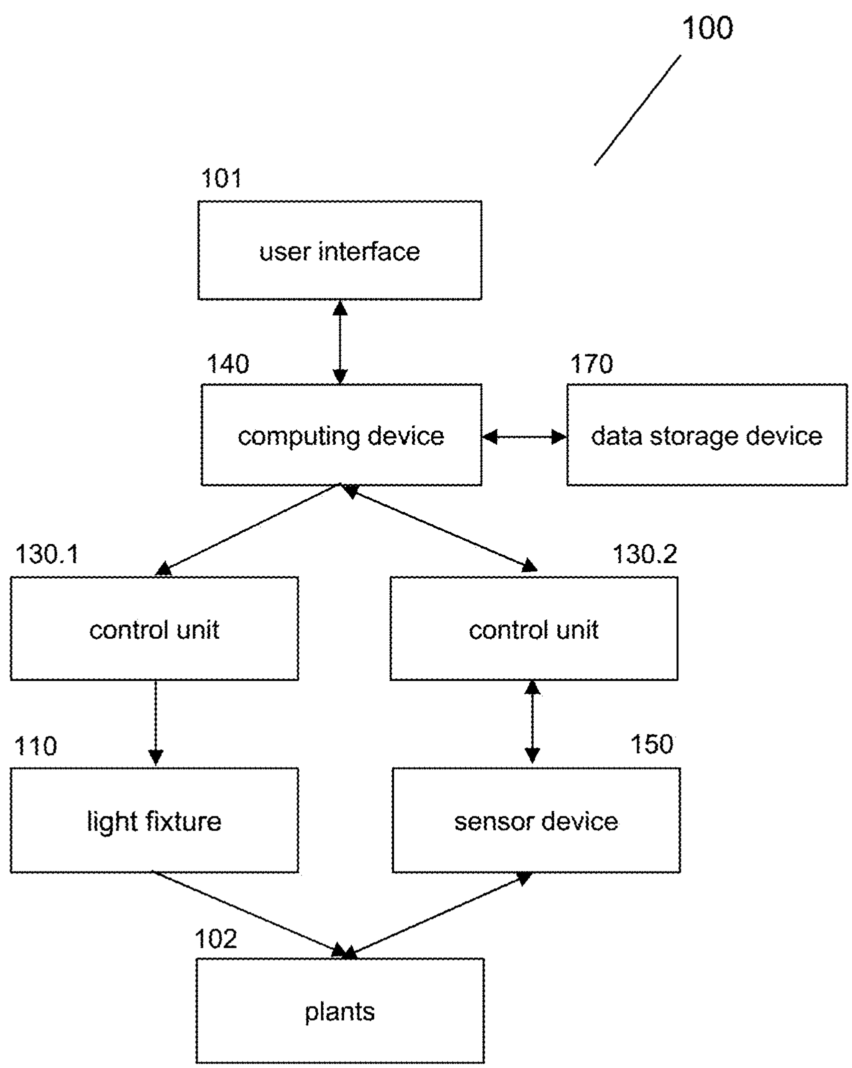
FIG. 25 shows a schematic block diagram of a controlled agricultural system according to an embodiment of "Discolored Spots Detection".

FIG. 25 shows a schematic block diagram of a controlled agricultural system 100, according to an embodiment of the disclosure. The controlled agricultural system 100 comprises a computing device 140, a data storage device 170, coupled to the computing device 140, an illumination device (light fixture) 110, coupled to the computing device 140 via a control unit 130.1 and a sensor device 150, coupled to the computing device 140 via a second control unit 130.2. The data storage device 170 or even the computing device 140 may be based locally (on-site), in a (centralized) network or the cloud. Furthermore, the data storage device 170 may also be integrated into the computing device 140.

The data storage device 170 comprises a database with a mapping of plant diseases, diseases-typical discolorations of the plants 102 (for every growth stage), and the respective complementary light (Complementary Color Spectrum CCSi). The computing device 140 is configured to control the illumination device 110 based on the data stored in the data storage device 170.

The illumination device 110 is configured to be able to emit the respective complementary light (Complementary Color Spectrum CCSi) according to the data stored in the data storage device 170. Furthermore, the controlled agricultural system 100 is configured to control the illumination device 110 based on the data of the database. The illumination device 110 may comprise light sources, which emit light of at least three different colors, in some embodiments/implementations red, green and blue to be able to cover the RGB color-space. Furthermore, the illumination device 110 may be configured to be able to emit white light or any illumination needed in an agriculture system to support plant growth. The illumination device 110 may also be integrated into an agricultural lighting system.

The sensor device 150 is configured to be able to detect the light reflected by the plants 102. The sensor device 150 may comprise camera or other sensor systems (Photodiode, CCD chips with filters etc.). Furthermore, the controlled agricultural system 100 is configured to analyze the data from the sensor device 150 and detect dark areas. The dark areas may correspond with discolored areas (or spots) on the plants 102, which may be caused by a plant disease. The dark areas may also correspond, for example, with fruits that have changed their color due to ripening.

Furthermore, the controlled agricultural system 100 may further comprise a user interface 101 for informing the user about the measurement results. Via the interface 101 the user may also schedule the measurements. Alternatively, the measurements schedule may follow an automatic routine, e.g. once a day, week, month.

Figure 26:
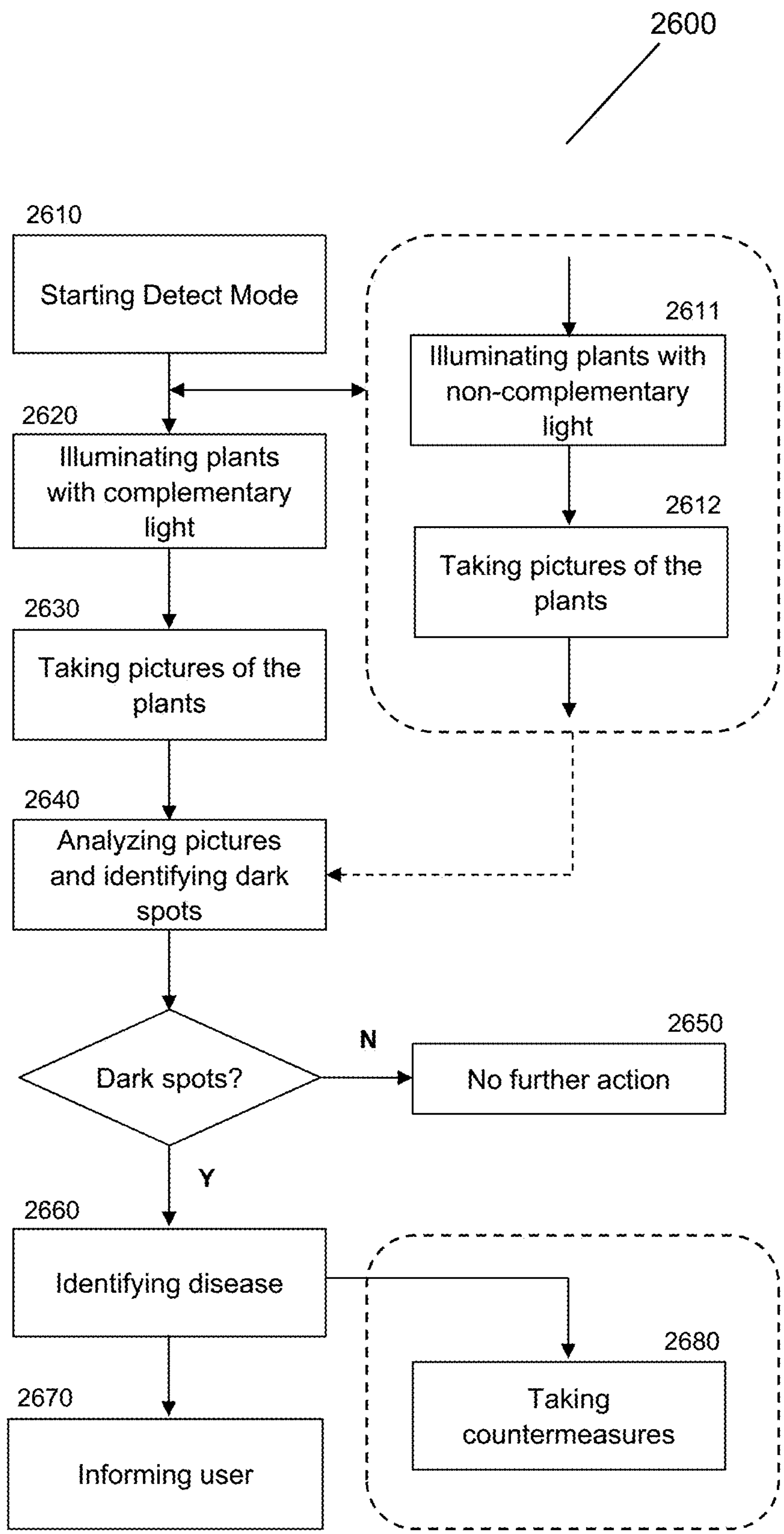
FIG. 26 schematically shows the steps of the method for agricultural management according to an embodiment of "Discolored Spots Detection".

FIG. 26 schematically shows the steps 2600 of the method for an agricultural management according to an embodiment of the disclosure. More precisely, FIG. 26 shows a method for detecting/verifying discolored spots of plants based on complementary illumination, particularly for disease detection. For the following description, in addition to FIG. 26, reference is made to FIG. 25. The method comprises the following steps:

Step 2610: Starting the detect mode of the controlled agricultural system 100;

Step 2620: Illuminating the plants 102 with complementary light by means of the illumination device 110;

Step 2630: Taking pictures of the plants 102 by means of the camera 150;

Step 2640: Analyzing the pictures and identifying dark spots by means of the computing device 140;

If no dark spots have been identified:

Step 2650: No further action;

If dark spots have been identified:

Step 2660: Identifying the disease that caused the discolored spots by means of the computing device 140 based on the data stored on the data storage device 170;

Step 2670: Informing the user by means of the user interface 101 that discolored spots have been identified and about the diagnosed disease;

Alternatively or optionally in addition to step 2670 (encircled with dashed line):

Step 2680: Initiating countermeasures;

Optionally, before step 2620 or after step 2630 (encircled with dashed line):

Step 2611: Illuminating the plants with non-complementary, e.g. white light, by means of an appropriate illumination device;

Step 2612: Taking pictures of the plants by means of the camera 150; furthermore, comparing in step 2640 the pictures of step 2612 (dashed arrow) with respective pictures of step 2630 for enhanced contrast. This additional measure is particularly beneficial if the discolored spots are (still) small.

In step 2610, other light sources, such as agricultural lighting fixtures may be switched off to facilitate the visualization of the dark spots when illuminating the plants with the complementary light. If the detection is performed in a greenhouse, shutters or blinds may be drawn down.

In step 2620, in order to probe for a specific discoloration, the plants are illuminated with the respective complementary light. For instance, to probe for red discolorations (with an RGB-code of e.g. #FF0000) the plants are illuminated with a cyan color with the RGB-code of #00FFFF. Therefore, any red spot will appear dark. Furthermore, the complementary light may comprise various Complementary Color Spectra CCSi for probing various discolored spots and associated diseases. The various CCSi may be applied consecutively, and respective pictures of the plants are taken with each CCSi.

In step 2630, instead of taking pictures with a camera, alternative sensors for visually detecting dark spots may be employed, e.g. a photodiode or CCD chips with filters.

In step 2640, the data from the camera or other sensors are analyzed by means of the computing device 140. Based on the data, the analysis enables to verify dark spots visualized by the complementary illumination.

In step 2660, diseases are identified by means of the mapping of plant diseases, diseases-typical discolorations of the plants, and the respective complementary light (Complementary Color Spectrum CCSi). Therefore, if dark spots are detected under a specific complementary light CCS, the corresponding disease-typical discoloration and disease of the plants can be identified from the mapping.

In step 2680, the countermeasures may comprise treating the affected plant(s) with e.g. UV-light, nutrition, medication, fungicides, pesticides, etc.

Instead of detecting discolored spots on plants for verifying diseases, the illumination with complementary light may be used for detecting (dis)colored areas of the plants that have other causes, for example, discoloring due to ripening of fruits or plant stress or pests.

Figure 27:
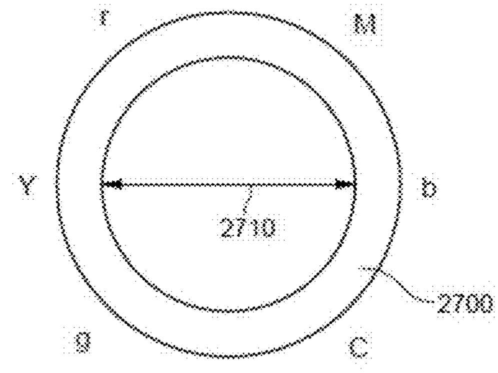
FIG. 27 shows a color ring.

FIG. 27 schematically shows a color ring 2700 (source: https://de.wikipedia.org/wiki/Komplement % C3% A4rfarbe). The complementary colors of the primary colors red (r), green (g), blue (b) are cyan (C), magenta (M) and yellow (Y), respectively. On the color ring 2700, the complementary color of any color is diametrically opposed. For instance, the complementary color of yellow (Y) can be determined by locating the opposite end of the diameter 2710, i.e. the color blue (b).

Figure 28:
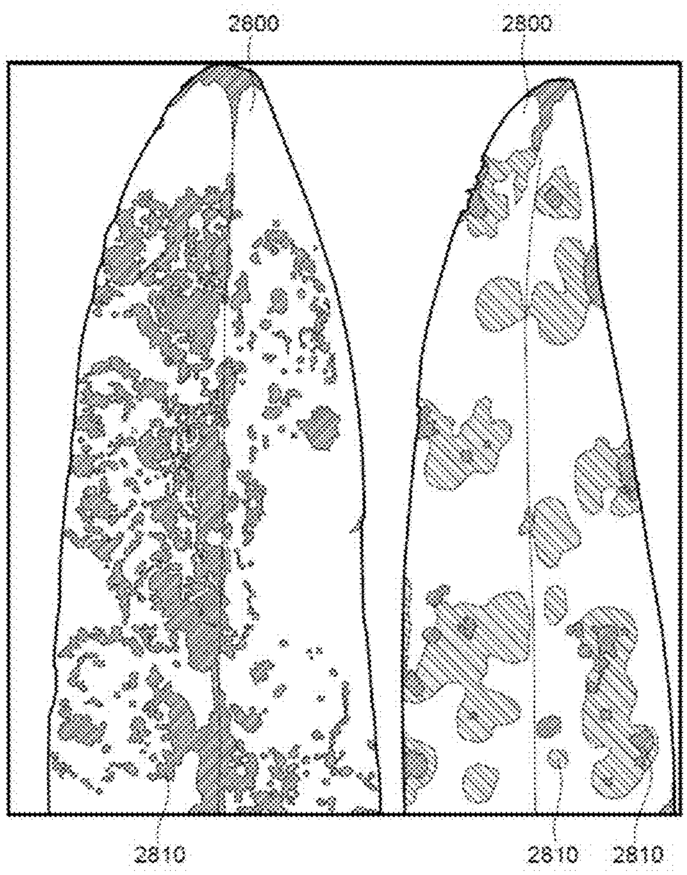
FIG. 28 shows a plant leave with mottling and discolorations.

FIG. 28 schematically shows typical mottling and discolorations 2810 caused by the Tobacco mosaic virus on the leaves 2800 of orchids (source: https://en.wikipedia.org/wiki/File:Tobacco_mosaic_virus_symptoms_orchid.jpg).

Figure 29:
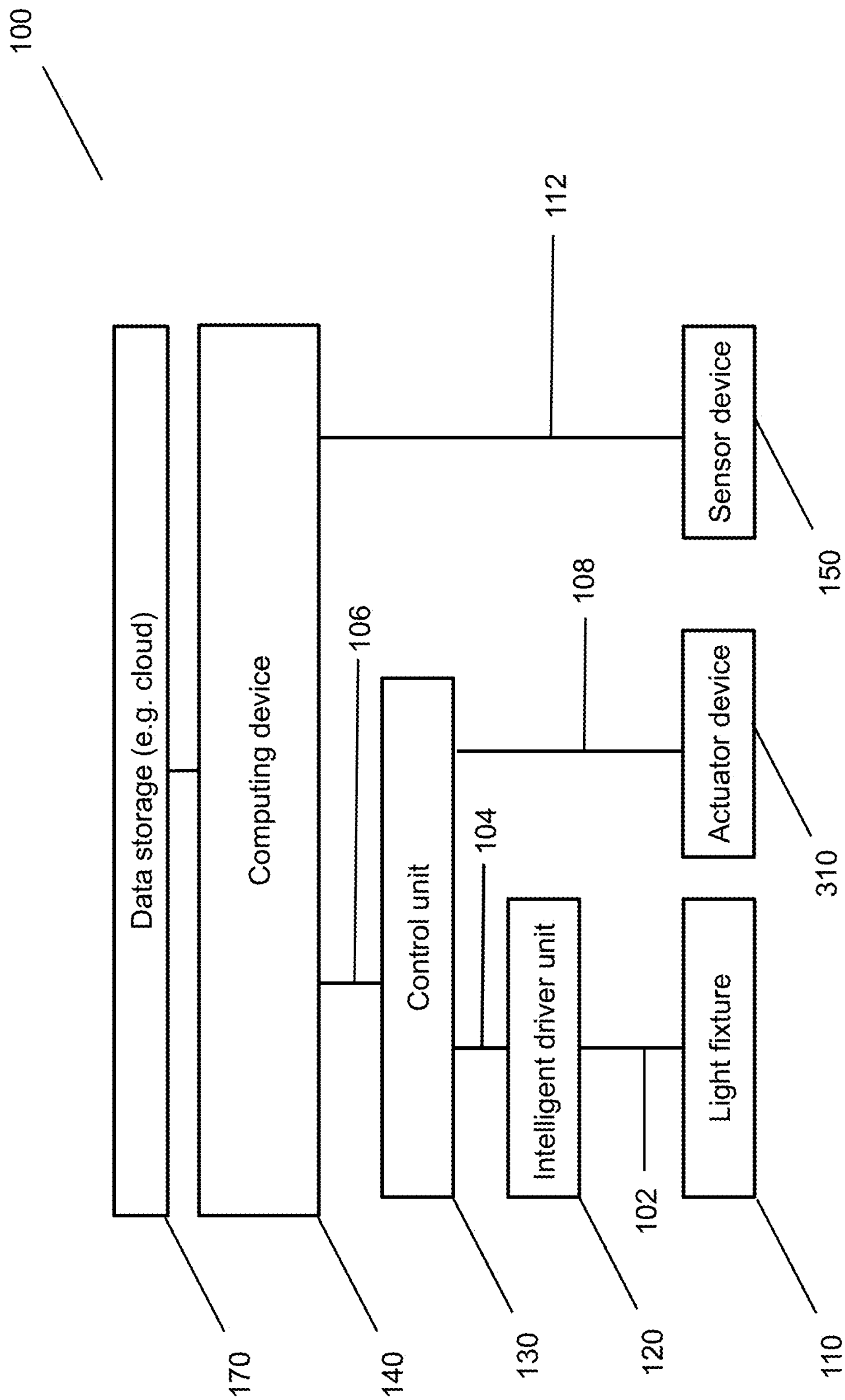
FIG. 29 shows a block diagram of a controlled agricultural system according to "Disease & Pest Control".

FIG. 29 shows a block diagram of an exemplary embodiment of a controlled agricultural system 100 for identifying and reacting to diseases and pests. An agricultural light fixture 110 is connected to an intelligent driver unit 120. The intelligent driver unit 120 is configured to transmit a signal 102 to the agricultural light fixture 110. The signal can contain operational parameters to operate the individual light sources of the agricultural light fixture 110 or it can enable a fixture-stored lighting program. The connection between the agricultural light fixture 110 and the intelligent driver unit 120 may be a wired connection or a wireless connection. The transmitting signal 102 may conform to a common communication protocol. The intelligent driver unit 120 is connected to a control unit 130. The control unit 130 is configured to transmit a signal 104 to the intelligent driver unit 120. The signal 102 is based on the signal 104. Optionally, an actuator device 310 is connected to the control unit 130. The actuator device 310 may comprise a variety of actuators, e.g. for adjusting environmental conditions like temperature, humidity, ventilation or for dosing fertilizer, pesticides etc. The control unit 130 is connected to a computing device 140, e.g. a computer system. Furthermore, the computing device 140 is connected to a sensor device 150. The sensor device 150 comprises a variety of sensors, e.g. for measuring environmental conditions like temperature, humidity, ventilation and for detecting the health of the plants, e.g. an imaging system. Furthermore, the computing device 140 is connected to a data storage 170. The computing device 140 may also be connected to a cloud computer network. In the data storage 170 the nominal values of the plant data are stored (reference data). The computing device 140 is configured to compute a control command 106 based on the comparison of the signal 112 transmitted from the sensor device 150 and the nominal values stored in the data storage 170.

Figure 30:
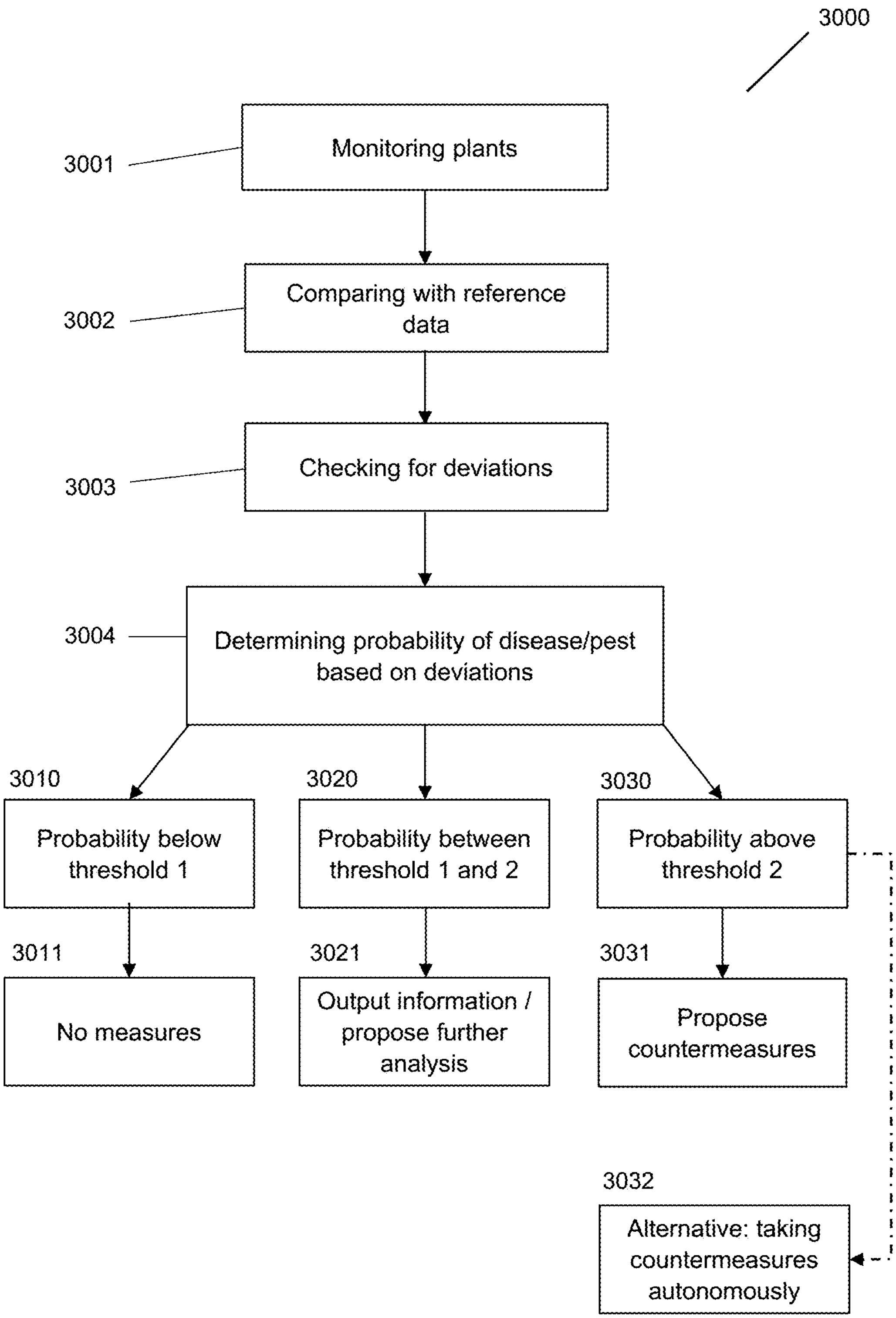
FIG. 30 shows a schematic flow chart of the method for agriculture according to "Disease & Pest Control".

FIG. 30 shows a schematic flow chart 3000 of the method for agriculture according to the disclosure. Below, reference is also made to FIG. 29. The growing plants and, optionally, the surroundings thereof (target area) as well are monitored on the basis of the sensor data from the sensor device 150 (step 3001). The sensor data, i.e., plant data, for example plant color, plant form, etc., and optionally data of the ambient conditions, e.g., air temperature, air composition, ground composition, etc., are compared to corresponding intended data (reference values) (step 3002) and possible deviations are detected (step 3003). The probability for the presence of a disease or the presence of a pest is established with the aid of the computing device 140 on the basis of the detected deviations (step 3004). There is a case discrimination for the further procedure. If the established probability lies below a first threshold (step 3010), no further measures are taken up (step 3011). If the established probability lies between the first threshold and a second threshold (step 3020), an information item is output, for example on a terminal or mobile appliance, for example a smartphone with an associated app, to the effect that a disease or infestation by pests may be present and/or a further analysis is proposed in order to be able to determine the disease or the infestation with pests more accurately (step 3021). If the established probability lies above the second threshold (step 3030), corresponding countermeasures are proposed (step 3031). Alternatively, the countermeasures are independently introduced by the computing device 140 by way of the actuator device 310 and/or suitable actuation of the light fixture 110 (step 3032).

Figure 31:
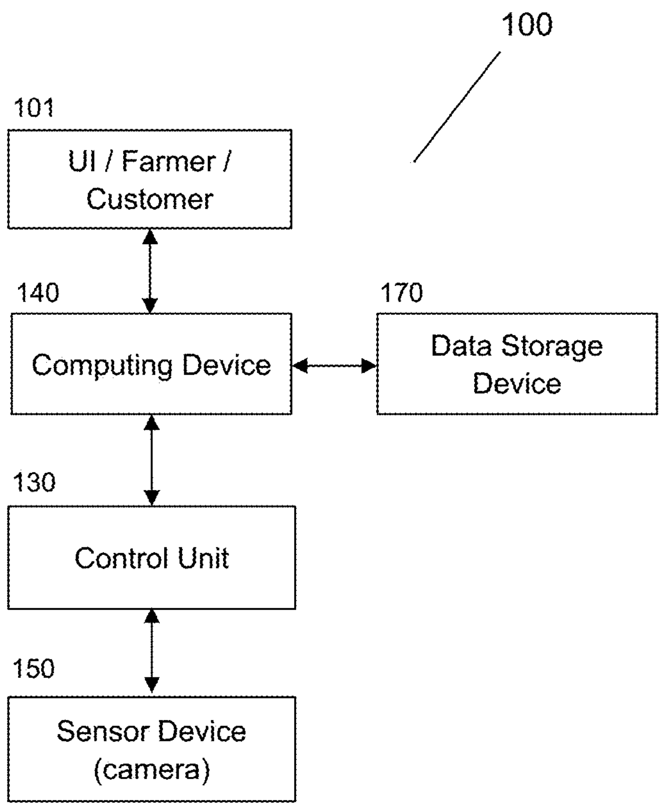
FIG. 31 shows a schematic block diagram of a controlled agricultural system according to "Yield Prediction".

FIG. 31 shows a schematic block diagram of a controlled agricultural system 100, according to the disclosure. The controlled agricultural system 100 comprises a computing device 140, a data storage device 170, coupled to the computing device 140 and a sensor device 150, coupled to the computing device 140 via a control unit 130. The data storage device 170 or even the computing device 140 may be based locally (on-site), in a network or the cloud. The sensor device 150 may comprise various sensors, in some embodiments/implementations an imaging system, e.g. a still or video camera, in some embodiments/implementations a TOF camera or stereo camera, a LIDAR system, environmental sensors, e.g. for measuring the temperature, humidity and/or chemical composition of the air or soil or nutrient solvents, sensors for detecting the color changes of the plant, particularly of the leaves, flowers and fruits.

The computing device 140 is configured to identify and count the flowers and/or buds of the plants in the cultivated area by means of the data measured by the sensor device 150. The analysis of the data, particularly the identifying of the flowers or buds, may involve picture recognition algorithms, e.g. deep learning. Additionally or alternatively, the computing device 140 is configured to identify the flowers directly based on the color of the flowers (e.g. yellow for tomatoes) and the typical size derived from the pictures, either as an absolute value or relative to the size of other parts of the plant (e.g. leaves).

Furthermore, the computing device 140 is configured to calculate a prediction for the yield of the plants in the cultivated area by means of the number of flowers and the respective conversion rate for flowers to fruits. The respective conversion rates are retrievable from a database stored on the data storage device 170. Optionally, the computing device 140 is also configured to calculate a prediction for the harvesting time of the fruits based on the currently detected status of growth of the plants and the typical time left until ripening of the fruits. Typical time schedules for ripening of the fruits may be stored in the data storage device 170.

The calculated results, i.e. the forecast of the yield and, optionally, harvesting time, are delivered to the user of the system (e.g. farmer) or a customer. The delivered results may comprise a set of data, including the forecasted yield and harvesting time, images (shot by still or video camera) or other graphical representation such as virtual or augmented reality of the plants. The result may be delivered to the user by a user interface (UI) 101, e.g. a control terminal coupled to the computing device or a mobile device such as a smartphone or tablet including a dedicated application (i.e. app for mobile devices).

Figure 32:
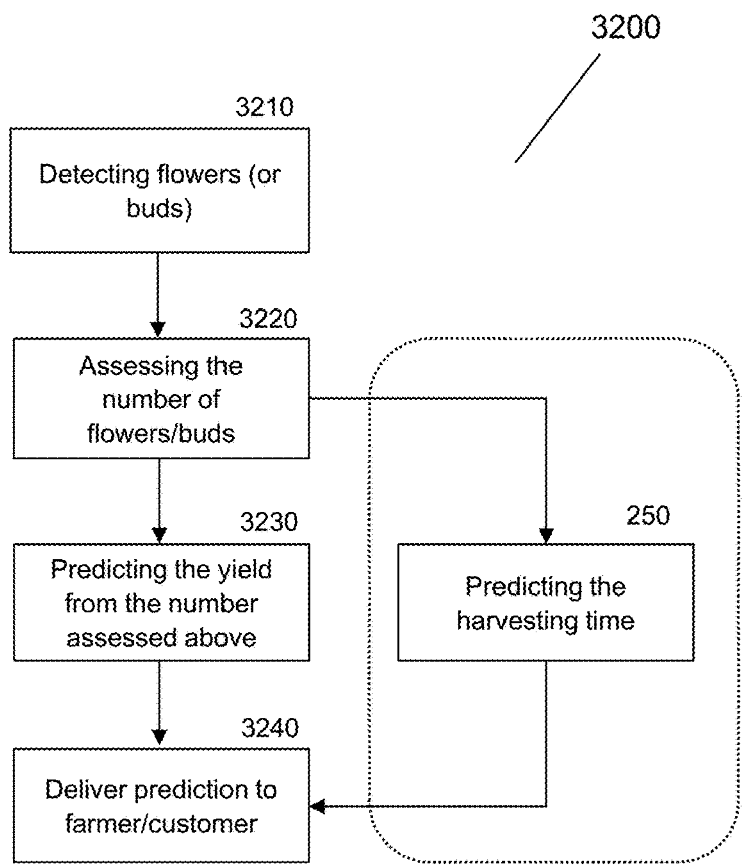
FIG. 32 shows a schematic flow chart of a method for agricultural management according to "Yield Prediction".

FIG. 32 shows a schematic flow chart 3200 of the method for agricultural management according to the disclosure. In addition to FIG. 2, reference is made to FIG. 1. The method comprises the following steps:

Step 3210: Detecting the flowers (or buds) of the plants in the cultivated area by means of the sensor device 150 and the computing device 140;

Step 3220: Assessing the number of flowers/buds by means of the computing device 140 and based on the data measured by the sensor device 150;

Step 3230; Predicting the yield by retrieving the respective conversion rate of the plant species from the data storage device 170 and weighing the number of flowers assessed in step 3220 above with the conversion rate by means of the computing device 140;

Step 3240; Delivering the result of the prediction to the user, e.g. a farmer or a customer who ordered the fruits from the farmer by means of the user interface 101;

Optionally, the method may comprise the additional

Step 3250: Predicting the harvesting time by retrieving the average harvesting time for the respective fruit (time schedule of ripening) from the data storage device 170 and comparing it with the current state of the ripeness by means of the computing device 140; the current state of the ripeness is identified by analyzing the data measured by the sensor device 150 with regard to, e.g., the development of the flowers, the withering of the flowers, the creation of the fruits, and the different state of its ripening.

The accuracy of the prediction of step 3230, and optionally step 3250, may be improved by measuring and considering additional environmental data like the temperature, humidity, etc.

Figure 33:
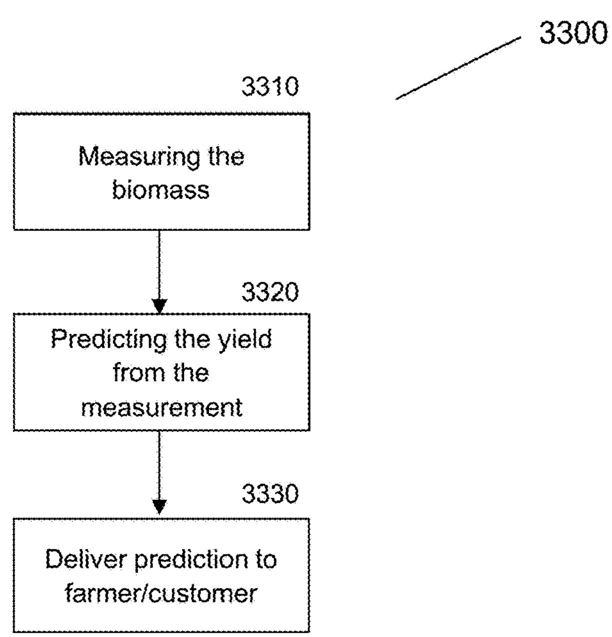
FIG. 33 shows a schematic flow chart of an alternative method for agricultural management according to "Yield Prediction".

FIG. 33 shows a schematic flow chart 3300 of an alternative method for agricultural management according to the disclosure. The method comprises the step 3310 of measuring the biomass by means of the of the sensor device 150. Based on the measured biomass and current and/or future environmental data (temperature, humidity, light intensity, light spectrum . . . ) the yield is predicted by means of the computing device 140 (step 3320). The result of the prediction is delivered to the user similar to step 3240 in FIG. 32 (step 3330).

Figure 34:
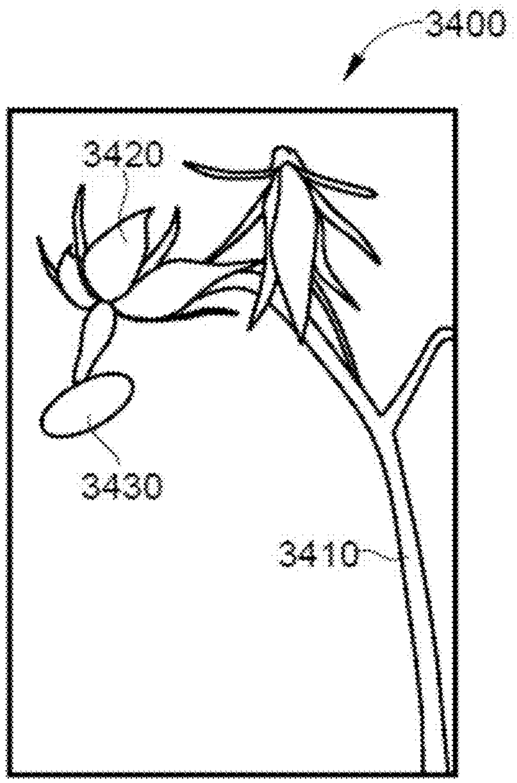
FIG. 34 shows a detail of a cultivated area within a greenhouse.

FIG. 34 shows an image 3400 depicting a detail of a cultivated area within a greenhouse. Particularly, it shows plants 3410 with yellow flowers 3420 and a bumble-bee 3430 close to a flower. If the detection system relies only on the color of the flower to detect a flower, it could mistake a bumble-bee for a flower. Therefore, it is necessary to also consider the relative or absolute size of the colored spot in the picture to reduce the risk of wrong identifications.

Figure 35:
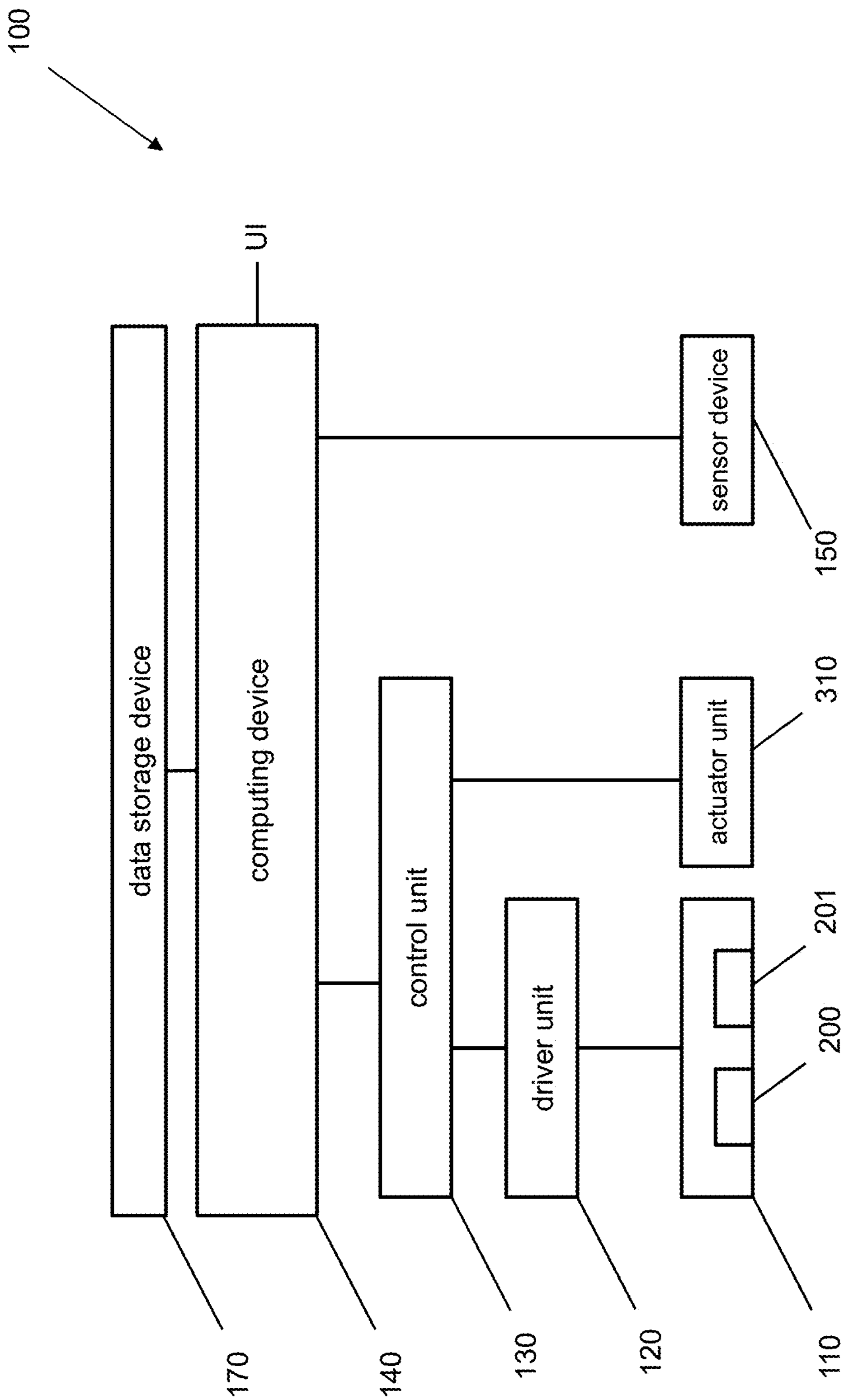
FIG. 35 shows a schematic block diagram of a controlled agricultural system according to "Growth Inhibition".

FIG. 35 shows a schematic block diagram of a controlled agricultural system 100, according to the disclosure. The controlled agricultural system 100 comprises a computing device 140, and a light fixture 110 coupled to the computing device 140 via a control unit 130 and a driver unit 120. The data storage device 170 or even the computing device 140 may be based locally (on-site), in a network or the cloud.

The data storage device 170 comprises a database with data of control parameters for controlling the illumination. Based on the data stored in the data storage device 170, the control parameters may be adjusted by means of the control unit 130. Furthermore, the computing device 140 is configured to control grow parameters like nutrient concentration, via the actuator unit 310.

The controlled agricultural system 100 further comprises a sensor device 150, coupled to the computing device 140, for sensing a fungi infection of the plants. This can for instance be achieved by a camera in combination with a picture recognition. In case of downy mildew, the pattern of the damage at infestation can be pale green or pale yellow spots (chloroses) on the upper surface of the leaves, often starting from the midrib of the leaf. As the infection progresses, chlorosis spreads and the first brown spots appear. At high humidity conditions, on the underside of leaves a greyish-violet-brown spore lawn is developing. It then comes to rapid propagation in the plant population, and the leaves die quickly. In the case of red-leaved varieties the infestation symptoms are often late to recognize. In small-leaved varieties, downy mildew usually does not show the typical chlorosis on the leaf top.

In another embodiment, chlorophyll fluorescence could be measured locally on the leaves with a camera. If the fluorescence is not in the optimum range at a certain location on the leaves, this might indicate an infection with a fungus. If this is the case, the treatment with the fungi prevention illumination can be initiated.

In another embodiment or additionally to the above, a thermal camera is used. Areas of the leaves infected by mildew or other fungi show a temperature that is different from the rest of the leaf (i.e. the healthy tissue). Usually, the temperature is elevated by some 0.1 degrees Celsius. Thus it is possible to detect an infection even before the typical marks of the infection can be seen on the plants. As soon as leaves show spots of different temperature, the treatment with the fungi prevention illumination can be initiated.

From a biological point of view, the fungus forms oospores, which release sporangia after germination. These can be spread by wind, air movements and water splashes (possibly also over the seeds of the plants). The plants are mainly infected when the temperatures are between 15 and 25° C. and the air is sufficiently humid. The spores enter the plant via the stomata and form a mycelium there. There, the conidiophores (holder of the conidia) emerge, which grow out of the stomata again and can be seen as a dark spore lawn on the underside of the leaf. These conidia are used to distribute the germs in the plantation. Conidia can germinate even at low temperatures of 5 to 10° C. Other host plants for downy mildew are sage, savory and other species of the mint family.

According to the disclosure, the development or germination of spores is prevented by illuminating the plants with a fungi prevention light source 200 during a night phase. It is a part of the light fixture 110 and emits red light. Additionally, a UV light source 201 is provided.

In an exemplary embodiment, the red light at 660 nm is switched on 2 hours after the night phase has started. Thus, there is a dark period at the beginning of the night phase. After this dark period, the red light is switched on at an intensity of 60 μmol/m$^2$/s for 4 hours. For example, in a day phase/night phase rhythm of 16/8 hours, the normal light treatment could last from 06:00-22:00. At 22:00 the 2 hour dark period starts (no light), and at midnight the fungi prevention time starts and lasts until 4:00, before a second dark period follows until 06:00 (no light). This cycle is repeated daily. The fungus requires a certain dark period duration to trigger the germination/sporulation, which is interrupted by the fungi prevention illumination.

In case that the sensor device 150 detects an infection, nevertheless, an additional UV treatment can be applied with the UV light source 201. The information about the infection may be delivered to the user or customer by a user interface (UI), e.g. a control terminal coupled to the computing device or a mobile device such as a smartphone or tablet including a dedicated application (i.e. app for mobile devices).

Figure 36:
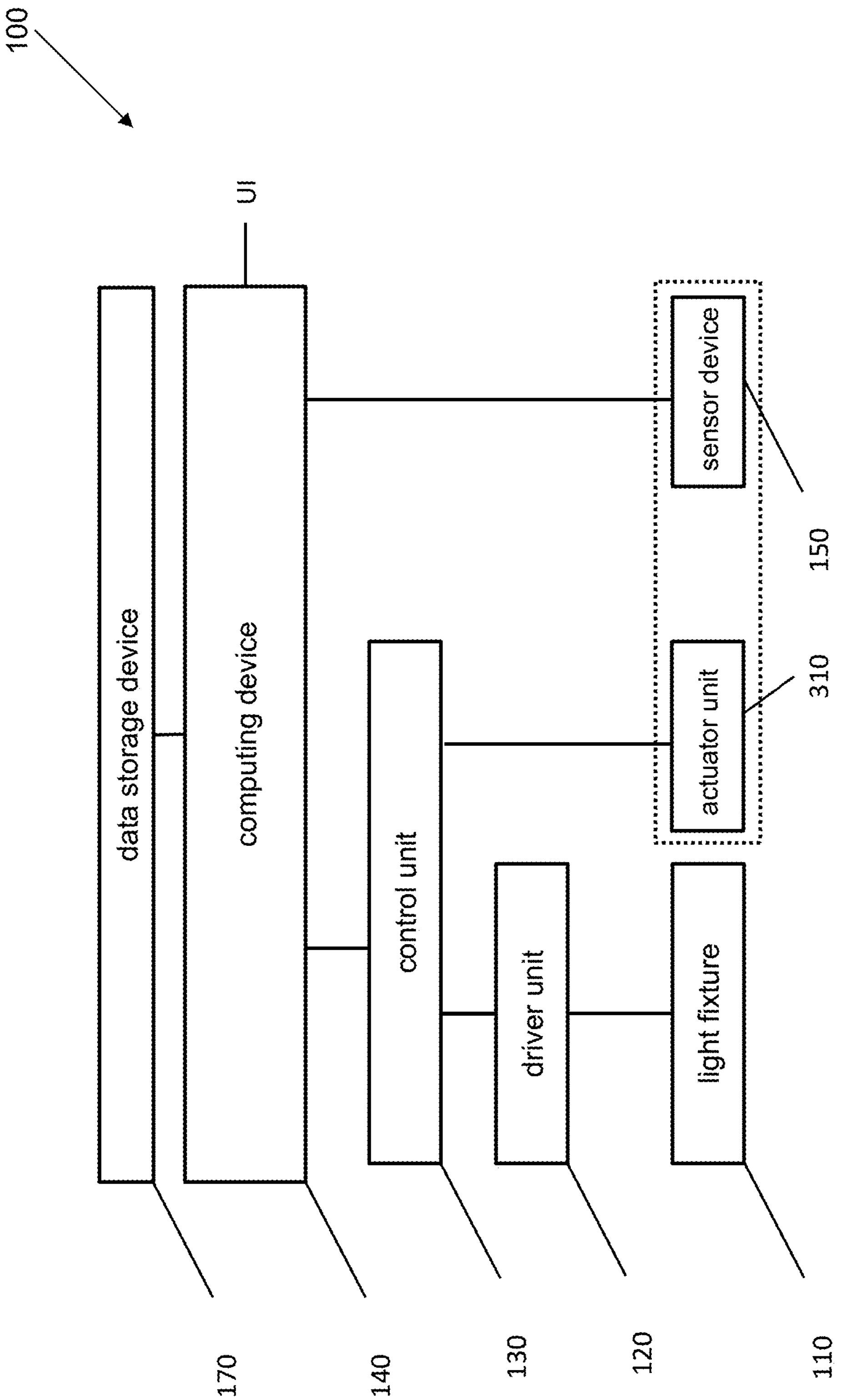
FIG. 36 shows a schematic block diagram of a controlled agricultural system according to "Sensor Retrofit".

FIG. 36 shows a schematic block diagram of a controlled agricultural system 100, according to the disclosure. The controlled agricultural system 100 comprises a computing device 140, and a light fixture 110 coupled to the computing device 140 via a control unit 130. The data storage device 170 or even the computing device 140 may be based locally (on-site), in a network or the cloud.

The data storage device 170 comprises a database with data of control parameters for controlling the illumination. Based on the data stored in the data storage device 170, the control parameters may be adjusted by means of the control unit 130. Furthermore, the computing device 140 is connected to an actuator unit 310, namely an irrigation device.

The controlled agricultural system 100 further comprises a sensor device 150 mounted at the irrigation device, see FIG. 2 in detail. The sensor device 150 is coupled to the computing device 140. Any information measured by the sensor device 150, for instance about the growth status of the plants, may be delivered to the user or customer by a user interface (UI), e.g. a control terminal coupled to the computing device or a mobile device such as a smartphone or tablet including a dedicated application (i.e. app for mobile devices).

Figure 37:
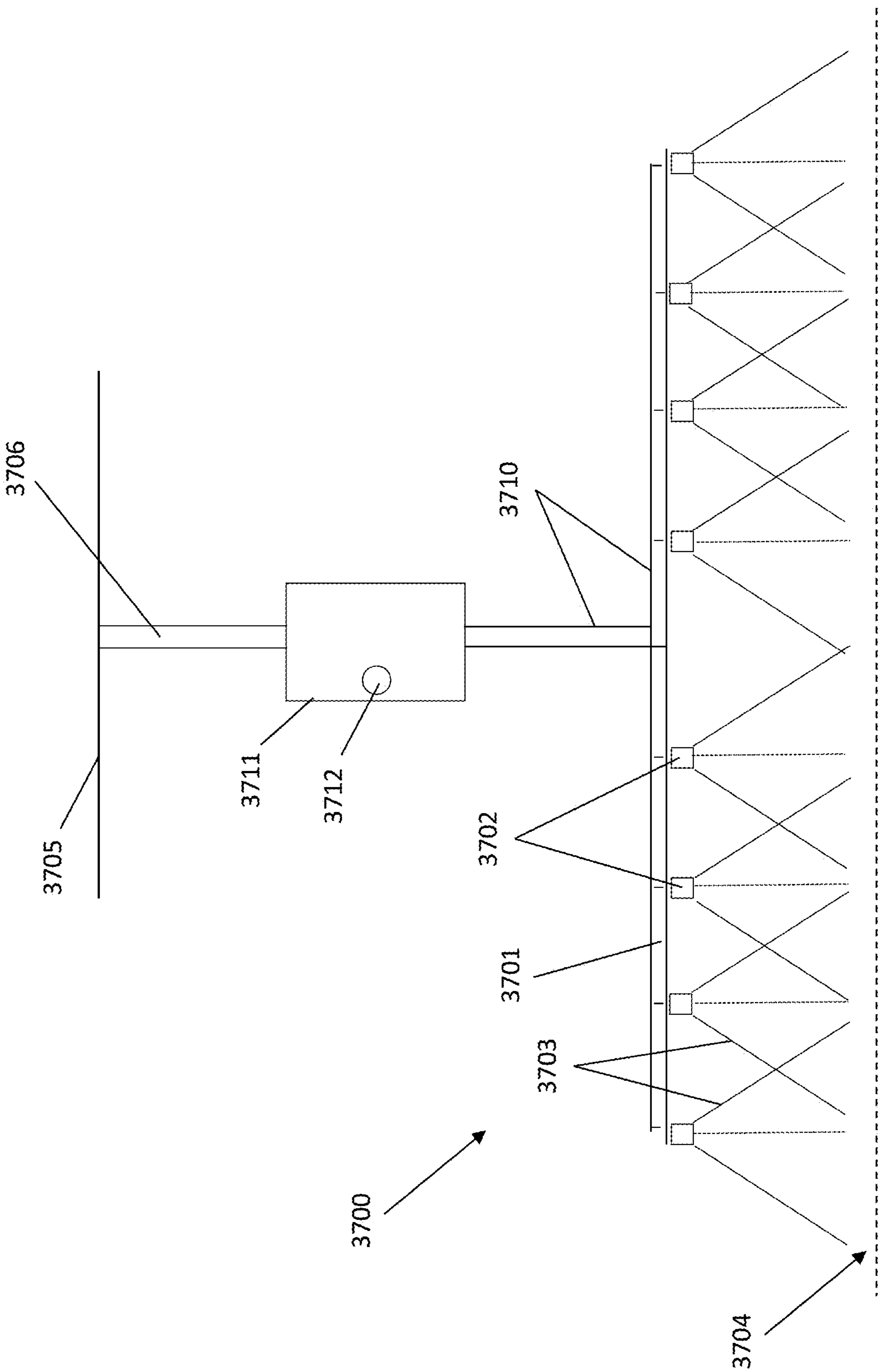
FIG. 37 shows an irrigation device equipped with sensor devices.

FIG. 37 shows an irrigation device 3700. It comprises a rail 3701 at which a plurality of sensors 3702 are provided. Each sensor 3702, in this case a camera, has a certain field-of-view 3703 onto a growth area 3704. In this case, the fields-of-view of the respective sensors are partially overlapping, allowing a 3D-reconstruction of the growth area.

The irrigation device 3700 is mounted movable at a ceiling 3705, it hangs at a rod 3706 hanging from the ceiling 3705. Via a rail system (see FIG. 37), the irrigation device 3700 is movable forth and back over the growth area 3704, namely forward out of the drawing plane and backward behind the drawing plane. Such an irrigation device 3700 is known as such. A power supply or data cable line 3710 connects the sensors 3702 with the control box 3711 of the irrigation device 3700. In particular, the irrigation device 3700 and the sensor device 3702 can share a common power supply 3712.

Figure 38:
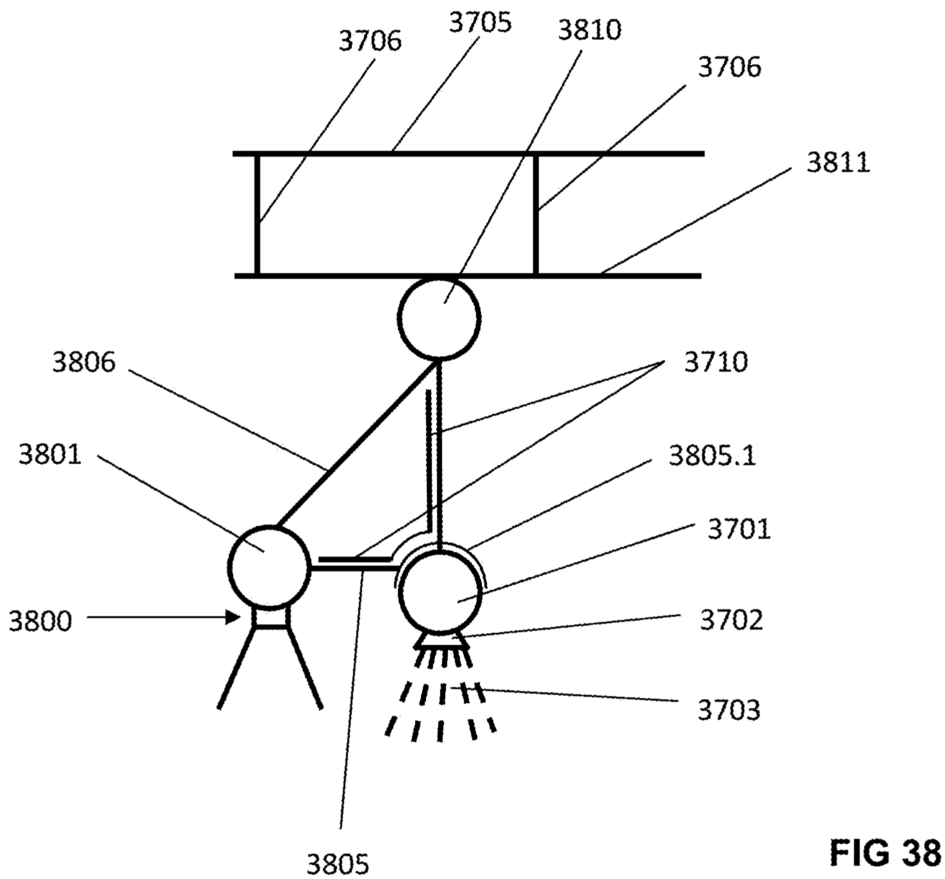
FIG. 38 shows a first mounting option.

FIG. 38 illustrates a possibility for mounting a plurality of sensor devices 150, namely cameras 3800. The cameras 3800 are provided at a rail 3801, which extends perpendicularly to the drawing plane (behind and in front of the drawing plane, further cameras 3800 are provided at rail 3801). The rail 3801 with the cameras 3800 is mounted at the rail 3701 with the nozzles 3702. FIG. 38 shows a sectional plane perpendicular to FIG. 37. For the mounting, a support bar 3805 with a clamp 3805.1 is clamped over the rail 3701. In addition, a crossbar 3806 is provided for stabilization. The power or data line 3710 is led to the cameras 3800 along the bar 3805. Furthermore, a splash guard could be installed between the cameras 3800 and the nozzles 3702 (not shown).

The whole setup is movable over the growth area by an engine 3810, which is guided at a rail 3811. The rail 3811 is mounted at the ceiling 3705 via a plurality of rods 3706.

Figure 39:
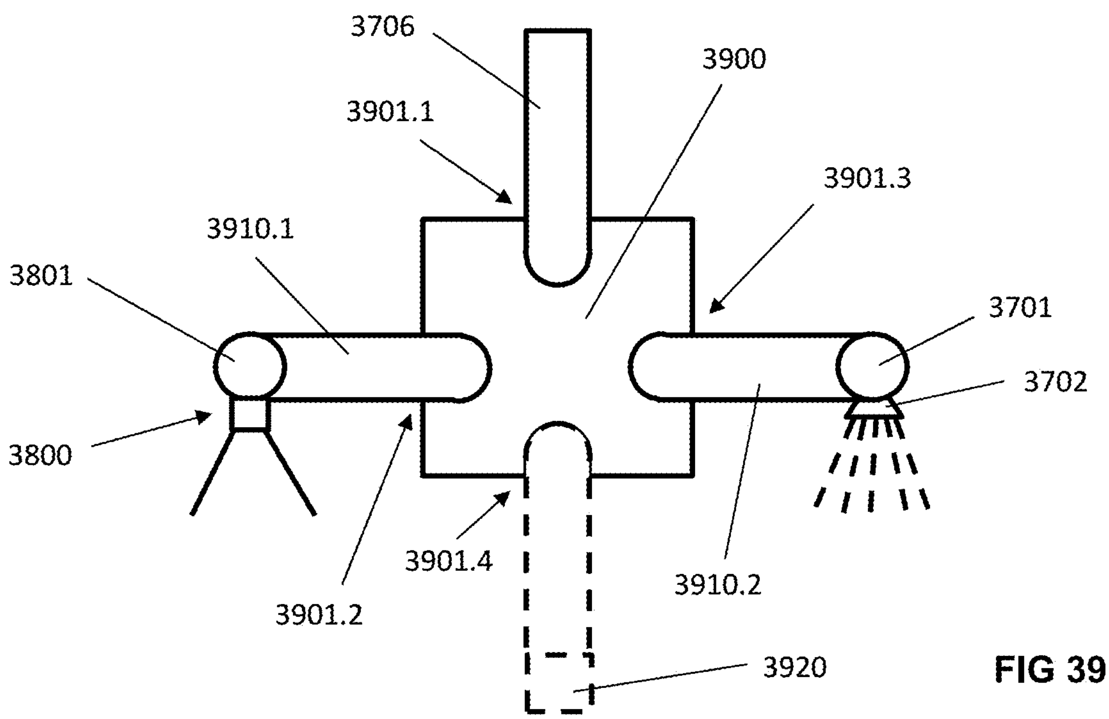
FIG. 39 shows a further mounting option.

FIG. 39 shows a further possibility for combining an irrigation and a sensor device. In this case, a profile rail 3900 is provided. At its opposite sides, the profile rail 3900 is formed with respective recesses 3901.1-3901.4. In the recess 3901.1 at the upper side, the rod 3706 for the mounting at the ceiling (not shown) is provided. In the recess 3901.2 on the left, the rail 3801 with the cameras 3800 is mounted. In the recess 3901.3 on the right, the bar 3701 with the nozzles 3702 is mounted. For the mounting, a respective transversal bar 3910.1, 3910.2 is placed in the respective recess 3901.1, 3901.3. In the recess 3901.4 at the lower side, a light source 3920 can be mounted optionally.

Figure 40:
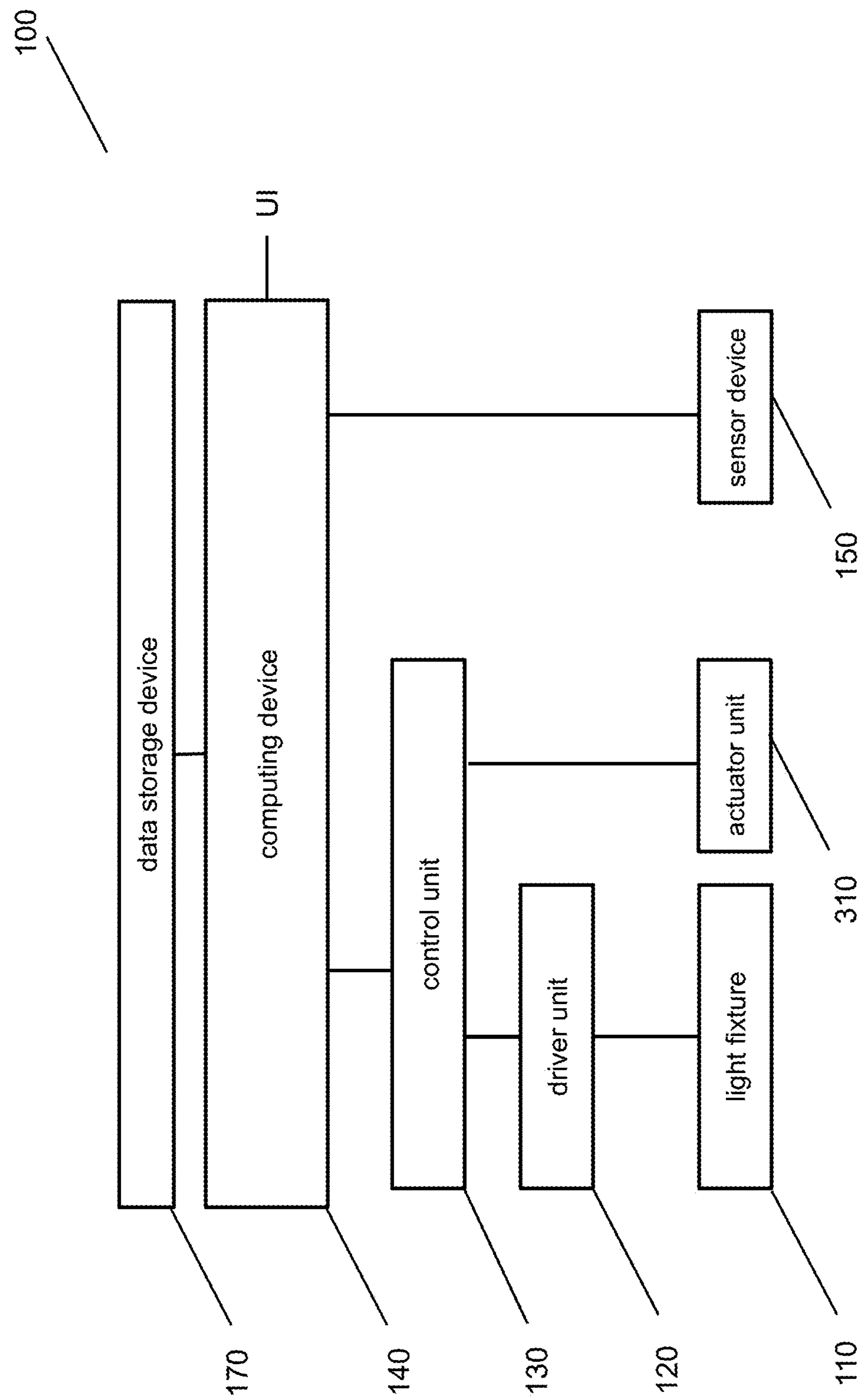
FIG. 40 shows a schematic block diagram of a controlled agricultural system according to "LiDAR Plant Surveillance".

FIG. 40 shows a schematic block diagram of a controlled agricultural system 100, according to the disclosure. The controlled agricultural system 100 comprises a computing device 140, and a light fixture 110 coupled to the computing device 140 via a control unit 130 and a driver unit 120. The data storage device 170 or even the computing device 140 may be based locally (on-site), in a network or the cloud.

The data storage device 170 comprises a database with data of control parameters for controlling the illumination. Based on the data stored in the data storage device 170, the control parameters may be adjusted by means of the control unit 130 (and the driver unit 120). Furthermore, the computing device 140 is configured to control grow parameters like nutrient concentration, via the actuator unit 310.

The controlled agricultural system 100 further comprises a sensor device 150 coupled to the computing device 140. According to the element "LiDAR Plant Surveillance" of the disclosure, the sensor device 150 is a LiDAR system, see FIG. 41, 42. It is provided for a morphological measurement of the plants grown on a growth area.

The information about the morphology of the plants may be delivered to the user or customer by a user interface (UI), e.g. a control terminal coupled to the computing device or a mobile device such as a smartphone or tablet including a dedicated application (i.e. app for mobile devices).

Figure 41:
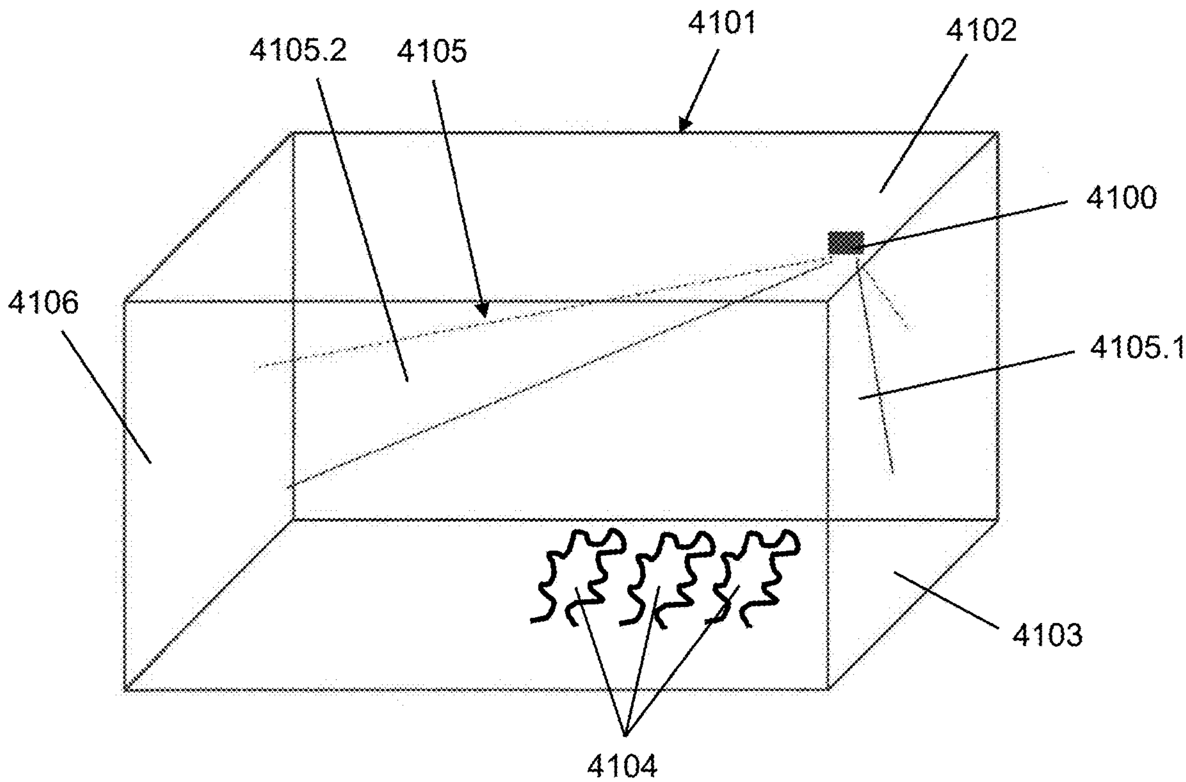
FIG. 41 shows a schematic view of a greenhouse with a distance measuring device mounted at the ceiling.

FIG. 41 shows an embodiment with a LiDAR system, namely a distance measuring device 4100. It is mounted in a greenhouse 4101, namely at the ceiling 4102 thereof. The distance measuring device 4100 is arranged above a growth area 4103 of the greenhouse 4101, on which plants 4104 are grown.

The distance measuring device 4100 is oriented towards the growth area 4103 so that the plants 4104 lie within the detection field 4105 of the distance measuring device 4100. In detail, the growth area 4103 lies within an inner region 4105.1 of the detection field 4105, in an outer region 4105.2 the distance to the wall 4106 of the greenhouse 4101 is measured. On the one hand, the wall 4106 can be used as a reference point, for instance for aligning a plurality of distance measuring devices 4100 (see FIG. 42). On the other hand, it is possible to adapt the area scanned by the distance measuring device 4100 such that only the inner region 4105.1 of the detection field 4105 is measured. This can for instance reduce the measurement and computing effort.

The distance measuring device 4100 used here is a LiDAR system which emits infrared laser pulses. Those pulses are reflected at the plants 4104 (or at any other object in the detection field 4105). The LiDAR system detects the reflected pulses (echo pulses), and the distance can be calculated from the time delay (time of flight) between emission and detection. The LiDAR system used here has a spatial resolution so that a three-dimensional distance picture is taken (a three-dimensional point cloud of distance values). Regarding possibilities for a technical implementation of the spatial resolution, reference is made to the description above.

By the spatially resolved distance measurement, the morphological structure of the plants 4104 can be evaluated. This gives information on the plant growth, enabling for instance a control whether the plants are growing as expected. Depending on this measurement, external parameters like the lighting, temperature nutrition and so on can be adjusted.

Figure 42:
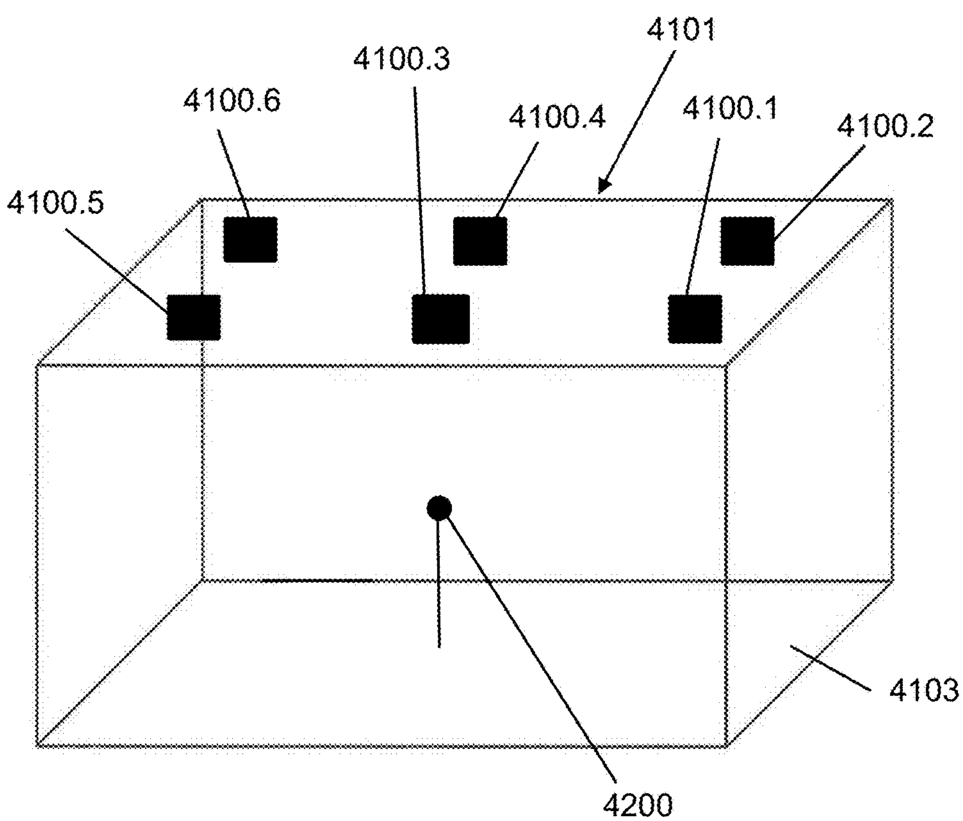
FIG. 42 shows a greenhouse with a plurality of distance measuring devices mounted at the ceiling.

FIG. 42 shows a further embodiment, namely also a greenhouse 4101 with a growth area 4103 for growing plants (not shown). At the ceiling 4102, a plurality of distance measuring devices 4100.1-4100.6 are mounted. With each distance measuring device 4100.1-4100.6, a different section of the growth area 4103 is measured, and it is measured from different angles. To align the images taken by the different distance measuring systems 4100.1-4100.6, a reference point 4200 is provided above the growth area 4103. By aligning the reference point 4200 amongst the different images taken, one single three-dimensional image of the growth area 4103 and the plants grown there can be obtained.

Light/Growth Recipes

Figure 43:
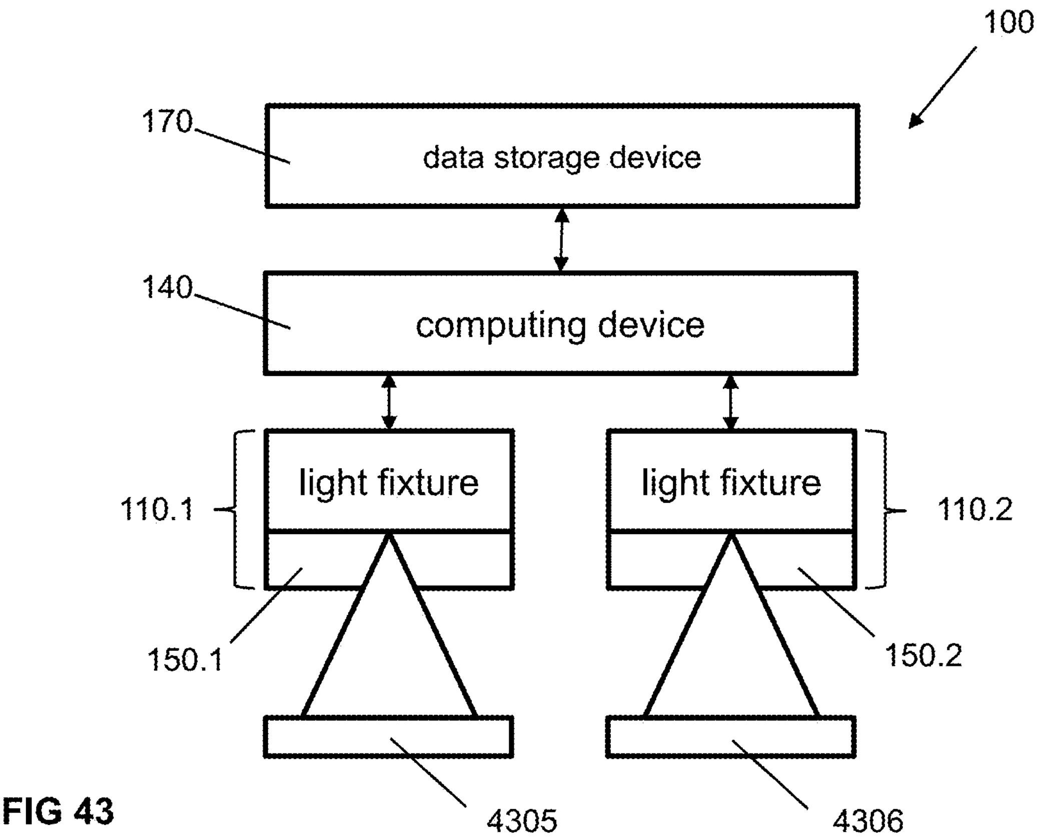
FIG. 43 shows a schematic block diagram of a controlled agricultural system, according to the disclosure.

FIG. 43 shows a schematic block diagram of a controlled agricultural system 100, according to the disclosure. The controlled agricultural system 100 comprises a computing device 140 and light fixtures 110.1, 110.2. In use, the light fixtures 110.1, 110.2 illuminate different locations 4305, 4306. Each lighting fixture 110.1, 110.2 is provided with a sensor device 150.1, 150.2 for measuring a temperature value at the respective location 4305, 4306. The sensors device 150.1, 150.2 are coupled to the computing device 140 (in between control units can be provided, which are not shown). The computing device 140 and a data storage device 170 assigned may be based locally (on-site), in a network or in the cloud.

A different temperature at the different locations 4305, 4306 leads to a different growth, in particular to a different Time to Flower. An object can be to synchronize the growth (simplified harvesting), namely achieve the same Time to Flower even though the temperature differs. In particular in vertical farms, a homogenization of the temperatures would be difficult. Therefore, the approach of the present disclosure is to compensate the different temperatures by a different lighting. For this purpose, the computing device 140 compares the temperature values measured by the sensor devices 150.1, 150.2 with a reference data set stored in the data storage device 170.

A corresponding data set can for instance be derived when a plurality of plants are grown and are, in groups, subjected to a different temperature and illumination. As a growth parameter, the Time to Flower (days) can be measured (see the description above regarding further examples). The following Table shows an evaluation matrix for Petunia Coral Pink.

| | DLI [mol/$m^2$d] | | | |
|---|---|---|---|---|
| T [° C.] | 5 | 10 | 15 | 20 |
| 14 | 80 | 65 | 50 | 42 |
| 17 | 48 | 40 | 35 | 30 |
| 20 | 35 | 30 | 28 | 25 |
| 23 | 30 | 28 | 23 | 20 |

Four different DLI values (5, 10, 15, 20 [mol/$m^2$d]) and four different temperatures (14, 17, 20, 23 [° C.]) have been applied, 16 groups having been investigated in total. For instance, Time to Flower at 23° C. and 5 mol/$m^2$d is about 30 days which is comparable to the Time to Flower at 20° C. at 10 mol/$m^2$d (~30 days). This means that in order to have the same growth rate at 23° C. and 20° C., the DLI ratio must be 1:2.

Time to flower at 20° C. at 10 mol/$m^2$d (ca. 30 days) equals same as time to flower at 17° C.: at 20 mol/$m^2$d: ca. 30 days. This means that in order to have the same growth rate at 20° C. and 17° C., the DLI ratio must be 1:2.

Time to flower at 20° C. at 5 mol/$m^2$d (gives 35 days) is same as 17° C. at 15 mol/$m^2$d gives 35 days. This means that in order to have the same growth rate at 20° C. and 17° C., the DLI ratio must be 1:3.

Time to flower at 17° C. at 5 mol/$m^2$d (gives 48 days) is almost the same as at 14° C. at 15 mol/$m^2$d (gives 50 days). This means that in order to have the same growth rate at 14° C. and 17° C., the DLI ratio must be 1:3.

These examples illustrate how a different temperature can be compensated by applying a different DLI in order to achieve the same Time to Flower. Further, also a spectral adaption of the illumination is possible, see the description above in detail.

Figure 44:
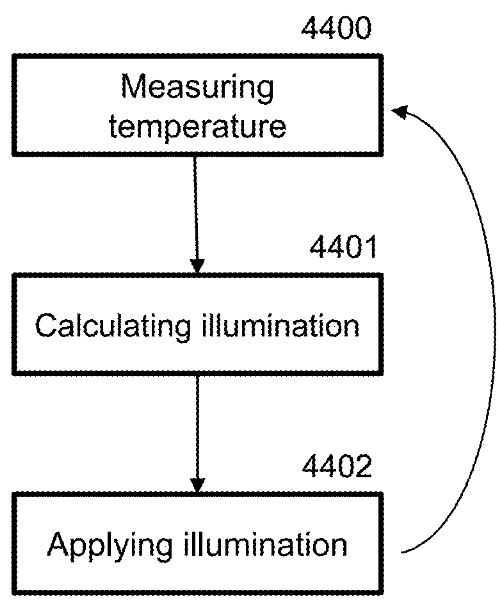
FIG. 44 shows the process or method in a schematic block diagram.

FIG. 44 shows the process or method in a schematic block diagram. The measuring 4400 of the temperature values delivers a temperature profile. The calculation 4401 of the required illumination (DLI and/or spectrum) is done with a reference data set as described above. The application 4402 of the different illumination on that basis can lead to change in temperature again, which can be considered in a feed-back-loop more or less in real-time. However, on the other hand, the temperature profile may also be measured only after quite long time intervals like hours, or only once per day.

Figure 45:
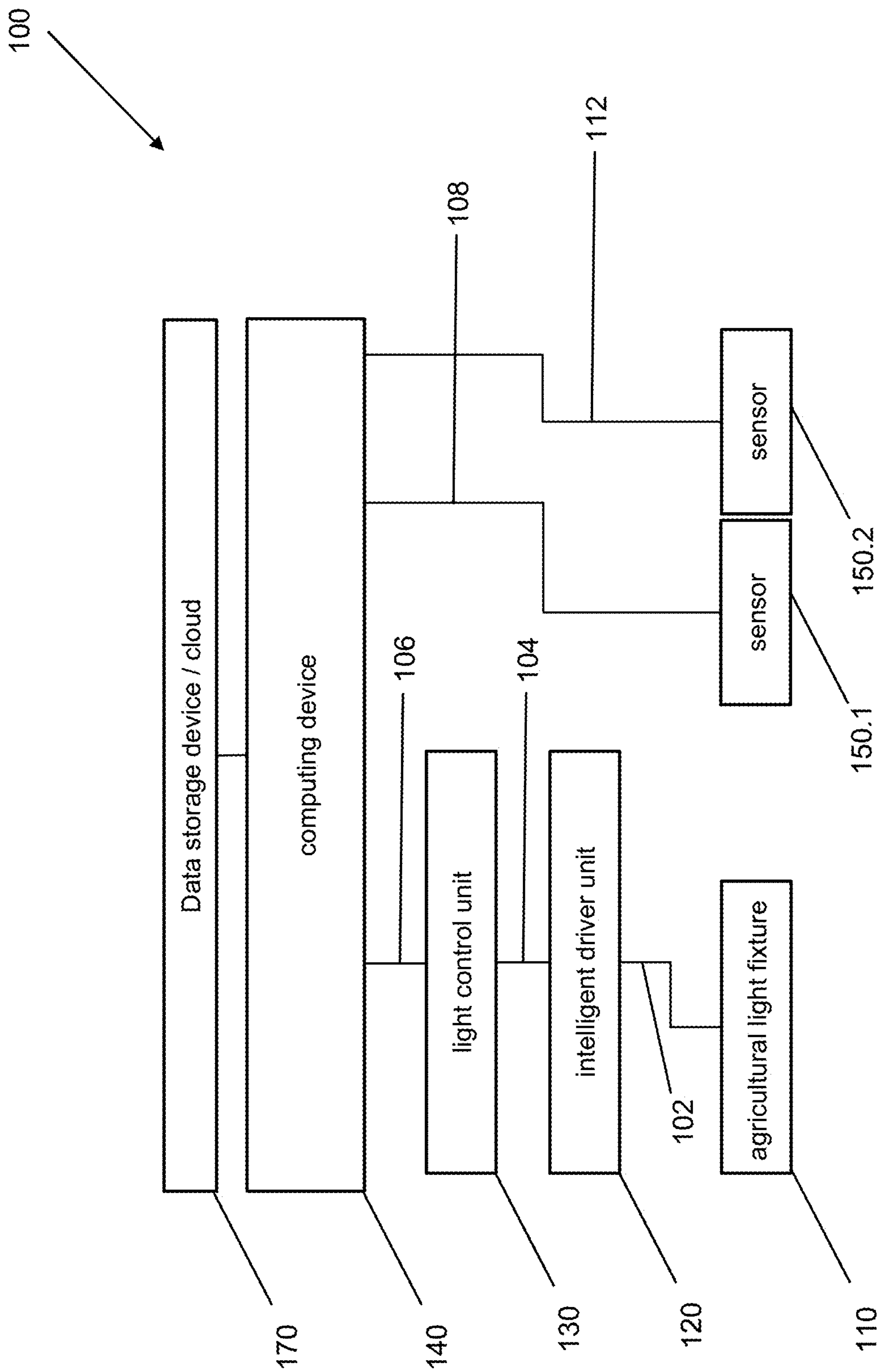
FIG. 45 shows a block diagram of an exemplary embodiment of a controlled agricultural system with adaptive additional light.

FIG. 45 shows a block diagram of an exemplary embodiment of a controlled agricultural system 100 with adaptive additional light. An agricultural light fixture 110 is connected to an intelligent driver unit 120. The intelligent driver unit 120 is configured to transmit a signal 102 to the agricultural light fixture 110. The signal can contain operational parameters to operate the individual light sources of the agricultural light fixture 110 or it can enable a fixture-stored lighting program. The connection between the agricultural light fixture 110 and the intelligent driver unit 120 may be a wired connection or a wireless connection. The transmitting signal 102 may conform to a common communication protocol. The intelligent driver unit 120 is connected to a light control unit 130. The light control unit 130 is configured to transmit a signal 104 to the intelligent driver unit 120. The signal 102 is based on the signal 104. The light control unit 130 is connected to a computing device 140, e.g. a computer system. Furthermore, the computing device 140 is connected to a first sensor 150 for measuring and analyzing the light spectrum of the ambient light (second light). Optionally, the computing device 140 is connected to a second sensor 160 for measuring and analyzing the light spectrum of the agricultural light fixture 110 (first light). The computing device 140 is configured to compute a signal 106 based on the signals 108, 112 transmitted from the sensor 150.1 (and optionally sensor 150.2) and the spectrum of the target light. The computing device 140 can be connected to a cloud computer network 170.

Figure 46:
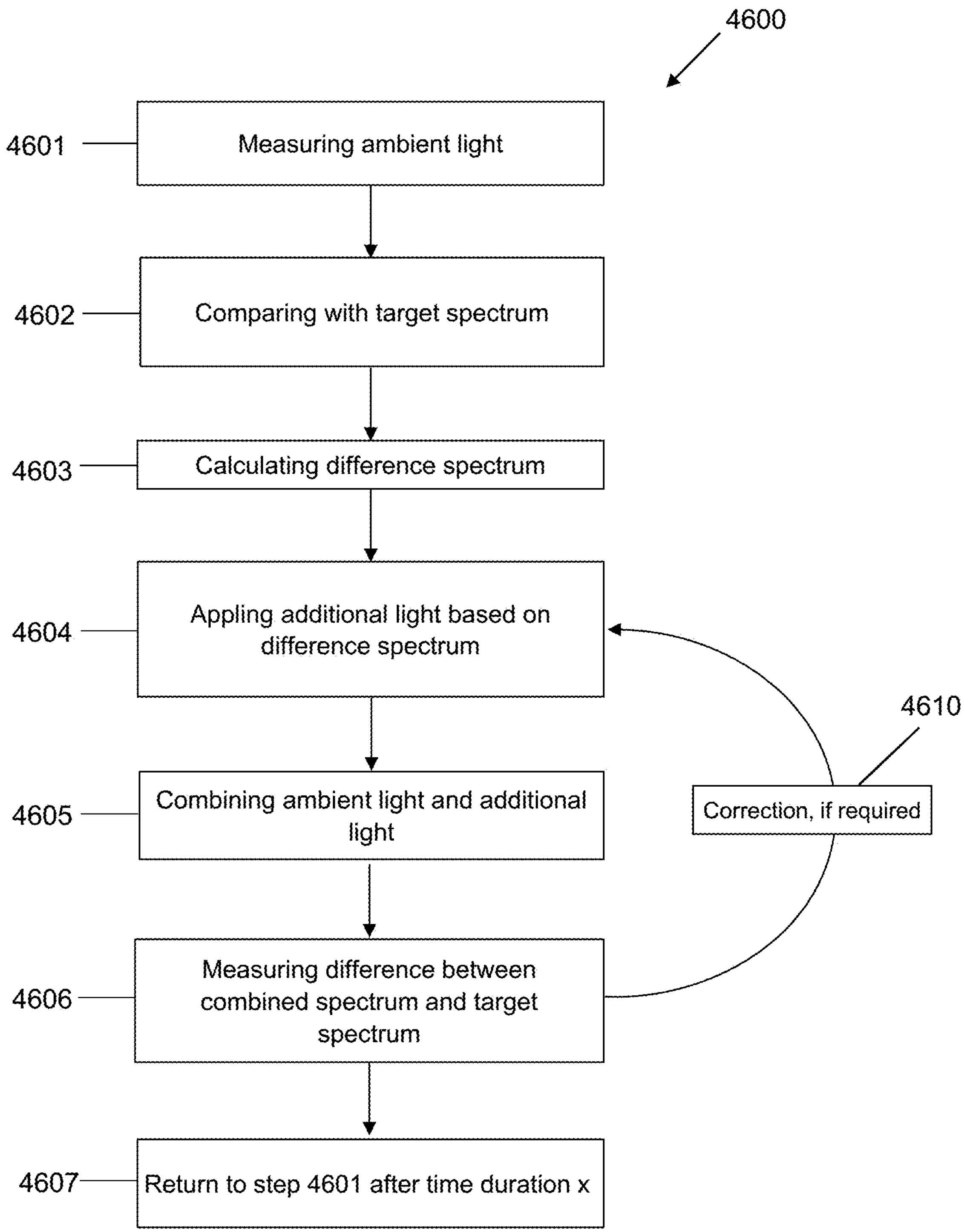
FIG. 46 shows a schematic flow chart of the method for agriculture according to the disclosure.

FIG. 46 shows a schematic flow chart 4600 of the method for agriculture according to the disclosure. Below, reference is also made to FIG. 45. In the first step 4601, the spectrum of the ambient light (second light) in the region to be irradiated is measured with the aid of the sensor 150. In the next step 4602, the spectrum of the second light is compared to the target spectrum (third light) in the computing device 140 on the basis of the measurement values. From this, the difference spectrum between the spectrum of the ambient light and the spectrum of the target light (third light) is established in the computing device 140 in the next step 4603. In the next step 4604, the light fixture 110 is actuated according to the previously established difference spectrum by way of the control unit 130 and the additional light (first light) with the difference spectrum is produced thus. Thereupon, the additional light with the difference spectrum is added to the ambient light (second light) in the region to be irradiated (target area) (step 4605). Optionally, the difference spectrum between the second and third light is measured, either continuously or at intervals, with the aid of the second sensor 4660 in the next step 4606 and, where necessary, the spectrum of the first light is appropriately corrected 4610 by returning to step 4604. Otherwise, there is a return (step 4607) to the first step 4501 after a predeterminable time duration x.

Figure 47:
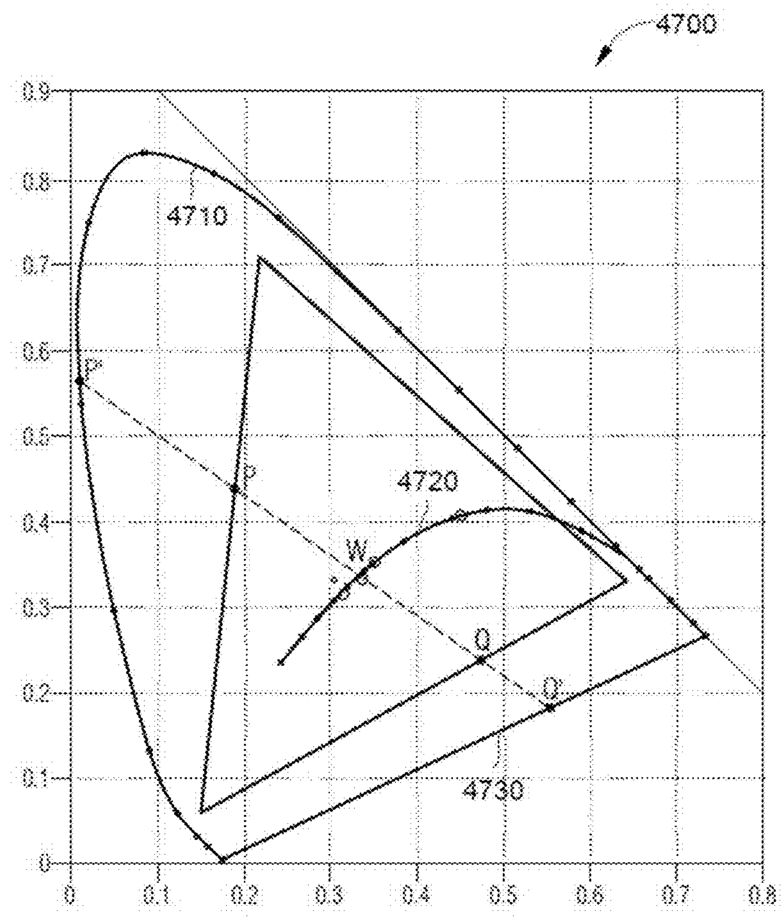
FIG. 47 shows a CIE diagram.

FIG. 47 shows a CIE diagram 4700. The area of the displayable light colors is delimited by the spectral line 4710 and the purple line 4730. Moreover, the blackbody curve 4720 is also plotted.

Figure 48:
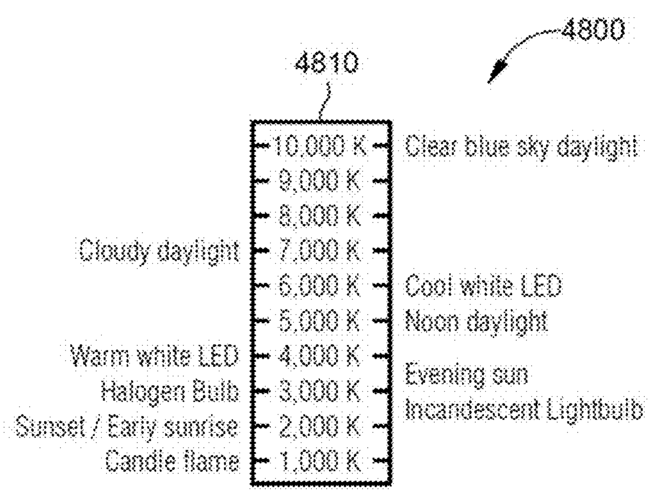
FIG. 48 shows an illustration of the color temperatures of the sunlight.

FIG. 48 shows an illustration 4800 of the color temperatures of the sunlight. In the column 4810, color temperatures from 10 000 K (top; clear blue sky daylight) to 1000 K (bottom; candle flame) are presented in 1000 K steps.

Figure 49:
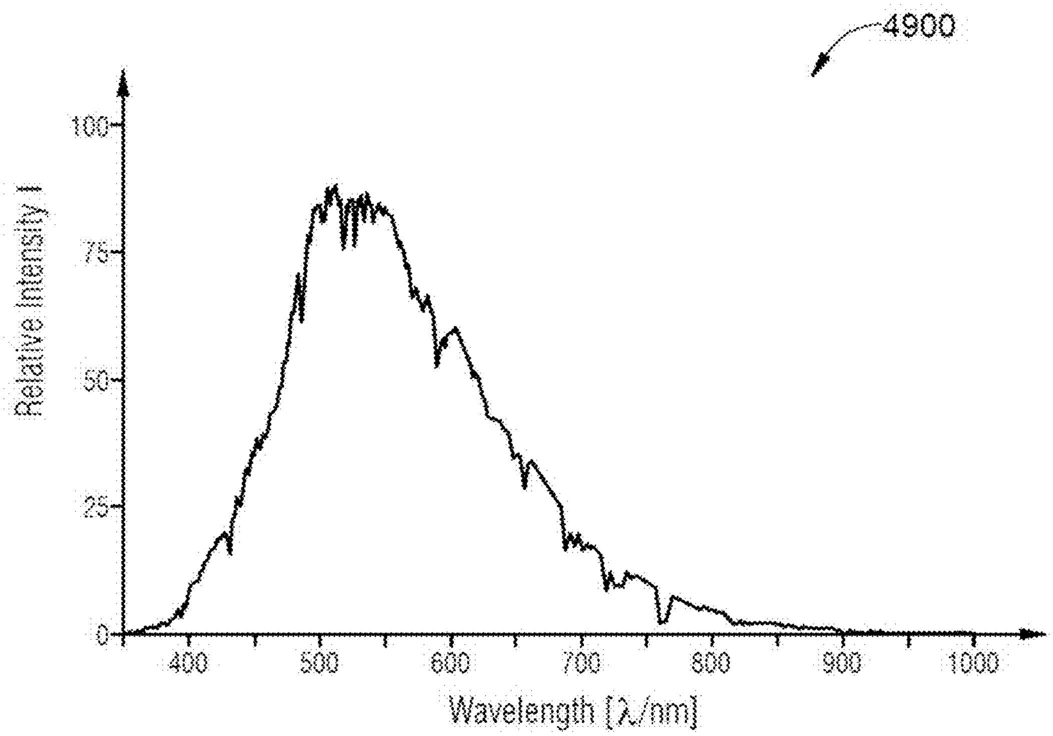
FIG. 49 shows an illustration of the solar spectrum.

FIG. 49 shows an illustration 4900 of the solar spectrum.

Figure 50:
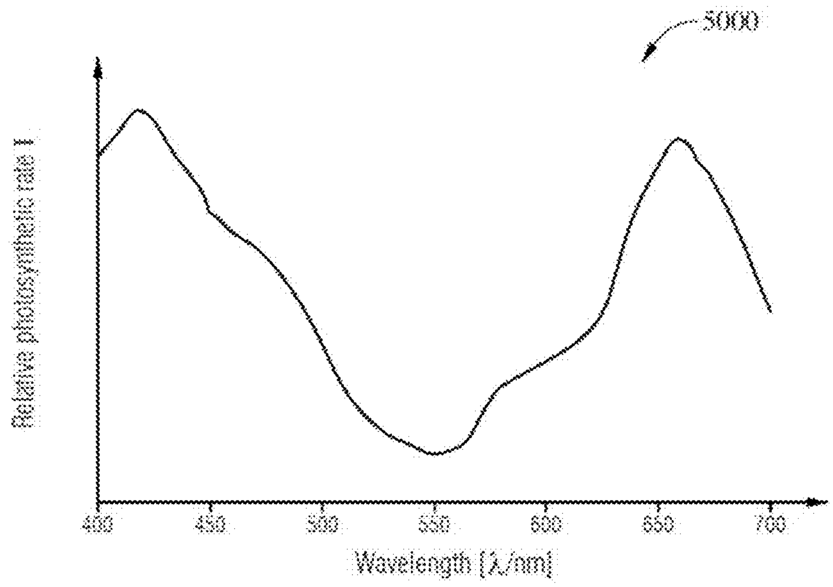
FIG. 50 shows an illustration of a target spectrum.

FIG. 50 shows an illustration 5000 of a target spectrum for an application in the horticultural sector.

Figure 51:
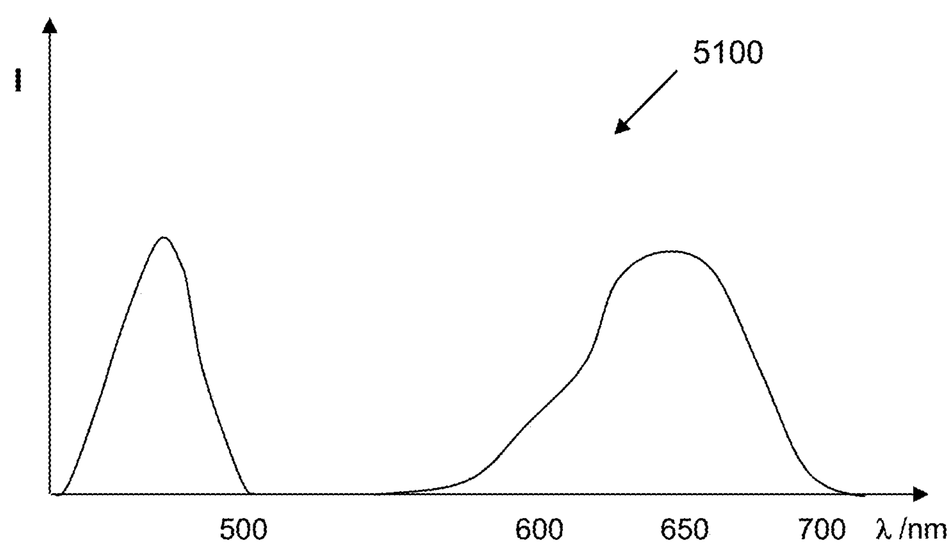
FIG. 51 shows a calculated difference spectrum.

FIG. 51 shows a calculated difference spectrum 5100 (as a basis for the actuation of the LEDs of the first light source (additional light), subdivided into discrete regions as a rule) between the solar light spectrum (FIG. 49) and the target spectrum (FIG. 50).

Proposed are a controlled agricultural system comprising a light fixture for spectral complementation of the ambient light and a method for agriculture for spectrally matching an additional light to an ambient light with the goal of obtaining a mixed light in a target area (e.g., plants) by way of the superposition of ambient light and target light, the spectrum of said mixed light at least approximately corresponding to that of a target spectrum (e.g., light recipe for the irradiation of the plants). To this end, the spectrum of the ambient light is measured (possibly only in portions) and this is used to establish the difference spectrum in relation to the target spectrum. Light fixtures designed to this end are actuated in such a way that the produced additional light at least approximately has the previously established difference spectrum. Optionally, the spectrum of the additional light is measured and compared to the difference spectrum, and the actuation of the light fixtures is corrected accordingly if required. Using this, it is possible to take account of changes in the sunlight due to weather, even in anticipatory fashion, for example.

Figure 52:
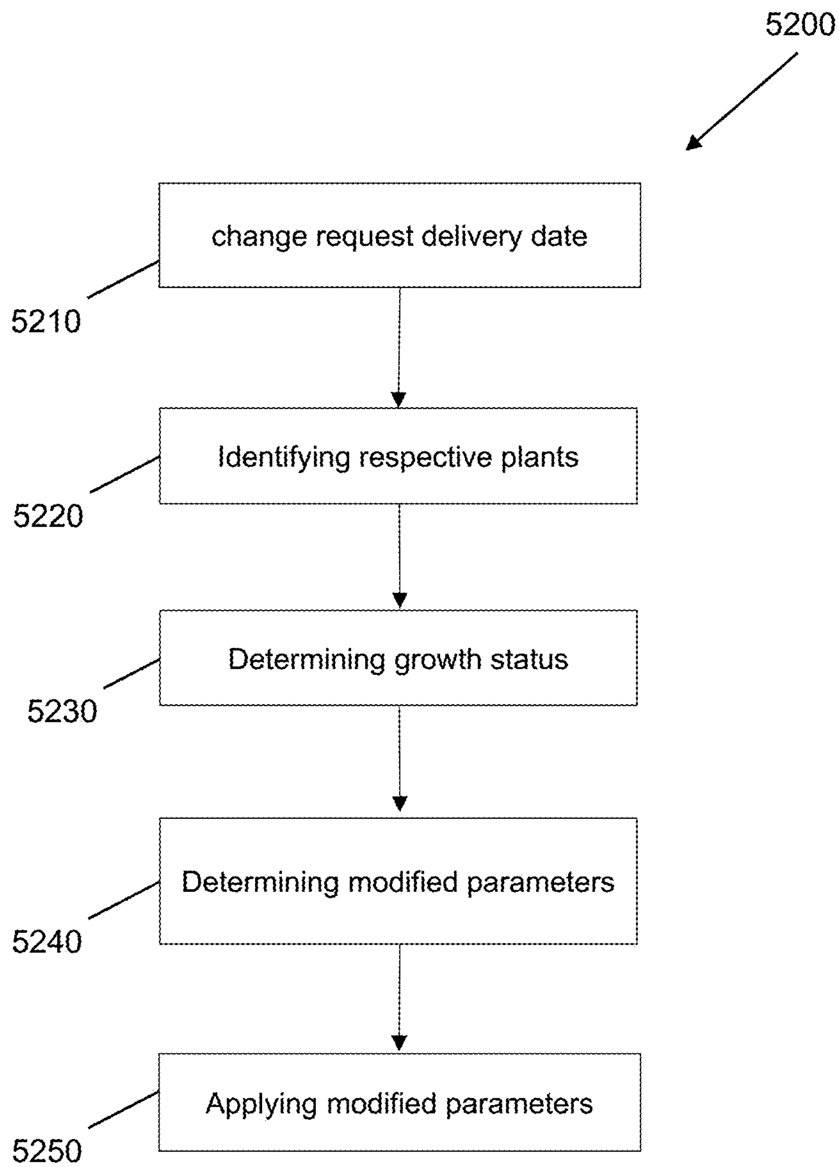
FIG. 52 shows a schematic flow chart 5200 of an exemplary embodiment of the method for agriculture according to the disclosure.

FIG. 52 shows a schematic flow chart 5200 of an exemplary embodiment of the method for agriculture according to the disclosure using the controlled agricultural system according to the disclosure (the latter is not shown).

The sequence of the method starts with the reception of the change in the delivery date for product of a plant (step 5210). This is followed by the identification of the affected plants (step 5220), e.g., with the aid of the control unit of the controlled agricultural system. To this end, the plants or plant units may be provided with machine-readable identification. This is followed by the growth status of the identified plants being determined (step 5230). The growth status and profile can be logged in a growth log, for example, and can be stored on a storage device of the controlled agricultural system. With the aid of the computing device of the controlled agricultural system and on the basis of the growth data obtained above, the modified parameters are established in the next step 5240 in such a way that this makes the desired product with the provided quality available at the amended delivery date. The quality of the product may relate to, for example, the growth phase of the plants, the degree of maturity of possible fruit, look, taste, etc. To this end, the computing device can access a database, which stores appropriate information items in respect of changing the growth (maturing) of the respective plant. By way of example, what may be stored there is that the change of the parameter x for a plant z leads to a delay or acceleration of the growth (the maturing) by y hours. From this, the computing device establishes the suitable parameter changes. Finally, the modified parameters are applied to the corresponding actuators by the control unit for the established time duration (step 5250) in order to influence the growth of the affected plants in targeted fashion. By way of example, these actuators can relate to the irradiation, i.e., for instance, change the spectrum or the intensity of a plant light fixture, the ambient temperature, the water and nutrient supply, etc.

Proposed are a controlled agricultural system and a method for agriculture for making the plant growth flexible. If there is a change in a delivery date for a product of a plant, the affected plants are initially identified and their growth statuses are established. From this, the computing device of the controlled agricultural system calculates modified control parameters for actuators which influence the plant growth in such a way that it is optionally delayed or accelerated such that the desired product is available with the sought-after quality at the amended delivery date.

Figure 53:
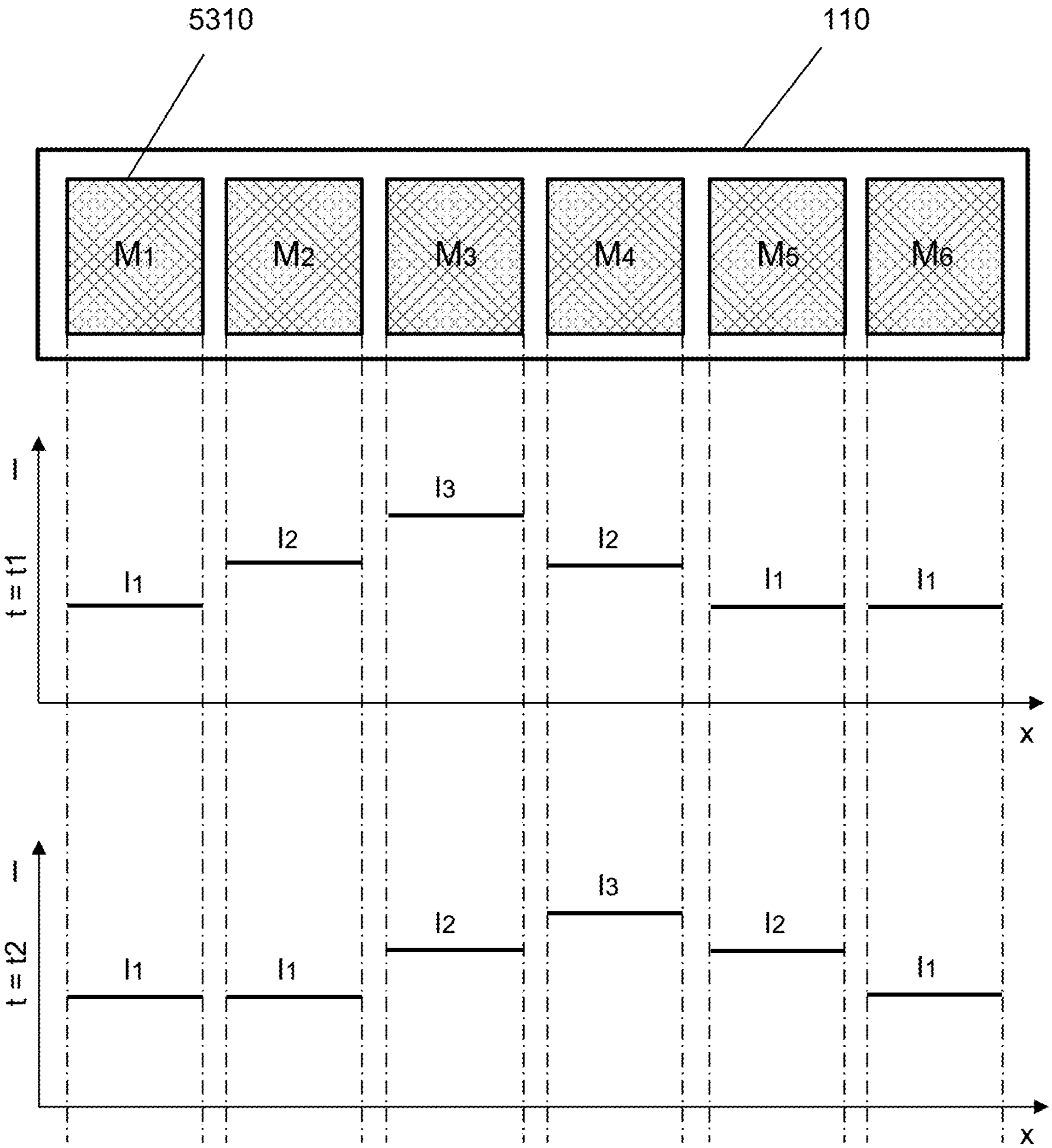
FIG. 53 schematically shows an agricultural light fixture according to an embodiment of the disclosure.

FIG. 53 schematically shows an agricultural light fixture 110 according to an embodiment of the disclosure. The agricultural light fixture 110 comprises six light modules 5310, e.g. LED modules, denoted by M1, M2 . . . M6. Each light module 5310 may comprise one or more light sources (not shown) connected to respective drivers (not shown). The agricultural light fixture 110 is elongated in shape, and the light modules 5310 are arranged in a row. The agricultural light fixture 110 may be positioned above a row of plants or any other arrangement of plants. The light modules 5310 can be controlled individually and are able to emit light with three different intensities $I_3>I_2>I_1$.

Below the agricultural light fixture 110 a first schematic diagram is shown, which indicates the light intensities $I_1$, $I_2$, $I_3$ allocated at a time $t=t_1$ to the respective light modules 5310. Specifically, at $t=t_1$ each one of the modules M1, M5 and M6 is controlled to emit light with the intensity $I_1$, modules M2 and M4 are controlled to each emit light with the intensity $I_2$, and module M3 is controlled to emit light with the maximum intensity $I_3$.

A second schematic diagram, depicted below the first schematic diagram, indicates the light intensities $I_1$, $I_2$, $I_3$ allocated at a later time $t=t_2$ to the respective light modules 5310. Now, at $t=t_2$ the module M4 is controlled to emit light with the maximum intensity $I_1$. Furthermore, modules M3 and M5 are controlled to each emit light with the intensity $I_2$, and modules M1, M2 and M6 are controlled to each emit light with the intensity $I_1$.

The two different controlling schemes shown in the two schematic diagrams of FIG. 1 result in two different intensity distributions along the agricultural light fixture 110. Particularly, the maximum light intensity $I_3$ is moved one module forward from left to right, i.e. from module M3 to module M4.

The controlling scheme may continue in similar manner as described above until one lighting cycle is complete, i.e. the modules are controlled such that the maximum intensity $I_3$ next moves to modules M5, M6, M1, M2 and, finally, to module M3 again. Then, the lighting cycle may be repeated. Alternatively, the lighting cycle may be reversed, i.e. moving the maximum intensity $I_3$ from right to left. Furthermore, the lighting cycles of two or more agricultural light fixture 110 may be synchronized in phase or out of phase.

In another embodiment (not shown), the intensity of module M1 can, once the maximum intensity has moved to the right, be lowered below its previous value in order to maximize the phototropic effect.

In addition or alternatively, as described in the main part of the description, any light module M1 to M6 may have its own specific light color temperature that can be changed as a function of a circadian time schedule and/or light intensity (photoactive radiation PAR).

Furthermore, the controlling schemes may be combined with specific light recipes for respective plant species.

Figure 54:
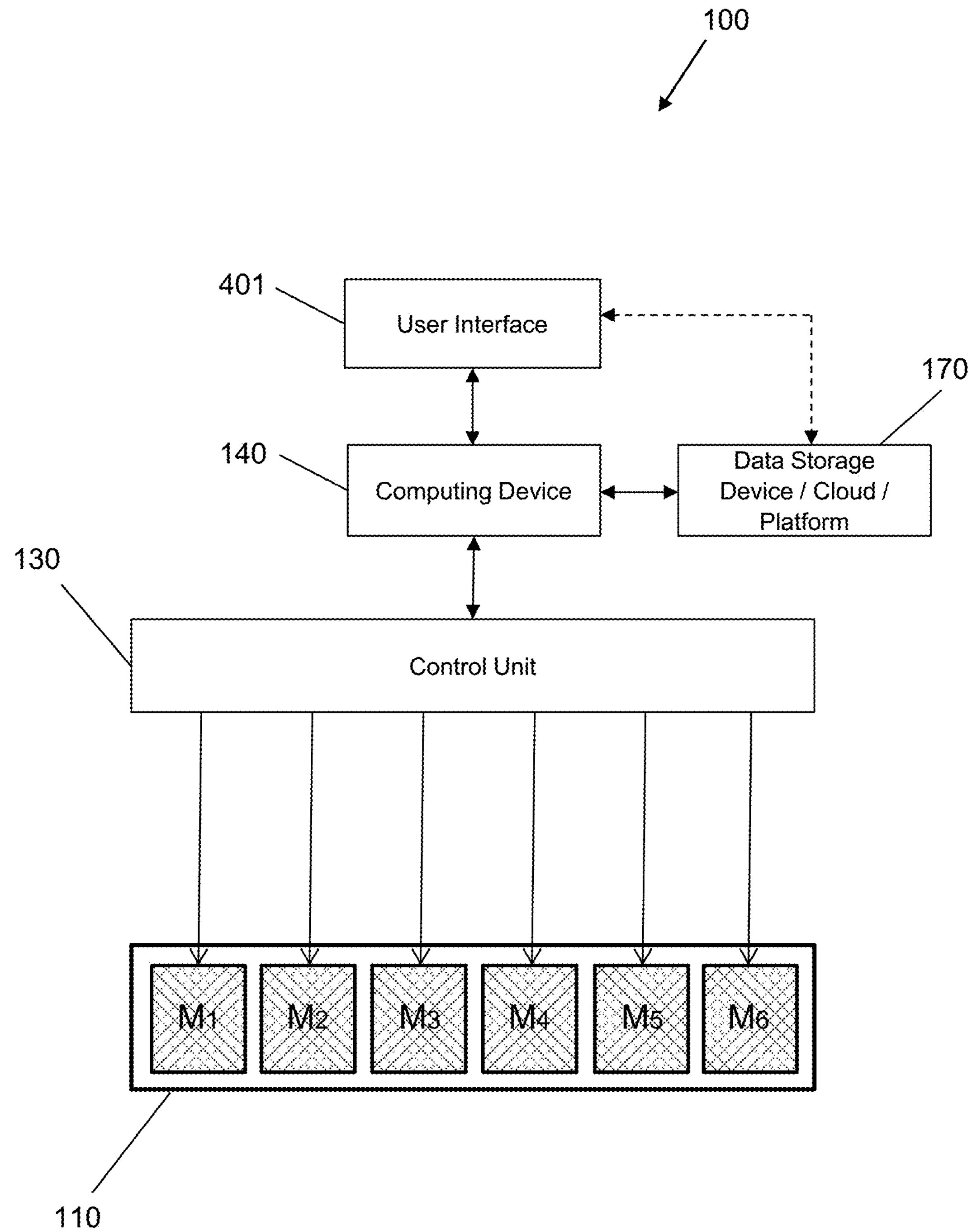
FIG. 54 shows a schematic block diagram of a controlled agricultural system, according to the disclosure.

FIG. 54 shows a schematic block diagram of a controlled agricultural system 100, according to the disclosure. The controlled agricultural system 100 comprises a computing device 140, a data storage device 170, coupled to the computing device 140, and the horticultural light fixture 110 according to FIG. 53. The horticultural light fixture 110 is coupled to the computing device 140 via a control unit 130, whereby each one of the six light modules M1 to M6 can be controlled individually.

Optionally, the controlled agricultural system may further comprise a sensor device (not shown), coupled to the computing device via a dedicated control unit and/or an actuator device (not shown), coupled to the computing device via another dedicated control unit. The sensor device may comprise sensors for monitoring and detecting the growth status of the plants, e.g. one or more cameras, or one or more thermo sensors, etc. The actuator device may comprise means for irrigation, air-conditioning, fertilization, etc.

The data storage device 170 or even the computing device 140 may be based locally (on-site) or in a (centralized) network or the cloud. Furthermore, the data storage device 170 may also be integrated into the computing device 140. The data storage device 170 may include a (digital/online-) platform, e.g. located in the cloud. The platform may also be accessible by mobile devices, e.g. laptop PC, tablet PC or smartphones via dedicated apps. Therefore, a user may access the platform via the computing device 140 or a separate device (not shown). Furthermore, the platform may comprise dashboards customized to various user groups such as growers and customers.

The data storage device 170 comprises a database in which the controlling schemes for the light modules M1 to M6 are stored. Furthermore, growth settings, including light recipes, for various plants species, growth stages, On-Off-cycle, and the like, may be stored. Furthermore, the database may comprise data of controlling schemes from previous plant projects, e.g. from other growers using the same platform.

The computing device 140 is configured to control the light modules 110 of the horticultural light fixture 110 via the control unit 130, based on the data of the controlling schemes stored in the data storage device 170. Furthermore, as the case may be, the computing device 140 is configured to control the optional sensor device and/or actuator device.

Figure 55:
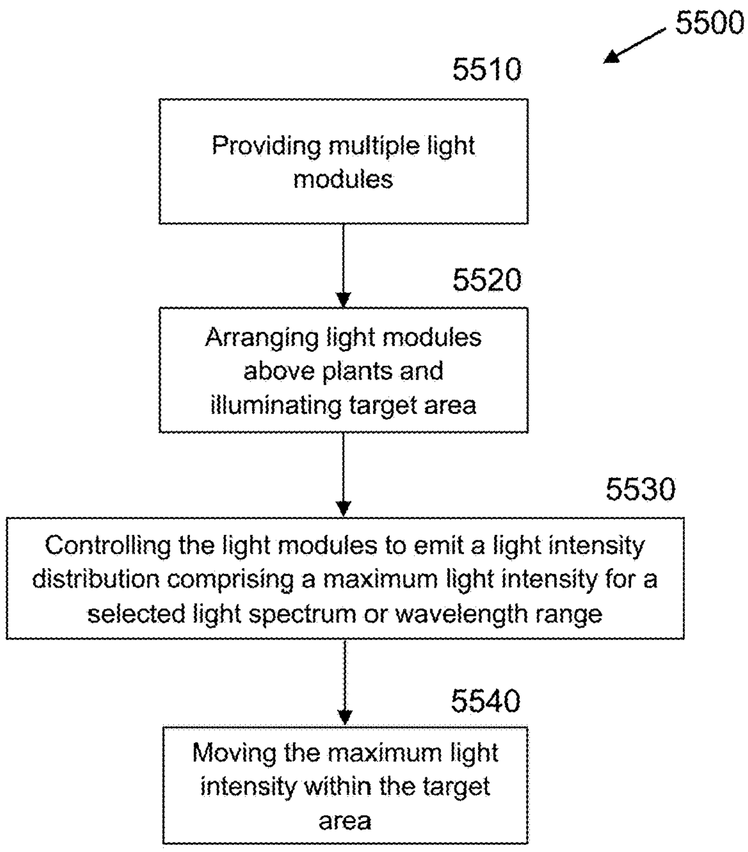
FIG. 55 schematically shows the steps of a method for agricultural management according to the disclosure.

FIG. 55 schematically shows the steps 5500 of a method for agricultural management according to the disclosure. The method aims to induce movements in the plants by moving a light intensity distribution comprising a maximum light intensity across a target area that is cultivated with plants (one or more). Particularly, the method may be performed by means of the controlled agricultural system 100 showed in FIG. 54. The method comprises the following steps:

- Step 5510: Providing multiple light modules, which can be controlled individually or in groups;
- Step 5520: Arranging the multiple light modules above the plants and illuminating the target area;
- Step 5530: Controlling the light modules to emit light on the target area having an intensity distribution that comprises a maximum light intensity for a selected light spectrum or wavelength range;
- Step 5540: Moving the maximum light intensity within the target area.

In step 5510, controlling the light modules may mean, for instance, switching the light modules on and off, changing the intensity and/or spectrum of the light emitted by the light modules gradually, continuously or erratically.

In step 5520, the light modules may be arranged in a row along an elongated cultivating area.

In step 5530, at least one light module or at most a subset of the multiple light modules of the light fixture has to be controlled such that its light intensity is higher than the light intensity of at least one other light module illuminating the target area. For instance, the multiple light modules may be controlled such that only one light module emits light with the maximum intensity, i.e. an intensity higher than the intensities of the light emitted by any other light module of the respective light fixture. The controlling scheme may than be designed for the maximum light intensity to move from one light module to another and so forth.

In step 5540, moving the maximum light intensity may be performed by changing the controlling scheme of the light modules as exemplarily described in the embodiment shown in FIG. 53.

A Controlled Agricultural System (100) is proposed, comprising an agricultural light fixture (110) for inducing movement of the illuminated plants. For this purpose, the agricultural light fixture (110) comprises multiple light modules (M1 to M6), which are controllable individually or in groups. Furthermore, the Controlled Agricultural System (100) is configured for controlling the light modules such that a light intensity distribution comprising a maximum light intensity is emitted by the agricultural light fixture (110), whereby the maximum light intensity moves from one light module to another light module.

Figure 56A:
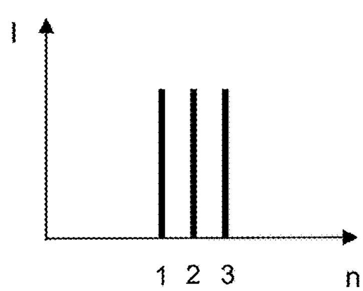
FIG. 56A, 56B schematically show intensities of LEDs.
Figure 56B:
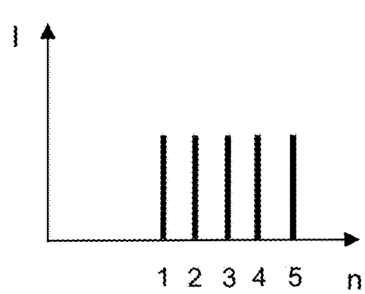

FIGS. 56A, 56B in each case schematically show, in comparison for a light recipe, the intensities I of structurally identical LEDs in different numbers n. In exemplary fashion, FIG. 56*a* corresponds to the conditions 5600 in a first light fixture with three LEDs (n=3) of a certain type. Here, the respective intensities of the three LEDs are set to the value $I_1$. By contrast, FIG. 56*b* corresponds, in exemplary fashion, to the conditions 5620 in a second light fixture with five structurally identical LEDs (n=5), i.e., LEDs of the same type but in greater number. Here, the respective intensities of the five LEDs are set to the lower value $I_2$, i.e., $I_2<I_1$; in this case, $I_2=\frac{3}{5}$. As a result, the larger number of LEDs over FIG. 56*a* (n=5 versus n=3) is compensated for in the light recipe. The variant in which the respective intensities of the values $I_2$ are different, but the overall value thereof corresponds to the predetermined reduction factor, does not have a figure.

Figure 57:
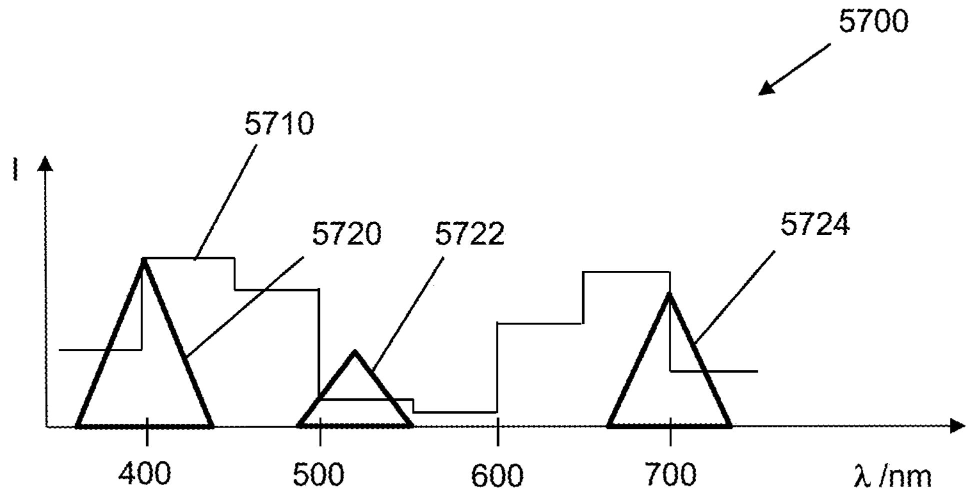
FIG. 57 shows a schematic comparison of spectra.

FIG. 57 shows a schematic comparison 5700 between a target spectrum 5710 and the spectra 5720, 5722, 5724 of three LEDs with maxima at 100 nm, 520 nm and 700 nm, said spectra being coarsely approximated as triangles (in fact, they tend to be Gaussian-like). Here, the target spectrum 5710 of the light recipe is available in 50 nm wide intensity steps (the tendency being to usually select smaller ranges). For the approximation, the LEDs (to the extent that they are available) are selected in such a way that the deviation to the target spectrum is minimized over the entire curve for the resultant LED spectra. (In this case, the selected LED spectrum has an overshoot in the green range. It is possible to prescribe the boundary condition that the LEDs may only have a maximum intensity here).

Figure 58:
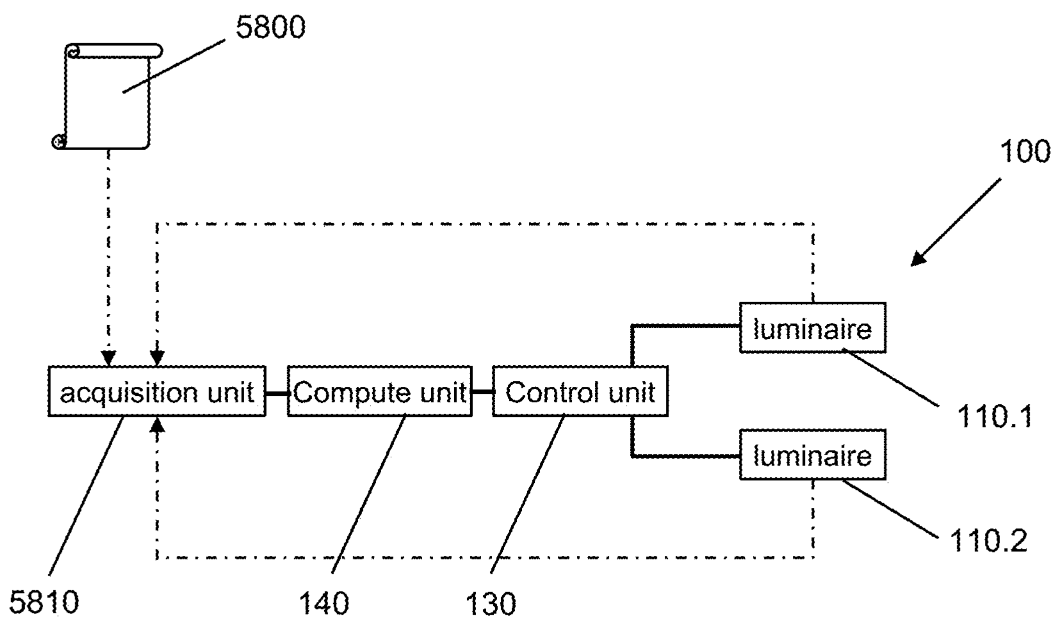
FIG. 58 shows the schematic design of a controlled agricultural system according to the disclosure.

FIG. 58 shows the schematic design of a controlled agricultural system 100 according to the disclosure, reduced in this case to the major components of acquisition unit 5810, computing device 140, control unit 130 and a first light fixture 110.1 and a second light fixture 110.2. Instead of two light fixtures, provision may also be made for only one light fixture or for more than two light fixtures. The parameters of the light fixtures 110.1 and 110.2, for example the number and type of the LEDs installed in the respective light fixture, are acquired by way of the acquisition unit 5810, in some embodiments/implementations in automated fashion. It is likewise conceivable for the acquisition unit to call up the light fixture data from a database. The light recipe 5800 is likewise acquired, for example the light recipe for the maturing process of a certain plant. On the basis of the light recipe 5800 and the parameters of the light fixtures 110.1, 110.2, the computing device 140 establishes, for each light fixture, a suitable selection of the light sources (e.g., LEDs; not illustrated) and the actuation thereof (e.g., the light intensity) in such a way that the light recipe 5800 is reproduced to the best possible extent by both light fixtures 110.1 and 110.2 within the scope of what is technically possible for the respective light fixture. The data of the generic light recipe 5800, in each case suitably transformed for the specific light fixtures 110.1, 110.2, are transmitted from the computing device 140 to the control unit 130, which correspondingly actuates the light fixtures 110.1, 110.2 or the selected light sources situated therein.

Figure 59:
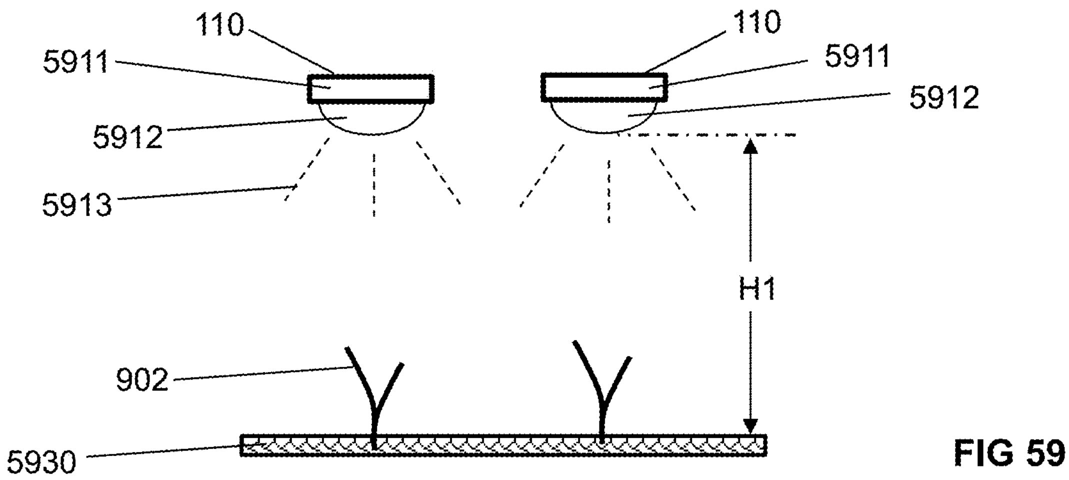
FIG. 59 schematically shows a first illumination configuration of an embodiment according to the disclosure.

FIG. 59 schematically shows a first illumination configuration of an embodiment according to the disclosure. For illustrative purpose, two horticultural light fixtures 110 of the same type (downlights) are shown, which illuminate plants 902 arranged on a cultivated area 5930 below the horticultural light fixtures 110. Each of the horticultural light fixtures 110 comprise a light source device 5911 and an optical device 5912 attached downstream to the light source device 5911.

The dashed lines 5913 schematically indicate a broad beam angle of the light emitted by the horticultural light fixtures 110. The reference sign H1 denotes the distance between the horticultural light fixtures 110 and the cultivated area 5930. H1 is relatively large. The broad beam angle and the relatively large distance between the horticultural light fixtures 110 and the plants 902 result in a relatively low light intensity on the plants 902 during illumination.

Figure 60:
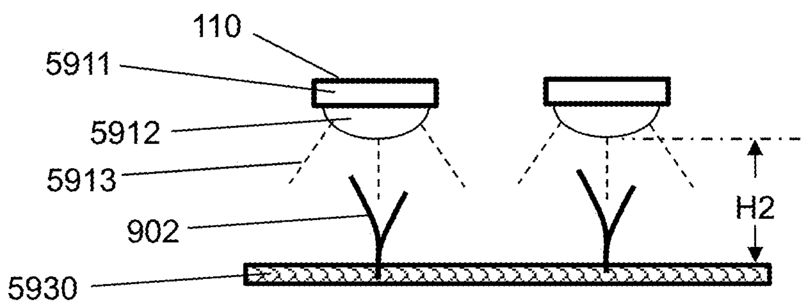
FIG. 60 schematically shows a second illumination configuration of the embodiment shown in FIG. 59.

FIG. 60 schematically shows a second illumination configuration of the embodiment shown in FIG. 59. In this second illumination configuration, the distance H2 between the horticultural light fixtures 110 and the cultivated area 5930 has been decreased, i.e. H2<H1. Consequently, the distance between the horticultural light fixtures 110 and the plants 902 has also been decreased. Due to this lowering of the horticultural light fixtures 110 down closer to the plants 902, the light intensity on the plants 902 during illumination has been increased without increasing the current setting of the horticultural light fixtures 110, i.e. without increasing the power consumption.

On the other hand, power consumption of the horticultural light fixtures 110 may even be reduced, if the light recipe specifies a light intensity that is lower than the one achieved by decreasing the distance between horticultural light fixtures 110 and plants 902. In this case, the brightness of the light source devices 5911 will be reduced, respectively, such that the light intensity at the plants matches with the light recipe.

Figure 61:
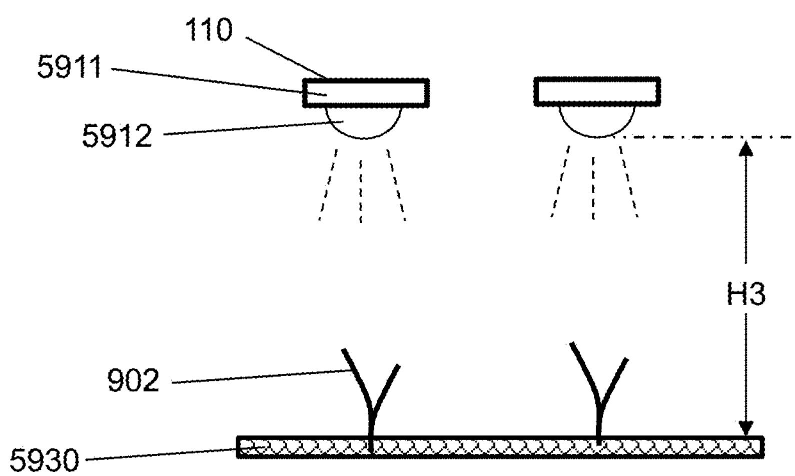
FIG. 61 schematically shows a third illumination configuration of the embodiment shown in FIG. 59.

FIG. 61 schematically shows a third illumination configuration of the embodiment shown in FIG. 59. Compared to FIG. 59, the focal length of the optical devices 5912 has been adjusted to focus the illumination more on the plants. Consequently, the light intensity on the plants 902 during illumination has been increased due to proper adjustment of the optical devices 5912. This, again, can be counteracted by a respective reduction of the brightness of the light source device 5911, depending on the illumination specified by the light recipe.

Figure 62:
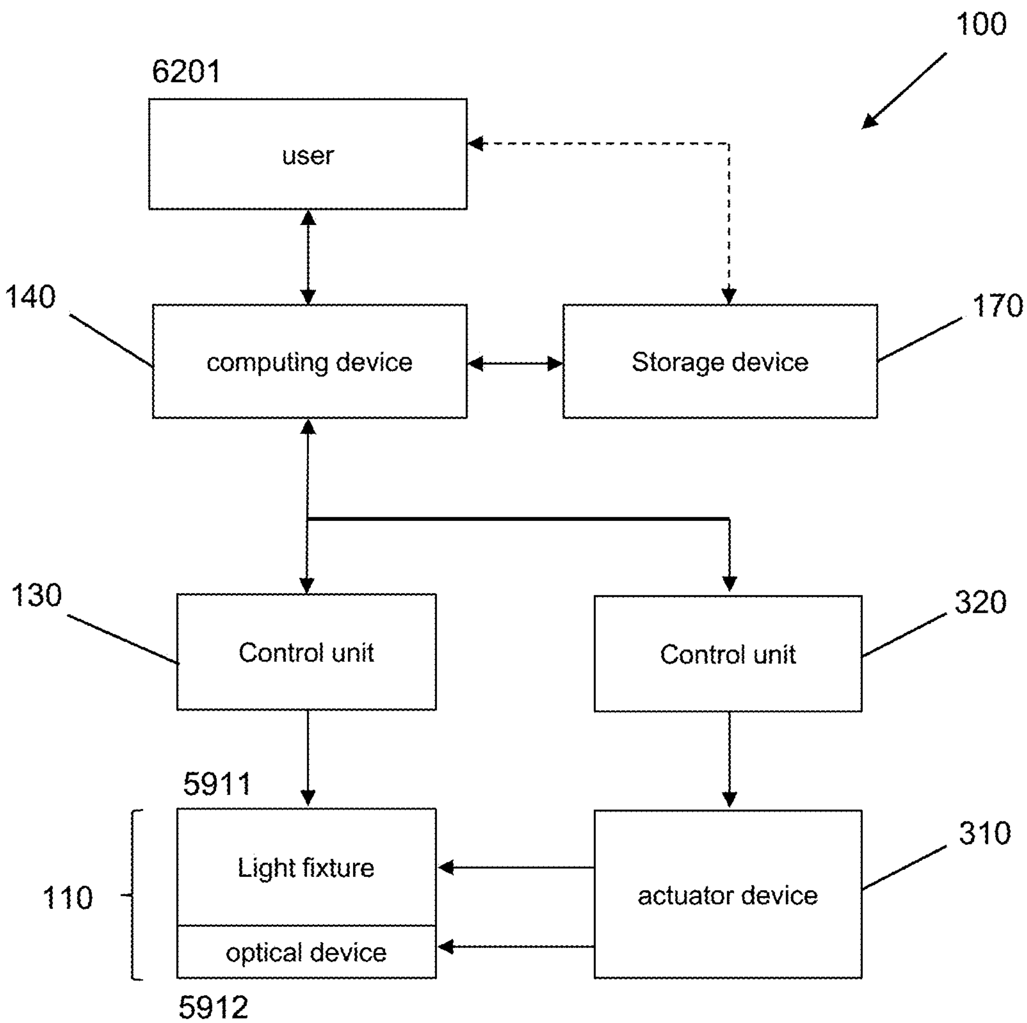
FIG. 62 shows a schematic block diagram of a controlled agricultural system according to the disclosure.

FIG. 62 shows a schematic block diagram of a controlled agricultural system 100 according to the disclosure. The controlled agricultural system 100 comprises a computing device 140, a data storage device 170, coupled to the computing device 140, an agricultural light fixture 110 as shown in FIGS. 59 to 61, coupled to the computing device 140 via a control unit 130 and an actuator device 310, coupled to the computing device 140 via another control unit 320. For illustrative purposes, only one agricultural light fixture 110 is shown. In practice, agricultural facilities can comprise a multitude of similar agricultural light fixtures.

The actuator device 310 is configured to be able to control the position/alignment of the agricultural light fixture 110 and/or the focal length of the optical device and/or the form and shape of a reflective element of the optical device 5912.

The data storage device 170 or even the computing device 140 may be based locally (on-site) or in a (centralized) network or the cloud. Furthermore, the data storage device 170 may also be integrated into the computing device 140. The data storage device 170 may include a (digital/online-) platform, e.g. located in the cloud. The platform may also be accessible by mobile devices, e.g. laptop PC, tablet PC or smartphones via dedicated apps. Therefore, a user 6201 may access the platform via the computing device 140 or a separate device (not shown). Furthermore, the platform may comprise dashboards customized to various user groups such as growers and customers.

The data storage device 170 comprises a database in which growth settings, including light recipes, for various plants species are stored. Furthermore, the database may comprise data documenting previous plant projects, e.g. from other growers using the same platform. The data storage device 170 may also comprise software programs, which can be uploaded into and executed by the computing device 140, particularly for controlling the (at least one) agricultural light fixture 130 according to the light recipe. The data storage device 170 may also comprise information on how mechanical and optical modifications of the agricultural light fixture influence the illumination at the plants.

The computing device 140 is configured to control the actuator device 310 and the agricultural light fixture 110 in order to achieve an intensity of the illumination on the plants according to the light recipe stored in the data storage device 170. Particularly, the computing device 140 is configured to adjust the alignment of the agricultural light fixture 110 and/or the focusing of the optical device 5912 such that the intensity of the illumination on the plants according to the light recipe is achieved with lower current for the light sources compared to the current necessary without supplemental adjustment.

Furthermore, a sensor (not shown) may be installed and connected to the computing device via a suitable control device to measure the light intensity at the plants. The horticultural light fixture and/or the optical device may be controlled such that the measurement results match with the light recipe.

A Controlled Agricultural System, particularly for breeding, growing, cultivating and harvesting in an agricultural facility, particularly a plant growing facility and/or an aquaponics facility, comprises at least one horticulture light fixture arranged above an area cultivated with plants for illuminating the plants. The Controlled Agricultural System is configured to effectuate the intensity of the illumination specified by a light recipe by, for example, bringing the horticultural light fixture closer to the plants, for example, by lowering the horticulture light fixture down closer to the plants, in conjunction with reducing the power settings (brightness) of the light sources, compared to the otherwise necessary power settings. Alternatively or additionally, in conjunction with a reduction of the power settings of the light sources, the illumination is more focused on parts of the cultivated area, on the plants or even on parts of the plants by means of a suitably adjusted optical device.

Figure 63:
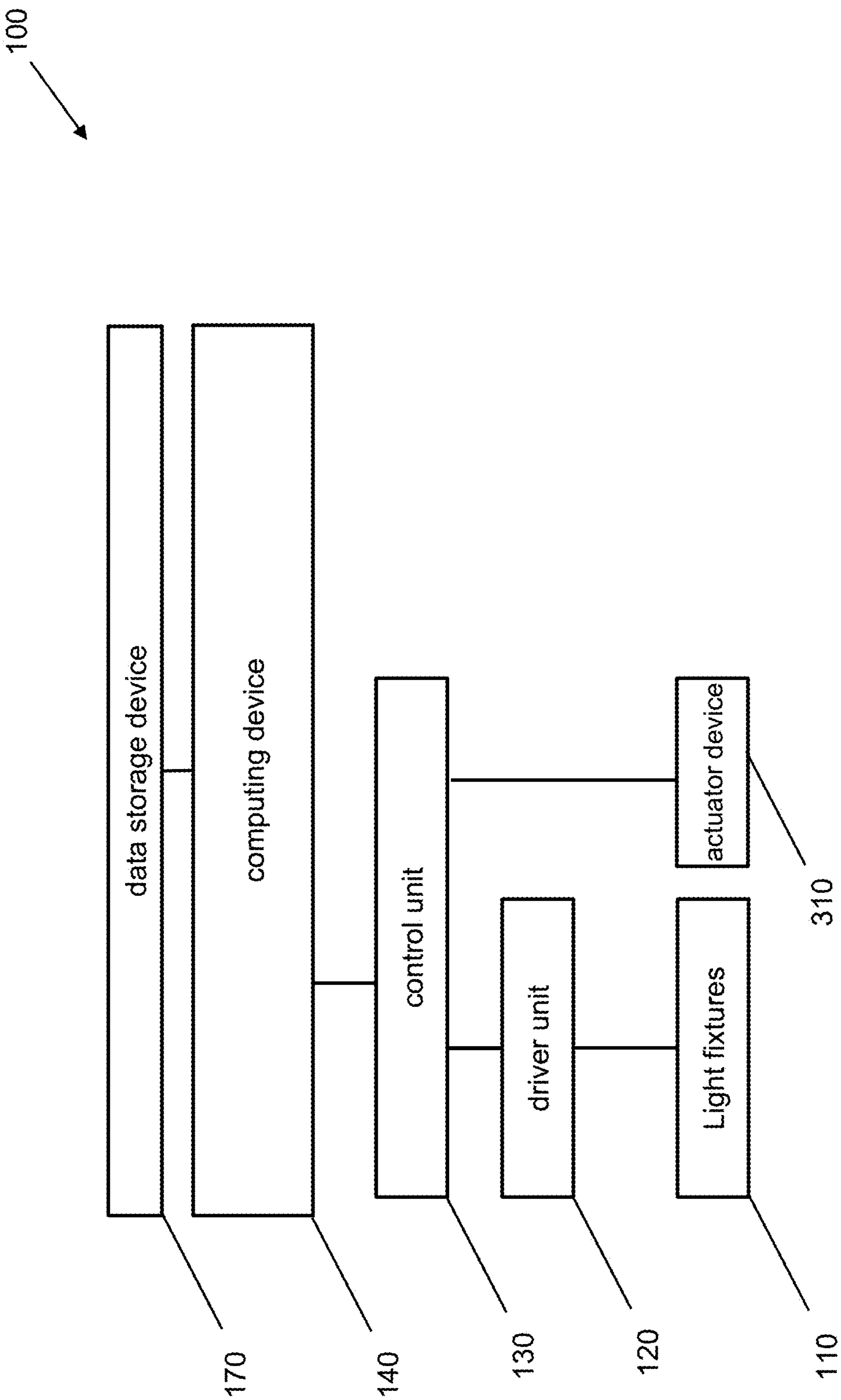
FIG. 63 shows a schematic block diagram of a controlled agricultural system, according to the disclosure.

FIG. 63 shows a schematic block diagram of a controlled agricultural system 100, according to the disclosure. The controlled agricultural system 100 comprises a computing device 140, a data storage device 170, coupled to the computing device 140 and an actuator device 310, coupled to the computing device 140 via a control unit 130. The data storage device 170 or even the computing device 140 may be based locally (on-site), in a network or the cloud.

The data storage device 170 comprises a database with data of control parameters for controlling the agricultural system 100. Based on the data stored in the data storage device 170, the control parameters may be adjusted by means of the actuator device 310. To this end, the computing device 140 can be configured to adjust irrigation, manuring, heating/ventilation or the like. Furthermore, the computing device 140 is configured to control light fixtures 110 (via the control unit 130 and a driver unit 120) to apply a defined illumination.

Figure 64:
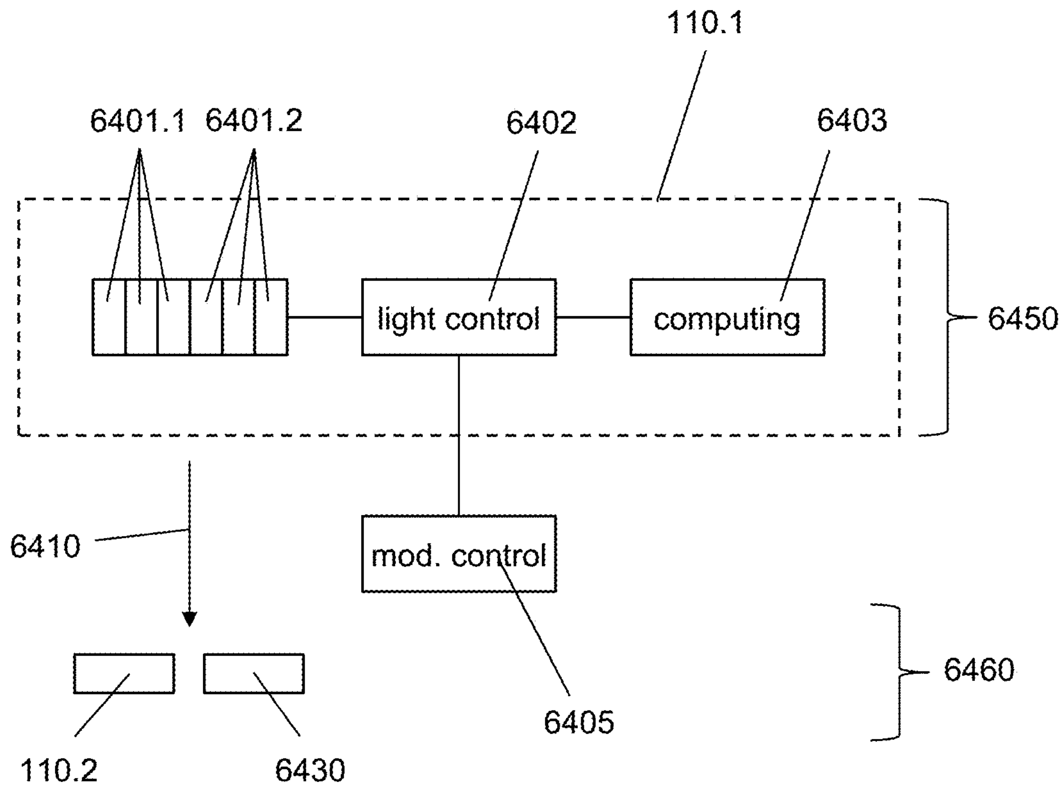
FIG. 64 shows a schematic block diagram of a light fixture.

FIG. 64 shows a schematic block diagram of a light fixture 110.1 comprising a plurality of light sources 6401. The light sources 6401 are of different types 6401.1, 6401.2 for providing light with different spectral properties. Typically, more than two different types will be provided, which is not shown for the sake of simplicity. The light fixture 110.1 further comprises a light control unit 6402 and a computing unit 6403 connected thereto. These units could also be provided externally.

A control unit 6405 for modulating the emission is provided as an external device. In FIG. 64, it is connected to the light control unit 6402. The control unit 6405 triggers the light control unit 6402 such that an emission of the light sources 6401 is modulated. For instance, for the modulation, the light sources 6401 can be switched off and on again and/or PWM-modulated with a high frequency. Accordingly, data can be coded in the emission, and the modulated signal 6410 can be used for transmitting this data.

As a receiver, for instance a second light fixture 110.2 and/or an actuator device 6430 can be provided. Likewise, lighting or actuation parameters can be transmitted. Regarding different modes of operation being possible (modulation of one/all light source types 6401.1, 6401.2 and so on) reference is made to the description above.

The control unit 6405 can be connected to the computing device 140 of the system shown in FIG. 63. In some embodiments/implementations, the lighting/actuation parameters are transmitted from the first light fixture 110.1 as a master 6450 to the second light fixture 110.2 or the actuator device 6430 as a slave 6460. As an alternative to the embodiment shown, the control unit 6405 can also be connected to the computing unit 6403.

Figure 65:
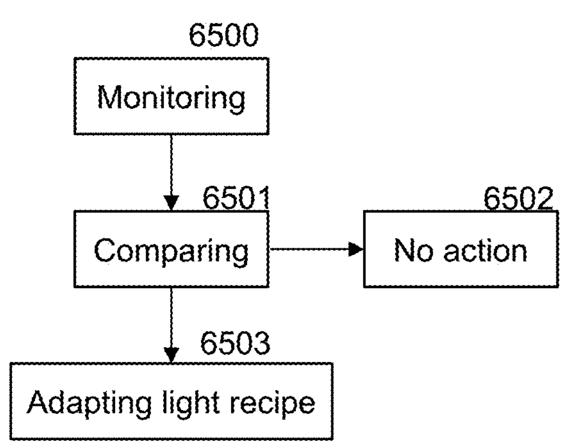
FIG. 65 illustrates a monitoring of the reduced lighting.

FIG. 65 illustrates a monitoring 6500 of the reduced lighting resulting from the modulation. Upon a comparison 6501 with a threshold value, no action 6502 is taken as long as a threshold value is not reached. Upon reaching 6503 the threshold value, the light recipe is adapted.

Figure 66:
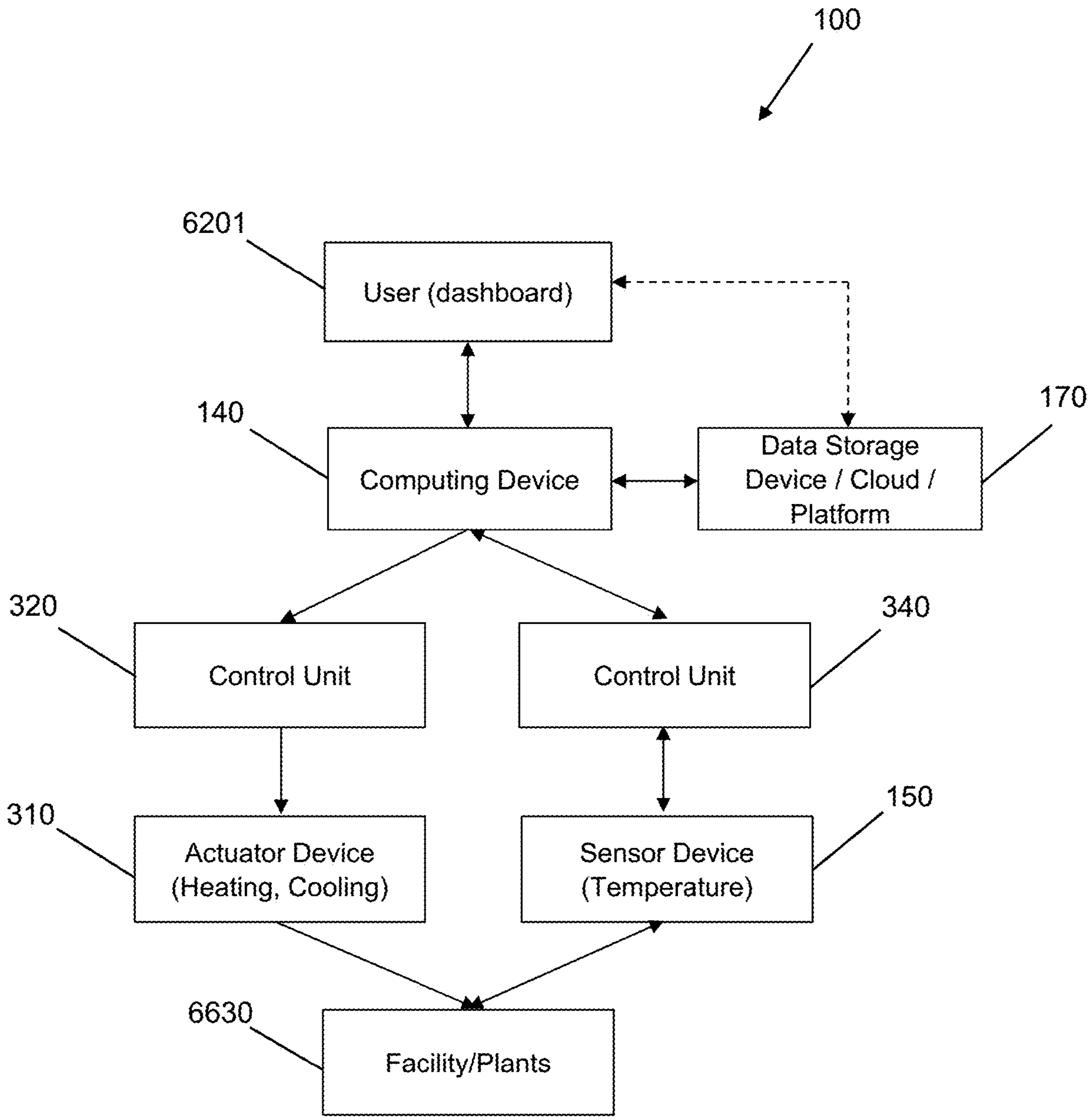
FIG. 66 shows a schematic block diagram of a controlled agricultural system for an agricultural facility, according to the disclosure.

FIG. 66 shows a schematic block diagram of a controlled agricultural system 100 for an agricultural facility 6630, according to the disclosure. The controlled agricultural system 100 comprises a computing device 140, a data storage device 170, coupled to the computing device 140, an actuator device 310, coupled to the computing device 140 via a control unit 320 and a sensor device 150, coupled to the computing device 140 via a second control unit 340.

The data storage device 170 or even the computing device 140 may be based locally (on-site) or in a (centralized) network or the cloud. Furthermore, the data storage device 170 may also be integrated into the computing device 140. The data storage device 170 may include a (digital/online-) platform, e.g. located in the cloud. The platform may also be accessible by mobile devices, e.g. laptop PC, tablet PC or smartphones via dedicated apps. Therefore, a user 6201 may access the platform via the computing device 140 or a separate device (not shown). Furthermore, the platform may comprise dashboards customized to various user groups such as growers and customers.

The data storage device 170 comprises a database in which growth settings, including light recipes and temperature profiles (temporal and/or spatial), for various plants are stored. The database may also comprise data documenting previous plant projects, e.g. from other growers using the same platform.

The computing device 140 is configured to control the actuator device 310 based on the data stored in the data storage device 170, particularly for (re-) adjusting the temperature according to the temperature profile of the respective plant species. Therefore, the actuator device 310 may comprise various actuators for controlling/adjusting the temperature, e.g. a heating and cooling system like an HVAC (heating, ventilation and air conditioning), a heating pipe, IR (infrared)-radiator, etc.

Furthermore, the computing device 140 is configured to collect the data from the sensor device 150, particularly for monitoring the environmental conditions in the agricultural facility, particularly the (local) temperature, optionally also the plant growth. Therefore, the sensor device 150 may comprise various sensors for, e.g., the temperature, the illumination, the color of the plants and fruits, or cameras for imaging methods, etc.

Figure 67:
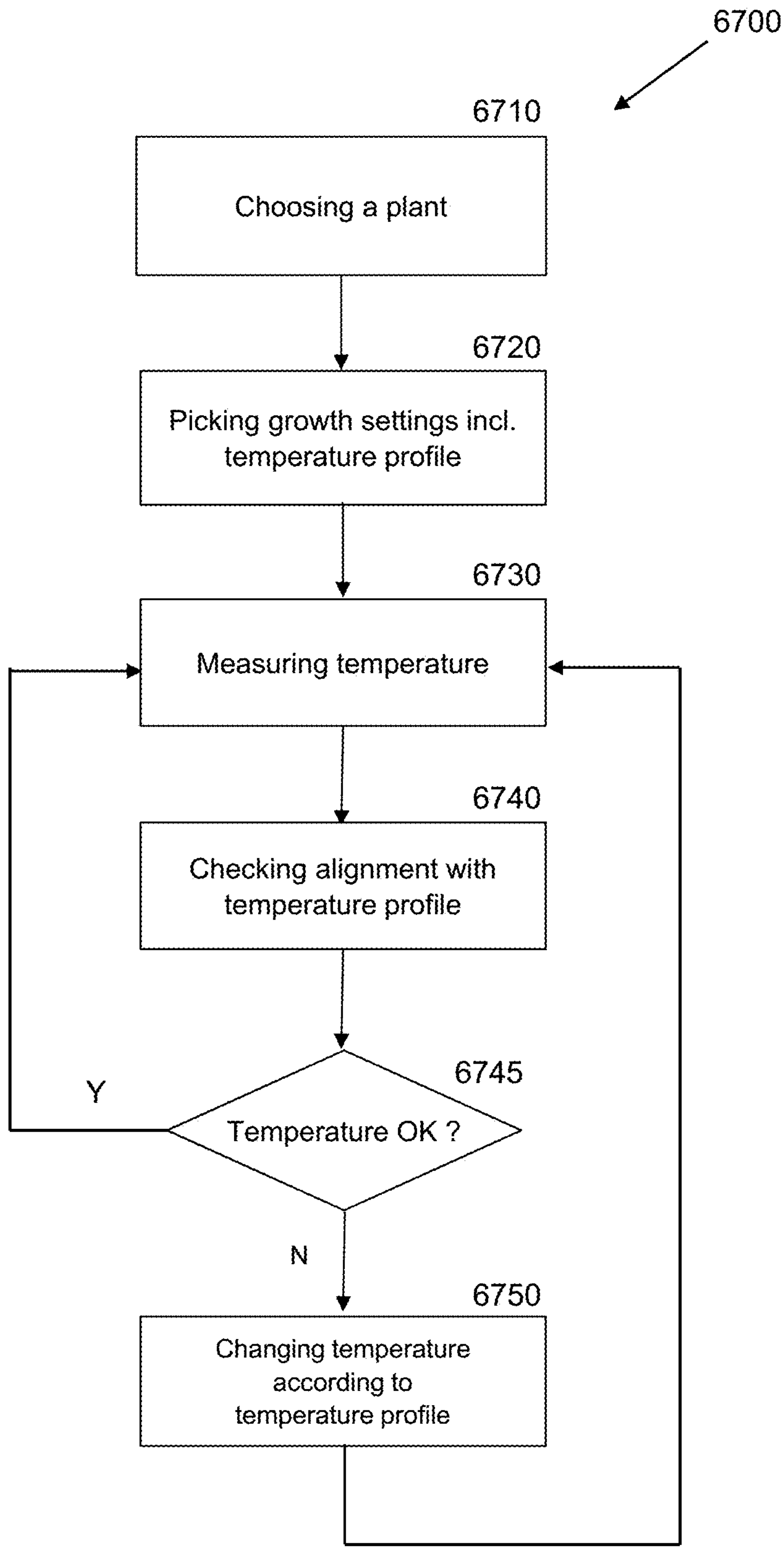
FIG. 67 schematically shows the steps of a method for agricultural management according to the disclosure.

FIG. 67 schematically shows the steps 6700 of a method for agricultural management according to the disclosure. The method aims to adjust the temperature conditions in an agricultural facility according to (temporal and/or spatial) temperature profiles, which are part of the growth settings for a respective plant species. For the following description, in addition to FIG. 67, reference is made to FIG. 66. The method comprises the following steps:

- Step 6710: Choosing a plant species by the user 6201 via a user interface;
- Step 6720: Picking from the data storage device 170 a growth setting including the correlated (temporal and/or spatial) temperature profile by the computing device 140 or by the user via the user interface 6201;
- Step 6730: Measuring the temperature in the agricultural facility by means of the sensor device 150 (temperature sensors);
- Step 6740: Checking by means of the computing device 140, whether the measured temperature matches with the nominal value according to the selected temperature profile;
- Step 6745: Deciding whether the temperature is OK:
  - If yes (Y): go to step 6740;
  - If no (N): continue with step 6750.
- Step 6750: Changing the temperature according to the temperature profile by means of the computing device 140 and the actuator device 310 (temperature influencing means);
- Go back to step 6730 to start next measuring, checking/controlling cycle. The cycle may be repeated until harvest of the plants.

Alternatively, the method may start with step 6720 by picking a growth setting including the correlated temperature profile by the user via the interface 6201.

Alternatively, the method may start with step 6720 by picking a preset growth setting including the correlated temperature profile by the computing device 140.

In step 6720, the temperature profile included in the growth settings may be correlated to various environmental conditions, e.g. day-night-shift, circadian rhythm of the plant, illumination conditions, growth phases of the plants, etc. Particularly, step 6720 or step 6730 may include synchronizing the temperature profile and the light recipe. Alternatively, the temperature profile and the light recipe may be integrated in one single dataset, which renders synchronization superfluous.

In step 6730, the temperature measurement may be conducted on various similar locations, e.g. with various temperature sensors each sensor being located in the same manner relative to a respective plant. The data of these temperature sensors may be used for calculating an average temperature for said similar locations or to give an overview of the temperature distribution for these various locations. Furthermore, the temperature measurement may be conducted on various different locations for the purpose of adjusting different temperature profiles, e.g. temperature sensors may be positioned at different vertical heights of the plants or even the agricultural facility. The sensor may be configured to measure the temperature of the air, soil or of parts of the plants (root, leaves, petal, etc.). Based on the data of these temperature sensors vertically different temperature profiles may be adjusted by means of the computing device 140 and the temperature influencing means.

In step 6750, changing the temperature may be conducted by heating (i.e. increasing the temperature) or cooling (i.e. decreasing the temperature) of the air or irrigation in the agricultural facility or by (local) IR-radiation.

Figure 68:
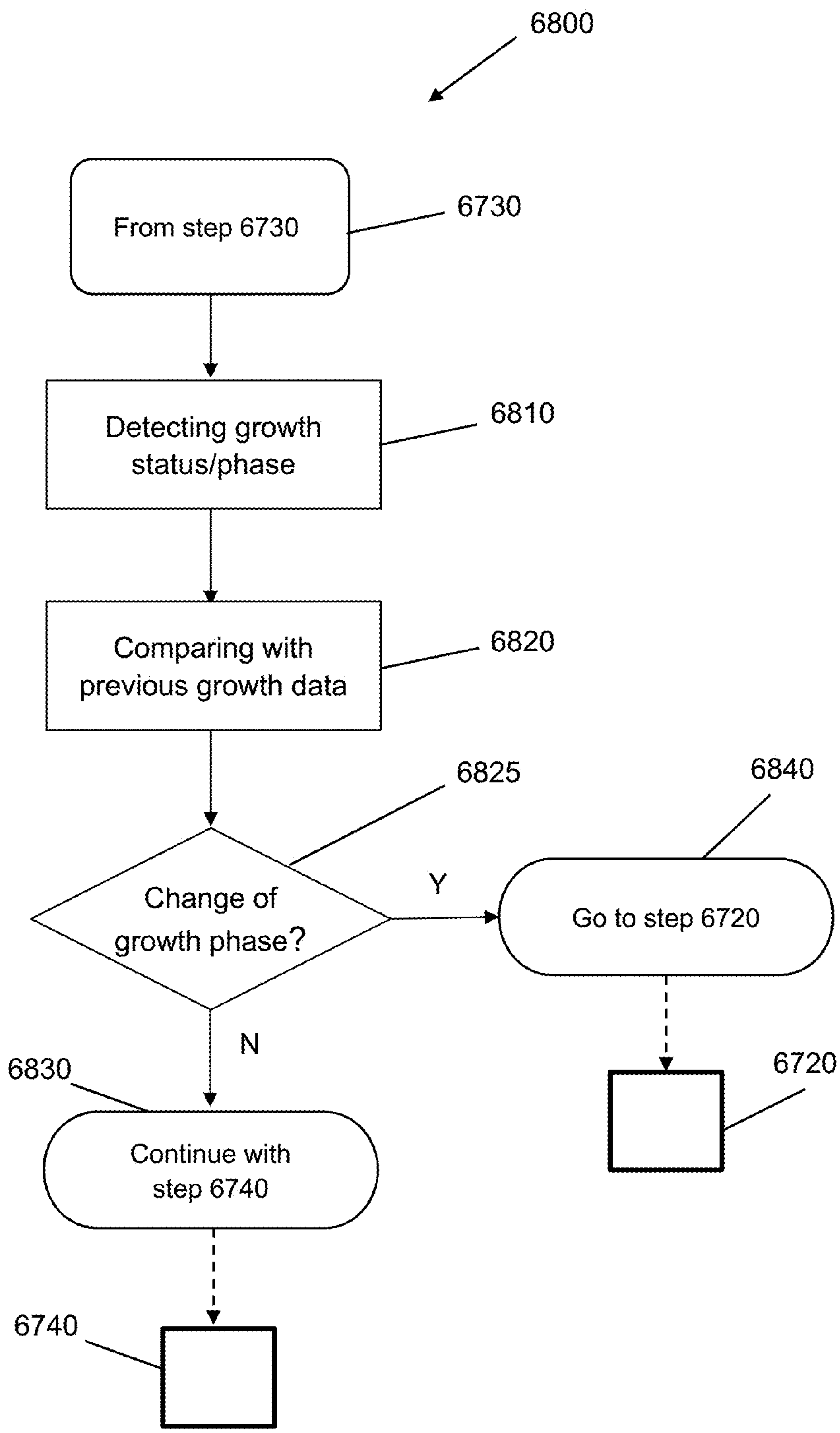
FIG. 68 schematically shows a set of optional steps.

FIG. 68 schematically shows a set of optional steps 6800. These steps aim to account for different temperature profiles correlating to different growth phases. For the following description, in addition to FIG. 68, reference is also made to FIGS. 66 and 67. The method starts from step 6730 of FIG. 67 and comprises the following steps:

- Step 6810: Detecting the growth phase of the plants by means of the sensor device 150;
- Step 6820: Comparing the presently detected growth data with the previously detected growth data or data stored in the database 170 and checking by means of the computing device 140 whether the growth phase has changed;
- Step 6825:
  - If yes (Y): go to step 6720;
  - If no (N): continue with step 6740.

Step 6810 may involve taking pictures from the plants, determining the size, shape or color of the plants/flowers. Furthermore, the computing device 140 may compare present images of the plants with various images of the plants stored in the database 170 to determine the present growth phase. The growth phases may comprise breeding, greening, flowering and harvest.

Temperature profiles that are correlated to various parameters like natural circadian cycles, database stored cycles, plant-specific cycles, customer-specified cycles, or freely adjustable cycles, are applied to the various stages of plant growth (e.g. measured by sensors). Temperature cycles can be correlated to lighting conditions or to other environmental conditions ($CO_2$, Energy price) so that they can be applied in a correlated way.

The present disclosure proposes a controlled agricultural system (100), particularly for plant breeding, growing, cultivating and harvesting in an agricultural facility, configured to change/adjust the temperature conditions in the agricultural facility (6630) according to a selected temporal and/or spatial temperature profile. In some embodiments/implementations, the temperature profile is dedicated to respective plant species and may be correlated to various environmental conditions like day-night-shift, circadian rhythm of the plant, illumination conditions and/or the plant growth phase. Furthermore, the temperature profile may be different in different locations of the agricultural facility and/or plants and or plant parts. Changing the temperature is conducted by temperature influencing means like heating devices and cooling devices.

Luminaire

Figure 69:
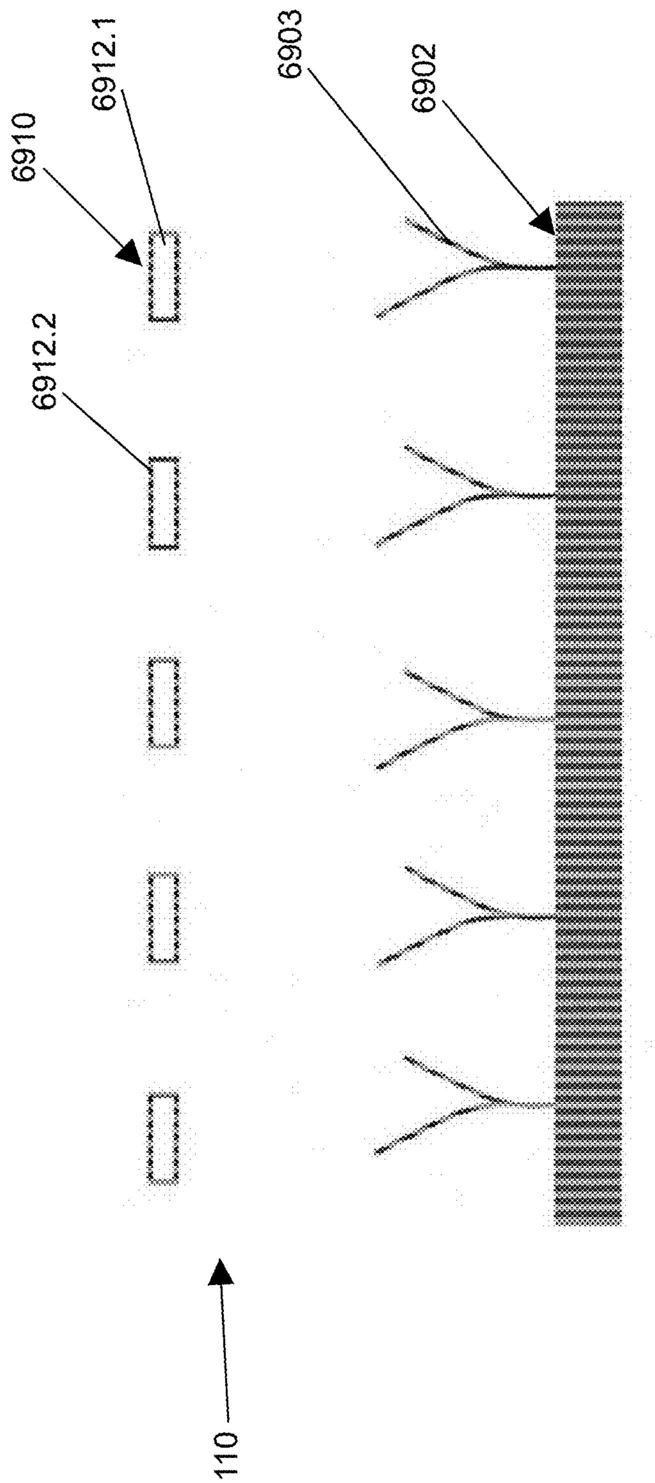
FIG. 69 shows a lighting fixture with a light module according to an embodiment of "Light Guides"

FIG. 69 shows an agricultural lighting fixture 110 according to an embodiment of "Light Guides". The lighting fixture 110 comprises a light module 6910 according to a first embodiment of "Light Guides". The light module 6910 comprises one or more light emitting elements 6912.1, 6912.2, each having at least one light guide (not shown in FIG. 69). According to the sectional view of FIG. 69, the light emitting elements 6912.1, 6912.2 are located on a common plane and the light guides (not shown) meander within this plane over a target area 6902. The light emitting element 6912.1, 6912.2 and/or the light guides may also be provided in different fashion, such as a spiraling fashion, stripe-like, or any other, also arbitrary fashion. In the example according to FIG. 69, the light emitting element 6912.1, 6912.2 is provided in one layer, i.e. one plane. It is to be noted that the light module 6910 may also comprise multiple light emitting elements 6912.1, 6912.2, which may be controllable separately from one another, as well as sensors and actuators, as described above. Accordingly, in some embodiments of "Light Guides", the light module 6910 comprises one light emitting element having interconnected sections 6912.1, 6912.2.

The light emitting element 6912.1, 6912.2 comprises at least one light guide not explicitly shown in the figures. The light emitting element 6912.1, 6912.2 may be integrally connected with the light guide. Thus, according to some embodiments of "Light Guides", the light emitting element or elements 6912.1, 6912.2 at the same time represent the respective light guide. Accordingly, in the figures, the light guide or light guides may be represented by the light emitting element 6912.1, 6912.2.

On the target area 6902, plants 3 are grown. The plants 6903 are to be illuminated by the light module 6910. In order to illuminate the target area 6902 and in particular the plants 6903 provided on or within the target area 6902, the light emitting element is appropriately arranged. The light emitting element 6912.1, 6912.2 or the entire light module 6910 and or the attached light guides may be movably mounted, in particular, in order to alter the distance between the target area 6902 and the light module 6910. This also implies that the distance between the plants 6903 and the light emitting element 6912.1, 6912.2 may be altered and thus set to a predetermined distance. That may also allow to influence the growth rate or ripening.

Figure 70:
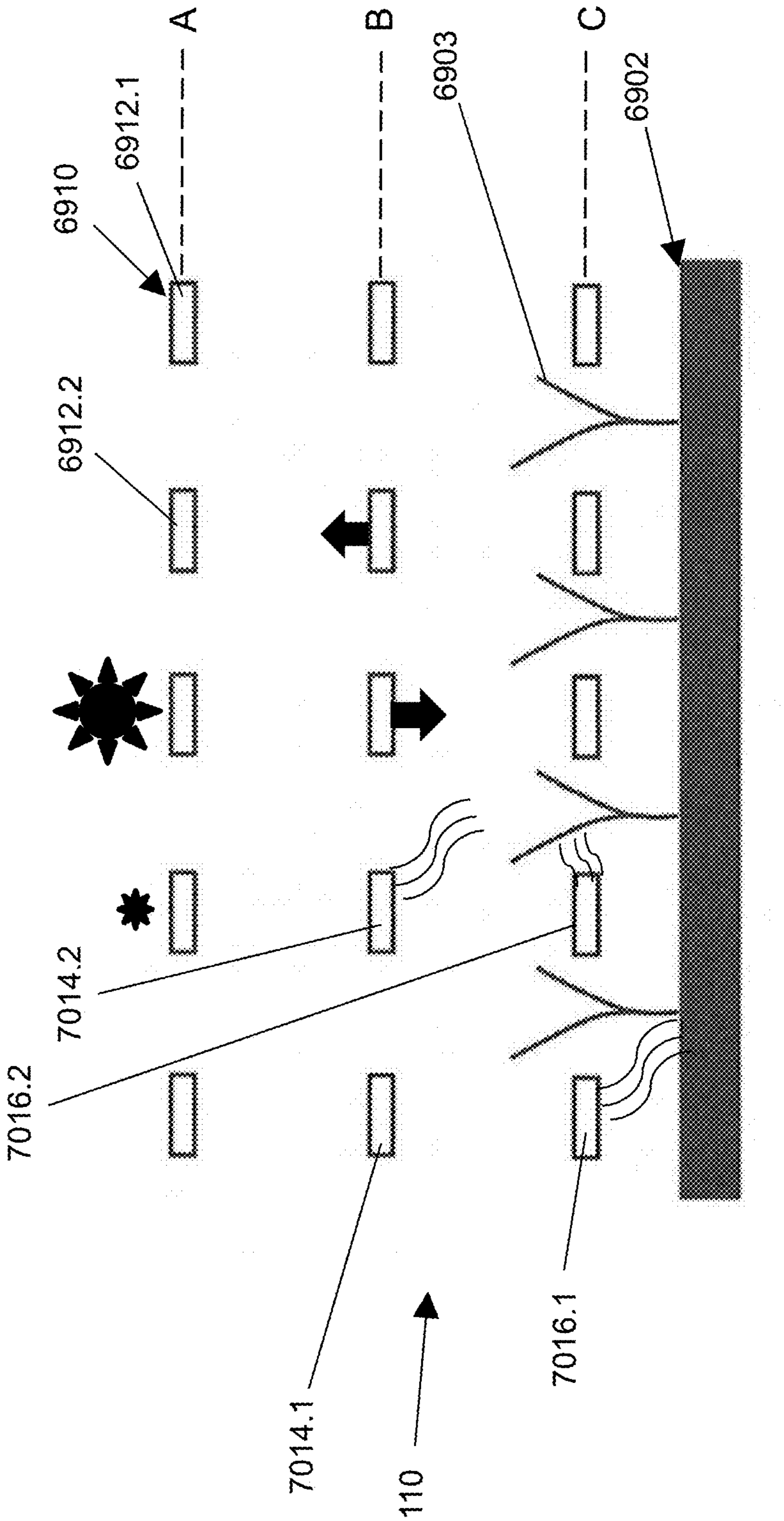
FIG. 70 shows another embodiment of "Light Guides"

FIG. 70 shows another embodiment according to "Light Guides". Same reference numbers are referring to same or similar components, the description of which will not be repeated in the following. The light module 6910 according to FIG. 70 comprises multiple layers A, B, C, whereas a layer A, B, C here is defined by light emitting elements or groups of light emitting elements 6912.1, 6912.2; 7014.1, 7014.2; 7016.1, 7016.2. In the Example shown, this groups of light emitting elements 6912.1, 6912.2; 7014.1, 7014.2; 7016.1, 7016.2 have the same or similar distance to the target area 6902. However, the light emitting elements 6912.1, 6912.2; 7014.1, 7014.2; 7016.1, 7016.2 of the light module 6910 may also have altering distance to the target area 6902.

It is also possible, that one layer A, B, C comprises multiple light emitting elements 6912.1, 6912.2; 7014.1, 7014.2; 7016.1, 7016.2, which are mounted and/or illuminated and/or controllable independently from one another. In layer A, as shown in FIG. 70, different brightness of the light emitted elements are indicated by sun-symbols in different size as an example for possible individual control. Arrows in layer B of FIG. 70 indicated separate movability of light emitting elements or sections thereof. Further, in FIG. 70 it is indicated in layer B and C how different wavelengths may be emitted by different light emitting elements 7014.2, 7016.1, 7016.2.

As an example, according to an embodiment of the disclosure as suggested in FIG. 70, the light module may be controlled to deactivate light emission from layer A, as layer A is still too far away from the plants 6903. In layer B, increased or maximum intensity could be applied according to the applicable or required light recipe. Layer C of the light module 6910 according to FIG. 70 may be operated with an increased blue light component, in order to compensate shading effects by higher leaves. Of course, it may also be possible to operate the light module to emit from other layers or to emit different wavelengths, as needed or as required by a light recipe.

Generally, the light module may be controlled to emit light from different layers with different and varying spectral composition and further parameters variable over time, e.g. depending on the size, growth, morphology and/or further parameters of the plants. Such parameters of the plants may be accessible by sensors provided in the light module 6910 or in the control unit 7230, 7330 as exemplified in FIGS. 72 and 73.

Figure 71:
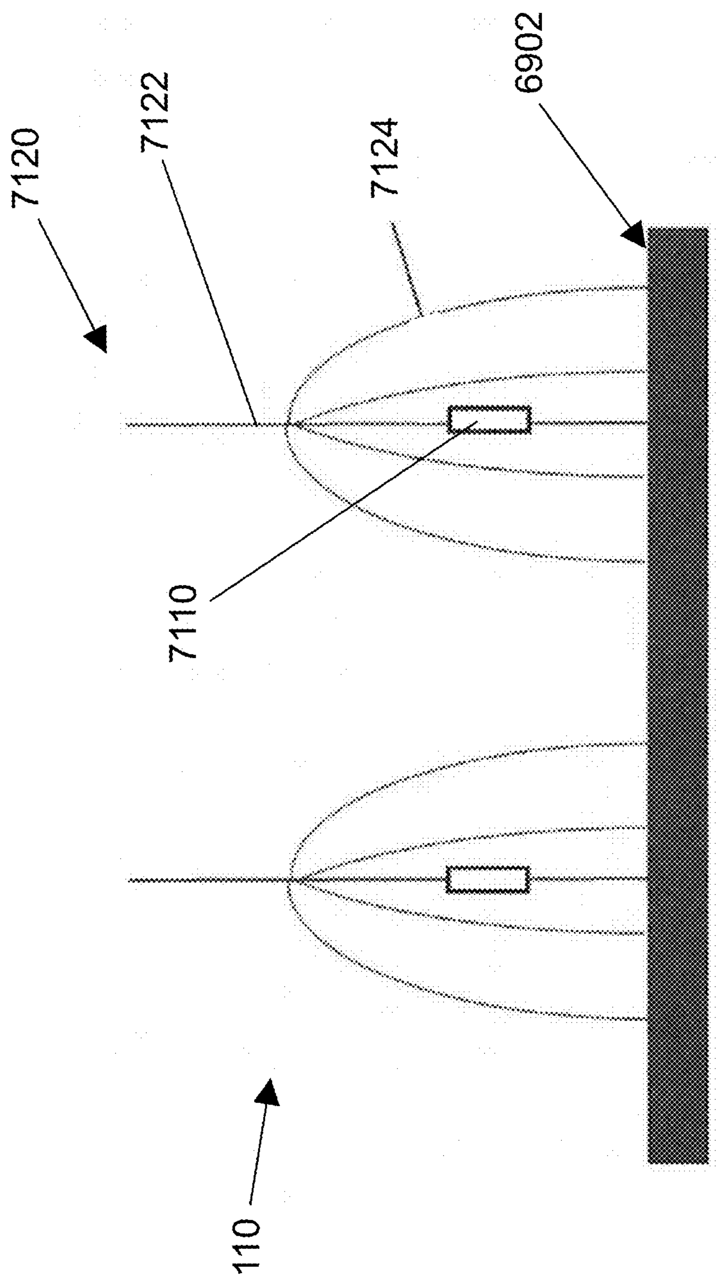
FIG. 71 shows another embodiment of "Light Guides"

FIG. 71 shows a further embodiment of "Light Guides", wherein the lighting fixture 110 comprises a light module 7120, which is located within a meshwork 7124. The meshwork 7124 may comprise wires. The meshwork may be provided to support the plants, or in order to provide a supporting structure for one or more light emitting elements 7110 and/or the light guides. In the example shown in FIG. 71, the light emitting element is provided at a central part of the meshwork. The light emitting element may, however, also be positioned at any other location of the light module. Light guides may be provided along the meshwork or woven into the meshwork. A holding part 7122 of the light module 7120 may be provided in order to connect the light emitting element 7110 with further components of the light module 7120, such components not being shown in FIG. 71, and in order to provide stability. The meshwork 7124 may in particular be provided to form a cage- or grid-like structure around one or more plants grown on the target area 2.

It is further to be noted that in the embodiments described above, light emitting elements or light guides may be individually controllable, in particular with respect to their position relative to the target area and thus to the plants, light parameters and/or other features. The embodiments provided above are exemplary for "Light Guides", while any combination of the given embodiments is also possible.

Figure 72:
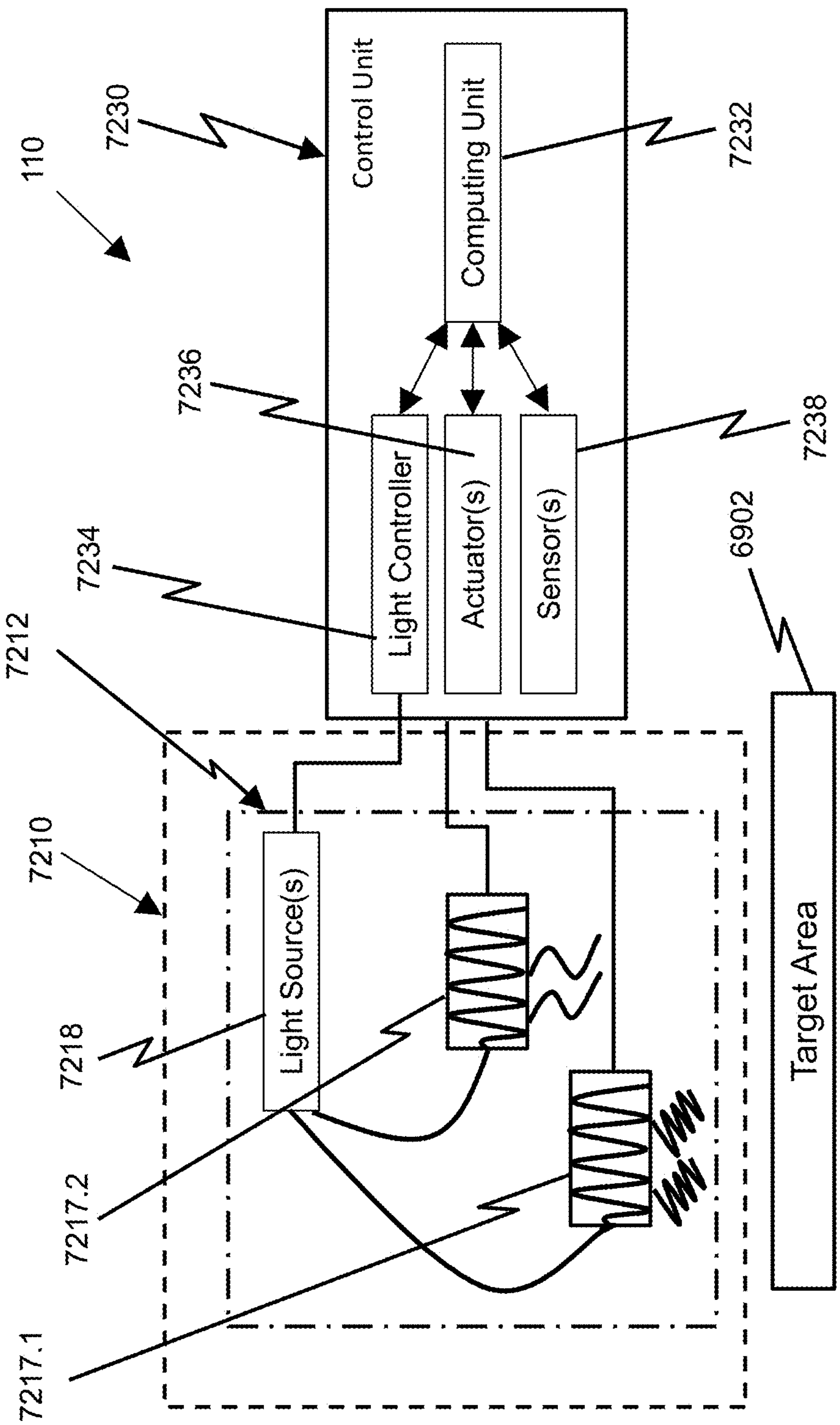
FIG. 72 shows a schematic drawing of an agricultural lighting fixture according to an embodiment of "Light Guides"

FIG. 72 shows a schematic illustration of an embodiment of "Light Guides". In this exemplary embodiment, an agricultural lighting fixture 110 is shown comprising a light module 7210 and a control unit 7230. The control unit 7230 comprises, in the embodiment shown in FIG. 72, a computing unit 7232, a light controller 7234, one or more actuators 7236, and one or more sensors 7238. The computing unit 7232 may be used to manage, calculate and control light recipes and parameters of the agricultural system. Accordingly, the computing unit is connected to the light controller 7234, in order to control lighting parameters of one or more light modules 7210. In the example shown in FIG. 72, the agricultural lighting fixture is provided with one light module 7210. Further, the computing unit 7232 is connected with actuators 7236. The actuators 7236 may be provided in order to control e.g. the position of light emitting elements 6912.1 and/or light guides 7217.

The computing unit 7232 may comprise computing means, storage means and communication means for local and network communication.

The light module 7210 according to the embodiment displayed in FIG. 72 comprises one light emitting element 7212. In alternative embodiments, the light module may also comprise multiple light emitting devices. The light emitting element 7212 comprises, according to the embodiment shown, light sources 7218 for supplying light to two light guides 7217.1, 7217.2. As indicated in the example of FIG. 72, the light guide 7217.1 is provided to emit light of a shorter wavelengths, such as UV light, or blue light. The light guided through the light guide 7217.1 is coupled into the light guide from a light source 7218. Another light guide 7217.2 may be provided with light of longer wavelengths, such as yellow, red or infrared. Again, that light may be coupled into the light guide from a light source 7218. "Light source" in this context shall refer to any one or more light emitters emitting light of the desired wavelengths or spectral composition.

It is to be noted that the light guide 7217.1, 7217.2 may also be provided such that the light coupling out of the light guide 7217.1, 7217.2 is converted to the desired wavelength or spectral composition only after traveling through the light guide 7217.1, 7217.2, being converted e.g. by means of a converter provided at the position of emission. The light guides 7217.1, 7217.2 may thus be supplied with light originating from the same light source or with light from separate light sources. A light source 7218 may in particular also comprise more than one light emitter, e.g. a group or an array of LEDs or laser diodes. Each of such individual light emitters within the light source 7218 may emit light of one or more wavelengths, which may differ from the light emitted from other light emitters.

Figure 73:
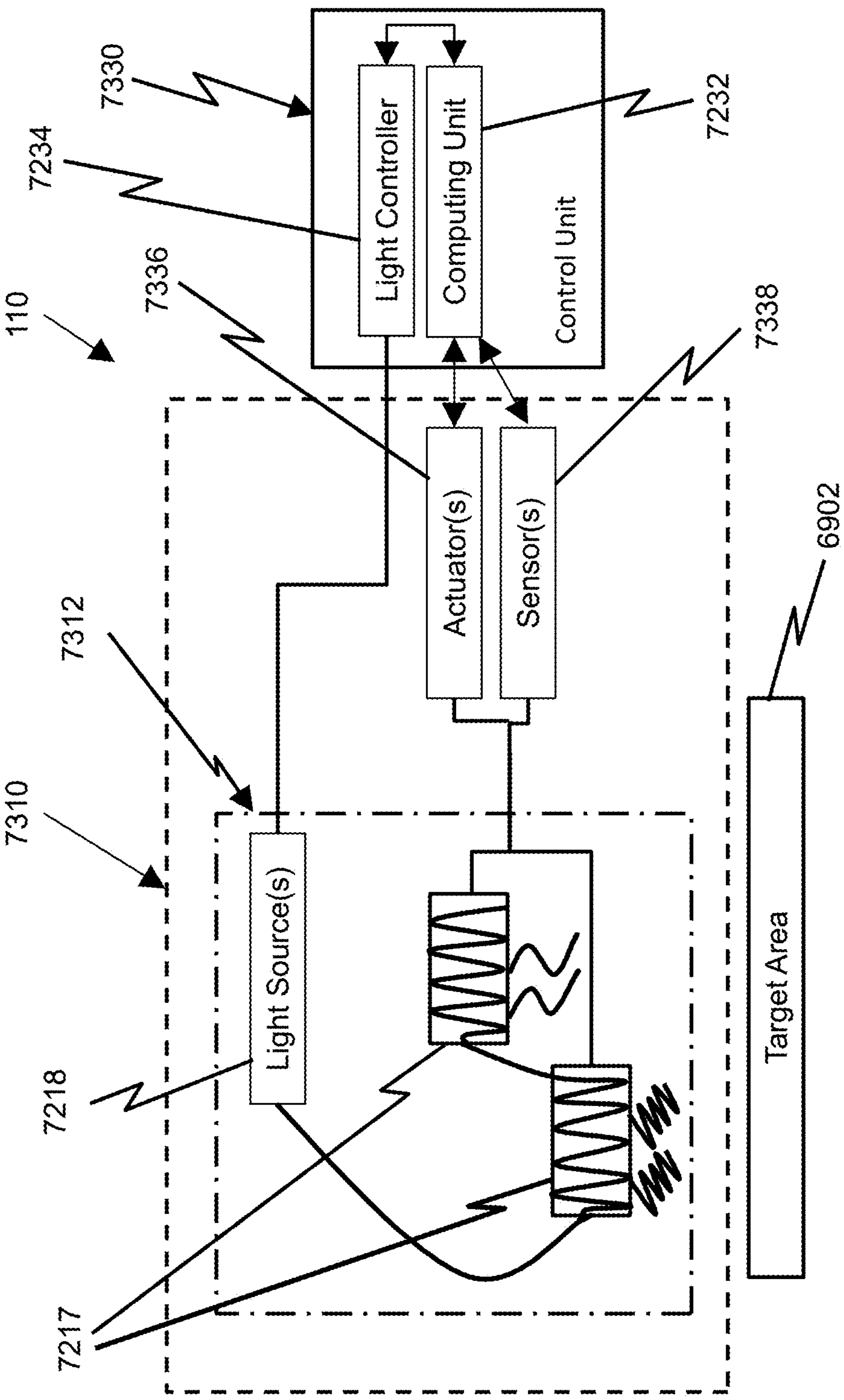
FIG. 73 shows a schematic drawing of an agricultural lighting fixture according to another embodiment of "Light Guides".

It should also be noted that the light guides 7217.1, 7217.2 may be freely arranged in space, independent of the schematic drawing according to FIG. 72 and FIG. 73. In particular, the light guides 7217.1, 7217.2 may be arranged within a vertical plane or a plane parallel to the target area.

The light module 7210 may further comprise fixing means in order to fix the light module to a supporting structure, and/or further components that may be required to functionally arrange the light module in an intended position relative to the target area 2. Such additional components are not shown in the schematic drawing of FIG. 72.

The at least one actuator 7236 of the control unit 7230 may be provided in order to set and control the position of the light guides 7217.1, 7217.2, the light emitting element 7212 and/or the light module 7210 or other components thereof. In particular, the at least one actuator 7236 may be provided in order to control the vertical position of at least one light guide 7217.1, 7217.2.

FIG. 73 shows a further exemplary embodiment of "Light Guides". Same or equally acting components are indicated with the same reference numbers and the description thereof is not repeated. In the following, differences of the embodiment according to FIG. 73 are described in comparison to the embodiment according to FIG. 72.

In the embodiment according to FIG. 73, the light module 7310 comprises the at least one actuator 7336 and the at least one sensor 7338. It is also possible that both the control unit 7330 and the light module 7310 comprise actuators and/or sensors in alternative embodiments. Further, in contrast to the embodiment according to FIG. 72, it is shown in FIG. 73 that the light emitting element 7312 comprises one light guide 7217. The light guide 7217 is provided such that portions thereof may be arranged on different vertical layers. Still, it may be possible to couple light out of the light guide, which has a different wavelength or spectral composition at different parts of the light guide. That may be realized by providing conversion means, such as a phosphor, within the light guide or at the location of emission.

In alternative embodiments, the light module may comprise multiple light emission elements. Further, one light emission element may comprise one light guide only. The light guide may also be provided in one plane only. The embodiments as shown herein are exemplary only and shall not limit the scope of protection, wherein any combination of features is suitable. In particular, "Light Guides" shall enclose such embodiments as well, according to which the light module comprises at least some of the features shown as part of the control unit and vice versa.

Figure 74:
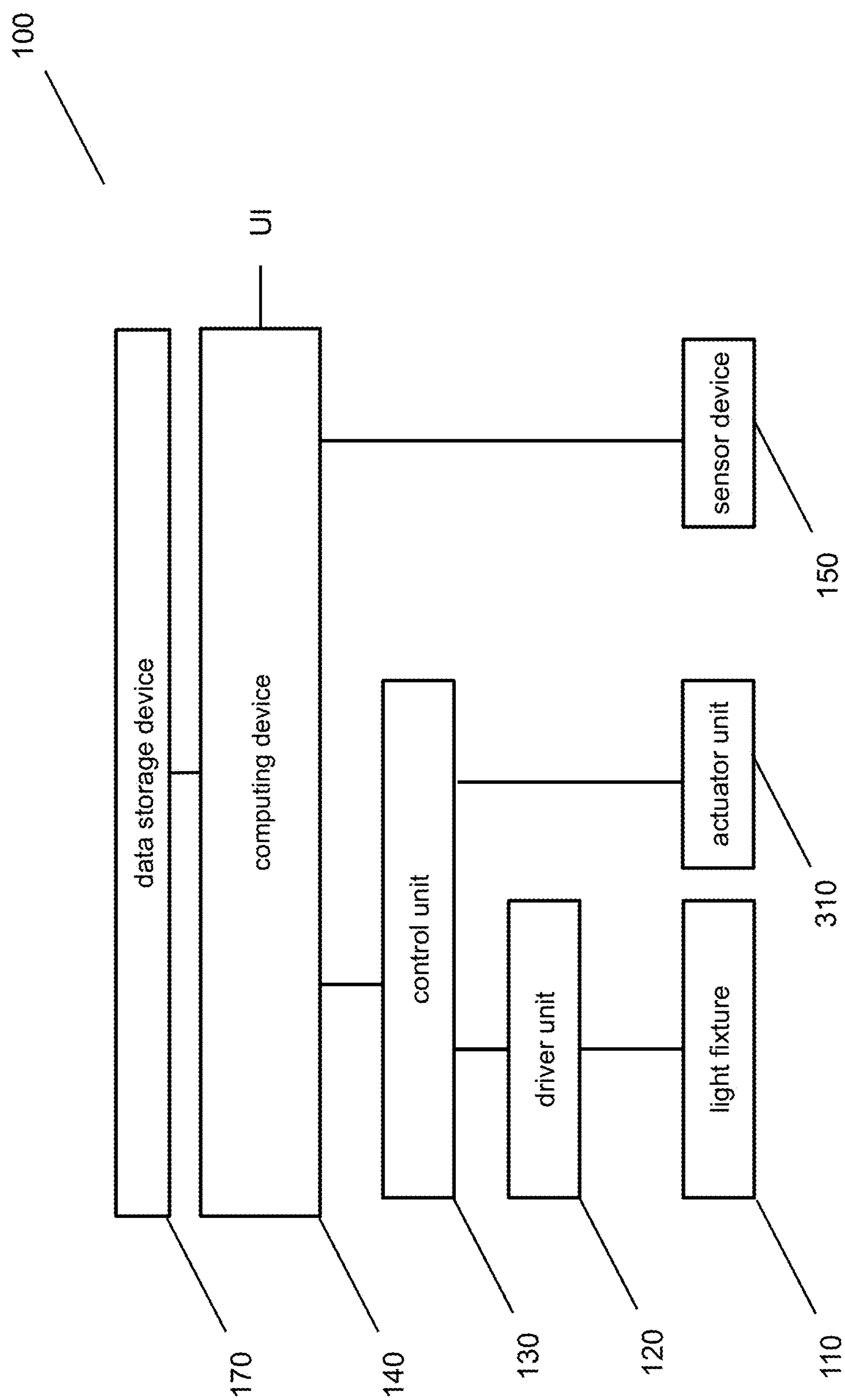
FIG. 74 shows a schematic block diagram of a controlled agricultural system according to "Failure Detection" and "Failure Compensation".

FIG. 74 shows a schematic block diagram of a controlled agricultural system 100, according to "Failure Detection" as well as "Failure Compensation". The controlled agricultural system 100 comprises a computing device 140, and a light fixture 110 coupled to the computing device 140 via a control unit 130. The data storage device 170 or even the computing device 140 may be based locally (on-site), in a network or the cloud.

The data storage device 170 comprises a database with data of control parameters for controlling the illumination. Based on the data stored in the data storage device 170, the control parameters may be adjusted by means of the control unit 130 (and the driver unit 120). Furthermore, the computing device 140 is configured to control grow parameters like nutrient concentration, via the actuator unit 310.

The controlled agricultural system 100 further comprises a sensor device 150, coupled to the computing device 140, for sensing a reduced emission or total failure. For detecting a failing light source (of the light fixture 110), the sensor device 150 is an electrical current sensor in this case. Alternatively, a light sensor 200 can be provided, see FIG. 75, 76.

The information about the failing light source or fixture 110 may be delivered to the user or customer by a user interface (UI), e.g. a control terminal coupled to the computing device or a mobile device such as a smartphone or tablet including a dedicated software application (i.e. app for mobile devices).

Figure 75:
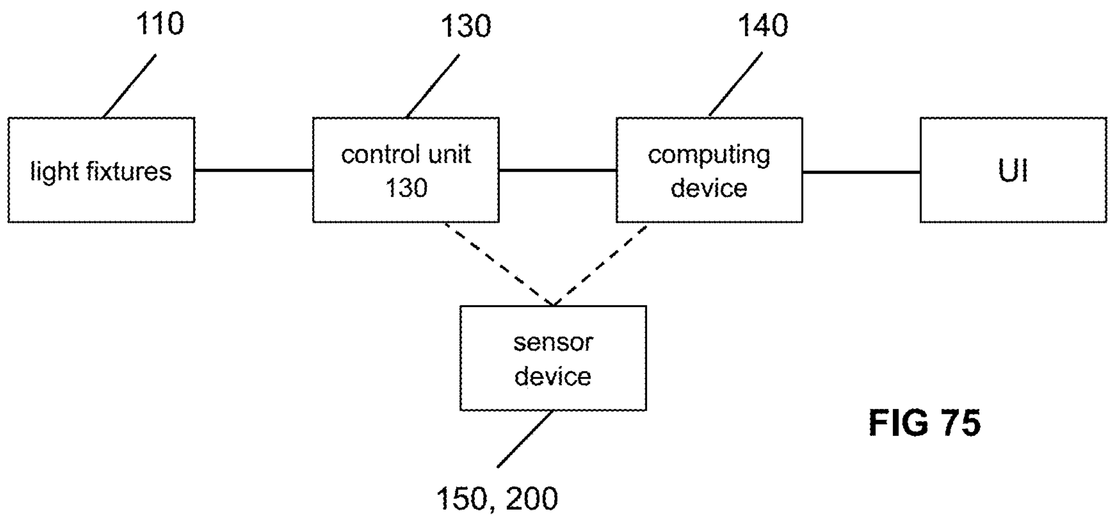
FIG. 75 shows a schematic block diagram of a controlled agricultural system with an integrated failure detection.

FIG. 75 shows a schematic block diagram of an embodiment of the disclosure. Therein, devices having the same function have the same reference numeral as in FIG. 74. FIG. 75 illustrates that the sensor device 150, 200 can be coupled either to the control unit 130 or to the computing device 140. In practice, the agricultural system will comprise a large number of light fixtures 110, each comprising a plurality of light sources. Respectively, a large number of current sensors 150 and/or light sensors 200 can be provided for a localization of the failing light source or fixture 110.

For allowing an individualization or localization of the failing light source by a light sensor 200, a modulation can be imposed on the emission of the light sources/fixtures. Each light source or fixture 110 can be modulated with an individual pattern enabling a linkage between the measured intensity and the respective light source or fixture 110. When the pattern is imposed on the emission by the control unit 130, the light sensor 200 is switched on.

Figure 76:
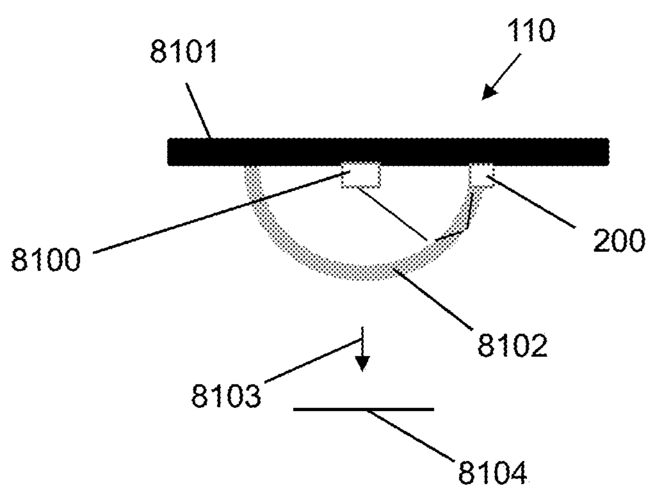
FIG. 76 shows a light fixture with a lens to which a light sensor is coupled.

FIG. 76 shows a schematic sectional view of a light fixture 110. The light source 8100 is mounted on a board 8101. The light fixture 110 comprises a lens 8102 which guides the light 8103 to a growth area 8104. The light sensor 200 is arranged at an edge of the lens 8102, which enables a detection of a part of the light, which is guided in the lens 8102 by total internal reflection.

Figure 77:
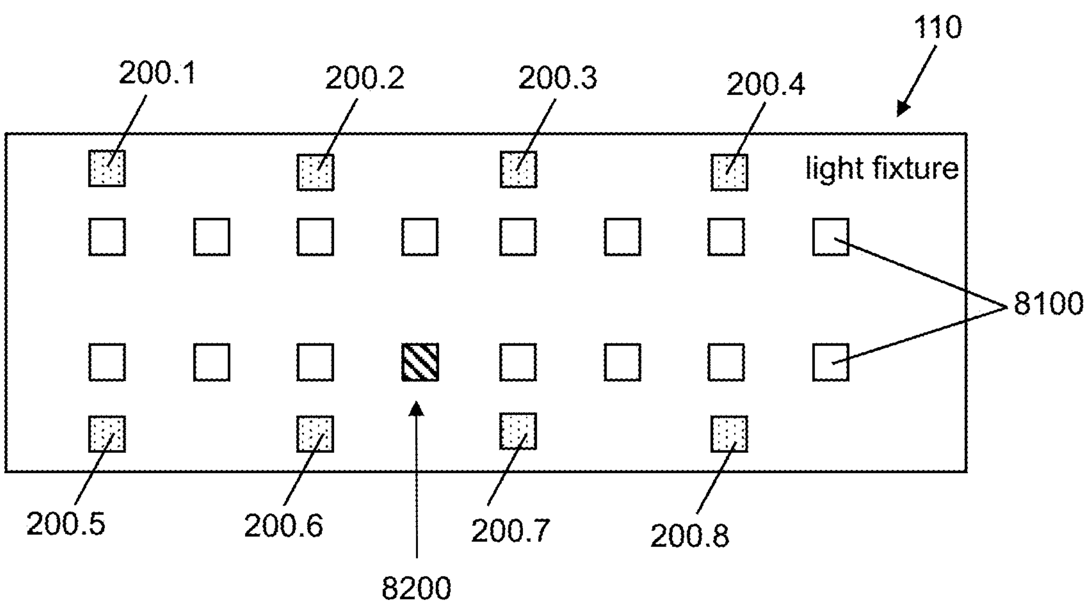
FIG. 77 shows a light fixture with a plurality of light sources and illustrates a possibility for a failure localization.

FIG. 77 shows a light fixture 110 with a plurality of light sources 8100. Further, the light fixture comprises a plurality of light sensors 200.1-200.8. In this figure, the growth area is arranged in front of the drawing layer, the light sources 8100 and the light sensors 200 are oriented towards the growth area. A failing light source 8200 is indicated schematically (cross hatched), its emission is reduced. The light sensors 200.6, 200.7 measure a reduced intensity. The same applies for the light sensors 200.2, 200.3, wherein these sensors measure only a minor intensity drop compared to the light sensors 200.6, 200.7. The other light sensors 200.1, 200.4, 200.5, 200.8 arranged at the corners of the light fixture 110 measure no intensity drop at all. From comparing the intensity drop measured by the individual light sensors 200, a localization of the failing light source 8200 is possible. In practice, different spectral properties of the light sources can additionally be taken into account by providing light sensors with different spectral sensitivities.

Figure 78:
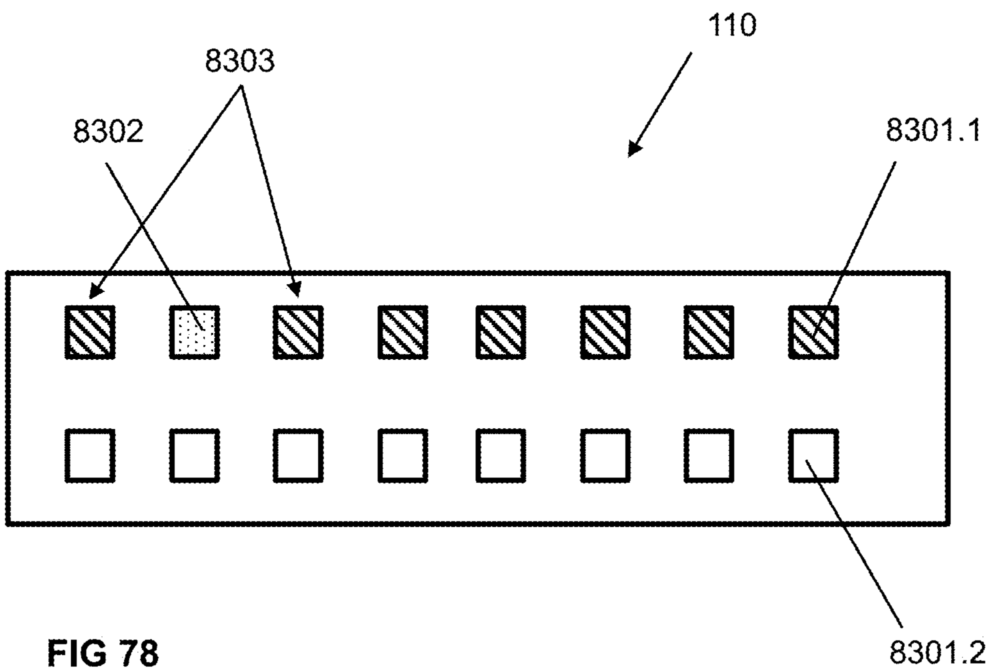
FIG. 78 shows a light fixture in a schematic view, a compensation being achieved by increasing the emission of other light sources.

FIG. 78 shows a light fixture 110 in a schematic view, it comprises a plurality of light sources 8301. In this case, red light sources 8301.1 and blue light sources 8301.2 are shown, further colours including UV and IR can be provided in practice. One light source 8302 is failing, having a reduced or no emission at all.

According to the disclosure, this is compensated by an increased emission of other light sources 8303 arranged close to the failing light source 8302. Therein, only those light sources are used for the compensation, which have the same spectral properties (red colour in this case) and are arranged close to the failing light source 8302. Accordingly, the illumination properties at the growth location with the plants can be kept rather constant until the failing light source 8302 is repaired or replaced.

Figure 79:
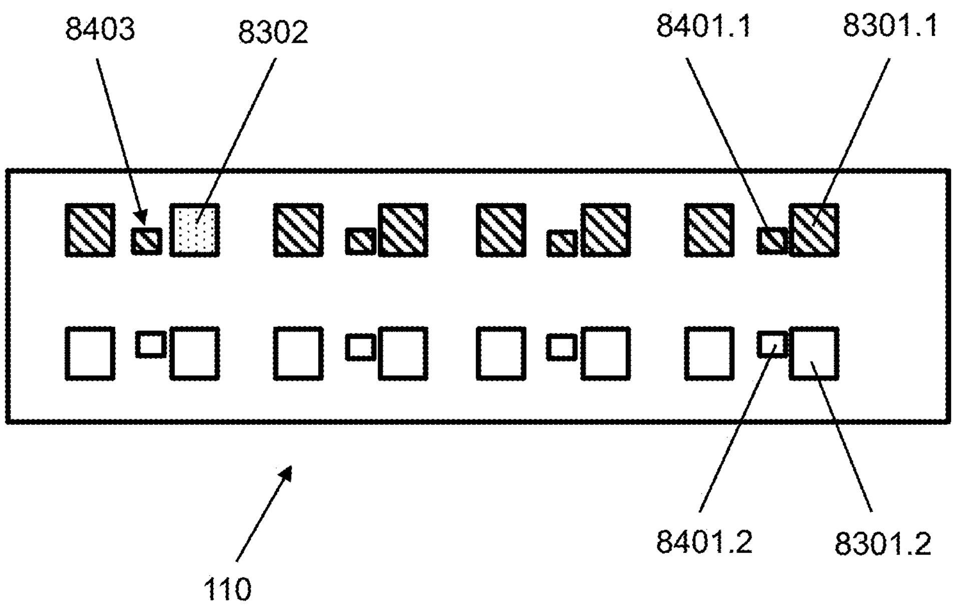
FIG. 79 shows a light fixture with redundant light sources for compensation.

FIG. 79 also shows a light fixture in a schematic view, comprising red light sources 8301.1 and blue light sources 8301.2. In contrast to FIG. 78, redundant light sources 8401 are provided in addition, namely red ones 8401.1 and blue ones 8401.2. In normal operation the redundant light sources 8401 are switched off. After the detection of the failing light source 8302, the redundant light source 8403 is switched on for the compensation. As in the embodiment of FIG. 75, the redundant light source 8403 is chosen based on the spectral match and the spatial proximity.

Figure 80:
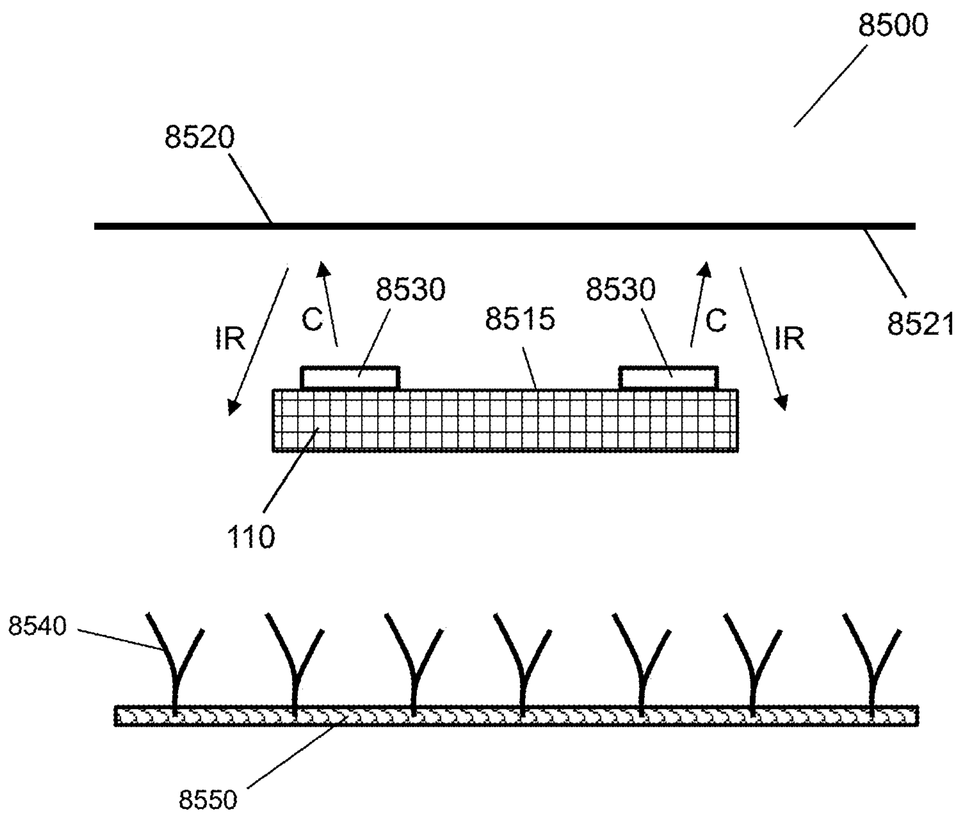
FIG. 80 schematically shows an agricultural light fixture with a heat reflector according to an embodiment of "Heat Reflector".

FIG. 80 schematically shows a side view of an embodiment 8500 of the horticultural apparatus according to the disclosure, comprising an elongated agricultural light fixture 110 and a plane reflector 8520 arranged above and parallel to the top side 8515 of the agricultural light fixture 110. The agricultural light fixture 110 comprises LED modules (not shown) and two ventilators 8530. The ventilators 8530 are arranged on the top side 8515 of the agricultural light fixture 110 in order to force the hot air from the LED modules towards the reflector 8520, i.e. by means of forced convection (indicated by arrow C). The bottom side 8521 of the reflector 8520, which may be a foil equipped with infrared (IR) reflecting properties, reflects the IR radiation back to the plants 8540 arranged on a cultivated area (plant bed) 8550 below the agricultural light fixture 110.

Figure 81:
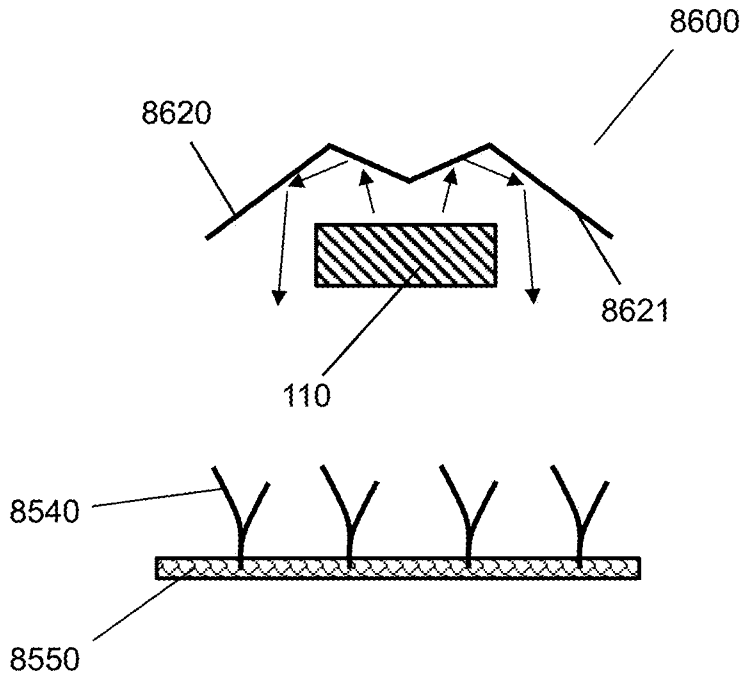
FIG. 81 schematically shows an agricultural light fixture according to another embodiment of "Heat Reflector".

FIG. 81 schematically shows a cross section of another embodiment 8600 of the horticultural apparatus according to the disclosure, comprising an elongated agricultural light fixture 110 and a reflector 8620 arranged above the top side of the agricultural light fixture 110. The heat reflecting bottom side 8621 of the reflector 8620, i.e. the side facing the top side of the agricultural light fixture 110, is shaped such that the heat emanating from the top side of the agricultural light fixture 110 is first reflected sideways and then downwards, i.e. around the agricultural light fixture 110 towards the plants 8540. In a cross-sectional view, the reflector 8620 is shaped like two mirror-image obtuse angles. Alternatively, the bottom side of the reflector 8620 may be formed to resemble the shape shown in FIG. 81, but with a smooth surface, i.e. without abutting edges from the plane parts, similar to the stylized shadow of a flying bird.

Figure 82:
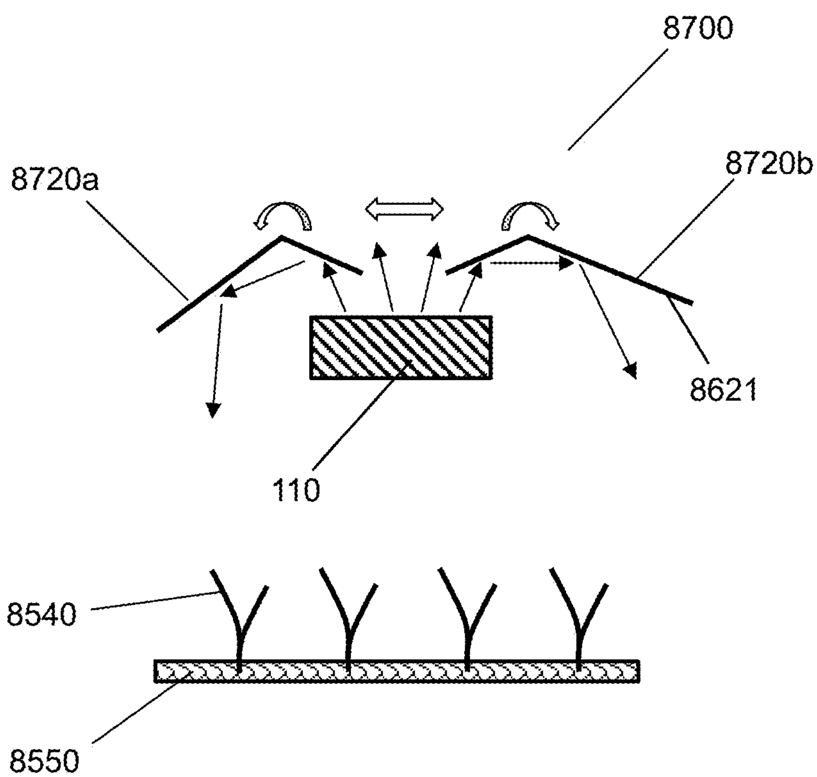
FIG. 82 schematically shows an agricultural light fixture according to a third embodiment of "Heat Reflector".

FIG. 82 schematically shows a cross section of a third embodiment 8700 of the horticultural apparatus according to the disclosure. The shape of the reflector 8720 is similar to the one shown in FIG. 81. Furthermore, the two mirror-image parts 8720*a*, 8720*b* can be moved apart (indicated by the bold double arrow). This enables to reduce the amount of heat that is reflected back to the plants, because when moved apart, some of the heat or hot air can flow through the aperture between the two parts 8720*a*, 8720*b*. Furthermore, the angle between the two surfaces of each part parts 8720*a*, 8720*b* can be adjusted (indicated by the bended arrows) in order to adjust the direction of the reflected heat. Of course, if the heating conditions change, the reflector parts can be moved back to their original position.

Figure 83:
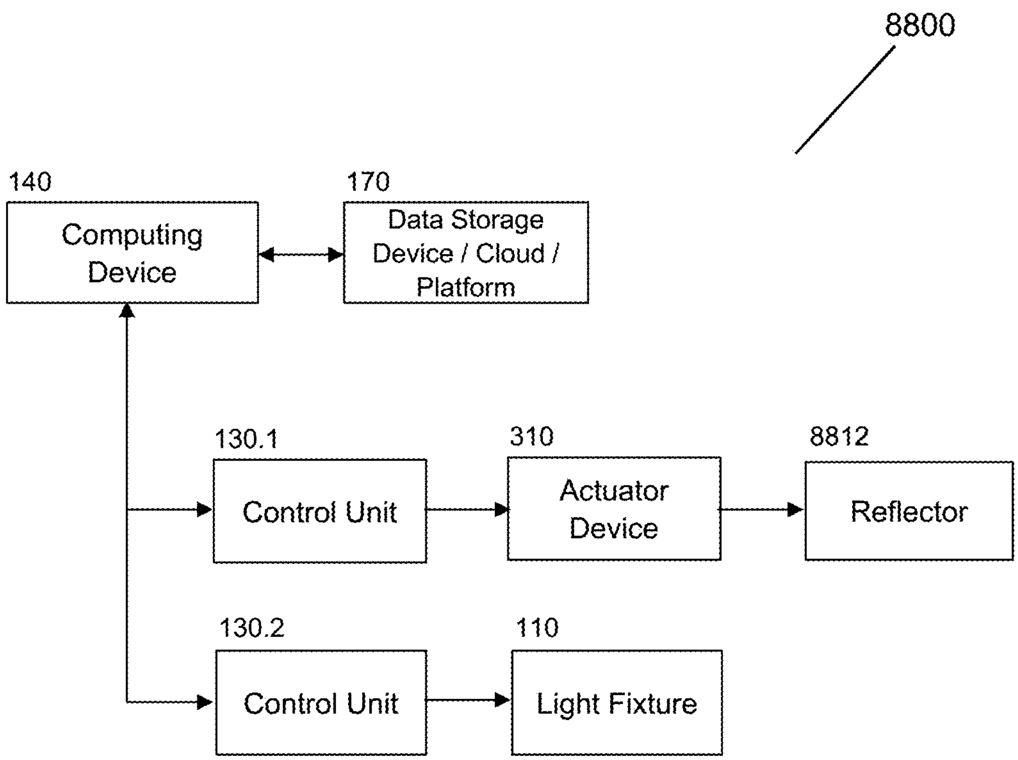
FIG. 83 shows a schematic block diagram of a controlled agricultural system according to "Heat Reflector".
Figure 85:
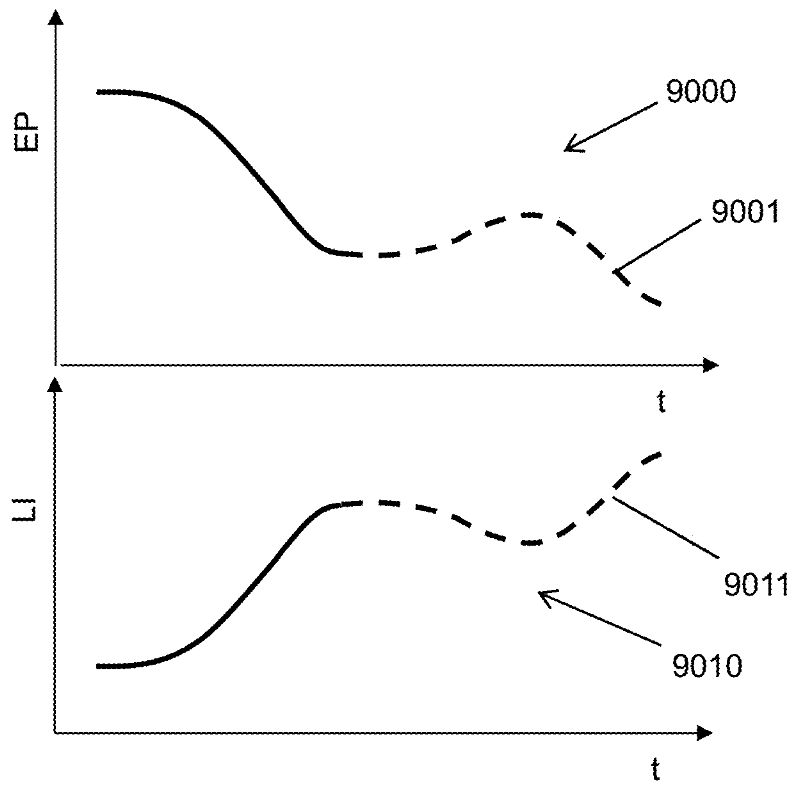
FIG. 85 shows a schematic curve of electricity price and light intensity of the light fixture of the controlled agricultural system adapted thereto.
Figure 86:
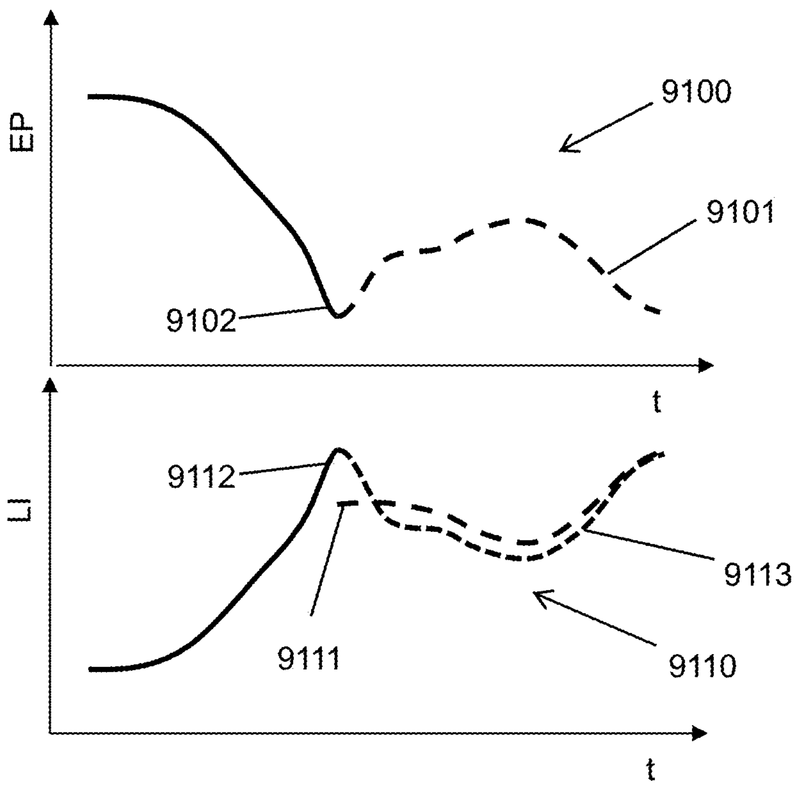
FIG. 86 shows a further schematic curve of electricity price and light intensity of the light fixture adapted thereto.
Figure 87:
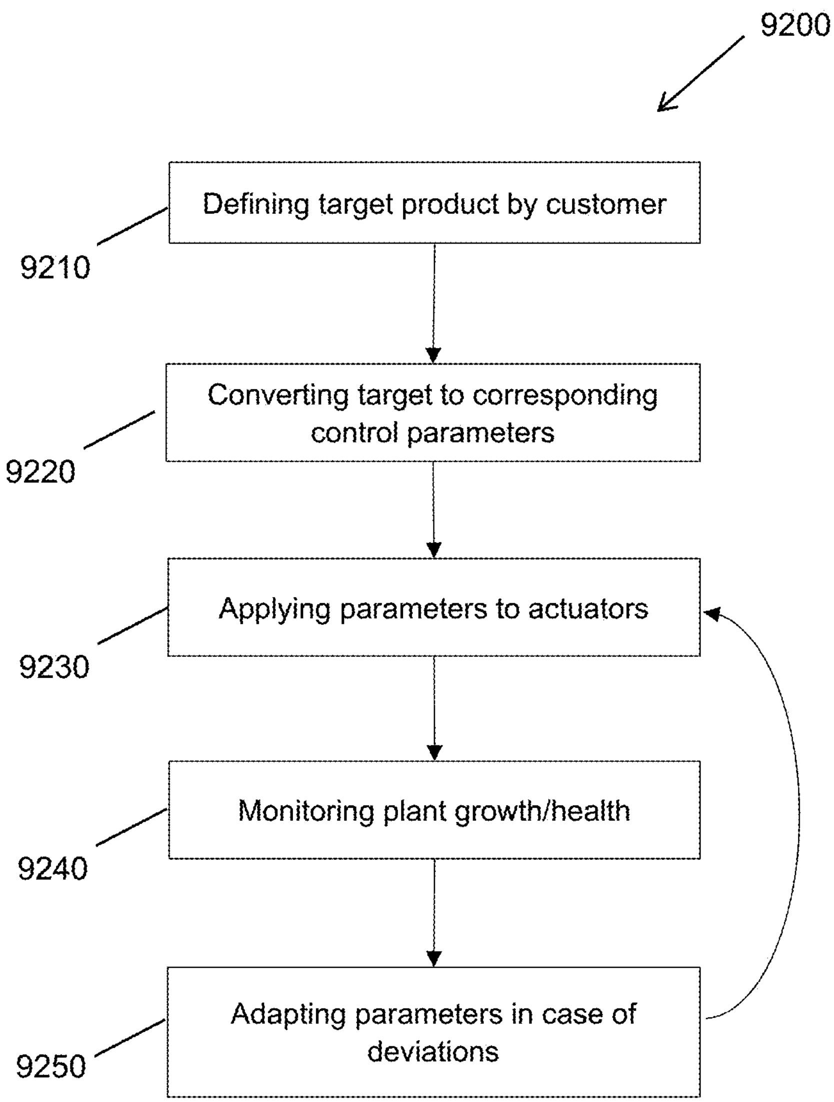
FIG. 87 shows a schematic flow chart of an exemplary embodiment of the method for agriculture according to "Customer Requirements".

FIG. 83 shows a schematic block diagram of a controlled agricultural system 8800 according to "Heat Reflector". The controlled agricultural system 8800 comprises a computing device 140, a data storage device 170, coupled to the computing device 140, an actuator device 310, coupled to the computing device 140 via a control unit 130.1, a heat reflector 8812, e.g. as shown in FIGS. 85 to 87, coupled to the actuator device 310, and an agricultural light fixture 110, e.g. as shown in FIGS. 85 to 87, coupled to the computing device 140 via another control unit 130.2. For illustrative purposes, only one agricultural light fixture 110 is shown. In practice, agricultural facilities can comprise a multitude of similar agricultural light fixtures.

The actuator device 310 is configured to be able to control the position/alignment of the heat reflector 8812 and/or—as the case may be—the shape by adjusting the movable parts of the heat reflector 8812 (see also FIG. 82).

The data storage device 170 comprises a database in which growth settings, including light recipes and correlated temperature values, for example measured at plant level, for various plants species are stored.

Furthermore, if knowing the reflector shape and distance to the fixture, the respective heat map at the reflector can be calculated (or measured). Alternatively, if a camera is around and measures the distance between fixture and plant, and measures the position and shape of a reflector, a computer can calculate the actual heat irradiation towards the plants and at the pants level—and thus allows controlling the entire setting.

The computing device 140 is configured to control the actuator device 310, including the heat reflector 8812, and the agricultural light fixture 110, including—as the case may be—ventilators and/or supplemental heat sources arranged at the agricultural light fixture 110, according to the growth recipe stored on the data storage device 170.

The information about the failing light source or fixture 110 may be delivered to the user or customer by a user interface (UI), e.g. a control terminal coupled to the computing device or a mobile device such as a smartphone or tablet including a dedicated software application (i.e. app for mobile devices).

Furthermore, one or more sensors (not shown) may be installed and connected to the computing device via a suitable control unit to measure the temperature, in some embodiments/implementations at various locations close to the plants.

Smart Grid

Figure 84:
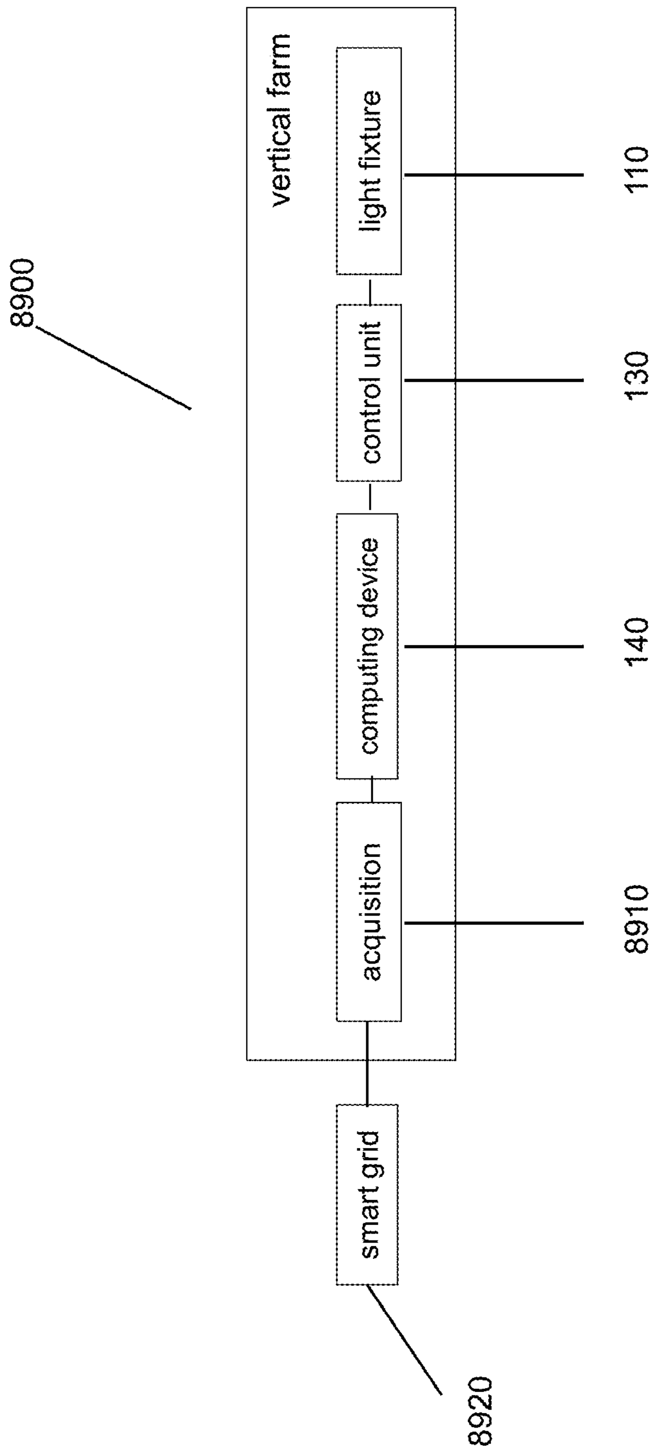
FIG. 84 shows a schematic design of a vertical farm with a controlled agricultural system according to "Smart Grid", which is connected to a smart grid power supply.

FIG. 84 shows a schematic design of a vertical farm 8900 having a controlled agricultural system according to the disclosure. The controlled agricultural system comprises an acquisition unit 8910, which is connected to a smart grid power supply (smart grid) 8920, a computing device 140 connected to the acquisition unit 8910, a control unit 130 connected to the computing device 140 and a light fixture 110 connected to the control unit 130.

By way of example, the acquisition unit can be configured as a central platform, which is accessed by various customers. Current information items in relation to the smart grid 8920, e.g., current electricity prices and predictions of the electricity price development, are supplied to the computing device 140 via the acquisition unit 8910. Using information items in relation to the smart grid 8920 and further information items in relation to the plants, the computing device 140 calculates the optimal light recipe and adapts the latter to changes in the information items where necessary. The calculated light recipe is output to the control device 130, which actuates the light fixture 110 in such a way that the light intensity currently corresponding to the light recipe is produced.

FIG. 85 shows a schematic curve 9000 of the electricity price EP over time t (top) and the curve 9010 of the light intensity LI (bottom) of the light fixture adapted thereto, said light fixture being represented schematically in FIG. 84 as an element of the vertical farm. It is possible to identify how the electricity price, which is derived from the current electricity supply, has an effect on the accordingly controlled light intensity. In this schematic illustration, the overall irradiation intensities, dark times, etc., have been neglected. A prediction 9001, 9011 for the further development is illustrated using dashed lines in each case.

FIG. 86 shows a further schematic curve 9100 of the electricity price EP over time t (top) and the curve 9110 of the light intensity LI (bottom) of the light fixture adapted thereto. A brief surplus of electricity, identifiable by the pronounced depression 9102 in the electricity price curve 9100, is captured by a brief corresponding increase in the light intensity, identifiable by the pronounced peak 9112 in the light intensity curve 9110. Thereafter, the further light intensity curve 9113 is recalculated, as illustrated by the tighter dashed line. The originally planned light intensity curve 9111 (illustrated by the wider dashed line) without the light intensity peak is slightly higher than the recalculated light intensity curve 9113.

In the case of an electricity surplus with a longer duration, the increase in the light intensity curve can be reduced prematurely again where necessary and an energy storage can be charged instead (not illustrated). The charged energy storage can then be used conversely during phases of high electricity prices for the energy supply of the vertical farm or of the controlled agricultural system.

Customer Interaction

FIG. 87 shows a schematic flow chart 9200 of an exemplary embodiment of the method for agriculture according to the disclosure using the controlled agricultural system according to the disclosure (the latter is not illustrated here).

Initially, the progress of the method starts with defining the target product by the customer (method step 9210). The definition is entered into the computer system of the controlled agricultural system, for example by way of the GUI or any other computer interface. Using this, the computer system converts the customer's wishes into corresponding control parameters or control signals (light recipe, etc.) (method step 9220). In the next method step 9230, the control parameters thus established are applied to the actuators (light fixture, etc.). The plant growth or the plant health is monitored by way of the sensor system of the controlled agricultural system (method step 9240). In the case of deviations between the result of the check (actual values) and an expected profile of the plant growth of the target product (intended values), suitable measures are adopted; by way of example, the control parameters are adapted (method step 9250). Then, there is a return to method step 9230. By contrast, if the final state of the target product has been reached, the product can be harvested.

A database may be provided for establishing possible deviations, the ideal profile of the plant growth of the target product (intended values) in some embodiments/implementations being stored in said database, for example on the basis of empirical values. As an alternative or in addition thereto, the computing device of the computer system can be configured, with the aid of suitable algorithms, to predict the ideal profile of the plant growth of the target product (intended values) on the basis of the definition of the target product and control parameters that are suitable to this end (intended values). Moreover, the computing device of the computer system can be configured to establish deviations of the current actual values from these intended values and, where necessary, calculate suitably corrected control parameters.

Figure 88:
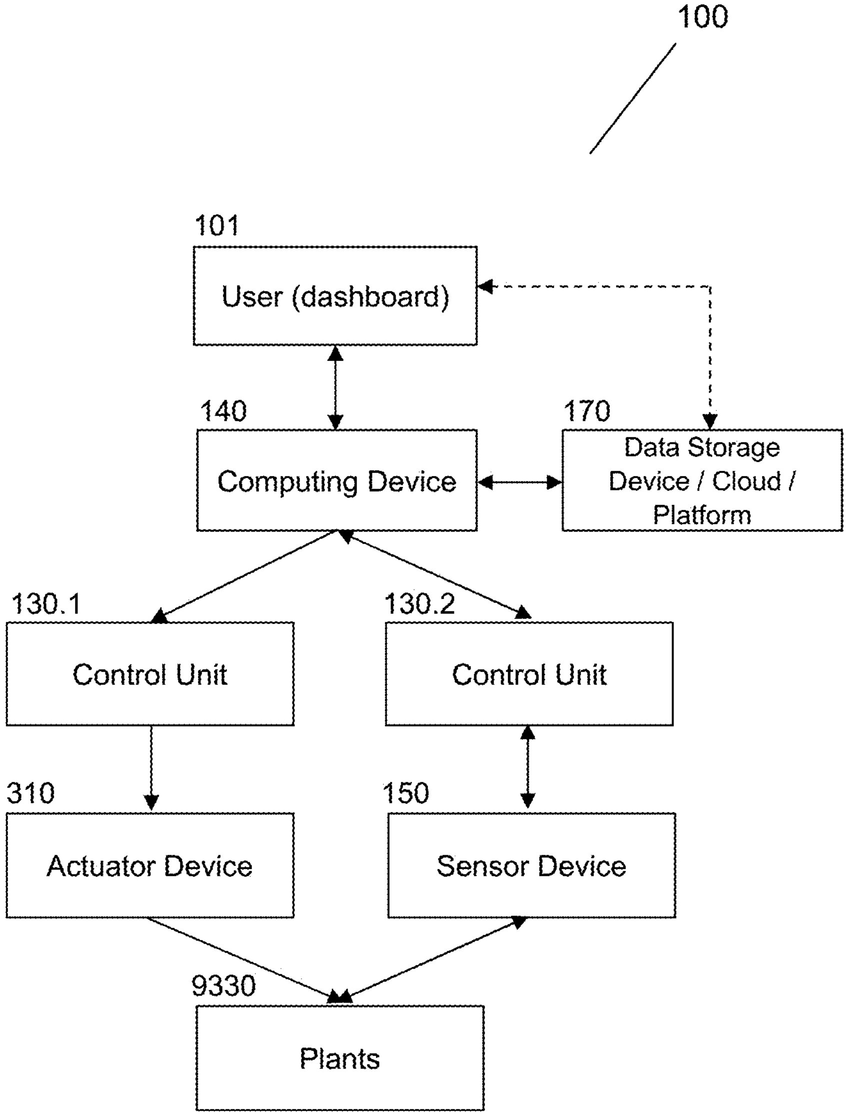
FIG. 88 shows a schematic block diagram of a controlled agricultural system according to "Success Score".

FIG. 88 shows a schematic block diagram of a controlled agricultural system 100, according to the disclosure. The controlled agricultural system 100 comprises a computing device 140, a data storage device 170, coupled to the computing device 140, an actuator device 310, coupled to the computing device 140 via a control unit 130.1 and a sensor device 121, coupled to the computing device 140 via a second control unit 130.2.

The data storage device 170 or even the computing device 140 may be based locally (on-site), in a (centralized) network or the cloud. Furthermore, the data storage device 170 may also be integrated into the computing device 140. The data storage device 170 may comprise a (digital/online-) platform, e.g. located in the cloud. The platform may also be accessible by mobile devices, e.g. laptop PC, tablet PC or smartphones via dedicated apps. Therefore, a user 101 may access the platform via the computing device 140 or a separate device (not shown). Furthermore, the platform may comprise dashboards customized to various user groups such as growers and customers.

The data storage device 170 comprises a database in which growth recipes are stored. The database may also comprise data documenting previous plant projects, e.g. from other growers using the same platform.

The computing device 140 is configured to control the actuator device 310 based on the data stored in the data storage device 170, particularly for conducting growth recipes. Therefore, the actuator device 310 may comprise various actuators for adjusting various growth parameters, e.g. water, nutrient, light (intensity, spectrum), etc.

Furthermore, the computing device 140 is configured to collect the data from the sensor device 150, particularly for monitoring the environmental conditions and the growth status of the plants. Therefore, the sensor device 150 may comprise various sensors for, e.g., the temperature, the illumination, the color of the plants and fruits, or cameras for imaging methods, etc.

In some embodiments/implementations, the computing device 140 is configured to choose the best-match growth recipe currently available in the database. Furthermore, the computing device 140 may be configured to analyze whether the best-match growth recipe can be realized with the available setup of the controlled agricultural system 100. Otherwise, the computing device 140 suggests a feasible growth recipe.

Furthermore, the computing device 140 is configured to evaluate a success score based on data stored in the data storage device 170 from similar configurations regarding customer demand, result of the corresponding plant project, and the setup of the respective agricultural system.

Furthermore, the computing device 140 is configured to render a model plant (digital plant twin) based on the respective growth recipe.

Furthermore, the computing device 140 is configured to identify possible differences between the real plant and the model plant. The computing device 140 may also be configured to adjust the growth parameter by means of the actuator device 310 in order to minimize any differences between the real plant 9330 and the model plant.

Figure 89:
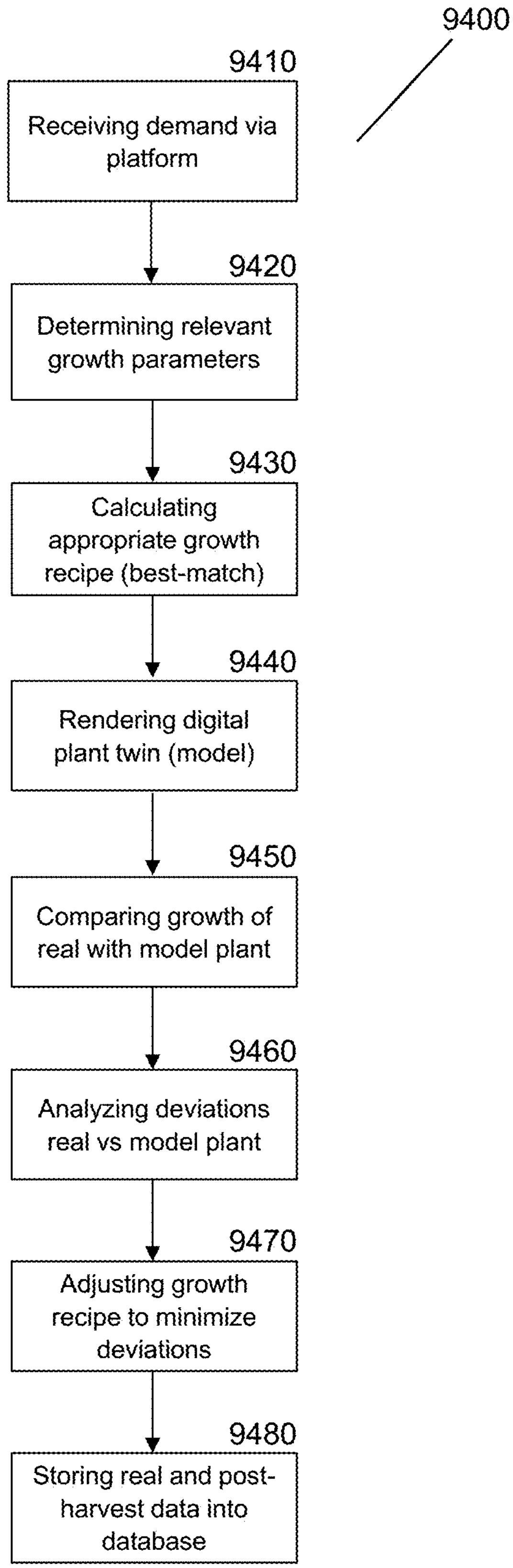
FIG. 89 schematically shows the steps of a method for agricultural management according to "Success Score".

FIG. 89 schematically shows the steps 9400 of a method for agricultural management according to the disclosure. The method aims to improve the growth results of real plants with the help of a model plant (digital plant twin). For the following description, in addition to FIG. 89, reference is made to FIG. 88. The method comprises the following steps:

Step 9410: Receiving a demand on the platform (growers view), submitted by a customer via the dashboard 101 of the platform (customers view);

Step 9420: Determining the growth parameters that influence the plant characteristics relevant to the customer's demand;

Step 9430: Calculating an appropriate growth recipe (preferably best-match; optionally extrapolating from existing growth recipes) by means of the computing device 140 based on the information of steps 9410 and 9420 and the database 170 (e.g. collection of growth recipes and results achieved under various environmental conditions and setups);

Step 9440: Applying the growth parameters to the plants and rendering a model plant (digital plant twin) by means of the computing device 140 based on the growth recipe determined in step 9430;

Step 9450: Comparing the growth of the real plant with the model plant by means of the computing device 140 based of the data from the sensor device 150 and the digital plant twin;

Step 9460: Analyzing which parameters caused the deviations between the real plant and the model plant by means of the computing device 140;

Step 9470: Adjusting the growth parameters of the growth recipe by means of the actuator device 310 and the computing device 140 in order to minimize the deviations detected in step 9450;

Step 9480: Storing the environmental data and growth data of the real plant(s) collected by means of the sensor device 150 and the post-harvest data (particularly regarding the characteristics relevant to the customer's demand) into the database 170.

The steps 9450 to 9470 may be repeated (regularly or randomly or from time to time or dependent on the growth status or else) until harvest.

Figure 90:
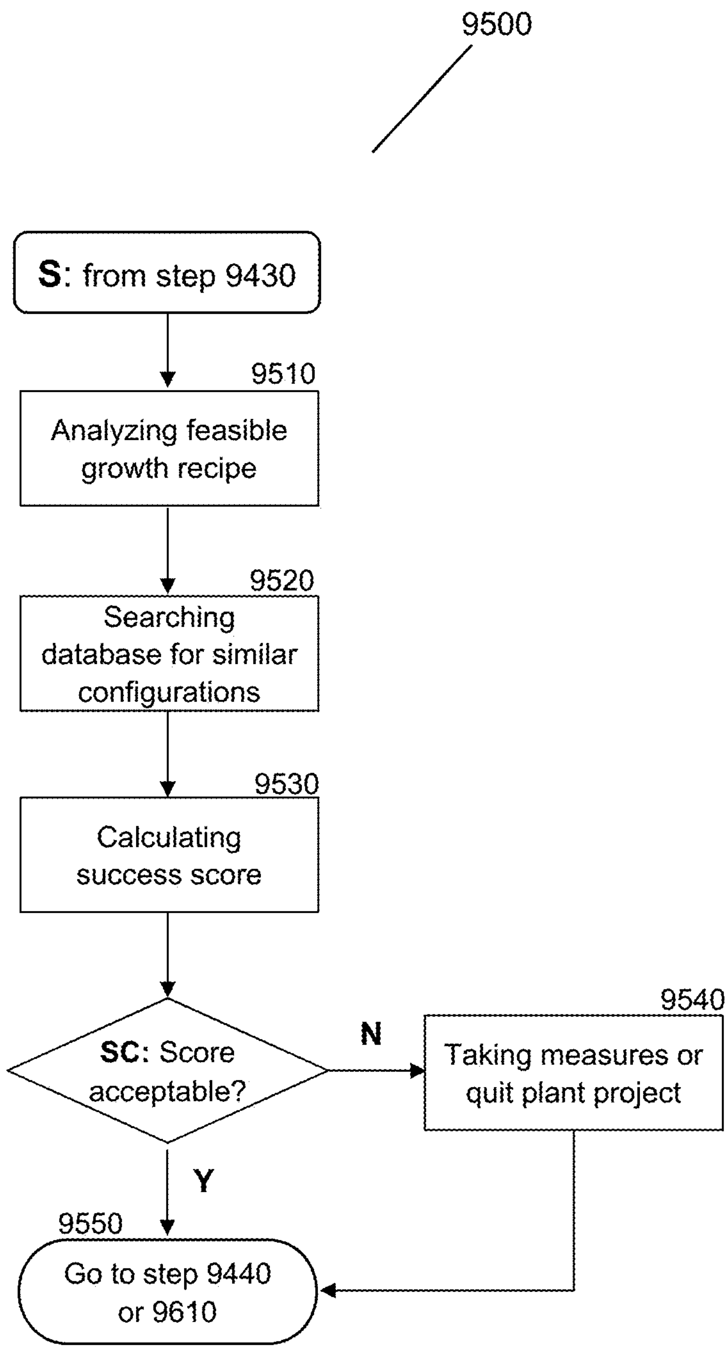
FIG. 90 schematically shows the steps of another method for agricultural management according to "Success Score".

In an enhanced embodiment of the method, the methods shown in FIG. 90 (evaluating success score) and/or 96 (deal making) may be conducted between the steps 9430 and 9440.

FIG. 90 schematically shows the steps 9500 of another method for agricultural management according to the disclosure. The method aims to calculate a success score in order to evaluate the chances of success for meeting a specific customer's demand. The method may be optionally combined with the method shown in FIG. 89 and helps to decide a grower whether to accept a customer's demand and/or to improve the grower's success rate by acting appropriately before starting the requested plant project. For the following description, in addition to FIG. 90, reference is also made to FIGS. 88 and 94. The method starts (S) from step 9430 of FIG. 89 and comprises the following steps:

Step 9510: Analyzing by means of the computing device 140 which growth recipe is feasible with the available setup of the controlled agricultural system 100 based on the best-match growth recipe determined in step 9430 (FIG. 89);

Step 9520: Searching the database 170 for similar configurations (setup, growth recipe) by means of the computing device 140;

Step 9530: Calculating a success score by means of the computing device 140 based on the search result of Step 9520;

If score is not acceptable (SC?=N):

Step 9540: Taking appropriate measures to improve the success score and go to step 9550 afterwards or quit the plant project;

If score is acceptable (SC?=Y):

Step 9550: Go to step 9440 (FIG. 89; conducting plant project) or to 9610 (FIG. 91; deal making).

In Step 9530, the calculation of the success score may be based on the number of previous successful growth for the same customer's demand recorded in the database 170.

Figure 91:
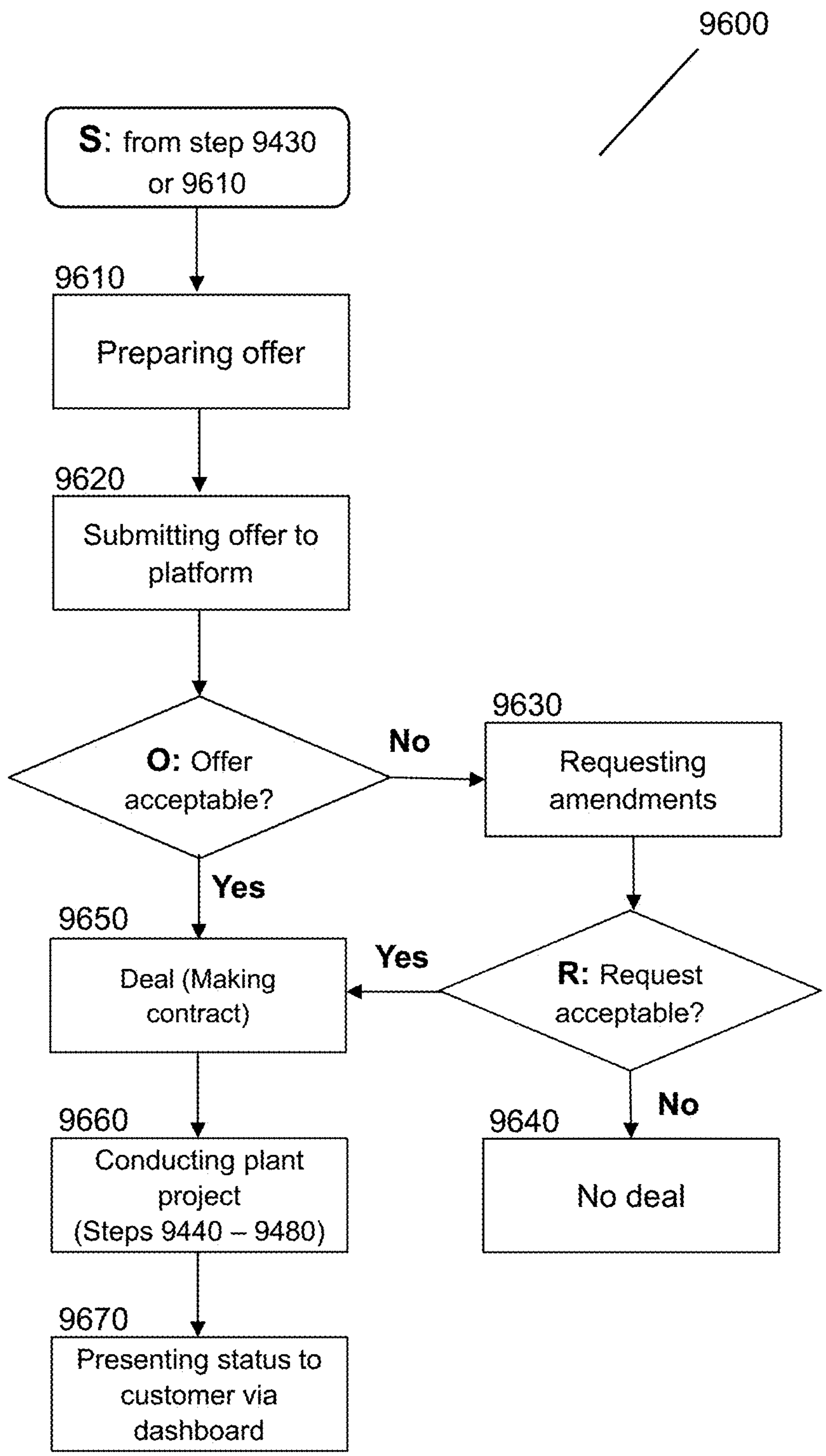
FIG. 91 schematically shows the steps of yet another method for agricultural management according to "Success Score".

FIG. 91 schematically shows the steps 9600 of yet another method for agricultural management according to the disclosure. The method aims to arrange a deal making between the customer submitting a specific plant demand via the platform 170 and the grower submitting an offer to the customer via the platform 170. The method may be optionally combined with the method shown in FIGS. 89 and/or 95 and helps to make a deal and keep the customer informed about the growth status of the requested plants. For the following description, in addition to FIG. 91, reference is also made to FIGS. 93 to 95. The method starts (S) from step 9430 of FIG. 89 and comprises the following steps:

Step 9610: Preparing an offer based on customer's demand, calculated costs and, optionally, the success score calculated according to FIG. 90;

Step 9620: Submitting the offer to the platform and addressing the dashboard of the customer who submitted the request;

If the offer is not acceptable to the customer (O?=N):

Step 9630: Requesting amendments (e.g. price, plants characteristics, delivery) to the offer by the customer via the platform;

If the requested amendments are not acceptable to the grower (R?=N):

Step 9640: No deal;

If the requested amendments are acceptable to the grower (R?=Y): go to step 9650;

If the offer is acceptable to the customer (O?=Y):

Step 9650: Deal; Making a respective contract between the costumer and the grower, in some embodiments/implementations via the platform;

Step 9660: Conducting the plant project agreed upon by both parties, i.e. go to steps 9440-9480;

Step 9670: Presenting the growth status of the customized plants to the customer via the platform (on customer's dashboard).

Figure 92:
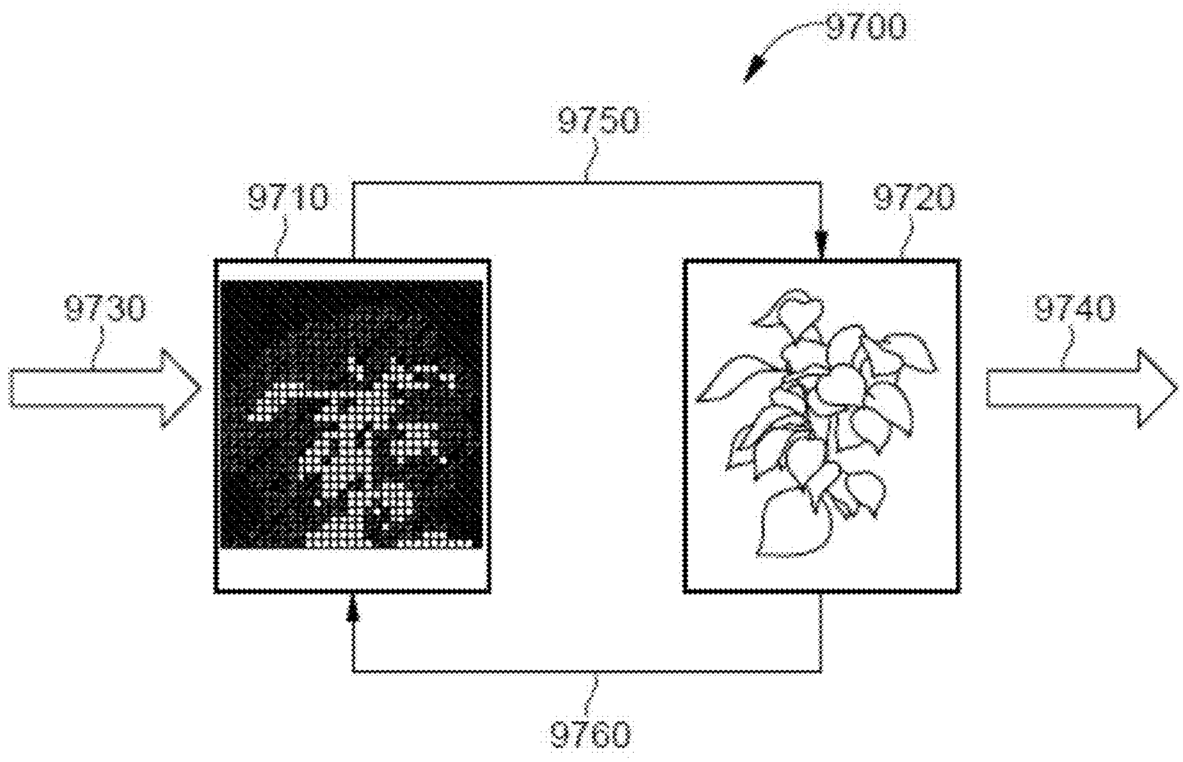
FIG. 92 schematically shows a digital model and a corresponding real plant.

FIG. 92 schematically shows the interrelationship 9700 between a digital model 9710 (customer's demand) and a corresponding real plant 9720 (customized product). The digital model 9710 (digital plant twin) is rendered by means of the computing device 140 of the controlled agricultural system 100 (see FIG. 88) according to the customer's demand. By means of feedback loops, plant growth algorithm and artificial intelligence (AI), possible deviations between the real plants 9720 and the digital plant twin 9710 are minimized. Furthermore, the digital plant twin 9710 allows predicting the result of changing growth parameters of the growth recipe.

Figure 93:
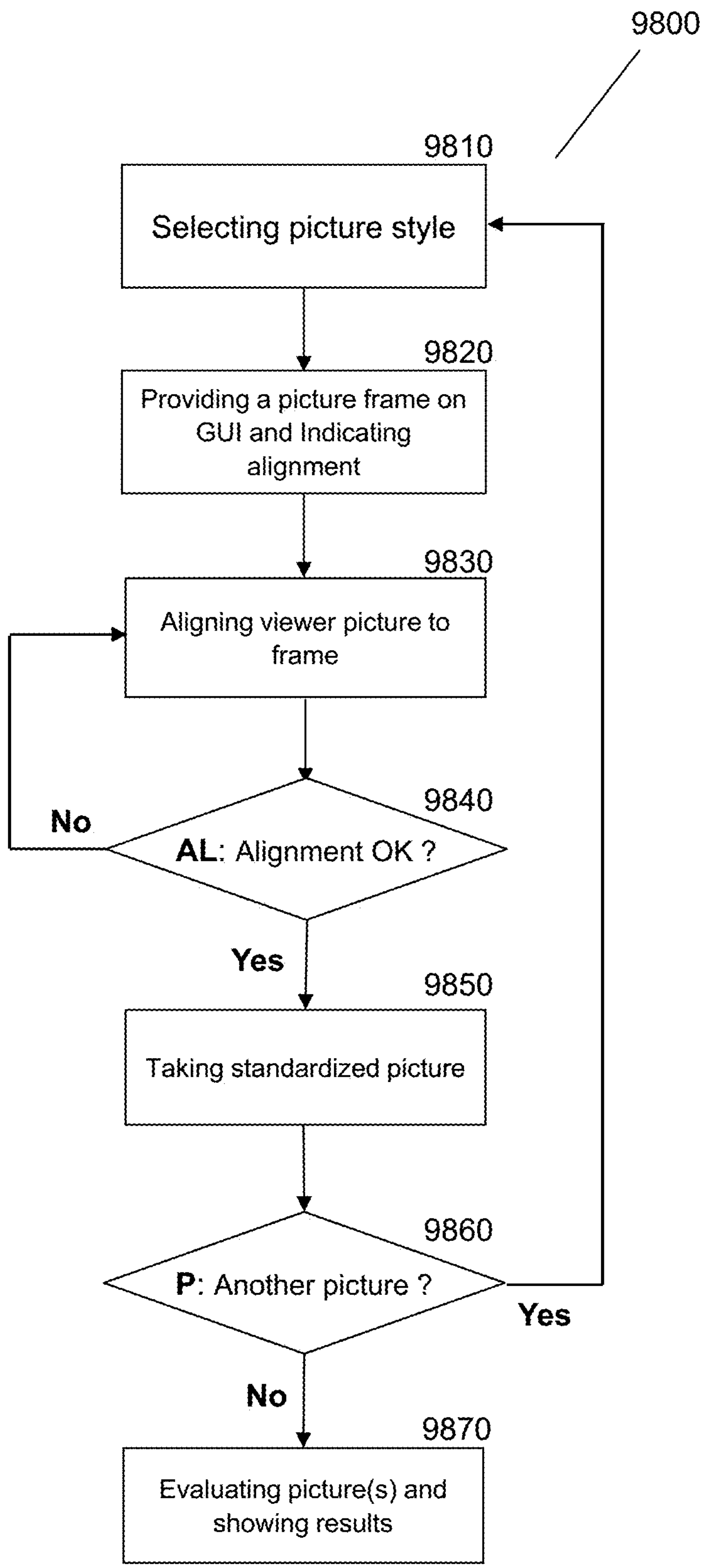
FIG. 93 schematically shows the steps of a method for agricultural management according to "Picture Taking & Evaluation".

FIG. 93 schematically shows the steps 9800 of a method for agricultural management according to the disclosure. The method aims to facilitate taking standardized pictures of horticultural objects, e.g. plants, in some embodiments/implementations with suitable mobile devices (i.e. including a camera), e.g. smartphones. The method starts by starting the app's picture mode on the device and further comprises the following steps;

Step 9810: Selecting a picture style from a set of picture styles,

Step 9820: Providing a picture frame on GUI (shown on screen of device) and indicating how to achieve alignment for taking a standardized picture, Step 9830: Targeting horticultural object with camera and aligning the viewer picture to the picture frame, Step 9840: Checking alignment (AL?), If out of alignment (No): repeat step 9830, If in alignment (Yes): continue with step 9850, Step 9850: Taking standardized picture, Step 9860: Deciding whether to take another standardized picture (P?), If another picture is requested (Yes): go back to step 9810, If another picture is not requested (No): continue with step 9870, Step 9870: Evaluating the picture(s) and showing the results.

Step 9810 may comprise selecting from a variety of picture styles like distance shot, figure shot, full shot, medium shot, close-ups, extreme close-ups, etc. Furthermore, the horticultural object type may be selected from a set of picture styles, e.g. plant (single, multiple), growing cabinet, etc. The selection may be conducted by taking a picture of the environment beforehand, analyzing the picture, e.g. by means of image recognition, and determining an appropriate picture style.

Step 9820 may comprise indications (e.g. arrows in the corners of the picture frame) on the GUI about adapting the position of the device, particularly the distance to the respective plant and the orientation (vertically and horizontally) as well as the inclination, to enable a standardized picture, which is suitable for subsequent analysis. For more details, see FIGS. 99-101.

Step 9830 may comprise moving the device back and forth, tilting the device, etc. until the picture of the target object, e.g. plant or growing cabinet including plants, seen by the camera of the device, i.e. as depicted on the "viewer" of the app, matches with the picture frame. For more details, see FIGS. 99-101.

Step 9850 may comprise shooting still pictures as well as motion pictures (videos). Shooting may be assisted by flash or continuous light in the visible (white or colored) or infrared range of the spectrum.

Step 9870 may comprise image recognition and data analytics (algorithms, AI) for evaluating the plant growth status and plant health. This may involve calculating Leaf Area Index or Normalized Difference Vegetation Index, detecting coloring/pigmentation, number of fruits and vegetables, plant morphology, etc.

Step 9870 may further comprise graphical output, e.g. graphs, growth trackers, time-lapse videos, etc., to represent the results of the analysis. This may comprise topographic maps or 3D data models based on different pictures, e.g. taken at different positions, possibly also under different angles.

Step 9870 may further comprise displaying scores and badges according to the grower's success, based on real-time, historical and benchmarking data.

Step 9870 may further comprise comparing the captured pictures with a picture database to determine plant abnormalities, e.g. mold, pest, nutrient lack, tip burn, etc. In a refinement of the method for agricultural management according to the disclosure, further steps may suggest adjustments to the present growing conditions.

Figure 94:
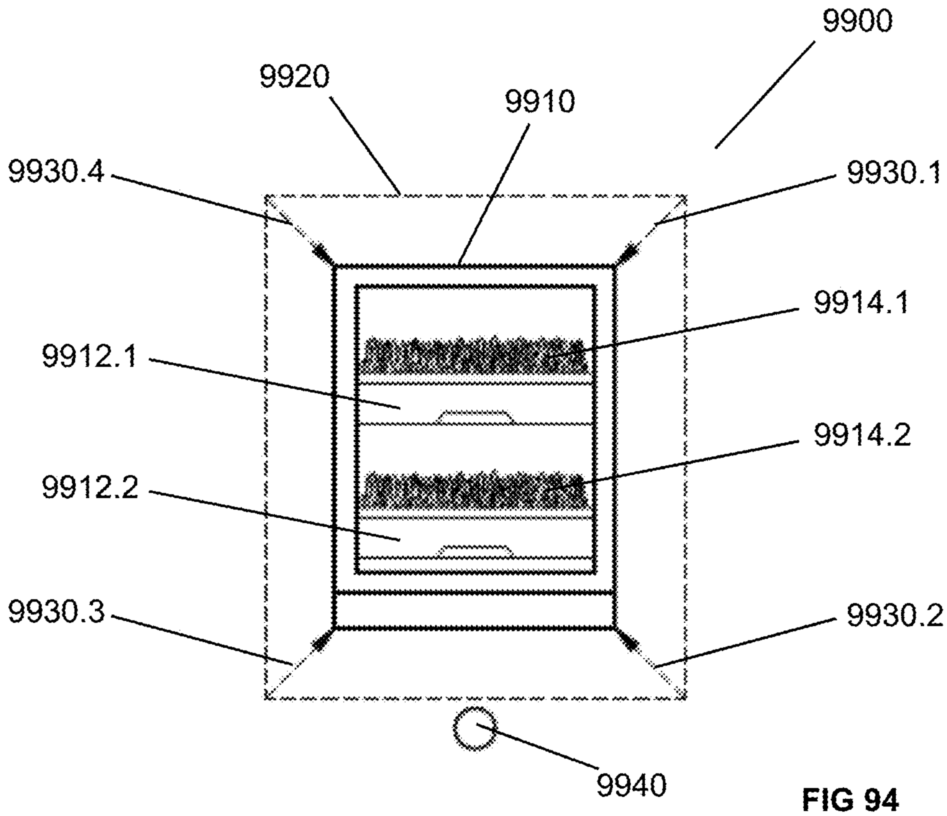
FIG. 94 schematically shows an example of an image of a growing cabinet in a viewfinder.

FIG. 94 schematically shows an example 9900 of an image 9910 of a growing cabinet (object) in the "viewer" screen (viewfinder) of an embodiment (e.g. software app running on a mobile device) of the method for agricultural management according to the disclosure. The (image of the) cabinet 9910 comprises two vertically stacked drawers 9912.1, 9912.2 in which plants 9914.1, 9914.2 are arranged, in some embodiments/implementations leafy greens and herbs. The picture frame 9920 comprises arrows 9930.1-9930.4 (four arrows, one arrow in each corner of the frame oriented to the center of the frame) that indicate to the user to move the device (e.g. smartphone running the app) closer to the growing cabinet 9910. A red light 9940 indicates that the frame 9920 and the image 9910 of the object are misaligned.

Figure 95:
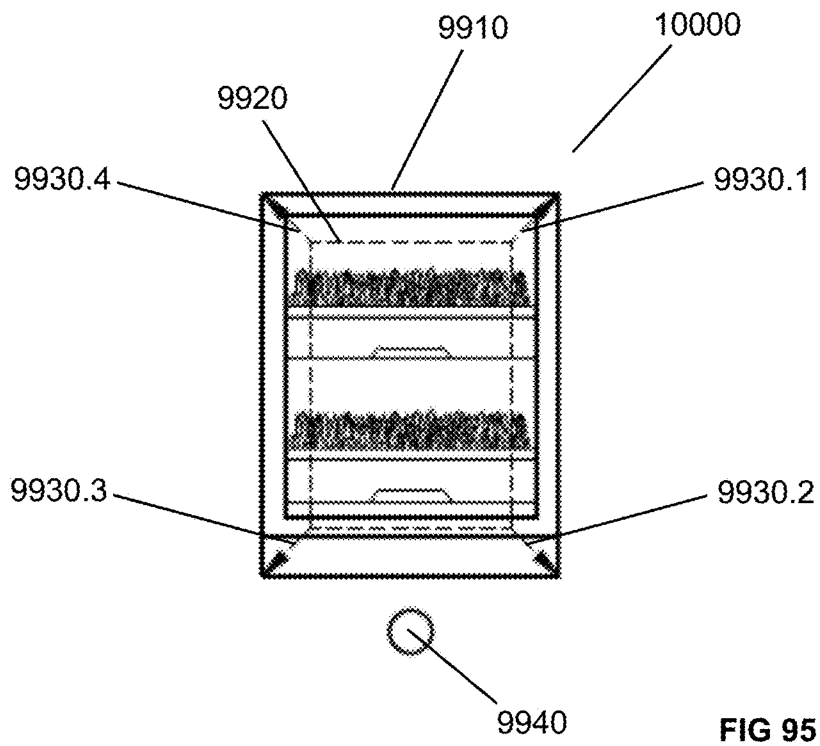
FIG. 95 shows a different view of the example of FIG. 94.

FIG. 95 schematically shows another view 10000 of the example shown in FIG. 94. Again, the red light 9940 indicates a misalignment between the picture frame 9920 and the object 9910 (plant cabinet). Here the arrows 9930.1-9930.4 indicate to the user to move the device (e.g. smartphone running the app) closer to the growing cabinet 9910.

Figure 96:
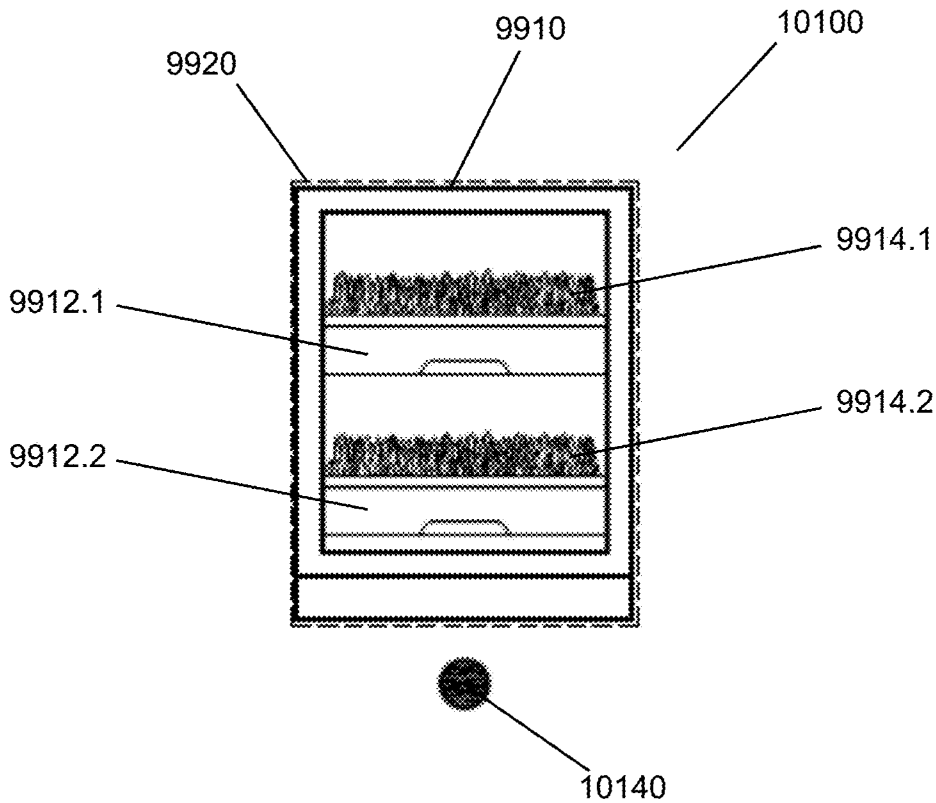
FIG. 96 shows a standard view of the example of FIG. 94.

FIG. 96 shows a view 10100 of the example of FIG. 94 with a corrected position of the device, i.e. now the frame 9920 and the (image of the) object 9910 are aligned (no arrows displayed), indicated by a green light 10140. In other words, the device is now in the correct position for taking a picture of the object 9910 (growing cabinet) according to the defined standard.

Figure 97:
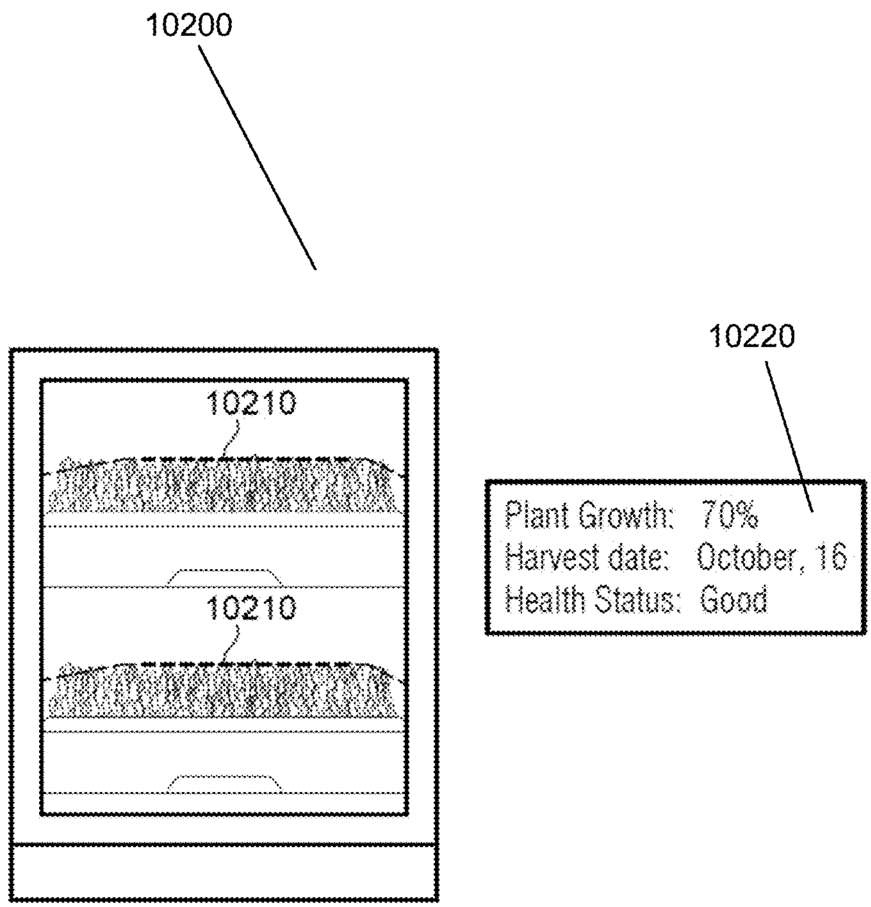
FIG. 97 shows an example of a result of an analysis of the standardized picture captured in FIG. 96.

FIG. 97 shows an example of a result 10200 of an analysis of the standardized picture captured in FIG. 96. The analysis depicts a growth height 10210 of the plants (culinary herbs), detected from the captured picture. Based on the height 10210, the software app calculates the plant growth status (70%) and the harvest date (e.g. October 16). Furthermore, based on the standardized picture 101, the software app evaluates the health status (e.g. good). The result of the analysis is displayed on a dashboard 10220.

Figure 98:
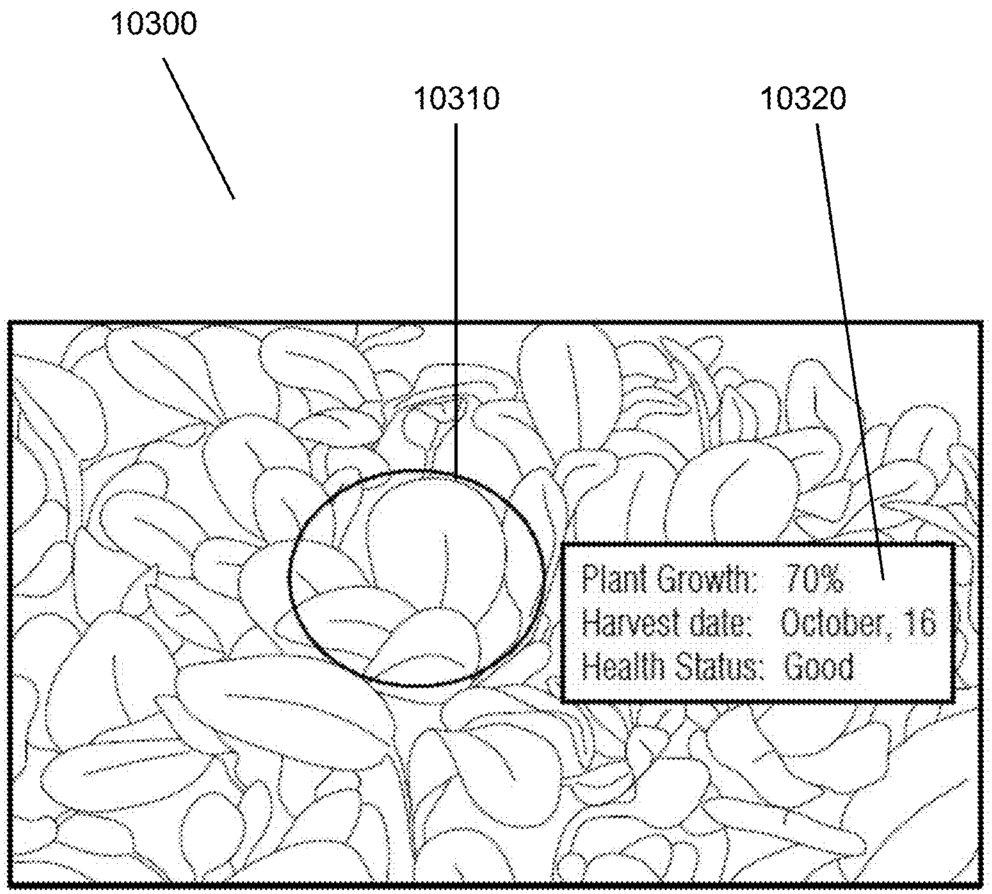
FIG. 98 shows another example of a result of an analysis of a standardized picture.

FIG. 98 shows another example of a result 10300 of an analysis of a standardized picture of e.g. basil or oregano. In this example, the analysis of the growth status is based on the Leaf Area Index detected from a suitable part 10310 of the picture, i.e. at least one leaf of the plants. Again, the result is depicted on a dashboard 10320 (in this example the result is the same as the one shown in FIG. 97).

Figure 99:
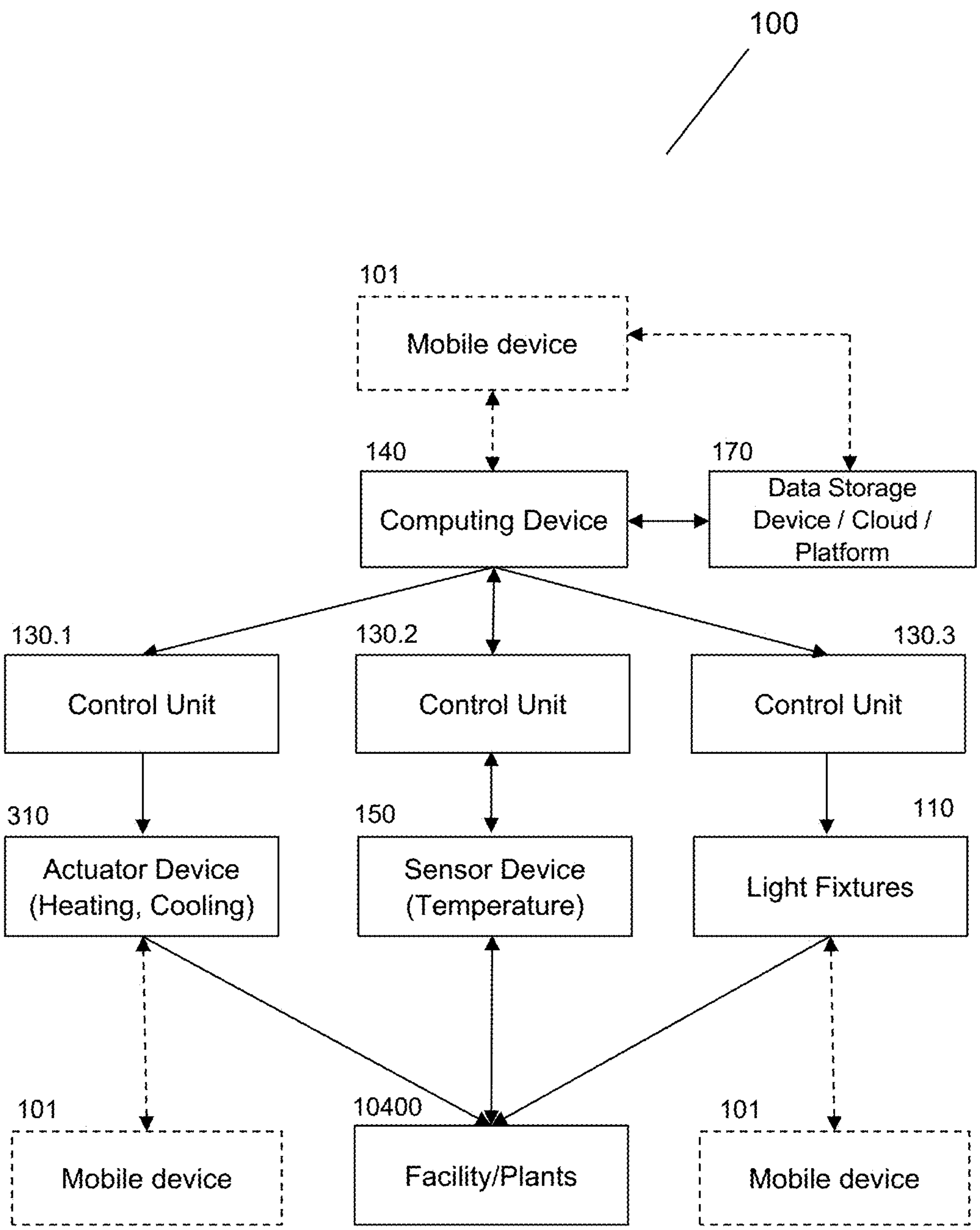
FIG. 99 shows a schematic block diagram of a controlled agricultural system for an agricultural facility.

FIG. 99 shows a schematic block diagram of a controlled agricultural system 100 for an agricultural facility 10400, according to the disclosure. The controlled agricultural system 100 comprises a computing device 140, a data storage device 170, coupled to the computing device 140, an actuator device 310, coupled to the computing device 140 via a control unit 130.1, a sensor device 150, coupled to the computing device 140 via a second control unit 130.2 and lighting fixtures 110 (one lighting fixture or multiple lighting fixtures), coupled to the computing device 140 via a third control unit 130.3.

The data storage device 170 or even the computing device 140 may be based locally (on-site) or in a (centralized) network or the cloud. Furthermore, the data storage device 170 may also be integrated into the computing device 140. The data storage device 170 may include a (digital/online-) platform, e.g. located in the cloud. The platform may also be accessible by a mobile device 101, e.g. laptop PC, tablet PC or smartphones via dedicated apps. Therefore, a user may access the platform via the computing device 140 or the mobile device 101. Furthermore, the platform may comprise dashboards customized to various user groups such as growers and customers.

The data storage device 170 comprises a database in which growth settings, including light recipes and temperature profiles (temporal and/or spatial), for various plants are stored. The database may also comprise data documenting previous plant projects, e.g. from other growers using the same platform.

The computing device 140 is configured to control the actuator device 310 based on the data stored in the data storage device 170, e.g. for (re-) adjusting the temperature according to the temperature profile of the respective plant species.

Furthermore, the computing device 140 is configured to collect the data from the sensor device 150, e.g. for monitoring the environmental conditions in the agricultural facility and/or the plant growth.

The computing device 140 is configured to control the lighting fixtures 110 based on the data stored in the data storage device 170, e.g. according to the light recipes of the respective plant species.

In a refined embodiment, the lighting fixtures 110 and/or the actuators 310 are configured for direct access and control via the mobile device 101, e.g. by means of a dedicated software application (app). For instance, the lighting fixtures 110 and the actuators 310 comprise sensors (photoelectrical, piezo, etc.). Furthermore, the app is designed to control and regulate the lighting fixtures 110 and the actuators 310 based on executable command data transmitted by the mobile device 101.

For instance, the user may accept a new, improved or more appropriate light recipe or any other adjustment of the environmental and/or growth conditions suggested by the app and execute it directly via the mobile device 101. An advantage of this operation mode is that it also works if the computer-based system is down or even without it.

Furthermore, the executable command data send by the mobile device 101 may comprise dedicated (ultra)sonic sequences generated by the speaker of the mobile device or modulations of a photoflash LED or a specific IR-LED.

Figure 100:
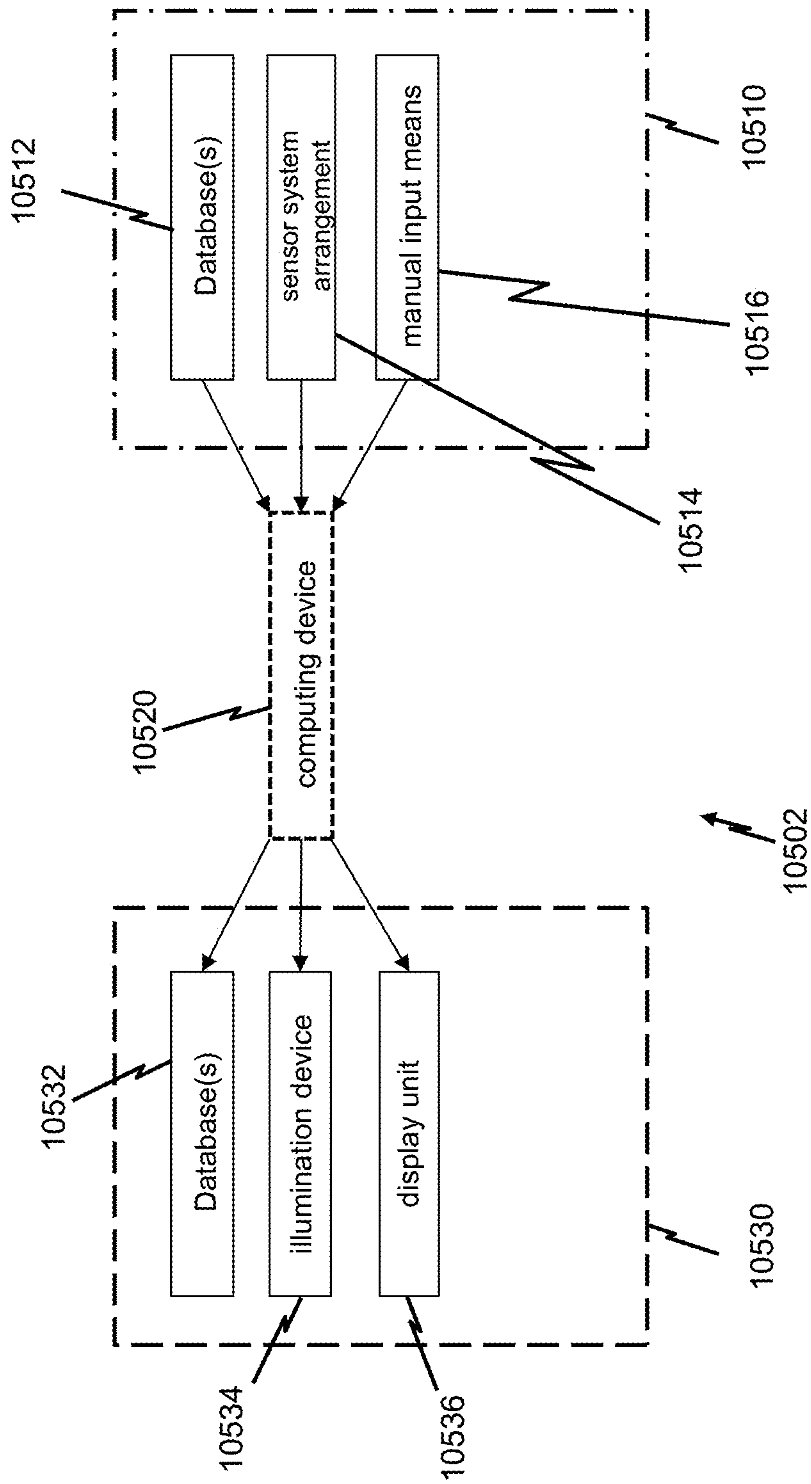
FIG. 100 shows a representation of a control unit of a breeding and/or growing and/or raising facility according to an embodiment of "Eco Certificate" as well as "Medical Certificates".

FIG. 100 shows a representation of a control unit 10502 of a breeding and/or growing and/or raising facility 10601 (see FIG. 101) according to an embodiment of “Eco Certificates” as well as “Medical Certificates”. The control unit 10502 comprises at least one input device 10510, a computing device 10520 and an output device 10530. Here, as data sources, the input device 10510 may comprise, inter alia, one or more databases 10512, one or more sensor system arrangements 10514 and/or manual input means 10516. The database 10512, or databases, can be stored both on local storage media, mobile storage media or so-called cloud storage media, i.e., nonlocal, decentralized storage media. The database or databases 10512 can store data in respect of the breeding and/or growing and/or raising facility 10601 per se, i.e., information items about the components used in the breeding and/or growing and/or raising facility or the products, such as plant or animal products, produced therein. Moreover, it is conceivable that more in-depth information items in respect of the products to be produced or the components employed are stored in the database or databases 10512, for example a life-cycle assessment of planted products or raised animals, data sheets of employed components such as, for example, light modules, or the like. Moreover, the database or the databases 10512 may contain light recipes.

Here, a sensor system arrangement 10514 is understood to mean one or more sensors that acquire data and that are connected indirectly or directly, for example via an interface, to the computing device 10520. The employed sensors of the sensor system arrangement 10514 can be cameras, LIDAR, radar, spectroscopes, sensors for measuring temperature, humidity or pH value, and other sensors. By way of example, further sensors may be able to acquire a growth, a maturity state, the occurrence and/or advance of diseases or pests, a mineral or vitamin content of plants to be grown or the like. To this end, the sensors of the sensor system arrangement can also be connected to one another, to a database and/or to a further computing device.

Manual input means of the input device 10510 can allow manual input on the part of a user or operator. Here, the content of the input can be light recipes or modifications to light recipes, for example.

Moreover, manual input means may also contain customer wishes, for example prescriptions from customer orders.

The computing device 10520 serves primarily to calculate and carry out light recipes for controlling an illumination device 10534. Moreover, the computing device can serve to evaluate sensor data from the sensor system arrangement 10514, for example in order to adapt a light recipe on the basis of sensor data, or in order to propose such an adaptation. Incidentally, the computing device 10520 can also be embodied to control the entire breeding and/or growing and/or raising facility. To this end, the computing device 10520 may also comprise a plurality of units. Here, the individual units may be connected to one another. In addition to a light control, there can also be, for example, the control of watering, feeding, fertilizing, climate control and the like.

Moreover, on the basis of the input prescriptions and information items, the computing device can calculate, decide and/or propose that alternative light recipes are more suitable within the scope of the selected options, have a higher efficiency, have a better life-cycle assessment, or the like. In this respect, the computer unit 10520 may also comprise an intelligent control or a self-learning control for improved actuation of the breeding and/or growing and/or raising facility 10601.

In the present case, an output device 10530 is understood to mean the components of the breeding and/or growing and/or raising facility 10601 in respect of which there is an output of data and/or control commands from the computing device 10520. Firstly, this comprises the illumination device 10534, which is used to illuminate the products and by means of which the light recipes are applied. Moreover, one or more display units 10536 can be provided in the output device 10530. A display unit 10536 can be provided or usable for displaying very different contents. Thus, a display unit 10536 renders it possible to display, for example, an advance of the growth of the products, a currently applied light recipe, a future prediction of the growth, an order process, an advance of order processes and the like. Here, a display unit 10536 can be, for example, a monitor, a display of a mobile device, and other apparatuses such as projectors, VR glasses or AR glasses and the like.

Moreover, the output device 10530 may contain one or more databases 10532. Here, in particular, it is also conceivable for the databases 10532 of the output device 10530 to be identical or partly identical with the databases 10512 of the input device 10510.

Figure 101:
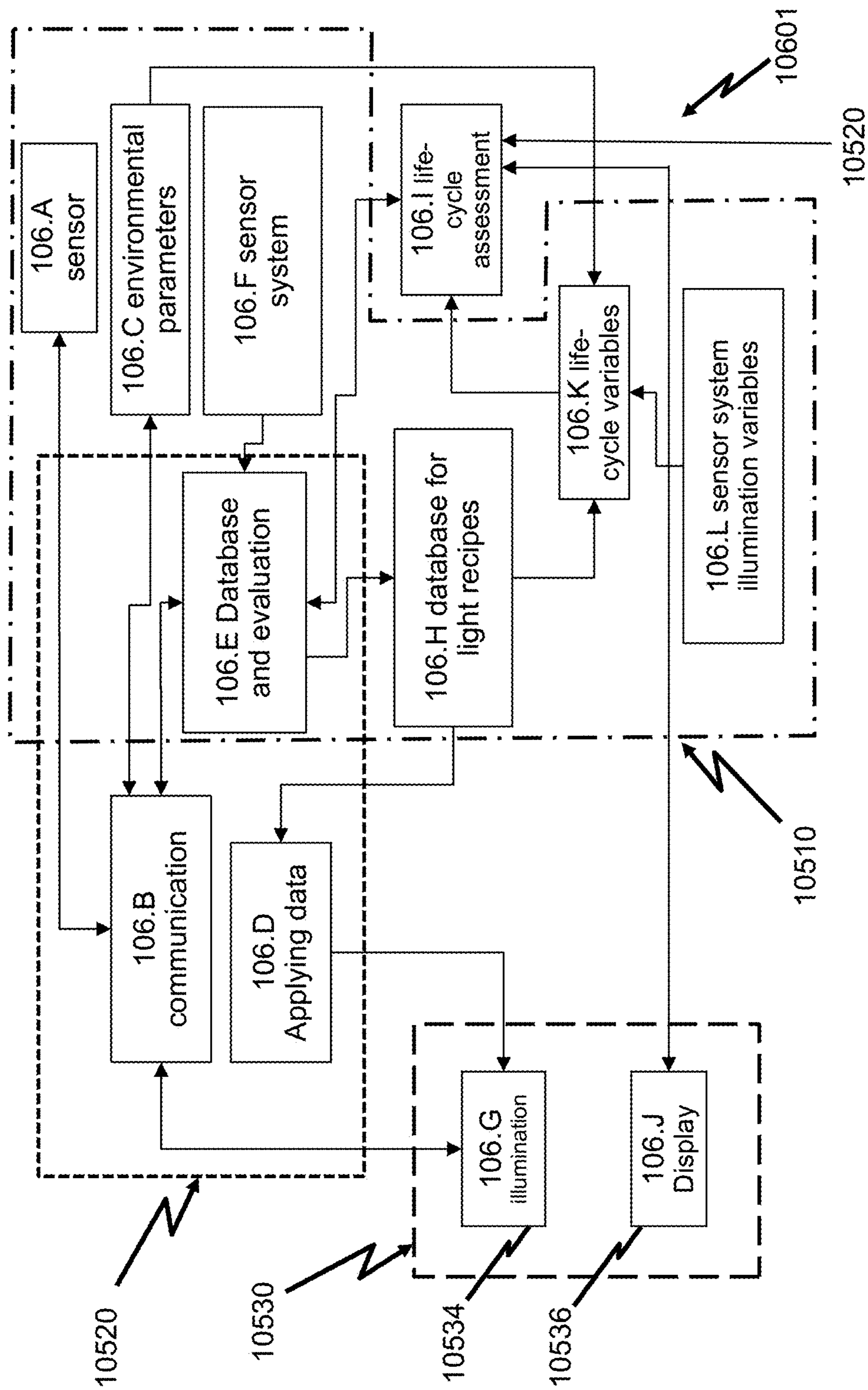
FIG. 101 shows a flowchart of a breeding and/or growing and/or raising facility according to an embodiment of "Eco Certificate".

FIG. 101 shows a representation of a breeding and/or growing and/or raising facility according to an embodiment of the disclosure. In particular, FIG. 101 illustrates a flowchart of how light recipes that have been assessed by a life-cycle assessment can be used in a breeding and/or growing and/or raising facility according to current or stored sensor data and/or other influencing factors, or how they can be adapted thereto. As already described in respect of FIG. 100, various sensor data are evaluated to this end. Depending on type, the various sensor data can be stored in different databases. Thus, for example, sensor system arrangements of internal or external sensor system arrangements may interact with a communications unit, the latter facilitating communication with other illumination devices and/or with the database and an external device. Moreover, database information items or further sensor data may include surrounding factors, such as watering, ventilation, fertilization, natural light as additional light, and time zones and the like. By way of example, other sensor data may contain data relating to the outside of the plant or the surroundings thereof, such as, for example, data in relation to air, ground, external environment, light conditions, LAI, LAD, or data relating to the interior of the plant.

Further sensor data could originate from, for example, camera, lidar, radar or similar sensors and/or may contain illumination variables, for example in respect of the spectrum, photon flux, mode of operation and the like.

The data captured thus can be evaluated together with information items from a database, which, for example, may contain light data, operational values and specifications for light recipes for light fixtures or light fixture groups. In this way, it is possible to acquire a life-cycle assessment or the individual life-cycle assessment variables, for example. The life-cycle assessment variables acquired thus can be evaluated in the computing device 10520 or in a further computing device and a life-cycle assessment can be created. Moreover, residual amounts of light or residual irradiation durations, for example, can be established from the data. The data established thus can then be made available in a suitable manner by means of a display or communications unit. Here, the communications unit may also contain means for communication via a network, in particular for presenting the established contents on mobile devices of a user, operator and/or customer.

It should be noted that an evaluation or a pre-evaluation may also be implemented in the input device 10510 and this need not exclusively take place in the computing device 10520. This is indicated by the overlap of the region that is surrounded by dashed lines in FIG. 101, which is intended to symbolize the computing device 10520, and of the region that is surrounded by dash-dotted lines, which is intended to symbolize the input device 10510. Here, moreover, the aforementioned database with light recipes can obtain information items from a further database and evaluation unit and control unit, or exchange data therewith. These data can be taken into account in the case of an assessment, selection or specification of light recipes and, in turn, can be input in the computing device in respect of an application of the operational data for regulating light. The computing device can control an illumination on the basis of the input and/or stored data, for example an illumination device or a breeding and/or growing and/or raising facility or a part thereof.

The list below provides an overview of the respective function of the blocks of the block diagram shown in FIG. 101.

- 106.A Sensor system arrangements (internal and external).
- 106.B Communication with other illumination devices and/or with the database and evaluation unit.
- 106.C Environmental parameters (watering, ventilation, fertilization, natural light as additional light, time zones).
- 106.D Applying the operation data for light control.
- 106.E Database and evaluation unit and control unit (illumination, light fixture configuration, surrounding factors).
- 106.F Sensor system external to plant (air, ground, external environment, light conditions, LAI, LAD), internal in plant.
- 106.G Illumination device
- 106.H Database for light recipes (light data and operational values).

Specifying light recipe for light fixture or light fixture group.

- 106.I Establishing life-cycle assessment and residual light amount.
- 106.J Display and 1 communications unit.
- 106.K Acquiring life-cycle assessment variables.
- 106.L Sensor system (camera, LIDAR, radar, etc.) illumination variables (spectrum, photon flux, mode of operation).

Figure 102:
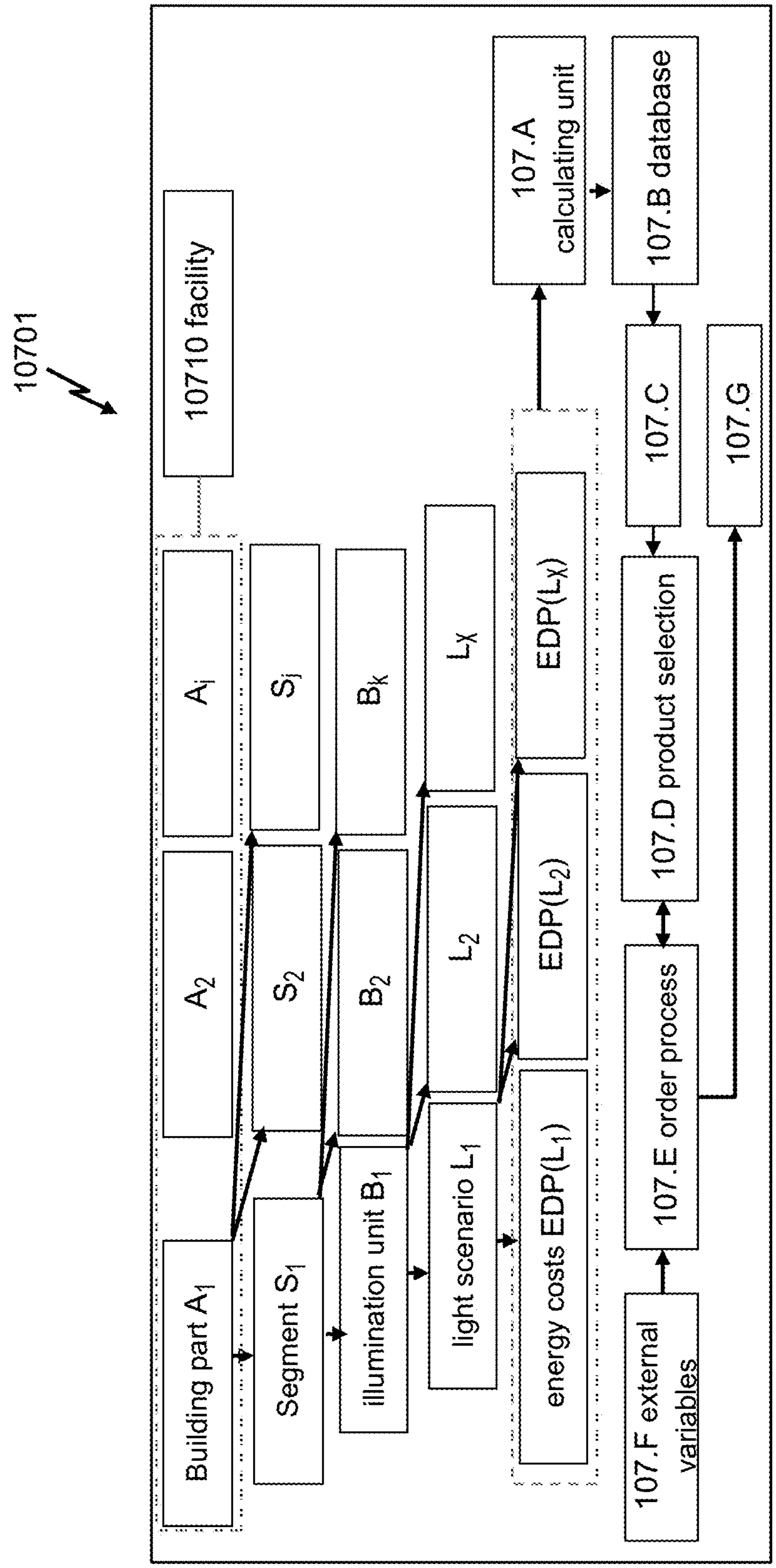
FIG. 102 shows a representation of a building complex for a breeding and/or growing and/or raising facility according to an embodiment of "Eco Certificate".

FIG. 102 shows the schematic construction of a building complex for a breeding and/or growing and/or raising facility 10701 according to an embodiment of the present disclosure. According to the shown embodiment, the breeding and/or growing and/or raising facility AG 10710 comprises a plurality of building parts $A_i$ (i=1, 2, 3, . . . n). Each building part A in turn has different segments $S_j$, i.e., overall: $A_iS_j$ with j=1, 2, . . . m.

Each segment $A_iS_j$ may comprise one or more illumination units $B_k$, i.e., overall: $A_iS_jB_k$ with k=1, 2, . . . p.

Each illumination unit $A_iS_jB_k$ can have, or be set to, different light scenarios $L_x$ (x=1, 2, . . . r), i.e., $A_iS_jB_kL_x$ with x=1, 2, . . . r, where all light scenarios $A_iS_jB_kL_x$ are known or defined at all times $t_y$ (with y=1, 2, . . . 5), these light scenarios can then be coupled to the growth/breeding and/or growing and/or raising process or an ordering process BS.

Hence, the respective energy costs can be established for each of the light scenarios $A_iS_jB_{k1}L_x$. At a given time $T_z$ (with z=1, 2, . . . t), there is exactly one $A_iS_jB_kL_xT_z$ data point which, of course, may assume different values for each time, i.e., each $T_z$. Here, a current energy consumption $EDP(A_iS_jB_kL_xT_z)$ can be assigned to each data point.

A light recipe LR is program code, which selects and carries out a set or variable or interactively determinable sequence of light scenarios. Consequently, each light recipe $LR_e$ (e=1, 2, . . . u) can be assigned a sequence of light scenarios $A_iS_jB_kL_x$ or the associated data points $A_iS_jB_kL_xT_z$ or the energy costs $EDP(A_iS_jB_kL_xT_z)$ connected therewith, or the sum values SUM $EDP(A_iS_jB_kL_xT_z)$ can be formed.

Now, an order process BS can be linked to one or more light scenarios $A_iS_jB_kL_x$ or respective sum values SUM $EDP(A_iS_jB_kL_xT_z)$, and it is consequently possible to specify an energy consumption per order process $BS_w$ (w=1, 2, . . . v), i.e., $BS_w$ (SUM $EDP(A_iS_jB_kL_xT_z)$). Then, the latter can be communicated to an operator, customer, etc., by way of a display, by way of an app or in any other way and on other devices for display, as already mentioned above. Hence, an operator or customer knows about the energy costs per order and can regularly recall this information item, can predict this into the future and the like, even during the production process.

A light scenario can be controlled by program code which can use current measurement variables such as plant growth, degree of maturity, weather conditions, cost of electricity from the various energy sources, etc., as control parameters in the program code. Sensors or measurement variables can be directed to the properties of the illumination arrangements relating to radiation. Here, light scenarios $A_iS_jB_kL_x$ of the illumination unit $A_iS_jB_k$ are referred to as measurement record M1. They can also be directed to properties specific to the surroundings, such as, for example, radiation reflection on the leaf and ground, temperature, humidity, etc. This measurement record is referred to as M2.

In this way, it is also possible to create an overall energy footprint per light recipe or per order and highlight this to an operator and/or customer. This can then be used by the operator for modifying the growing conditions or by the customer in respect of their order, or possible cancellation.

In particular, the present disclosure allows an operator or customer to also consider one or more ecological boundary conditions, such as, for example, the availability of energy sources, nuclear power, state funding, energy imports, energy exports, energy storage, $CO_2$ footprints, etc.

Table 6.1 below provides an overview of the employed indices for better comprehension of the above-mentioned considerations.

TABLE 6.1

| Breeding and/or growing and/or raising facility AG | | |
|---|---|---|
| Building A | i | 1-n |
| Segments S | j | 1-m |
| Illumination unit B | k | 1-p |
| Light scenario L | x | 1-r |
| Time T | y | s |
| Integration time Delta-T | z | t |
| Energy consumption per data point EDP | | |
| Light recipe LR | e | 1-u |
| Order process B | w | 1-v |

All numbers are integers here.
All indices are integer values.
$T_z$=e.g., in the millisecond, second or minute range.

A light recipe can also specify the sum photon flux, for example expressed in $\mu E/(m^2 s)$, specifically also the photon flux in the photosynthetically active radiation PAR range.

Below the respective function of some of the blocks of the block diagram shown in FIG. 102 are listed (the other ones have already been explained above).

107.A Acquiring and/or calculating unit and evaluation unit.

107.B Database of light recipes; energy evaluation and assignment to light recipe.

107.C Correlating light recipe to product.

107.D Presentation and communication of product selection: energy consumption of light recipe or energy consumption per desired order process BS; selecting light recipe.

107.E Customer order process of products based on ecologically rated lighting and/or growing conditions

107.F External control variables (ecology, environmental factors, etc.).

Figure 103:
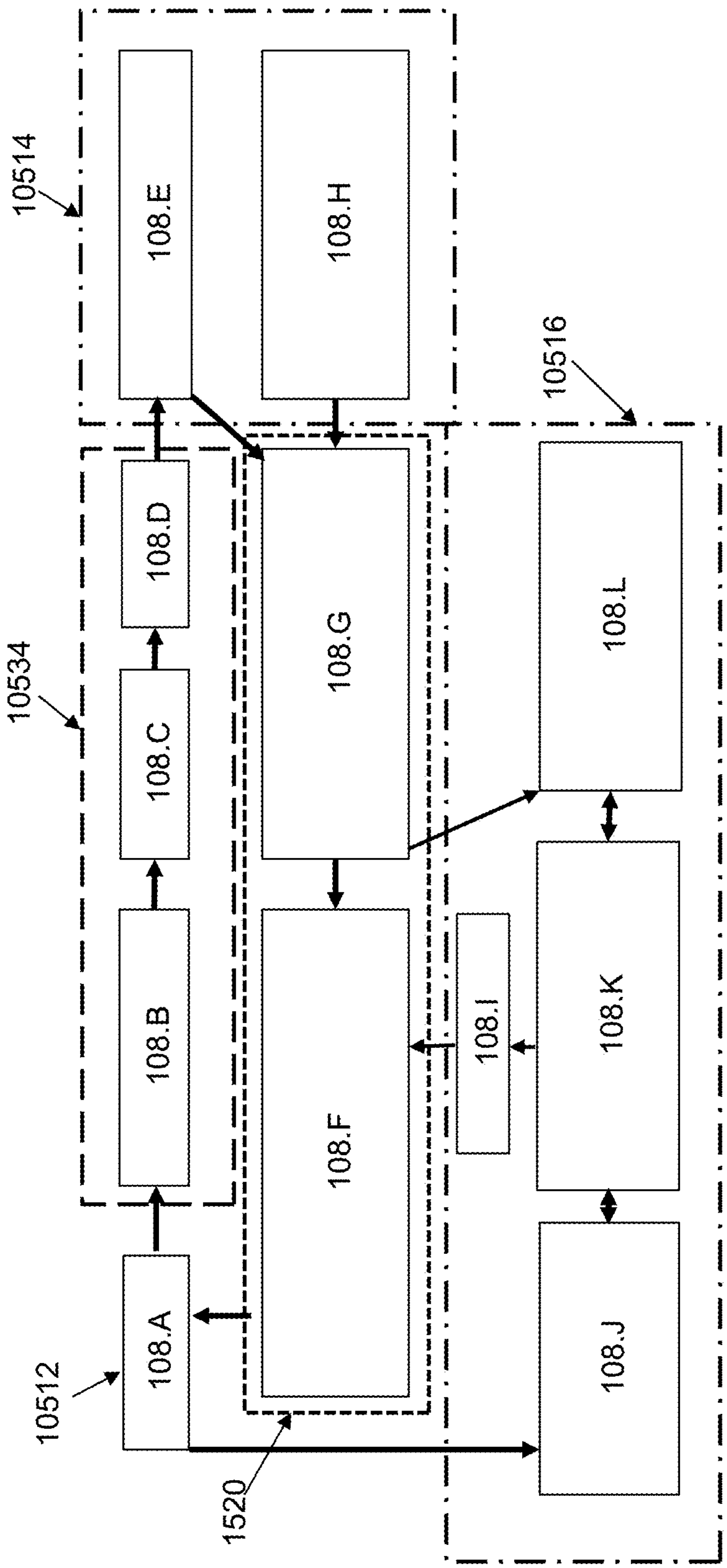
FIG. 103 shows a schematic illustration of a measurement and control device for a breeding and/or growing and/or raising facility according to an embodiment of "Eco Certificate".

107.G Interface to FIG. 103.

FIG. 103 shows a more detailed representation of a measurement and control device according to an embodiment of the present disclosure. As emerges from FIG. 103, an evaluating device may exchange data with a control device, and so sensor data and the like, which are acquired and evaluated by the evaluating device, can be used for controlling a breeding and/or growing and/or raising facility. The control device can store data in respect of a light recipe, or other data, in a database. Moreover, the control device can call or activate light recipes from the database, said light recipes then being used for controlling an illumination unit. Here, the light recipe is transmitted to a control unit for an illumination unit or an overall irradiation apparatus and there is, either in a centralized or else decentralized fashion, an actuation of the individual light sources of an illumination unit. Ultimately, this leads to the emission of light of the selected light sources.

The illumination produced thus can be evaluated, in turn, within the scope of a control loop in an evaluation device, i.e., for example, in the computing device 10520. The data of the evaluation device fed to the control device, and also further data, can then inform a customer, an operator or other interested parties about the respective product status, for example at regular intervals, upon request, or else in real time. These information items may moreover contain a delivery status, data in respect of a residual irradiation amount, storage conditions and preconditions and the like. The light recipes selected for illumination purposes can likewise be communicated to a customer or user, or these can be provided for selection purposes. Here, further aspects can be selected for the respective product selection, such as, e.g., the energy or the energy consumption of a certain light recipe or the energy per desired order process. As already described, a customer can then select on a transfer platform the products on the one hand and the respective energy-assessed light scenarios on the other hand. This applies analogously to operators of breeding and/or growing and/or raising stations.

The corresponding order process or the customer wishes for an order can then be taken into account as further controlled variables, as a manual input as in the previous case.

Therefore, the control device for controlling the illumination device 10534 can be embodied to acquire measurement variables, data of the evaluation device, orders and the like. The control device can also be embodied to take account of customer-interactive modifications, automated orders that are triggered by a predetermined manipulated variable being reached, e.g., sensor measurements, order parameters and the like. Moreover, the determination of a residual light amount, a time duration of the irradiation or the residual irradiation and the like can be determined in the control device or can be taken into account for the control. Here, the control device can be part of a central computing device of the breeding and/or growing and/or raising facility. The control device can also be part of one or more illumination apparatuses, wherein a breeding and/or growing and/or raising facility may have a plurality of illumination apparatuses.

Here, according to an embodiment of the present disclosure, the interfaces of FIG. 102 and FIG. 103 may represent a transfer platform, for example, on which customers and operators of a breeding and/or growing and/or raising facility can use a common database in order to carry out trade in respect of the products and/or the light recipes. Moreover, it is conceivable that customers are able to modify their orders, even still during a growth process, adapt delivery times or delivery amounts or adapt other parameters of the products, for example by purchasing or modifying alternative light recipes.

The list below provides an overview of the respective function of the blocks of the block diagram shown in FIG. 103.

- 108.A Database for light recipe(s).
- 108.B Control unit for the illumination unit/irradiation device.
- 108.C Actuating the light sources of an illumination unit.
- 108.D Light sources.
- 108.E Sensors for measuring light and radiation variables; M1.
- 108.F Control device: acquiring: measurement variables, evaluation device, order. Additionally, customer-interactive modifications, also an automated order triggered by a manipulated variable being reached (measurements, order parameters). Determining the residual light amount, time duration of the irradiation or residual irradiation.
- 108.G Evaluation device.
- 108.H Sensors and measurement device of plant specific and/or surroundings-specific parameters with data acquisition and storage; M2.
- 108.I Interface from FIG. 102.
- 108.J Presentation and communication of product selection: energy of light recipe or energy for desired order process BS; selecting light recipe.
- 108.K Customer order process of product and energy-assessed light scenarios. Operator breeding and/or growing and/or raising control.
- 108.L Customer information about product status, delivery status, residual light amount, storage conditions etc.

Figure 104:
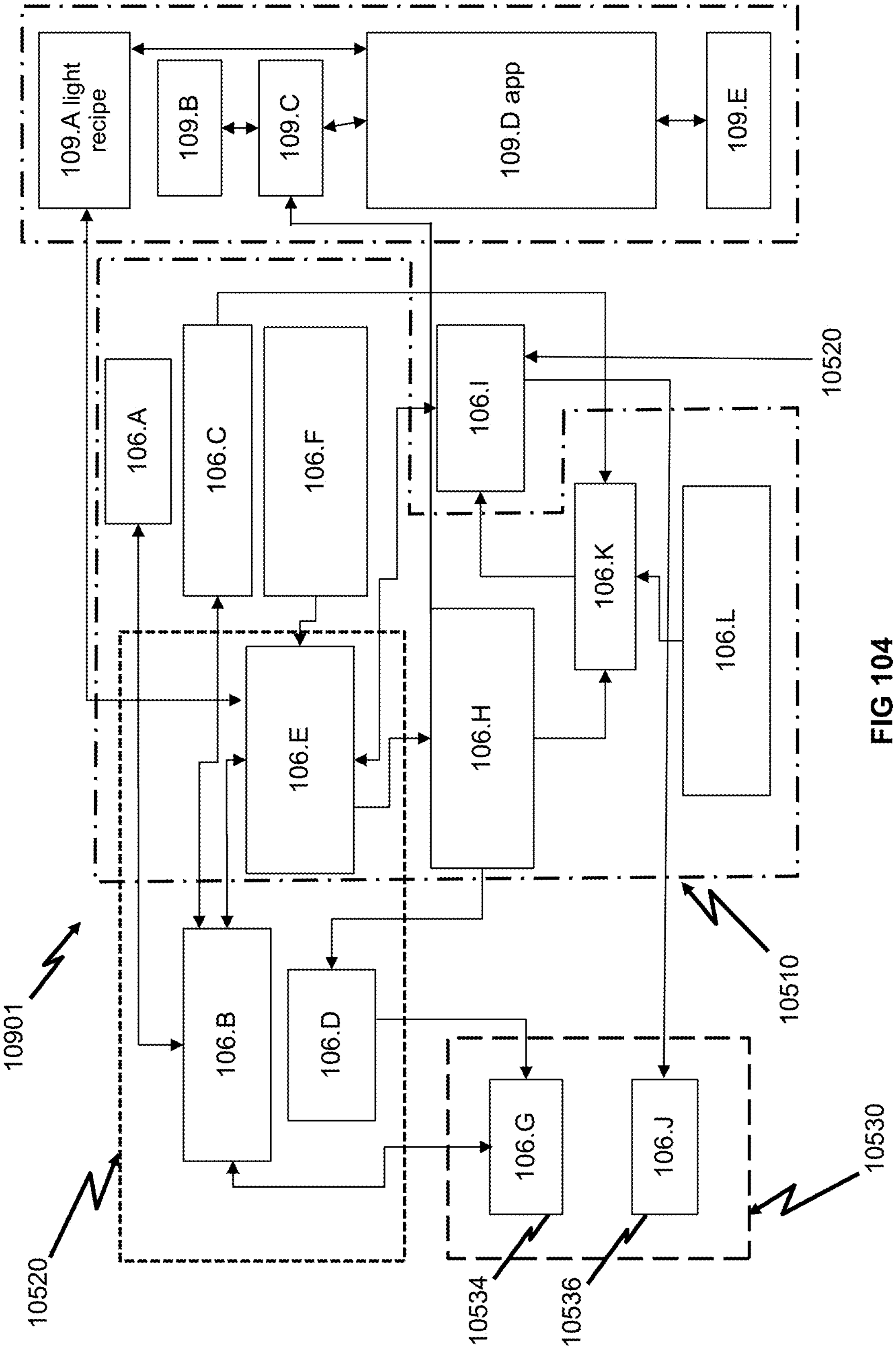
FIG. 104 shows a flowchart of a breeding and/or growing and/or raising facility according to an embodiment of "Medical Certificate".

FIG. 104 shows a representation of a breeding and/or growing and/or raising facility according to an embodiment of the disclosure (particularly of the element "Medical Certificate") that is based on the embodiment shown in FIG. 101. More specifically, the block diagram 10901 shown in FIG. 104 comprises all the blocks 106.A-106.L of the block diagram shown in FIG. 101. Therefore, reference is made to the description of FIG. 101 including the description of the blocks 106.A-106.L above to avoid duplication of the respective text.

In addition to the blocks 106.A-106.L already described above, the supplemental blocks 109.A-109.E are added in FIG. 104. The function of the supplemental blocks is described in the following.

- 109.A Receiving light recipe from a customer and coupling to a plant product, illumination location and illumination unit.
- 109.B Certification body.
- 109.C Database for certified light recipes.
- 109.D App for selection of light recipes for growth product, and for selecting a provider or producer, and for triggering an order process, and for the interactive creation of a light recipe, and for capturing a customer measurement. App may also be interactive (other customers, user group).
- 109.E Customer measurement (determination of active ingredients).

As emerges further from FIG. 104, a further database may be provided for certified light recipes. This further database can be provided internally as part of the input device 10510, i.e., in the system of the breeding and/or growing and/or raising facility 10701 (see FIG. 102) or the control unit 10502 (see FIG. 100). However, it is likewise conceivable that the further database for certified light recipes is available externally, for example at a certifying body such as the department of health, licensing authorities or other establishments or databases.

This further database then can have corresponding interfaces with certification bodies. Moreover, the further database can have interfaces to a user output device, for example a user application, which is also referred to as app here. The app may be provided for selecting light recipes for growing products. Moreover, the app can be embodied or provided for selecting a provider or producer and for triggering an order process. Furthermore, the app can be provided for interactive creation of a light recipe and for creating a coupled light recipe. Moreover, it is conceivable for the app to be embodied to form a sensor system by way of a software/hardware interface or to be connected to an external sensor system for the purposes of acquiring a customer measurement, for example for determining active ingredients or content concentrations of a product. Moreover, the app can be embodied in interactive fashion, i.e., for use by a plurality of users or whole groups of users.

Incidentally, the app can constitute an interface between the control unit 10502 (see FIG. 100) and external databases. Here, for example alternative light recipes or variations for light recipes can be output from an internal database or evaluation unit.

During the order process, a customer themselves can specify a light recipe, for example a medical light recipe. By way of example, this can be implemented on the basis of experience, tests or else on account of suggestions from a possible user group. The system may now accept this light recipe and adopt the latter in the breeding and/or growing and/or raising program and then implement said light recipe in a certain breeding and/or growing and/or raising process, for example in respect of the location and/or the time, in particular on plants that are then provided for the respective customer. Naturally, this assumes that the light recipe is accepted by the database, in particular in relation to the observation of legal requirements or in relation to the implementability of the light program. This test can be carried out by an app. Here, the app can call or use information items, for example current light fixture data such as the type of LEDs, the age thereof, the location or position thereof, and/or possible light recipes that are realizable by the light fixture, for example in the case of a reinstallation of a light fixture, and others. To this end, the app can communicate with the sensors of the breeding and/or growing and/or raising facility or else prompt the latter to carry out the current measurement, then said app can evaluate said data and consequently check whether the light recipe can be implemented using the available light fixtures or whether, for example on account of occupancy, the light recipe and hence the order process can be implemented at the order time desired by the customer. What may occur in the process is that this problem cannot be clearly implemented or that the problem cannot be solved by the software. Consequently, the app can trigger technical method steps that contain the communication with sensors and actuators, the prompt for a current measurement, the collection and evaluation of the data, the presentation of the result and a decision or a plurality of alternatives for the solution. The app can also cause data from sensors and/or actuators to have to be made available within a certain time frame. Thus, for example, the app can accept or discard the incoming data on account of the time frame thereof, too. In the process, the app can also cause a repetition of a measurement by virtue of renewed prompting of a sensor or an actuator.

The use of an app as described above or the control or monitoring of a growth process by means of a corresponding application on a computing device such as a computer, tablet computer, cellular telephone, etc., can moreover allow a corresponding use of the appliance or of the app for outputting data as part of the output device 10530 (see FIG. 100).

Referring again to FIG. 102, the respective light data can be acquired, e.g. by means of sensors and evaluation devices, or calculated (on account of known light properties of the light sources) for each of the light scenarios $A_iS_jB_kL_x$. This acquisition can be implemented in defined spectral ranges, e.g. UV-B (380-415 nm), or in the blue, red or dark-red range. The acquirable variables include, for example, irradiance, incoming radiation angle, polarization, photon flux, light modulation, pulsed operation, and then also the times and time intervals of zero measurements such as during dark stages, which of course also have a decisive contribution to the quality of the products. This is referred to as measurement set M3 and the latter can contain a multiplicity of individual measured values (and correlation values).

Moreover, a sequence of light scenarios $A_iS_jB_kL_x$ or the associated data points $A_iS_jB_kL_xT_z$ or the measurement sets $M_3(A_iS_jB_kL_xT_z)$ associated therewith can be assigned to each light recipe LRe (e=1, 2, . . . u) or the summed value $SUM(A_iS_jB_kL_xT_z)$ or SUM $M_3(A_iS_jB_kL_xT_z)$ can be formed.

The data $SUM(A_iS_jB_kL_xT_z)$ or SUM $M_3(A_iS_jB_kL_xT_z)$ can be stored and evaluated, for example for individual time measurements, time interval measurements, overall measurement times and said data can also be correlated with other measurement variables or influencing factors (correlation factors K). The results can then be presented graphically (display, VR or AR glasses) and/or communicated to a customer or interested party or else the operator of the facility AG in any other suitable form. Consequently, a multidimensional effective space can be created.

A light scenario can be controlled by program code, which can use current measurement variables such as plant growth, concentration of active ingredients, concentration of toxic plant ingredients, degree of maturity, weather conditions, electricity costs of the various energy sources, etc., as control parameters in the program code. Sensors or measurement variables can be designed for the radiation properties of the illumination arrangements (light scenarios $A_iS_jB_kL_x$ of the illumination unit $A_iS_jB_k$ are referred to here as measurement set M1), or they can be designed for environment-specific properties such as, for example, radiation reflection on the leaf and on the ground, temperature, humidity, etc. This measurement set is denoted M2 or plant-inherent active ingredients (concentrations of vitamin C, stress indicators, etc.) are measured, possibly with the aid of fluorescence measurements (measurement set M3). For reasons of simplicity, the measurement sets M1, M2 and M3 are subsumed by the term measurement set MM.

An order process BS can now be connected to one or more light scenarios AiSjBkLx or the respective summed values SUM(AiSjBkLxTz) and SUM M3(AiSjBkLxTz) and the expected effect functions W and, optionally, to the correlation factors K as well, and can consequently reveal an expected effective variable per order process Wf (f=1, 2, . . . y) and this can then be communicated to an operator, customer, etc. (display, per app, etc.). Hence, an operator or customer is informed with knowledge about the (expected) effective variables per product order.

The aforementioned measurement or determination variables $SUM(A_iS_jB_kL_xT_z)$ and SUM $M_3(A_iS_jB_kL_xT_z)$ and the expected effect functions W and, optionally, the anticipated correlation factors K as well can be assessed or certified by a certification body (e.g., health office, benevolent societies, self-help groups).

A light recipe created by a customer can be protected and consequently be able to be licensed where applicable. Customers or users can exchange, discuss, optimize, etc., light recipes via social networks, user groups, etc.

Table 1 below provides an overview of the employed indices for better comprehension of the above-mentioned considerations.

TABLE 1

| Breeding and/or growing and/or raising facility AG | | |
|---|---|---|
| Building A | i | 1-n |
| Segments S | j | 1-m |
| Illumination unit B | k | 1-p |
| Light scenario L | x | 1-r |
| Time T | y | s |
| Integration time Delta-T | z | t |
| Energy consumption per data point EDP | | |
| Light recipe LR | e | 1-u |
| Order process B | w | 1-v |
| Effect values WW | | |

All numbers are integers here.
All indices are integer values.
$T_z$=e.g., in the millisecond, second or minute range.

A light recipe can also specify the sum photon flux, for example expressed in μE/(m²s), specifically also the photon flux in the photosynthetically active radiation PAR range Measurement sets M1, M2, M3, MM.

Figure 105:
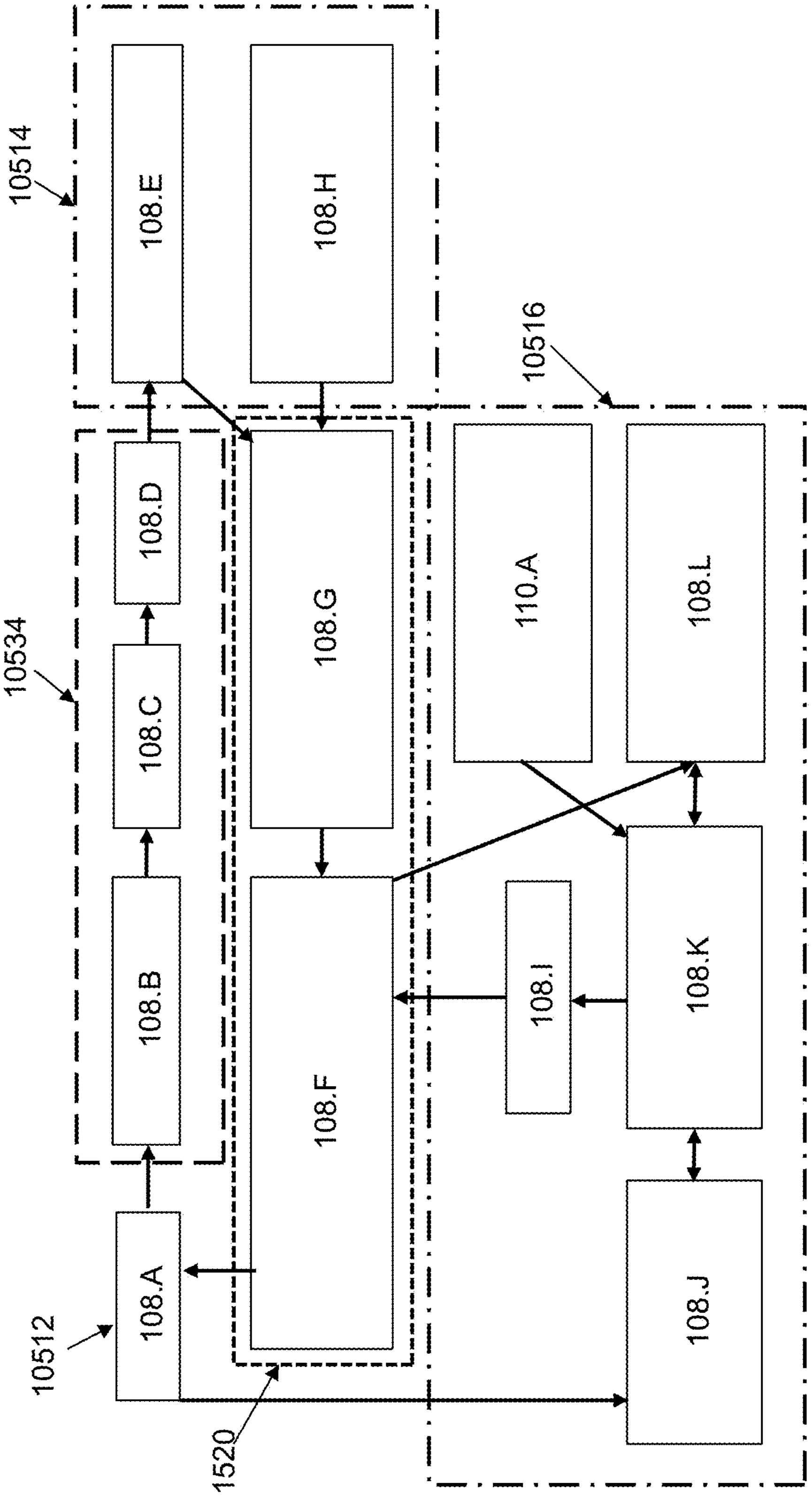
FIG. 105 shows a schematic illustration of a measurement and control device for a breeding and/or growing and/or raising facility according to an embodiment of "Medical Certificate".

FIG. 105 shows a representation of a measurement and control device according to an embodiment of the disclosure (particularly of the element "Medical Certificate") that is based on the embodiment shown in FIG. 103. More specifically, the block diagram shown in FIG. 105 comprises all the blocks 108.A-108.L of the block diagram shown in FIG. 103. Therefore, reference is made to the description of FIG. 103 including the description of the blocks 108.A-108.L above to avoid duplication of the respective text.

In addition to the blocks 108.A-108.L already described above, the only one supplemental block 110.A is added in FIG. 105. The function of the supplemental block is as follows:

110.A User groups, self-help groups, certification body for defining and selecting suitable light recipes.

It is moreover conceivable that there is communication as to what light recipes were created by customers or users, or whether a light recipe is an adapted light recipe or original light recipe.

Figure 106:
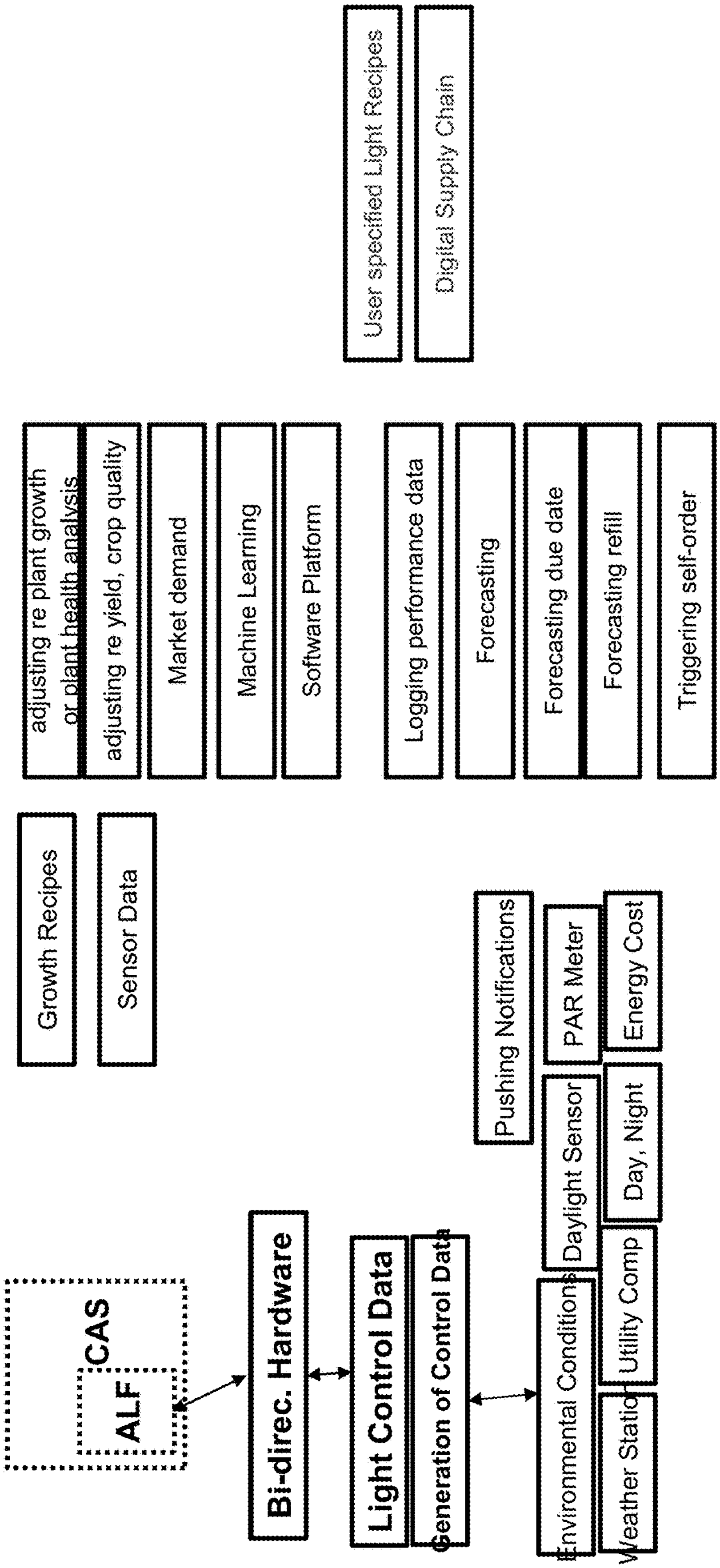
FIG. 106 shows a schematic overview of tasks and steps for operating the Controlled Agricultural System according to the disclosure.

FIG. 106 shows a schematic overview of tasks and steps for operating the Controlled Agricultural System according to the disclosure. The abbreviation ALF denotes the agricultural light fixture and the abbreviation CAS denotes the Controlled Agricultural System. The tasks and steps are managed by the agriculture management software on the basis of the available data, e.g. data from the sensors of the CAS. To this end the agriculture management software comprises a plurality of program instructions, which when executed by the computer system of the CAS, cause the CAS to execute the tasks and steps as shown in FIG. 106.

System Architecture with Scalable Inputs and Outputs

Indoor horticultural facilities, such as indoor farms, may be equipped with a variety of different devices from a variety of different vendors/manufacturers. It is highly unlikely that a single vendor may manufacture all the devices used in an indoor farm. For example, an indoor farm may utilize lighting fixtures made by a first vendor, actuators made by a second vendor, a temperature control system made by a third vendor, an HVAC system made by a fourth vendor, and three different types of sensors made by three different vendors.

In order to enable smart agricultural systems, all the devices in a horticultural facility should be able to communicate with each other and with a central control system. However, each device usually has a specific communication format determined by the vendor/manufacturer of the device, and cannot communicate with other devices that have a different communication format absent some form of semantic translation or normalization. Given that a horticultural facility may include devices from many vendors, and the devices/vendors may change over time, it is very difficult to build a central control system that can flexibly incorporate many third party devices into its ecosystem.

Various implementations disclosed herein include a horticultural platform that may easily incorporate third party devices into its system, even though each device may have a different format of communication. The horticultural platform disclosed herein may include easily replicable, modular semantic converters. Each semantic converter may be configured to translate between the specific data format of a vendor device and a common semantic model used by the horticultural platform. Whenever a new device is added into the horticultural system, one or more new semantic converters are created to translate the inputs/output formats of the new device into the common semantic model of the horticultural platform. This allows new third-party devices to be added into a horticultural system easily.

Figure 107:
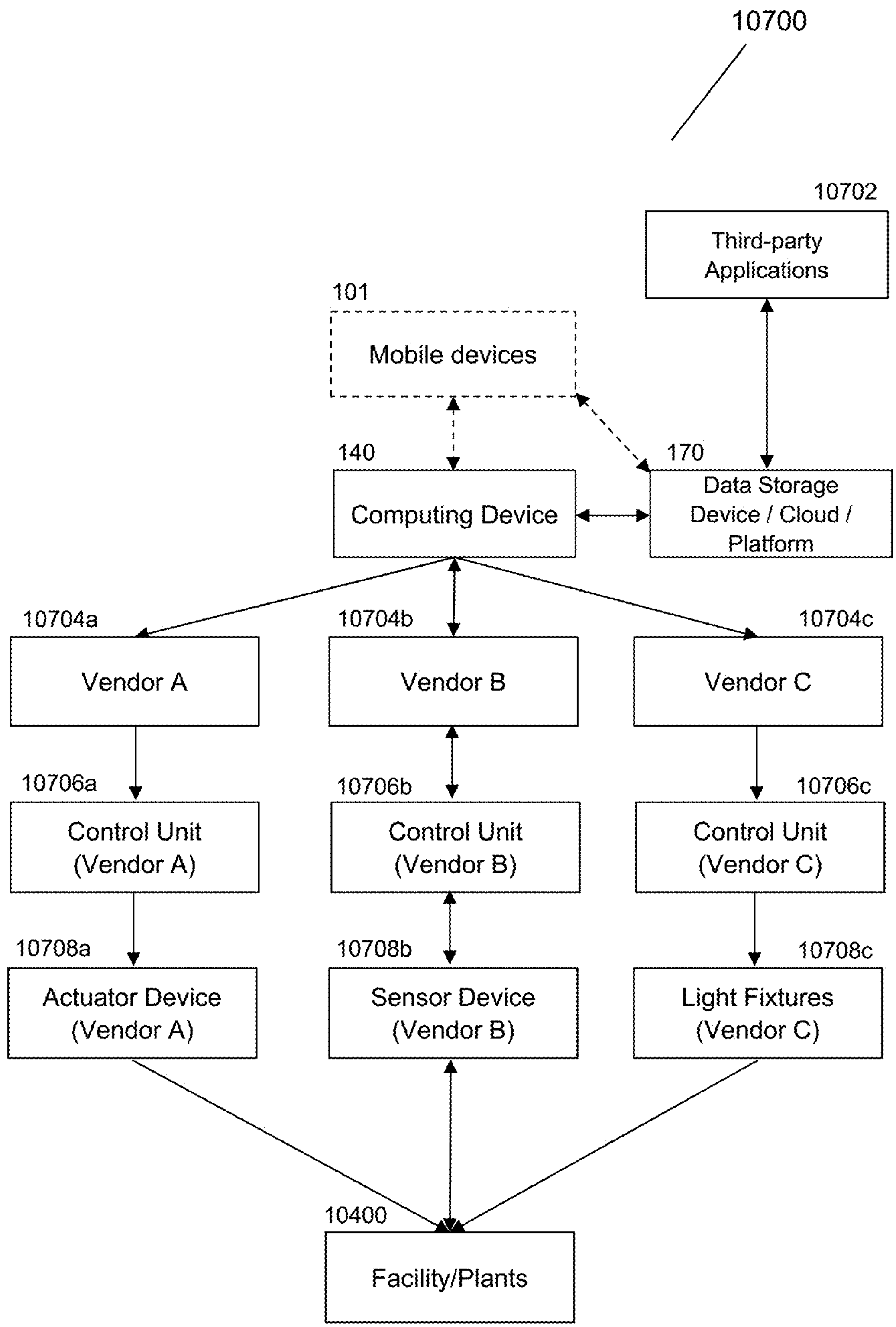
FIG. 107 shows a schematic block diagram of a horticultural system with scalable inputs and outputs.

FIG. 107 shows a schematic block diagram of a horticultural system 10700 with scalable inputs and outputs according to various implementations. The horticultural system 10700 may include one or more mobile devices 101, one or more computing devices 140, and a data storage device/cloud/platform 170 (for the purposes of the proceeding discussion, the term "platform" will be used) as previously described herein. The horticultural system 10700 may also include a number of different devices 10708*a*-10708*c* (e.g., actuators, sensors, light fixtures, environmental controls) from a number of different third-party vendors 10704*a*-10704*c*. FIG. 107 illustrates three vendors A-C, but in general the horticultural system may include any number of third-party vendors. Each device may have an associated control unit 10706*a*-10706*c* specific to that vendor. The horticultural system 10700 may also include one or more third-party applications 10702 that communicates with the platform 170. The third-party applications 10702 may include web-based applications, user applications, or any other application that may supply information to the horticultural system 10700 or receive information from the horticultural system 10700. Third-party applications 10702 may also include enterprise resource planning (ERP) applications, which may communicate with the platform 170 via a semantic conversion channel.

Each device 10708*a*-10708*c* may communicate with the computing device 140 and/or the platform 170 using a specific communication format. For example, device 10708*a* may receive data from the computing device 140 or platform 170 using a communications format specific to vendor A while device 10708*b* may transmit data to the computing device 140 or platform 170 and receive data from the computing device 140 or platform 170 using a communications format specific to vendor B.

The platform 170 may also communicate with a number of different user devices (e.g., mobile device 101, computing device 140) and/or third-party applications 10702 through APIs. Each user device and third-party application 10702 may also send and receive data according to specific communication formats which vary from user device to user device, and from application to application.

The platform 170 may have a common semantic model for a number of different input and output categories. The platform 170 may also include a plurality of semantic converters for converting the inputs/outputs of each device 10708*a*-10708*c*, each user device 101, 140, and each third-party application 10702 into the common semantic model. There may be a specific semantic converter associated with each device 10708, each user device 101, 140, and each third-party application 10702, and in some cases there may be more than one semantic converter associated with some devices/applications (e.g., different semantic converters for inputs and outputs for the same device).

The common semantic model may include a number of input categories and a number of output categories. The input categories may include, but are not limited to, sensors, lighting schedules, ERP information, forecasted energy data, weather predictions, crop cards, location information, human labor information, lighting information, and temperature information. The output categories may include, but are not limited to, lighting controls, building automation controls, user alerts, data visualizations, projected harvest dates, and ERP information. Each input and output category has a common semantic model for how to format or express information in that category.

Each input category may accept inputs from a plurality of vendor/manufacturer specific inputs, conforming to each vendor's API or other specified type of interface. The platform 170 may use semantic converters to normalize and convert each vendor specific input into the common semantic model associated with that input category. For example, the platform 170 may receive inputs from two different temperature sensors made by two different vendors. Each sensor has an associated semantic converter that converts their respective specific inputs into a common semantic model for a particular input category (e.g., temperature information). Thus the platform 170 may easily store, compare, and analyze information from both types of temperature sensors because data from each sensor is normalized/standardized into a common data format upon receipt.

Likewise, each output category is able to output to a plurality of vendor/manufacturer specific outputs, conforming to each vendor's API or other specified type of interface. The platform 170 may use semantic converters to convert the common semantic model associated with that output category into the vendor specific data format. For example, the platform 170 may generate outputs for two different light fixtures made by two different vendors. Each light fixture has an associated semantic converter that converts the output from the common semantic model for a particular output category (e.g., lighting controls) into the specific data format for that light fixture. Thus the platform 170 may control both types of light fixtures using a single data format because that data is converted into a vendor-specific format before transmission.

The semantic converters may be implemented in a number of different ways. For example, semantic converters may be implemented as a configuration file (e.g., written in JSON or YAML), a software driver (e.g., written in Python or Java), a microservice (e.g., written using a software framework), or any other type of software or hardware function. The semantic converters may be located within the platform 170.

Figure 108:
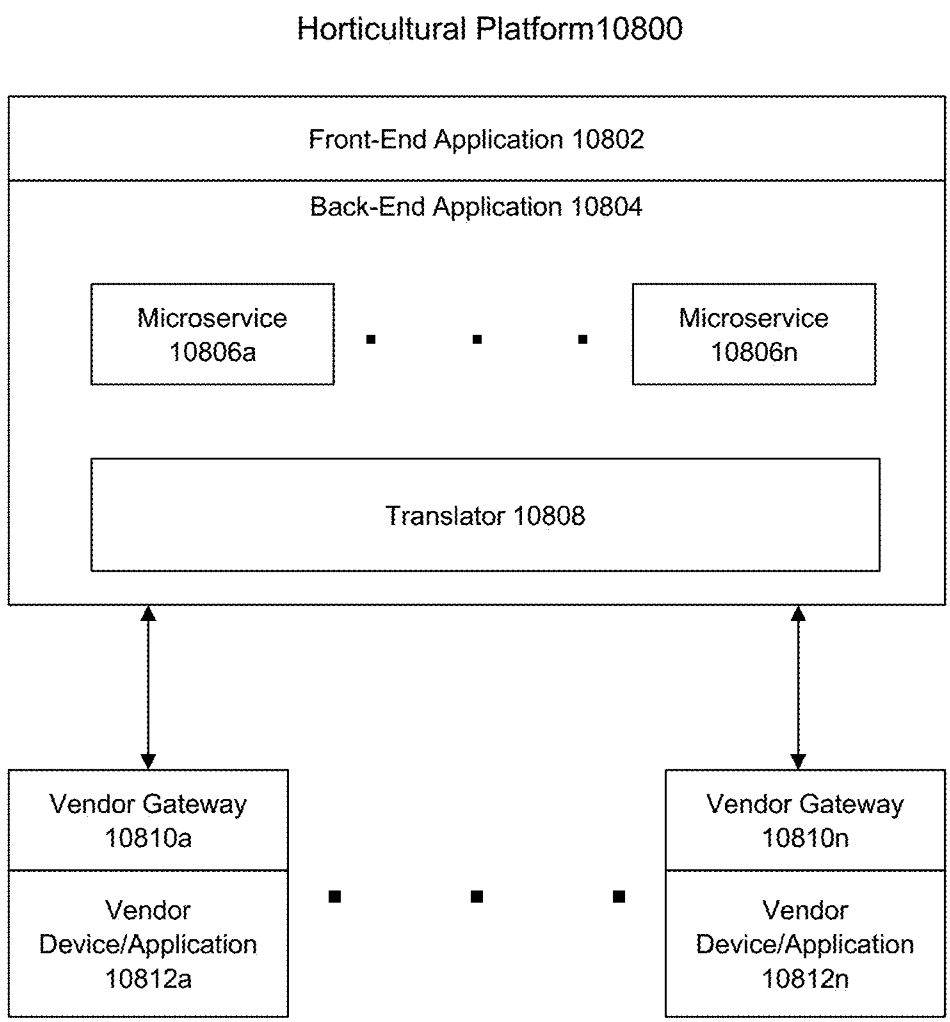
FIG. 108 shows a schematic block diagram of a horticultural platform for interfacing with third party vendor devices.

FIG. 108 shows a schematic block diagram of a horticultural platform 10800 for interfacing with third party vendor devices according to various implementations. The horticultural platform 10800 may be similar to the platform 170 described with reference to FIG. 107. The horticultural platform 10800 may include a front-end application 10802 for interfacing with users, devices, and applications and a back-end application 10804. The back-end application 10804 may include a number of microservices 10806*a*-10806*n* and a translator 10808. The horticultural platform 10800 may communicate with a number of vendor devices/applications 10812*a*-10812*n* via vendor gateways 10810*a*-10810*n*. Each vendor device may communicate with the horticultural platform 10800 using different data formats specific to that vendor, and each vendor application may communicate with the horticultural platform 10800 using different APIs that use data formats specific to that vendor.

The horticultural platform 10800 may include a number of semantic converters implemented as microservices 10806*a*-10806*n*. Microservices may be self-contained applications that serve to translate between a vendor-specific data format and a common semantic model used by the horticultural platform. While FIG. 108 illustrates the semantic converters as microservices, the semantic converters may also be implemented in other ways (e.g., configuration file, software drivers). Each microservice 10806*a*-10806*n* may be associated with a specific vendor device/application 10812*a*-10812*n*. The horticultural platform 10800 also includes a translator 10808 that calls the microservices 10806*a*-10806*n* in order to translate data inputs and outputs in communications with the different vendor devices/applications 10812*a*-10812*n*. The translator 10808 may include one or more API translators and semantic translators.

For example, the horticultural platform 10800 may receive input data from vendor device 10812*a*. The translator 10808 may identify the microservice 10806*a* that is associated with the vendor device 10812*a*. For example, the vendor device 10812*a* may transmit a device identifier and/or a vendor identifier, which the translator 10808 may use to determine the microservice 10806*a* associated with the vendor device 10812*a*. The translator 10808 may then use the microservice 10806*a* to convert the vendor-specific format of the input data into a common semantic model for the input category of the input data. The horticultural platform 10800 is then free to store and process the input data in the common semantic model rather than the vendor-specific format that is provided by the vendor device 10812*a*.

Likewise, the horticultural platform 10800 may generate output data to send to vendor application 10812*n*. The output data is formatted in the common semantic model for that output category. The translator 10808 may call the microservice 10812*n* associated with the vendor application 10812*n*, and use the microservice 10812*n* to translate the output data from the common semantic model into the vendor-specific data format of the vendor application 10812*n*. The output data may then be transmitted to the vendor application 10812*n* via the API for that vendor application 10812*n*. This allows the horticultural platform 10800 to generate output data in a standardized data format, while providing the output data to a variety of devices and applications in vendor-specific formats.

The semantic converters, such as microservices 10806*a*-10806*n* may be easily replicable so that new devices and applications from different vendors may be easily incorporated into the horticultural system. For example, microservice 10806*a* may be used to convert input data from a temperature sensor from a first vendor into the common semantic model for temperature information. A user may wish to add another temperature sensor from a second vendor into the horticultural system. The user may simply copy the microservice 10806*a* and then edit it so that it can convert the input format of the second vendor into the common semantic model for temperature information. Now the horticultural platform 10800 may easily handle inputs from either temperature sensor. In this manner, the semantic converters are modular (e.g., independent from each other) and may be easily created and edited to give the horticultural platform 10800 flexibility in being able to communicate with a variety of devices and applications regardless of which communication format that the devices and applications use.

Figure 109A:
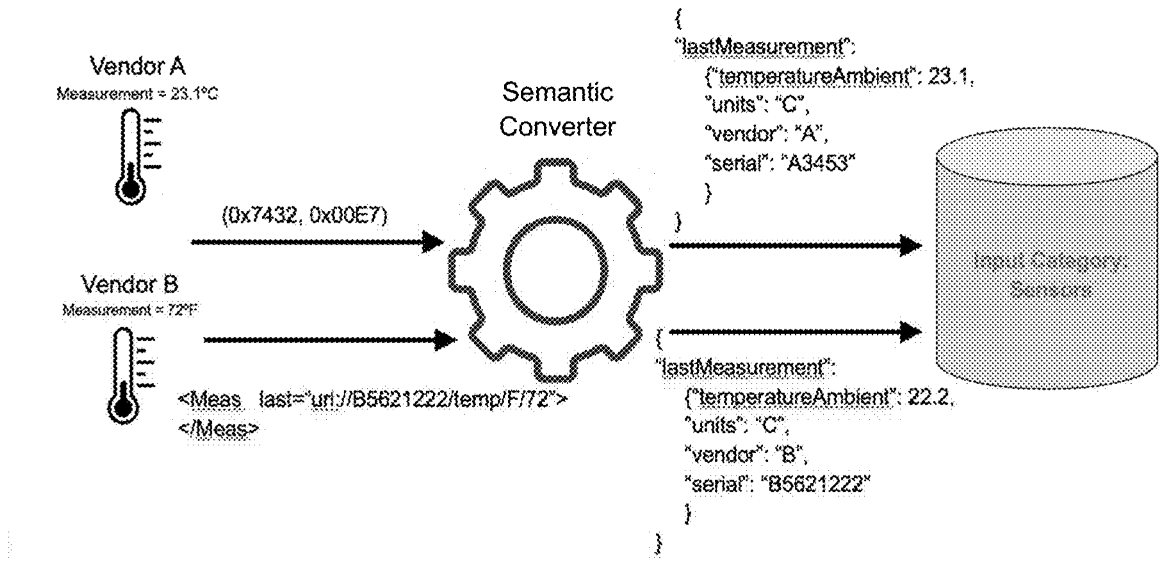
FIGS. 109A, 109B shows examples of a modular semantic converter for handling various input and output categories.
Figure 109B:
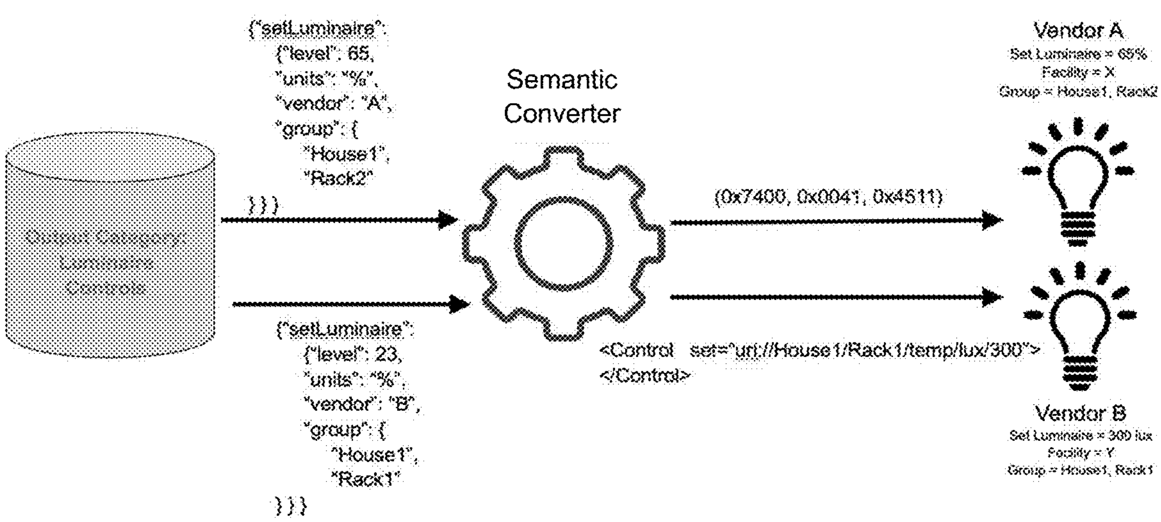

FIGS. 109A, 109B shows examples of a modular semantic converter for handling various input and output categories according to various implementations. FIG. 109A illustrates an example of converting different input formats into a common semantic model for a particular input category (in this case, temperature information). A horticultural platform may receive temperature information from a device made by vendor A and from another device made by vendor B. Each device provides the temperature information in different formats. Each device may be associated with a specific semantic converter. The semantic converter translates the vendor-specific temperature information from each device into a common semantic model for temperature information (e.g., formatted as a data structure that includes the ambient temperature, the unit, a vendor identifier, and the serial number of the device). The horticultural platform may then directly store, compare, calculate, and analyze the temperature information from both devices without having to account for data format differences.

FIG. 109B illustrates an example of converting a common semantic model for a particular output category (in this case, lighting controls) into different output formats to be sent to different devices. A horticultural platform may generate lighting control information to control luminaires made by vendor A and by vendor B. The lighting control information generated by the horticultural platform may be formatted in a common semantic model (e.g., a lighting level, a unit, a vendor identifier, a group identifier). Each device may be associated with a specific semantic converter. The semantic converter translates the lighting control information from the common semantic model into the vendor-specific data format for that device. The output data may then be transmitted to each luminaire for processing. Thus the horticultural platform is enabled to control devices from different vendors without having to account for data format differences.

Implementations disclosed herein include a platform comprising a plurality of semantic converters, wherein each semantic converter is configured to translate between a specific data format and a common semantic model, a communications interface configured to communicate with a plurality of third-party sources, and a processor configured to receive a first input from a first third-party source, wherein the first input is formatted in a first data format, identify a first semantic converter from the plurality of semantic converters that is associated with the first third-party source, and convert the first input into a first common semantic model using the first semantic converter.

In some implementations, the first third-party source comprises a device or an application. In some implementations, the processor is further configured to receive a second input from a second third-party source, wherein the second input is formatted in a second data format, identify a second semantic converter from the plurality of semantic converters that is associated with the second third-party source, and convert the second input into the first common semantic model using the second semantic converter. In some implementations, the processor is further configured to generate output data in a second common semantic model, identify a second semantic converter from the plurality of semantic converters that is associated with the first third-party source, convert the output data into a first output using the second semantic converter; and transmit, via the communications interface, the first output to the first third-party source. In some implementations, the platform supports a plurality of input categories and a plurality of output categories, and each input category and each output category is associated with a different common semantic model. In some implementations, the processor is further configured to receive a plurality of inputs, including the first input, from a subset of third-party sources, wherein each of the plurality of inputs is classified in a first input category associated with the first common semantic model, identify semantic converters associated with each third-party source in the subset of third-party sources, and convert each of the plurality of inputs into the first common semantic model using the identified semantic converters. In some implementations, the processor is further configured to generate output data to be transmitted to a subset of third-party sources, wherein the output data is classified in a first output category associated with a second common semantic model, identify semantic converters associated with each third-party source in the subset of third-party sources, convert the output data from the second common semantic model into a plurality of outputs using the identified semantic converters, each of the plurality of outputs associated with a different third-party source in the subset of third-party sources, and transmit, via the communications interface, each of the plurality of outputs to the associated third-party source. In some implementations, the plurality of semantic converters are implemented as at least one of configuration files, software drivers, or microservices. In some implementations, each of the plurality of semantic converters is associated with one of the plurality of third-party sources.

Further implementations disclosed herein include a method of processing data, comprising receiving, at a communications interface, a first input from a first third-party source, wherein the communications interface is configured to communicate with a plurality of third-party sources including the first third-party source, identifying, by a processor, a first semantic converter from a plurality of semantic converters that is associated with the first third-party source, wherein each semantic converter is configured to translate between a specific data format and a common semantic model, and converting, by the processor, the first input into a first common semantic model using the first semantic converter.

In some implementations, the first third-party source comprises a device or an application. In some implementations, the method further comprises receiving, at the communications interface, a second input from a second third-party source, wherein the second input is formatted in a second data format, identifying, by the processor, a second semantic converter from the plurality of semantic converters that is associated with the second third-party source, and converting, by the processor, the second input into the first common semantic model using the second semantic converter. In some implementations, the method further comprises generating, by the processor, output data in a second common semantic model, identifying, by the processor, a second semantic converter from the plurality of semantic converters that is associated with the first third-party source, converting, by the processor, the output data into a first output using the second semantic converter, and transmitting, by the communications interface, the first output to the first third-party source. In some implementations, the processor supports a plurality of input categories and a plurality of output categories, and each input category and each output category is associated with a different common semantic model. In some implementations, the method further comprises receiving, at the communications interface, a plurality of inputs, including the first input, from a subset of third-party sources, wherein each of the plurality of inputs is classified in a first input category associated with the first common semantic model, identifying, by the processor, semantic converters associated with each third-party source in the subset of third-party sources, and converting, by the processor, each of the plurality of inputs into the first common semantic model using the identified semantic converters. In some implementations, the method further comprises generating, by the processor, output data to be transmitted to a subset of third-party sources, wherein the output data is classified in a first output category associated with a second common semantic model, identifying, by the processor, semantic converters associated with each third-party source in the subset of third-party sources, converting, by the processor, the output data from the second common semantic model into a plurality of outputs using the identified semantic converters, each of the plurality of outputs associated with a different third-party source in the subset of third-party sources, and transmitting, by the communications interface, each of the plurality of outputs to the associated third-party source. In some implementations, the plurality of semantic converters are implemented as at least one of configuration files, software drivers, or microservices. In some implementations, each of the plurality of semantic converters is associated with one of the plurality of third-party sources. In some implementations, the method further comprises adding, by the processor, a new semantic converter associated with a new third-party source to the plurality of semantic converters, receiving, at the communications interface, a new input from the new third-party source, identifying, by the processor, the new semantic converter from the plurality of semantic converters, and converting, by the processor, the new input into a second common semantic model using the new semantic converter.

Further implementations disclosed herein include a horticultural platform, comprising a first communications interface configured to receive raw input data from a plurality of input devices and transmit output data to a plurality of output devices, a second communications interface configured to receive application input from one or more applications via one or more application programming interfaces (APIs) and transmit application output to the one or more applications via the one or more APIs, and one or more processors configured to convert the raw input data into standardized input data, generate standardized output data and the application output based on at least one of the standardized input data and the application input, and convert the standardized output data into the output data, wherein the application output comprises data regarding growth of one or more plants in an indoor horticultural environment and the output data comprises control commands for controlling at least one of the plurality of output devices to affect growth of the one or more plants in the indoor horticultural environment.

In some implementations, the one or more processors are configured to convert the raw input data into standardized input data by receiving, at the first communications interface, a first input from a first input device, identifying, by the one or more processors, a first semantic converter from a plurality of semantic converters that is associated with the first input device, wherein each semantic converter is configured to translate between a specific data format and a standardized data format, and converting, by the one or more processors, the first input into a standardized first input using the first semantic converter. In some implementations, the one or more processors are configured to convert the standardized output data into the output data by identifying, by the one or more processors, a second semantic converter from a plurality of semantic converters that is associated with a second input device, wherein each semantic converter is configured to translate between a specific data format and a standardized data format, converting, by the one or more processors, the standardized output data into the output data using the second semantic converter, and transmitting, via the first communications interface, the output data to the second input device. In some implementations, the platform supports a plurality of semantic converters, each semantic converter configured to translate between a specific data format and a common semantic model. In some implementations, the plurality of input devices are classified into a plurality of input categories, each input category associated with a different common semantic model. In some implementations, the plurality of output devices are classified into a plurality of output categories, each output category associated with a different common semantic model.

Further implementations disclosed herein include a horticultural platform, comprising a first communications interface configured to receive raw input data from a plurality of input devices and transmit output data to a plurality of output devices, a second communications interface configured to receive application input from one or more applications via one or more application programming interfaces (APIs) and transmit application output to the one or more applications via the one or more APIs, and one or more processors configured to process the raw input data into standardized input data and generate the output data and the application output based on at least one of the standardized input data and the application input, wherein the application output comprises data regarding growth of one or more plants in an indoor horticultural environment and the output data comprises control commands for controlling at least one of the plurality of output devices to affect growth of the one or more plants in the indoor horticultural environment.

In some implementations, each input device provides the raw input data in a format specific to the input device. In some implementations, processing the raw input data into standardized input data comprises classifying the raw input data into a plurality of input types and standardizing, for each input type, the raw input data classified as that input type. In some implementations, the plurality of input types includes at least one of temporal data, results of data analytics, blockchain data, structured/relational data, and unstructured data. In some implementations, the application input comprises a request for the application output and/or output data and the one or more processors are further configured to select one or more of the plurality of input types based on the request and generate the application output and/or output data based on the standardized input data of the selected input types. In some implementations, each output device receives data in a format specific to the output device. In some implementations, the plurality of input devices comprises at least one of a sensor, a lighting fixture, a third-party data service, and an environmental control system. In some implementations, the application input comprises input from at least one of a user and a third party application. In some implementations, the plurality of output devices comprises at least one of an actuator, a sensor, a lighting fixture, a computing device, a third-party data service, and an environmental control system. In some implementations, the one or more processors are further configured to determine correlations between the standardized input data and the application output and the output data are generated based on the determined correlations. In some implementations, the platform further comprises a memory configured to store the raw input data, the application input, the standardized input data, the determined correlations, the application output, and the output data. In some implementations, the raw input data comprises at least one of sensor data, user input, environmental data of the indoor horticultural environment, lighting data, plant growth data, and data collected by third parties. In some implementations, the output data comprises at least one of operational parameters for at least one of the plurality of output devices, plant lighting recipes, plant growth recipes, pest control programs, disinfection procedures, and yield prediction.

Further implementations disclosed herein include a method of providing a horticultural platform as a service, comprising receiving, at a first communications interface, raw input data from a plurality of input devices, receiving, at a second communications interface, application input from one or more applications via one or more application programming interfaces (APIs), processing, by one or more processors, the raw input data into standardized input data, generating, by the one or more processors, output data and application output based on at least one of the standardized input data and the application input, wherein the application output comprises data regarding growth of one or more plants in an indoor horticultural environment and the output data comprises control commands for controlling at least one of a plurality of output devices to affect growth of the one or more plants in the indoor horticultural environment, transmitting, by the first communications interface, the output data to the plurality of output devices, and transmitting, by the second communications interface, the application output to the one or more applications via the one or more APIs.

In some implementations, each input device provides the raw input data in a format specific to the input device. In some implementations, processing the raw input data into standardized input data comprises classifying, by the one or more processors, the raw input data into a plurality of input types and standardizing, by the one or more processors, for each input type, the raw input data classified as that input type. In some implementations, the application input comprises a request for the application output and/or output data and the method further comprises selecting one or more of the plurality of input types based on the request and generating the application output and/or output data based on the standardized input data of the selected input types. In some implementations, each output device receives data in a format specific to the output device. In some implementations, the application input comprises input from at least one of a user and a third party application. In some implementations, the method further comprises determining, by the one or more processors, correlations between the standardized input data, wherein the application output and the output data are generated based on the determined correlations.

OTHER CONSIDERATIONS

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, aspect, article, material, kit, and/or method described herein. In addition, any combination of two or more such features, systems, aspects, articles, materials, kits, and/or methods, if such features, systems, aspects, articles, materials, kits, and/or methods are not mutually inconsistent, is included within the inventive scope of the present disclosure. Particularly, any element of the disclosure and any aspect thereof may be combined, in any order and any combination, with any other element of the disclosure and any aspect thereof.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various disclosed concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the disclosure above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the eighth edition as revised in July 2010 of the United States Patent Office Manual of Patent Examining Procedures, Section 2111.03

For the purpose of this disclosure and the claims that follow, the term "connect" has been used to describe how various elements interface or couple. Such described interfacing or coupling of elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

Glossary

Actuators

Actuators comprise components or devices, usually as part of a machine, that can transform electric, hydraulic or pneumatic energy into mechanical movement. Actuators can also be suited to emit, for example by spraying, herbicides, nutrients, and so on.

Agricultural Light Fixtures

Agricultural light fixtures provide lighting for plants, algae, fungi, transgenic plants, and any other edible or useable produce as well as for animals, including transgenic animals, insects, bacteria, and viruses with natural and/or artificial electromagnetic radiation.

The agricultural light fixture may comprise at least one light module. Said one light module may have a light source and a driver connected to the light source. Furthermore, the agricultural light fixture further may have an interface unit, in particular a hardware interface, configured to receive, emit, and/or store data signals. The interface unit may be connected to the driver and/or to the light source for controlling the operation state of the driver and/or the operation of the light source.

Agricultural light is applied in order to influence, stimulate and control the growth and well-being in all stages of the individual development including shoot development, reproduction, morphology, maturation, flowering, harvesting and storage. In the following, due to simplicity, the term 'light' shall encompass the entire electromagnetic wavelength range from the ultraviolet (100 to 400 nm) to the visible (400-780 nm) to the infrared (780 nm to 1 mm) spectral range.

The light source may be configured to emit radiation in the visible and/or the non-visible spectral range, as for example in the far-red range and/or in the UV-B region of the electromagnetic spectrum. It may be configured to emit monochromatic light, e.g. green light at 525 nm, or narrow band radiation with a Full Width At Half Maximum (FWHM) smaller than 50 nm, or broadband radiation with a Full Width At Half Maximum (FWHM) greater than 100 nm. The light source may be an integral part of the light fixture as well as a remote yet connected element. It may be placed in various geometrical patterns, distance pitches and may be configured for alternating of color or wavelength emission or intensity or beam angle. The fixture and/or light sources may be mounted such that they are moveable or can be inclined, rotated, tilted etc. The fixture and/or light source may be configured to be installed inside a building or exterior to a building. In particular, it is possible that the light source or selected light sources are mounted such or adapted to being automatically controllable, in some embodiments/implementations remotely, in their orientation, movement, light emission, light spectrum, sensor etc.

Agricultural light fixtures can be part of a fixed, moveable or portable growth or storage place. Agricultural light fixtures can contain light sources, light source drivers and controllers, sensors, optical components, actuators, as well as data storage, processing and one-directional, bi-directional and multi-directional communication devices. Agricultural light fixtures can contain heating and cooling devices as well as heat deflecting devices, such as heat reflective walls.

Agricultural light fixtures can contain or be made of transparent polymeric materials, translucent materials, and specular or diffusive materials.

Agricultural light fixtures for plant growth can be suited to modulate light generated by the light sources with a rhythmic or aperiodic signal produced artificially or a rhythmic signal extracted from sound present in nature, and can be suited to illuminate a plant with the modulated light.

Agricultural light fixtures can be operated based on the execution of light recipes. Agricultural light fixtures can have individual identifiers, like an RFID chip or a digital signature or IP-address, allowing them to be connected to a computer system or cloud computer network, so that they can be part of an Internet-of-Things (IoT)-system.

Agricultural light fixtures can be suited for underwater lighting, sweet and salt water.

Agricultural light fixtures can be part of an Industry 4.0 standard.

Light fixtures of agricultural purposes can contain artificial light sources like Light Emitting Diodes (LED) with or without conversion by using a fluorescent substance, commonly referred to as phosphor, or laser diodes, organic light emitting diodes (OLED), Quantum Dot light emitters, Fluorescent lamps, Sodium low and high pressure lamps, Xenon and Mercury Short Arc lamps, Halogen lamps, and the like. Light fixtures of agricultural purposes can contain fluorescent or phosphorescent substances, for example applied to the fixture surfaces. The light source of the light fixtures of agricultural purposes can be adjusted or be optimized for use in connection to optical components, such as reflectors, symmetrical or asymmetrical lenses, filters and so on.

Light fixtures of agricultural purposes can be grouped together or can be arranged in a network or wireframe fashion.

An agricultural light fixture can be rotated, for example from lighting top-down to lighting bottom-up at various stages of a rotary growth cabinet.

An agricultural light fixture can be made of a flexible material that is formable, e.g. bendable, and can therefore be changed in form and shape. An agricultural light fixture can be comprised of one or several light modules that can be changed, individually or as a group, in their form and/or position thus altering the shape and appearance of the fixture.

In some embodiments, the agricultural light fixture may comprise a sensor, such as a resistive, a capacitive, an inductive, a magnetic, an optical and/or a chemical sensor. It may comprise a voltage or current sensor. The sensor may connect to the interface unit and/or the driver of the agricultural light source.

In some embodiments, the agricultural light fixture may comprise a brightness sensor, for example for sensing environmental light conditions in proximity of agricultural objects, such as plants. It may be used for sensing daylight conditions and the sensed brightness signal may e.g. be used to improve yield and/or energy efficiency. That way, it may be enabled to provide plants with a required amount of light of a predefined wavelength, when natural light conditions, such as daylight conditions, are not sufficient. It is also possible, in particular when the area to be illuminated is within an area without natural light, that daylight conditions are simulated, based on a sensor remote to the light module or light source of the agricultural light fixture, sensing the actual daylight conditions. That way, comparison of yield and influence of lighting conditions of an agricultural light fixture with respect to natural lighting conditions may be assessed, while minimizing other natural influences.

In some embodiments, the agricultural light fixture comprises a sensor for plant growth, harvesting time, plant morphology and/or plant health sensing. Such sensor data may allow a better prediction, as to whether the growth conditions are sufficient, as to when a harvesting is preferable, whether the development of the plants are normal and/or on schedule or whether the state of health of the plants is within acceptable limits.

The agricultural light fixture may also comprise a presence sensor. This may allow to adapt the emitted light to the presence of a farmer or other person in order to provide sufficient illumination, prohibit or minimize eye damage or skin irritation or such due to illumination in harmful or invisible wavelength regions, such as UV or IR. It may also be enabled to provide light of a wavelength that may warn or frighten away unwanted presences, e.g. the presence of animals such as pets or insects.

In some embodiments, the agricultural light fixture comprises a sensor or multi-sensor for predictive maintenance and/or operation of the agricultural light fixture failure. This may allow planning of maintenance of fixtures for times, where outage of the agricultural light has minimal effect on the growth, health or other predetermined characteristics of the plants.

In some embodiments, the agricultural light fixture comprises an operating hour meter. The operating hour meter may connect to the driver.

The agricultural light fixture may comprise one or more actuators for adjusting the growing conditions for the plants. For instance it may comprise actuators that allow adjusting the temperature, humidity, lighting, air, ventilation in the proximity of the light fixture. It may as well allow the application of active agents, such as water, nutrients and/or pesticides.

While the sensor or actuator had been described as part of the agricultural light fixture, it is understood, that any sensor or actuator may be an individual element or may form part of a different element of the Controlled Agricultural System. As well, it may be possible to provide an additional sensor or actuator, being configured to perform or performing any of the described activities as individual element or as part of an additional element of the Controlled Agricultural System.

In some embodiments, the agricultural light fixture further comprises a light control unit that connects to the interface unit.

The light control unit may be configured to control the at least one light module for operating in at least one of the following operation modes: dimming, pulsed, PWM, boost, irradiation patterns, including illuminating and non-illuminating periods, light communication, synchronization with other elements of the Controlled Agricultural System, such as a second agricultural light fixture.

The interface unit of the agricultural light fixture may comprise a gateway, such as a wireless gateway, that may connect to the light control unit. It may comprise a beacon, such as a Bluetooth™ beacon.

The interface unit may be configured to connect to other elements of the Controlled Agricultural System, e.g. one or more other agricultural light fixtures and/or to one or more sensors and/or one or more actuators of the Controlled Agricultural System.

The interface unit may be configured to be connect by any wireless or wireline connectivity, including radio and/or optical connectivity.

The agricultural light fixture may be configured for adaptive form shaping and adjustment of the distance to the plants. It may be modularly structured and configured for easy upgrades and replacements of modules. In some embodiments, the agricultural light fixture may be configured to enable customer-specific and/or plant-specific light spectra. It may be configured to enable customer-specific and/or plant-specific Photosynthetically Active Radiation (PAR). The agricultural light fixture may be configured to change the form and/or position and/or orientation of the at least one light module. Further the agricultural light fixture may be configured to change the light specifications of the light emitted by the light source, such as direction of emission, angle of emission, beam divergence, color, wavelength, and intensity as well as other characteristics.

In some embodiments, the agricultural light fixture may comprise a data processing unit. The data processing unit may connect to the light driver and/or to the interface unit. It may be configured for data processing, for data and/or signal conversion and/or data storage. The data processing unit may advantageously be provided for communication with local, network-based or web-based platforms, data sources or providers, in order to transmit, store or collect relevant information on the light module, the plants to be grown, or other aspects connected with the agricultural light fixture.

Agricultural Plant or Facility

The term Agricultural plant or facility shall comprise greenhouses, vertical farms, urban farms, aquaponics farms, aeroponic farms, indoor farms, small kitchen farming units, and the like. An agricultural facility needs control of energy, material, human workforce, harvesting machines, agribots (agricultural robots), waste, ecological recycling devices, ventilation, heating and cooling, humidifying, and the like. An agricultural facility can track or calculate the total energy.

The term Agritecture describes concepts of buildings and buildings that are suited for vertical farming or the coexistence of humans and plants or animals in one building. Agritecture can include aspects of energy efficiency, flow of goods and energy, use of natural lighting, use of natural energy or heat sources, like geothermic, wind, water as well as design of the building.

Agricultural System

An agricultural system is an assemblage of components, which are united by some form of interaction and interdependence and which operate within a prescribed boundary to achieve a specified agricultural objective on behalf of the beneficiaries of the system.

The agricultural system may be connected to numerous other systems, including the provision and distribution of energy, the marketing of agricultural goods, the provision of monetary and financial services, and of central relevance to this report the planning of land use.

An agricultural system can include agricultural light fixtures, sensors, actuators, networks, power grid-systems, growth control devices, harvesting and post-harvesting equipment, user interface, crop-management, and may comprise an agricultural management system.

Automated Guided Vehicle (AGV)

An automated guided vehicle or automatic guided vehicle (AGV) is a robot that follows markers or wires in the floor, or uses vision, magnets, or lasers for navigation. An AGV can be equipped to operate autonomously.

Beacon

A Beacon is a device that emits signal data for communication purposes, for example based on Bluetooth technology. A Beacon can establish a Wireless Local Area Network.

Controlled Agricultural System

In a Controlled Agricultural System according to the present disclosure, a computing device may be locally based, network based, and/or cloud-based. That means, the computing may be performed in the Controlled Agricultural System or on any directly or indirectly connected entities. In the latter case, the Controlled Agricultural System is provided with some connecting means, which allow establishment of at least a data connection with such connected entities. The data connection can be done wireless (e.g. WLAN or Bluetooth) or wireline (e.g. LAN).

In some embodiments, the Controlled Agriculture System comprises an Agriculture Management System connected to the at least one hardware interface. The agriculture management system may comprise one or more actuators for adjusting the growing conditions for the plants. For instance, growing conditions may be temperature, humidity, water, nutrients, lighting, air, ventilation, pesticides.

The present disclosure further comprises an agriculture management software. The present disclosure further comprises a data storage device with the agriculture management software, wherein the data storage device is enabled to run the agricultural management software. The data storage device may either comprise be a hard disk, a RAM, or other common data storage utilities such as USB storage devices, CDs, DVDs and similar.

The Controlled Agricultural System, in particular the agriculture management software, may be configured to control and handle supply and demand, waste management, recycling, disinfection and/or Automatically Guided Vehicles (AGV). That way, human interaction with and contamination of the farms may be reduced.

The Controlled Agricultural System may be part of a Digital Supply Chain and collect inputs from customers, partners or other third persons as well as provide feedback to them.

In some embodiments, the computing device is configured to perform the agriculture management software.

The agriculture management software may comprise any member selected from the following group or a combination thereof: software rules for adjusting light to outside conditions, adjusting the light intensity of the at least one agricultural light fixture to environmental conditions, adjusting the light spectrum of the at least one agricultural light fixture to environmental conditions, adjusting the light spectrum of the at least one agricultural light fixture to supply-and-demand conditions, adjusting the light spectrum of the at least one agricultural light fixture according to customer specification.

The agriculture management software may furthermore comprise similar rules to adjust other parameters of the agricultural plant, like temperature, humidity, CO2.

The Controlled Agricultural System may further comprise a feedback system connected to the at least one hardware interface. The feedback system may comprise one or more sensors for monitoring the state of plants for which the Controlled Agricultural System is provided. The state of plants may for example, be assessed by at least one of the following: plant growth, plant health sensing, stress detection, plant color, plant morphology, plant leaf density, plant nutrients, plant chemicals, plant enzymes.

The Controlled Agricultural System may further comprise a feedback software.

The feedback software may in some embodiments comprise algorithms for plant health assessment on the basis of the data of the sensors.

The feedback software of the Controlled Agricultural System may in some embodiments comprise algorithms for deriving growth strategies and/or lighting strategies on the basis of the data of the sensors.

The feedback software of the Controlled Agricultural System may in some cases comprise light recipes for plants depending on any member selected from the following group or a combination thereof: plant physiology, plant health, growth stage, harvesting, storage and delivery.

The feedback software may be configured to provide instructions to the agriculture management software for adapting the growing conditions of the plants autonomously.

The feedback software may comprise algorithms for interpreting sensor data and suggesting corrective actions to the agriculture management software.

In some embodiments of the Controlled Agricultural System, the instructions to the agriculture management software are based on measured values and/or data of any member selected from the following group or a combination thereof: daylight, Photosynthetically Active Radiation, temperature, $CO_2$, plant stress, nutrition supply, electricity prices and current demand for the plants, leaf reflection, plant fluorescence or phosphorescence. The Agricultural System therefore may have a data interface to receive the measured values and/or data. The data interface may be provided for wire-bound transmission or wireless transmission. In particular, it is possible that the measured values or the data are received from an intermediate storage, such as a cloud-based, web-based, network-based or local type storage unit.

Further, the sensors for sensing environmental or plant conditions may be connected with or interconnected by means of cloud-based services, often also referred to as Internet of Things.

In some embodiments, the Controlled Agricultural System comprises a software user interface (UI), particularly a graphical user interface (GUI). The software user interface may be provided for the light control software and/or the agriculture management software and/or the feedback software.

The software user interface (UI) may further comprise a data communication and means for data communication for an output device, such as an augmented and/or virtual reality display.

The user interface may be implemented as an application for a mobile device, such as a smartphone, a tablet, a mobile computer or similar devices.

The Controlled Agricultural System may further comprise an application programming interface (API) for controlling the Agriculture System by third parties and/or for third party data integration, for example energy prices, weather data, GPS.

In some embodiments, the Controlled Agricultural System comprises a software platform for providing at least one of grow data, plant health assessment and growth strategies, light recipes, time-to-harvest, residual Photosynthetically Active Radiation demand, delivery date.

The software platform may cumulate data from growers to train machine learning algorithms for improving light recipes and growth strategies.

The Controlled Agricultural System may be connected to smart grid power supply.

The Controlled Agricultural System may also comprise a plurality of agricultural light fixtures arranged in adjustable groups.

The Controlled Agricultural System may further comprise a farm control unit. The farm control unit may be configured for running a farming management system. It is configured to connect to one or more agricultural light fixtures. It may connect to a data bus. The data bus may be configured to connect to an interface unit of an agricultural light fixture. As part of the agriculture management system, the farm control unit may be configured for controlling an operating state of the agricultural light fixture.

The agriculture management system may comprise a light control system which may comprise any of the following elements: monitoring and/or controlling the status of the at least one agricultural light fixture, monitoring and/or controlling the use of the at least one agricultural light fixture, scheduling the lighting of the at least one agricultural light fixture adjusting the light spectrum of the at least one agricultural light fixture, defining the light spectrum of the at least one agricultural light fixture, monitoring and/or controlling the use of at least one sensor of the at least one agricultural light fixture or Controlled Agricultural System.

The present disclosure further refers to a building with at least one Controlled Agricultural System. The building may be planned and build particularly for integration of the Controlled Agricultural System. However, it is also possible, that the Controlled Agricultural System was integrated in a pre-existing building. According to the present disclosure, both cases as well as a combination of these cases shall be referred to.

Controlled-Environmental Agriculture

Controlled-environment agriculture (CEA) is a technology-based approach toward food production. The aim of CEA is to provide protection and maintain optimal growing conditions throughout the development of the crop. Production takes place within an enclosed growing structure of an agricultural plant (such as a greenhouse, a vertical farm or an urban farm). Plants are often grown using hydroponic methods in order to supply the proper amounts of water and nutrients to the root zone. CEA optimizes the use of resources such as water, energy, space, capital and labor. CEA technologies include hydroponics, aeroponics, aquaculture, and aquaponics.

Controllable variables can be temperature (air, nutrient solution, root-zone, leaf), humidity (% RH), carbon dioxide ($CO_2$), light (intensity, spectrum, duration and intervals), nutrient concentration (measured e.g. in ppm, EC (Electrical Conductivity)), Nutrient pH (acidity), pests.

CEA facilities can range from fully 100% environmentally controlled enclosed closed loop systems, to fully automated glasshouses with computer controls for watering, lighting and ventilation, to low-tech solutions such as cloches or plastic film on field grown crops and plastic-covered tunnels.

CEA methods can be used to grow literally any crop, though the reality is a crop has to be economically viable and this will vary considerably due to local market pricing, and resource costs.

Crops can be grown for food, pharmaceutical and nutraceutical applications. It can also be used to grow algae for food or for biofuels.

Daily Light Integral (DLI)

A daily light integral (DLI) describes the number of photosynthetically active photons (individual particles of light in the 400-700 nm range) that are delivered to a specific area over a 24-hour period.

Data Analytics

Quantitative and/or qualitative examination of data to reveal information and insights contained therein. Data analytics shall comprise hardware, software and methods to analyze data in order to obtain information like, distance to an object, object classification, object morphology. In agriculture, an object can be a plant, animal, and so on, as described above. Data analytics can be connected to a computerized control system. All data can be encrypted. Data analytics and processing can use Blockchain methods for data persistence and confidence.

Digital Plant Twin

A Digital Plant Twin is a digital representation of a plant. The digital plant twin contains all relevant information to describe the growth of the plant (e.g. size, color, morphology, heat map). A digital plant twin may be used to compare the expected growth of a plant at a certain stage (described by the digital plant twin) with the actual growth of the plant as detected by sensors.

Gateway

Gateway means a networking hardware equipped for interfacing with another network. More specifically, a gateway is a node on a network that serves as a 'gate' or entrance/exit point to/from the network. A gateway may contain devices such as protocol translators, impedance matching devices, rate converters, fault isolators, or signal translators as necessary to provide system interoperability. It may also require the establishment of mutually acceptable administrative procedures between both networks.

Graphical User Interface (GUI)

A Graphical User Interface (GUI) is a form of a user interface that allows users to interact with electronic devices through graphical icons and visual indicators such as secondary notation, instead of text-based user interfaces, typed command labels or text navigation. GUI can be used for light scheduling and real-time control of a horticultural farm.

Growth Recipe

A growth recipe comprises growth parameters, i.e. control parameters which control the growth of plants. These control parameters can include illumination conditions (see light recipe), but also parameters like temperature, humidity, nutrient, $CO_2$, etc.

Hydroponics

Hydroponics is a subset of hydroculture, which is a method of growing plants without soil by using mineral nutrient solutions in a water solvent. Terrestrial plants may be grown with only their roots exposed to the mineral solution, or the roots may be supported by an inert medium, such as perlite or gravel.

Leaf Area Index (LAI)

Researchers often represent the vertical foliage structure using the leaf area density (LAD) in each horizontal layer, where LAD is defined as the total one-sided leaf area per unit of layer volume. The leaf area index (LAI), which is defined as the leaf area per unit of ground area covered by the projected area of the crown, is then calculated by vertically integrating the LAD profile data. The LAI ranges from 0 (bare ground) to over 10 (dense conifer forests).

Life Cycle Assessment (LCA)

Life Cycle Assessment (LCA) is the assessment of the environmental impact of a given product or service throughout its lifespan. The goal of LCA is to compare the environmental performance of products and services. The term 'life cycle' refers to the notion that the raw material production, manufacture, distribution, use and disposal (including all inputs and intervening transportation steps) need to be assessed. This is then the 'life cycle' of the product. The concept can also be used to optimize the environmental performance of a single product (eco-design) or to optimize the environmental performance of a company.

Light Detection and Ranging (LiDAR)

LiDAR is a method to measure distances and speed of objects by means of electromagnetic radiation similar to radar but using optical wavelengths (light). Usually, a pulsed laser illuminates a scene (scanning or in a flash) and sensors (photodiodes, either single ones or an array of photodiodes) measure the time-delay of the reflected pulses thus being able to calculate the distance of an object.

Light Recipe

Light recipes define lighting conditions, particularly for the illumination of plants.

A light recipe can be stored as a data set or a program code and executed by a computer-implemented software program, by a user-defined or user-selected program code, or by a sensor trigger signal.

A light recipe can contain information and/or executable commands that control light wavelength, for example suited to chlorophyll absorption curves, light intensity at specific wavelengths or overall, including photon fluxes, physical light properties such as polarization, collimation and coherence, ratios of photon fluxes in certain wavelength ranges, for example the ratio of blue to red radiation, or blue to far-red (730 nm), or UV-B to red radiation, or green to red radiation, duration of ON-times (illumination) and OFF-times (no illumination), radiation of light for measurement purposes, like monochromatic laser radiation for fluorescence measurement.

A light recipe can be adaptive, that is, it can be dependent on external trigger signals and part of a regulative feedback control loop.

A light recipe can contain information for activating and controlling light operation modes such as dimming, pulsing, pulse-width modulation, lighting patterns, boosting, for example in the millisecond range, data generation for light-based communication including synchronization with other light fixtures or agricultural operation networks for energy, material, and waste management, or with other agricultural farming places.

A light recipe can be used for plant treatment as well as for disinfection purposes.

A light recipe can contain information about bug-repelling light features as well as for bug-usable light features, like certain wavelengths in the ultraviolet, or the amount of light polarization, e.g. the amount of left- or right-handed circular polarization, heat radiation and the like.

A light recipe can contain information about the amount of photosynthetically active radiating (PAR) or flux density.

A light recipe can contain information or be selectable based on information about the total energy consumption of the activated or selected light recipe over the entire lighting duration time, or an energy equivalent such as the production of $CO_2$, oxygen or methane gases.

A light recipe can contain information about the residual energy or equivalent thereof, for example the amount of lighting energy until harvesting time.

A light recipe can be selectable and allow producers or customers to order a produce at any time and provide the necessary residual or remaining lighting data.

A light recipe can be user defined, also interactively.

A light recipe can be certified, in particular light recipes for medical plants.

A light recipe can be sold or licensed as intellectual property.

Light recipes can define the amount of canopy and interstitial lighting.

A light recipe can contain information about the location and shape of a light fixture, and can trigger a command code in order to move a fixture into a certain position or shape.

A light recipe can be stored in an accessible database system.

Photon Flux

The Photon Flux of defines the available photons per second, with no regard for wavelength. This flux is measured in micromoles of photons per second with a broadband "quantum sensor", typically a silicon photodiode with an optical filter.

Photosynthetically Active Photon Flux Density (PFD or PPFD)

The Photosynthetically Active Photon Flux Density (PFD or PPFD) means the photon flux density of photons in the PAR part of the spectrum. Its unit is μmol (Photons)/($m^2$s).

Photosynthetically Active Radiation (PAR)

A Photosynthetically Active Radiation (PAR) is driving photosynthesis in higher plants, it describes a wavelength range—i.e. 400-700 nm—but does not define whether an energy or photon quantity is being used.

Phototropism

Phototropism is the ability of a plant, or other photosynthesizing organism, to grow directionally in response to a light source. Positive phototropism is the response of a plant toward a light source, while negative phototropism (also called "aphototropism") causes growth in the opposite direction. Plant roots usually use negative phototropism.

Plant

The term plant shall include crops, grains, fruits, algae, fungi, transgenic plants, flowering plants, prokaryotes, and any other edible or useable produce as well as animals, including fish, transgenic animals, and insects.

Sensors

Sensors are devices, modules or subsystems whose purpose it is to detect events or changes in its environment and send the information to other electronics, frequently a computer processor. Nowadays, there is a broad range of sensors available for all kinds of measurement purposes, for example the measurement of touch, temperature, humidity, air pressure and flow, electromagnetic radiation, toxic substances and the like.

Sensors can be used to measure resistive, capacitive, inductive, magnetic, optical or chemical properties.

Sensors include camera sensors, for example CCD chips, Lidar sensors for measurements in the infrared wavelength range, Radar Sensors, and acoustic sensors for measurement in the infrasound, audible and ultrasound frequency range. Ultrasound is radiation with a frequency above 20 kHz.

Sensors can be infrared sensitive and measure for example the presence and location of humans or animals.

Sensor can be grouped into a network of sensors.

Sensors can be connected directly or indirectly to data storage, data processing and data communication devices.

Sensors can be used to measure the content or concentration of plant enzymes, vitamins, flavonoids, but also for ingredients in the soil or other growth media, the type and amount of fertilizes, nutrients or toxic substances. In particular, sensors can measure the temperature and gas concentrations in warehouses, e.g. for apples and bananas.

Sensors in cameras can be connected to a CCTV (Closed Circuit Television). Light sensors can measure the amount and orientation of reflected light from the plants (leaf reflectivity index).

Smart Grid

Smart Grid is an electrical grid that may include a variety of operational and energy measures including smart meters, smart appliances, renewable energy resources, and energy efficient resources. The smart grid means an interconnection and control of power suppliers, storage, electrical loads and network resources in power transmission and distribution grids of the electricity supply. This allows optimization and monitoring of the interconnected components. An aim is to secure the energy supply based on efficient and reliable system operation.

Vapor Pressure Deficit

Vapor-pressure deficit, or VPD, is the difference (deficit) between the amount of moisture in the air and how much moisture the air can hold when it is saturated. Once air becomes saturated, water will condense out to form clouds, dew or films of water over leaves. It is this last instance that makes VPD important for greenhouse regulation. If a film of water forms on a plant leaf, it becomes far more susceptible to rot. On the other hand, as the VPD increases, the plant needs to draw more water from its roots. In the case of cuttings, the plant may dry out and die. For this reason the ideal range for VPD in a greenhouse is from 0.45 kPa to 1.25 kPa, ideally sitting at around 0.85 kPa.

Visible Light Communication

Visible light communication (VLC) is a data communications variant, which uses visible light between 400 and 800 THz (780-375 nm). In a more general term, VLC or optical light communication can comprise UV- or IR-wavelengths in addition to visible wavelengths. The technology usually uses LEDs or OLEDs to transmit data, and photodiodes or digital cameras to receive the data.

What is claimed is:

1. A platform, comprising:
- a plurality of semantic converters, wherein each semantic converter is configured to translate between a specific data format and a common semantic model, wherein the platform supports a plurality of input categories and a plurality of output categories, and each input category and each output category is associated with a different common semantic model;
- a communications interface configured to communicate with a plurality of third-party sources; and
- a processor configured to:
  - receive a plurality of inputs including a first input from a subset of third-party sources including a first third-party source, wherein the first input is formatted in a first data format and each of the plurality of inputs is classified in a first input category associated with the first common semantic model;
  - identify semantic converters associated with each third-party source in the subset of third-party sources, including identifying a first semantic converter from the plurality of semantic converters that is associated with the first third-party source; and
  - convert each of the plurality of inputs into the first common semantic model using the identified semantic converters, including converting the first input into a first common semantic model using the first semantic converter.

2. The platform of claim 1, wherein the first third-party source comprises a device or an application.

3. The platform of claim 1, wherein the processor is further configured to:
- receive a second input from a second third-party source, wherein the second input is formatted in a second data format;
- identify a second semantic converter from the plurality of semantic converters that is associated with the second third-party source; and
- convert the second input into the first common semantic model using the second semantic converter.

4. The platform of claim 1, wherein the processor is further configured to:
- generate output data in a second common semantic model;
- identify a second semantic converter from the plurality of semantic converters that is associated with the first third-party source;
- convert the output data into a first output using the second semantic converter; and
- transmit, via the communications interface, the first output to the first third-party source.

5. The platform of claim 1, wherein the processor is further configured to:
- generate output data to be transmitted to a secondary subset of third-party sources, wherein the output data is classified in a first output category associated with a second common semantic model;
- identify semantic converters associated with each third-party source in the secondary subset of third-party sources;
- convert the output data from the second common semantic model into a plurality of outputs using the identified semantic converters, each of the plurality of outputs associated with a different third-party source in the secondary subset of third-party sources; and
- transmit, via the communications interface, each of the plurality of outputs to the associated third-party source.

6. The platform of claim 1, wherein the plurality of semantic converters are implemented as at least one of configuration files, software drivers, or microservices.

7. The platform of claim 1, wherein each of the plurality of semantic converters is associated with one of the plurality of third-party sources.

8. A method of processing data, comprising:
- receiving, at a communications interface, a plurality of inputs including a first input from a subset of third-party sources including a first third-party source, wherein the communications interface communicates with the plurality of third-party sources including the first third-party source, and each of the plurality of inputs is classified in a first input category associated with the first common semantic model;
- identifying, by a processor, semantic converters associated with each third-party source in the subset of third-party sources, including a first semantic converter from a plurality of semantic converters that is associated with the first third-party source, wherein each semantic converter is configured to translate between a specific data format and a common semantic model, the processor supports a plurality of input categories and a plurality of output categories, and each input category and each output category is associated with a different common semantic model; and
- converting, by the processor, each of the plurality of inputs into a first common semantic model using the identified semantic converters, including the first input into the first common semantic model using the first semantic converter.

9. The method of claim 8, wherein the first third-party source comprises a device or an application.

10. The method of claim 8, further comprising:
- receiving, at the communications interface, a second input from a second third-party source, wherein the second input is formatted in a second data format;
- identifying, by the processor, a second semantic converter from the plurality of semantic converters that is associated with the second third-party source; and
- converting, by the processor, the second input into the first common semantic model using the second semantic converter.

11. The method of claim 8, further comprising:
- generating, by the processor, output data in a second common semantic model;
- identifying, by the processor, a second semantic converter from the plurality of semantic converters that is associated with the first third-party source; converting, by the processor, the output data into a first output using the second semantic converter; and
- transmitting, by the communications interface, the first output to the first third-party source.

12. The method of claim 8, further comprising:
- generating, by the processor, output data to be transmitted to a secondary subset of third-party sources, wherein the output data is classified in a first output category associated with a second common semantic model;
- identifying, by the processor, semantic converters associated with each third-party source in the secondary subset of third-party sources;
- converting, by the processor, the output data from the second common semantic model into a plurality of outputs using the identified semantic converters, each of the plurality of outputs associated with a different third-party source in the secondary subset of third-party sources; and transmitting, by the communications interface, each of the plurality of outputs to the associated third-party source.

13. The method of claim 8, wherein the plurality of semantic converters are implemented as at least one of configuration files, software drivers, or microservices.

14. The method of claim 8, wherein each of the plurality of semantic converters is associated with one of the plurality of third-party sources.

15. The method of claim 8, further comprising:

adding, by the processor, a new semantic converter associated with a new third-party source to the plurality of semantic converters;

receiving, at the communications interface, a new input from the new third-party source;

identifying, by the processor, the new semantic converter from the plurality of semantic converters; and converting, by the processor, the new input into a second common semantic model using the new semantic converter.

* * * * *